US012079533B2

(12) United States Patent
Seger, Jr. et al.

(10) Patent No.: US 12,079,533 B2
(45) Date of Patent: *Sep. 3, 2024

(54) GENERATING WRITTEN USER NOTATION DATA FOR DISPLAY BASED ON DETECTING AN IMPEDANCE PATTERN OF A WRITING PASSIVE DEVICE

(71) Applicant: SigmaSense, LLC., Wilmington, DE (US)

(72) Inventors: Richard Stuart Seger, Jr., Belton, TX (US); Michael Shawn Gray, Elgin, TX (US); Patrick Troy Gray, Cedar Park, TX (US); Daniel Keith Van Ostrand, Leander, TX (US); Kevin Joseph Derichs, Buda, TX (US)

(73) Assignee: SigmaSense, LLC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,832

(22) Filed: Sep. 19, 2023

(65) Prior Publication Data

US 2024/0004602 A1 Jan. 4, 2024

Related U.S. Application Data

(63) Continuation of application No. 18/053,528, filed on Nov. 8, 2022, now Pat. No. 11,829,677, which is a (Continued)

(51) Int. Cl.

*G06F 3/044* (2006.01)
*G06F 3/041* (2006.01)

(Continued)

(52) U.S. Cl.

CPC .......... *G06F 3/1423* (2013.01); *G06F 3/0416* (2013.01); *G06F 3/0446* (2019.05); *G06F 3/04883* (2013.01); *G06F 21/31* (2013.01)

(58) Field of Classification Search

CPC .. G06F 3/0416; G06F 3/0446; G06F 3/04883; G06F 3/1423; G06F 21/31

See application file for complete search history.

(56) References Cited

U.S. PATENT DOCUMENTS 5,437,178 A 8/1995 Esin et al.
6,218,972 B1 4/2001 Groshong (Continued)

FOREIGN PATENT DOCUMENTS

CN 103995626 A 8/2014
CN 104182105 A 12/2014

(Continued)

OTHER PUBLICATIONS

Baker; How delta-sigma ADCs work, Part 1; Analog Applications Journal; Oct. 1, 2011; 6 pgs.

(Continued)

*Primary Examiner* — Ryan A Lubit

(74) *Attorney, Agent, or Firm* — Garlick & Markison; Katherine C. Stuckman; Bruce E. Stuckman

(57) ABSTRACT

An interactive device is operable to receive a first plurality of sensed signals during a first temporal period. The first plurality of sensed signals indicate a first plurality of changes in electrical characteristics of a set of electrodes of the plurality of electrodes. A first impedance pattern identifying a writing passive device is detected based on interpreting the first plurality of changes in the electrical characteristics of the set of electrodes during the first temporal period. The writing passive device is detected based on detecting the first impedance pattern. Written user notion data is detected based on detecting movement of the writing passive device in relation to the interactive display device during the first temporal period. The written user notation (Continued)

data is processed for display in accordance with at least one display setting corresponding to the writing passive device.

20 Claims, 258 Drawing Sheets
(14 of 258 Drawing Sheet(s) Filed in Color)

Related U.S. Application Data continuation of application No. 17/445,027, filed on Aug. 13, 2021, now Pat. No. 11,556,298.

(60) Provisional application No. 63/203,806, filed on Jul. 30, 2021.

(51) Int. Cl.

| | |
|---|---|
| ***G06F 3/04883*** | (2022.01) |
| ***G06F 3/14*** | (2006.01) |
| ***G06F 21/31*** | (2013.01) |

(56) References Cited

U.S. PATENT DOCUMENTS 6,665,013 B1 12/2003 Fossum et al.
7,476,233 B1 1/2009 Wiener et al.
7,528,755 B2 5/2009 Hammerschmidt
8,031,094 B2 10/2011 Hotelling
8,089,289 B1 1/2012 Kremin et al.
8,279,180 B2 10/2012 Hotelling et al.
8,537,110 B2 9/2013 Kruglick
8,547,114 B2 10/2013 Kremin
8,587,535 B2 11/2013 Oda et al.
8,625,726 B2 1/2014 Kuan
8,657,681 B2 2/2014 Kim
8,966,400 B2 2/2015 Yeap
8,970,540 B1 * 3/2015 Hebenstreit ........... G06F 40/169 178/18.05
8,982,097 B1 3/2015 Kuzo et al.
9,081,437 B2 7/2015 Oda
9,201,547 B2 12/2015 Elias
9,880,676 B1 * 1/2018 Mukherjee ............ G06F 3/0447
10,007,335 B2 6/2018 Lee
2003/0052657 A1 3/2003 Koernle et al.
2003/0207244 A1 * 11/2003 Sakai ....................... G09B 7/02 434/350
2005/0235758 A1 10/2005 Kowal et al.
2011/0063154 A1 3/2011 Hotelling et al.
2011/0298745 A1 * 12/2011 Souchkov ............. G06F 3/0446 345/174
2012/0278031 A1 11/2012 Oda
2013/0278447 A1 10/2013 Kremin
2014/0272890 A1 * 9/2014 DiBuono ................. G09B 7/00 434/350
2014/0327644 A1 11/2014 Mohindra
2014/0368447 A1 * 12/2014 Saini ..................... G06F 3/1423 345/173
2015/0054784 A1 * 2/2015 Kim .................... G06F 3/04883 345/174
2015/0091847 A1 4/2015 Chang
2015/0339051 A1 * 11/2015 Yang ................... G06F 3/04886 382/189
2015/0346889 A1 12/2015 Chen
2015/0370356 A1 * 12/2015 Hwang ................. G06F 3/0445 345/173
2016/0148520 A1 * 5/2016 Bujsaim .................. G06F 3/167 434/317
2016/0188049 A1 6/2016 Yang et al.
2018/0081456 A1 * 3/2018 Li ......................... G06F 3/0383
2018/0096623 A1 * 4/2018 Xia ......................... A63F 13/92
2018/0157354 A1 6/2018 Blondin et al.
2018/0275824 A1 9/2018 Li
2020/0000220 A1 * 1/2020 Kurian ................... A47B 41/02
2020/0213368 A1 * 7/2020 Rangel ................ H04L 65/4015
2020/0293121 A1 * 9/2020 Matsui ................ G06F 3/04162
2021/0223939 A1 * 7/2021 Losh ................... G06F 3/04184

FOREIGN PATENT DOCUMENTS

CN 104536627 A 4/2015
CN 107771273 A 3/2018
EP 2284637 A1 2/2011

OTHER PUBLICATIONS

Brian Pisani, Digital Filter Types in Delta-Sigma ADCs, Application Report SBAA230, May 2017, pp. 1-8, Texas Instruments Incorporated, Dallas, Texas.
European Patent Office; Extended European Search Report; Application No. 19853507.2; Jun. 13, 2023; 7 pgs.

* cited by examiner

FIG. 1 interactive display device
10 interactive display device 10 contact, human touch touch screen system 86 cross section
hollow center interactive display device 10 interactive display device 10 interactive display device 10 interactive display device 10 interactive display device 10 interactive display device 10 interactive display device 10

Processing module 48 time $t_0$ time $t_1$ time $t_0$ time $t_1$ time $t_2$ time $t_2$ time $t_0$ time $t_1$ time $t_2$ time $t_0$ time $t_1$ communication system 1110 computing device 1112-1114 computing device 1112-1114 computing device 1112-1114 computing device 1112-1114 computing device 1112-1114 computing device 1112-1114 computing device 1112-1114 computing device 1112-1114 example default ping signal

| | | |
|---|---|---|
| cycle 1 | TX at f1 | 1 |
| cycle 2 | no TX | 0 |
| cycle 3 | TX at f1 | 1 |
| cycle 4 | no TX | 0 |
| cycle 5 | no TX | 0 |
| cycle 6 | TX at f1 | 1 |
| cycle 7 | TX at f1 | 1 |
| cycle 8 | TX at f1 | 1 |
| cycle 9 | no TX | 0 |
| cycle 10 | TX at f1 | 1 |
| cycle 11 | no TX | 0 |
| cycle 12 | TX at f1 | 1 |
| cycle 13 | no TX | 0 |
| cycle 14 | TX at f1 | 1 |
| cycle 15 | no TX | 0 |
| cycle 16 | TX at f1 | 1 |

another example default ping signal

| | | |
|---|---|---|
| cycle 1 | no TX | 00 |
| cycle 2 | TX at f1 | 01 |
| cycle 3 | TX at f2 | 10 |
| cycle 4 | TX at f3 | 11 |
| cycle 5 | TX at f1 | 01 |
| cycle 6 | TX at f2 | 10 |
| cycle 7 | TX at f1 | 01 |
| cycle 8 | TX at f2 | 10 |
| cycle 9 | TX at f3 | 11 |
| cycle 10 | TX at f3 | 11 |
| cycle 11 | no TX | 00 |
| cycle 12 | TX at f1 | 01 |
| cycle 13 | TX at f2 | 10 |
| cycle 14 | TX at f3 | 11 |
| cycle 15 | TX at f3 | 11 |
| cycle 16 | no TX | 00 |

example default ping signal

| | | |
|---|---|---|
| cycle 1 | TX at f1 | 1 |
| cycle 2 | no TX | 0 |
| cycle 3 | TX at f1 | 1 |
| cycle 4 | no TX | 0 |
| cycle 5 | no TX | 0 |
| cycle 6 | TX at f1 | 1 |
| cycle 7 | TX at f1 | 1 |
| cycle 8 | TX at f1 | 1 |
| cycle 9 | no TX | 0 |
| cycle 10 | TX at f1 | 1 |
| cycle 11 | no TX | 0 |
| cycle 12 | TX at f1 | 1 |
| cycle 13 | no TX | 0 |
| cycle 14 | TX at f1 | 1 |
| cycle 15 | no TX | 0 |
| cycle 16 | TX at f1 | 1 |

ICD = interactive computing device
UCD = user computing device
STS = screen-to-screen ICD = interactive computing device
UCD = user computing device
STS = screen-to-screen

1400

1500

1601

1602

1700
drive-sense circuit 1228

1800
display 1283 with in-cell touch sensors 1900
transparent electrode (ITO) layer with thin film transistors

2000

2100

2200

2300

2400

2500

2600

2700

2801

2802

3901

3902 computing device 3114 computing device 3118 computing device 3114 or 3118

No touch or touchless indication it = cv
c= Q/v series Ct = C1*C2/(C1 + C2)
parallel Ct = C1 + C2 i2Cm_0 > i2Cm_1, v is constant, t is constant, thus Cm_0 < Cm_1

Touch or touchless indication

2000

2100

FIG. 64S
2201
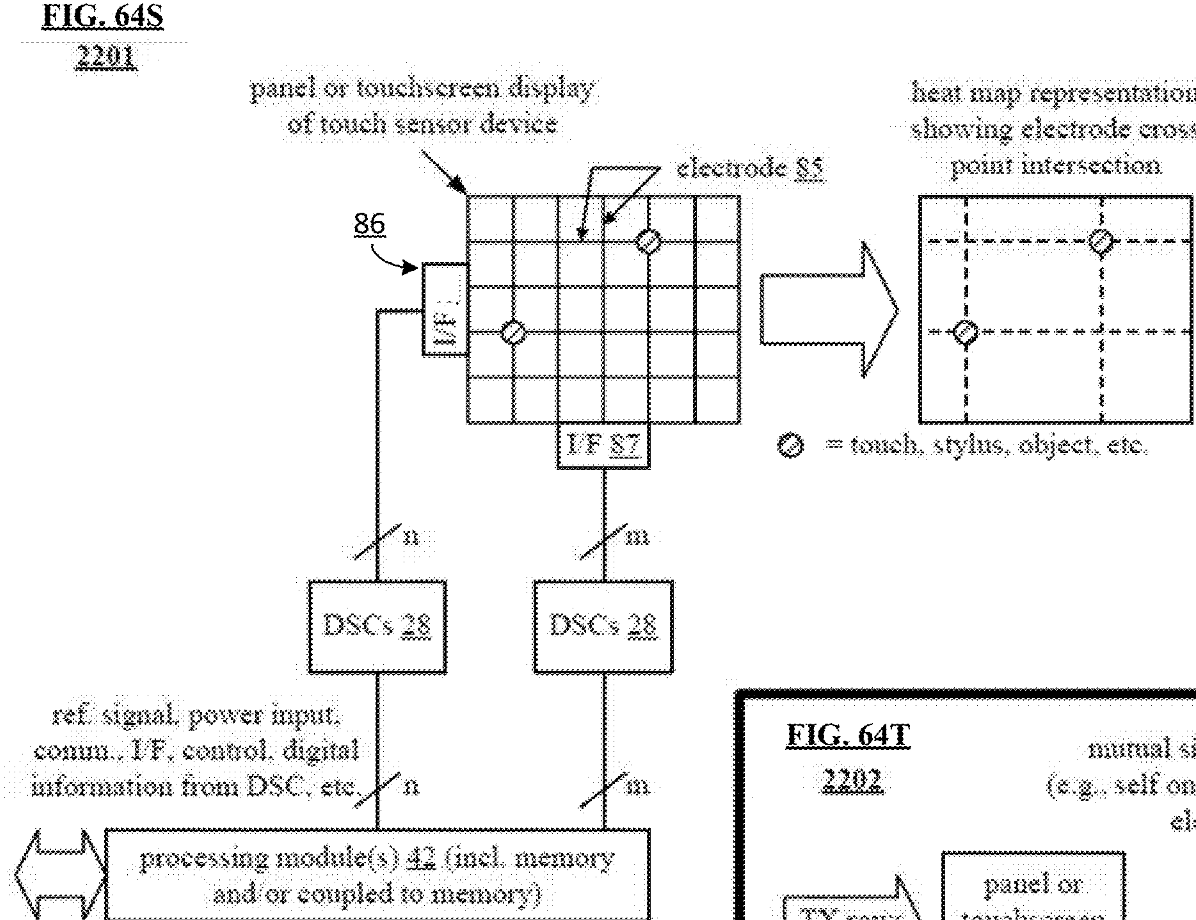
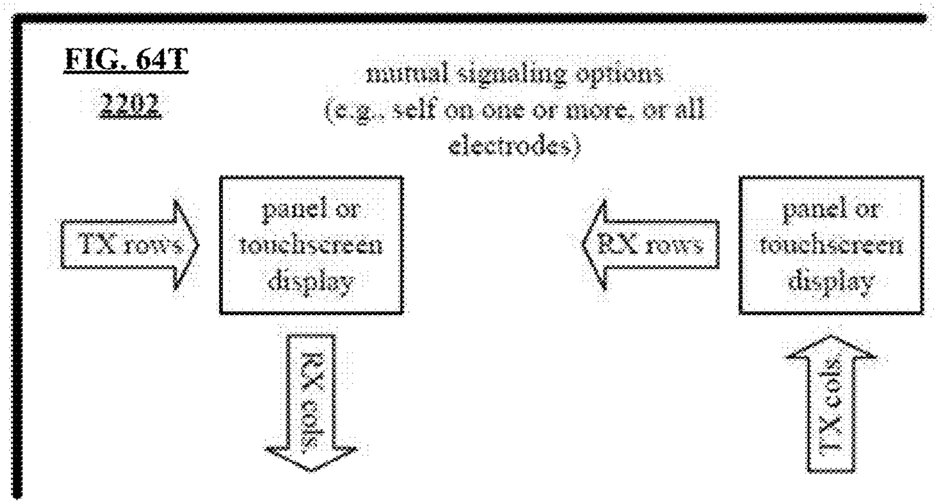

GENERATING WRITTEN USER NOTATION DATA FOR DISPLAY BASED ON DETECTING AN IMPEDANCE PATTERN OF A WRITING PASSIVE DEVICE

CROSS-REFERENCE TO RELATED APPLICATIONS

The present U.S. Utility Patent Application claims priority pursuant to 35 U.S.C. § 120 as a continuation of U.S. Utility application Ser. No. 18/053,528, entitled "GENERATING WRITTEN USER NOTATION DATA BASED ON DETECTION OF A WRITING PASSIVE DEVICE", filed Nov. 8, 2022, which is a continuation of U.S. Utility application Ser. No. 17/445,027, entitled "GENERATION AND COMMUNICATION OF USER NOTATION DATA VIA AN INTERACTIVE DISPLAY DEVICE", filed Aug. 13, 2021, issued as U.S. Pat. No. 11,556,298 on Jan. 17, 2023, which claims priority pursuant to 35 U.S.C. § 119(e) to U.S. Provisional Application No. 63/203,806, entitled "GENERATION AND COMMUNICATION OF USER NOTATION DATA VIA AN INTERACTIVE DISPLAY DEVICE", filed Jul. 30, 2021, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates to computer systems and more particularly to interaction with a touch screen of a computing device.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIGS. 5A-51B are pictorial diagrams illustrating embodiments of an interactive display device in accordance with the present disclosure;

Figure 62A:
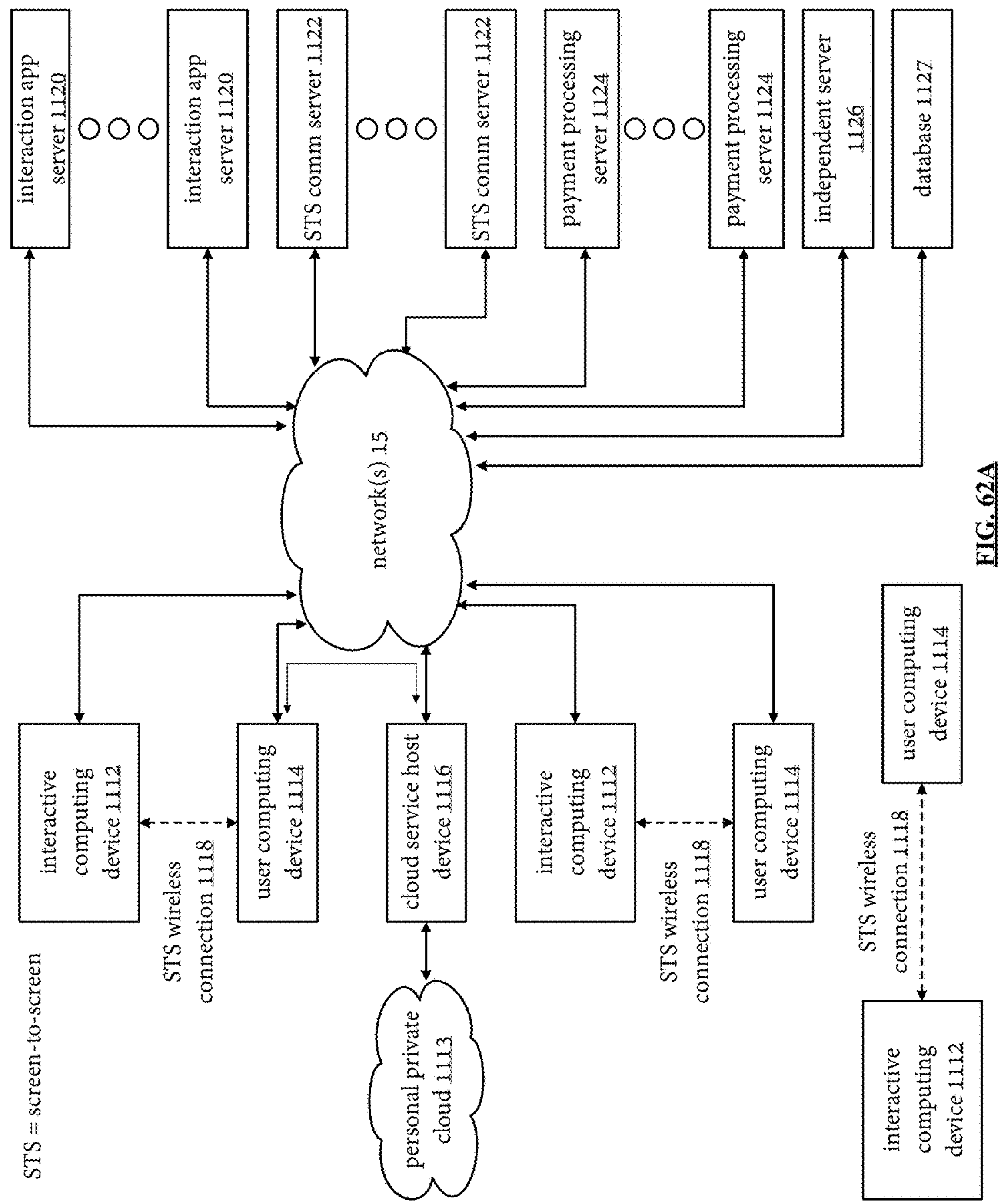
FIG. 62A is a schematic block diagram of an embodiment of a communication system in accordance with the present disclosure.
Figure 62B:
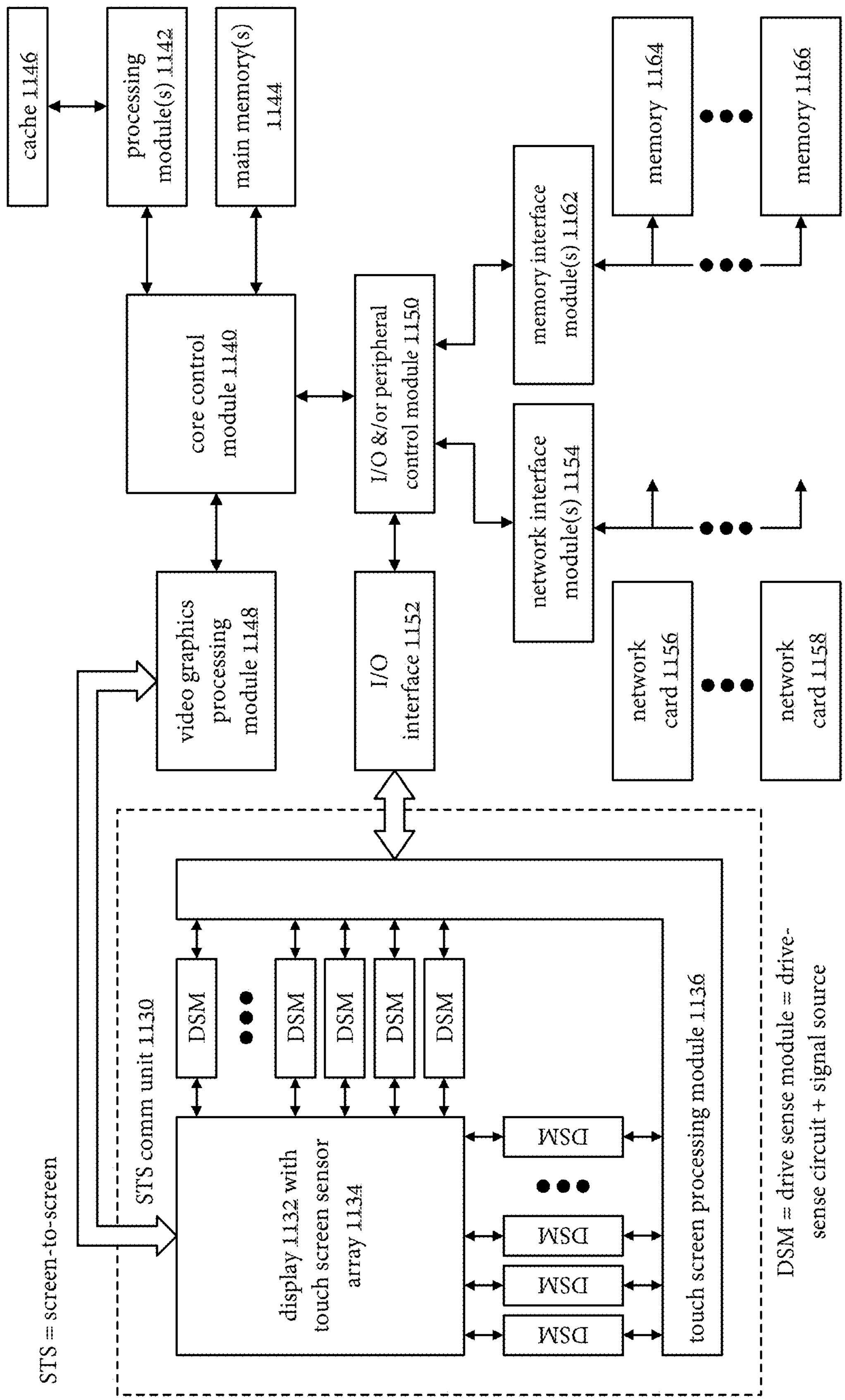
FIG. 62B is a schematic block diagram of an embodiment of a computing device in accordance with the present disclosure.
Figure 63A:
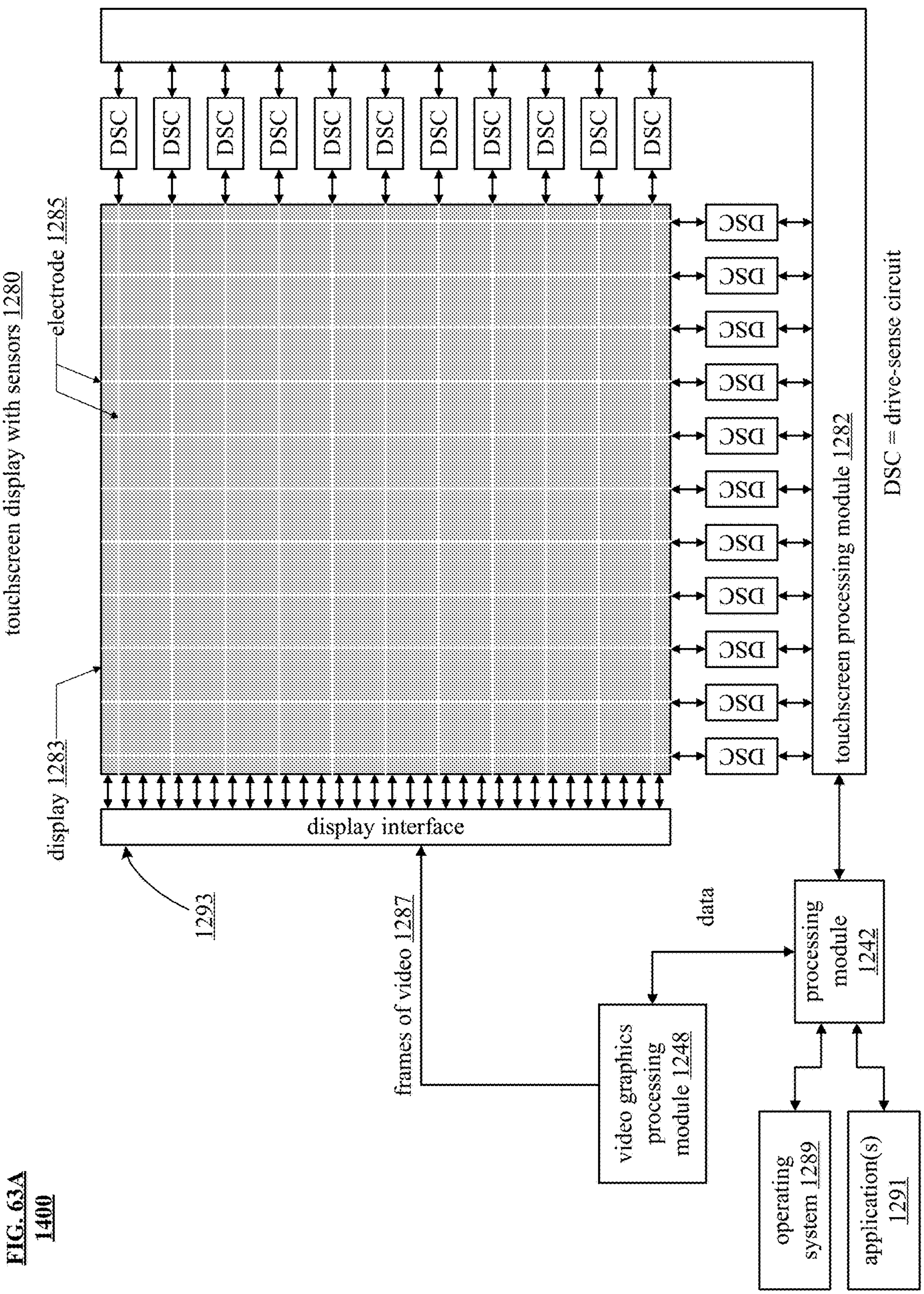
Figure 63B:
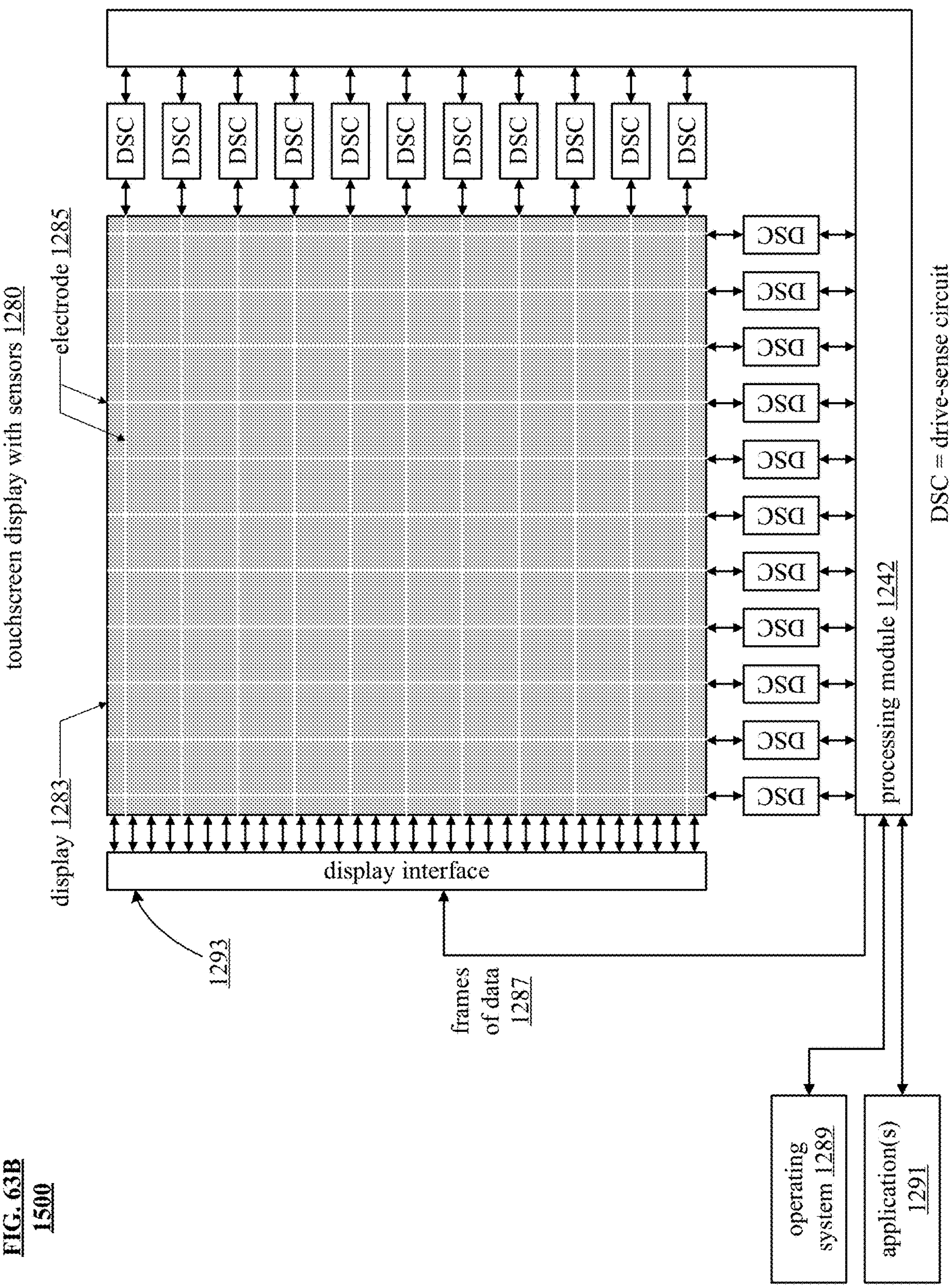
Figure 63C:
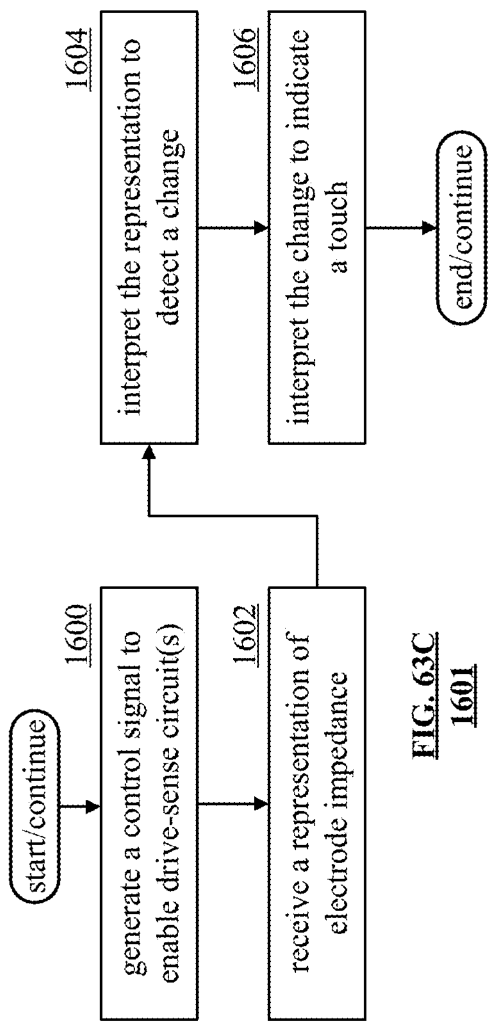
Figure 63D:
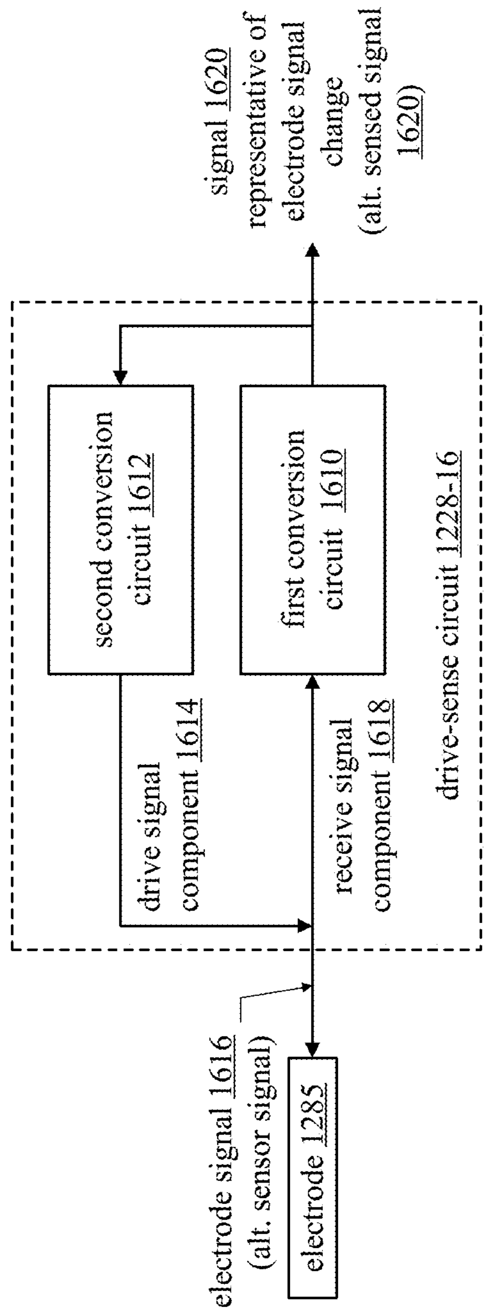
Figure 63E:
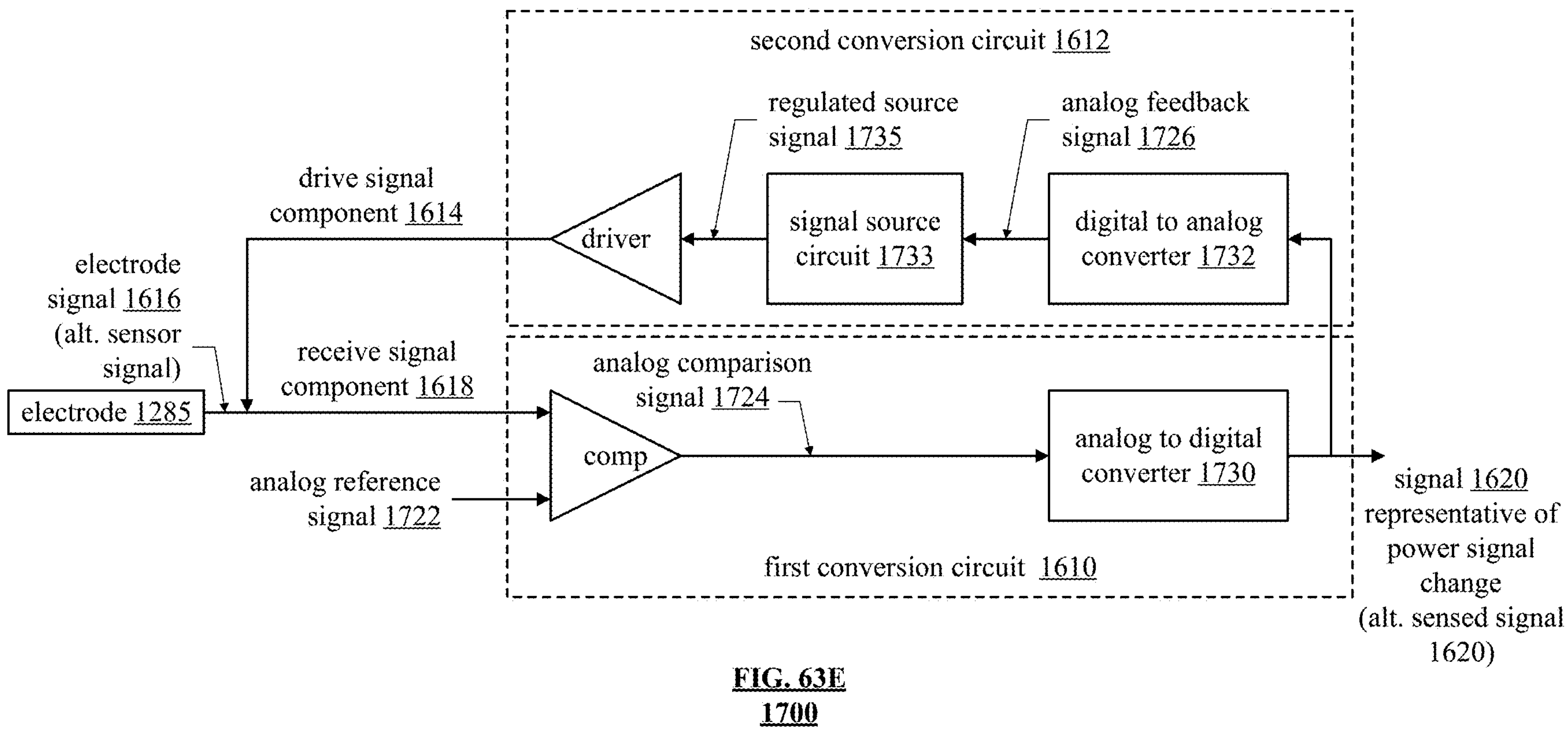
Figure 63F:
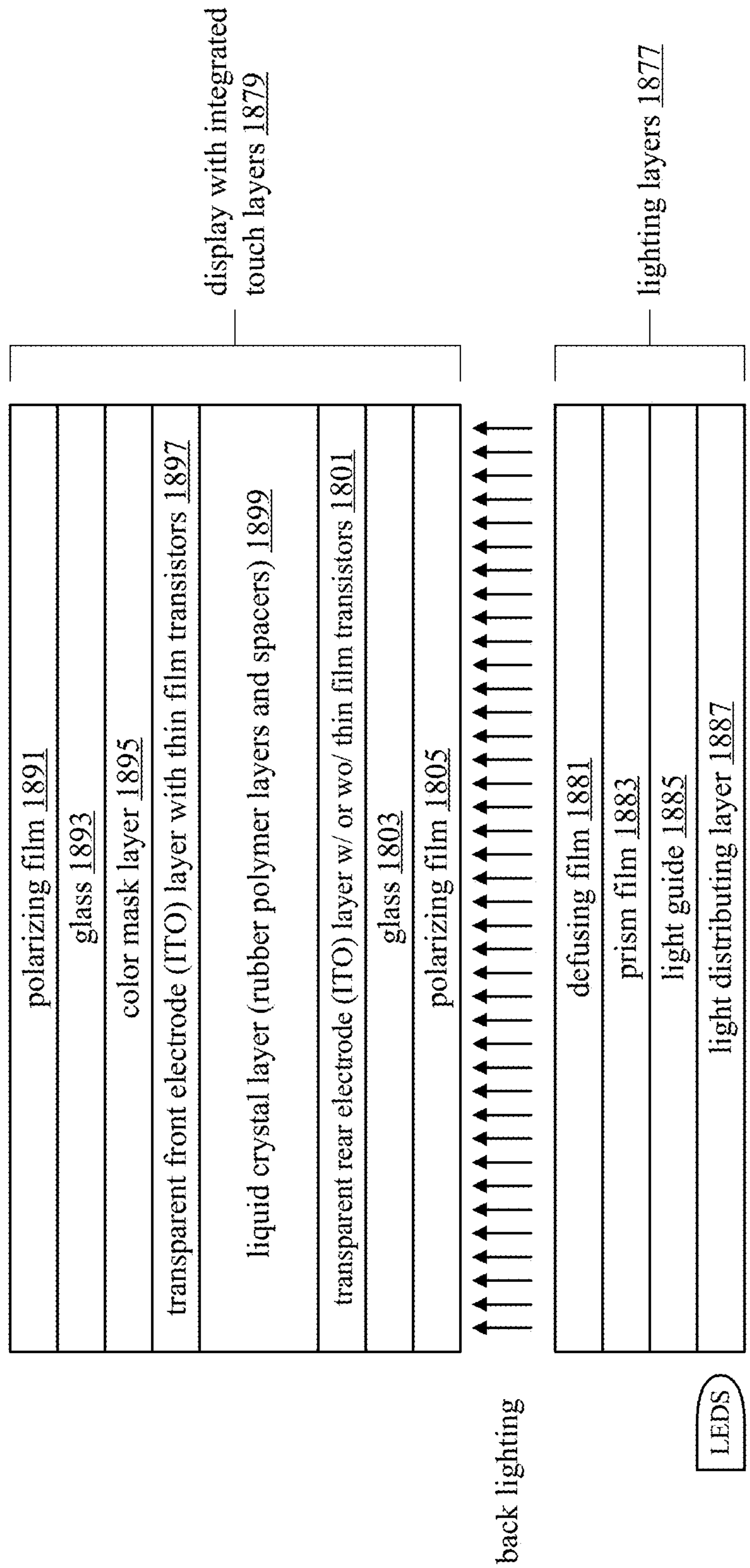
Figure 63G:
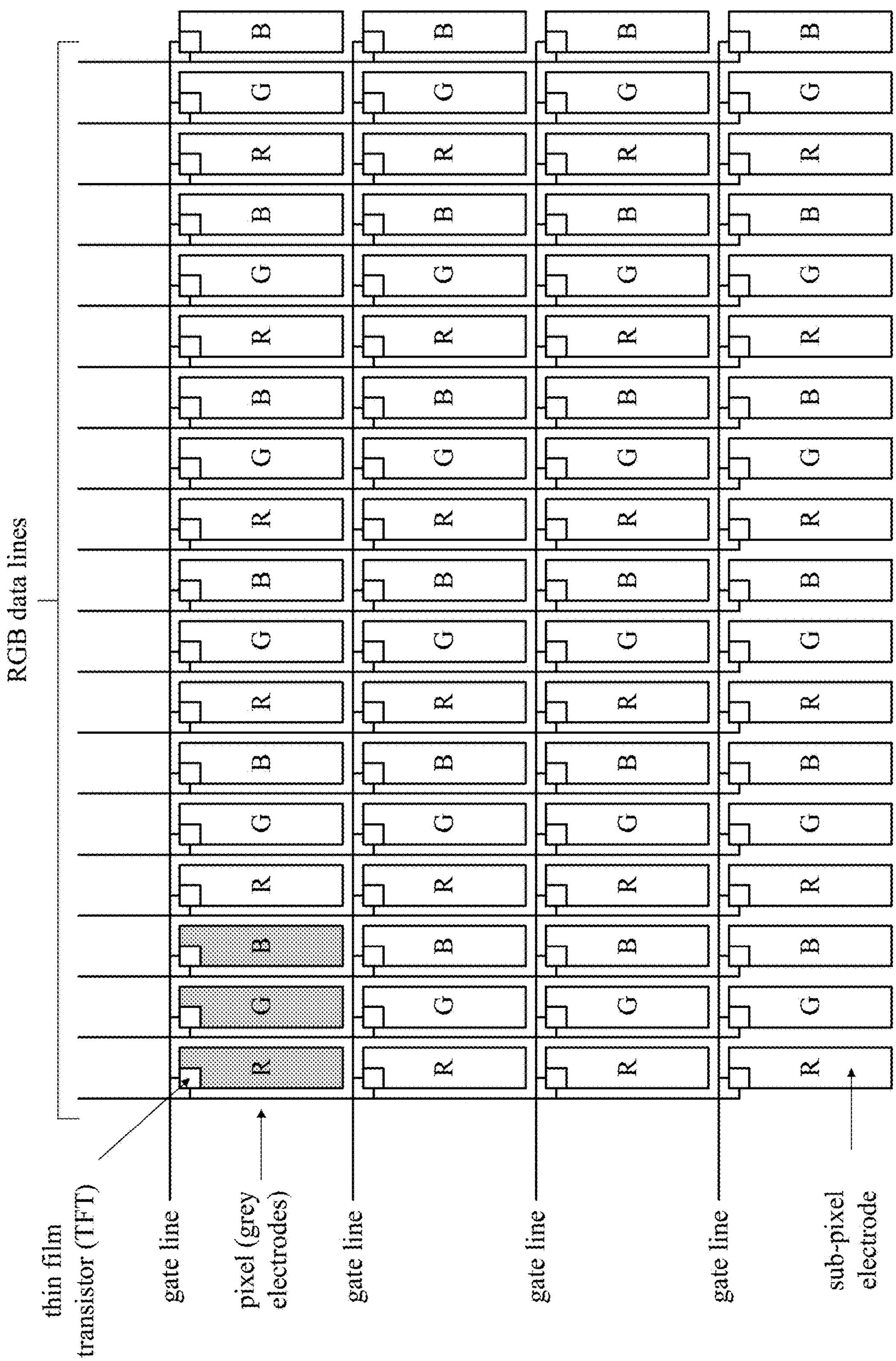
Figure 63H:
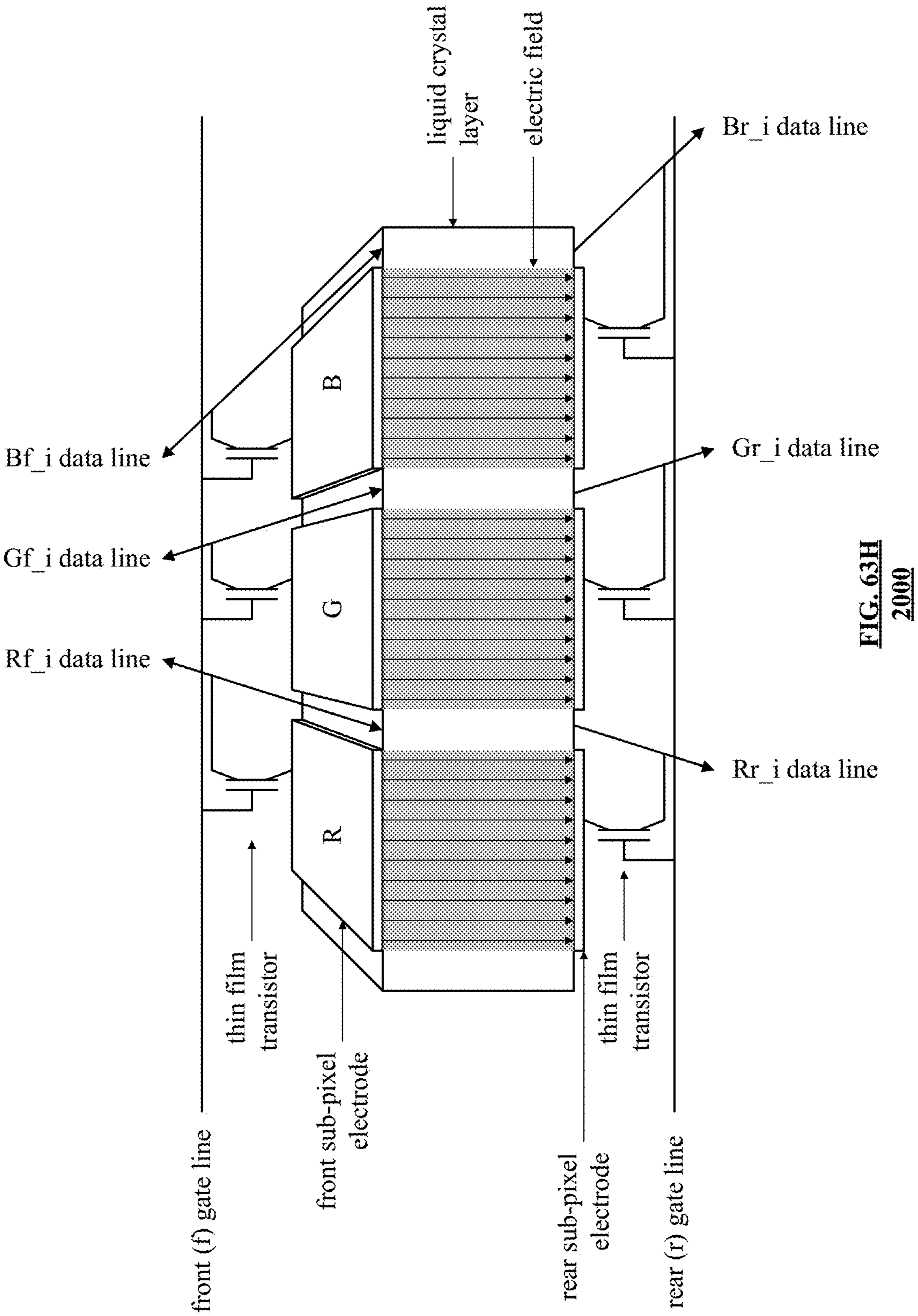
Figure 63I:
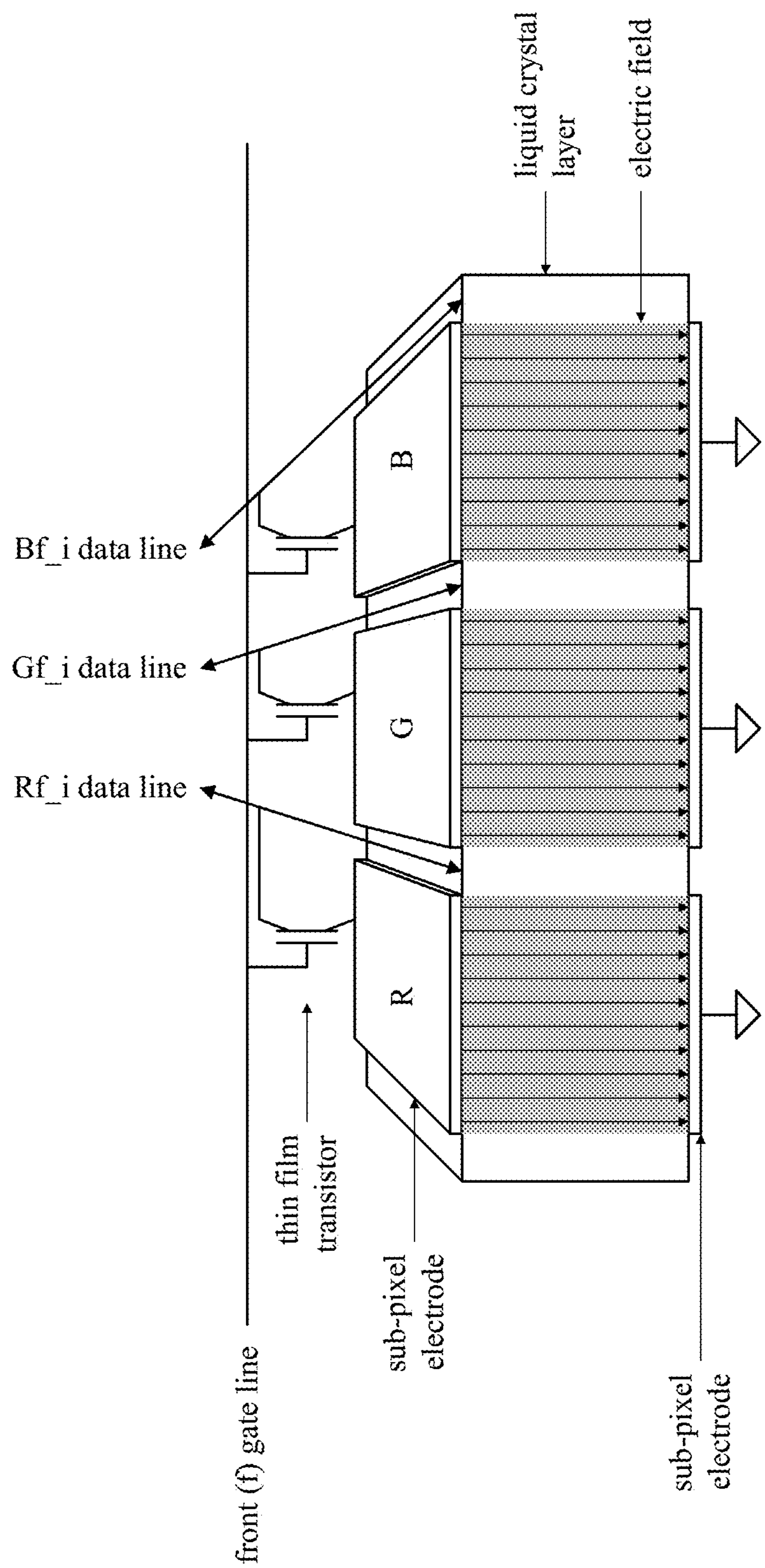
Figure 63J:
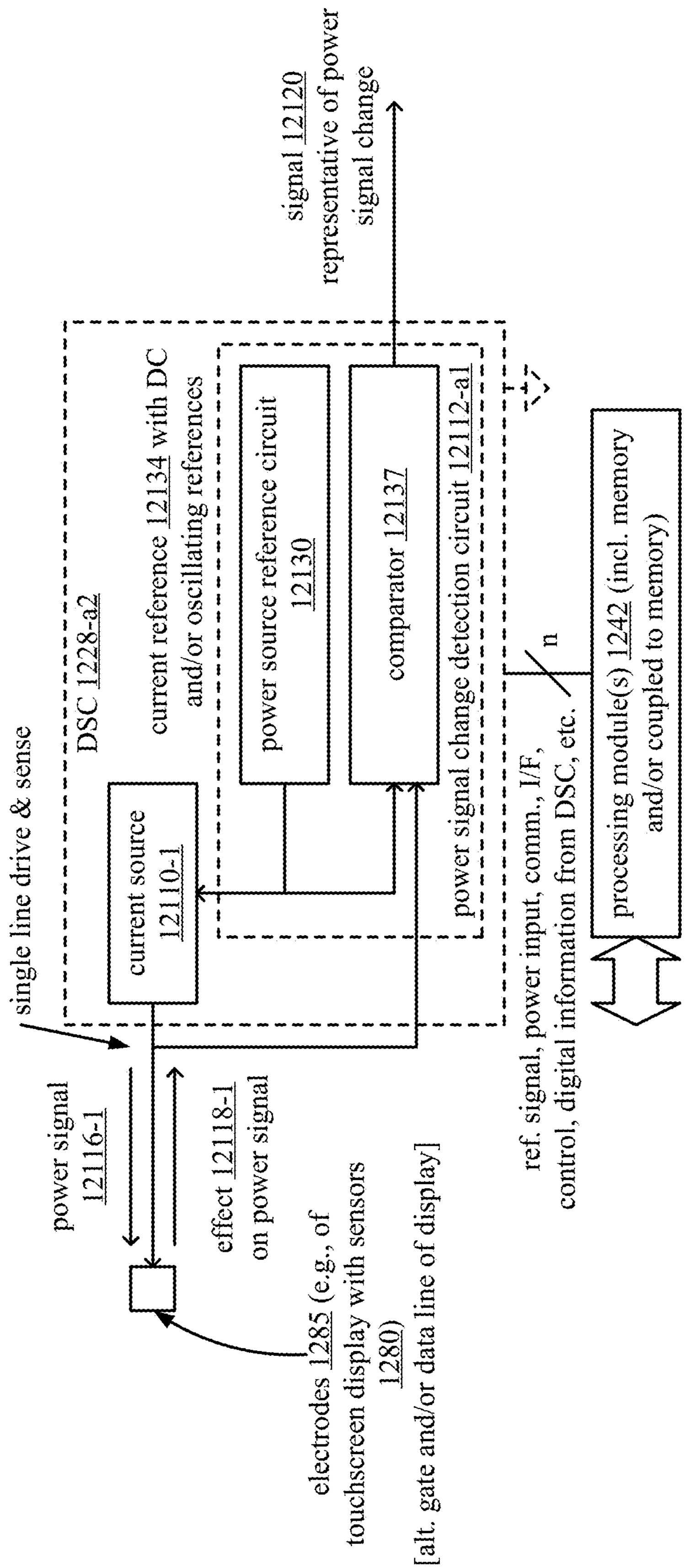
Figure 63K:
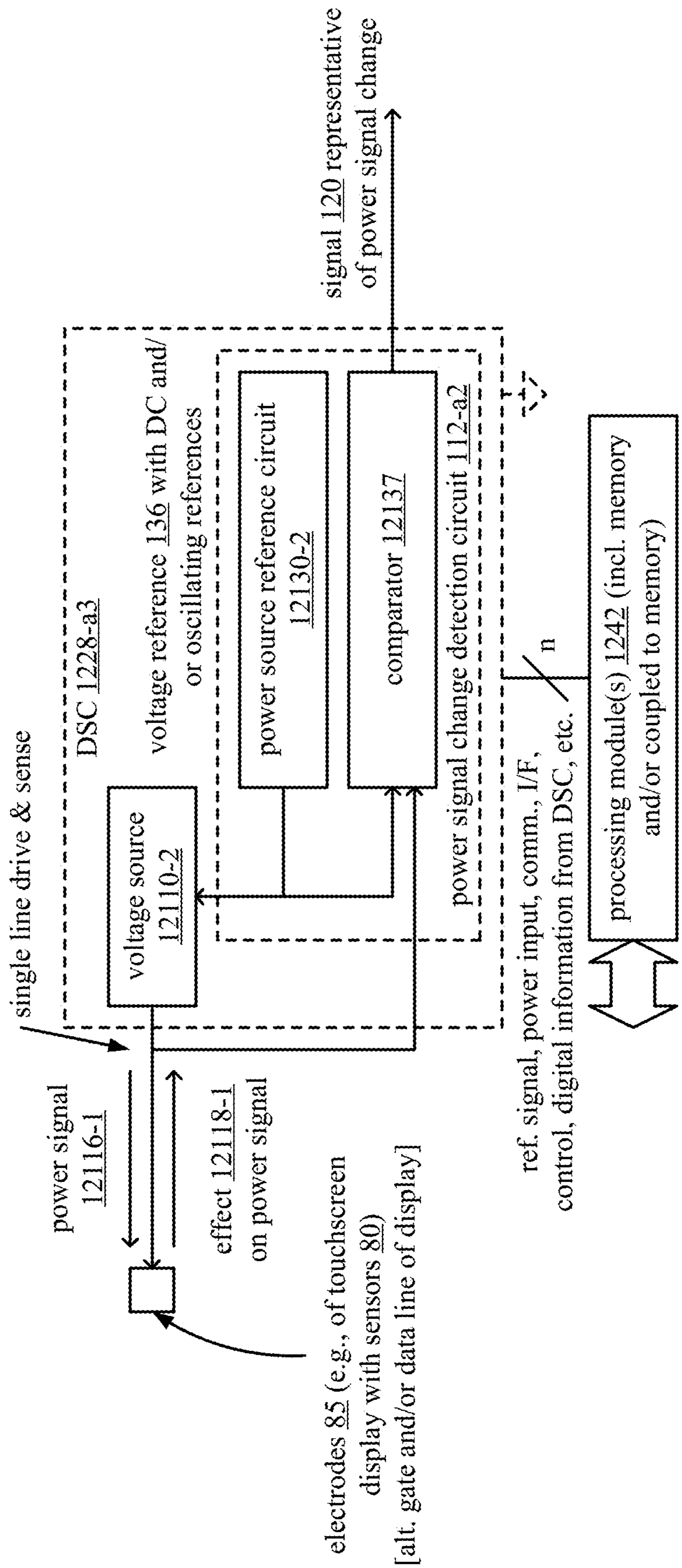
Figure 63L:
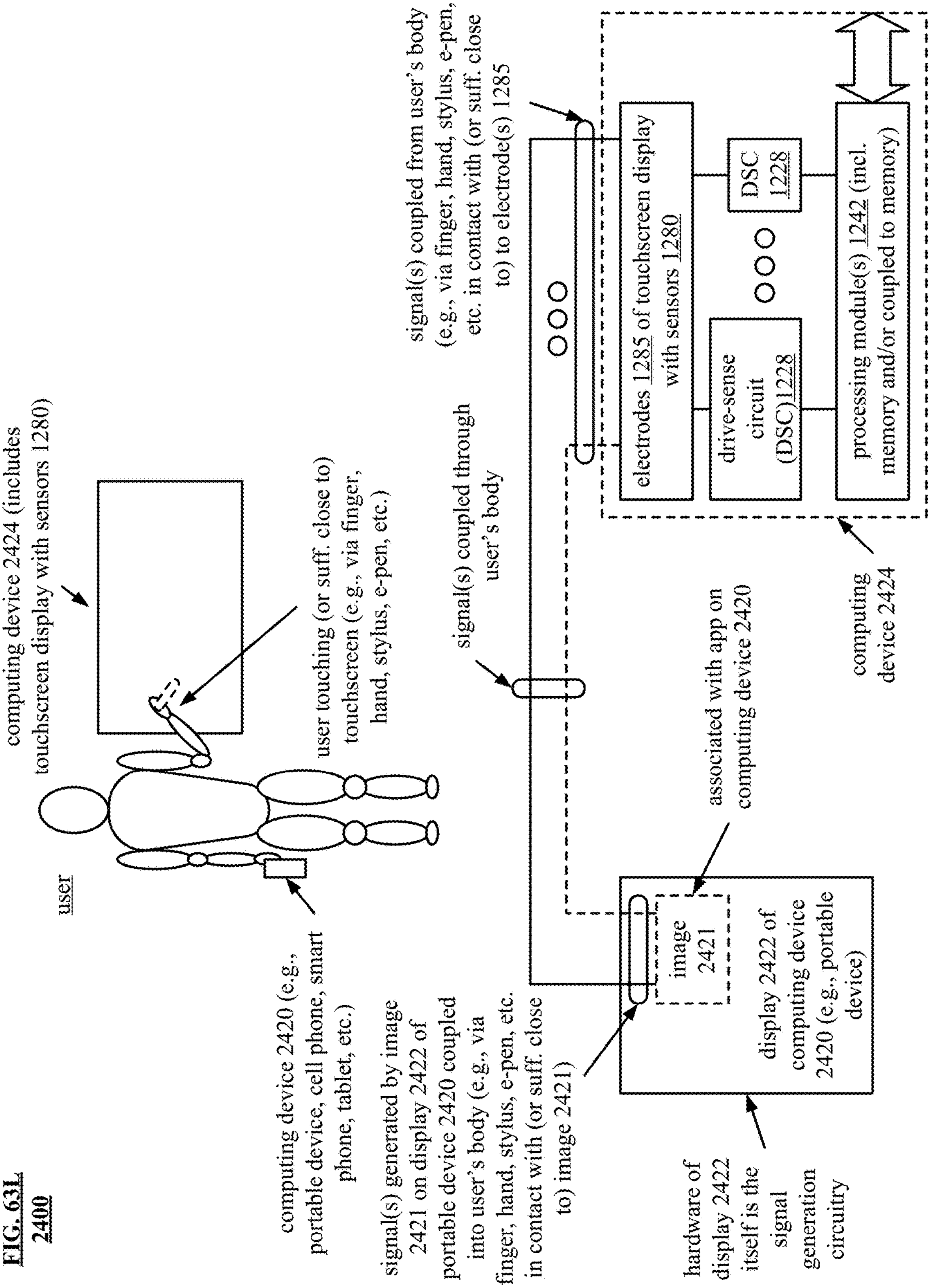
Figure 63M:
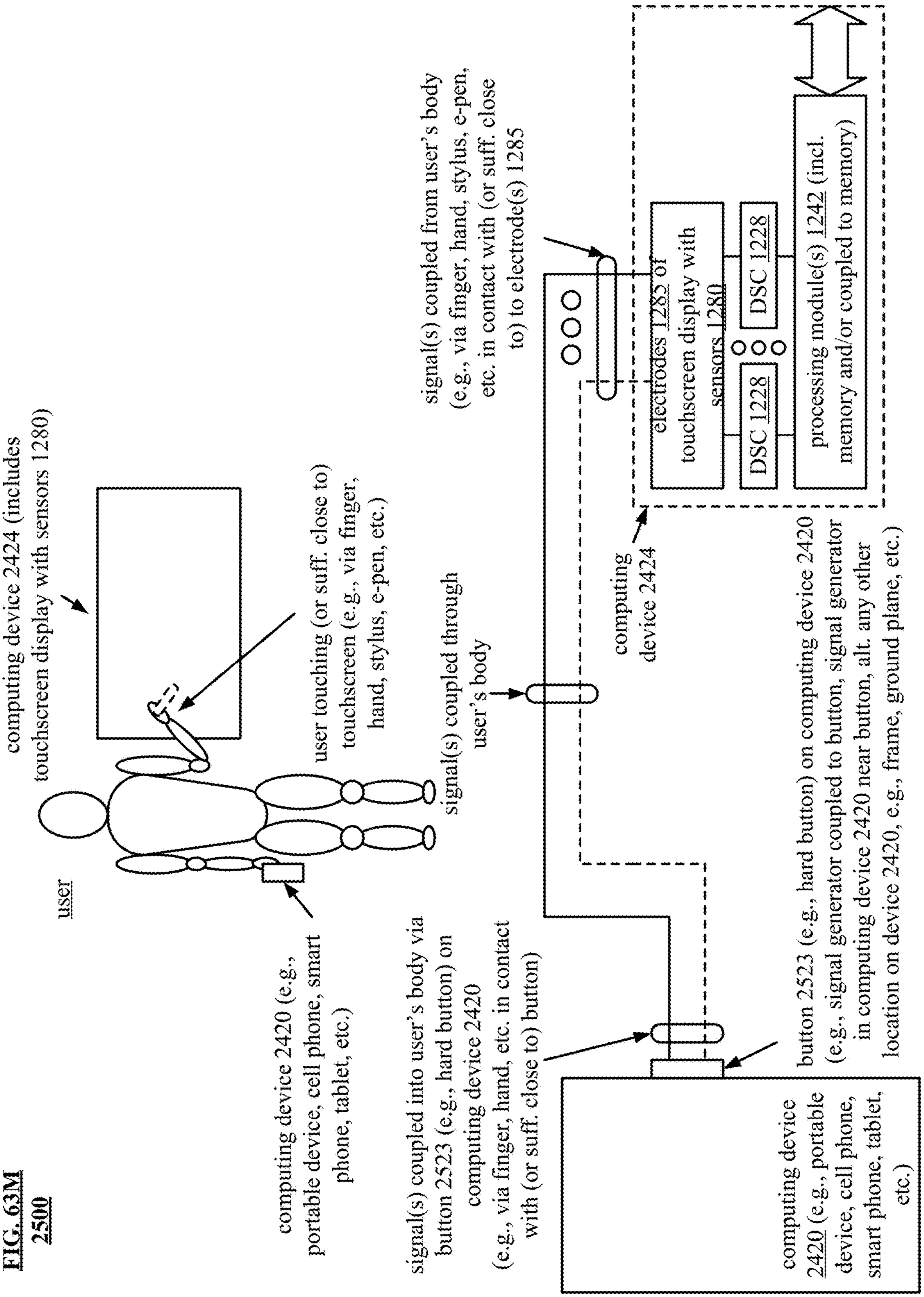
Figure 63N:
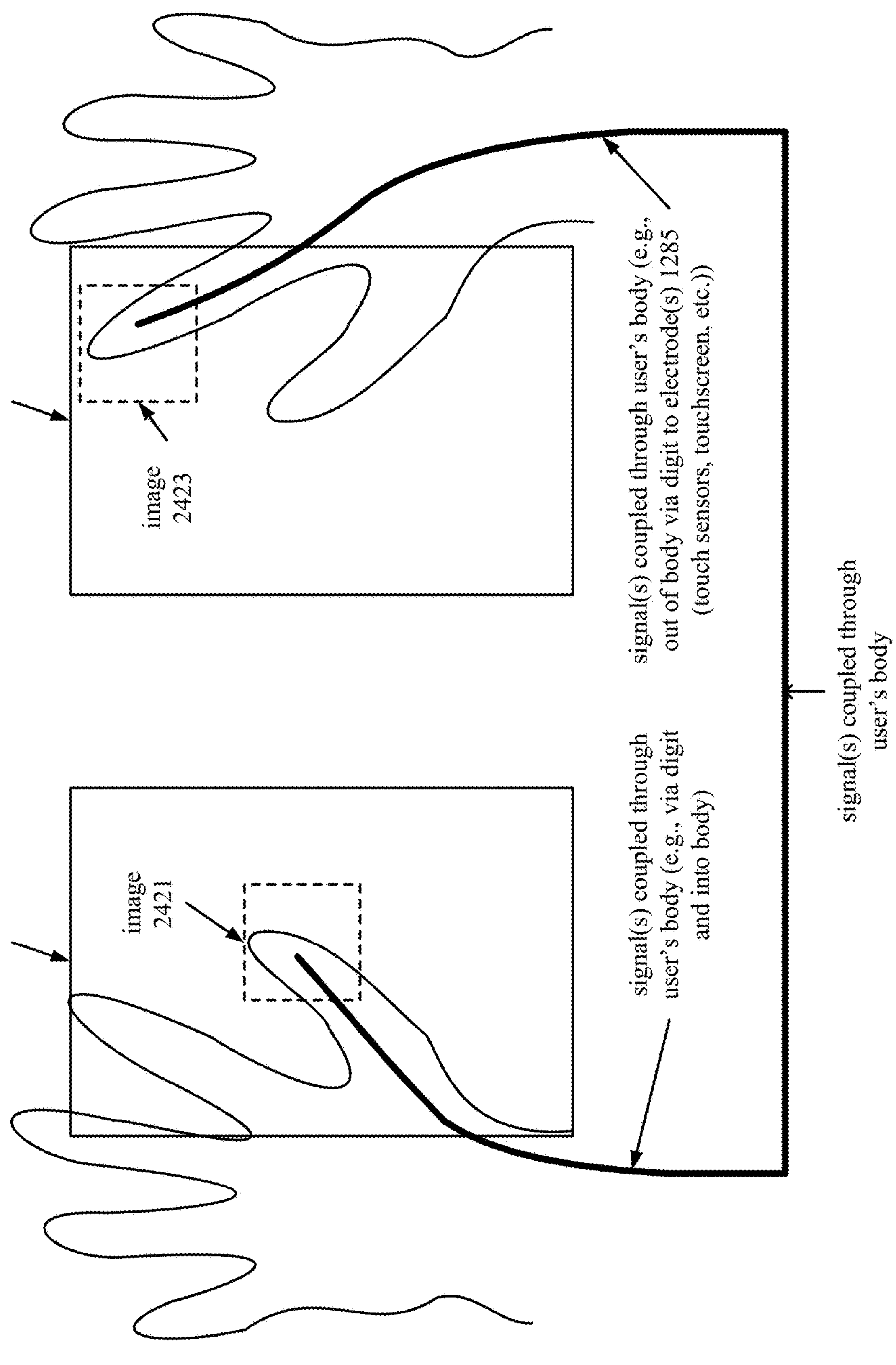
Figure 63O:
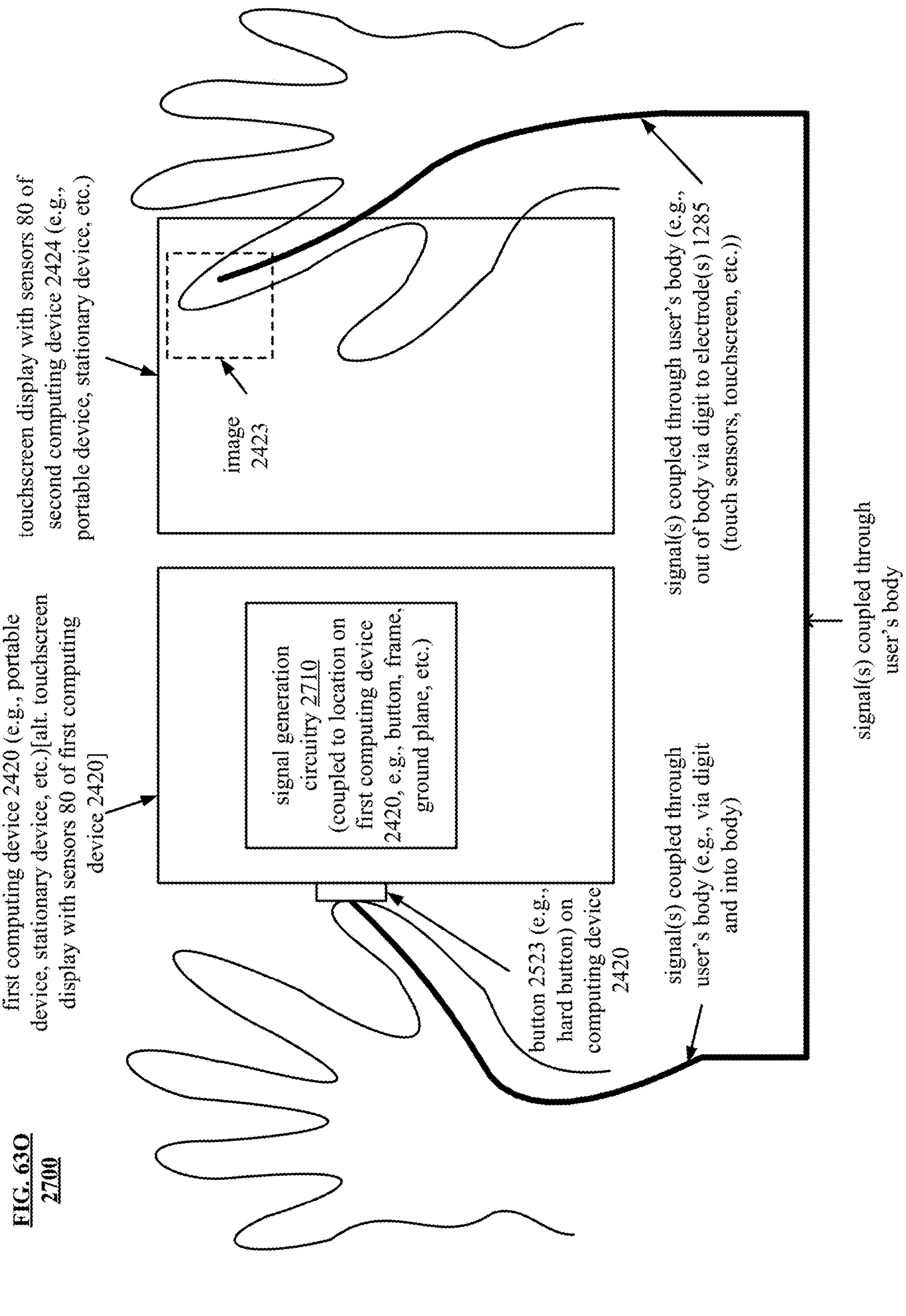
Figure 63P:
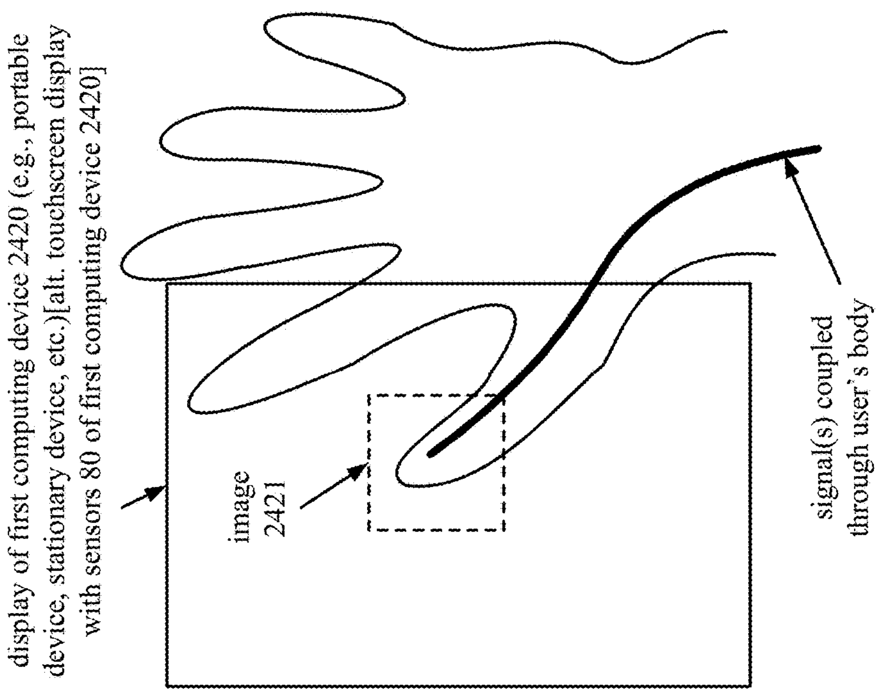
Figure 63Q:
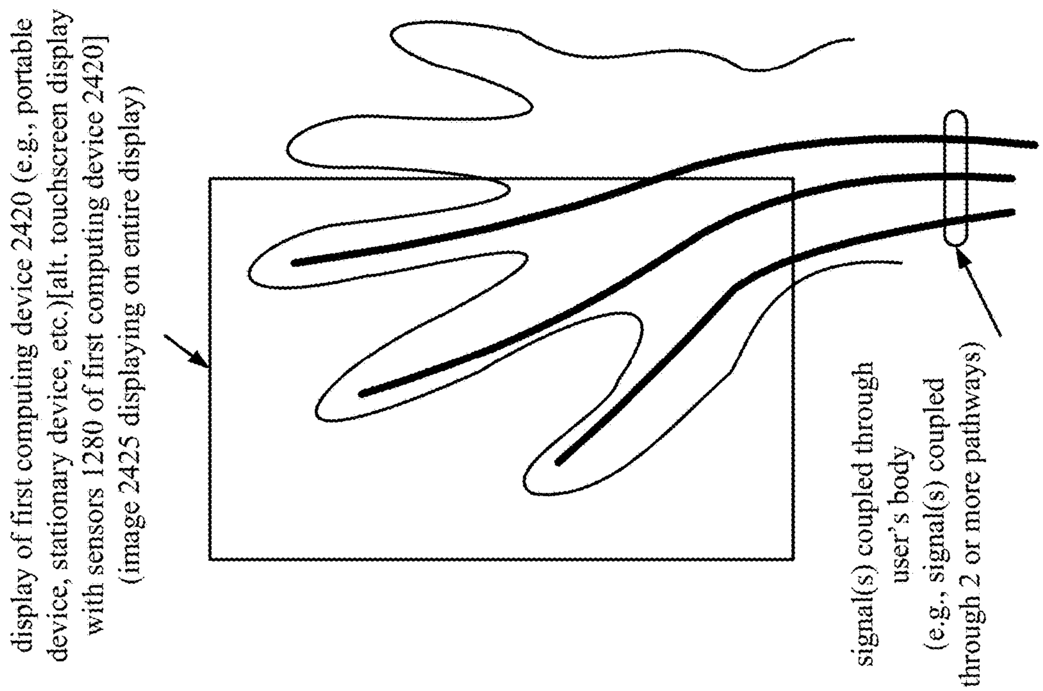
Figure 63R:
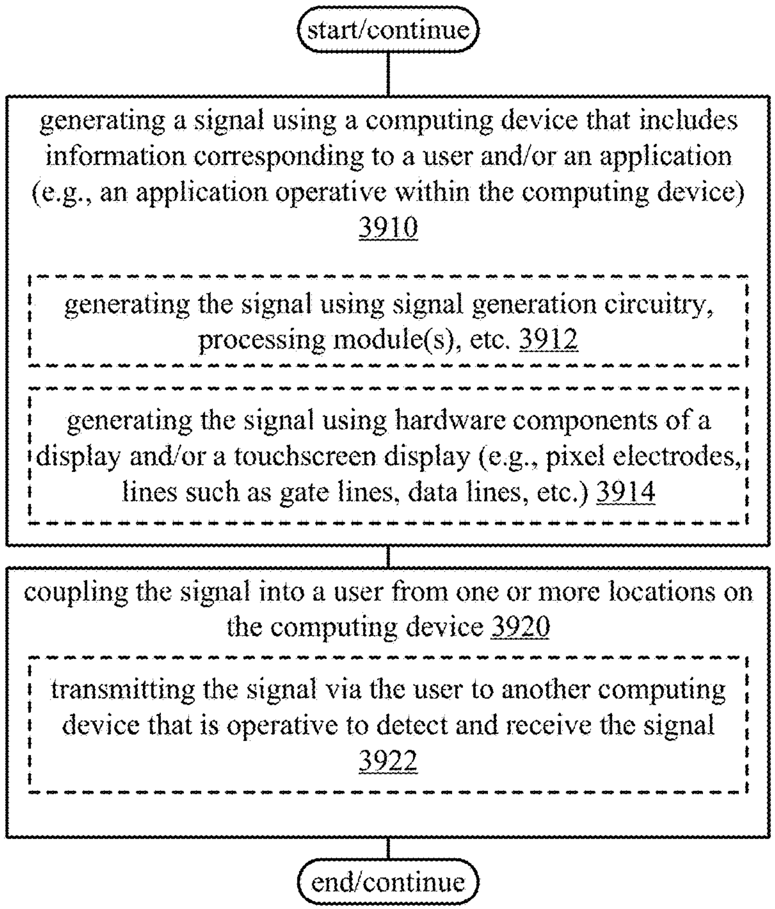
Figure 63S:
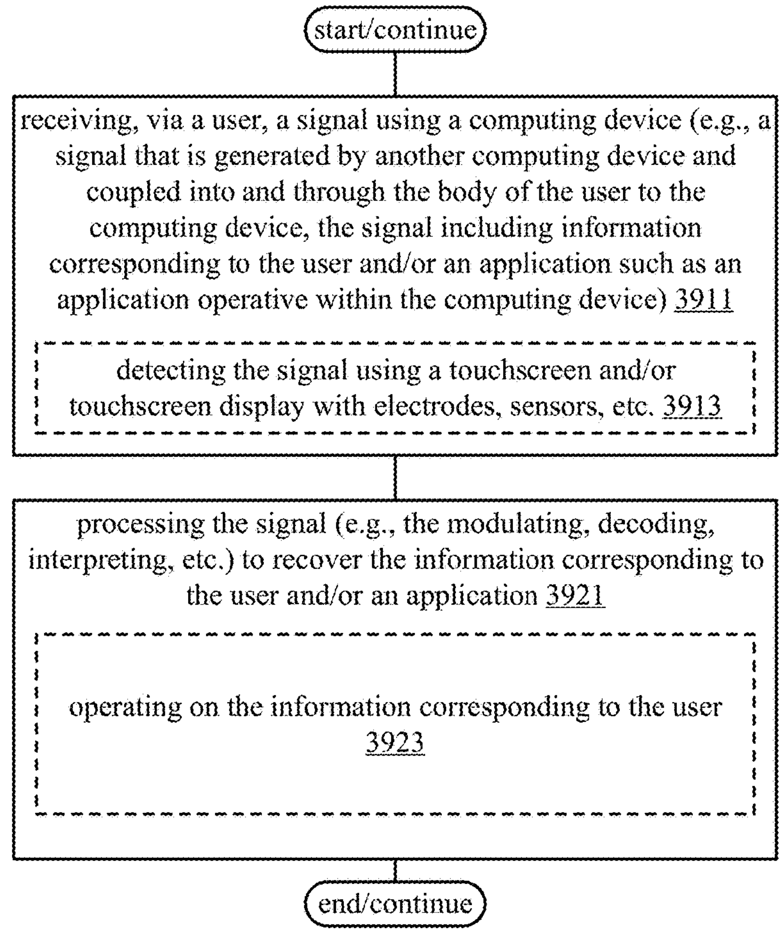
Figure 64A:
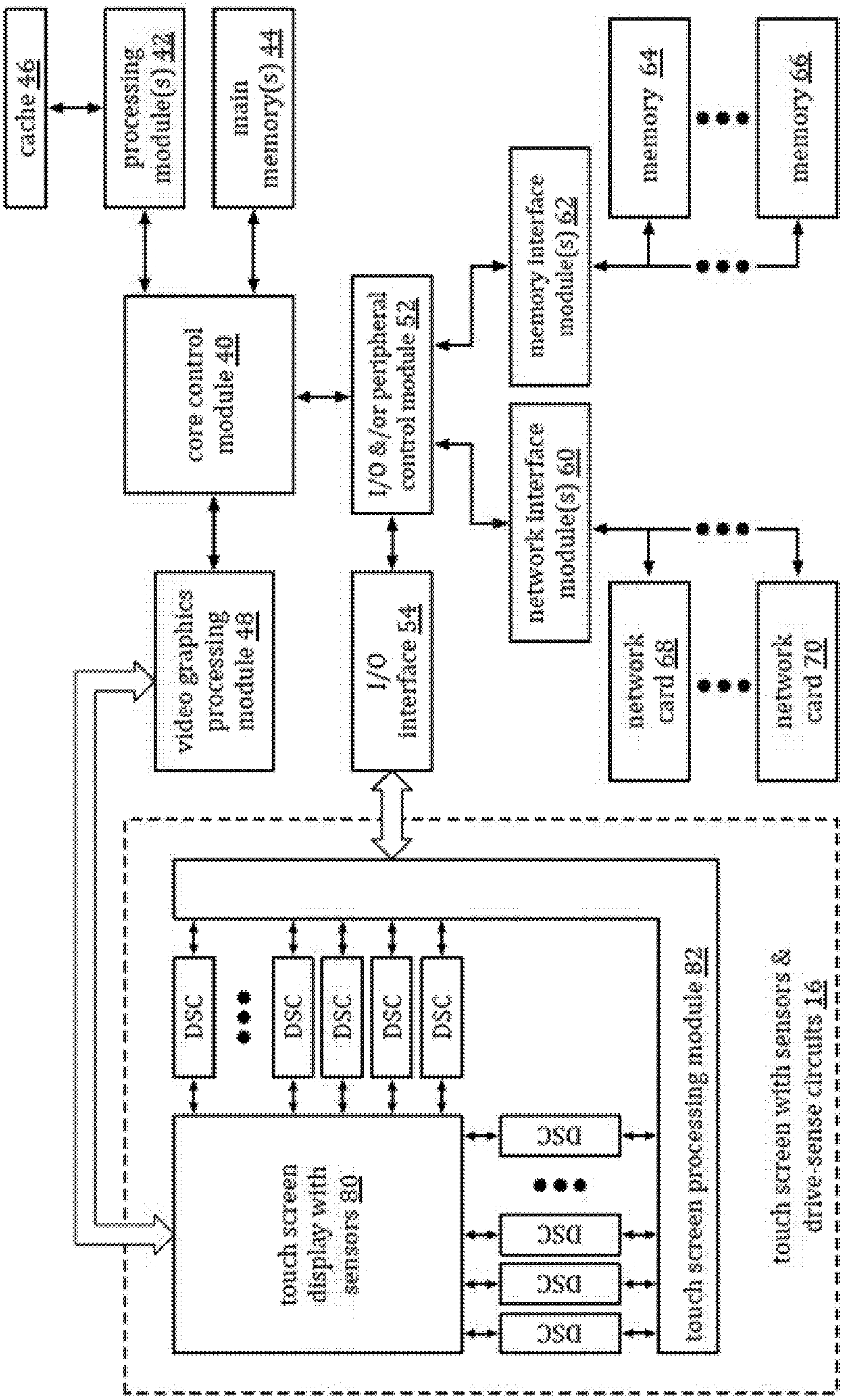
Figure 64B:
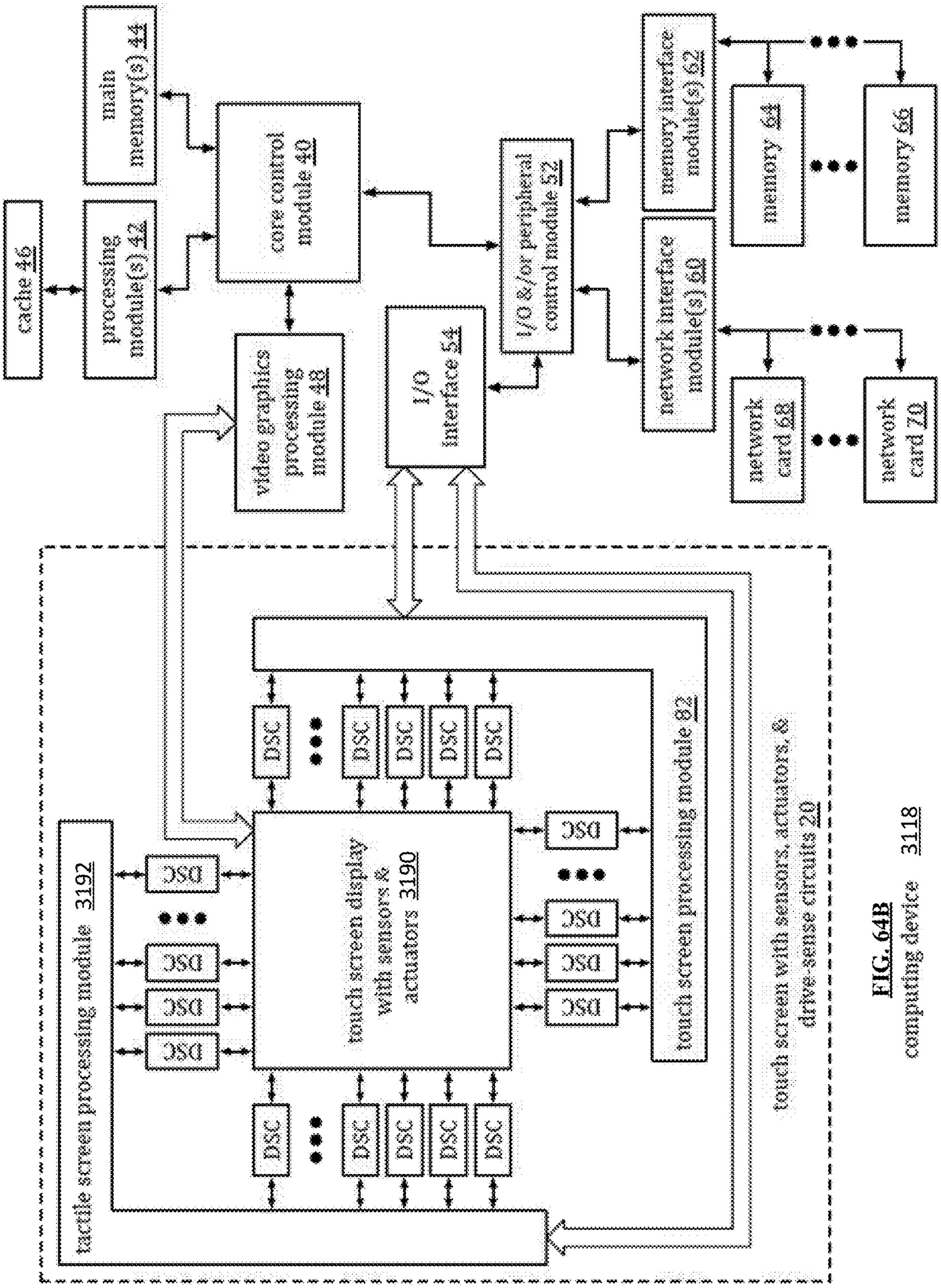
Figure 64C:
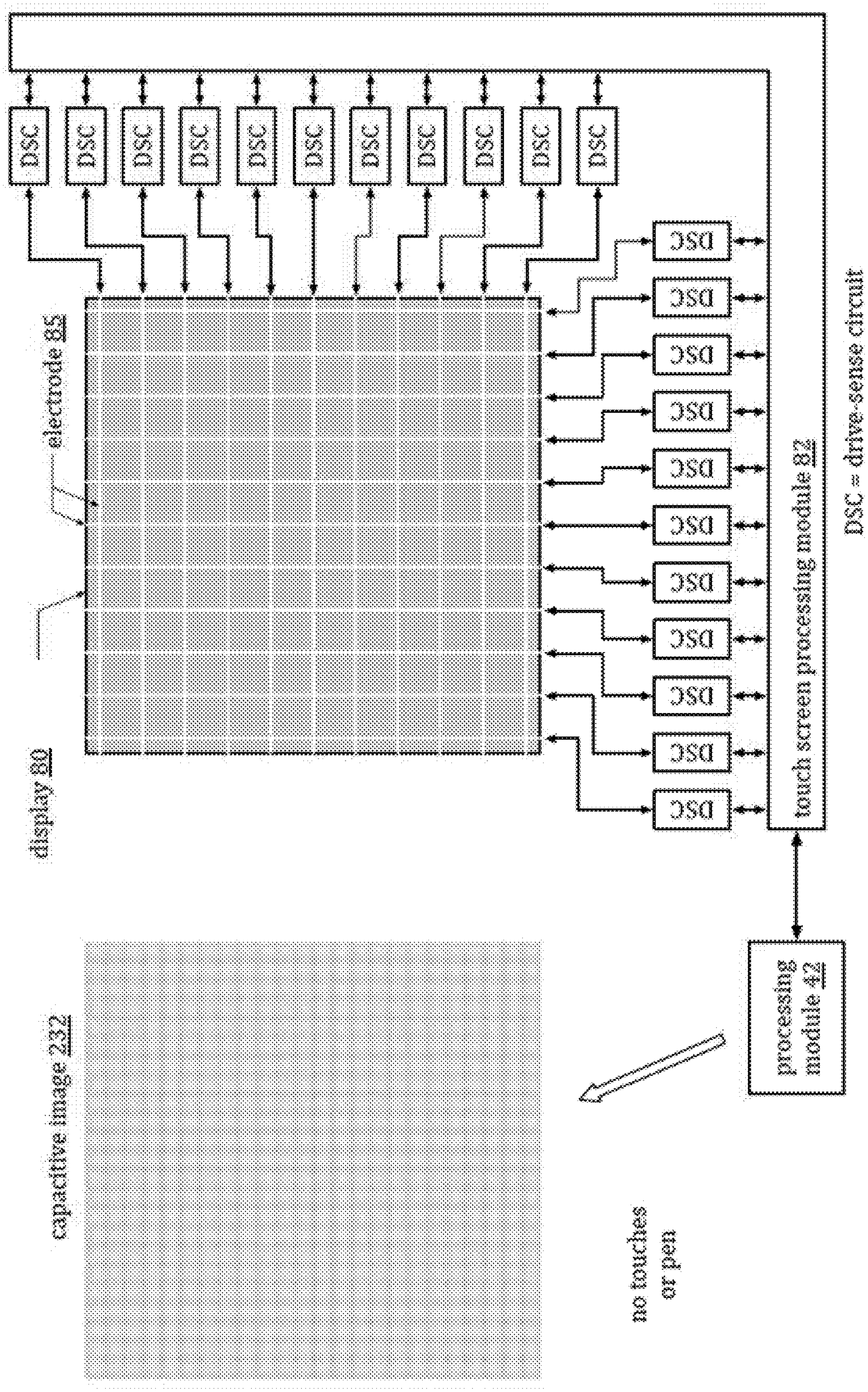
Figure 64D:
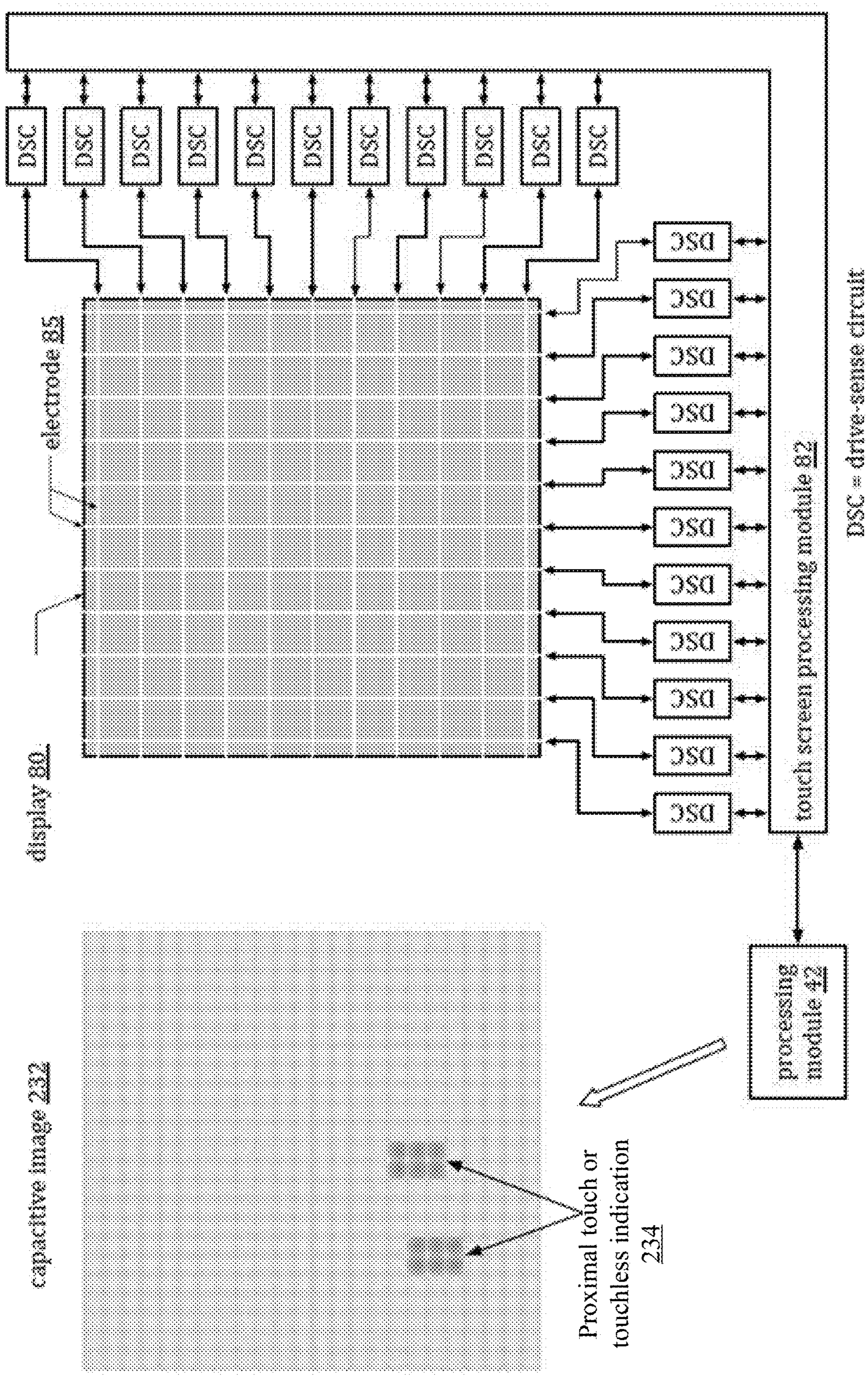
Figure 64F:
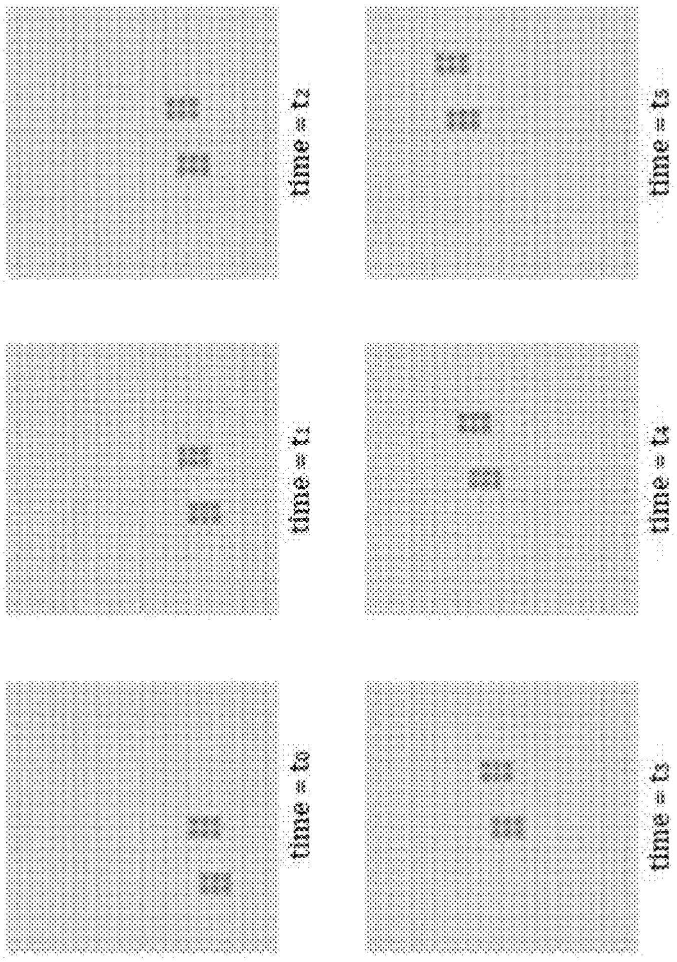
Figure 64E:
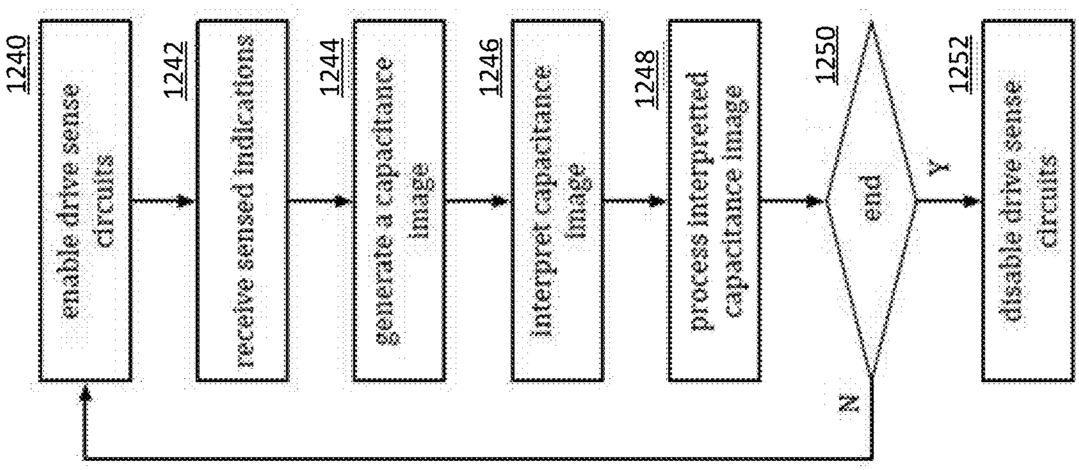
Figure 64G:
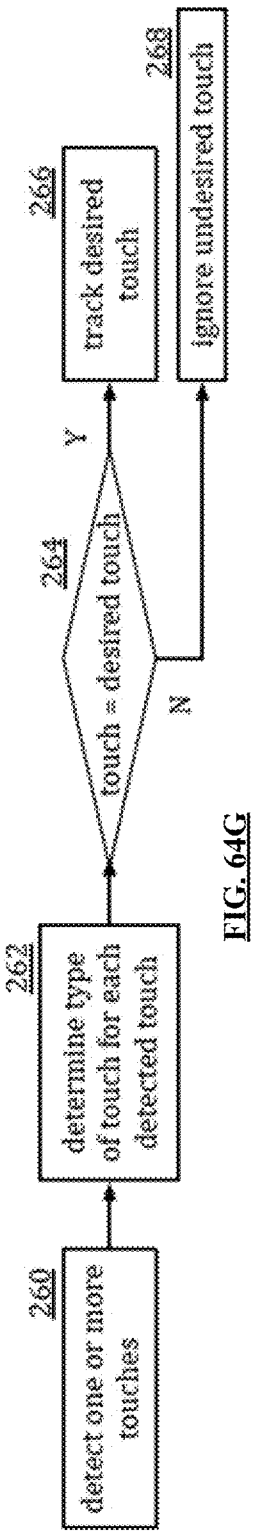
Figure 64H:
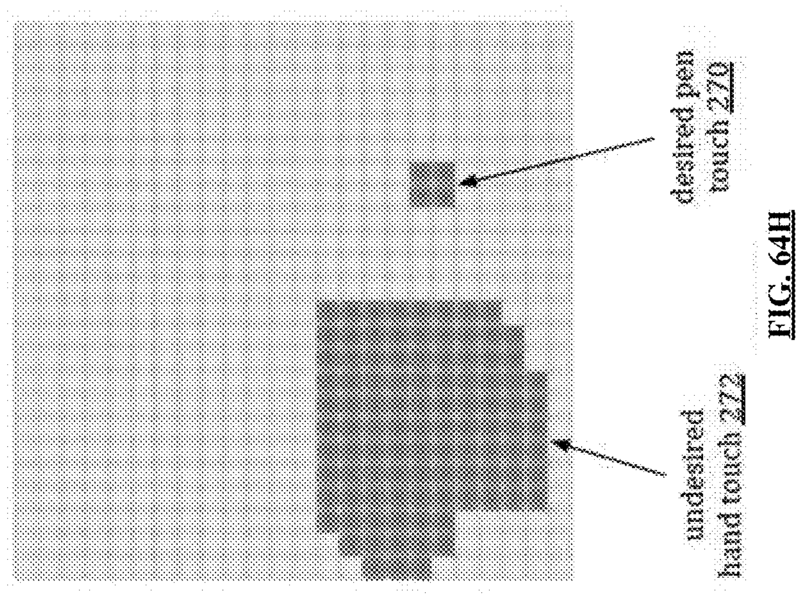
Figure 64I:
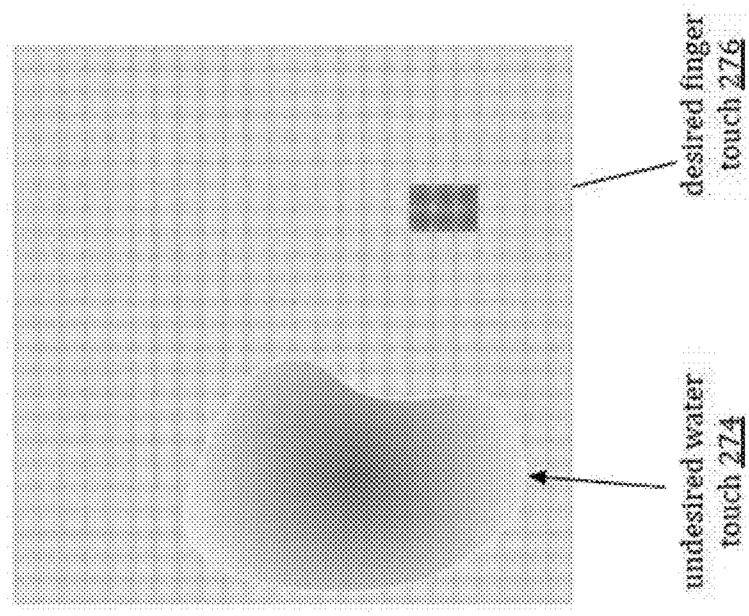
Figure 64J:
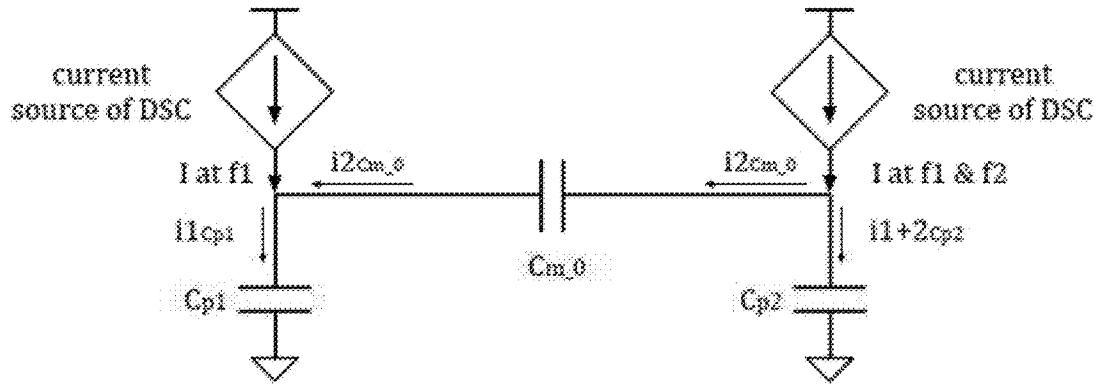
Figure 64K:
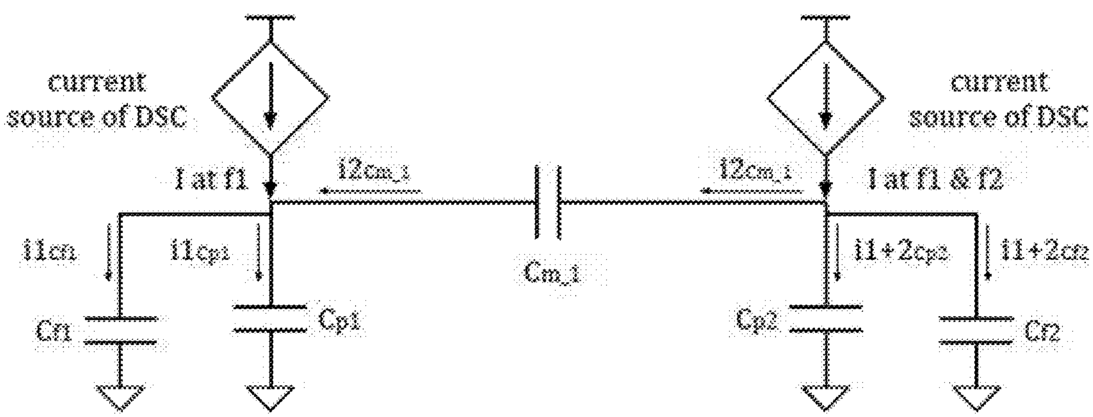
Figure 64L:
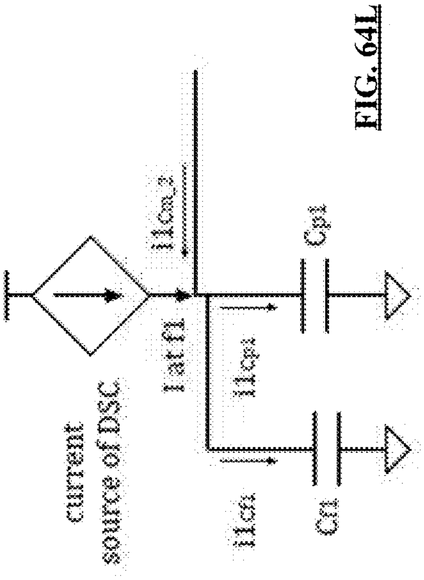
Figure 64M:
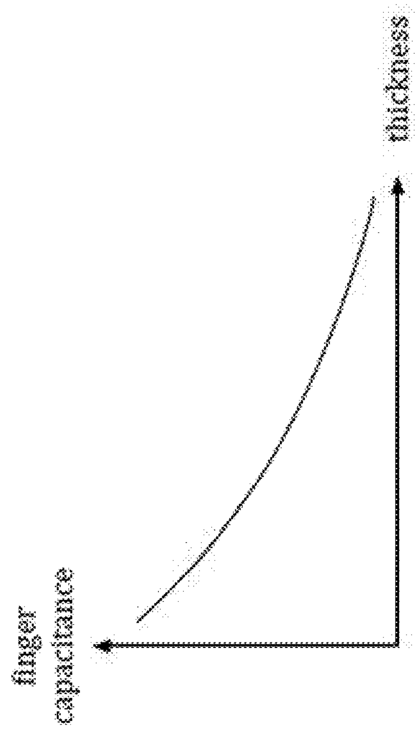
Figure 64N:
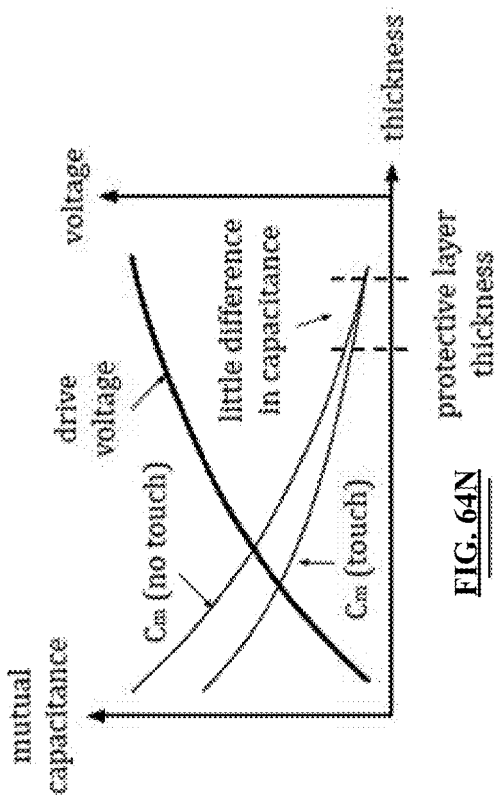
Figure 64O:
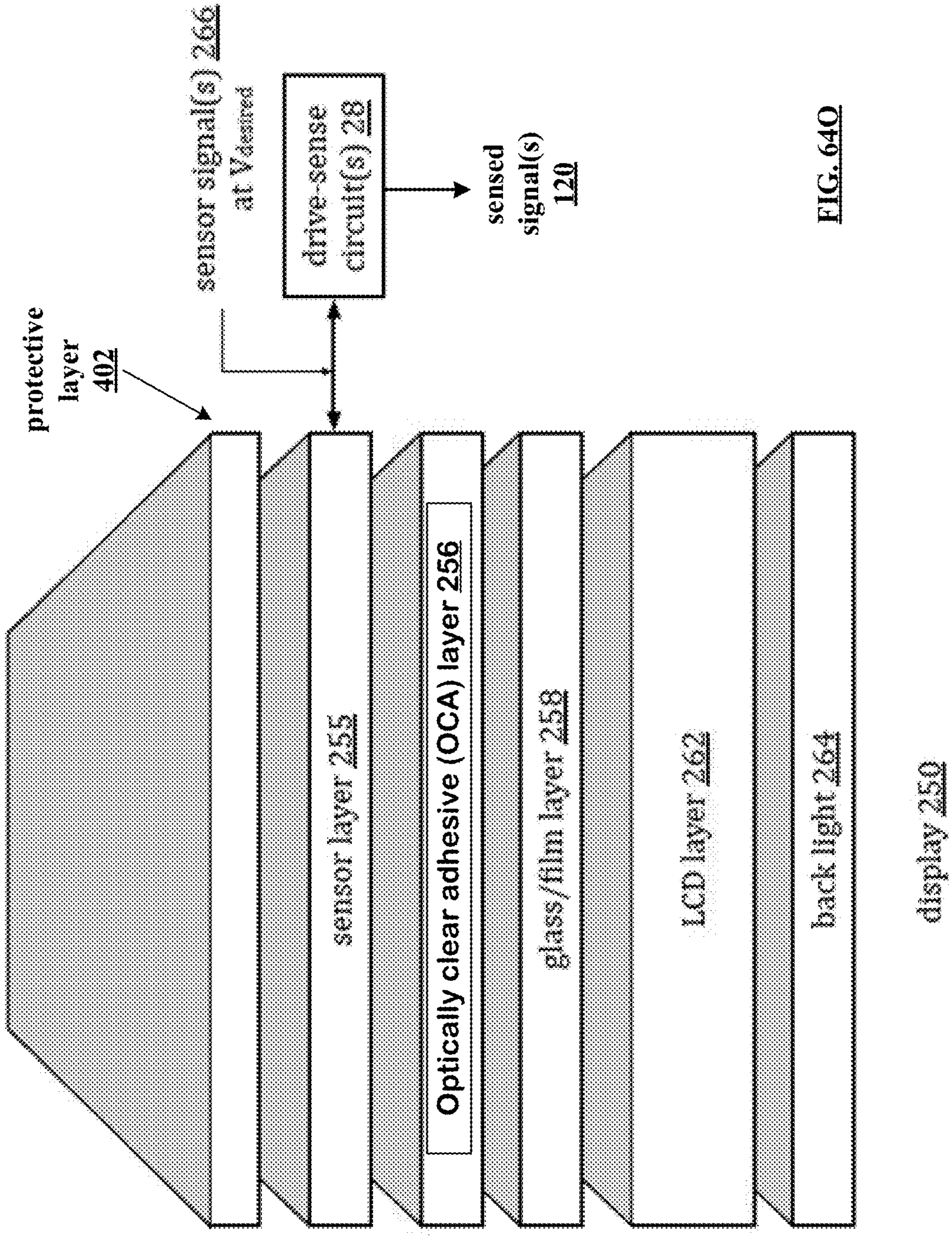
Figure 64P:
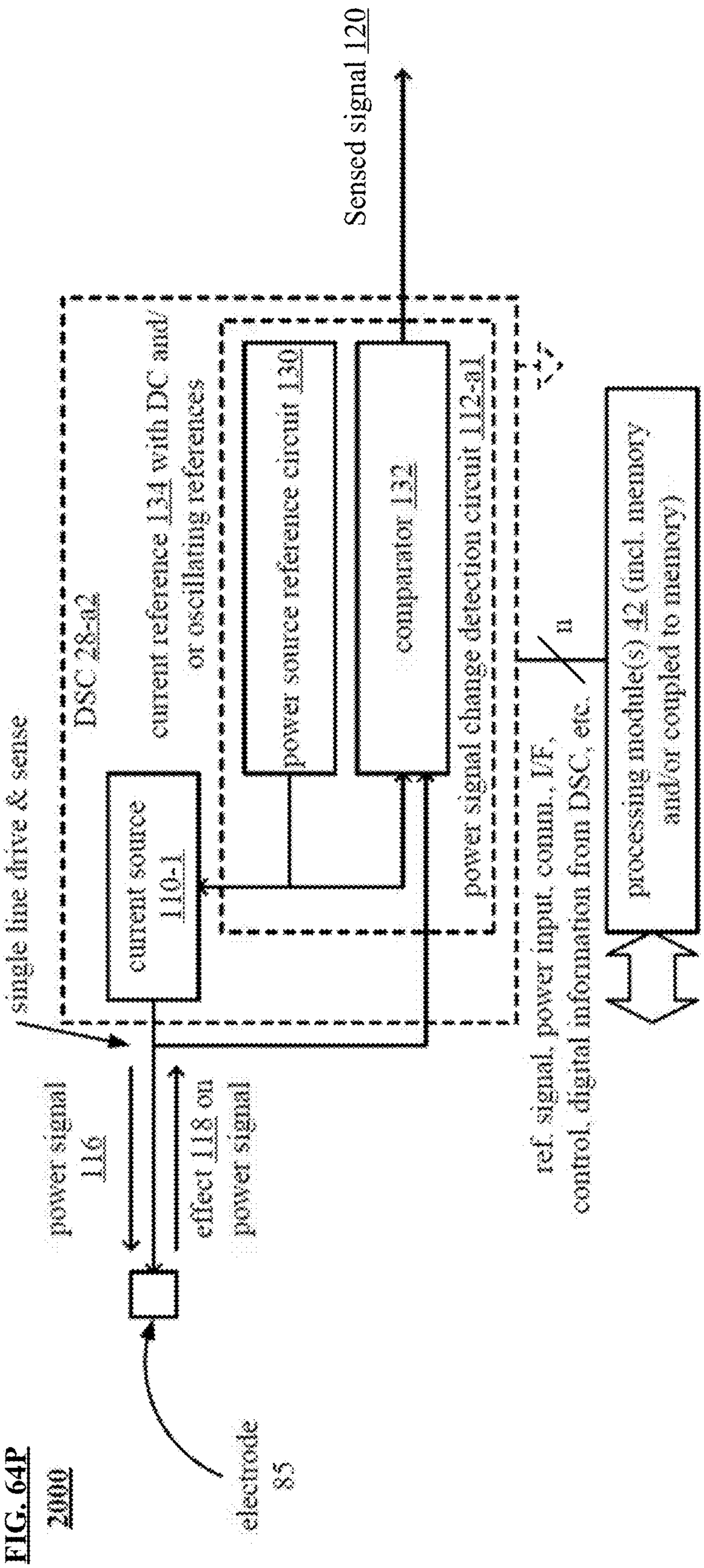
Figure 64Q:
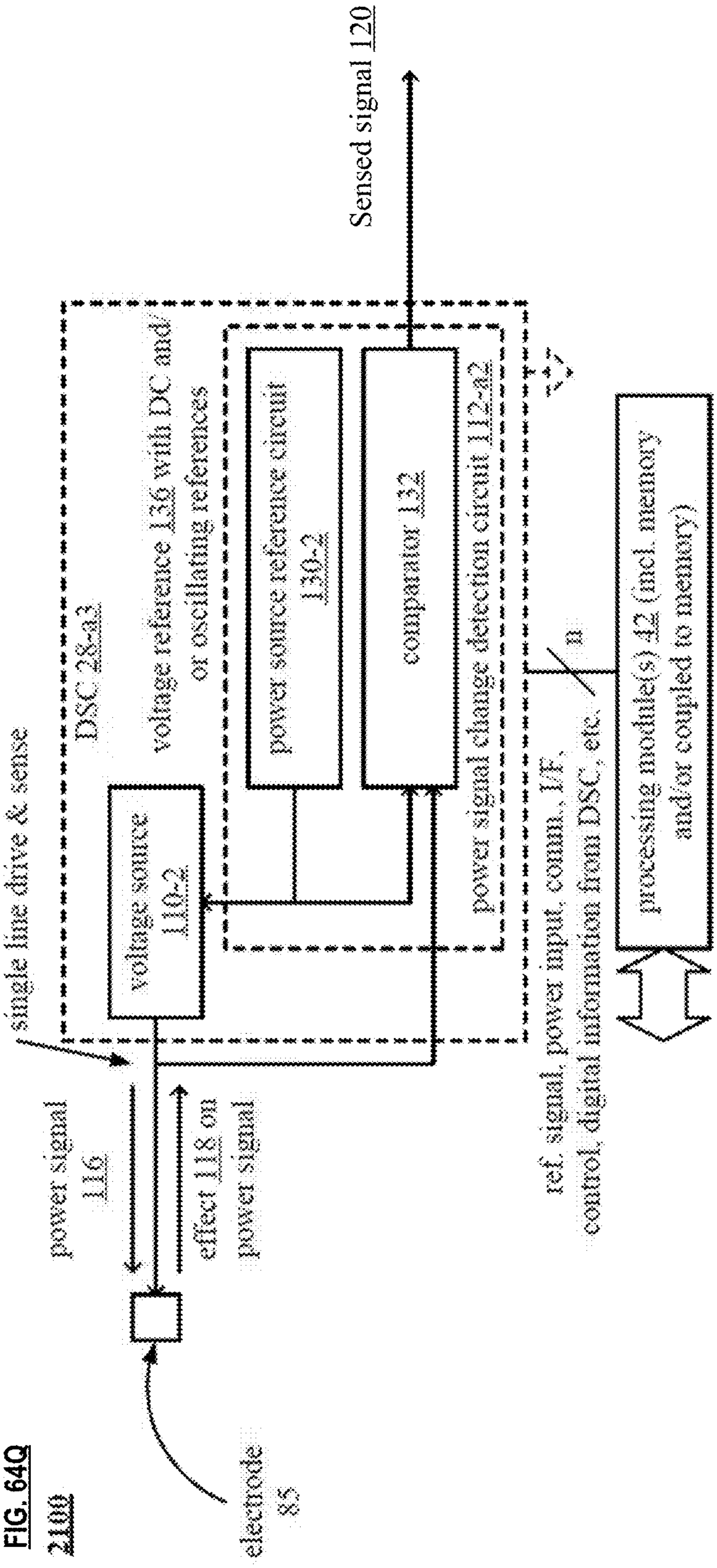
Figure 64R:
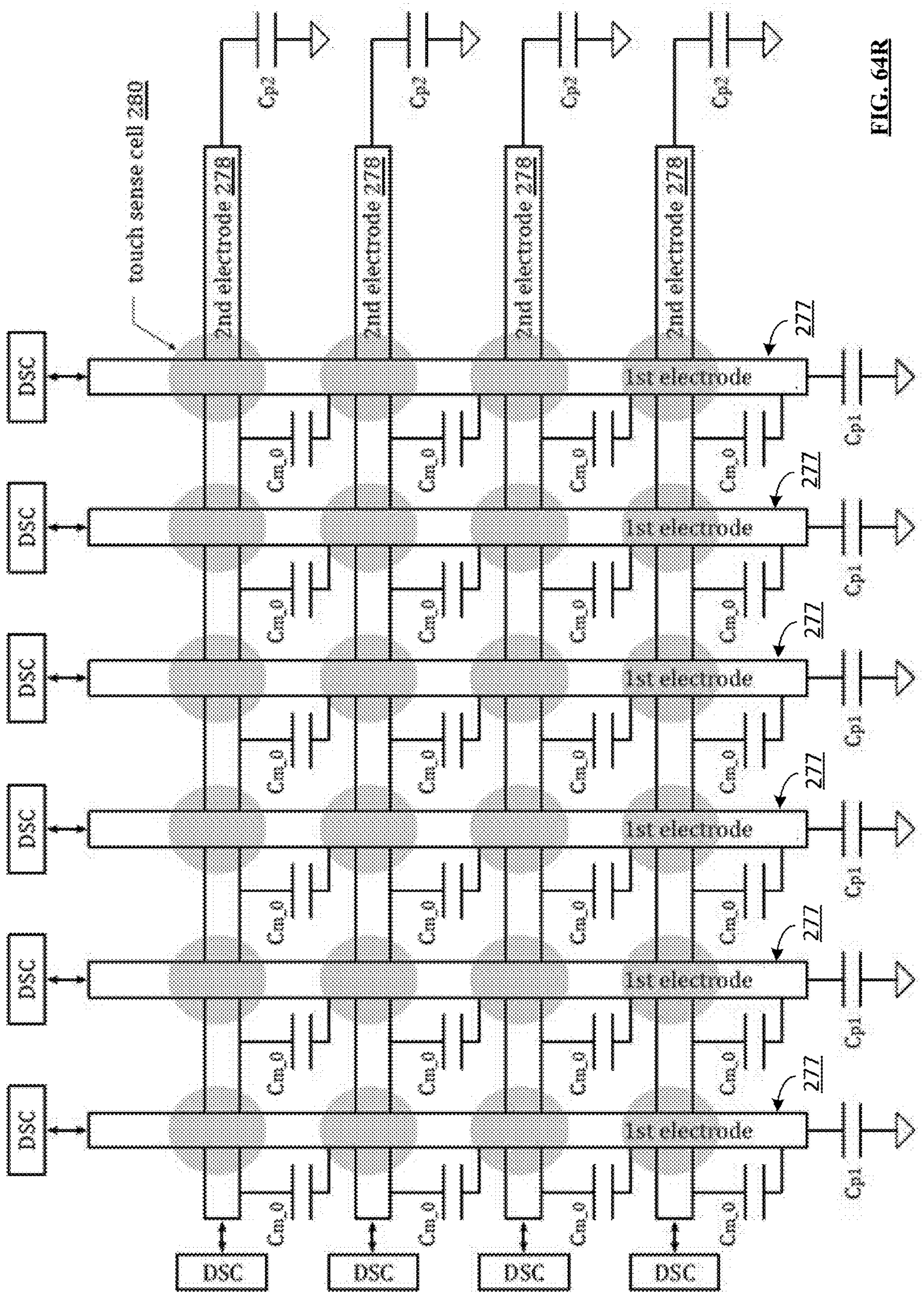
Figure 64U:
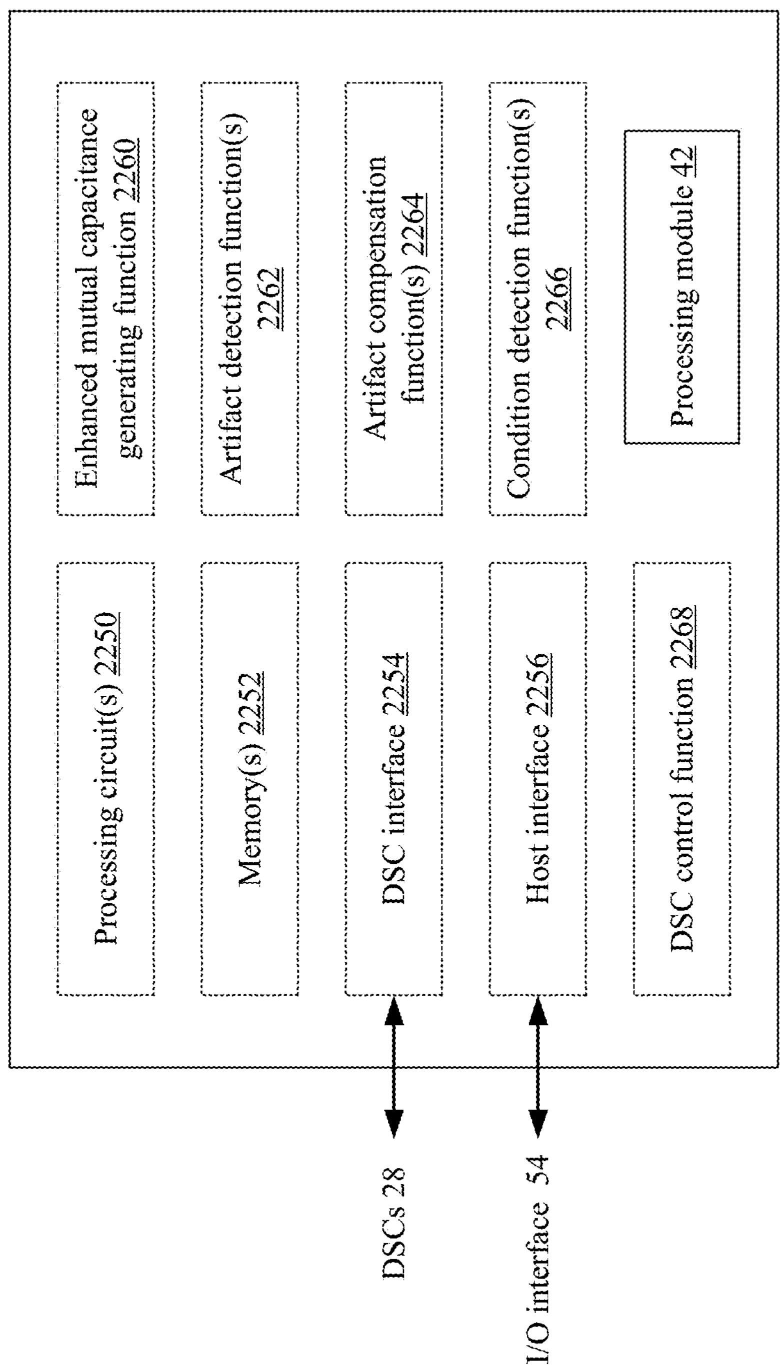
Figure 64V:
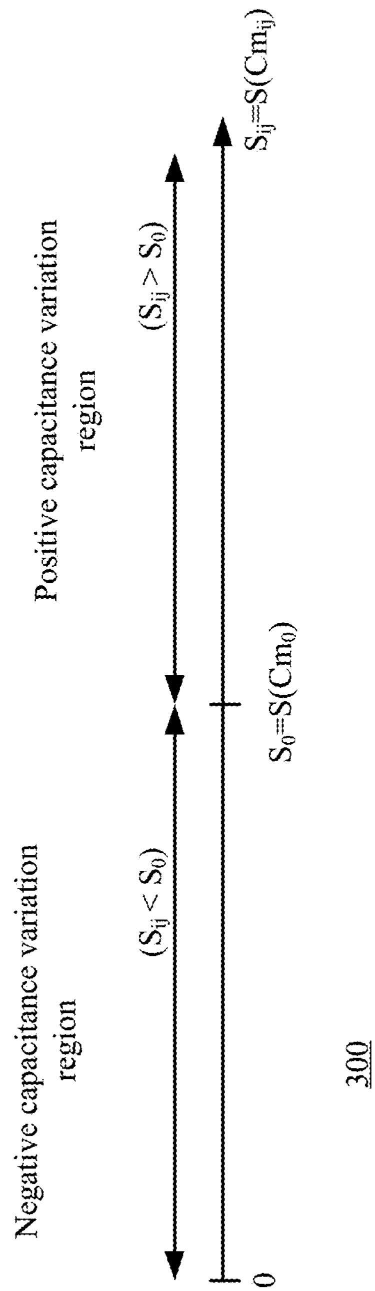
Figure 64W:
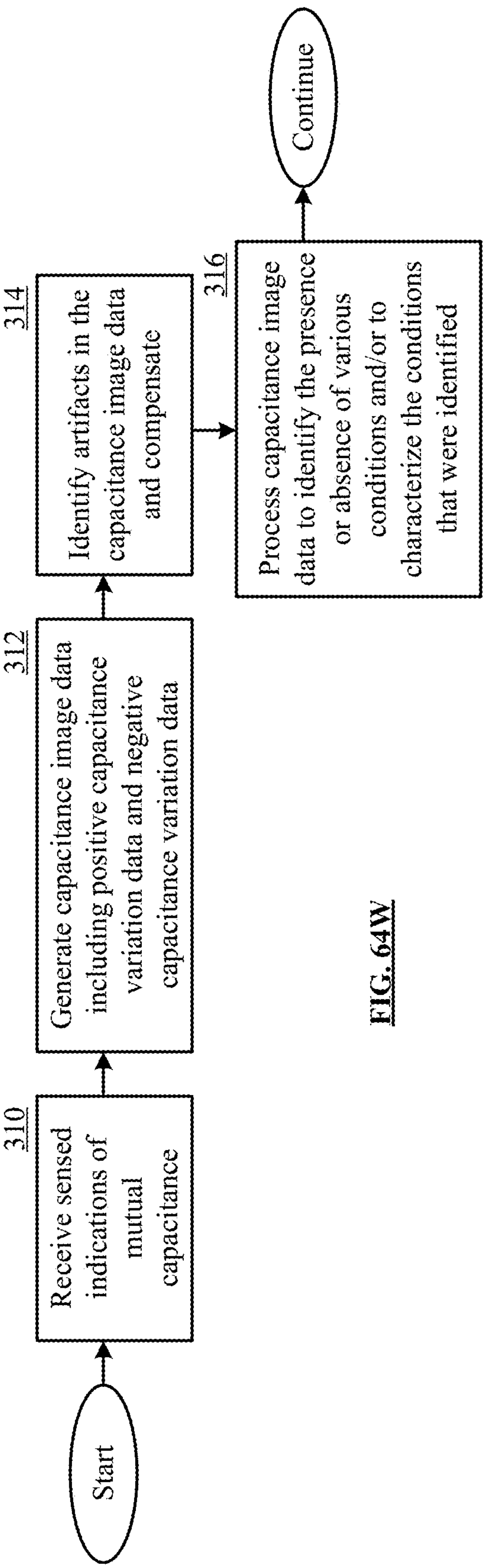
Figure 64X:
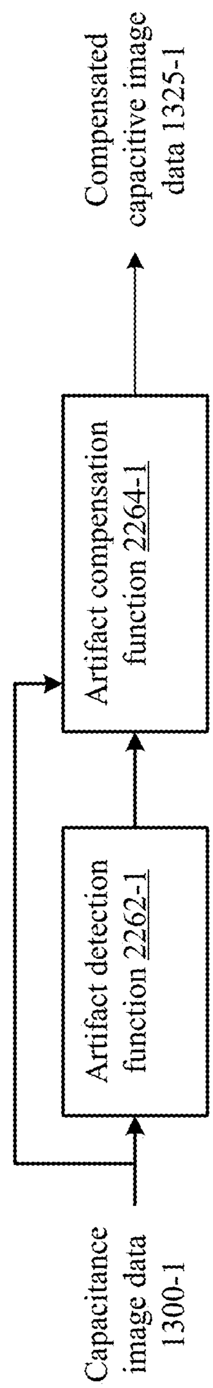
Figure 64Y:
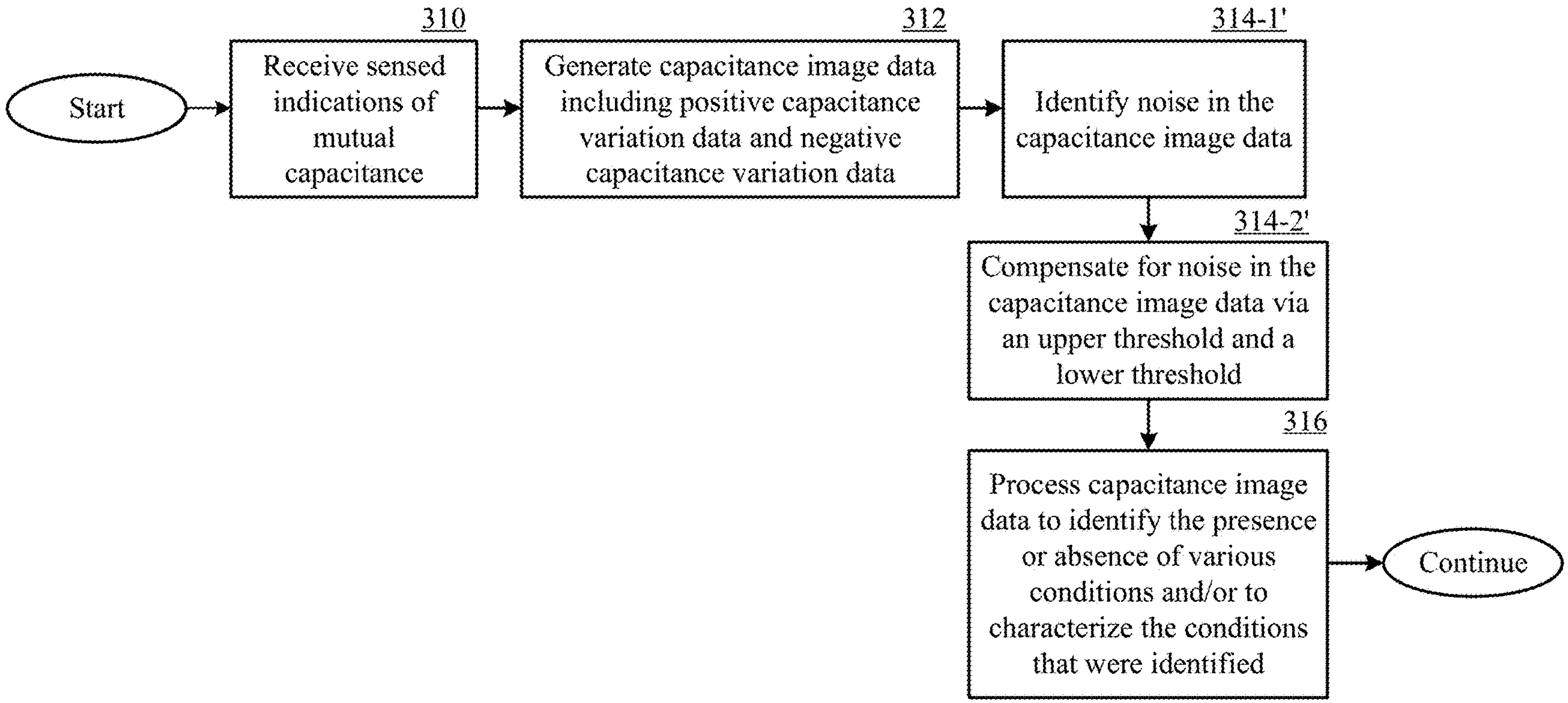
Figure 64Z:
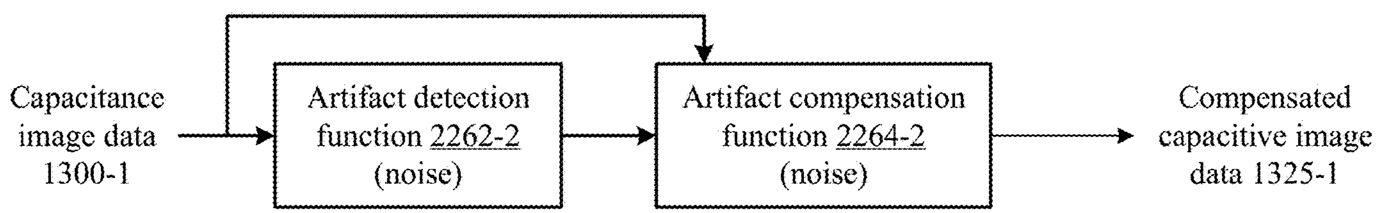
Figure 64A:
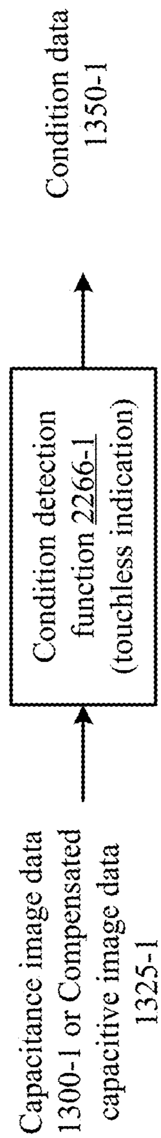
Figure 64A:
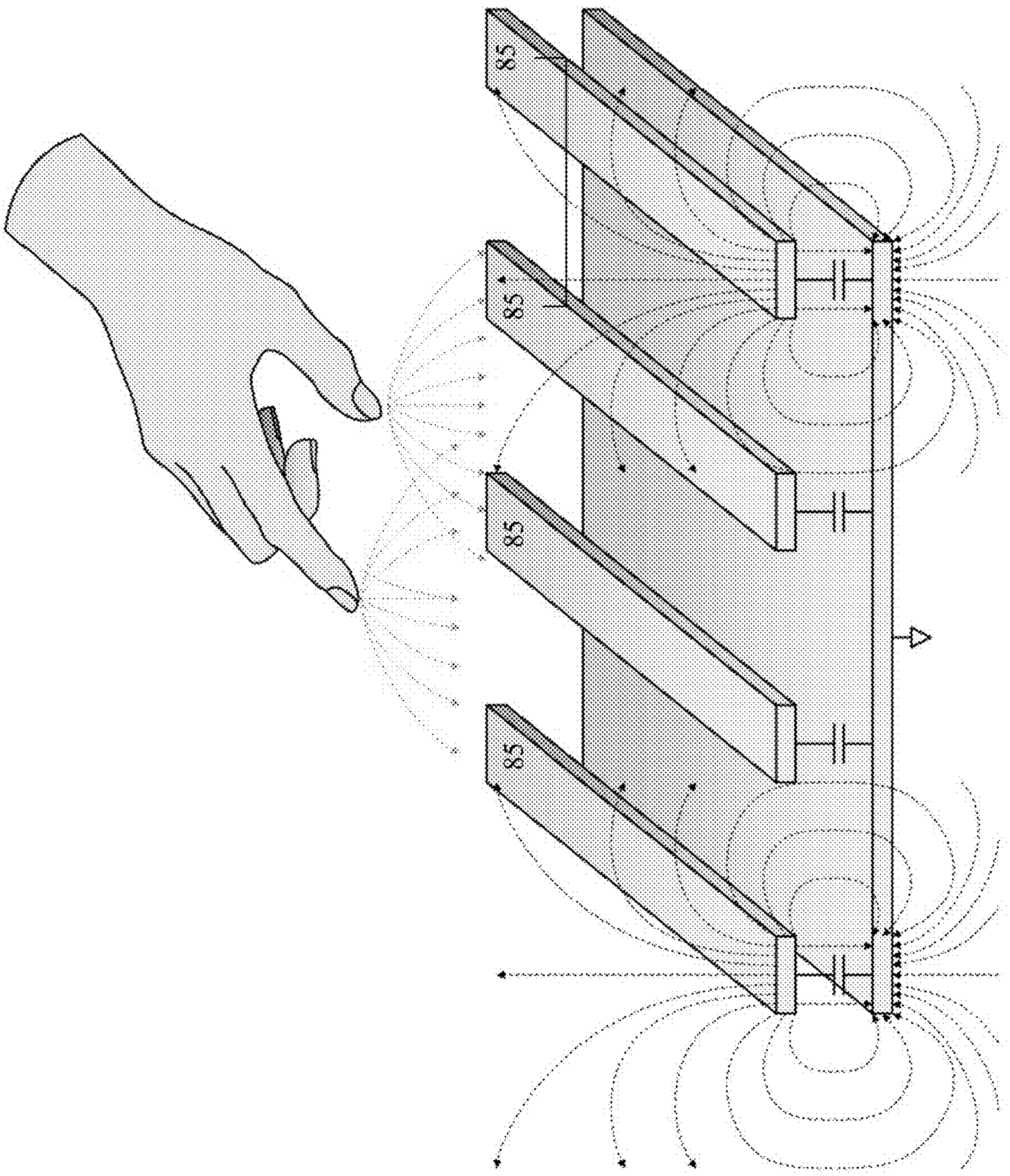
Figure 64A:
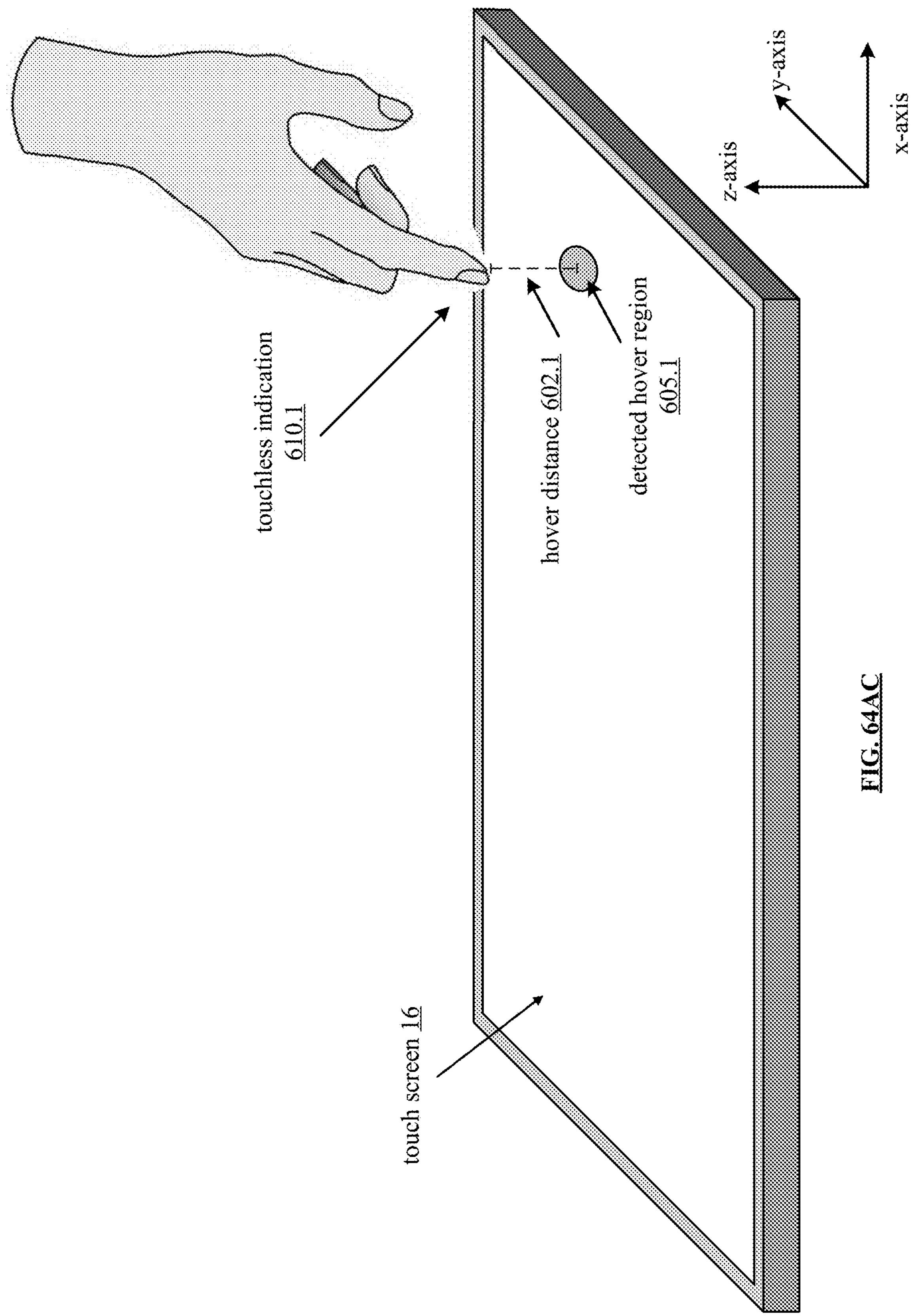
Figure 64A:
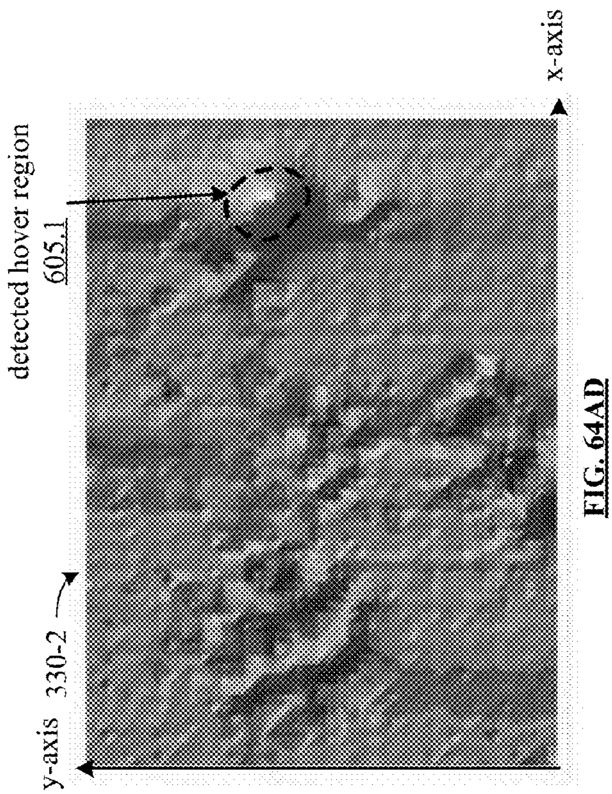
Figure 64A:
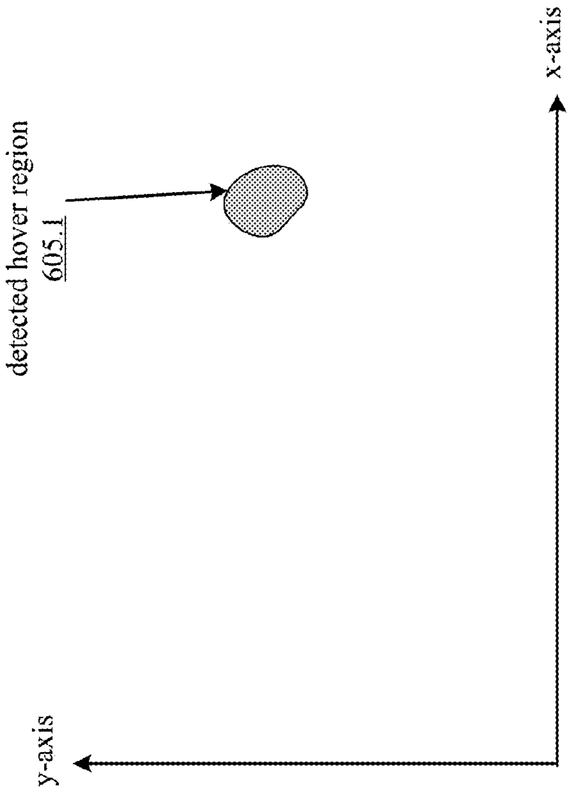
Figure 64A:
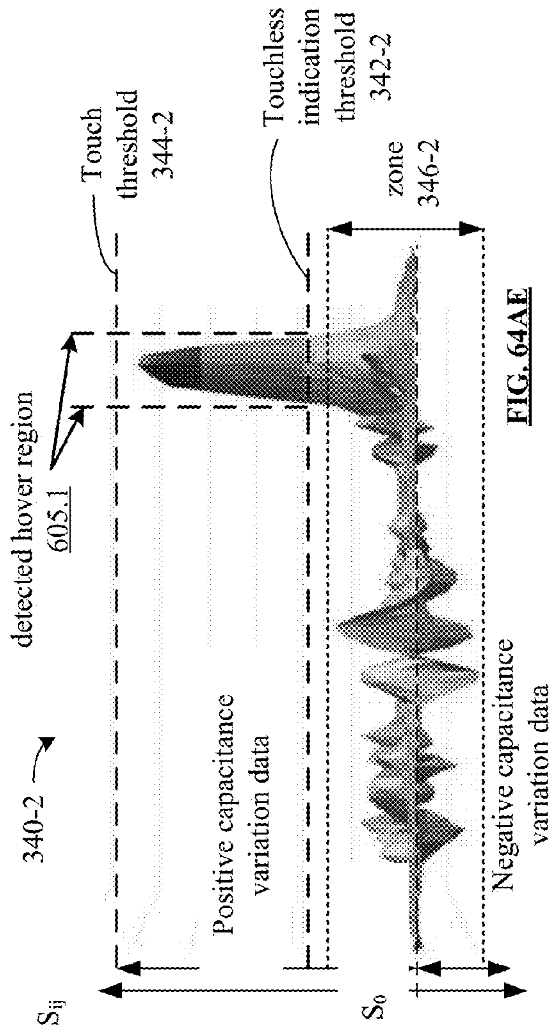
Figure 64A:
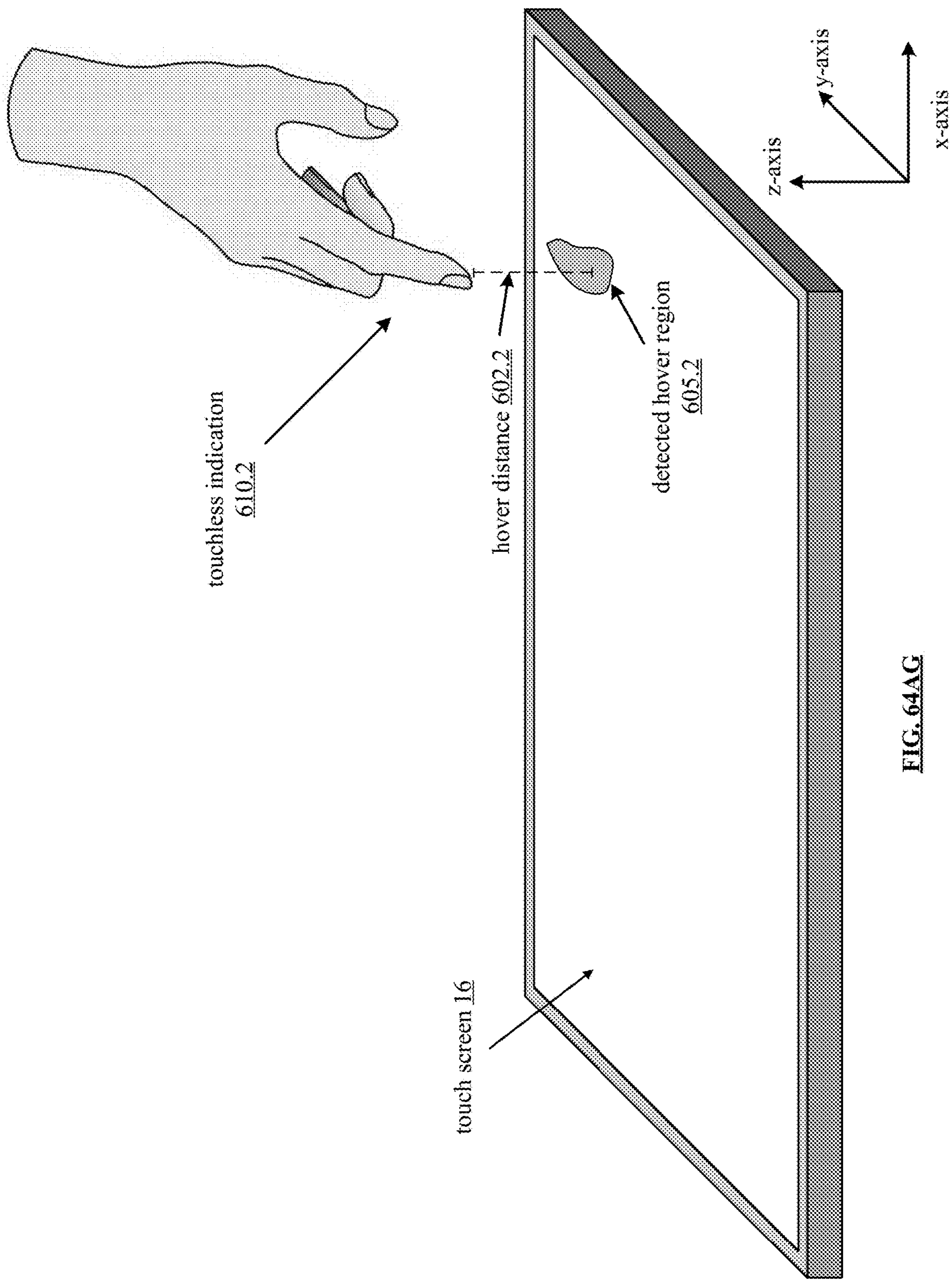
Figure 64A:
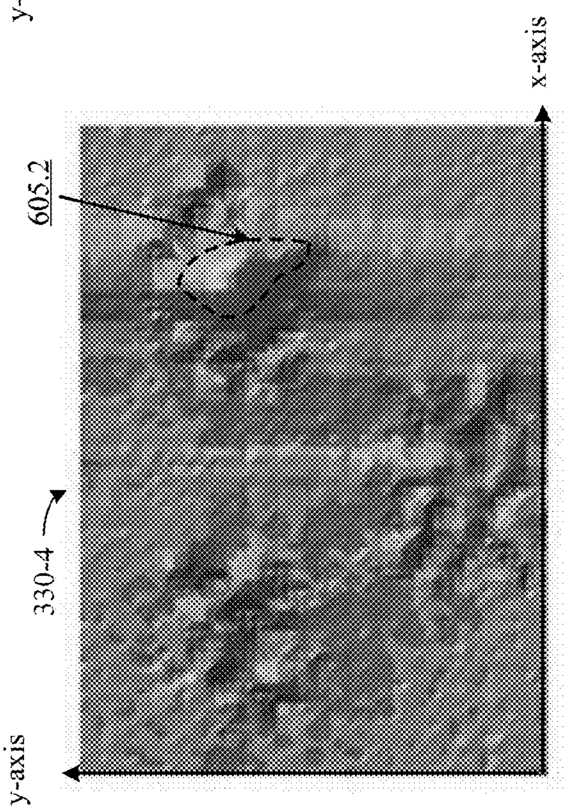
Figure 64A:
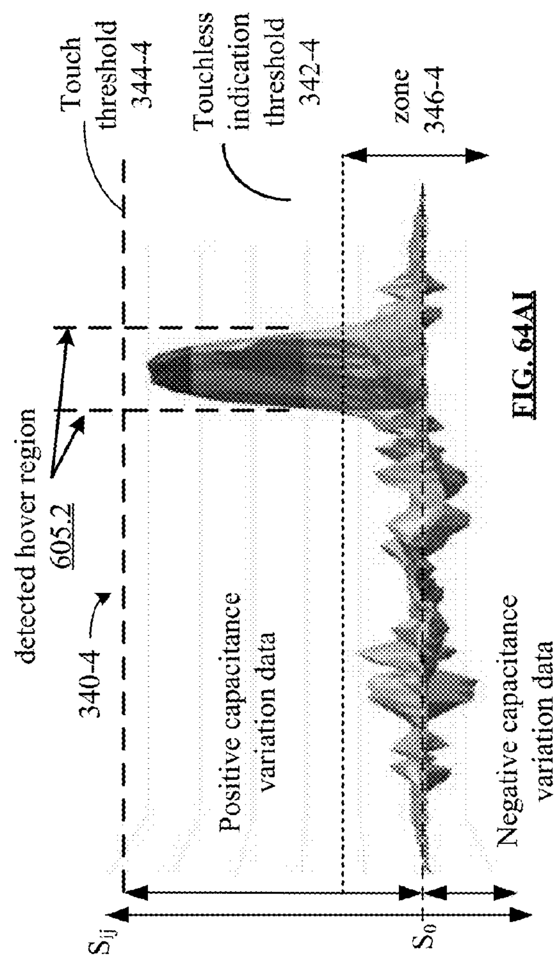
Figure 64A:
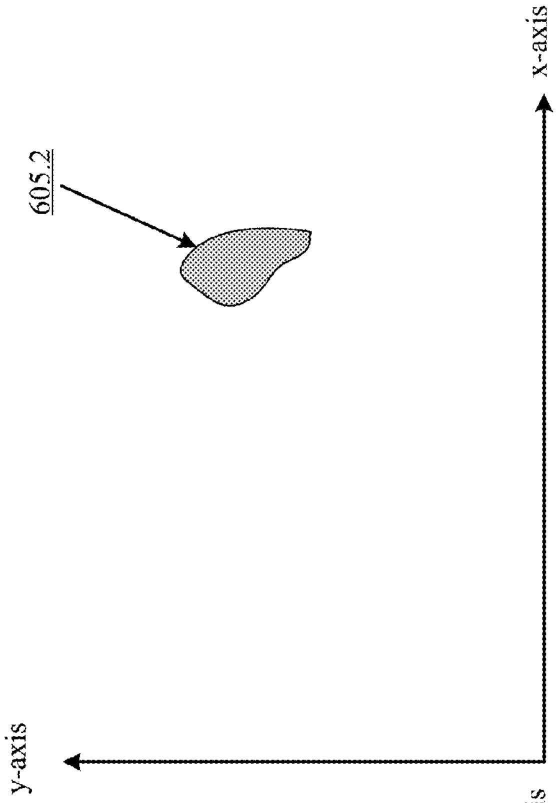
Figure 64A:
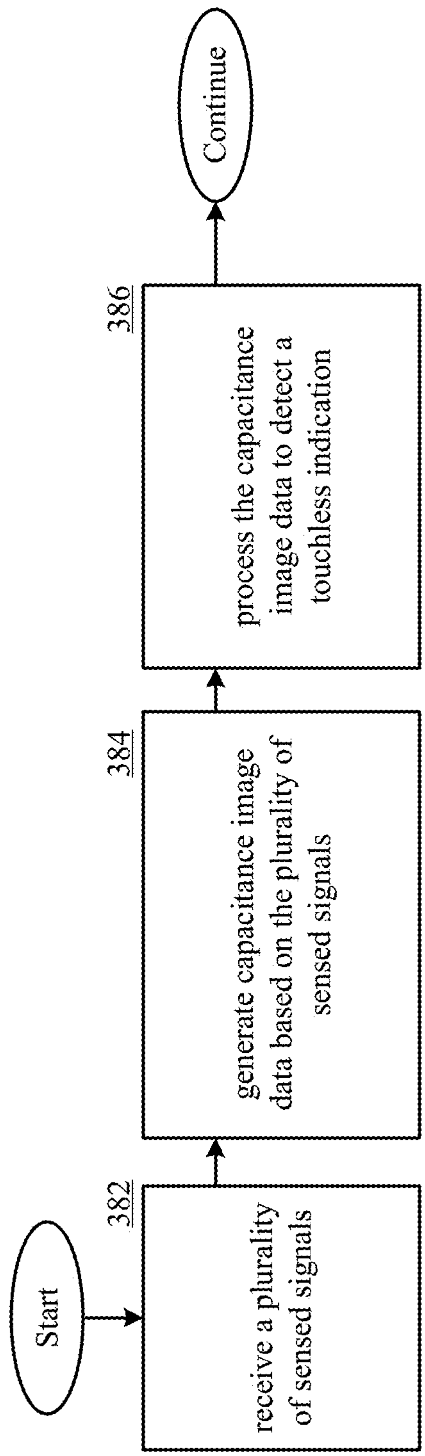
Figure 64A:
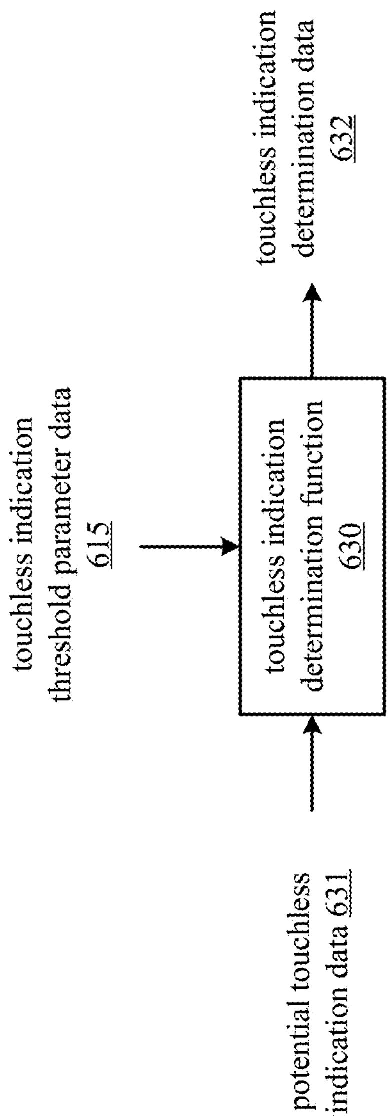
Figure 64A:
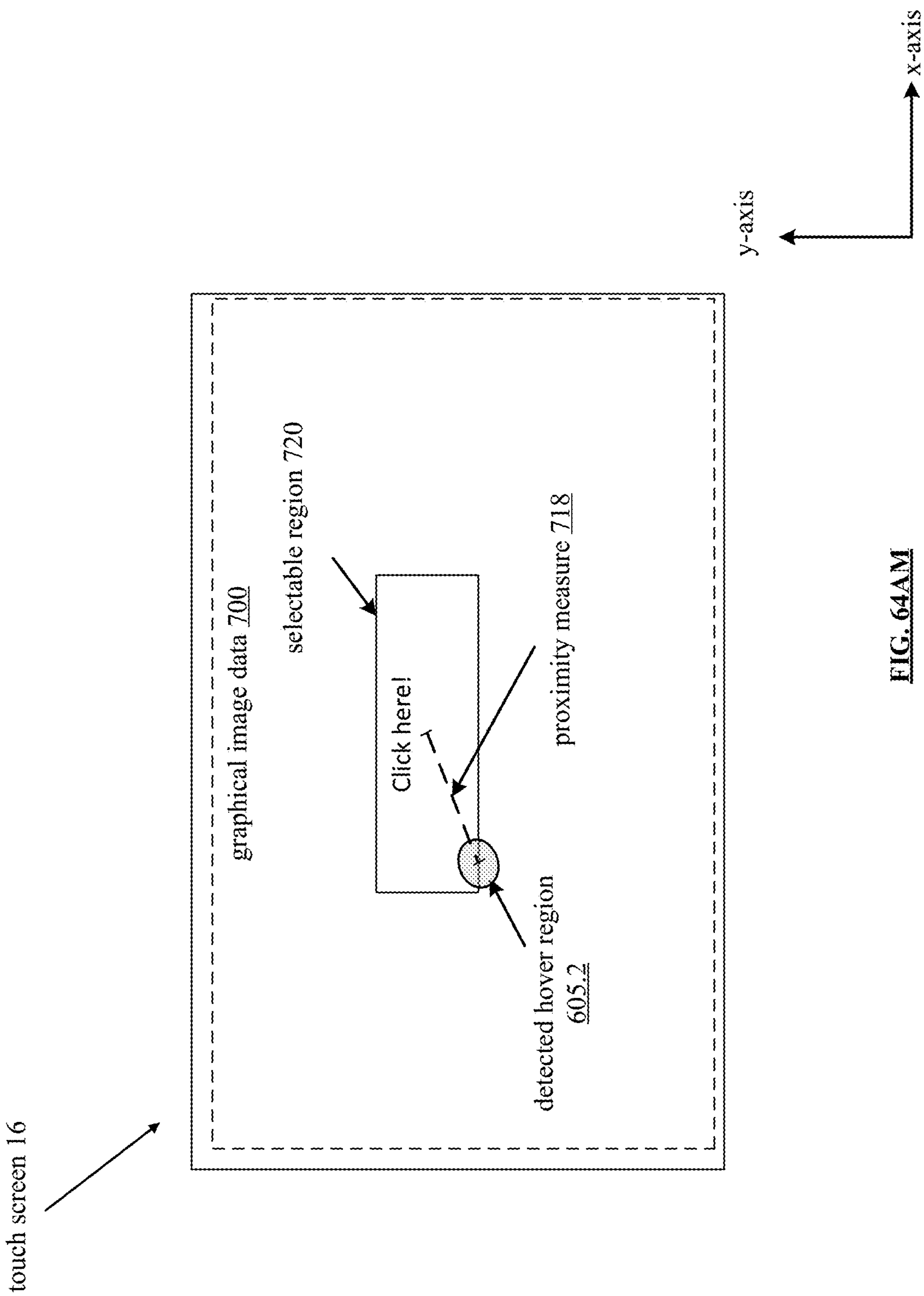
Figure 64A:
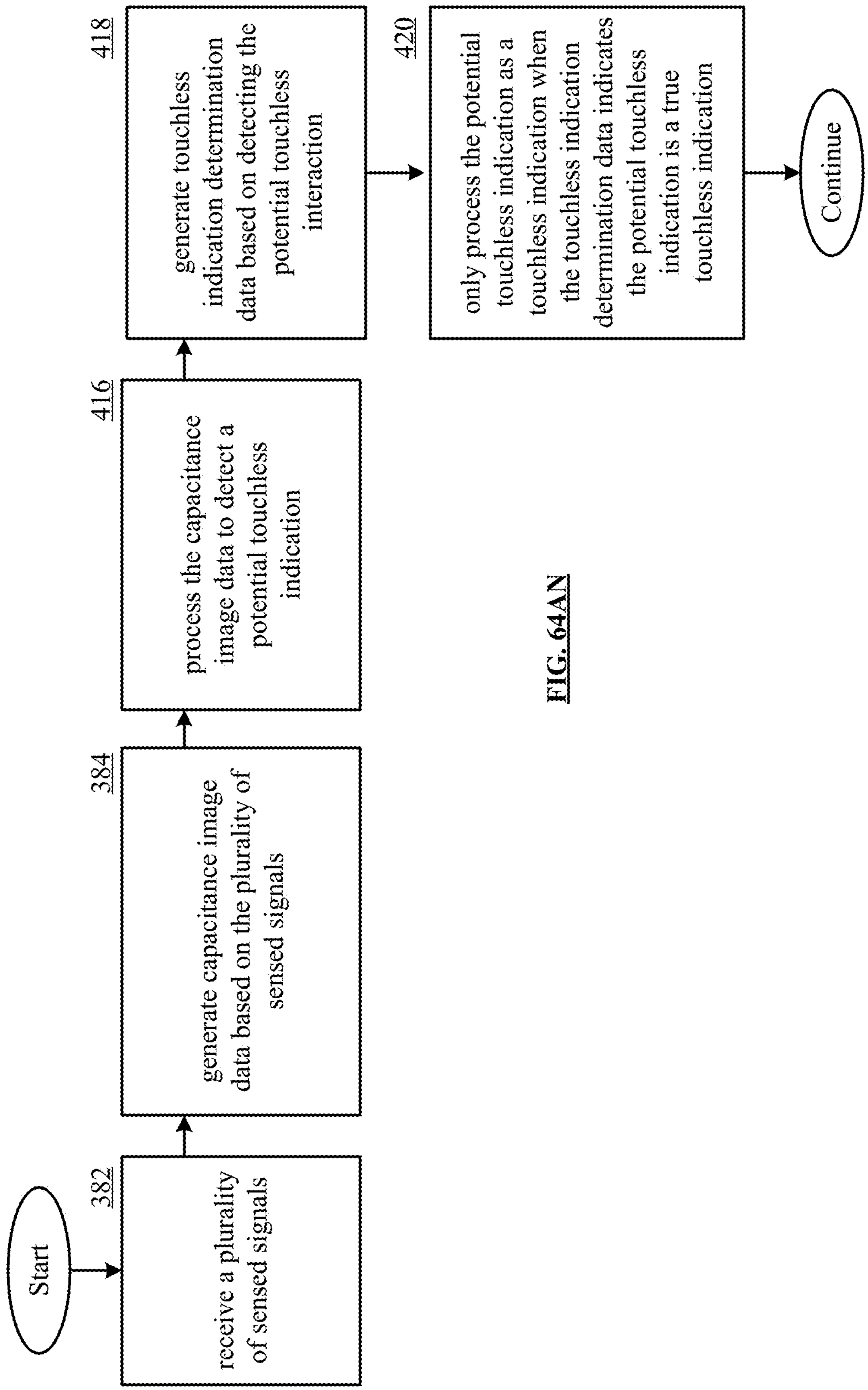
Figure 64A:
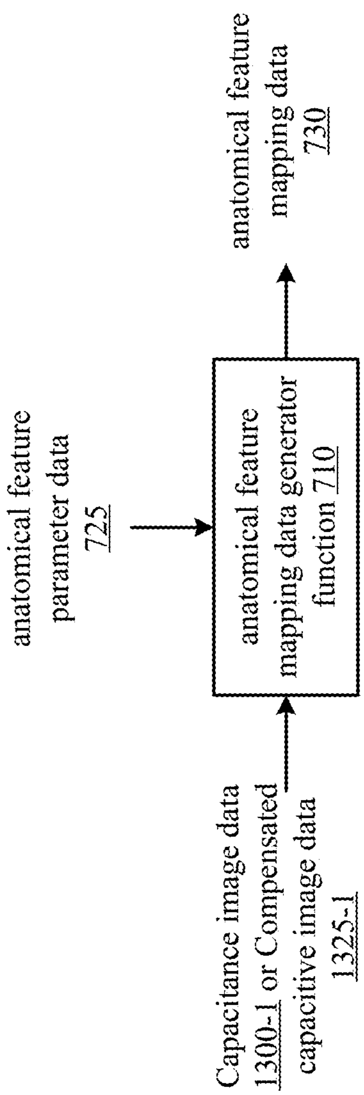
Figure 64A:
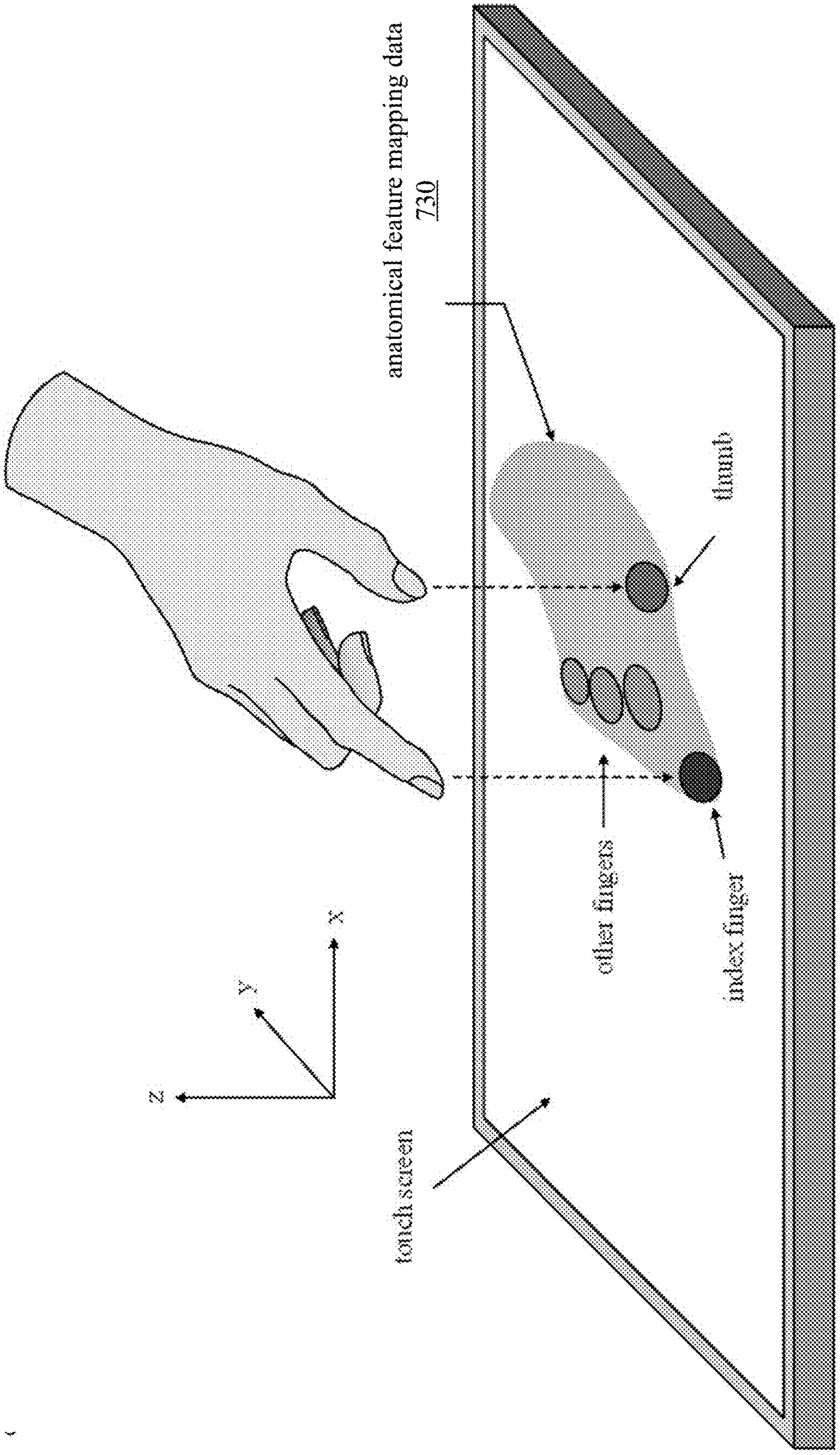
Figure 64A:
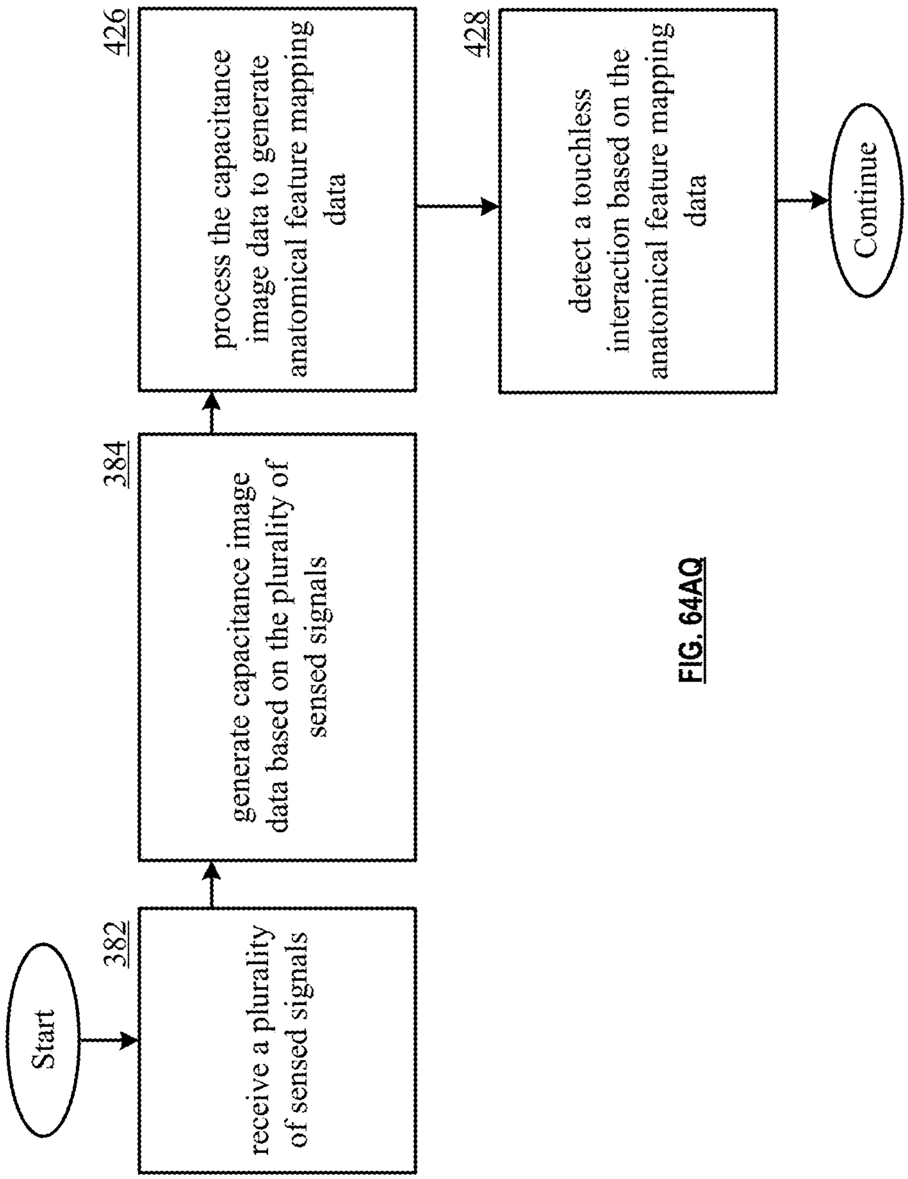
Figure 64A:
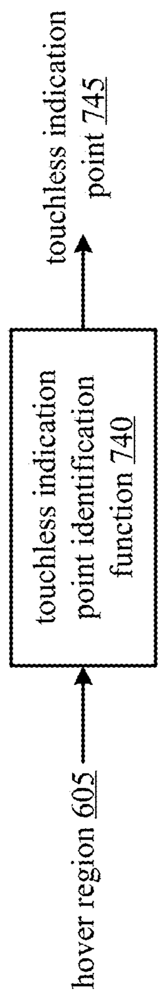
Figure 64A:
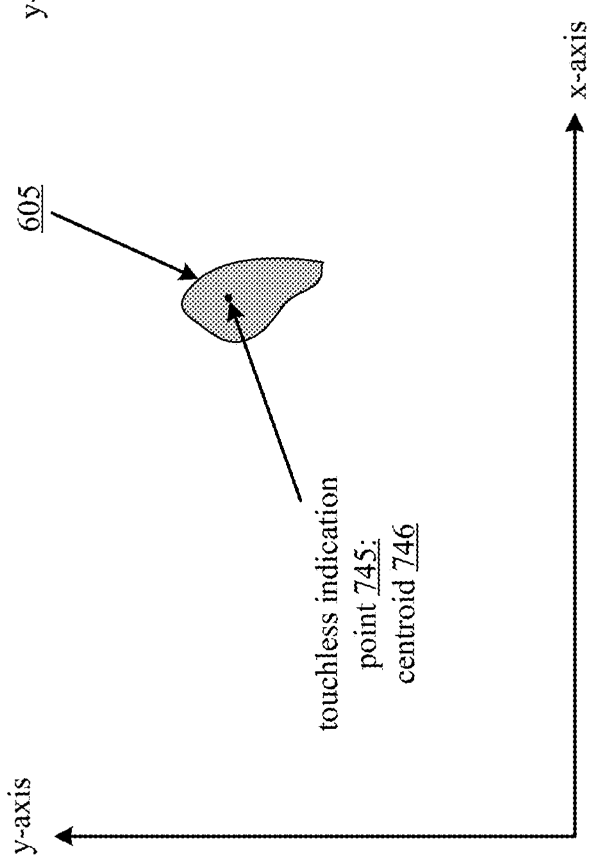
Figure 64A:
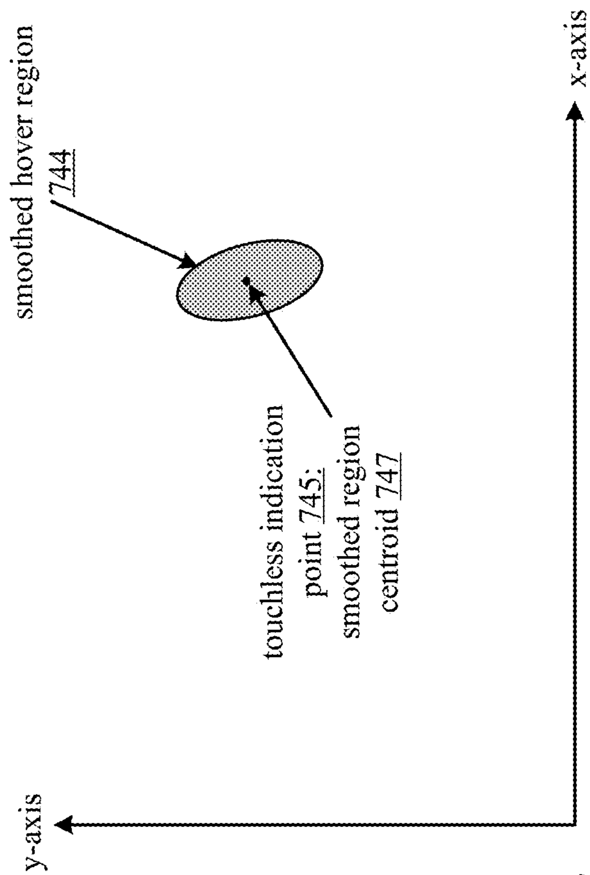
Figure 64A:
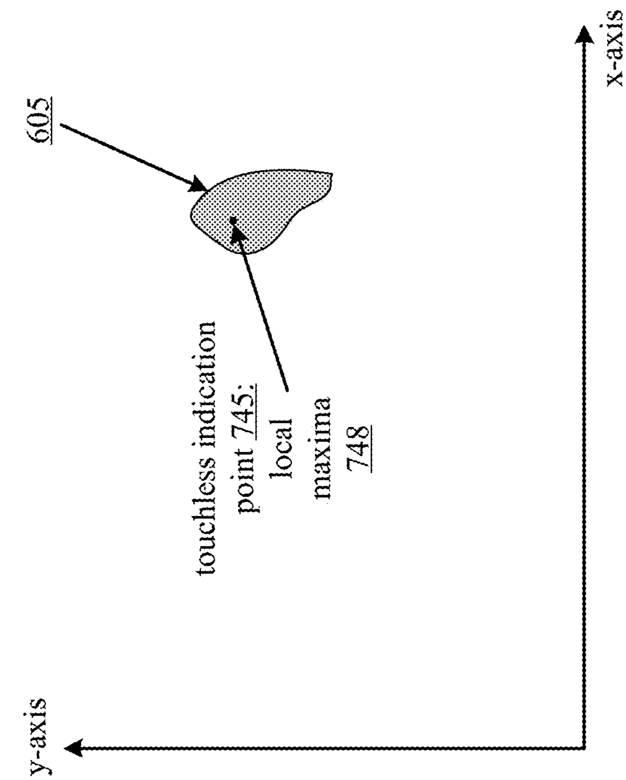
Figure 64A:
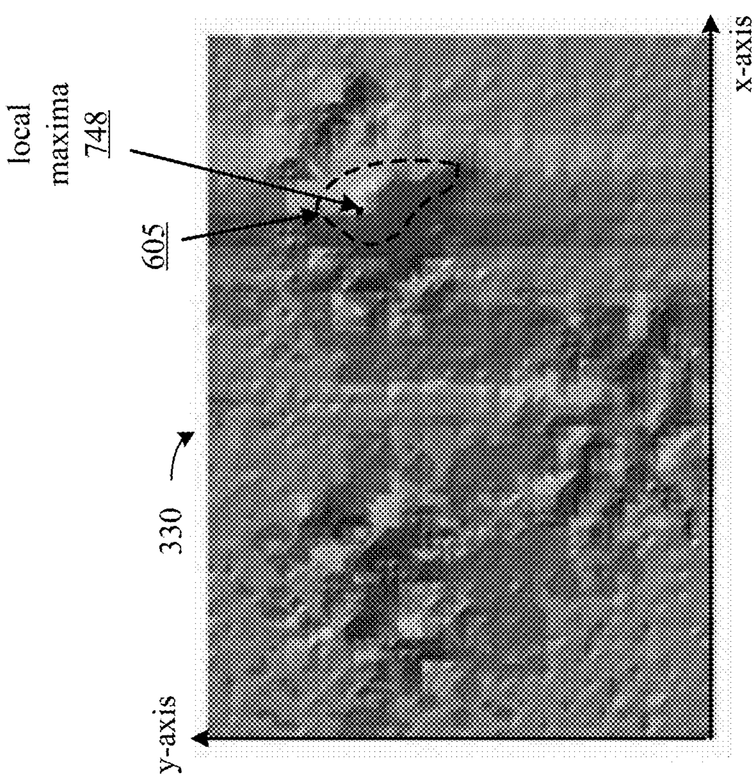
Figure 64A:
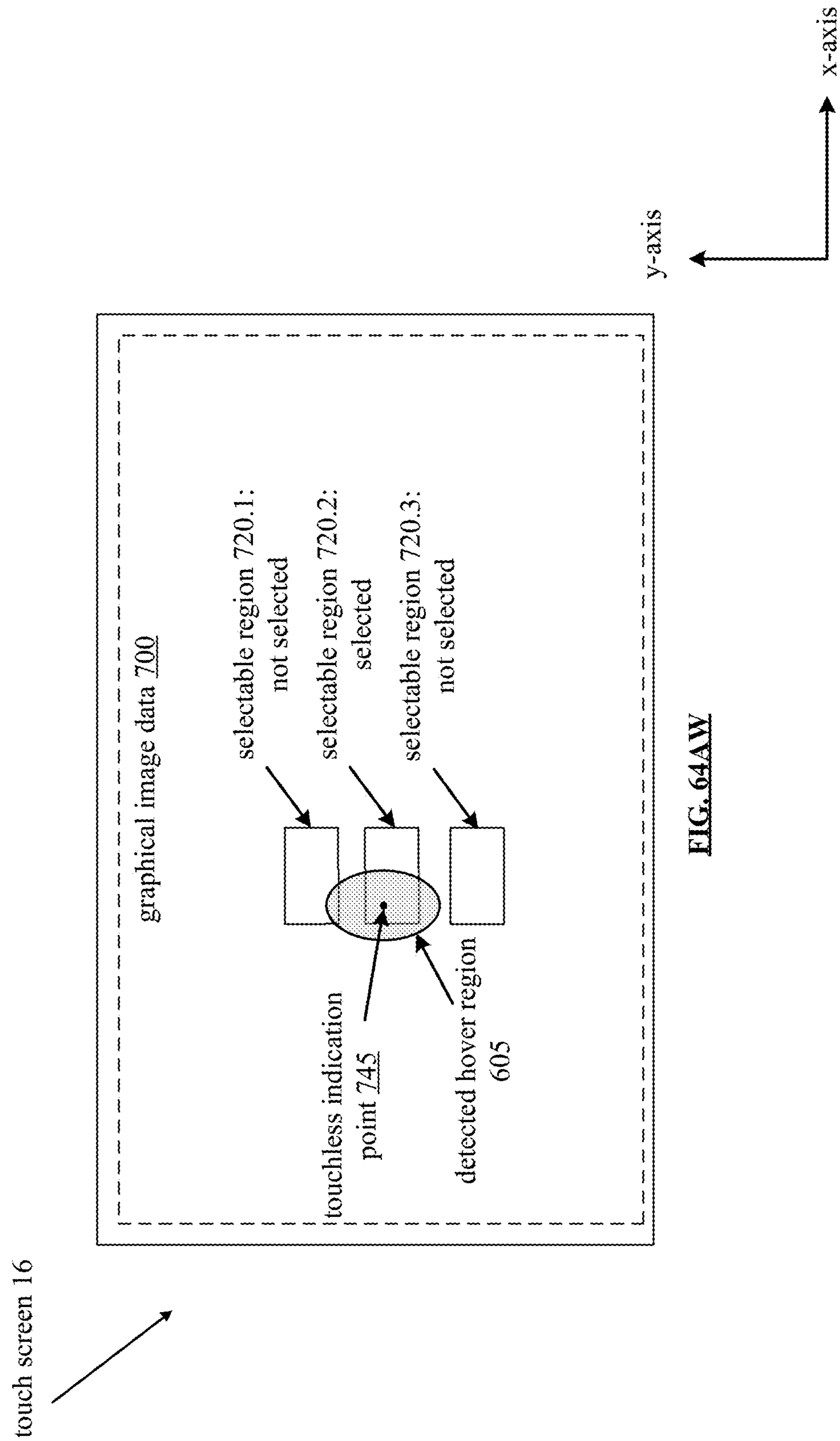
Figure 64A:
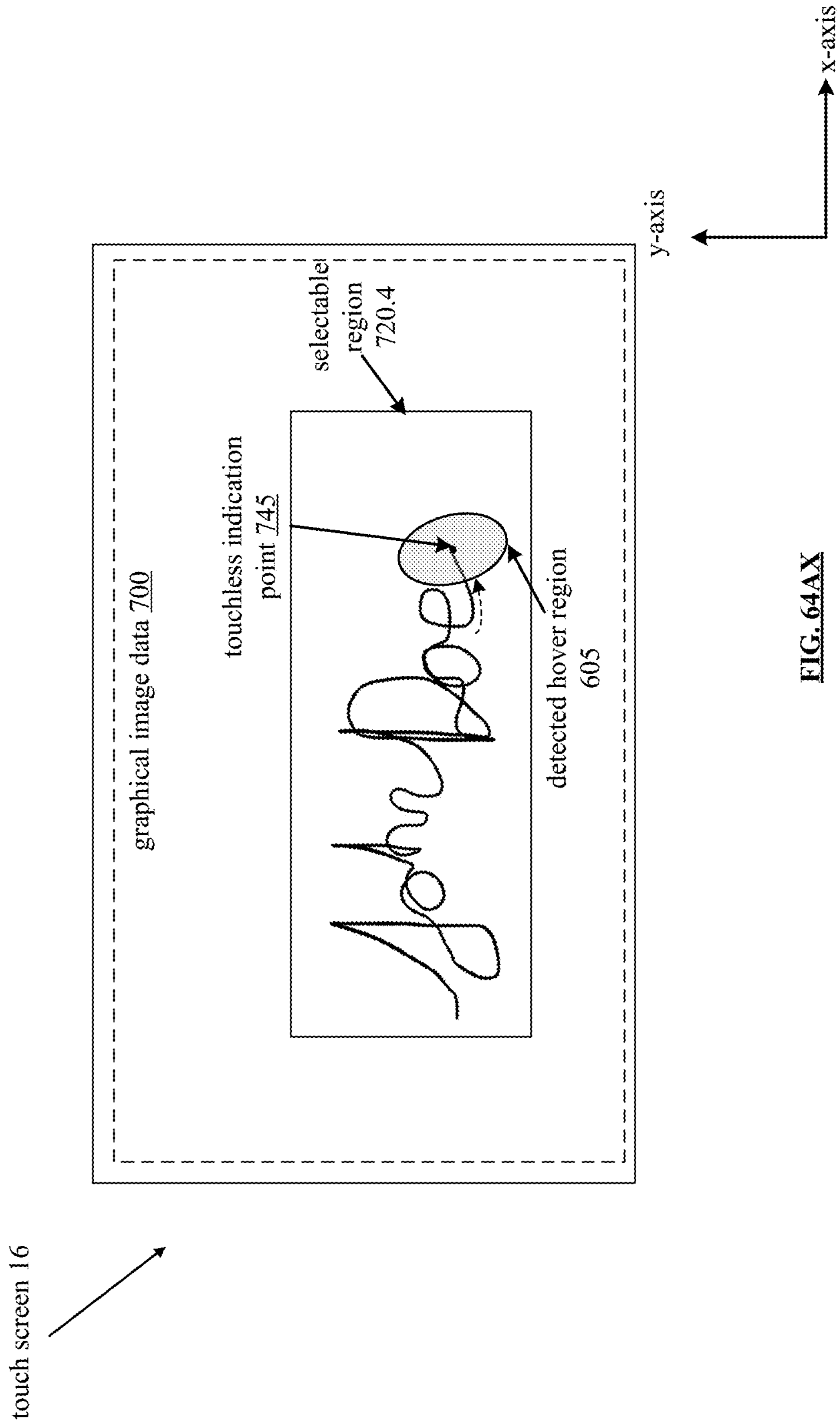
Figure 64A:
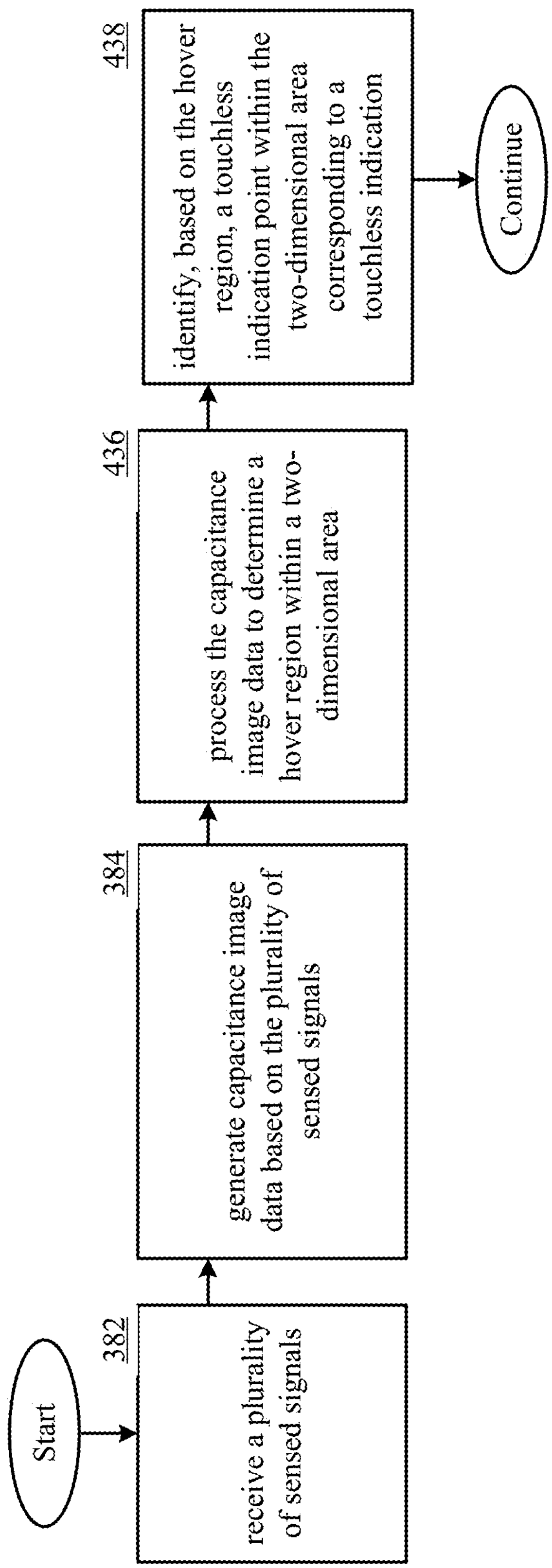
Figure 64A:
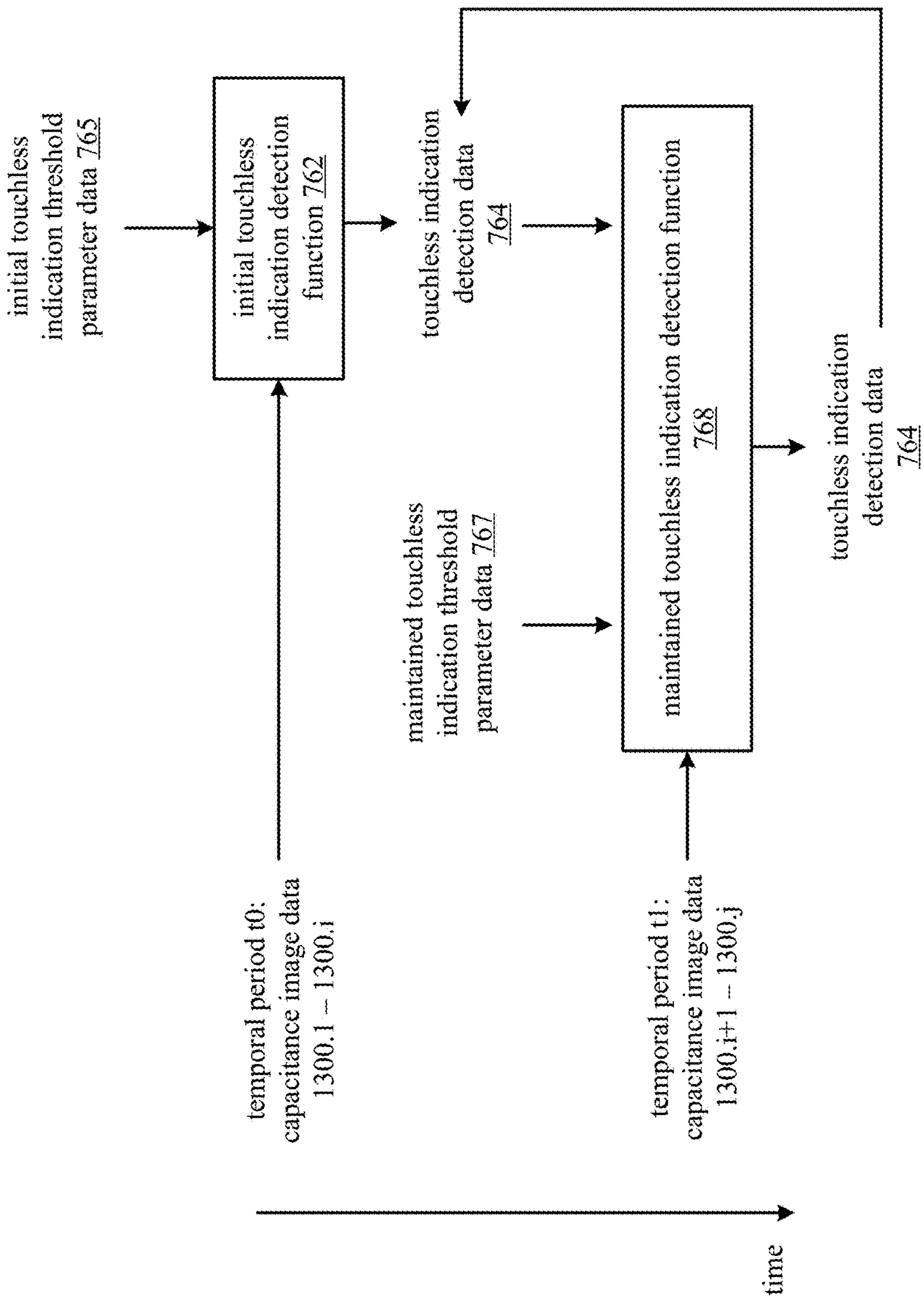
Figure 64B:
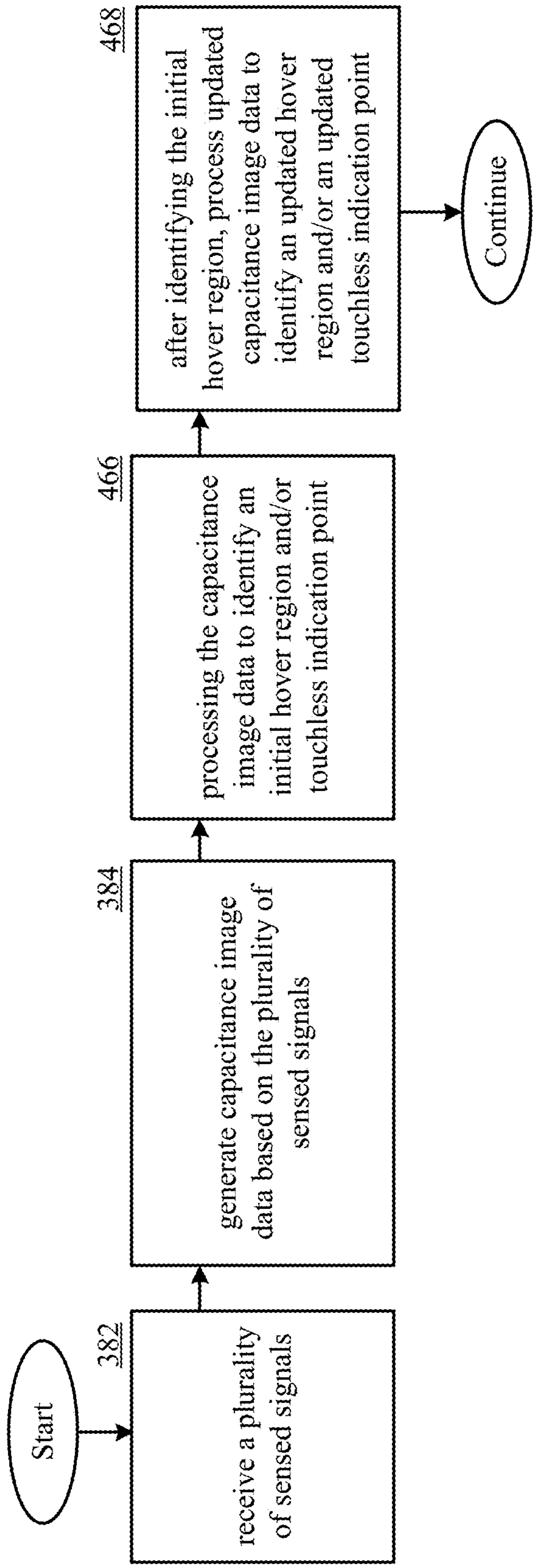
Figure 64B:
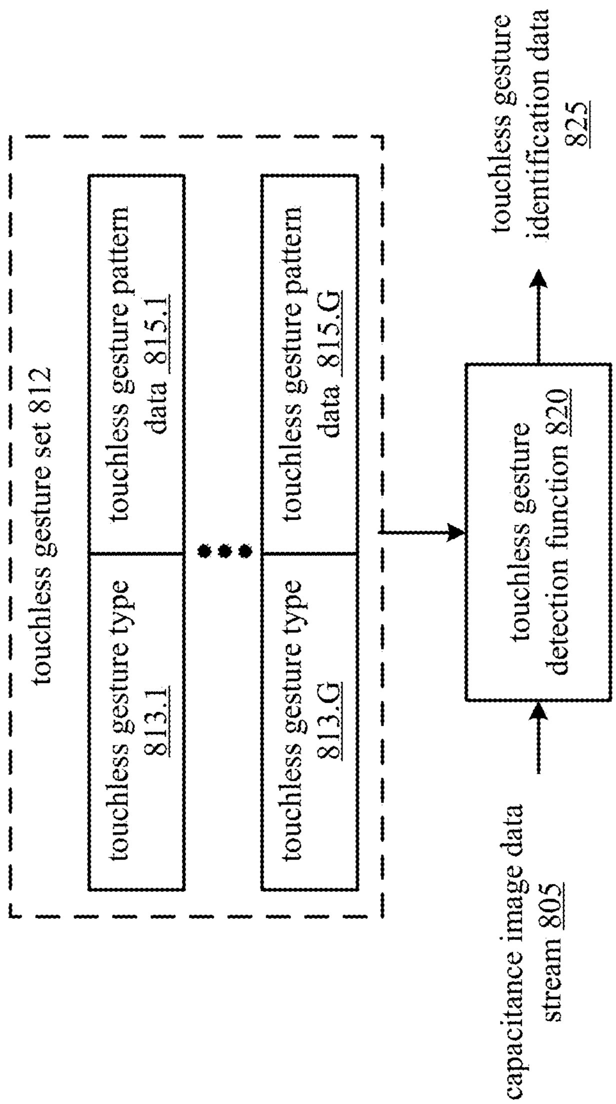
Figure 64B:
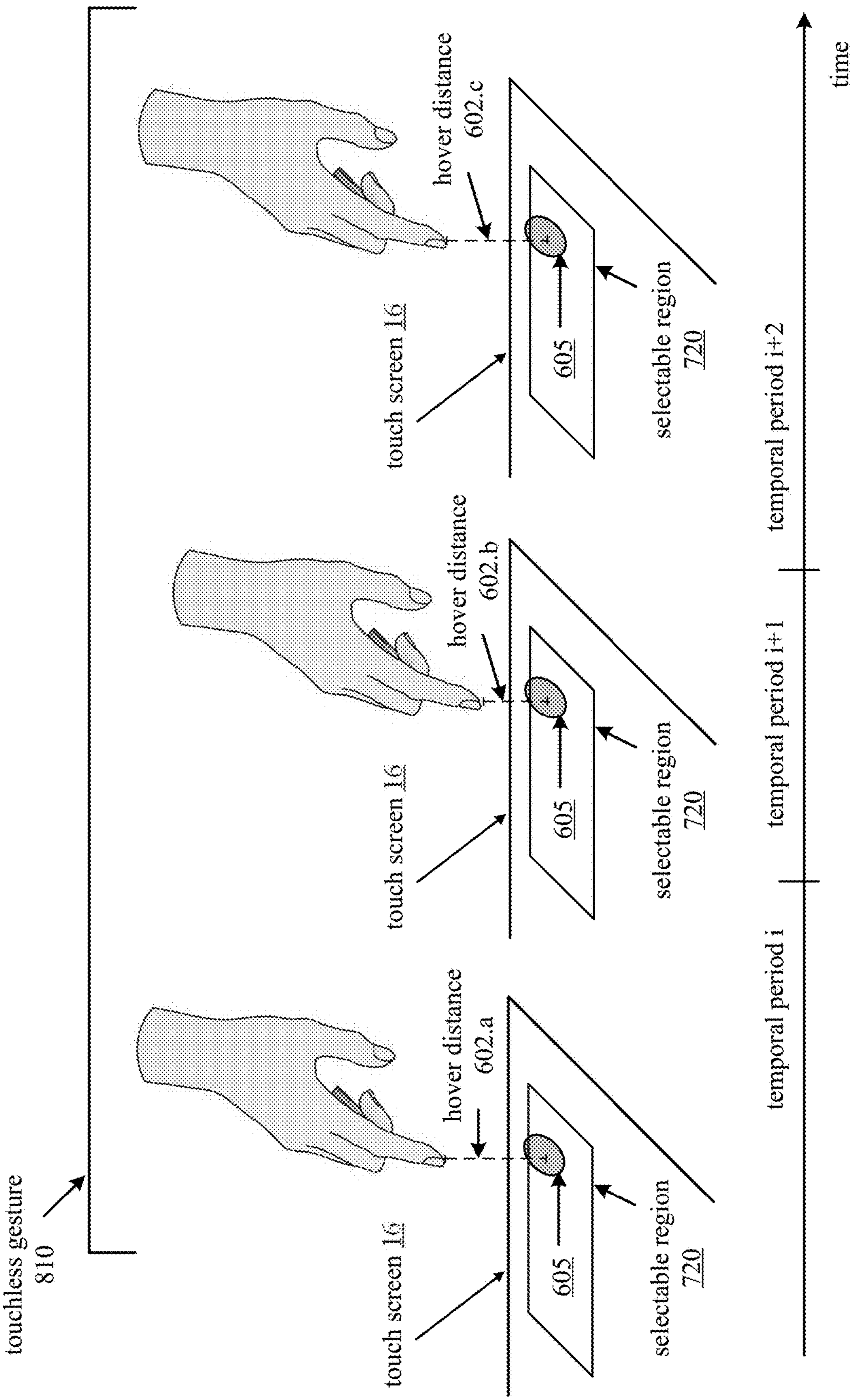
Figure 64B:
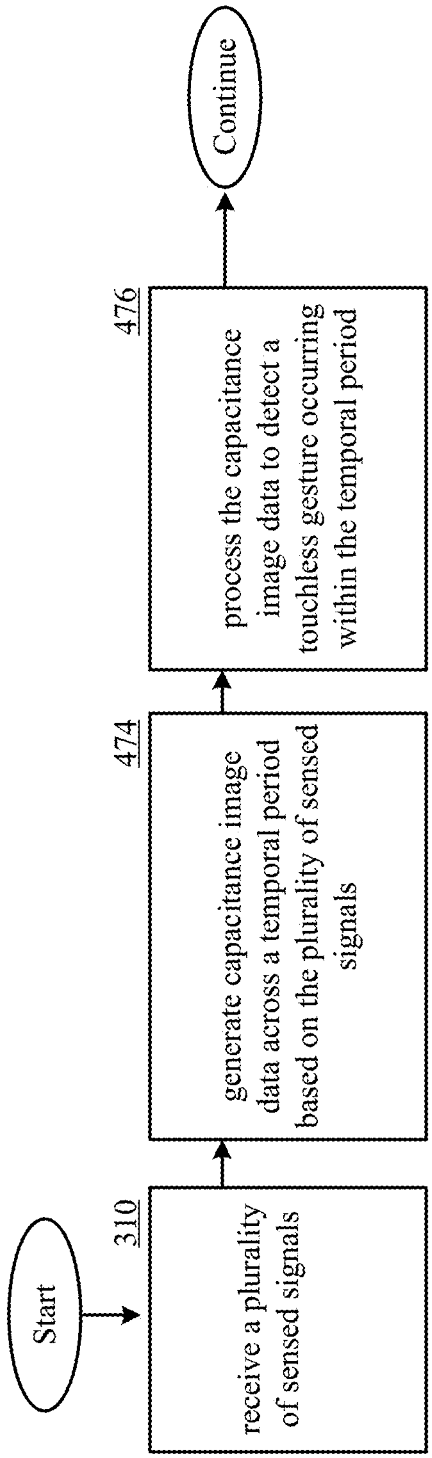
Figure 64B:
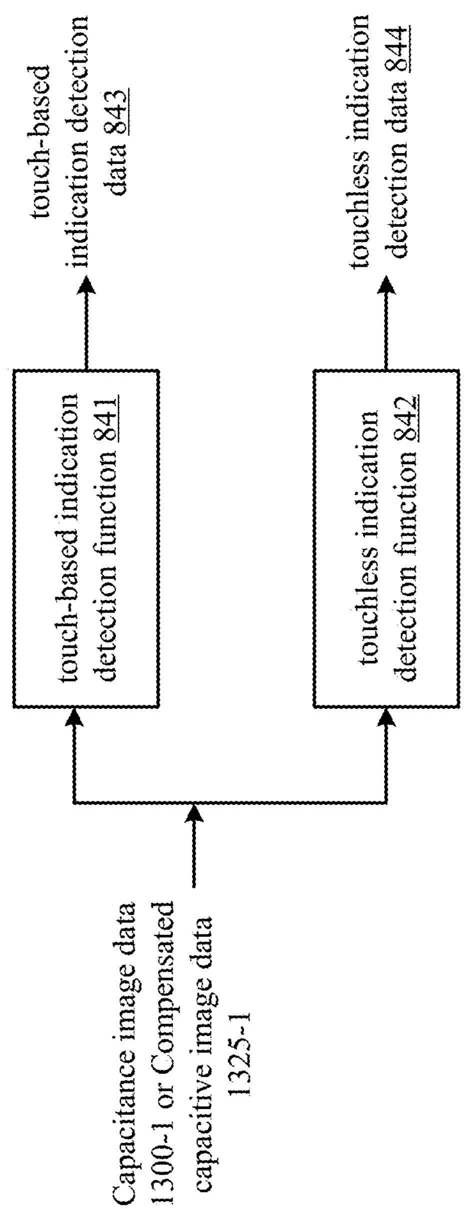
Figure 64B:
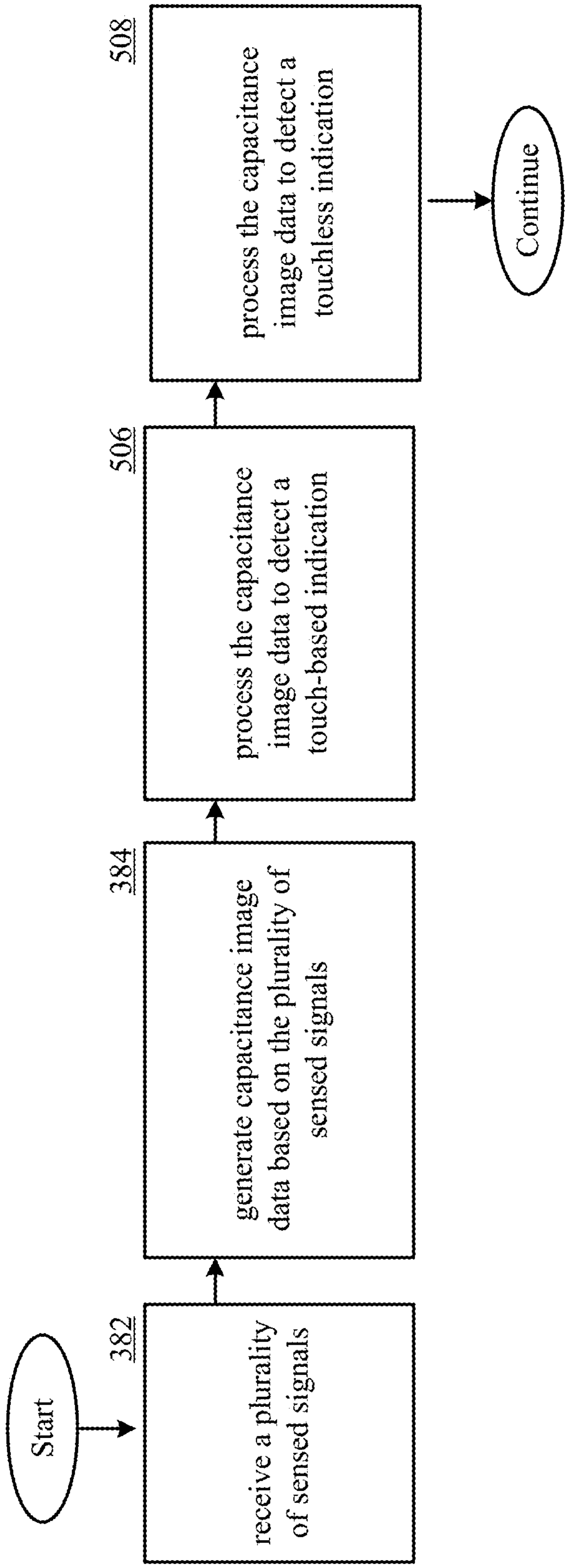

FIG. 62AA is a schematic block diagram of another embodiment of an example of a communication in accordance with the present disclosure;

FIG. 62AB is a schematic block diagram of another embodiment of an example of a communication in accordance with the present disclosure;

FIG. 62AC is a schematic block diagram of another embodiment of an example of a communication in accordance with the present disclosure;

FIG. 62AD is a schematic block diagram of another embodiment of an example of a communication in accordance with the present disclosure;

FIG. 62AE is a schematic block diagram of another embodiment of an example of a communication in accordance with the present disclosure;

FIG. 62AF is a logic flow diagram of an example of a method of determining a type of communication to use for an interaction in accordance with the present disclosure;

FIG. 62AG is a schematic block diagram of an embodiment of an embodiment of initiating and setting up screen to screen (STS) communications in accordance with the present disclosure;

FIG. 62AH is a logic flow diagram of another example of a method of setting up a screen to screen (STS) communications in accordance with the present disclosure;

FIG. 62AI a logic flow diagram of another example of a method of setting up a screen to screen (STS) communications in accordance with the present disclosure;

FIG. 62AJ is a schematic block diagram of an embodiment of an example of transmitting close proximity signals in accordance with the present disclosure;

FIG. 62AK is a schematic block diagram of an embodiment of an example of transmitting ping signals in accordance with the present disclosure;

FIG. 62AL is a schematic block diagram of an embodiment of an example of an interactive computing device (ICD) 1112 generating a default ping signal in accordance with the present disclosure;

FIG. 62AM is a schematic block diagram of an embodiment of an example of a default ping signal in accordance with the present disclosure;

FIG. 62AN is a schematic block diagram of an embodiment of an example of a default ping signal in accordance with the present disclosure;

FIG. 62AO is a schematic block diagram of another embodiment of an example of transmitting a default ping signal in accordance with the present disclosure;

FIG. 62AP is a logic flow diagram of an example of a method for setting up a screen to screen connection in accordance with the present disclosure;

FIG. 62AQ is a schematic block diagram of an embodiment of affected electrodes of an interactive computing device in accordance with the present disclosure;

FIG. 62AR is a schematic block diagram of an example of receiving a default ping signal in accordance with the present disclosure;

FIG. 62AS is a schematic block diagram of another embodiment of receiving a ping signal in accordance with the present disclosure;

FIG. 62AT is a schematic block diagram of an embodiment of an example of generating a ping back signal in accordance with the present disclosure;

FIG. 62AU is a schematic block diagram of an embodiment of an example of producing a ping back signal in accordance with the present disclosure;

FIG. 62AV is a logic flow diagram of an example of a method of setting up a screen to screen (STS) connection in accordance with the present disclosure;

FIG. 62AW is a logic flow diagram of another example of a method for use in setting up a screen to screen (STS) connection in accordance with the present disclosure;

FIG. 62AX is a logic flow diagram of another example of a method of setting up a screen to screen (STS) connection in accordance with the present disclosure;

FIG. 62AY is a schematic block diagram of an embodiment of an example of a radio frequency (RF) transceiver and a signal source in accordance with the present disclosure;

FIG. 62AZ is a schematic block diagram of an embodiment of an interactive computing device (ICD) interacting with a user computing device (UCD) to select items in accordance with the present disclosure;

FIG. 62BA is a schematic block diagram of an embodiment of an example of an interactive computing device (ICD) interacting with a user computing device (UCD) to mirror a menu of items in accordance with the present disclosure;

FIG. 62BB is a schematic block diagram of an embodiment of an example of an interactive computing device (ICD) interacting with a user computing device (UCD) to select items of a menu in accordance with the present disclosure;

FIG. 62BC is a schematic block diagram of another embodiment of an example of an interactive computing device (ICD) interacting with a user computing device (UCD) to edit a menu selection in accordance with the present disclosure;

FIG. 62BD is a logic flow diagram of an example of an interactive computing device (ICD) interacting with a user computing device (UCD) to edit a menu selection in accordance with the present disclosure;

FIG. 62BE is a schematic block diagram of an example of an interactive computing device (ICD) interacting with a user computing device (UCD) to edit a menu selection in accordance with the present disclosure;

FIG. 62BF is a schematic block diagram of an example of an interactive computing device (ICD) interacting with a user computing device (UCD) to edit a menu selection in accordance with the present disclosure;

FIG. 62BG is a schematic block diagram of an example of an interactive computing device (ICD) interacting with a user computing device (UCD) to edit a menu selection in accordance with the present disclosure;

FIG. 62BH is a schematic block diagram of an embodiment of setting up screen to screen (STS) communications in accordance with the present disclosure;

FIG. 62BI is a schematic block diagram of an embodiment of the setting up screen to screen communications in accordance with the present disclosure;

FIG. 62BJ is a schematic block diagram of the example of the setting up the screen to screen (STS) communications in accordance with the present disclosure;

FIG. 62BK is a schematic block diagram of an embodiment of the example of the setting up screen to screen (STS) communications in accordance with the present disclosure;

FIG. 62BL is a logic flow diagram of an example of a method of determining a menu interaction modality in accordance with the present disclosure;

FIG. 62BM is a logic flow diagram of an example of a method of setting up a screen to screen (STS) communication in accordance with the present disclosure;

FIG. 63A is a schematic block diagram of an embodiment of a touchscreen display in accordance with the present disclosure;

FIG. 63B is a schematic block diagram of another embodiment of a touchscreen display in accordance with the present disclosure;

FIG. 63C is a logic diagram of an embodiment of a method for sensing a touch on a touchscreen display in accordance with the present disclosure;

FIG. 63D is a schematic block diagram of an embodiment of a drive sense circuit in accordance with the present disclosure;

FIG. 63E is a schematic block diagram of another embodiment of a drive sense circuit in accordance with the present disclosure;

FIG. 63F is a cross section schematic block diagram of an example of a touchscreen display with in-cell touch sensors in accordance with the present disclosure;

FIG. 63G is a schematic block diagram of an example of a transparent electrode layer with thin film transistors in accordance with the present disclosure;

FIG. 63H is a schematic block diagram of an example of a pixel with three sub-pixels in accordance with the present disclosure;

FIG. 63I is a schematic block diagram of another example of a pixel with three sub-pixels in accordance with the present disclosure;

FIG. 63J is a schematic block diagram of an embodiment of a DSC that is interactive with an electrode in accordance with the present disclosure;

FIG. 63K is a schematic block diagram of another embodiment of a DSC that is interactive with an electrode in accordance with the present disclosure;

FIG. 63L is a schematic block diagram of an embodiment of computing devices within a system operative to facilitate coupling of one or more signals from a first computing device via a user to a second computing device in accordance with the present disclosure;

FIG. 63M is a schematic block diagram of another embodiment of computing devices within a system operative to facilitate coupling of one or more signals from a first computing device via a user to a second computing device in accordance with the present disclosure;

FIG. 63N is a schematic block diagram of an embodiment of coupling of one or more signals from a first computing device, such as from an image displayed by the computing device, via a user to a second computing device in accordance with the present disclosure;

FIG. 63O is a schematic block diagram of an embodiment of coupling of one or more signals from a first computing device, such as from a button of the computing device, via a user to a second computing device in accordance with the present disclosure;

FIG. 63P is a schematic block diagram of an embodiment of coupling of one or more signals from a computing device via a user, or alternatively, from a user into a computing device, in accordance with the present disclosure;

FIG. 63Q is a schematic block diagram of an embodiment of coupling of one or more signals from a computing device via a user, or alternatively, from a user into a computing device, in accordance with the present disclosure;

FIG. 63R is a schematic block diagram of an embodiment of a method for execution by one or more computing devices in accordance with the present disclosure;

FIG. 63S is a schematic block diagram of another embodiment of a method for execution by one or more computing devices in accordance with the present disclosure;

FIG. 64A is a schematic block diagram of an embodiment of a computing device in accordance with the present disclosure;

FIG. 64B is a schematic block diagram of another embodiment of a computing device in accordance with the present disclosure;

FIG. 64C is a schematic block diagram of an example of a computing device generating a capacitance image of a touch screen display in accordance with the present disclosure;

FIG. 64D is a schematic block diagram of another example of a computing device generating a capacitance image of a touch screen display in accordance with the present disclosure;

FIG. 64E is a logic diagram of an embodiment of a method for generating a capacitance image of a touch screen display in accordance with the present disclosure;

FIG. 64F is a schematic block diagram of an example of generating capacitance images over a time period in accordance with the present disclosure;

FIG. 64G is a logic diagram of an embodiment of a method for identifying desired and undesired touches using a capacitance image in accordance with the present disclosure;

FIG. 64H is a schematic block diagram of an example of using capacitance images to identify desired and undesired touches in accordance with the present disclosure;

FIG. 64I is a schematic block diagram of another example of using capacitance images to identify desired and undesired touches in accordance with the present disclosure;

FIG. 64J is a schematic block diagram of an electrical equivalent circuit of two drive sense circuits coupled to two electrodes without a finger touch in accordance with the present disclosure;

FIG. 64K is a schematic block diagram of an electrical equivalent circuit of two drive sense circuits coupled to two electrodes with a finger touch in accordance with the present disclosure;

FIG. 64L is a schematic block diagram of an electrical equivalent circuit of a drive sense circuit coupled to an electrode without a finger touch in accordance with the present disclosure;

FIG. 64M is an example graph that plots finger capacitance verses protective layer thickness of a touch screen display in accordance with the present disclosure;

FIG. 64N is an example graph that plots mutual capacitance verses protective layer thickness and drive voltage verses protective layer thickness of a touch screen display in accordance with the present disclosure;

FIG. 64O is a cross section schematic block diagram of another example of a touch screen display in accordance with the present disclosure;

FIG. 64P is a schematic block diagram of an embodiment of a DSC that is interactive with an electrode in accordance with the present disclosure;

FIG. 64Q is a schematic block diagram of another embodiment of a DSC that is interactive with an electrode in accordance with the present disclosure;

FIG. 64R is a schematic block diagram of an embodiment of a plurality of electrodes creating a plurality of touch sense cells 280 within a display;

FIG. 64S is a schematic block diagram of another embodiment of a touch sensor device in accordance with the present disclosure;

FIG. 64T is a schematic block diagram of an embodiment of mutual signaling within a touch sensor device in accordance with the present disclosure;

FIG. 64U is a schematic block diagram of an embodiment of a processing module in accordance with the present disclosure;

FIG. 64V is a graphical diagram of an embodiment of capacitance image data in accordance with the present disclosure;

FIG. 64W is a flow diagram of an embodiment of a method in accordance with the present disclosure;

FIG. 64X is a schematic block diagram of an embodiment of an artifact detection function and artifact compensation function in accordance with the present disclosure;

FIG. 64Y is a flow diagram of an embodiment of a method in accordance with the present disclosure;

FIG. 64Z is a schematic block diagram of an embodiment of an artifact detection function and artifact compensation function in accordance with the present disclosure;

FIG. 64AA is a schematic block diagram of an embodiment of a condition detection function in accordance with the present disclosure;

FIG. 64AB is a pictorial diagram of an embodiment of electrodes of a touch screen display in accordance with the present disclosure;

FIG. 64AC is a pictorial diagram of an embodiment of a surface of a touch screen display in accordance with the present disclosure;

FIG. 64AD is a graphical diagram of an embodiment of capacitance image data in accordance with the present disclosure;

FIG. 64AE is a graphical diagram of a detected hover region in accordance with the present disclosure;

FIG. 64AF is a graphical diagram of an embodiment of capacitance image data in accordance with the present disclosure;

FIG. 64AG is a pictorial diagram of an embodiment of a surface of a touch screen display in accordance with the present disclosure;

FIG. 64AH is a graphical diagram of an embodiment of capacitance image data in accordance with the present disclosure;

FIG. 64AI is a graphical diagram of a detected hover region in accordance with the present disclosure;

FIG. 64AJ is a graphical diagram of an embodiment of capacitance image data in accordance with the present disclosure;

FIG. 64AK is a flow diagram of an embodiment of a method in accordance with the present disclosure;

FIG. 64AL is a schematic block diagram of an embodiment of a touchless indication determination function in accordance with the present disclosure;

FIG. 64AM is an illustration of graphical image data displayed by a touch screen in accordance with the present disclosure;

FIG. 64AN is a flow diagram of an embodiment of a method in accordance with the present disclosure;

FIG. 64AO is a schematic block diagram of an embodiment of an anatomical feature mapping data generator function in accordance with the present disclosure;

FIG. 64AP is an illustration of anatomical feature mapping data in accordance with the present disclosure;

FIG. 64AQ is a flow diagram of an embodiment of a method in accordance with the present disclosure;

FIG. 64AR is a schematic block diagram of an embodiment of a touchless indication point identification function in accordance with the present disclosure;

FIGS. 64AS-64AX are illustrations of example embodiments of touchless indication points in accordance with the present disclosure;

FIG. 64AY is a flow diagram of an embodiment of a method in accordance with the present disclosure;

FIG. 64AZ is a schematic block diagram of an embodiment of an initial touchless indication detection function and a maintained touchless indication detection function in accordance with the present disclosure;

FIG. 64BA is a flow diagram of an embodiment of a method in accordance with the present disclosure;

FIG. 64BB is a schematic block diagram of an embodiment of a touchless gesture detection function in accordance with the present disclosure;

FIG. 64BC is an illustration of an example touchless gesture in accordance with the present disclosure;

FIG. 64BD is a flow diagram of an embodiment of a method in accordance with the present disclosure;

FIG. 64BE is a schematic block diagram of an embodiment of a touch-based indication detection function and a touchless indication detection function in accordance with the present disclosure;

FIG. 64BF is a flow diagram of an embodiment of a method in accordance with the present disclosure;

DETAILED DESCRIPTION OF THE INVENTION

Figure 1:
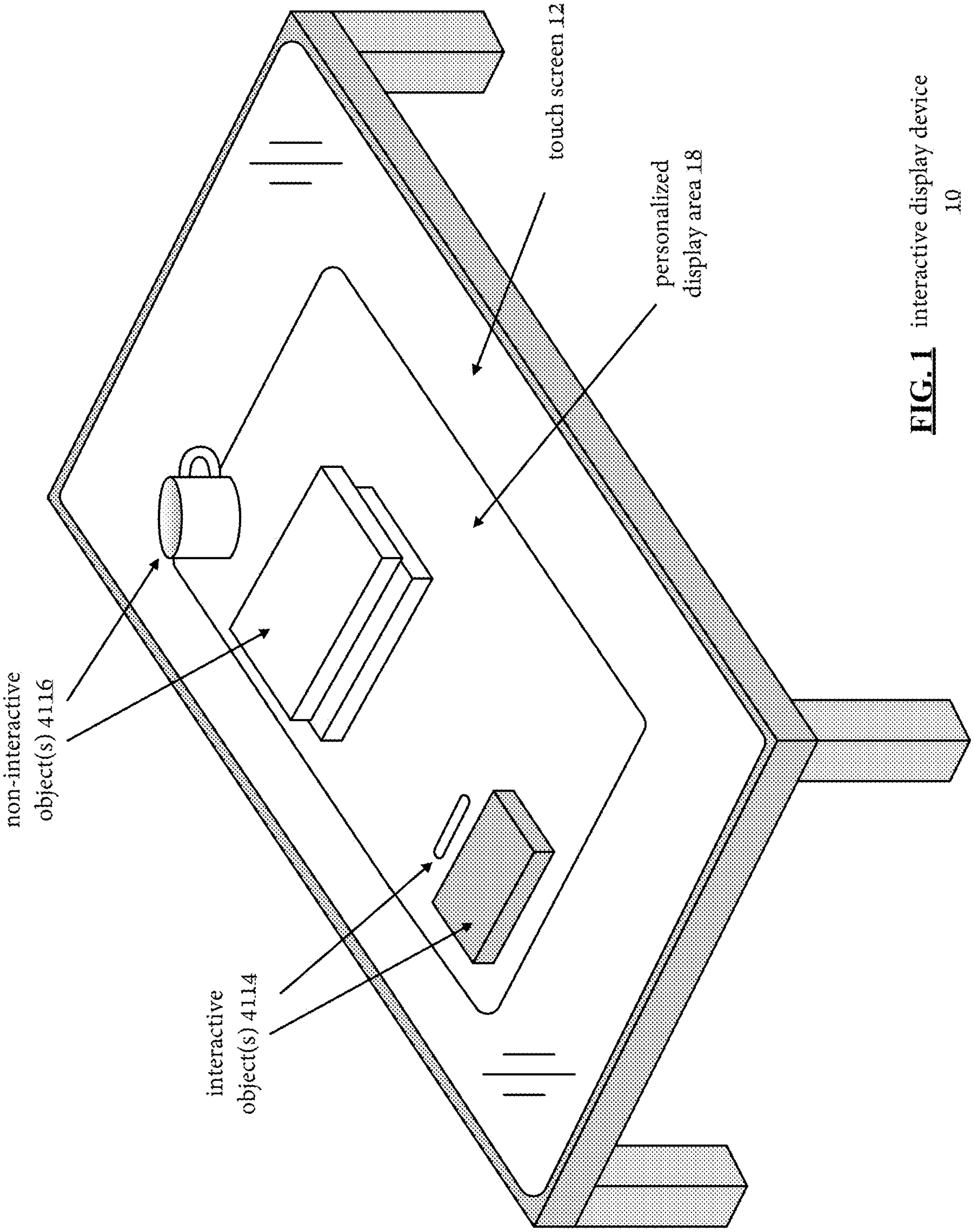
FIG. 1 is a schematic block diagram of an embodiment of an interactive display device in accordance with the present disclosure.

FIG. 1 is a schematic block diagram of an embodiment of an interactive display device 10 having a touch screen 12, which may further include a personalized display area 18 to form an interactive touch screen display (also referred to herein as an interactive surface). Personalized display area 18 may extend to all of touch screen 12 or a portion as shown. Further, touch screen 12 may include multiple personalized display areas 18 (e.g., for multiple users, functions, etc.). The interactive display device 10, which will be discussed in greater detail with reference to one or more of FIGS. 2-3, may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core.

A fixed computing device may be a computer (PC), an interactive white board, an interactive table top, an interactive desktop, an interactive display, a computer server, a cable set-top box, vending machine, an Automated Teller Machine (ATM), an automobile, a satellite receiver, a television set, a printer, a fax machine, home entertainment equipment, a video game console, and/or any type of home or office computing equipment. An interactive display functions to provide users with an interactive experience (e.g., touch the screen to obtain information, be entertained, etc.). For example, a store provides interactive displays for customers to find certain products, to obtain coupons, to enter contests, etc.

Here, the interactive display device 10 is implemented as an interactive table top. An interactive table top is an interactive display device 10 that has a touch screen display for interaction with users but also functions as a usable table top surface. For example, the interactive display device 10 may include one or more of a coffee table, a dining table, a bar, a desk, a conference table, an end table, a night stand, a cocktail table, a podium, and a product display table.

As an interactive table top, the interactive display device 10 has interactive functionality and well as non-interactive functionality. For example, interactive objects 4114 (e.g., a finger, a user input passive device, a user input active device, a pen, tagged objects, etc.) interact with the touch screen 12 to communicate data with interactive display device 10. A user input passive device for interaction with the interactive display device 10 will be discussed in greater detail with reference to one or more of FIGS. 5-32.

Additionally, non-interactive objects 4116 (e.g., a coffee mug, books, magazines, a briefcase, an elbow, etc.) may also be placed on the interactive display device 10 that are not intended to communicate data with the interactive display device 10. The interactive display device 10 is able to recognize objects, distinguish between interactive and non-interactive objects, and adjust the personalized display area 18 accordingly. For example, if a coffee mug is placed in the center of the personalized display area 18, the interactive display device 10 recognizes the object, recognizes that it is a non-interactive object 4116 and shifts the personalized display over such that the coffee mug is no longer obstructed the user's view of the personalized display area 18. Detecting objects on the interactive display device 10 and adjusting personalized displays accordingly will be discussed in greater detail with reference to one or more of FIGS. 36-44.

Further, the interactive display device 10 supports interactions from multiple users having differing orientations around the table top. For example, the interactive display device 10 is a dining table where each user's presence around the table triggers personalized display areas 18 with correct orientation (e.g., a sinusoidal signal is generated when a user sits in a chair at the table and the signal is communicated to the interactive display device 10, the user is using/wearing a unique device having a particular frequency detected by the interactive display device 10, etc.). As another example, the use of a game piece triggers initiation of a game and the correct personalized display areas 18 are generated in accordance with the game (e.g., detection of an air hockey puck and/or striker segments the display area into a player 1 display zone and a player 2 display zone). Generation of personalized display areas 18 will be discussed in greater detail with reference to one or more of FIGS. 45-48.

Figure 2:
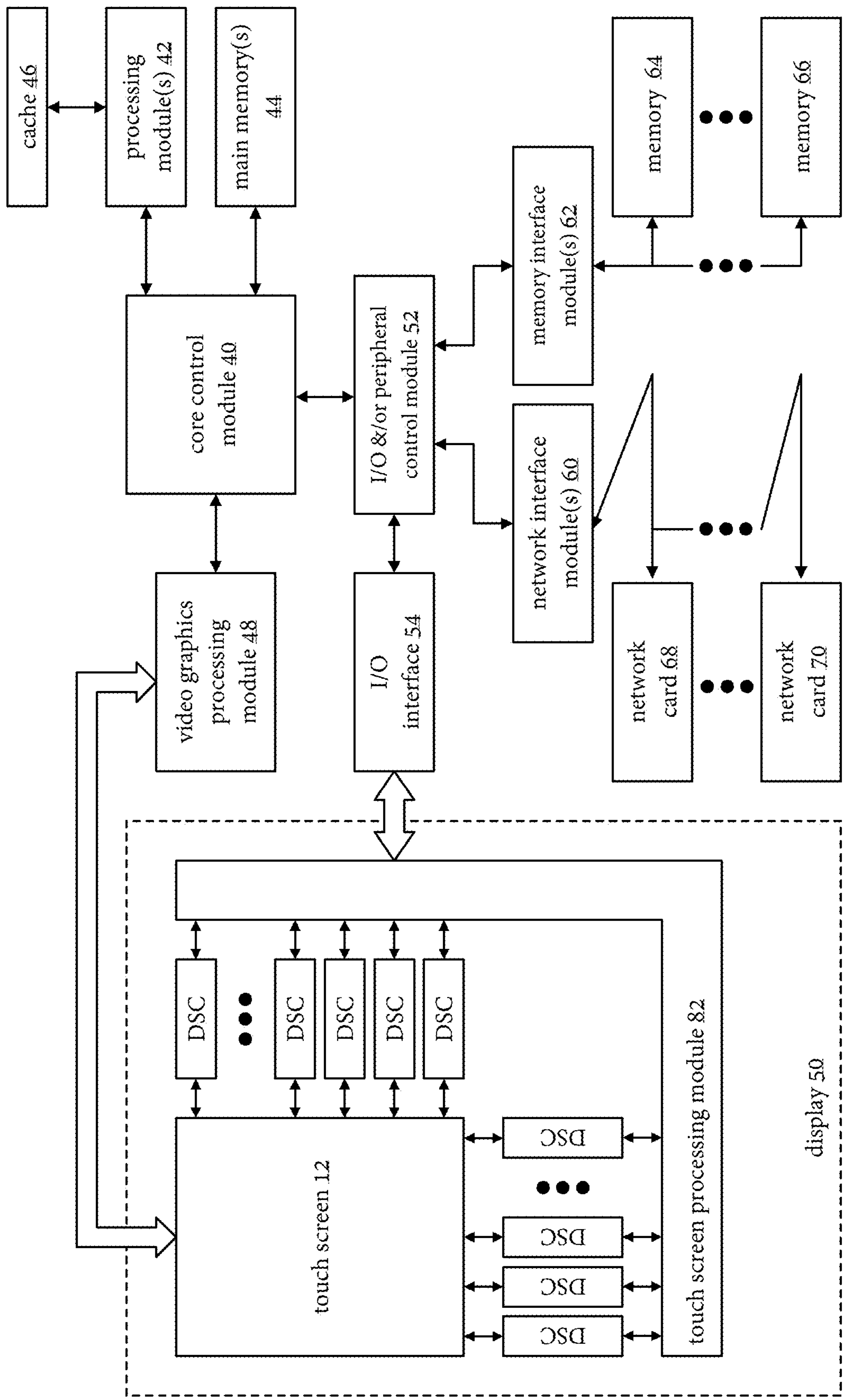
FIG. 2 is a schematic block diagram of an embodiment of the interactive display device in accordance with the present disclosure.

FIG. 2 is a schematic block diagram of an embodiment of an interactive display device 10 that includes a core control module 40, one or more processing modules 42, one or more main memories 44, cache memory 46, a video graphics processing module 48, a display 50, an Input-Output (I/O) peripheral control module 52, one or more input interface modules, one or more output interface modules, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and a network, or networks, via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) via the input interface module(s) and the I/O and/or peripheral control module 52. An input device includes a keypad, a keyboard, control switches, a touchpad, a microphone, a camera, etc. An input interface module includes a software driver and a hardware connector for coupling an input device to the I/O and/or peripheral control module 52. In an embodiment, an input interface module is in accordance with one or more Universal Serial Bus (USB) protocols.

The core control module 40 coordinates data communications between the processing module(s) 42 and output device(s) via the output interface module(s) and the I/O and/or peripheral control module 52. An output device includes a speaker, etc. An output interface module includes a software driver and a hardware connector for coupling an output device to the I/O and/or peripheral control module 52. In an embodiment, an output interface module is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect thx quality of the display. The video graphics processing module 48 receives data from the processing module 42, processes the data to produce rendered data in accordance with the characteristics of the display, and provides thx rendered data to the display 50.

The display 50 includes the touch screen 12 (e.g., and personalized display area 18), a plurality of drive-sense circuits (DSC), and a touch screen processing module 82. The touch screen 12 includes a plurality of sensors (e.g., electrodes, capacitor sensing cells, capacitor sensors, inductive sensor, etc.) to detect a proximal touch of the screen. For example, when a finger or pen touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 3:
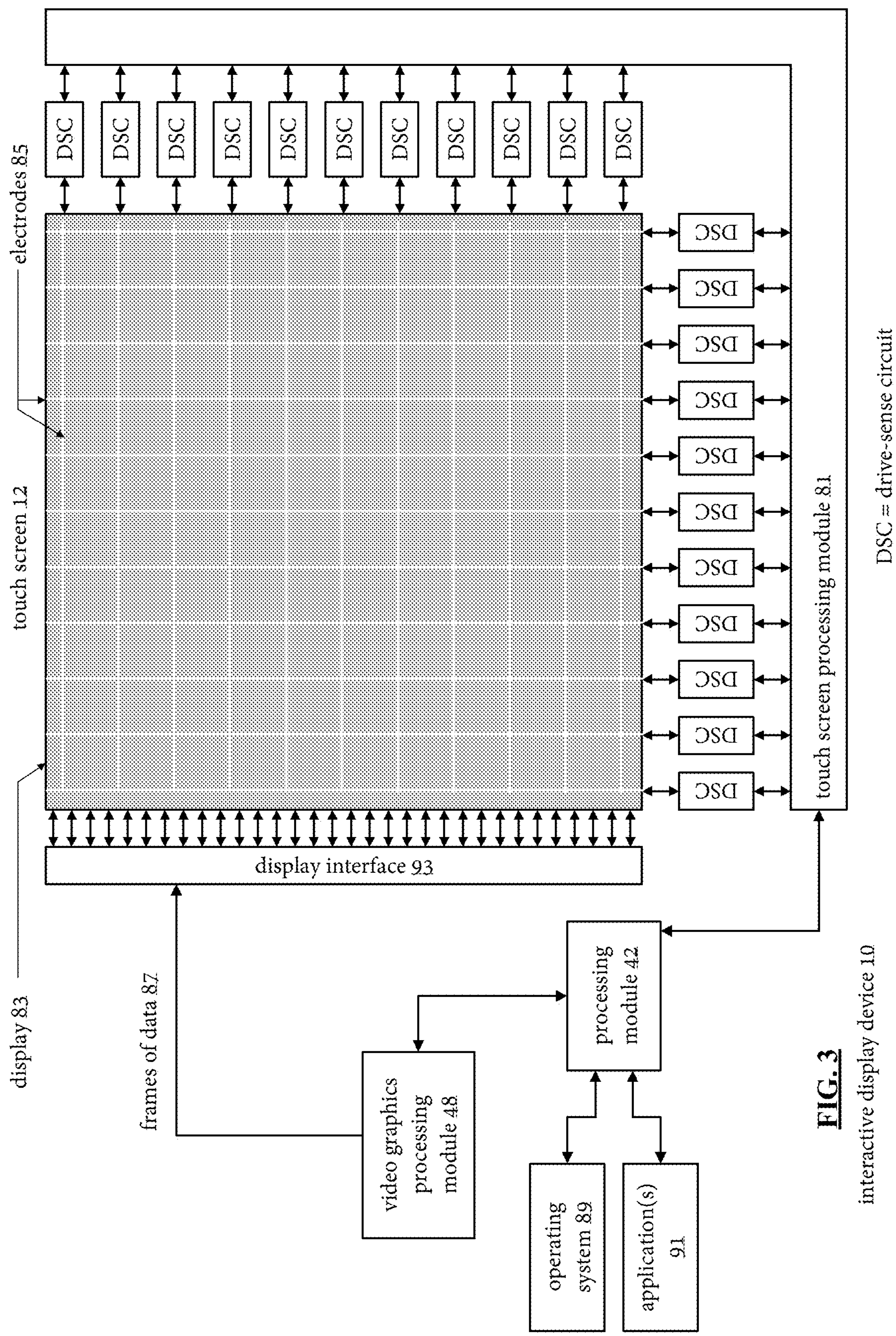
FIG. 3 is a schematic block diagram of another embodiment of the interactive display device in accordance with the present disclosure.

FIG. 3 is a schematic block diagram of another embodiment of an interactive display device 10 that includes the touch screen 12, the drive-sense circuits (DSC), the touch screen processing module 81, a display 83, electrodes 585, the processing module 42, the video graphics processing module 48, and a display interface 93. The display 83 may be a small screen display (e.g., for portable computing devices) or a large screen display (e.g., for fixed computing devices). In general, a large screen display has a resolution equal to or greater than full high-definition (HI)), an aspect ratio of a set of aspect ratios, and a screen size equal to or greater than thirty-two inches. The following table lists various combinations of resolution, aspect ratio and screen size for the display 83, but it is not an exhaustive list.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280- >=7680 | 720- >=4320 | 1:1, 2:3, etc. | 2:3 | 50, 55, 60, 65, 70, 75, &/or >80 |

The display 83 is one of a variety of types of displays that is operable to render frames of data 57 into visible images. For example, the display is one or more of: a light emitting diode (LED)) display, an electroluminescent display (ELD), a plasma display panel (PDP), a liquid crystal display (LCD), an LCD high performance addressing (HPA) display, an LCD thin film transistor (TFI) display, an organic light emitting diode (OLED)) display, a digital light processing (DLP) display, a surface conductive electron emitter (SEI)) display, a field emission display (FED)), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The touch screen 12 includes integrated electrodes 85 that provide the sensors the touch sense part of the touch screen display. The electrodes 85 are distributed throughout the display area or where touch screen functionality is desired. For example, a first group of the electrodes are arranged in rows and a second group of electrodes are arranged in columns.

The electrodes 855 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, a gaming application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of data 87 to the display 83, which renders the frames of data 87 into visible images.

While the display 83 is rendering the frames of data 87 into visible images, the drive-sense circuits (DSC) provide sensor signals to the electrodes 85. When the screen is touched by a pen or device, signals on the electrodes 85 proximal to the touch (i.e., directly or close by) are changed. The DSCs detect the change for effected electrodes and provide the detected change to the touch screen processing module 81.

The touch screen processing module 81 processes the change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

If the signals received from a device include embedded data, the touch screen processing module 81 interprets the embedded data and provides the resulting information to the processing module 42. If, interactive display device 10 is not equipped to process embedded data, the device still communicates with the interactive display device 10 using the change to the signals on the effected electrodes (e.g., increase magnitude, decrease magnitude, phase shift, etc.).

Figure 4A:
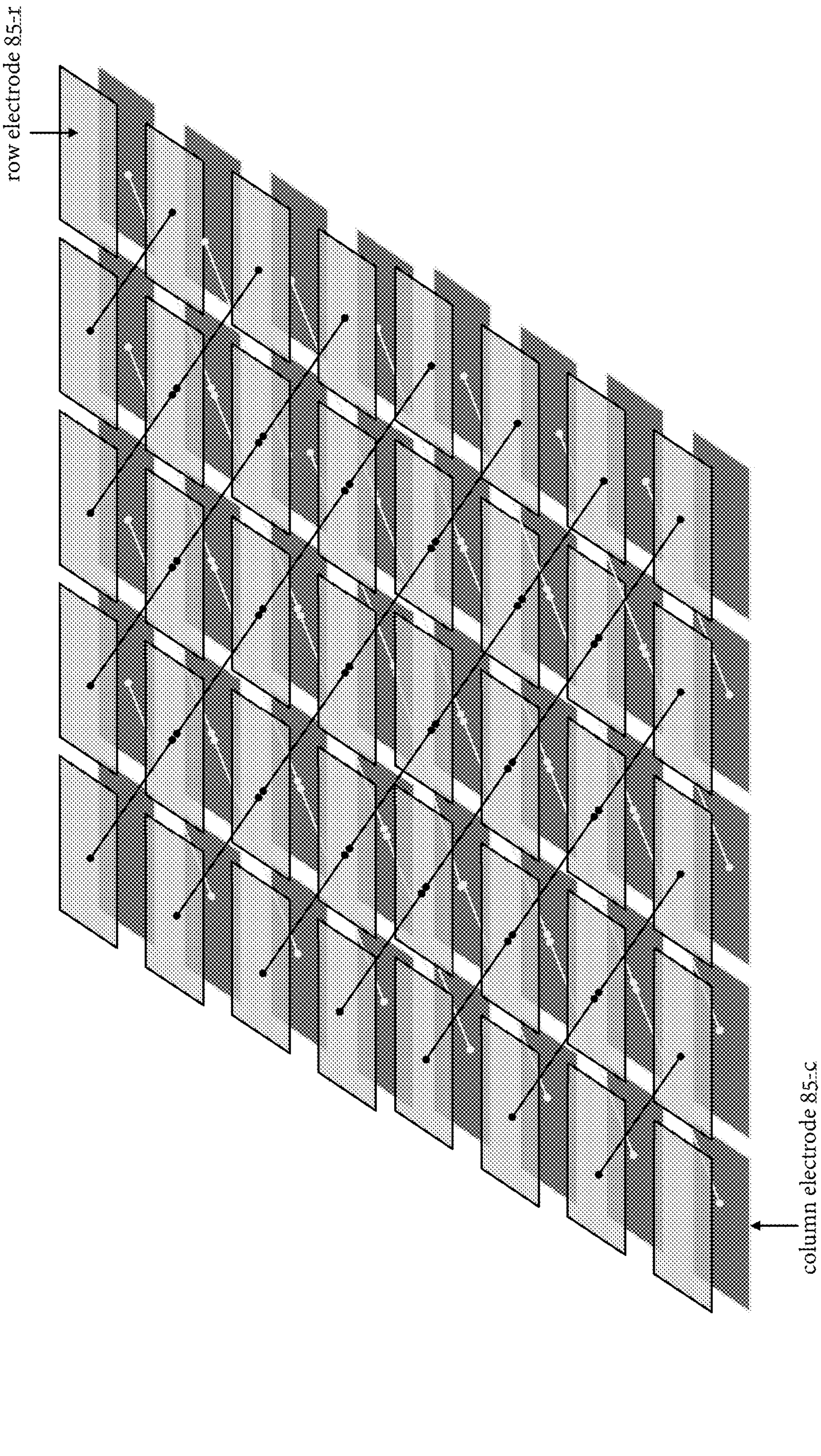
FIGS. 4A-4B are schematic block diagrams of embodiments of a touch screen electrode pattern in accordance with the present disclosure.
Figure 4B:
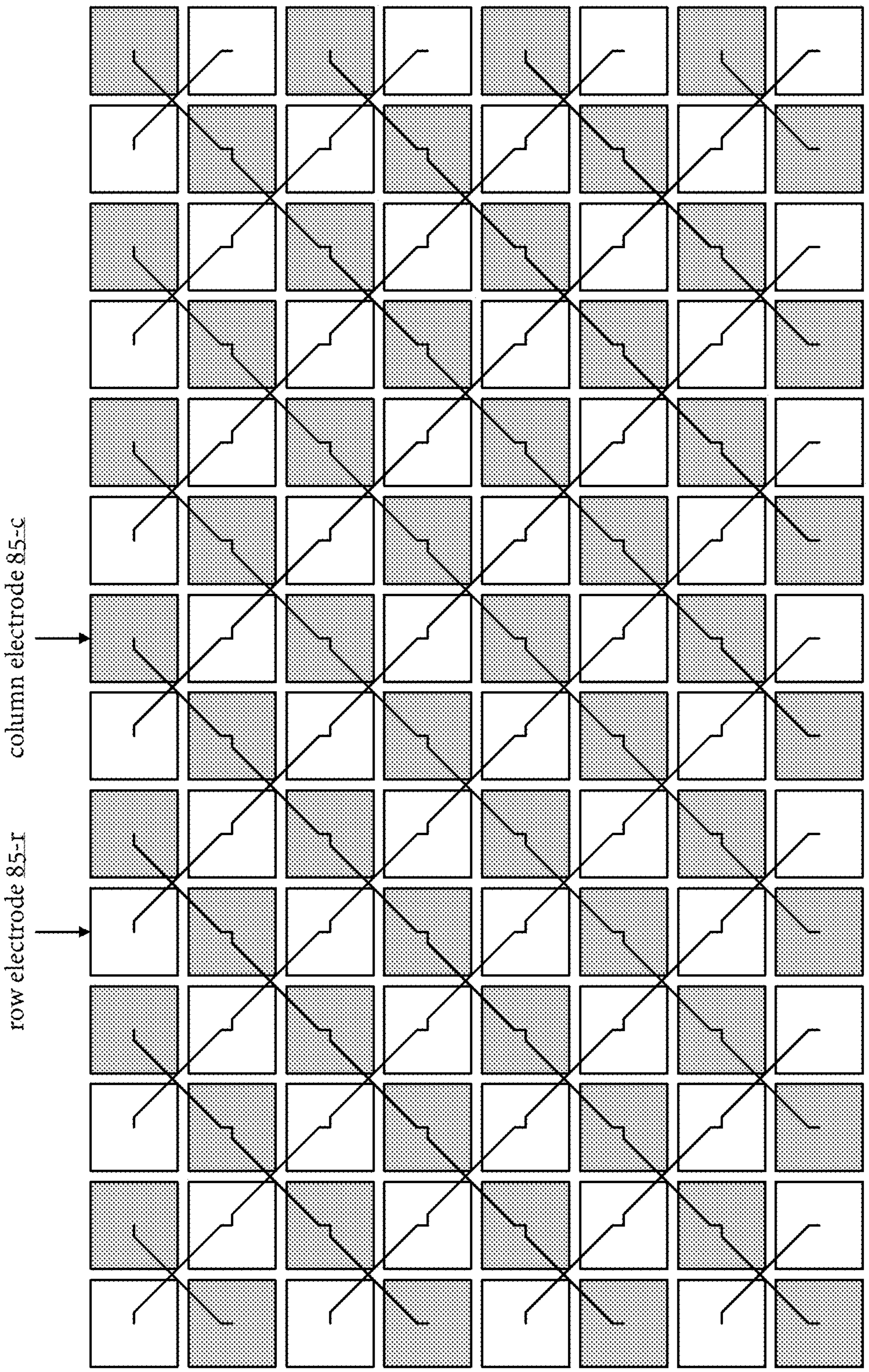

FIGS. 4A-4B are schematic block diagrams of embodiments of a touch screen electrode pattern that includes rows of electrodes 85-*r* and columns of electrodes 85-*c*. Each row of electrodes 85-*r* and each column of electrodes 85-*c* includes a plurality of individual conductive cells (e.g., capacitive sense plates) (e.g., light gray squares for rows, dark gray squares for columns) that are electrically coupled together. The size of a cell depends on the desired resolution of touch sensing. For example, a cell size may be 1 millimeter by 1 millimeter to 5 millimeters by 5 millimeters to provide adequate touch sensing for cell phones and tablets. Making the cells smaller improves touch resolution and will typically reduce touch sensor errors (e.g., touching a "w" by an "e" is displayed). While the cells are shown to be square, they may be of any polygonal shape, diamond, or circular shape.

The cells for the rows and columns may be on the same layer or on different layers. In FIG. 4A, the cells for the rows and columns are shown on different layers. In FIG. 4B, the cells for the rows and columns are shown on the same layer. The electric coupling between the cells is done using vias and running traces (e.g., wire traces) on another layer. Note that the cells are on one or more ITO layers of a touch screen, which includes a touch screen display.

Figure 5:
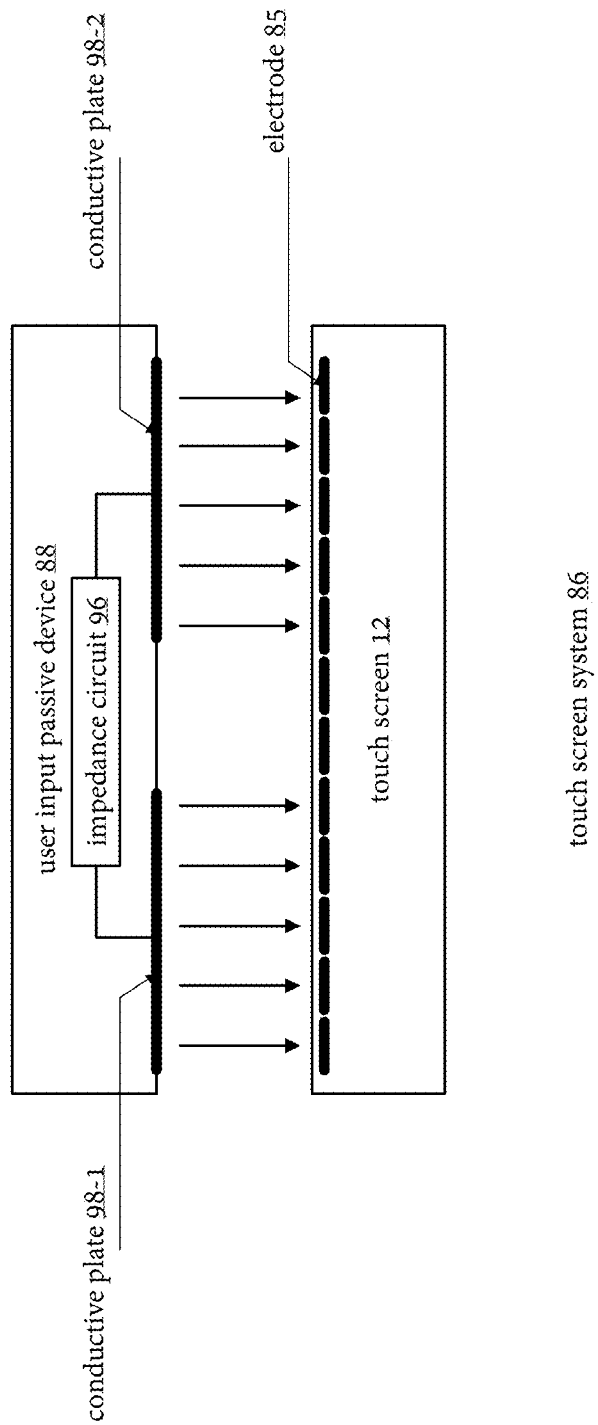
FIG. 5 is a schematic block diagram of an embodiment of a touch screen system in accordance with the present disclosure.

FIG. 5 is a schematic block diagram of an embodiment of a touch screen system 86 that includes a user input passive device 88 in close proximity to a touch screen 12 (e.g., interactive surface of the interactive display device 10). FIG. 5 depicts a front, cross sectional view of the user input passive device 88 (also referred to herein as the passive device 88) that includes conductive plates 98-1 and 98-2 coupled to an impedance circuit 96. The user input passive device 88 may include a plurality of conductive (i.e., electrically conductive) plates and impedance circuits.

The impedance circuit 96 and the conductive plates 98-1 and 98-2 cause an impedance and/or frequency effect on electrodes 85 when in close proximity to an interactive surface of the touch screen 12 (e.g., the passive device 88 is close to or in direct contact with the touch screen 12) that is detectable by the touch screen 12. As an alternative, conductive plates 98-1 and 98-2 may be a dielectric material. Dielectric materials generally increase mutual capacitance whereas conductive materials typically decrease mutual capacitance. The touch screen is operable to detect either or both effect. The user input passive device 88 will be discussed in greater detail with reference to one or more of FIGS. 6-25.

Figure 6A:
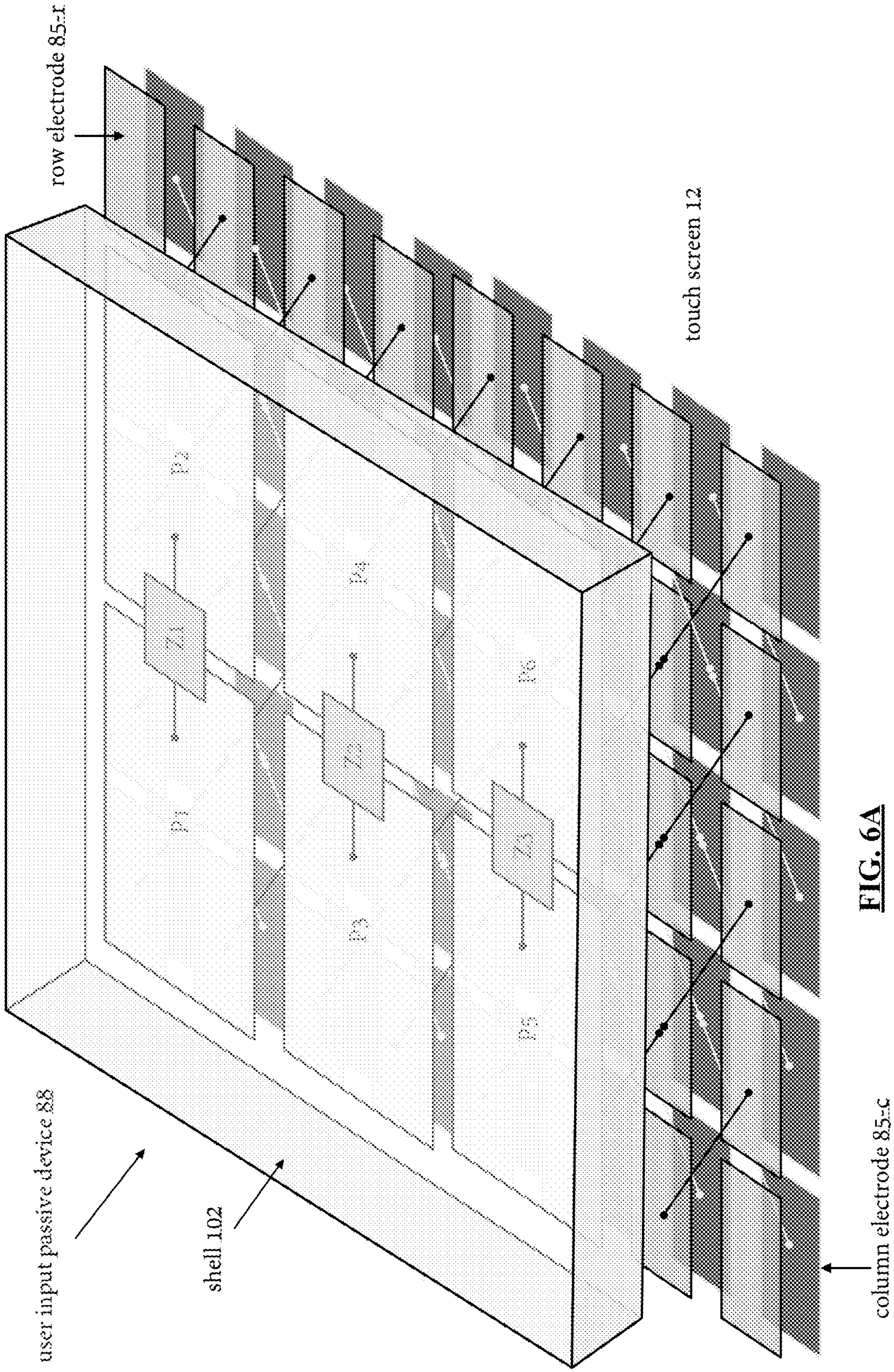
FIGS. 6A-6B are schematic block diagrams of embodiments of a touch screen system in accordance with the present disclosure.
Figure 6B:
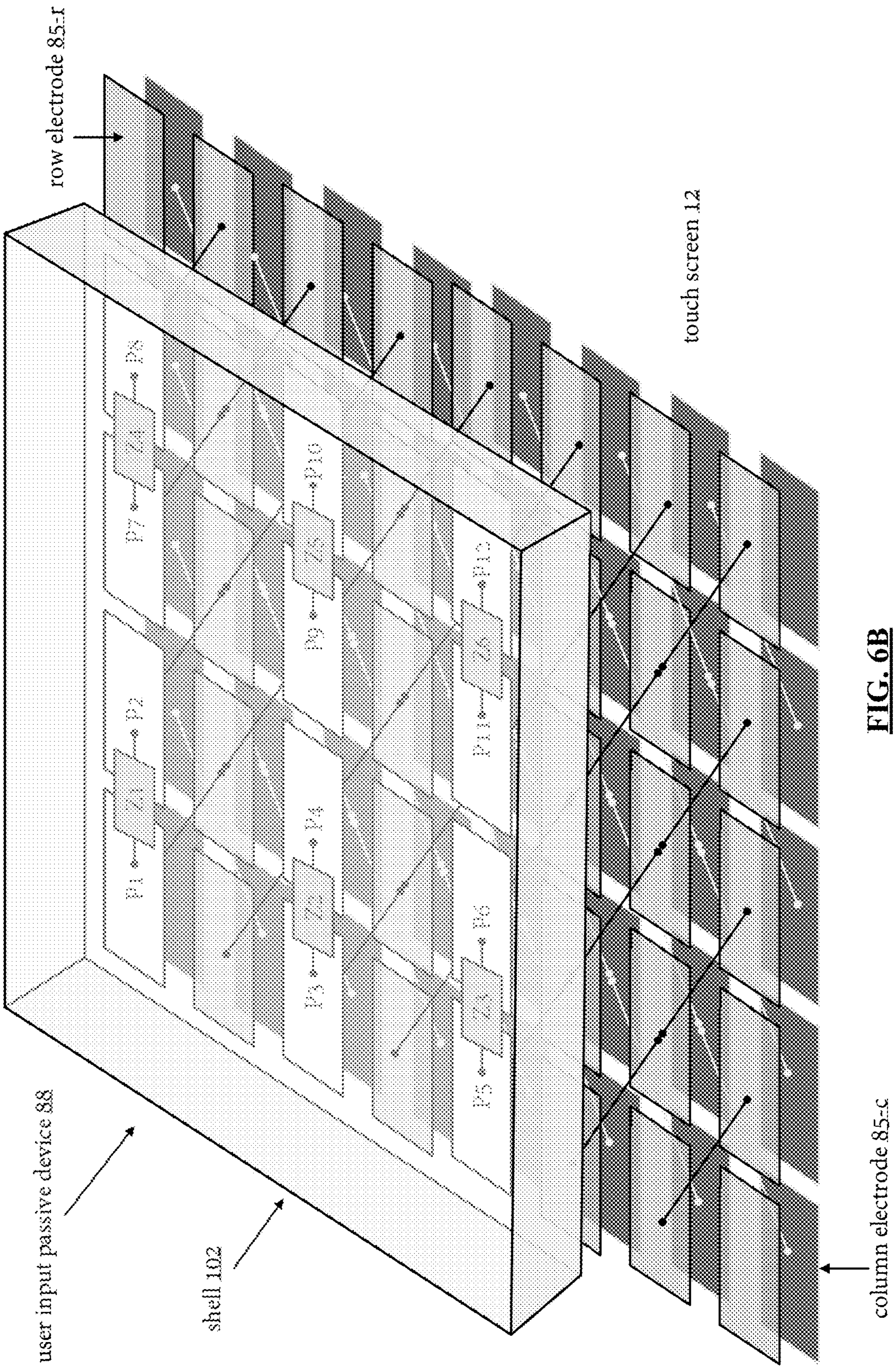

FIGS. 6A-6B are schematic block diagrams of embodiments of a touch screen system 86 that include a simplified depiction of the touch screen 12 as a touch screen electrode pattern that includes rows of electrodes 85-*r* and columns of electrodes 85-*c* and a simplified depiction of the user input passive device 88 with a transparent housing for ease of viewing the bottom surface.

The row electrodes 85-*r* (light gray squares) and the column electrodes 85-*c* (dark gray squares) of the touch screen 12 are on different layers (e.g., the rows are layered above the columns). A mutual capacitance is created between a row electrode and a column electrode.

The user input passive device 88 includes a housing that includes a shell 102 (e.g., conductive, non-conductive, dielectric, etc.), a non-conductive supporting surface (not shown), a plurality of impedance circuits, and a plurality of conductive plates. The plurality of conductive plates are mounted on the non-conductive supporting surface such that the shell 102 and the plurality of conductive plates are electrically isolated from each other and able to affect the touch screen 12 surface. The impedance circuits and the conductive plates that may be arranged in a variety of patterns (e.g., equally spaced, staggered, diagonal, etc.). The size of the conductive plates varies depending on the size of the electrode cells and the desired impedance and/or frequency change to be detected.

One or more of the plurality of impedance circuits and plurality of conductive plates cause an impedance and/or frequency effect when the user input passive device 88 is in close proximity to an interactive surface of the touch screen 12 (e.g., the passive device 88 is resting on or near the touch screen 12). The impedance and/or frequency effects detected by the touch screen 12 are interpreted as device identification, orientation, one or more user functions, one or more user instructions, etc.

In FIG. 6A, the user input passive device 88 includes impedance circuits Z1-Z3 and conductive plates P1-P6. Each of the conductive plates P1-P6 are larger than each electrode of the touch screen 12 in order to affect multiple touch screen electrodes per plate. For example, a conductive plate may be 2-10 times larger than an electrode. In this example, the conductive plates are shown having approximately four times the area of an electrode (e.g., an electrode is approximately 5 millimeters by 5 millimeters and a conductive plate is approximately 10 millimeters by 10 millimeters). With multiple electrodes affected per plate, the impedance and/or frequency effect caused by a particular plate can be better identified by the touch screen 12.

In FIG. 6B, the user input passive device 88 includes impedance circuits Z1-Z6 and conductive plates P1-P12. In the example of FIG. 6B, each conductive plate is approximately the same size as an electrode. Each conductive plate may be the same size as an electrode or smaller than an electrode. While less electrodes are affected per plate than in the example of FIG. 6A, multiple electrodes are affected (e.g., relative impedance changes and/or direct impedance changes) in a particular pattern recognizable to the touch screen 12. The user input passive device 88 will be discussed in greater detail with reference to one or more of FIGS. 7A-25.

Figure 7A:
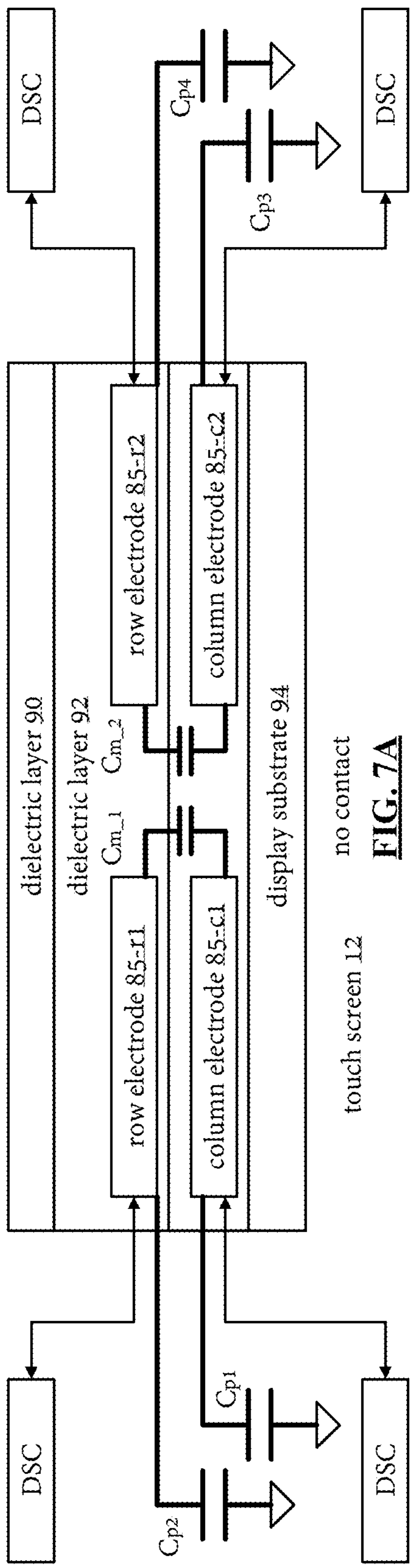
FIGS. 7A-7B are schematic block diagrams of examples of capacitance of a touch screen with no contact with a user passive device in accordance with the present disclosure.
Figure 7B:
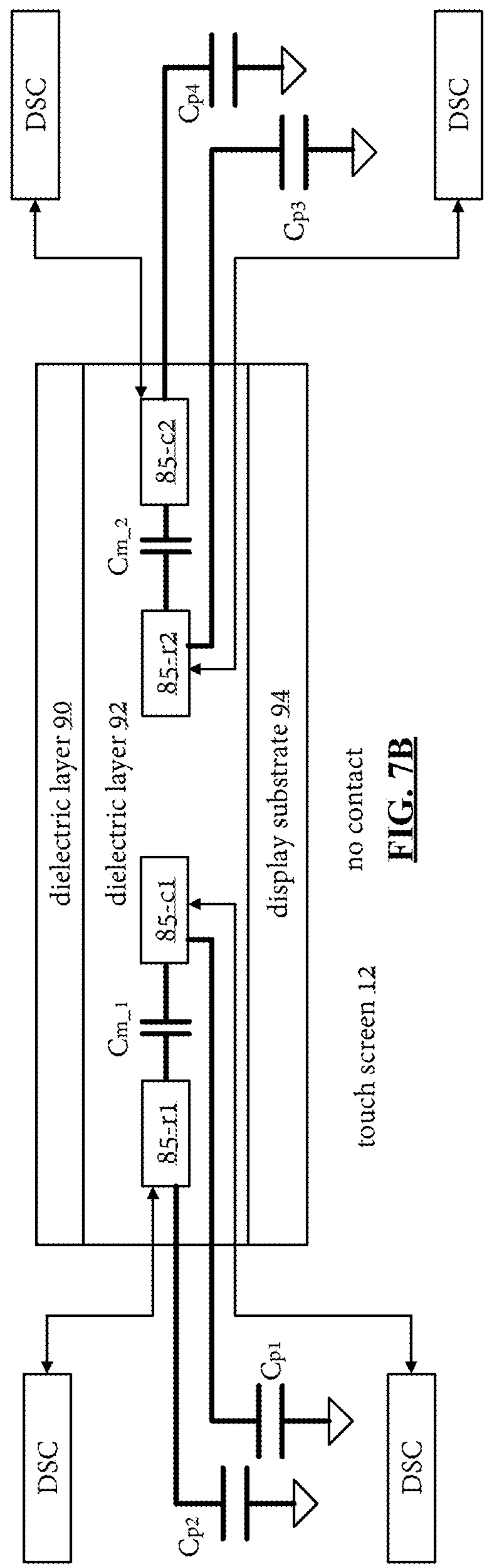

FIGS. 7A-7B are cross section schematic block diagrams of examples of capacitance of a touch screen 12 with no contact with a user input passive device 98. The electrode 85*s* are positioned proximal to dielectric layer 92, which is between a cover dielectric layer 90 and the display substrate 94. In FIG. 7A, the row electrodes 85-*r*1 and 85-*r*2 are on a layer above the column electrodes 85-*c*1 and 85-*c*2. In FIG. 7B, the row electrodes 85-*r* and the column electrodes 85-*c* are on the same layer. Each electrode 85 has a self-capacitance, which corresponds to a parasitic capacitance created by the electrode with respect to other conductors in the display (e.g., ground, conductive layer(s), and/or one or more other electrodes).

For example, row electrode 85-*r*1 has a parasitic capacitance $C_{p2}$, column electrode 85-*c*1 has a parasitic capacitance $C_{p1}$, row electrode 85-*r*2 has a parasitic capacitance $C_{p4}$, and column electrode 85-*c*2 has a parasitic capacitance $C_{p3}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic self-capacitance.

As shown, the touch screen 12 includes a plurality of layers 90-94. Each illustrated layer may itself include one or more layers. For example, dielectric layer 90 includes a surface protective film, a glass protective film, and/or one or more pressure sensitive adhesive (PSA) layers. As another example, the second dielectric layer 92 includes a glass cover, a polyester (PET) film, a support plate (glass or plastic) to support, or embed, one or more of the electrodes **85-*c*1, 85-*c*2, 85-*r*1, and 85-*r*2 (e.g., where the column and row electrodes are on different layers), a base plate (glass, plastic, or PET), an ITO layer, and one or more PSA layers. As yet another example, the display substrate 94** includes one or more LCD layers, a back-light layer, one or more reflector layers, one or more polarizing layers, and/or one or more PSA layers.

A mutual capacitance (Cm_1 and Cm_2) exists between a row electrode and a column electrode. When no touch and/or device is present, the self-capacitances and mutual capacitances of the touch screen 12 are at a nominal state. Depending on the length, width, and thickness of the electrodes, separation from the electrodes and other conductive surfaces, and dielectric properties of the layers, the self-capacitances and mutual capacitances can range from a few pico-Farads to 10's of nano-Farads.

Touch screen 12 includes a plurality of drive sense circuits (DSCs). The DSCs are coupled to the electrodes and detect changes for affected electrodes. The DSC functions as described in co-pending patent application entitled, "DRIVE SENSE CIRCUIT WITH DRIVE-SENSE LINE", having a serial number of Ser. No. 16/113,379, and a filing date of Aug. 27, 2018.

Figure 8:
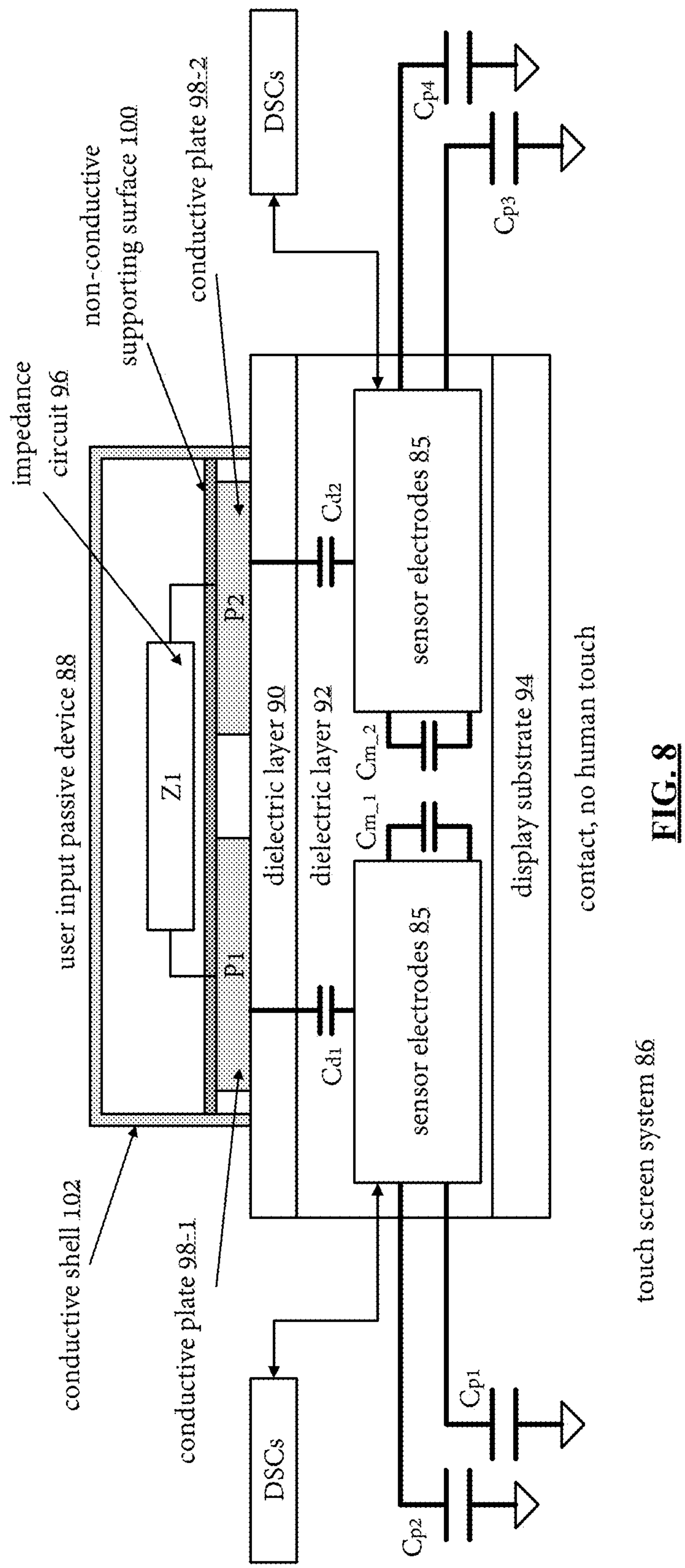
FIG. 8 is a schematic block diagram of an example of capacitance of a touch screen system in accordance with the present disclosure.

FIG. 8 is a schematic block diagram of an example of capacitance of a touch screen system 86 that includes the touch screen 12 and a user input passive device 88 in contact with the touch screen 12. In this example, the user input passive device 88 is in contact (or within a close proximity) with an interactive surface of the touch screen 12 but there is no human touch on the user input passive device 98.

The user input passive device 88 includes impedance circuit 96, conductive plates 98-1 and 98-2, a non-conductive supporting surface 100, and a conductive shell 102. The conductive shell 102 and non-conductive supporting surface shell 100 together form a housing for the user input passive device 98. The housing has an outer shape corresponding to at least one of: a computing mouse, a game piece, a cup, a utensil, a plate, and a coaster. The conductive shell 102 may alternatively be a non-conductive or dielectric shell. When the shell 102 is non-conductive, a human touch does not provide a path to ground and does not affect both self-capacitance and mutual capacitance of the sensor electrodes 85. In that example, only mutual capacitance changes from the conductive plates are detected by touch screen 12 when the user input passive device 88 is in close proximity to the touch screen 12 surface. Because additional functionality exists when the shell is conductive, the shell 102 is referred to as conductive shell 102 in the remainder of the examples.

The conductive plates 98-1 and 98-2 and the conductive shell 102 are in contact with the touch screen 12's interactive surface. The non-conductive supporting surface 100 electrically isolates the conductive shell 102, the conductive plate 98-1, and the conductive plate 98-2. The impedance circuit 96 connects the conductive plate 98-1 and the conductive plate 98-2 and has a desired impedance at a desired frequency. The impedance circuit 96 is discussed with more detail with reference to FIGS. 15A-15F.

The user input passive device 88 is capacitively coupled to one or more sensor electrodes 85 proximal to the contact. The sensor electrodes 85 may be on the same or different layers as discussed with reference to FIGS. 7A-7B. Because the conductive plates 98-1 and 98-2 and the conductive shell 102 are electrically isolated, when a person touches the conductive shell 102 of the passive device 98, the person provides a path to ground such that the conductive shell 102 affects both the mutual capacitance and the self-capacitance.

When the passive device 88 is not touched by a person (as shown here), there is no path to ground and the conductive shell 102 only affects the mutual capacitance. The conductive plates 98-1 and 98-2 do not have a path to ground regardless of a touch and thus only affect mutual capacitance when the passive device is touched or untouched. Because the contact area of the conductive plates 98-1 and 98-2 is much larger than the conductive shell 102, the mutual capacitance change(s) detected is primarily due to the conductive plates 98-1 and 98-2 and the effect of the impedance circuit 96 not the conductive shell 102.

As an example, when the user input passive device 88 is resting on the touch screen 12 with no human touch, the user input passive device 88 is capacitively coupled to the touch screen 12 of the touch screen system 86 via capacitance Cd1 and Cd2 (e.g., where Cd1 and Cd2 are with respect to a row and/or a column electrode). Depending on the area of the conductive plates 98-1 and 98-2, the effect of the impedance circuit 96, and the dielectric layers 90-92, the capacitance of Cd1 or Cd2 is in the range of 1 to 2 pico-Farads. The values of Cd1 and Cd2 affect mutual capacitances Cm_1 and Cm_2. For example, Cd1 and Cd2 may raise or lower the value of Cm_1 and Cm_2 by approximately 1 pico-Farad. Examples of the mutual capacitance changes caused by the passive device 88 will be discussed in more detail with reference to FIGS. 16A-25.

In this cross-sectional view, two conductive plates and one impedance circuit are shown. However, the passive device 88 may include multiple sets of conductive plates where each set is connected by an impedance circuit. The various sets of conductive plates can have different impedance effects on the electrodes of the touch screen which can correspond to different information and/or passive device functions.

Drive-sense circuits (DSC) are operable to detect the changes in mutual capacitance and/or other changes to the electrodes and interpret their meaning. For example, by detecting changes in mutual capacitance and/or by detecting characteristics of the impedance circuit 96 (e.g., a sweep for resonant frequency of an impedance circuit 96), the DSCs of the touch screen 12 determines the presence, identification (e.g., of a particular user), and/or orientation of the user input passive device 88.

Figure 9:
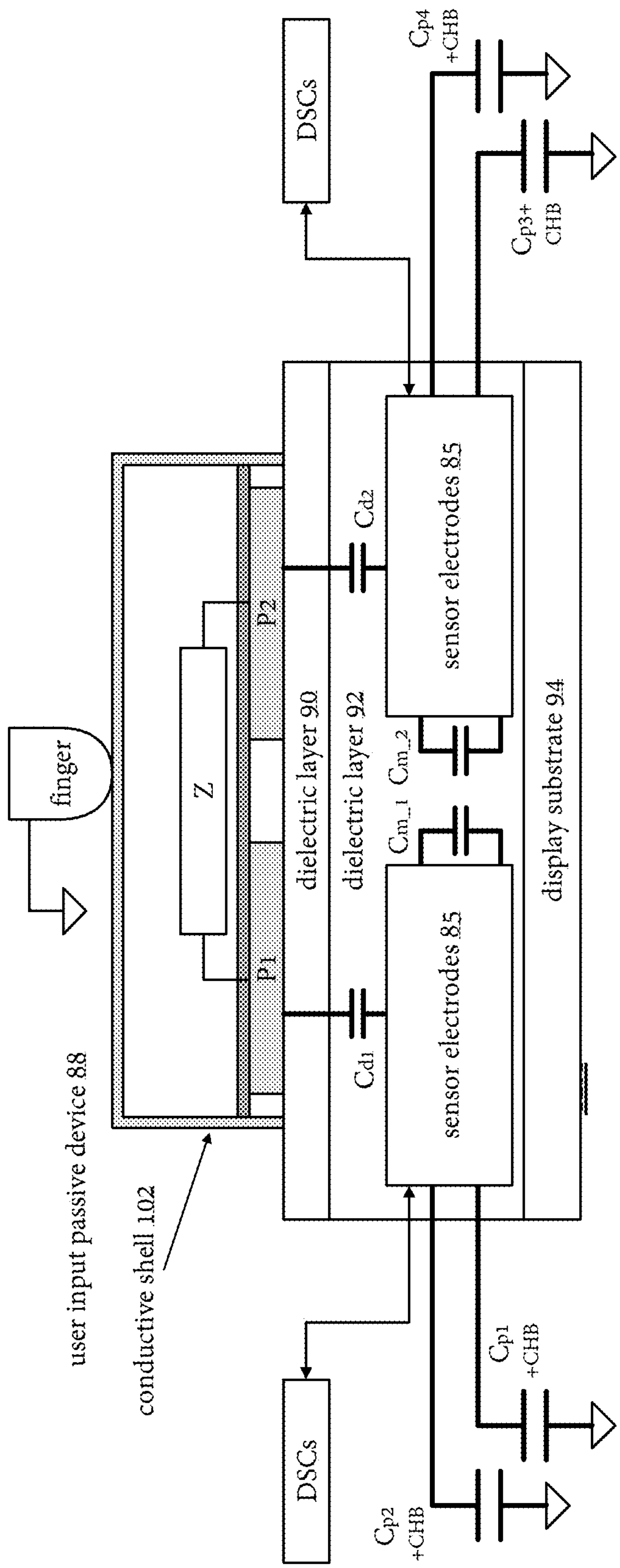
FIG. 9 is a schematic block diagram of another example of capacitance of the touch screen system in accordance with the present disclosure.

FIG. 9 is a schematic block diagram of another example of capacitance of a touch screen system 86 that includes the touch screen 12 and a user input passive device 88 in contact with the touch screen 12. In this example, the user input passive device 88 is in contact (or within a close proximity) with the touch screen 12 and there is a human touch on the conductive shell 102 of the user input passive device 88. When a person touches the conductive shell 102 of the passive device 88, the person provides a path to ground such that the conductive shell 102 affects both the mutual capacitance and the self-capacitance. Here, parasitic capacitances Cp1, Cp2, Cp3, and Cp4 are shown as affected by CHB (the self-capacitance change caused by the human body).

Drive-sense circuits (DSC) are operable to detect the changes in self capacitance and/or other changes to the electrodes and interpret their meaning. For example, by detecting changes in self capacitance along with mutual capacitance changes, the DSCs of the touch screen 12 determines that the user input passive device 88 is on the touch screen 12 and that it is in use by a user. While the user input passive device 88 continues to be touched (e.g., the self-capacitance change is detected), mutual capacitance changes may indicate different functions. For example, without a touch, a mutual capacitance changes caused by the conductive plates ID the passive device. With a touch, the mutual capacitance change caused by the conductive plates can indicate a selection, an orientation, and/or any user initiated touch screen function.

In an embodiment where the conductive shell 102 is not conductive, a person touching the passive device does not provide a path to ground and a touch only minimally affects mutual capacitance.

Figure 10:
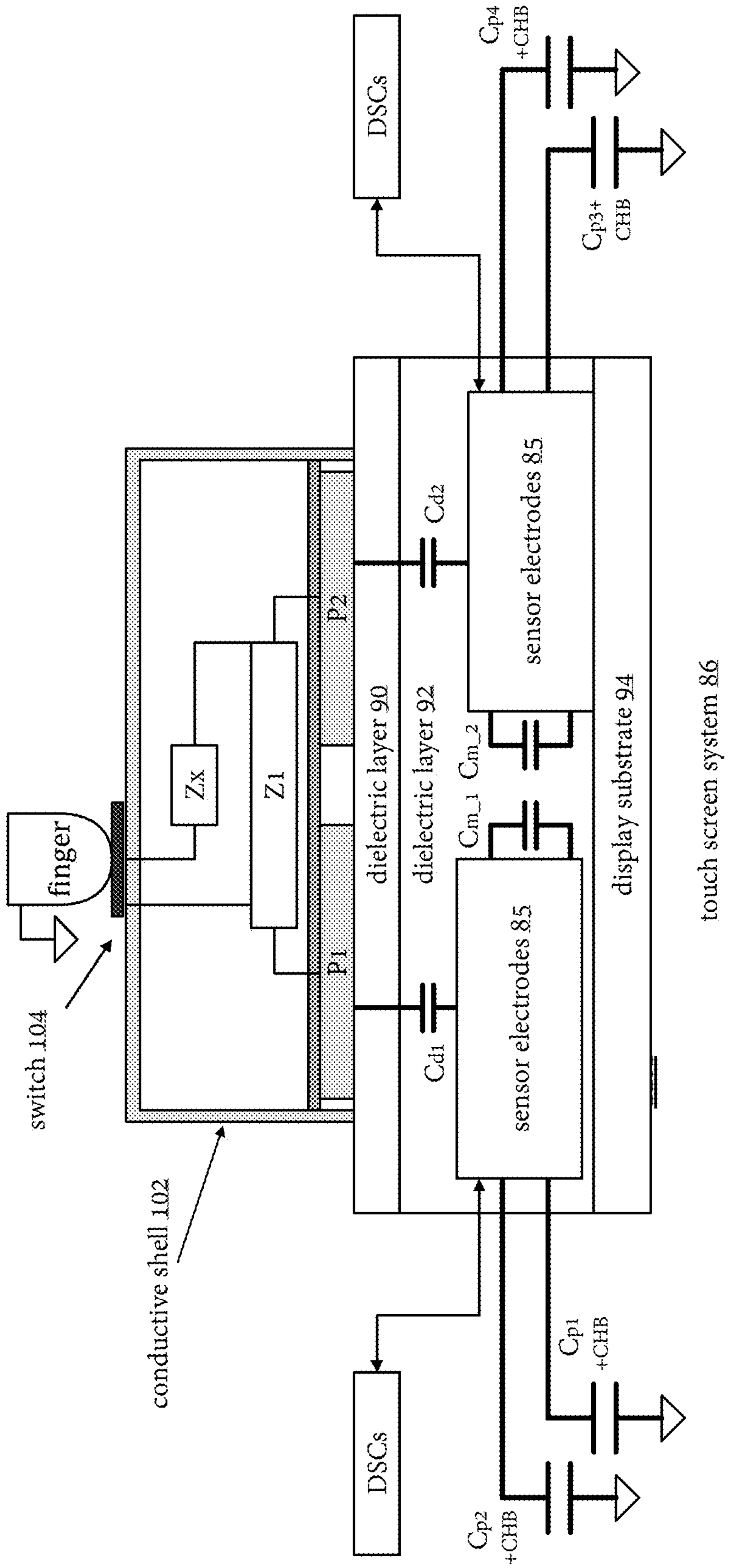
FIG. 10 is a schematic block diagram of another example of capacitance of the touch screen system in accordance with the present disclosure.

FIG. 10 is a schematic block diagram of another example of capacitance of a touch screen system 86 that includes the touch screen 12 and a user input passive device 88 in contact with the touch screen 12. In this example, the user input passive device 88 is in contact (or in close proximity) with the touch screen 12 and there is a human touch on the conductive shell 102 of the user input passive device 98.

When a person touches the conductive shell 102 of the passive device 88, the person provides a path to ground such that the conductive shell 102 affects both the mutual capacitance and the self-capacitance. Here, parasitic capacitances Cp1, Cp2, Cp3, and Cp4 are shown as affected by CHB (the self-capacitance change caused by the human body).

Further, in this example, the conductive shell includes a switch mechanism (e.g., switch 104) on the conductive shell 102 of the passive device 88 housing. When a user presses (or otherwise engages/closes) the switch 104, the impedance circuit is adjusted (e.g., the impedance circuit Zx is connected to Z1 in parallel). Adjusting the impedance circuit causes a change to Cd1 and Cd2 thus affecting the mutual capacitances Cm_1 and Cm_2. The change in impedance can indicate any number of functions such as a selection, a right click, erase, highlight, select, etc.

While one switch is shown here, multiple switches can be included where each impedance caused by an open and closed switch represents a different user function. Further, gestures or motion patterns can be detected via the impedance changes that corresponding to different functions. For example, a switch can be touched twice quickly to indicate a double-click. As another example, the switch can be pressed and held down for a period of time to indicate another function (e.g., a zoom). A pattern of moving from one switch to another can indicate a function such as a scroll.

Figure 11:
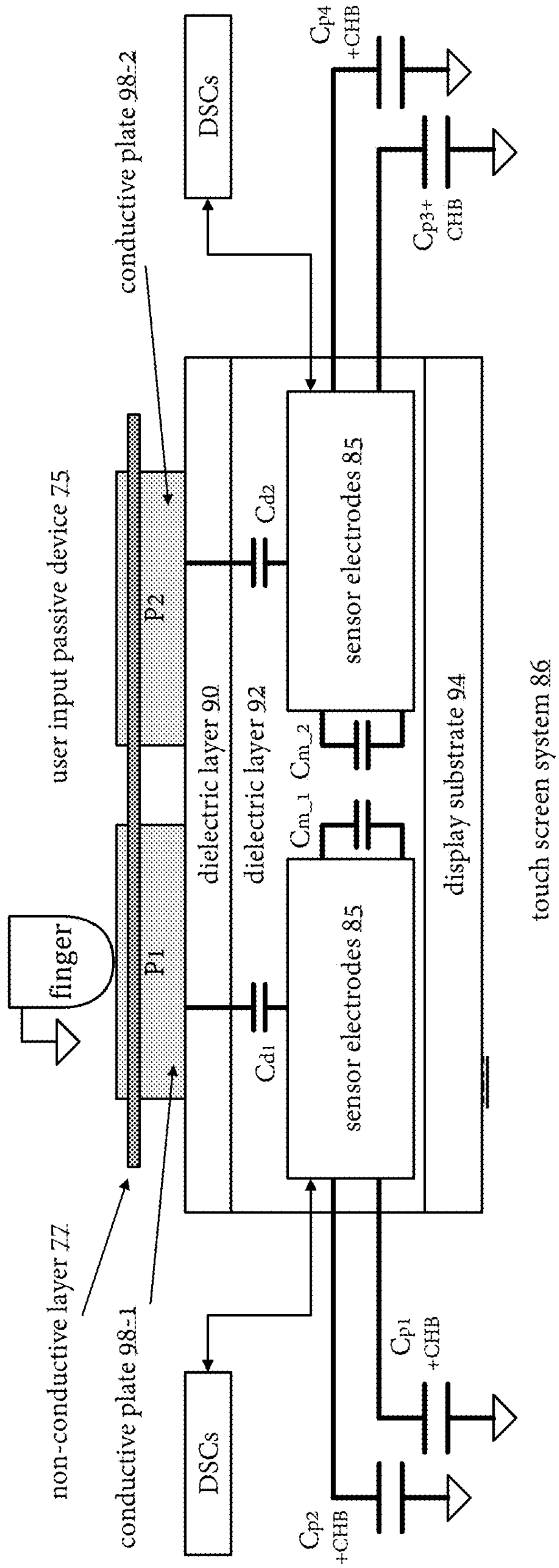
FIG. 11 is a schematic block diagram of another example of capacitance of the touch screen system in accordance with the present disclosure.

FIG. 11 is a schematic block diagram of another example of capacitance of a touch screen system 86 that includes the touch screen 12 and a user input passive device 75 in contact with the touch screen 12. The user input passive device 75 includes conductive plates 98-1 and 98-2, and a non-conductive layer 77. The non-conductive layer 77 electrically isolates conductive plates 98-1 and 98-2 from each other.

In this example, the user input passive device 75 is in contact (or within a close proximity) with the touch screen 12 and there is a human touch directly on the conductive plate 98-1 of the user input passive device 75. When a person touches a conductive plate of the passive device 75, the person provides a path to ground such that the conductive plates affect both the mutual capacitance and the self-capacitance of the sensor electrodes 85. With conductive plates 98-1 and 98-2 capacitively coupled (e.g., Cd1 and Cd2) to sensor electrodes 85, mutual capacitances Cm_1 and Cm_2 are affected and parasitic capacitances Cp1, Cp2, Cp3, and Cp4 are affected by CHB (the self-capacitance change caused by the human body).

Drive-sense circuits (DSC) are operable to detect the changes in self and mutual capacitance and/or other changes to the electrodes and interpret their meaning. For example, by detecting changes in self capacitance along with mutual capacitance changes, the DSCs of the touch screen 12 determines that the user input passive device 75 is on the touch screen 12 and that it is in use by a user. While the user input passive device 75 continues to be touched (e.g., the self-capacitance change is detected), mutual capacitance changes may indicate different functions. For example, without a touch, a mutual capacitance changes caused by the conductive plates ID the passive device. With a touch, the mutual capacitance change caused by the conductive plates can indicate a selection, an orientation, and/or any user initiated touch screen function.

While two conductive plates are shown here, the user input passive device 75 may include one or more conductive plates, where touches to the one or more conductive plates can indicate a plurality of functions. For example, a touch to both conductive plates 98-1 and 98-2 may indicate a selection, a touch to conductive plate 98-1 may indicate a right click, touching conductive plates in a particular pattern and/or sequence may indicate a scroll, etc. The user input passive device 75 may further include a scroll wheel in contact with one or more conductive plates, conductive pads on one or more surfaces of the device, conductive zones for indicating various functions, etc. As such, any number of user functions including traditional functions of a mouse and/or trackpad can be achieved passively.

Figure 12:
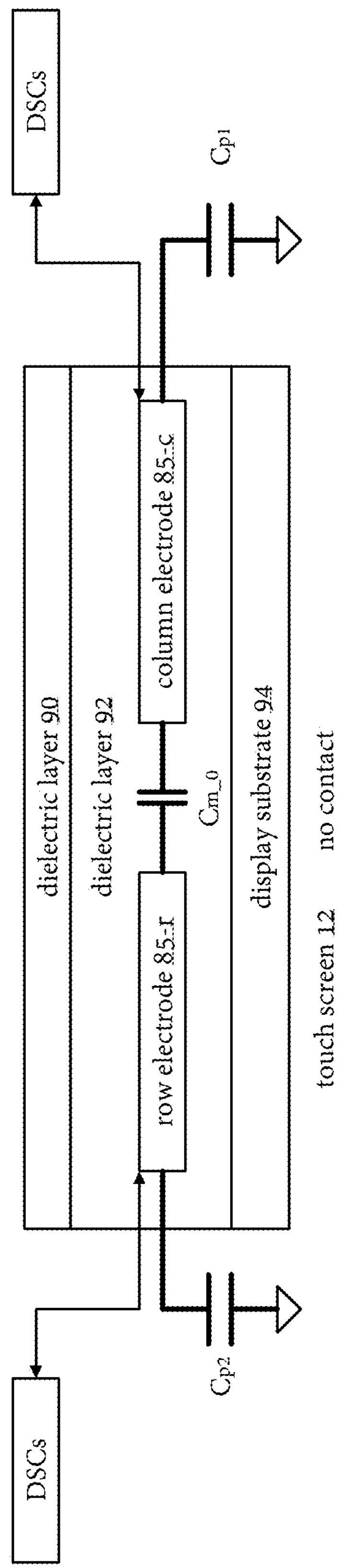
FIG. 12 is a schematic block diagram of an example of capacitance of a touch screen with no contact with a user passive device in accordance with the present disclosure.

FIG. 12 is a cross section schematic block diagram of an example of capacitance of a touch screen 12 with no contact with a user input passive device 98. FIG. 12 is similar to the example of FIG. 7B except one row electrode 85-*r* and one column electrode 85-*c* of the touch screen 12 are shown on the same layer. The electrode 85*s* are positioned proximal to dielectric layer 92, which is between a cover dielectric layer 90 and the display substrate 94.

Each electrode 85 has a self-capacitance, which corresponds to a parasitic capacitance created by the electrode with respect to other conductors in the display (e.g., ground, conductive layer(s), and/or one or more other electrodes).

For example, row electrode 85-*r* has a parasitic capacitance $C_{p2}$ and column electrode 85-*c* has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic self-capacitance.

As shown, the touch screen 12 includes a plurality of layers 90-94. Each illustrated layer may itself include one or more layers. For example, dielectric layer 90 includes a surface protective film, a glass protective film, and/or one or more pressure sensitive adhesive (PSA) layers. As another example, the second dielectric layer 92 includes a glass cover, a polyester (PET) film, a support plate (glass or plastic) to support, or embed, one or more of the electrodes 85-*c* and 85-*r* (e.g., where the column and row electrodes are on different layers), a base plate (glass, plastic, or PET), an ITO layer, and one or more PSA layers. As yet another example, the display substrate 94 includes one or more LCD layers, a back-light layer, one or more reflector layers, one or more polarizing layers, and/or one or more PSA layers.

A mutual capacitance (Cm_0) exists between a row electrode and a column electrode. When no touch and/or device is present, the self-capacitances and mutual capacitances of the touch screen 12 are at a nominal state. Depending on the length, width, and thickness of the electrodes, separation from the electrodes and other conductive surfaces, and dielectric properties of the layers, the self-capacitances and mutual capacitances can range from a few pico-Farads to 10's of nano-Farads.

Touch screen 12 includes a plurality of drive sense circuits (DSCs). The DSCs are coupled to the electrodes and detect changes for affected electrodes.

Figure 13A:
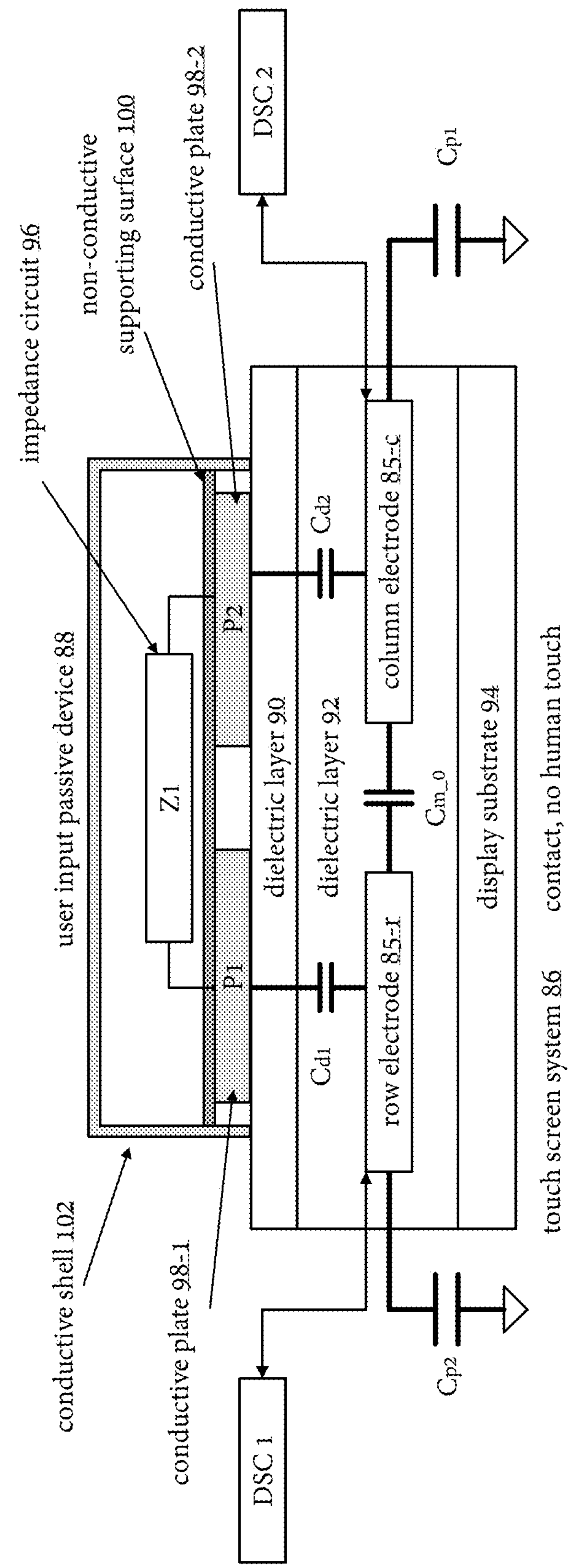
FIGS. 13A-13B are schematic block diagrams of examples of capacitance of a touch screen system in accordance with the present disclosure.
Figure 13B:
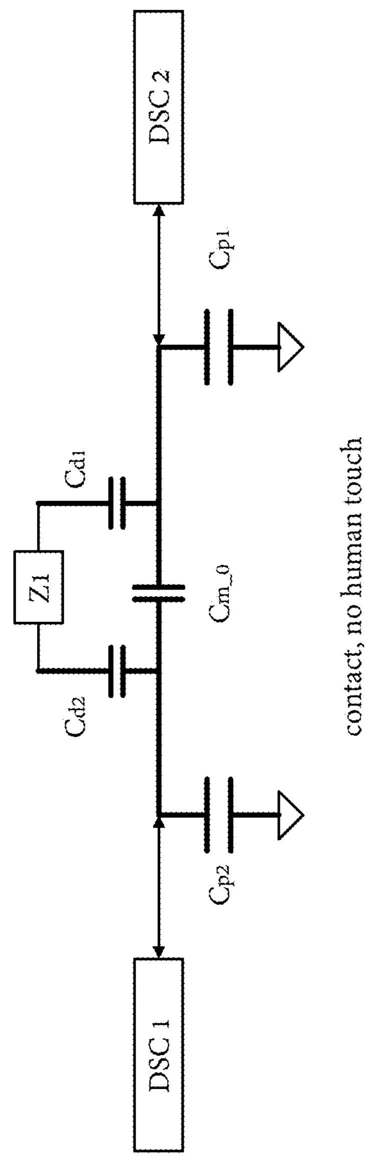

FIGS. 13A-13B are schematic block diagrams of examples of capacitance of a touch screen system 86 that includes the touch screen 12 and a user input passive device 88 in contact with the touch screen 12. In this example, the user input passive device 88 is in contact (or within a close proximity) with an interactive surface of the touch screen 12 but there is no human touch on the user input passive device 98. FIGS. 13A-13B operate similarly to the example of FIG. 8 except that only one row electrode 85-*r* and one column electrodes 85-*c* are shown on a same layer of the touch screen 12.

As shown in FIG. 13A, the user input passive device 88 includes impedance circuit 96 (Z1), conductive plates 98-1 and 98-2 (P1 and P2), a non-conductive supporting surface 100, and a conductive shell 102. The conductive shell 102 and non-conductive supporting surface shell 100 together form a housing for the user input passive device 88. The housing has an outer shape corresponding to at least one of: a computing mouse, a game piece, a cup, a utensil, a plate, and a coaster.

The conductive plates 98-1 and 98-2 and the conductive shell 102 are in contact with the touch screen 12's interactive surface. The non-conductive supporting surface 100 electrically isolates the conductive shell 102, the conductive plate 98-1, and the conductive plate 98-2. The impedance circuit 96 connects the conductive plate 98-1 and the conductive plate 98-2 and has a desired impedance at a desired frequency. The impedance circuit 96 is discussed with more detail with reference to FIGS. 15A-15F.

The user input passive device 88 is capacitively coupled to one or more rows and/or column electrodes proximal to the contact. Because the conductive plates 98-1 and 98-2 and the conductive shell 102 are electrically isolated, when a person touches the conductive shell 102 of the passive device 98, the person provides a path to ground such that the conductive shell 102 affects both the mutual capacitance and the self-capacitance.

When the passive device 88 is not touched by a person (as shown here), there is no path to ground and the conductive shell 102 only affects the mutual capacitance. The conductive plates 98-1 and 98-2 do not have a path to ground regardless of a touch and thus only affect mutual capacitance when the passive device is touched or untouched. Because the contact area of the conductive plates 98-1 and 98-2 is much larger than the conductive shell 102, the mutual capacitance change detected is primarily due to the conductive plates 98-1 and 98-2 and the effect of the impedance circuit 96 not the conductive shell 102.

As an example, when the user input passive device 88 is resting on the touch screen 12 with no human touch, the user input passive device 88 is capacitively coupled to the touch screen 12 of the touch screen system 86 via capacitance Cd1 and Cd2 (e.g., where Cd1 and Cd2 are with respect to a row and/or a column electrode). Depending on the area of the conductive plates 98-1 and 98-2, the effect of the impedance circuit 96, and the dielectric layers 90-92, the capacitance of Cd1 or Cd2 is in the range of 1 to 2 pico-Farads. The values of Cd1 and Cd2 affect mutual capacitance Cm_0 (created between the column and row electrode on the same layer). For example, Cd1 and Cd2 may raise or lower the value of Cm_0 by approximately 1 pico-Farad.

In this cross-sectional view, two conductive plates and one impedance circuit are shown. However, the passive device 88 may include multiple sets of conductive plates where each set is connected by an impedance circuit. The various sets of conductive plates can have different impedance effects on the electrodes of the touch screen which can correspond to different information and/or passive device functions.

Drive-sense circuits (DSCs 1-2) are operable to detect the changes in mutual capacitance and/or other changes to the electrodes and interpret their meaning. One DSC per row and one DSC per column are affected in this example. For example, by detecting changes in mutual capacitance and/or by detecting characteristics of the impedance circuit 96 (e.g., a sweep for resonant frequency of an impedance circuit 96), the DSCs of the touch screen 12 determines the presence, identification (e.g., of a particular user), and/or orientation of the user input passive device 98.

FIG. 13B shows a simplified circuit diagram representation of FIG. 13A. The capacitances Cd1 and Cd2 of the user input passive device 88 are coupled to the touch screen 12 such that the mutual capacitance Cm_0 between column and row electrodes 85 is affected. However, with no human touch, there is no path to ground. Therefore, the collective parasitic capacitances Cp2 and Cp1 remain substantially unchanged. DSC 1 may detect changes to one row and DSC 2 may detect changes to one column. Thus, DSC 1 and DSC 2 are operable to sense a mutual capacitance change to Cm_0.

Figure 14A:
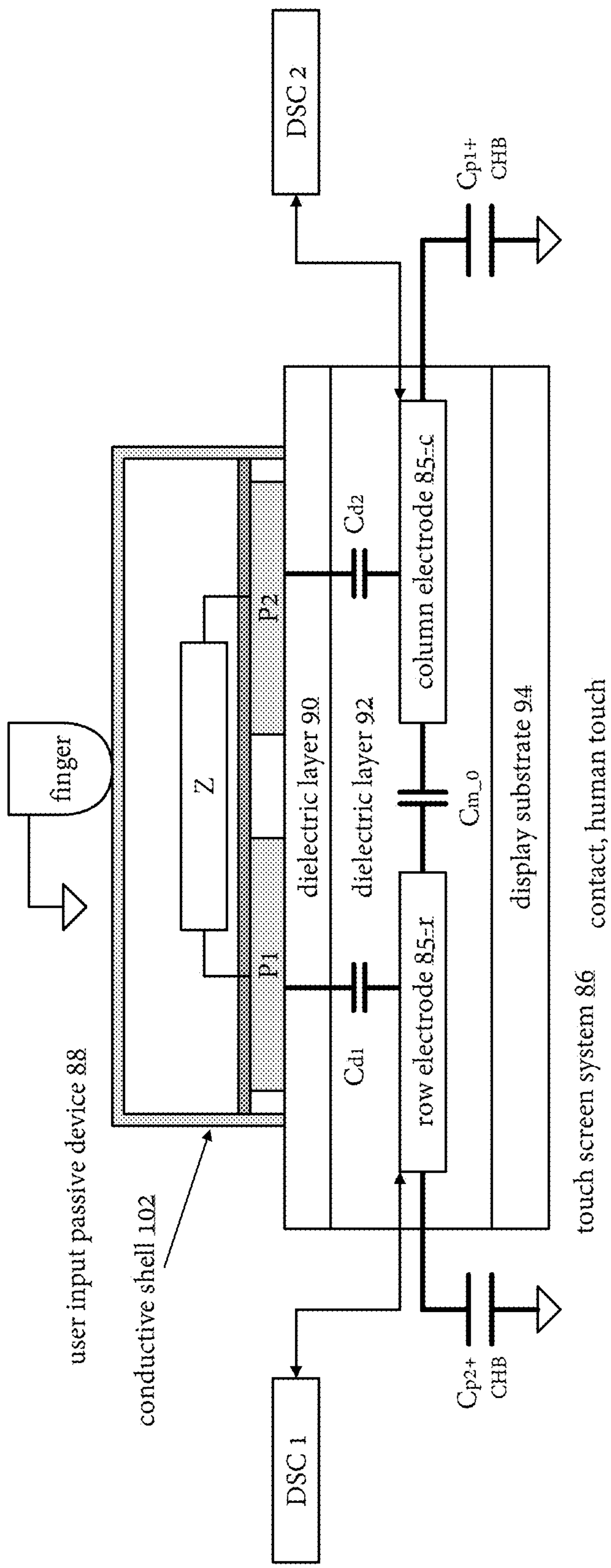
FIGS. 14A-14B are schematic block diagrams of examples of capacitance of a touch screen system in accordance with the present disclosure.
Figure 14B:
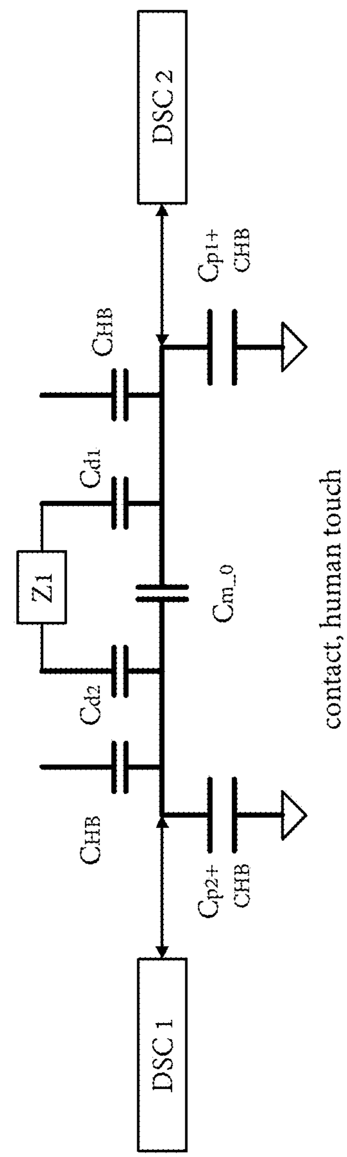

FIGS. 14A-14B are schematic block diagrams of another example of capacitance of a touch screen system 86 that includes the touch screen 12 and a user input passive device 88 in contact with the touch screen 12. In this example, the user input passive device 88 is in contact (or within a close proximity) with the touch screen 12 and there is a human touch on the conductive shell 102 of the user input passive device 88. FIGS. 14A and 14B operate similarly to FIG. 9 except electrodes 85-*r* and 85-*c* are shown on the same layer of the touch screen 12.

When a person touches the conductive shell 102 of the passive device 88, the person provides a path to ground such that the conductive shell 102 affects both the mutual capacitance and the self-capacitance. Here, parasitic capacitances Cp1 and Cp2 are shown as affected by CHB (the self-capacitance change caused by the human body).

Drive-sense circuits (DSCs 1-2) are operable to detect the changes in self capacitance and/or other changes to the electrodes and interpret their meaning. For example, by detecting changes in self capacitance along with mutual capacitance changes, the DSCs of the touch screen 12 determines that the user input passive device 88 is on the touch screen 12 and that it is in use by a user. While the user input passive device 88 continues to be touched (e.g., the self-capacitance change is detected), mutual capacitance changes may indicate different functions. For example, without a touch, a mutual capacitance change IDs the passive device. With a touch, the mutual capacitance change can indicate a selection, an orientation, and/or any user initiated touch screen function.

FIG. 14B shows a simplified circuit diagram representation of FIG. 14A. The capacitances Cd1 and Cd2 of the user input passive device 88 are coupled to the touch screen 12 such that the mutual capacitance Cm_0 between column and row electrodes 85 is affected. With a human touch there is path to ground. Therefore, the collective parasitic capacitances Cp2 and Cp1 are affected by CHB (the self-capacitance change caused by the human body). DSC 1 may detect changes to one row and DSC 2 may detect changes to one column. Thus, DSC 1 and DSC 2 are operable to sense a mutual capacitance change to Cm_0 as well as the effect of CHB on Cp2 and Cp1.

Figure 15A:
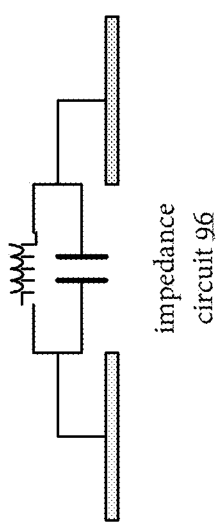
FIGS. 15A-15F are schematic block diagrams of examples of an impedance circuit in accordance with the present disclosure.

FIGS. 15A-15F are schematic block diagrams of examples of the impedance circuit 96. In FIG. 15A the impedance circuit 96 is a parallel tank (LC) circuit (e.g., an inductor and a capacitor connected in parallel). In resonance, (i.e., operating at resonant frequency) a parallel tank circuit experiences high impedance and behaves like an open circuit allowing minimal current flow.

Figure 15B:
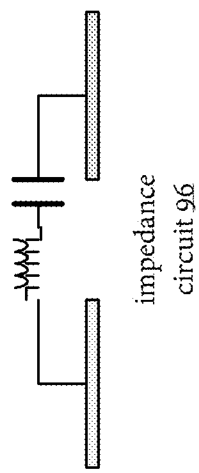

In FIG. 15B, the impedance circuit 96 is a series tank (LC) circuit (e.g., an inductor and a capacitor connected in series). In resonance, a series tank circuit experiences low impedance and behaves like a short circuit allowing maximum current flow.

Figure 15C:
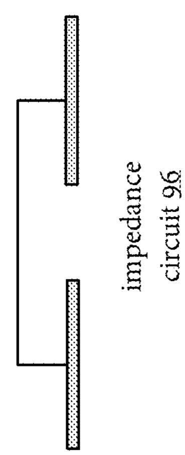
Figure 15D:
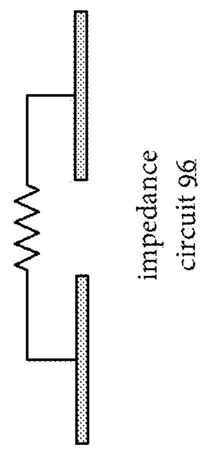
Figure 15E:
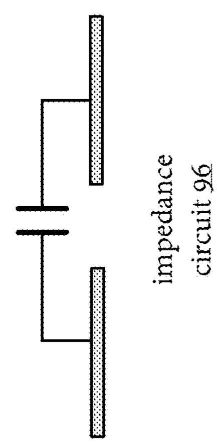
Figure 15F:
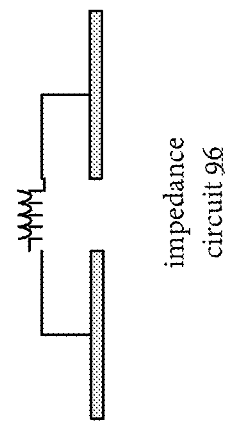

In FIG. 15C, the impedance circuit 96 is a wire (i.e., a short circuit). In FIG. 15D the impedance circuit 96 is a resister. In FIG. 15E, the impedance circuit 96 is a capacitor. In FIG. 15F, the impedance circuit 96 is an inductor. Impedance circuit 96 may include any combination and/or number of resistors, capacitors, and/or inductors connected in series and/or parallel (e.g., any RLC circuit).

Figure 16A:
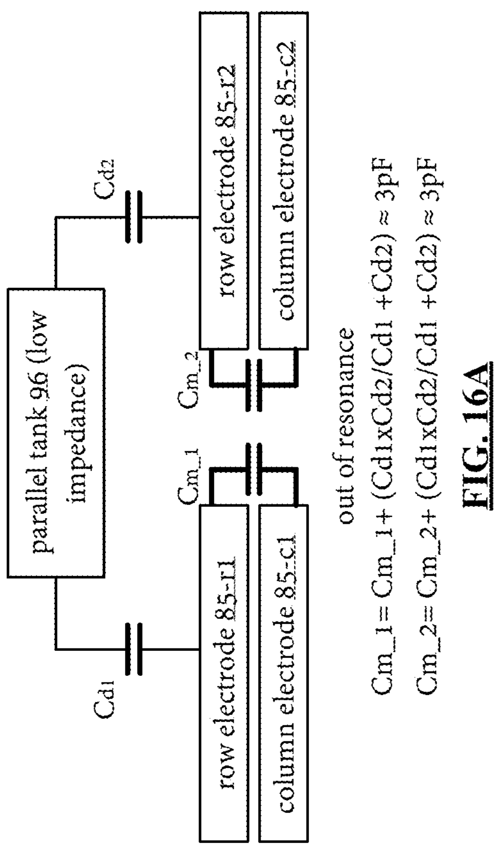
FIGS. 16A-16B are schematic block diagrams of examples of mutual capacitance changes to electrodes with a parallel tank circuit as the impedance circuit in accordance with the present disclosure.
Figure 16B:
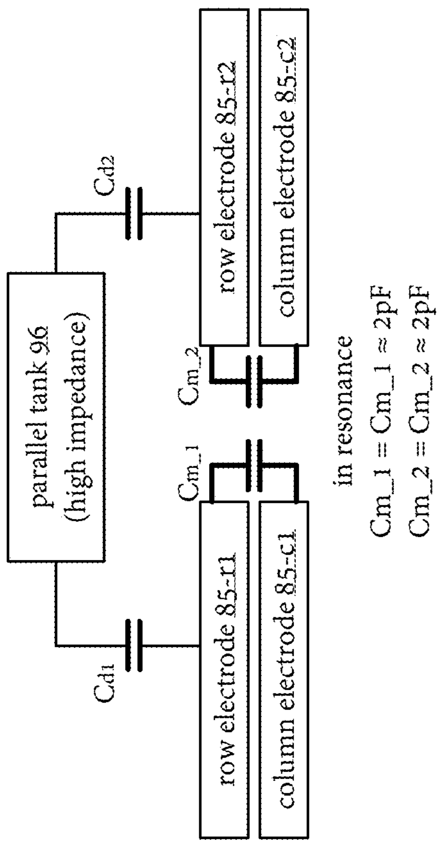

FIGS. 16A-16B are schematic block diagrams of examples of mutual capacitance changes to electrodes 85 with a parallel tank circuit as the impedance circuit 96. The parallel tank circuit 96 includes an inductor and a capacitor connected in parallel. The user input passive device is capacitively coupled to the touch screen 12 of the touch screen system 86 via capacitance Cd1 and Cd2. In this example, row and column electrodes are on different layers and the capacitance of each of Cd1 is Cd2 is 2 pico-Farads. The values of Cd1 and Cd2 affect mutual capacitances Cm_1 and Cm_2. Without any contact, the capacitance of each of Cm_1 and Cm_2 are 2 pico-Farad in this example.

As shown in FIG. 16A, when the parallel tank circuit 96 is out of resonance (i.e., operating at any frequency besides resonant frequency), the parallel tank circuit 96 has low impedance allowing current to flow. Thus, out of resonance, Cm_1 is connected in parallel to a series combination of Cd1 and Cd2 and Cm_2 is connected in parallel to a series combination of Cd1 and Cd2. Therefore, out of resonance, Cm_1 and Cm_2 go from 2 pico-Farads to 3 pico-Farads.

As shown in FIG. 16B, when the parallel tank circuit 96 is in resonance (i.e., operating at resonant frequency), parallel tank circuit 96 has high impedance restricting current flow. Thus, at resonance, Cm_1 and Cm_2 experience minimal change from Cd1 and Cd2. Therefore, at resonance, Cm_1 and Cm_2 remain 2 pico-Farads.

Figure 17A:
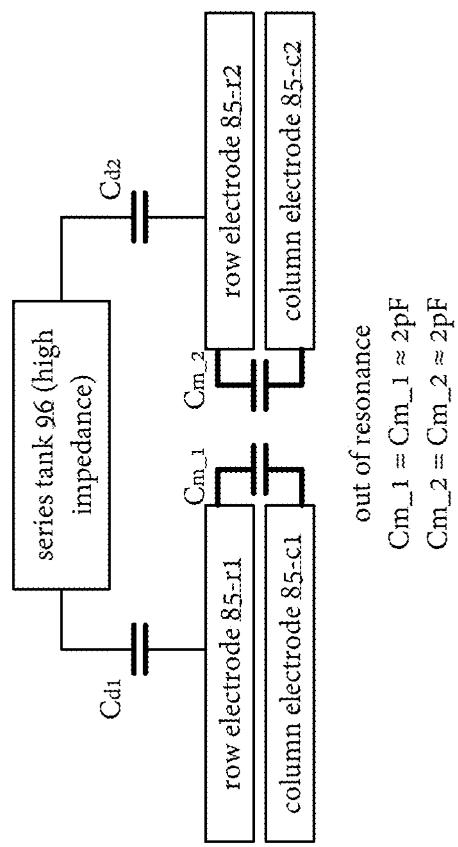
FIGS. 17A-17B are schematic block diagrams of examples of mutual capacitance changes to electrodes with a series tank circuit as the impedance circuit in accordance with the present disclosure.
Figure 17B:
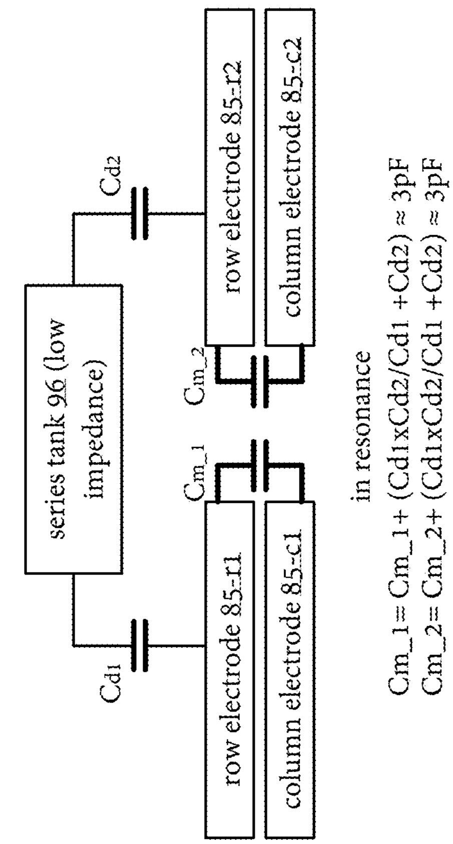

FIGS. 17A-17B are schematic block diagrams of examples of mutual capacitance changes to electrodes 85 with a series tank circuit as the impedance circuit 96. The series tank circuit 96 includes an inductor and a capacitor connected in series. The user input passive device is capacitively coupled to the touch screen 12 of the touch screen system 86 via capacitance Cd1 and Cd2. In this example, row and column electrodes are on different layers and the capacitance of each of Cd1 is Cd2 is 2 pico-Farads. The values of Cd1 and Cd2 affect mutual capacitances Cm_1 and Cm_2. Without any contact, the capacitance of each of Cm_1 and Cm_2 are 2 pico-Farad in this example.

As shown in FIG. 17A, when the series tank circuit 96 is out of resonance (i.e., operating at any frequency besides resonant frequency) the series tank circuit 96 has high impedance restricting current flow. Thus, out of resonance, Cm_1 and Cm_2 experience minimal change from Cd1 and Cd2. Therefore, out of resonance, Cm_1 and Cm_2 stay at 2 pico-Farads.

As shown in FIG. 17B, when the series tank circuit 96 is in resonance (i.e., operating at resonant frequency), the series tank circuit 96 has low impedance allowing current to flow. Thus, Cm_1 is connected in parallel to a series combination of Cd1 and Cd2 and Cm_2 is connected in parallel to a series combination of Cd1 and Cd2. Therefore, in resonance, Cm_1 and Cm_2 go from 2 pico-Farads to 3 pico-Farads.

Figure 18A:
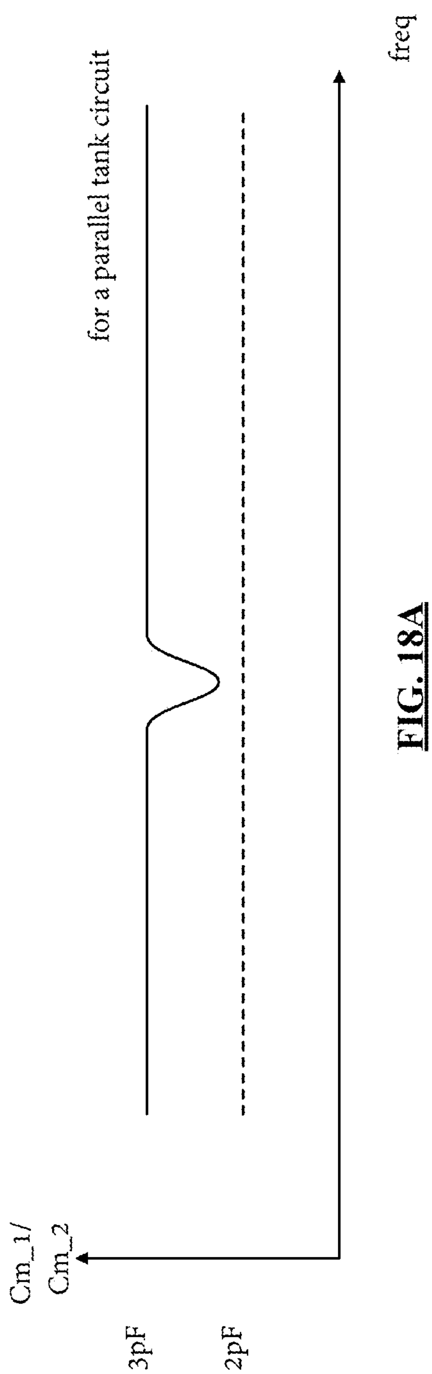
FIGS. 18A-18B are examples of detecting mutual capacitance change in accordance with the present disclosure.
Figure 18B:
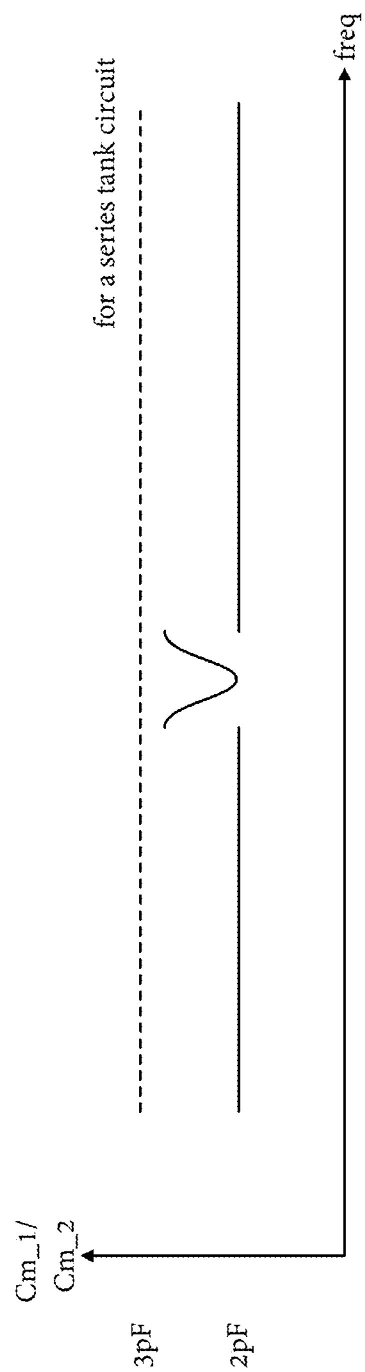

FIGS. 18A-18B are examples of detecting mutual capacitance change. FIG. 18A depicts a graph of frequency versus mutual capacitances Cm_1 and Cm_2 from the example of FIGS. 16A-16B where the impedance circuit is a parallel tank circuit. In this example, the touch screen 12 does a frequency sweep. At all frequencies besides the resonant frequency of the parallel tank circuit, Cm_1 and Cm_2 will be 3 pico-Farads when the passive device is in contact. At the resonant frequency (e.g., 1 MHz), a shift from 3 pico-Farads to 2 pico-Farads can be detected.

FIG. 18B depicts a graph of frequency versus mutual capacitances Cm_1 and Cm_2 from the example of FIGS. 17A-17B where the impedance circuit is a series tank circuit. In this example, the touch screen 12 does a frequency sweep. At all frequencies besides the resonant frequency of the series tank circuit, Cm_1 and Cm_2 will be 2 pico-Farads when the passive device is in contact. At the resonant frequency (e.g., 1 MHz), a shift from 2 pico-Farads to 3 pico-Farads can be detected.

Figure 19A:
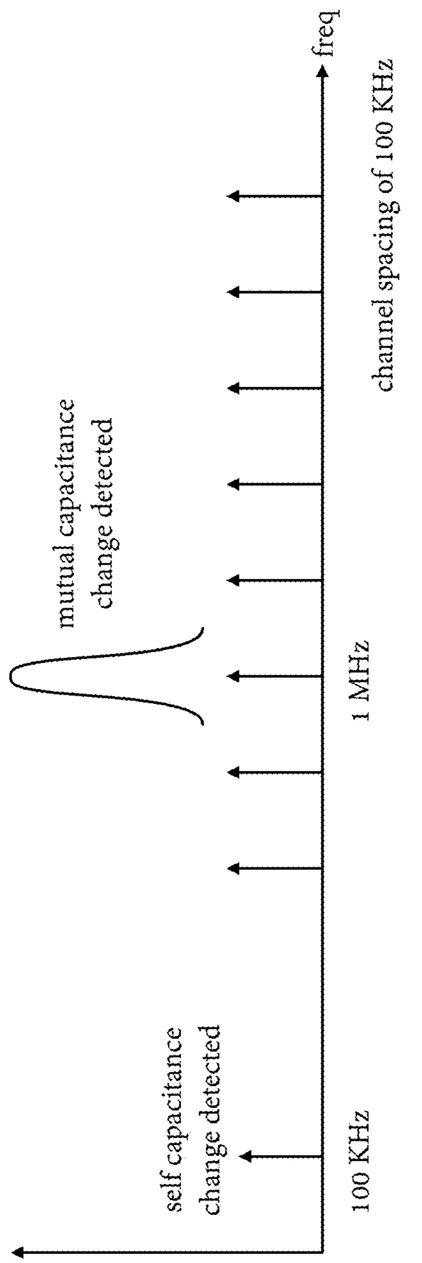
FIGS. 19A-19B are examples of detecting capacitance change in accordance with the present disclosure.
Figure 19B:
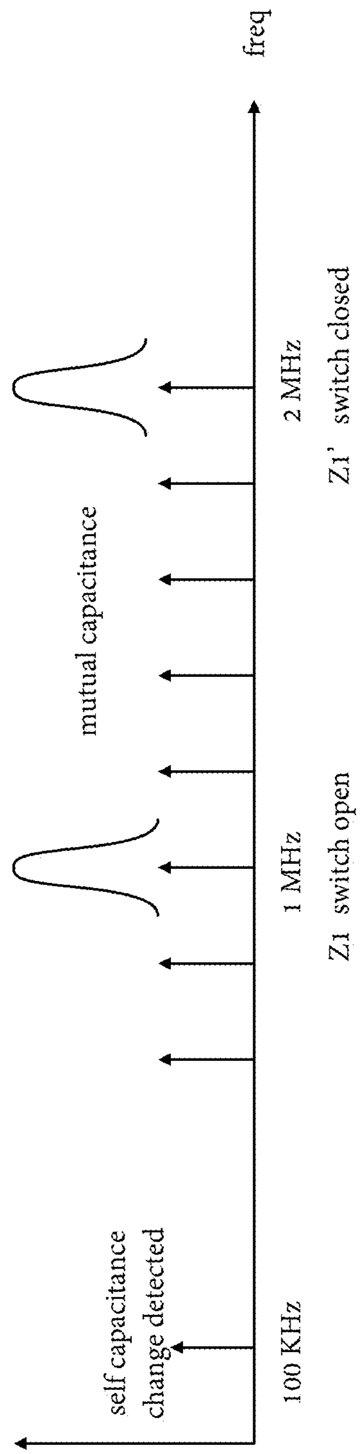

FIGS. 19A-19B are examples of detecting capacitance change. FIG. 19A depicts a graph of frequency versus capacitance with a channel spacing of 100 KHz. In this example, the passive device is in contact with the touch screen and is also being touched by a user. Using a frequency sweep, the self-capacitance change from the user touching the conductive shell is detectable at 100 Khz in this example. In accordance with the tank circuit impedance circuit examples discussed previously, the mutual capacitance change from the impedance circuit and conductive plates is detectable at a resonant frequency of the tank circuit (e.g., 1 MHz). Therefore, when the frequency of detectable impedance changes is known, the touch screen is able to sweep those frequencies to determine the presence and various functions of the passive device.

FIG. 19B depicts a graph of frequency versus capacitance with a channel spacing of 100 KHz. In this example, the passive device is in contact with the touch screen and is also being touched by a user. Further, the passive device includes a switching mechanism which affects the impedance of the impedance circuit. For example, the resonant frequency of the impedance circuit when the switch mechanism is closed increases. Using a frequency sweep, the self-capacitance change from the user touching the conductive shell is detectable at 100 Khz.

In accordance with the tank circuit impedance circuit examples discussed previously, the mutual capacitance change from the impedance circuit and conductive plates when the switch is open is detectable at a first resonant frequency (e.g., 1 MHz). The mutual-capacitance change from the impedance circuit and conductive plates when the switch is closed is detectable at a second resonant frequency (e.g., 2 MHz). As such, detecting the self-capacitance change from the user touching the device as well as detecting the second frequency (2 MHz) indicates a particular user function (e.g., select, zoom, highlight, erase, scroll, etc.).

A drive sense circuit of the touch screen is operable to transmit a self and a mutual frequency per channel for sensing but also has the ability to transmit multiple other frequencies per channel. As an additional example of performing a frequency sweep, one or more frequencies in addition to the standard self and mutual frequency can be transmitted per channel. The one or more additional frequencies change every refresh cycle and can aid in detecting devices/objects and/or user functions. For example, a set of known frequencies can be transmitted every refresh cycle and detected frequency responses can indicate various functions. For example, an object responds to a particular frequency and the touch screen interprets the object as an eraser for interaction with the touch screen.

Figure 20:
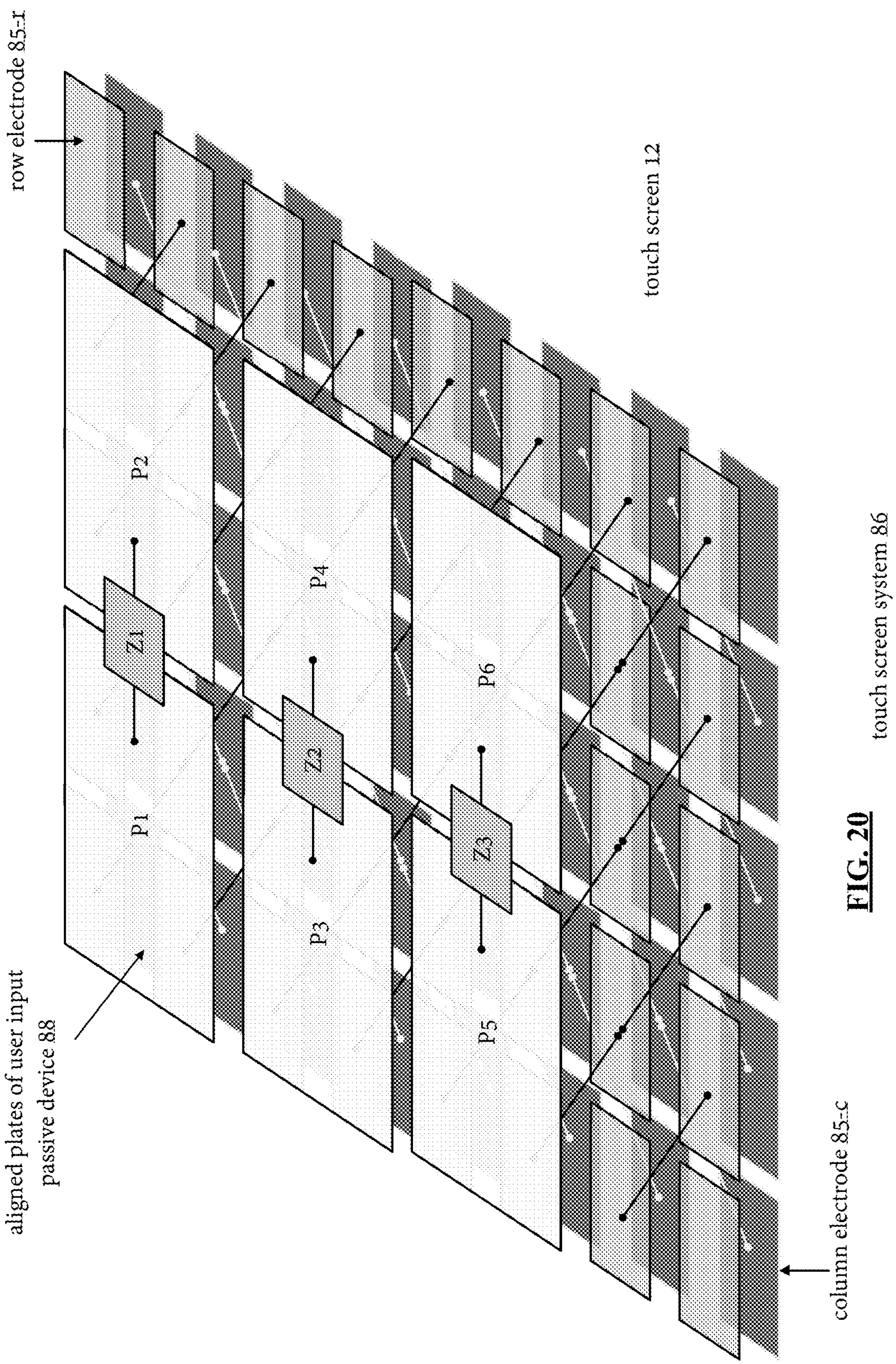
FIG. 20 is a schematic block diagram of another embodiment of the touch screen system in accordance with the present disclosure.

FIG. 20 is a schematic block diagram of an embodiment of a touch screen system 86 that includes a user input passive device 88 in contact with a touch screen 12. FIG. 20 is similar to the example of FIG. 6A but only the conductive plates (P1-P6) and impedance circuits (Z1-Z3) of the user input passive device 88 are shown. FIG. 20 shows a simplified depiction of the touch screen 12 as a touch screen electrode pattern that includes rows of electrodes 85-*r* and columns of electrodes 85-*c*. Here, the conductive cells for the rows (light gray squares) and columns (dark gray squares) are on different layers (e.g., the rows are layered above the columns). Alternatively, the rows and columns may be on the same layer. A mutual capacitance is created between a row electrode and a column electrode. An electrode cell may be 1 millimeter by 1 millimeter to 5 millimeters by 5 millimeters depending on resolution.

The conductive plates P1-P6 are shown as approximately four times the area of an electrode cell in this example (e.g., an electrode cell is 5 millimeters by 5 millimeters and a conductive plate is 10 millimeters by 10 millimeters) to affect multiple electrodes per plate. The size of the conductive plates can vary depending on the size of the electrode cells and the desired impedance change to be detected. For example, the conductive plate may be substantially the same size as an electrode cell.

One or more of the plurality of impedance circuits and plurality of conductive plates cause an impedance and/or frequency effect when in close proximity to an interactive surface of the touch screen 12 (e.g., the passive device 88 is resting on the touch screen 12) that is detectable by the touch screen 12. As shown here, the conductive plates of user input passive device 88 are aligned over the conductive cells of the touch screen 12 such that the mutual capacitances of four row and column electrodes are fully affected per conductive plate.

Figure 21:
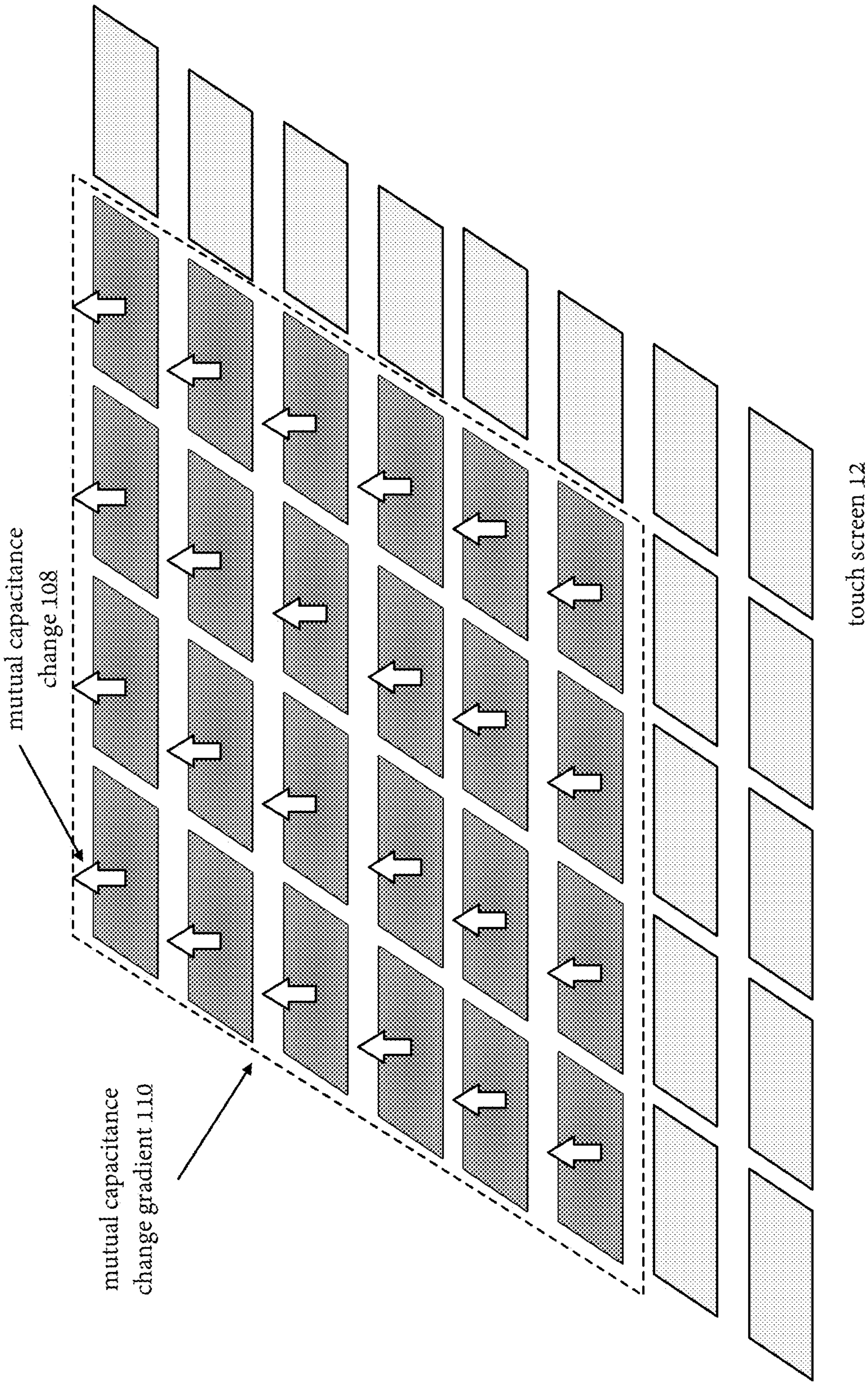
FIG. 21 is a schematic block diagram of an example of a mutual capacitance change gradient in accordance with the present disclosure.

FIG. 21 is a schematic block diagram of an example of a mutual capacitance change gradient 110 caused by the user input passive device 88 on the touch screen 12 in accordance with the example described with reference to FIG. 20 (e.g., the conductive plates align with conductive cells of the touch screen 12). For simplicity, only the conductive cells for the row electrodes (light gray squares) are shown. The mutual capacitance effect is created between a row electrode and a column electrode.

When the conductive plates of the user input passive device 88 align with conductive cells of the touch screen 12 in the most ideal situation, the mutual capacitance of four row and column electrodes are affected per conductive plate. Each mutual capacitance change 108 in the area of the user input passive device creates a mutual capacitance change gradient 110 that is detectable by the touch screen 12.

Capacitance change detection, whether mutual, self, or both, is dependent on the channel width of the touch screen sensor, the thickness of the cover glass, and other touch screen sensor properties. For example, a higher resolution channel width spacing allows for more sensitive capacitive change detection.

Figure 22:
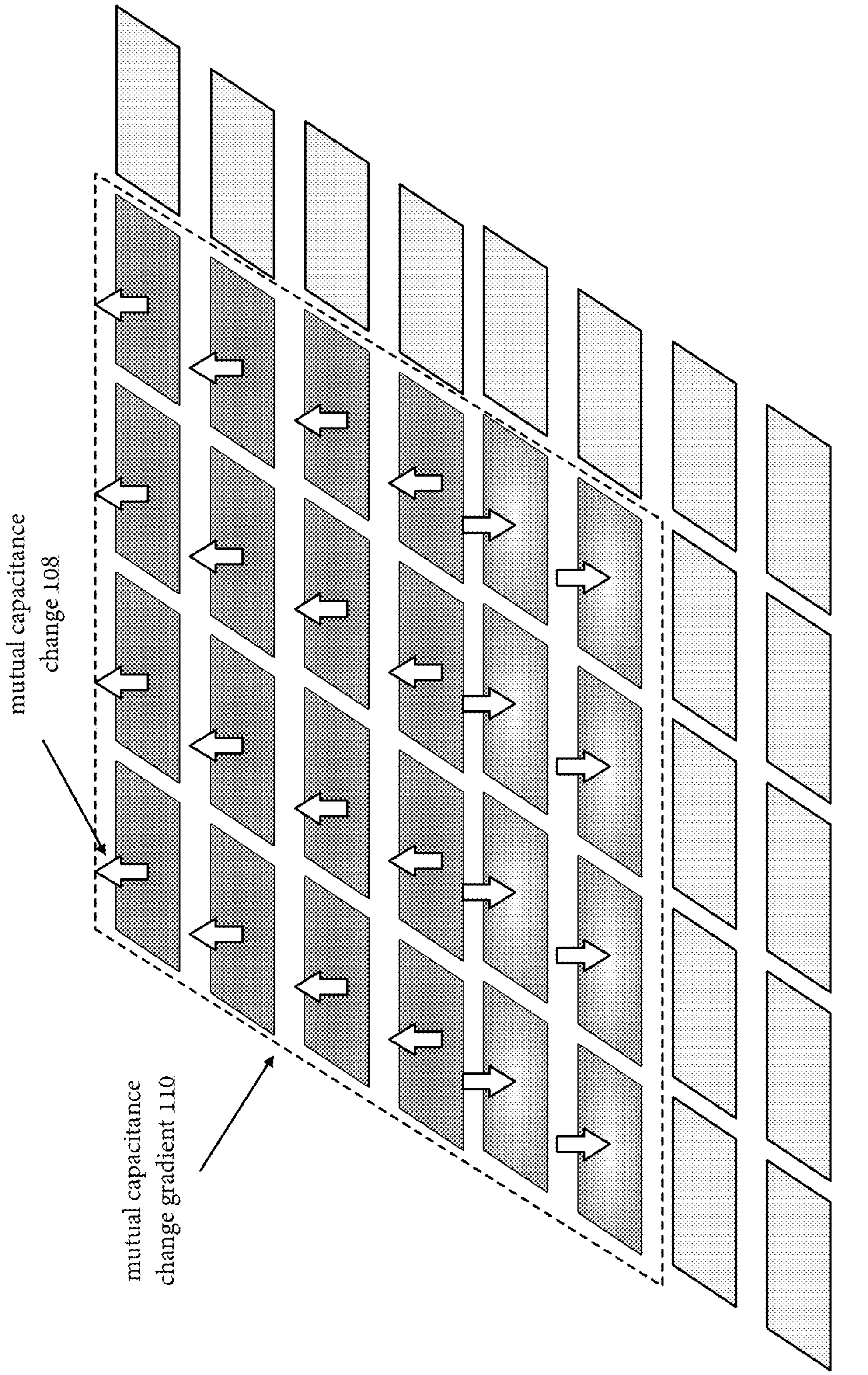
FIG. 22 is a schematic block diagram of another example of a mutual capacitance change gradient in accordance with the present disclosure.

FIG. 22 is a schematic block diagram of another example of a mutual capacitance change gradient 110 caused by the user input passive device 88 on touch screen 12 in accordance with the example described with reference to FIG. 20 (e.g., the conductive plates align with conductive cells of the touch screen 12). For simplicity, only the conductive cells for the row electrodes (light gray squares) are shown. The mutual capacitance effect is created between a row electrode and a column electrode.

When the conductive plates of the user input passive device 88 align with conductive cells of the touch screen 12 in the most ideal situation, the mutual capacitance between four row column electrodes are affected per conductive plate. Each mutual capacitance change 108 in the area of the user input passive device creates a mutual capacitance change gradient 110 that is detectable across the touch screen 12.

In this example, the two lower plates of the user input passive device create a different mutual capacitance change than the other four conductive plates. For example, impedance circuits Z1 and Z2 (see FIG. 20 for reference) are series tank circuit causing the mutual capacitance of the electrodes to raise during a resonant frequency sweep. The impedance circuit Z3 may be a parallel tank circuit with the same resonant frequency as the series tank circuit such that the mutual capacitance of the electrodes lowers during the resonant frequency sweep. The difference in mutual capacitance changes 108 across the mutual capacitance change gradient 110 can indicate orientation of the user input passive device.

Figure 23:
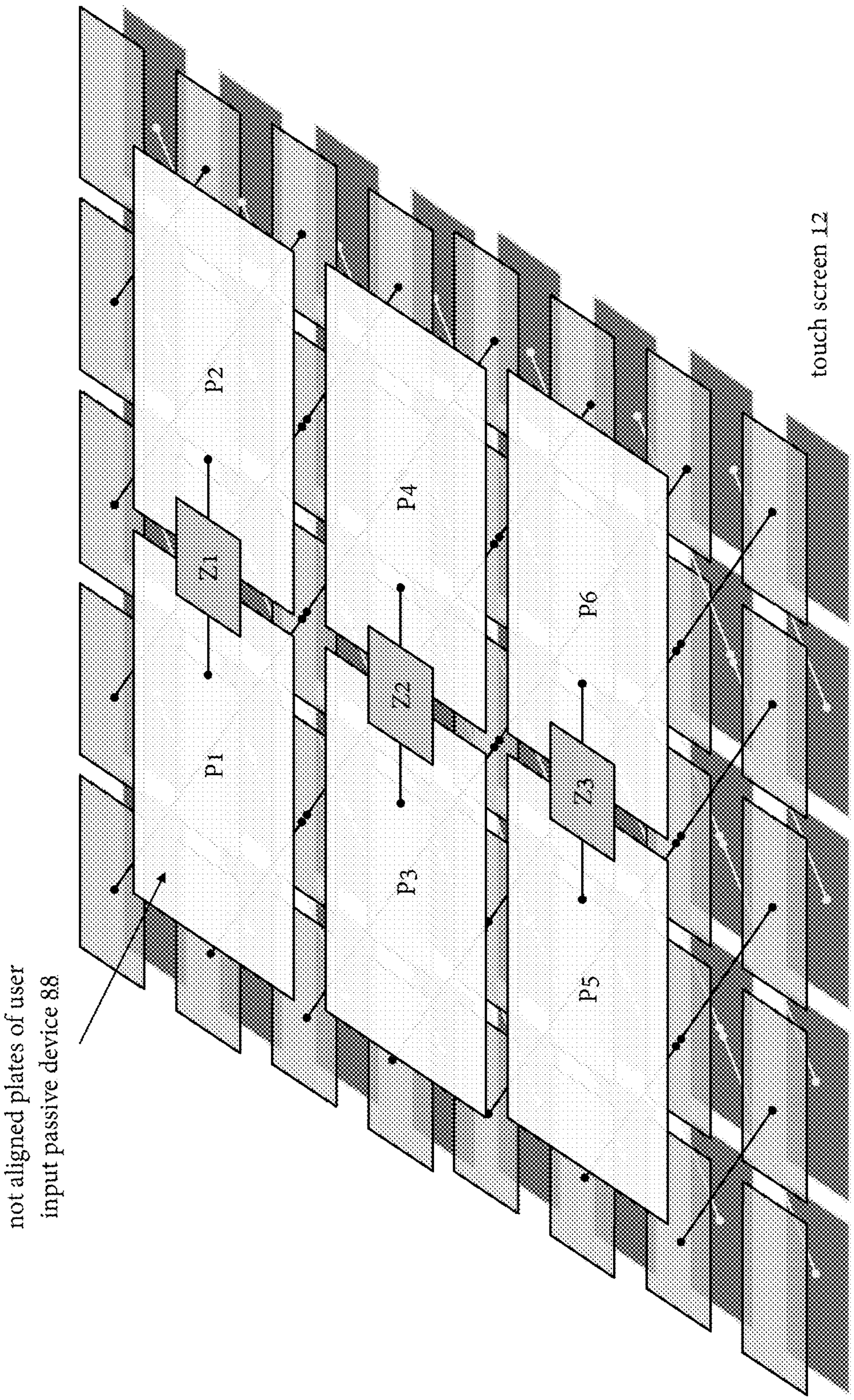
FIG. 23 is a schematic block diagram of another embodiment of the touch screen system in accordance with the present disclosure.

FIG. 23 is a schematic block diagram of an embodiment of a touch screen system 86 that includes a user input passive device 88 in contact with a touch screen 12. FIG. 23 is similar to FIG. 20 except here the conductive plates of the user input passive device 88 are not aligned over the electrode cells of the touch screen 12. For example, one conductive plate of the passive device 88 fully covers one electrode cell and only portions of the eight surrounding electrode cells.

Figure 24:
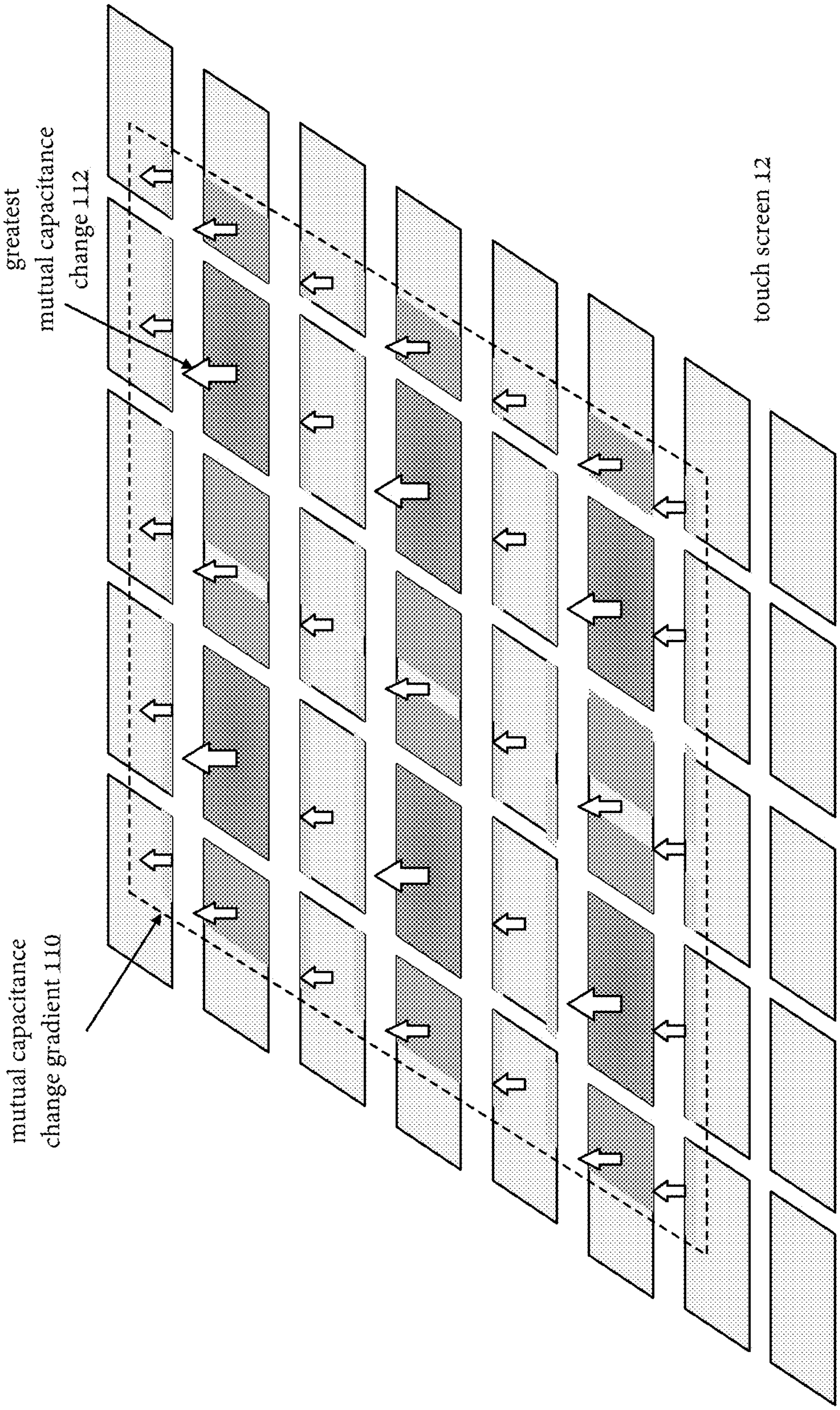
FIG. 24 is a schematic block diagram of another example of a mutual capacitance change gradient in accordance with the present disclosure.

FIG. 24 is a schematic block diagram of another example of a mutual capacitance change gradient 110 caused by the user input passive device 88 on touch screen 12 in accordance with the example described with reference to FIG. 23 (e.g., the conductive plates do not align with electrode cells of the touch screen 12).

With one conductive plate of the user input passive device 88 fully covering only one conductive cell, the greatest mutual capacitance change 112 is detected from the fully covered electrodes (e.g., shown by the dark gray squares and the largest white arrows). Each conductive plate also covers portions of eight surrounding electrode cells creating areas of lesser mutual capacitance changes (e.g., shown by the lighter shades of grays and the smaller white arrows).

Thus, the touch screen 12 is operable to detect the user input passive device 88 from a range of mutual capacitance change gradients 110 (i.e., mutual capacitance change patterns) from a fully aligned gradient (as illustrated in FIGS. 21 and 22) to a partially aligned gradient.

The touch screen 12 is operable to recognize mutual capacitance change patterns as well as detect an aggregate mutual capacitance change within the mutual capacitance change gradients 110. For example, the touch screen 12 can recognize a range of aggregate mutual capacitance changes within a certain area that identify the user input passive device (e.g., aggregate mutual capacitance changes of 12 pF-24 pF in a 30 millimeter by 30 millimeter area ae representative of the user input passive device).

Figure 25:
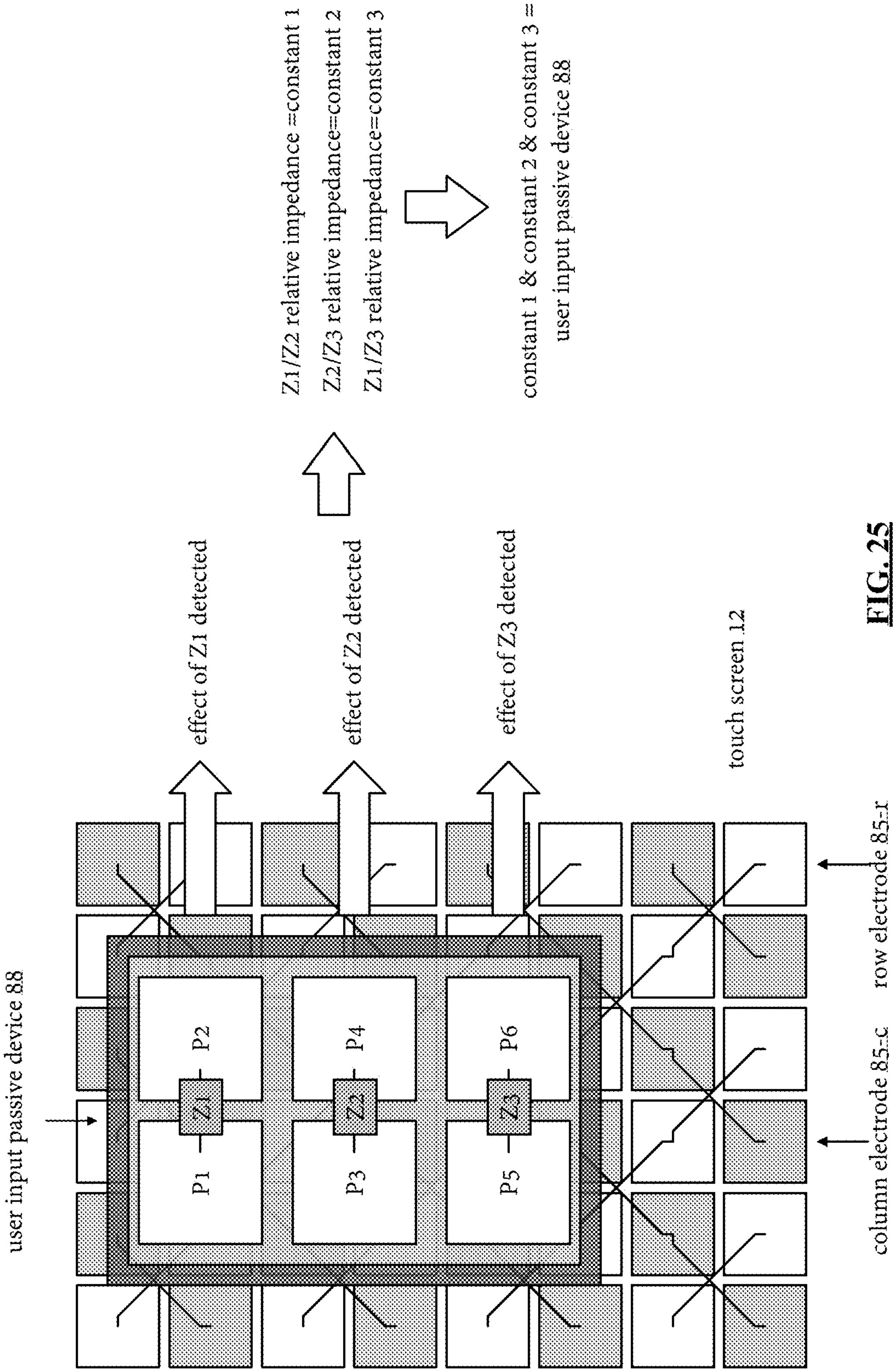
FIG. 25 is a schematic block diagram of an example of determining relative impedance in accordance with the present disclosure.

FIG. 25 is a schematic block diagram of an example of determining relative impedance that includes user input passive device 88 in contact with touch screen 12. For simplicity, the touch screen 12 is shown as touch screen electrode pattern that includes rows of electrodes 85-*r* and columns of electrodes 85-*c*. Here, the conductive cells for the rows (white squares) and columns (dark gray squares) are on same layer but may be on different layers as discussed previously.

As the user input passive device 88 contacts the touch screen 12 surface, impedance circuits Z1-Z3 and corresponding conductive plates P1-P6 cause mutual capacitance changes to the touch screen 12. Detecting exact mutual capacitance changes in order to identify the user input passive device 88 and user input passive device 88 functions can be challenging due to small capacitance changes and other capacitances of the touch screen potentially altering the measurements. Therefore, in this example, a relative impedance effect is detected so that exact impedance measurements are not needed.

For example, the relationship between the impedance effects of Z1, Z2, and Z3 (and corresponding conductive plates) are known and constant. The impedance effects of Z1, Z2, and Z3 are individually determined, and based on the relationship between those effects, the user input passive device 88 can be identified (e.g., as being present and/or to identify user functions). For example, Z1/Z2, Z2/Z3, and Z1/Z3 are calculated to determine a first constant value, a second constant value, and a third constant value respectively. The combination of the first constant value, the second constant value, and the third constant value is recognized as an impedance pattern associated with the user input passive device 98. The methods for detecting the user input passive device and interpreting user input passive device functions described above can be used singularly or in combination.

Figure 26:
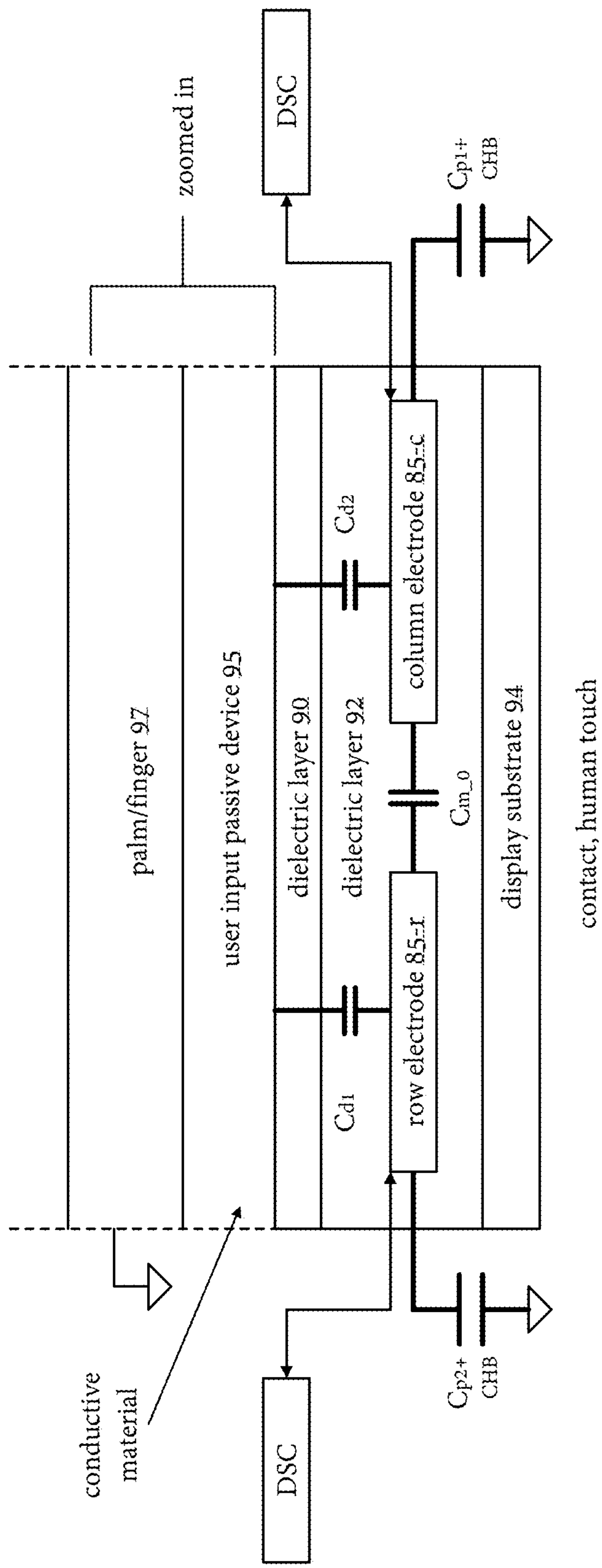
FIG. 26 is a schematic block diagram of an example of capacitance of a touch screen in contact with a user input passive device in accordance with the present disclosure.

FIG. 26 is a schematic block diagram of an example of capacitance of a touch screen 12 in contact with a user input passive device 95. In this example, the user input passive device 95 includes a conductive material. The user input passive device 95 may include a conductive shell with a hollow center, a solid conductive material, a combination of conductive and non-conductive materials, etc. The user input passive device 95 may include a spherical, half-spherical, and/or other rounded shape for user interaction with the touch screen 12. Examples of the user input passive device 95 will be discussed further with reference to FIGS. 27-31.

The user input passive device 95 is capacitively coupled to one or more rows and/or column electrodes proximal to the contact (e.g., Cd1 and Cd2). A zoomed in view is shown here to illustrate contact between the user input passive device 95 and two electrodes of the touch screen 12, however, many more electrodes are affected when the user input passive device 95 is in contact (or within a close proximity) with the touch screen 12 because the user input passive device 95 is much larger in comparison to an electrode. In this example, there is a human touch (e.g., via a palm and/or finger 97) on the conductive material of the user input passive device 95.

When a person touches the conductive material of the passive device 95, the person provides a path to ground such that the conductive material affects both the mutual capacitance (Cm_0) and the self-capacitance. Here, parasitic capacitances Cp1 and Cp2 are shown as affected by CHB (the self-capacitance change caused by the human body).

Drive-sense circuits (DSC) are operable to detect the changes in self capacitance and/or other changes to the electrodes and interpret their meaning. For example, as a person moves the user input passive device 95, the DSCs of the touch screen 12 interpret changes in electrical characteristics of the affected electrodes as a direction of movement. The direction of movement can then be interpreted as a specific user input function (e.g., select, scroll, gaming movements/functions, etc.).

Figure 27:
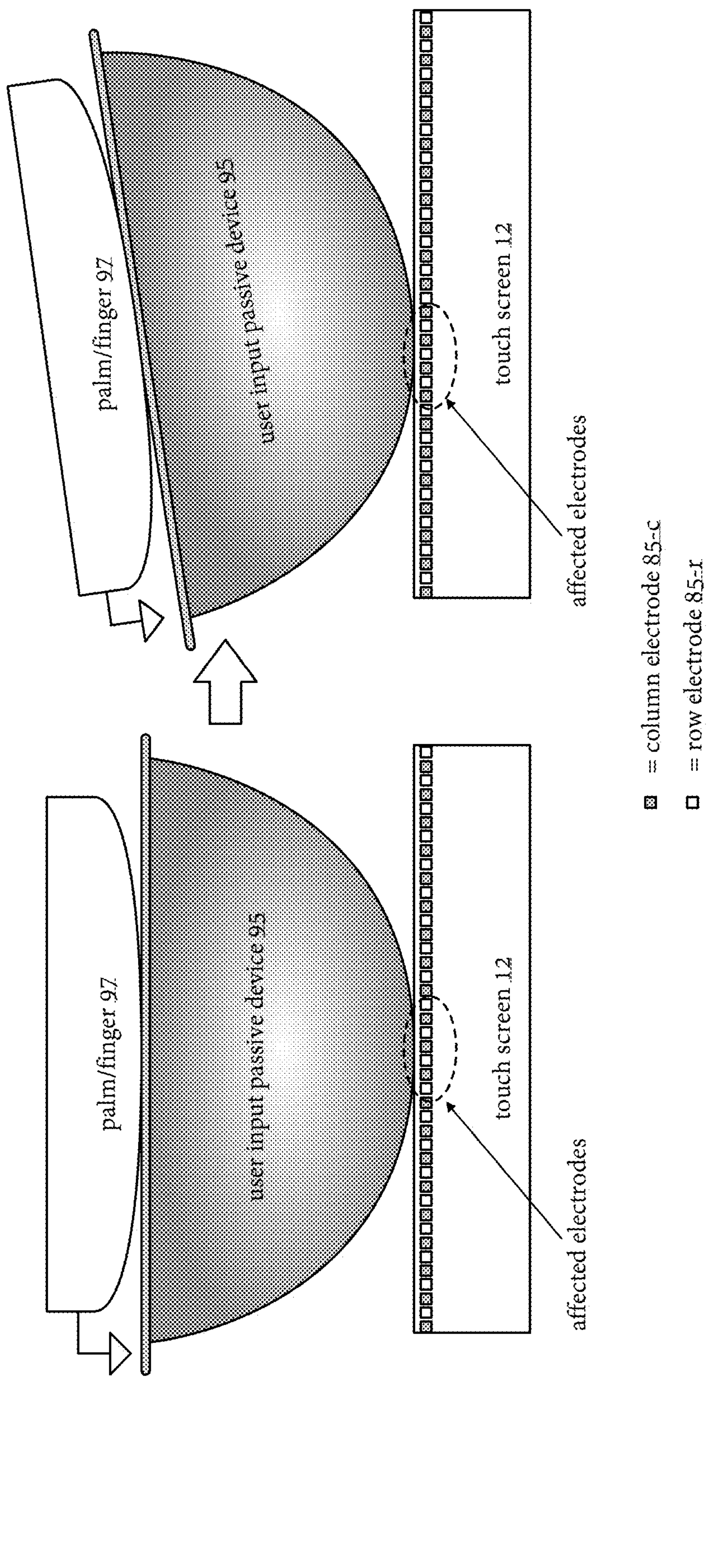
FIG. 27 is a schematic block diagram of an embodiment of the user input passive device interacting with the touch screen in accordance with the present disclosure.

FIG. 27 is a schematic block diagram of an embodiment of the user input passive device 95 interacting with the touch screen 12. In this example, the user input passive device 95 in a half spherical shape with a flat top surface. The user input passive device 95 is made of a rigid conductive material such that the user input passive device 95 retains its shape when applied pressure. A user may rest a palm and/or a finger on the flat top surface to maneuver the spherical shape in various directions in one location and/or across the touch screen 12 surface.

As shown on the left, the user input passive device 95 is used in an upright position and is affecting a plurality of electrodes on the touch screen 12 surface. On the right, the user input passive device 95 is tilted, thus, shifting the location of the plurality of affected electrodes. The amount of electrodes affected, the location of affected electrodes, the rate of the change in the location of affected electrodes, etc., can be interpreted as various user functions by the touch screen 12. For example, the user input passive device 95 can be utilized as a joystick in a gaming application.

Figure 27A:
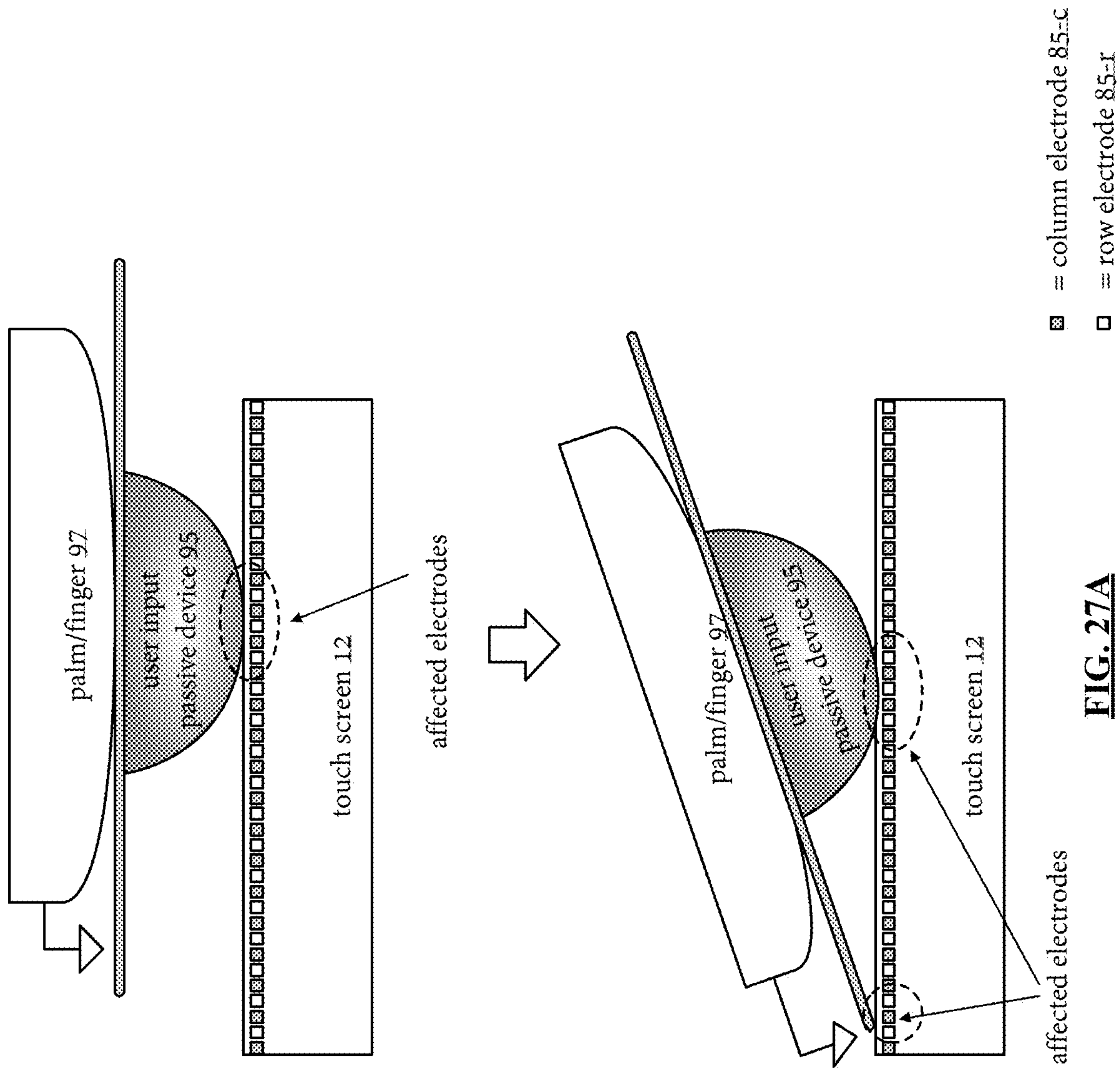
FIG. 27A is a schematic block diagram of another embodiment of the user input passive device interacting with the touch screen in accordance with the present disclosure.

FIG. 27A is a schematic block diagram of another embodiment of the user input passive device 95 interacting with the touch screen 12. In this example, the user input passive device 95 in a half spherical shape with a flat top surface. In comparison to FIG. 27, the half spherical shape shown here is shorter and smaller such that the flat top surface (e.g., the touch plate) is extends beyond the half spherical shape. The user input passive device 95 is made of a rigid conductive material such that the user input passive device 95 retains its shape when applied pressure. A user may rest a palm and/or a finger on the flat top surface to maneuver the spherical shape in various directions in one location and/or across the touch screen 12 surface.

As shown on the top of FIG. 27A, the user input passive device 95 is used in an upright position and is affecting a plurality of electrodes on the touch screen 12 surface. On the bottom, the user input passive device 95 is tilted, thus, shifting the location of the plurality of affected electrodes and affecting additional electrodes with the flat top surface.

The flat top surface of the user input passive device 95 is a conductive material. As the user input passive device 95 is tilted, the flat top surface affects electrodes of the touch screen 12 with an increasing affect (e.g., a change in capacitance increases as the flat top surface gets closer) as it approaches the surface of the touch screen 12. As such, an angle/tilt of the device can be interpreted by this information. Further, the flat top surface in close proximity to the touch screen 12 (e.g., a touch) can indicate any one of a variety of user functions by the touch screen (e.g., a selection, etc.).

Figure 28:
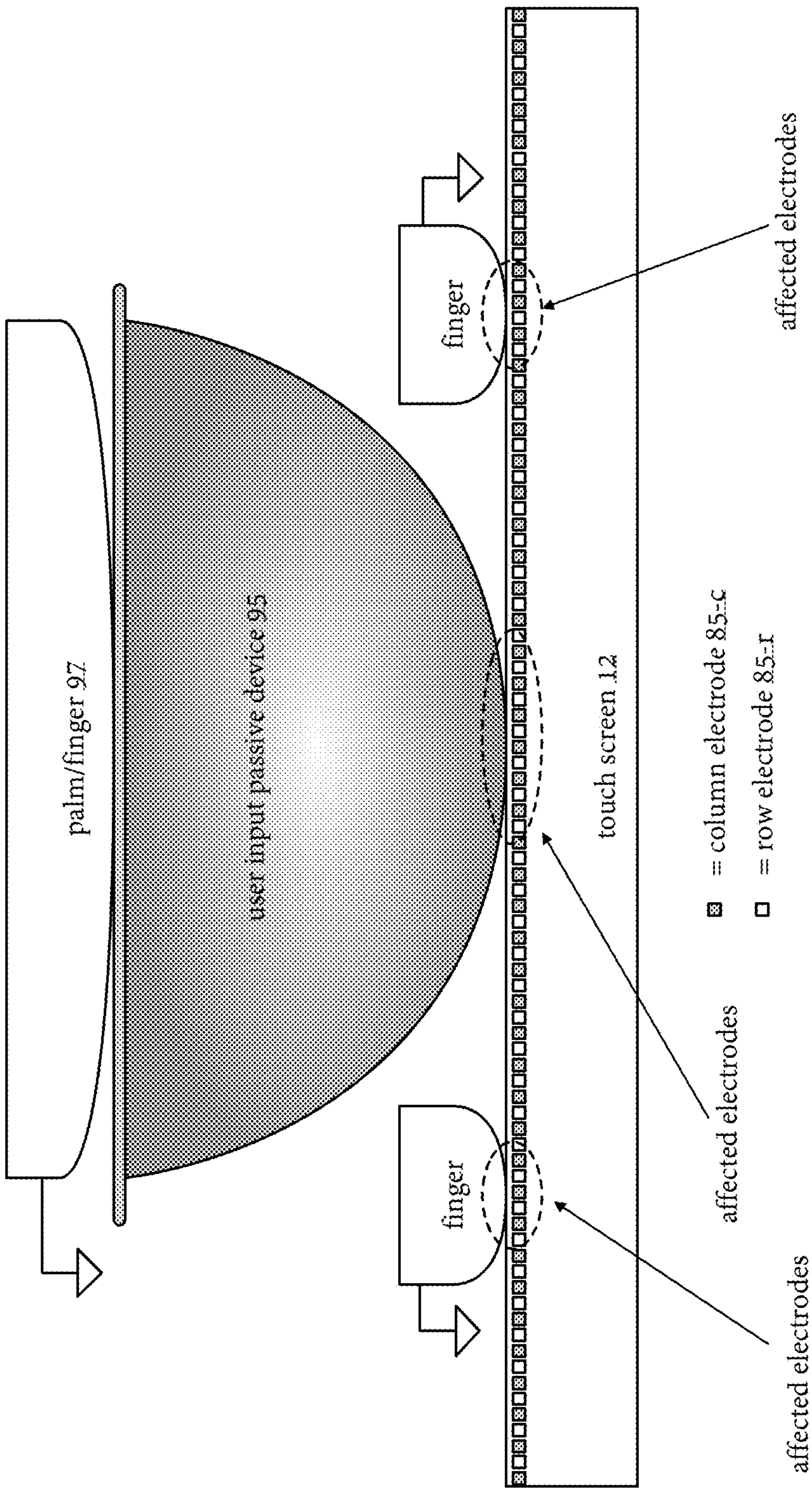
FIG. 28 is a schematic block diagram of another embodiment of the user input passive device interacting with the touch screen in accordance with the present disclosure.

FIG. 28 is a schematic block diagram of another embodiment of the user input passive device 95 interacting with the touch screen 12. In this example, the user has a palm and/or a finger on the user input passive device 95 but also has two fingers directly on the touch screen 12 surface. For example, the user has a palm and three fingers resting on the top surface of the user input passive device 95 and a thumb and pinky on either side of the user input passive device 95 directly on the touch screen 12. When interaction with the user input passive device 95 is detected (e.g., by detection of a region of affected electrodes, by the type of affected electrodes (e.g., a certain self-capacitance change is detected over a certain area, etc.) etc.), the detection of a finger touch nearby can indicate further user functions.

For example, the user input passive device 95 is directly over a list of files and a finger can be used on the touch screen to initiate a scrolling function. As another example, the user input passive device 95 is directly over an image and placing one or two fingers on the screen initiates a zooming function.

Figure 29:
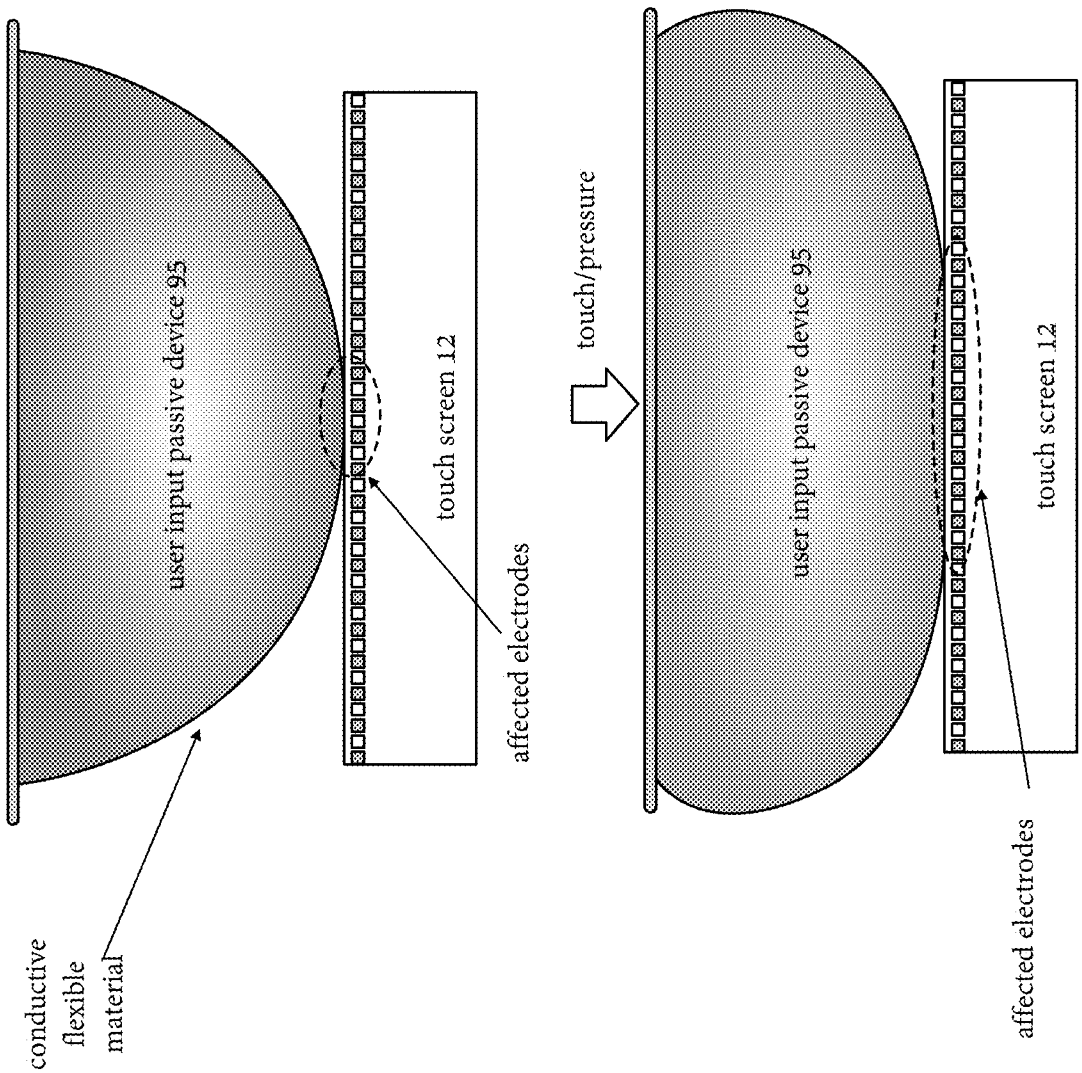
FIG. 29 is a schematic block diagram of another embodiment of the user input passive device interacting with the touch screen in accordance with the present disclosure.

FIG. 29 is a schematic block diagram of another embodiment of the user input passive device 95 interacting with the touch screen 12. In this example, the user input passive device 95 includes a flexible conductive material such that when a touch and/or pressure is applied, the user input passive device 95 changes shape. For example, when pressure is applied in the center of the top of the user input passive device 95 the area in contact with the touch screen 12 increases thus affecting more electrodes. As such, applying pressure can indicate any number of user input functions (e.g., select, zoom, etc.).

Figure 30:
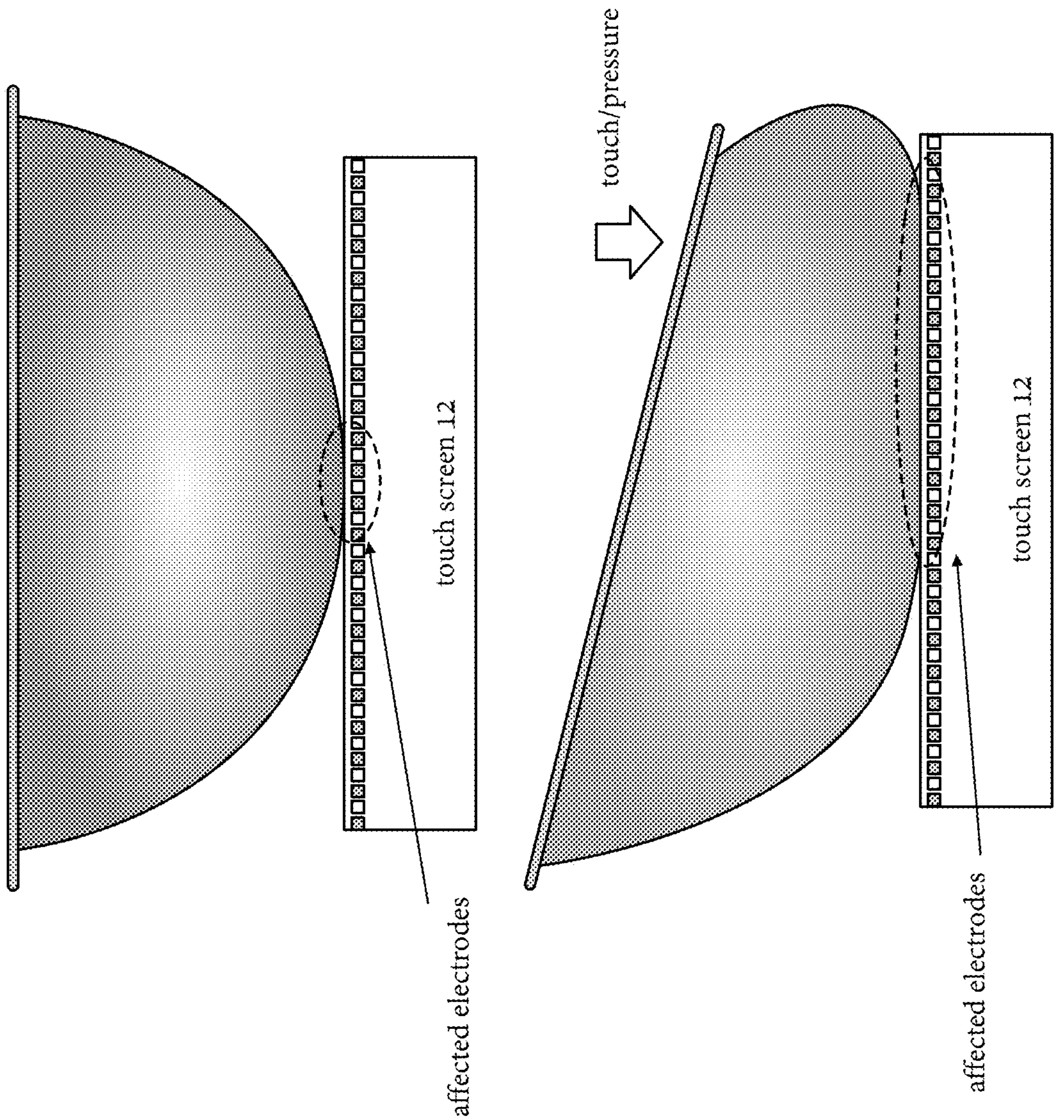
FIG. 30 is a schematic block diagram of another embodiment of the user input passive device interacting with the touch screen in accordance with the present disclosure.

FIG. 30 is a schematic block diagram of another embodiment of the user input passive device 95 interacting with the touch screen 12. FIG. 30 is similar to the example of FIG. 29 where the user input passive device 95 includes a flexible conductive material such that when a touch and/or pressure is applied, the user input passive device 95 changes shape.

In this example, pressure is applied off center on the top of the user input passive device 95. The pressure increases and shifts the area in contact with the touch screen 12 thus affecting more electrodes in a different location. Therefore, the shift in location as well as an increased number of affected electrodes can indicate any number of user input functions. For example, the user input passive device 95 can be tilted forward to indicate a movement and pressure can be applied to indicate a selection.

Figure 31A:
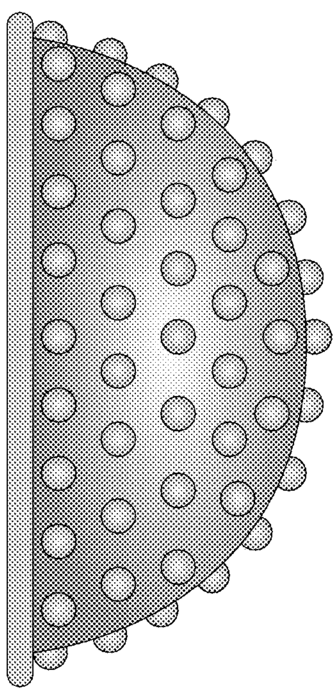
FIGS. 31A-31G are schematic block diagrams of examples of a user input passive device in accordance with the present disclosure.

FIGS. 31A-31G are schematic block diagrams of examples of the user input passive device 95. In FIG. 31A, the user input passive device 95 is a half-spherical shape with a flat top surface that includes a plurality of protruding bumps or dimples for interaction with the touch screen. The entire surface may be conductive, the dimples may be conductive, and/or some combination thereof may be conductive. The pattern and size of the dimples can aid the touch screen 12 in detecting the user input passive device 95 and interpreting user input functions.

Figure 31B:
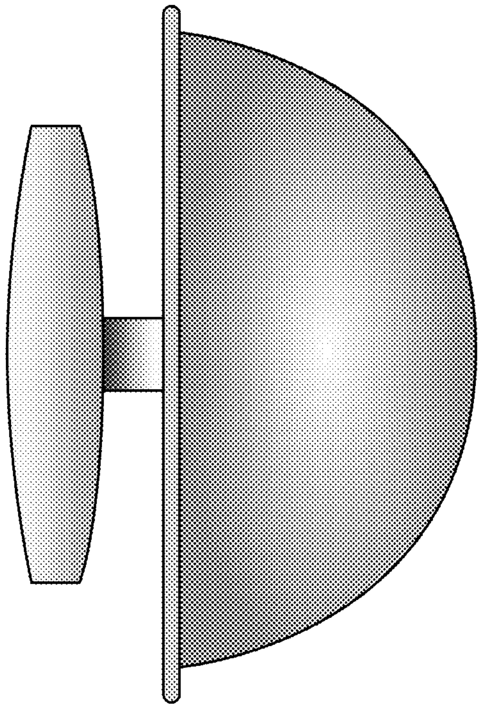

In FIG. 31B, the user input passive device 95 is a smooth, half-spherical shape with a flat top surface that includes a top handle for ease of use by the user. The top shape of the user input passive device 95 can correspond to a game piece (e.g., an air hockey striker) or resemble a gaming joy stick to allow for intuitive and easy use for a variety of applications and functions.

Figure 31C:
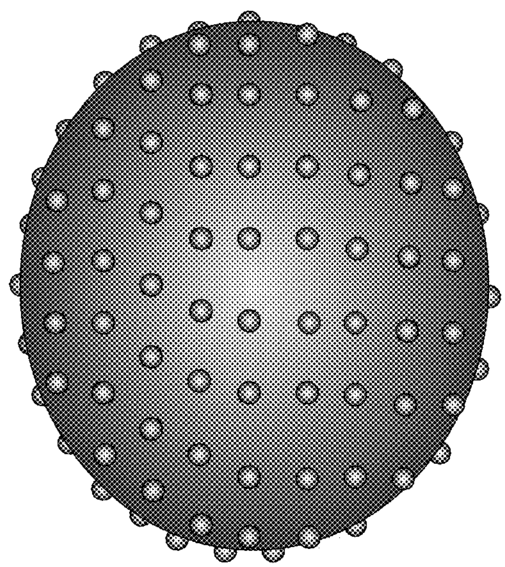

In FIG. 31C, the user input passive device 95 is a spherical shape that includes a plurality of protruding bumps or dimples for interaction with the touch screen. The entire surface may be conductive, the dimples may be conductive, and/or some combination thereof may be conductive. The pattern and size of the dimples can add the touch screen 12 in detecting the user input passive device 95 and interpreting user input functions. With a full sphere, the user can roll the user input passive device 95 across the touch screen with a palm.

Figure 31D:
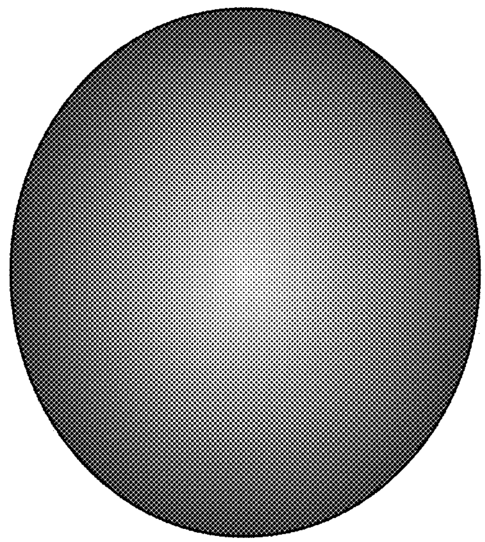
Figure 31E:
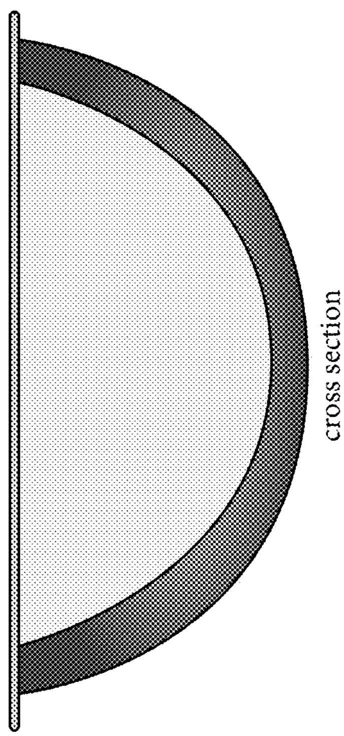

In FIG. 31D, the user input passive device 95 is a smooth spherical shape. In FIG. 31E, the user input passive device 95 a smooth, half-spherical shape with a flat top surface that has a conductive outer shell and a hollow center.

Figure 31G:
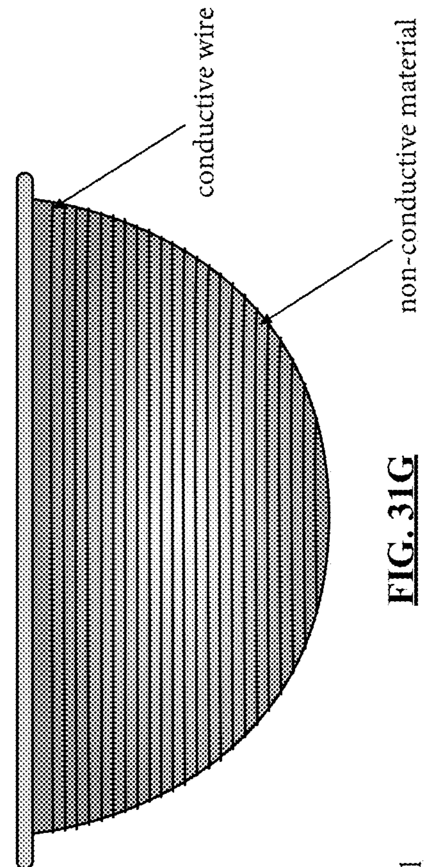
Figure 31F:
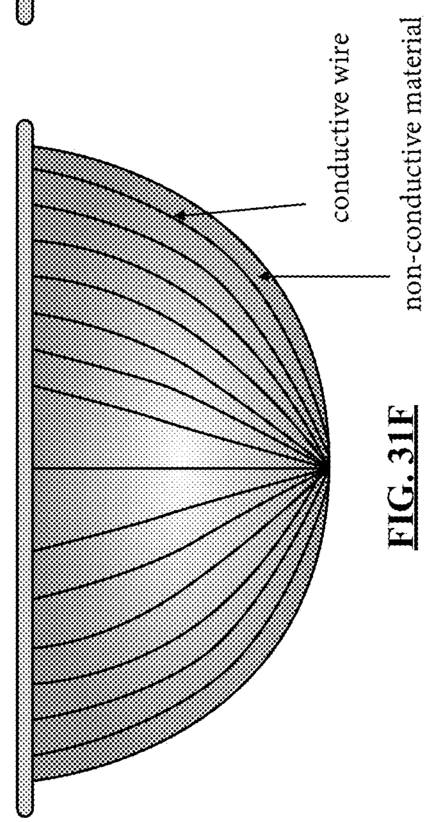

In FIG. 31F, the user input passive device 95 is a smooth, half-spherical shape with a flat top surface that includes non-conductive material and conductive wires in a radial pattern. In FIG. 31G, the user input passive device 95 is a smooth, half-spherical shape with a flat top surface that includes non-conductive material and conductive wires in a circular pattern. The examples, of FIGS. 31F and 31G are similar to FIGS. 31A and 31C in that the conductive wires interact with the touch screen 12 in a unique way and/or pattern. The unique pattern enhances user input passive device 95 detection and user function recognition.

Any of the examples described in FIGS. 31A-31G may include rigid or flexible conductive material as discussed previously.

Figure 32:
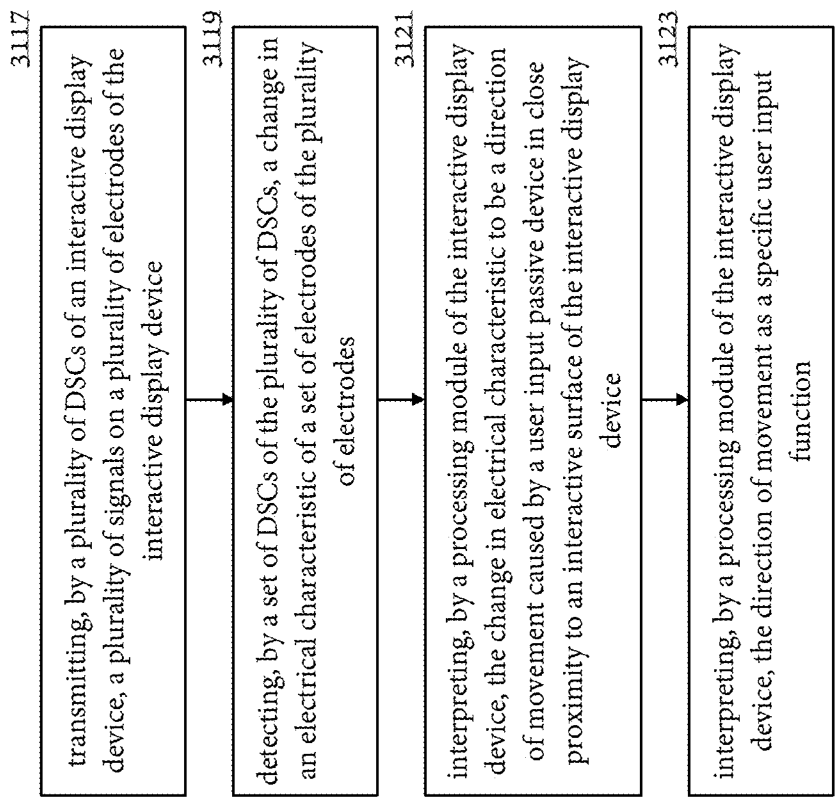
FIG. 32 is a logic diagram of an example of a method for interpreting user input from the user input passive device in accordance with the present disclosure.

FIG. 32 is a logic diagram of an example of a method for interpreting user input from the user input passive device. The user input passive device may include a conductive shell with a hollow center, a solid conductive material, a combination of conductive and non-conductive materials, etc. The user input passive device may include a spherical, half-spherical, and/or other rounded shape for user interaction with the touch screen. Examples of the user input passive device 95 will be discussed further with reference to FIGS. 27-31.

The method begins with step 3117 where a plurality of drive sense circuits (DSCs) of an interactive display device transmit a plurality of signals on a plurality of electrodes of the interactive display device. The interactive display device includes the touch screen, which may further include a personalized display area to form an interactive touch screen.

The method continues with step 3119 where a set of DSCs of the plurality of DSCs detect a change in an electrical characteristic of a set of electrodes of the plurality of electrodes. For example, the self and mutual capacitance of an electrode is affected when a user input passive device is capacitively coupled to the interactive display device.

The method continues with step 3121 where a processing module of the interactive display device interprets the change in electrical characteristic to be a direction of movement caused by a user input passive device in close proximity to an interactive surface of the interactive display device. For example, the change in electrical characteristic is an increase or decrease in self and/or mutual capacitance by a certain amount to a certain number of electrodes that is indicative of movement by the user input passive device.

The method continues with step 3123 where the processing module of the interactive display device interprets the direction of movement as a specific user input function. For example, a direction of movement may indicate a movement (e.g., in a game, with a cursor, etc.), a selection, a scroll, etc.

Figure 33:
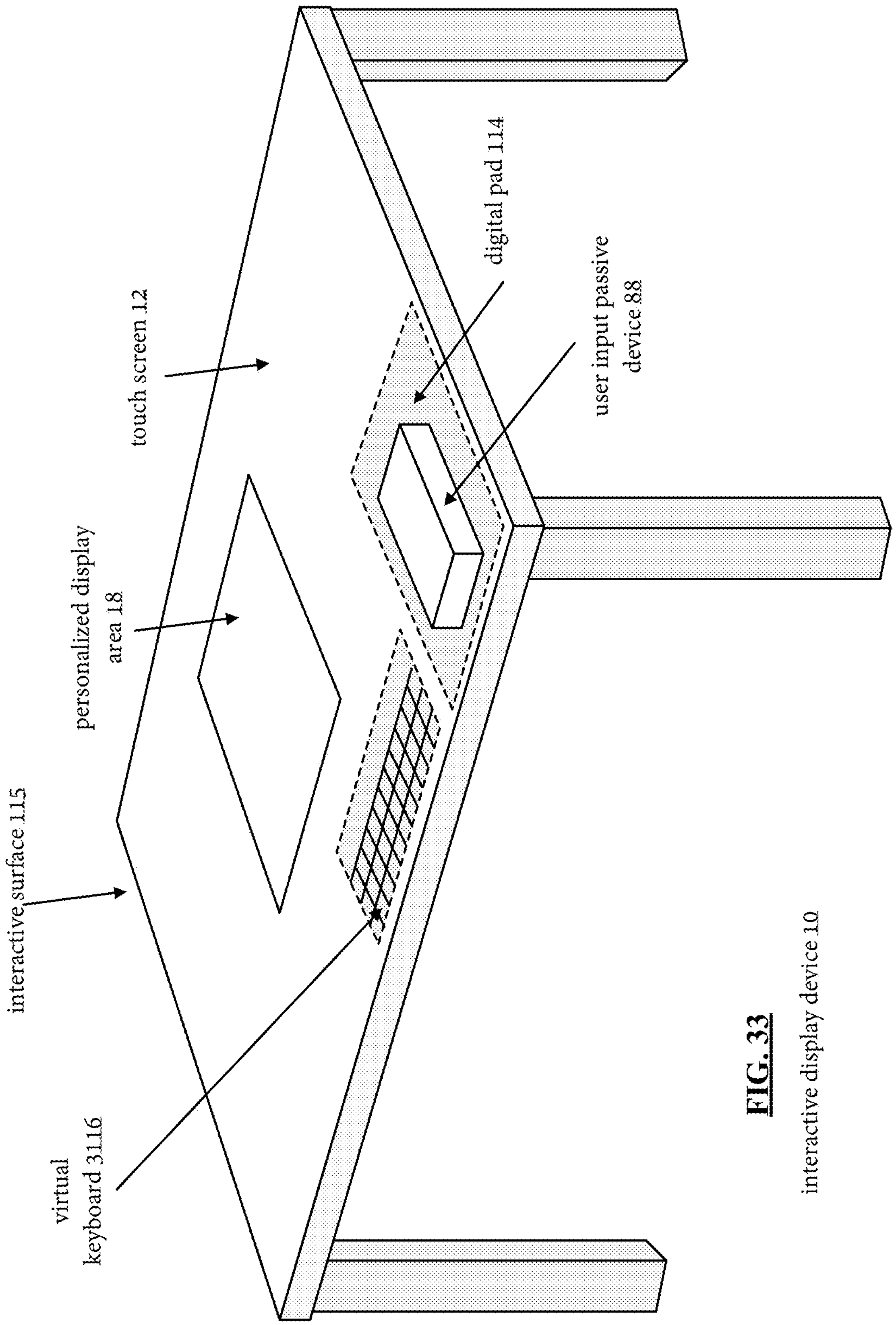
FIG. 33 is a schematic block diagram of another embodiment of the interactive display device in accordance with the present disclosure.

FIG. 33 is a schematic block diagram of another embodiment of the interactive display device 10 (e.g., shown here as an interactive table top) that includes the touch screen 12, which may further include a personalized display area 18 to form an interactive touch screen display (also referred to herein as interactive surface 115). The personalized display area 18 may extend to all of the touch screen 12 or a portion as shown. When the user input passive device 88 is in contact with the interactive surface, a digital pad 114 is generated for use with the user input passive device 98.

The interactive display device 10 is operable to interpret user inputs received from the user input passive device 88 within the digital pad 114 area as functions to manipulate data on the personalized display area 18 of the interactive display device 10. For example, moving the user input passive device 88 within the digital pad 114 maps to movements on the personalized display area 18 so that the user can execute various functions within the personalized display area 18 without having to move the user input passive device 88 onto the personalized display area 18. This is particularly useful when the personalized display area 18 is large, and the user cannot easily access the entire personalized display area.

The digital pad 114 is operable to move with the user input passive device 88 and is of a predetermined size and shape, a user defined size and shape, and/or a size and shape based on the size and shape of the user input passive device 98. Further, the size of the digital pad 114 may be determined and dynamically adjusted based on available space of the interactive display device 10 (e.g., where available space is determined based on one or more personalized display areas, detected objects, etc.). Moving the digital pad 114 onto the personalized display area 18 can cause the personalized display area 18 to adjust so that the digital pad 114 is not obstructing the personalized display area 18. Alternatively, moving the digital pad 114 onto the personalized display area 18 may disable the digital pad 114 when the user intends to use the user input passive device 88 directly on the personalized display area 18. A more detailed discussion of adjusting a personalized display area based on an obstructing object is discussed with reference to one or more of FIGS. 36-44.

When the user input passive device 88 is in contact with the interactive surface, a virtual keyboard 3116 may also be generated for use by the user. The virtual keyboard 3116 is displayed in an area of the touchscreen in accordance with the user input passive device 88's position. For example, the virtual keyboard 3116 is displayed within a few inches of where the user input passive device 88 is located. User information (e.g., location at the table, right handed or left, etc.) available from the user input passive device and/or user input aids in the display of the virtual keyboard 3116. For example, a user identifier (ID) (e.g., based on a particular impedance pattern) associated with the user input passive device 88 indicates that the user is right-handed. Therefore, the virtual keyboard 3116 is displayed to the left of the user input passive device 88.

As such, use of the user input passive device 88 triggers the generation of one or more of the digital pad 114 and the virtual keyboard 3116. Alternatively, a user input triggers the generation of one or more of the digital pad 114 and the virtual keyboard 3116. For example, the user hand draws an area (e.g., or inputs a command or selection to indicate generation of the digital pad 114 and/or the virtual keyboard 3116 is desired) on the touchscreen to be used as one or more of the digital pad 114 and the virtual keyboard 3116. When the digital pad 114 area is triggered without the user input passive device, the user can optionally use a finger and/or other capacitive device for inputting commands within the digital pad 114. As with the user input passive device 88, the interactive display device 10 is operable to interpret user inputs received within the digital pad 114 area as functions to manipulate data on the personalized display area 18 of the interactive display device 10.

As another example, a keyboard has a physical structure (e.g., a molded silicon membrane, a transparent board, etc.). The interactive display device can recognize the physical structure as a keyboard using a variety of techniques (e.g., a frequency sweep, capacitance changes, a tag, etc.) and also know its orientation (e.g., via passive device recognition techniques discussed previously). When the physical keyboard is recognized, the touch screen may display the virtual keyboard underneath the transparent structure for use by the user.

The physical keyboard includes conductive elements (e.g., conductive paint, a full conductive mechanical key structure, etc.) such that interaction with the conductive element by the user is interpreted as a keyboard function. For example, the keyboard is a molded silicon membrane with conductive paint on each key. The user physically presses down on a key such that the conductive paint contacts the touch screen. Each key may have a different conductive paint pattern such that the touch screen interprets each pattern as a different function (i.e., key selection, device ID, etc.).

The touch screen of the interactive display device 10 may further include a high resolution section for biometric input (e.g., a finger print) from a user. The biometric input can unlock one or more functions of the interactive display device 10. For example, inputting a finger print to the high resolution section may automatically display one or more of a digital pad 114, virtual keyboard 3116, and the personalized display area in accordance with that user's preferences.

Figure 34A:
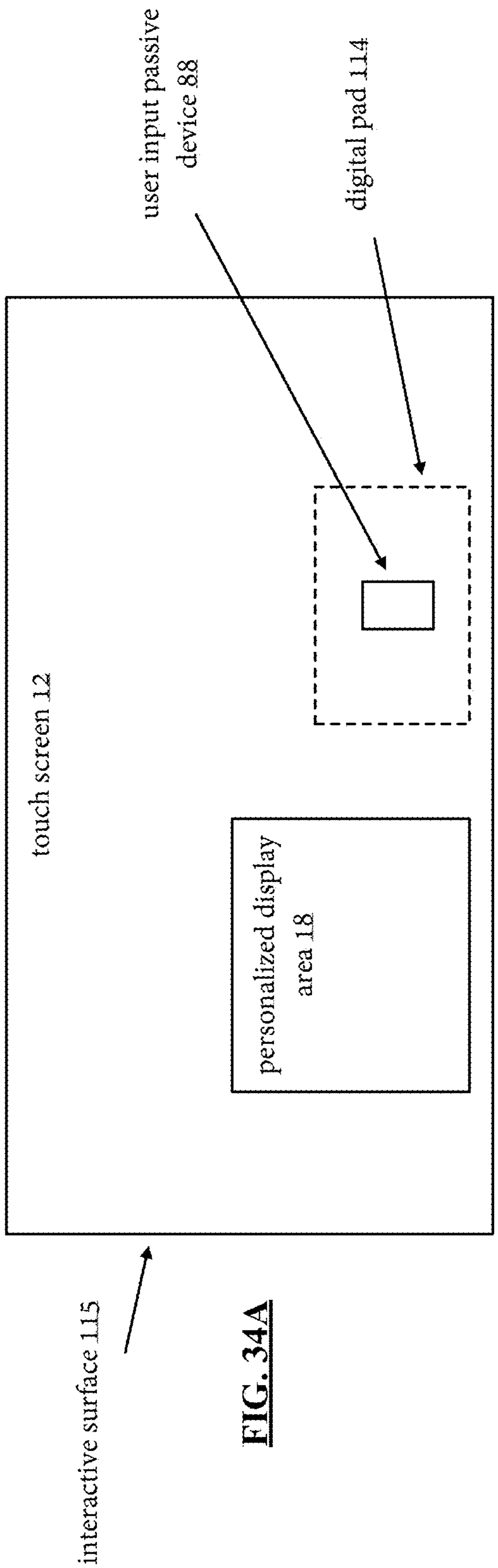
FIGS. 34A-34B are schematic block diagrams of examples of digital pad generation on a touch screen in accordance with the present disclosure.
Figure 34B:
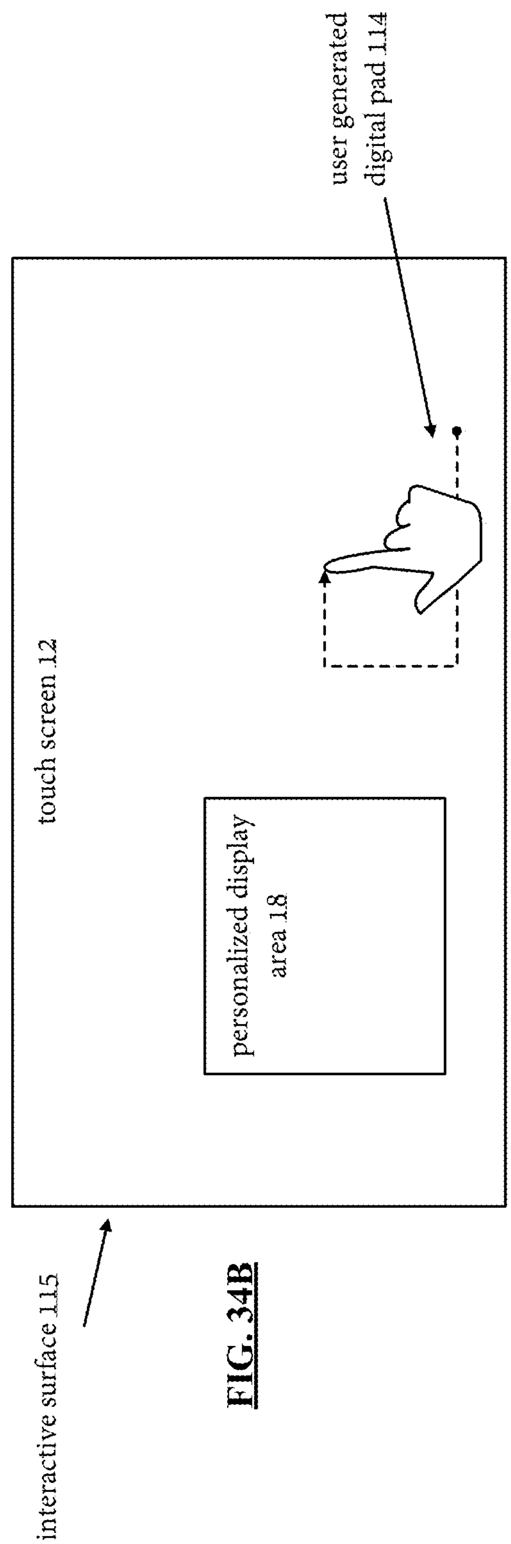

FIGS. 34A-34B are schematic block diagrams of examples of digital pad 114 generation on an interactive surface 115 of the interactive display device. Interactive surface 115 includes touch screen 12 and personalized display area 18. FIG. 34A depicts an example where using the user input passive device 88 on the interactive surface 115 triggers generation of a digital pad 114 for use with the user input passive device 88 on the interactive surface 115. For example, setting the user input passive device 88 on the interactive surface 115 generates the digital pad 114. Alternatively, a user requests generation of the digital pad 114 via an input interpreted via the user input passive device 88 or other user input.

The interactive display device 10 is operable to interpret user inputs received from the user input passive device 88 within the digital pad 114 area as functions to manipulate data on the personalized display area 18 of the interactive display device 10. For example, moving the user input passive device 88 around the digital pad 114 maps to movements around the personalized display area 18 so that the user can execute various functions within the personalized display area 18 without having to move the user input passive device 88 onto the personalized display area 18. The digital pad 114 is operable to move with the user input passive device 88 and is of a predetermined shape and size, a user defined size and shape, and/or a size and shape based on the size and shape of the user input passive device 88.

FIG. 34B depicts an example where a user input triggers the generation of the digital pad 114 for use with or without the user input passive device 98. For example, the user hand draws an area and/or inputs a command or selection to indicate generation of the digital pad 114 is desired on the interactive surface 115. When the digital pad 114 area is triggered without the user input passive device, the user can optionally use a finger or other capacitive device for inputting commands within the digital pad 114. As with the user input passive device 88, the interactive display device 10 is operable to interpret user inputs received within the digital pad 114 area as functions to manipulate data on the personalized display area 18 of the interactive display device 10.

Figure 35:
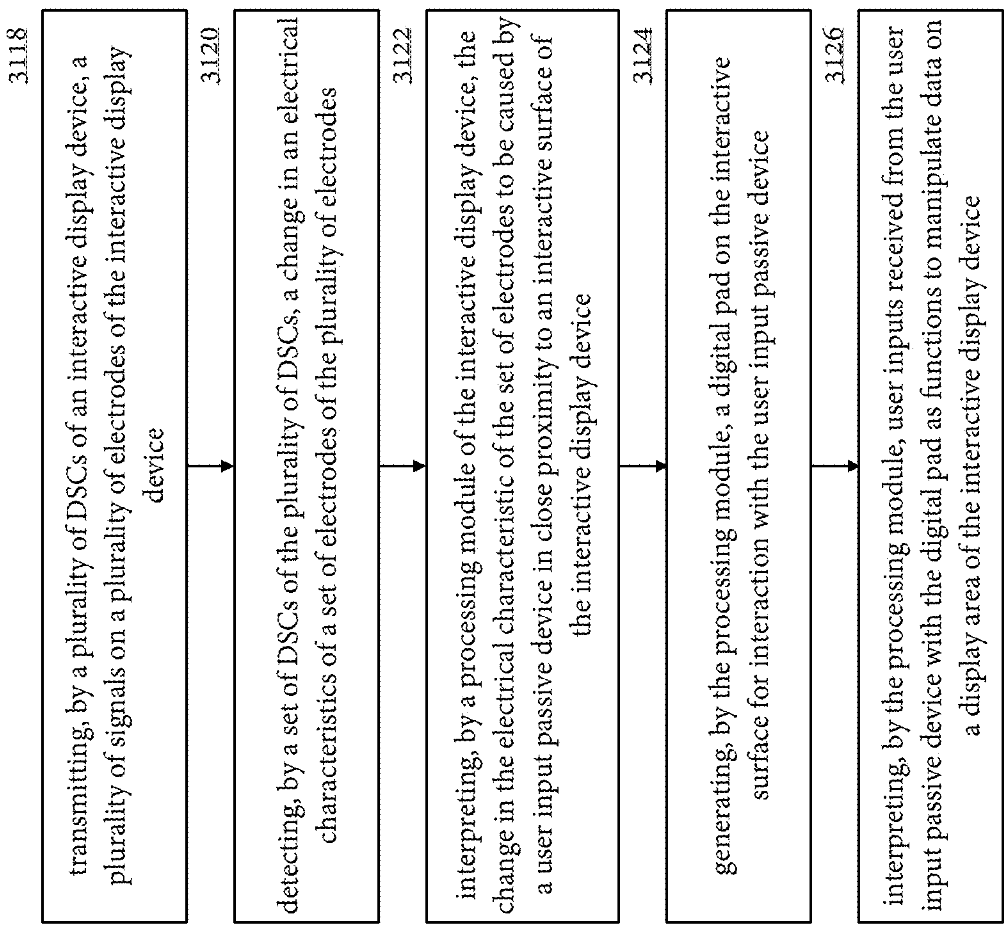
FIG. 35 is a logic diagram of an example of a method for generating a digital pad on an interactive surface of an interactive display device for interaction with a user input passive device in accordance with the present disclosure.

FIG. 35 is a logic diagram of an example of a method for generating a digital pad on an interactive surface of an interactive display device for interaction with a user input passive device. The method begins with step 3118 where a plurality of drive sense circuits (DSCs) of the interactive display device transmit a plurality of signals on a plurality of electrodes of the interactive display device.

The method continues with step 3120 where the plurality of DSCs detect a change in electrical characteristics of a set of electrodes of the plurality of electrodes. For example, the plurality of DSCs detect a change to mutual capacitance of the set of electrodes. The method continues with step 3122 where a processing module of the interactive display device interprets the change in the electrical characteristics of the set of electrodes to be caused by a user input passive device in close proximity to an interactive surface of the interactive display device. For example, the mutual capacitance change detected on the set of electrodes is an impedance pattern corresponding to a particular user input passive device. User input passive device detection is discussed in more detail with reference to one or more of FIGS. 5-32.

The method continues with step 3124 where the processing module generates a digital pad on the interactive surface for interaction with the user input passive device. The digital pad may or may not be visually displayed to the user (e.g., a visual display may include an illuminated area designating the digital pad's area, an outline of the digital pad, a full rendering of the digital pad, etc.). The digital pad moves with the user input passive device as the user input passive device moves on the interactive surface of the interactive display device. The digital pad may be of a predetermined size and shape, a size and shape based on the size and shape of the user input passive device, a size and shape based on a user selection, and/or a size and shape based on an available area of the interactive display device.

For example, available area of the interactive display device may be limited due to the size of the interactive display device, the number and size of personalized display areas, and various objects that may be resting on and/or interacting with the interactive display device. The interactive display device detects an amount of available space and scales the digital pad to fit while maintaining a size that is functional for the user input passive device. The size of the digital pad is dynamically adjustable based on the availability of usable display area on the interactive display device.

Moving the digital pad onto a personalized display area can cause the personalized display area to adjust so that the digital pad is not obstructing the view of the personalized display area. A more detailed discussion of adjusting display areas based on obstructing objects is disclosed with reference to one or more of FIGS. 36-44. Alternatively, moving the digital pad onto the personalized display area disables the digital pad so that the user input passive device can be used directly on the personalized display area.

The method continues with step 3126 where the processing module interprets user inputs received from the user input passive device within the digital pad as functions to manipulate data on a display area of the interactive display device. For example, moving the user input passive device around the digital pad maps to movements around a personalized display area of the interactive display device so that the user can execute various functions within the personalized display area without having to move the user input passive device directly onto the personalized display area.

The digital pad may also have additional functionality for user interaction. For example, the digital pad may consist of different zones where use of the user input passive device in one zone achieves one function (e.g., scrolling) and use of the user input passive device in another zone achieves another function (e.g., selecting). The digital pad is also operable to accept multiple inputs. For instance, the user input passive device as well as the user's finger can be used directly onto the digital pad for additional functionality.

In an alternative example, instead of use of the user input passive device triggering generation of the digital pad, a user input can trigger the generation of the digital pad. For example, a user can hand draw an area and/or input a command or selection to indicate generation of the digital pad on the interactive surface of the interactive display device. When the digital pad is triggered without the user input passive device, the user can optionally use a finger or other capacitive device for inputting commands within the digital pad. As with the user input passive device, the interactive display device is operable to interpret user inputs received within the digital pad area as functions to manipulate data on the personalized display area of the interactive display device.

Generation of the digital pad can additionally trigger the generation of a virtual keyboard. When the user input passive device triggers the digital pad, the virtual keyboard is displayed in an area of the interactive surface in accordance with the user input passive device's position. For example, the virtual keyboard is displayed within a few inches of where the user input passive device is located. User information (e.g., user location at a table, right handed or left handed, etc.) available from the user input passive device or other user input aids in the display of the virtual keyboard. For example, a user identifier (ID) (e.g., based on a particular impedance pattern) associated with the user input passive device indicates that the user is right handed. Therefore, the virtual keyboard is displayed to the left of the user input passive device.

Alternatively, a user input triggers the generation of the virtual keyboard. For example, the user hand draws the digital pad and the digital pad triggers generation of the virtual keyboard or the user hand draws and/or inputs a command or selection to indicate generation of the virtual keyboard on the interactive surface.

Figure 36:
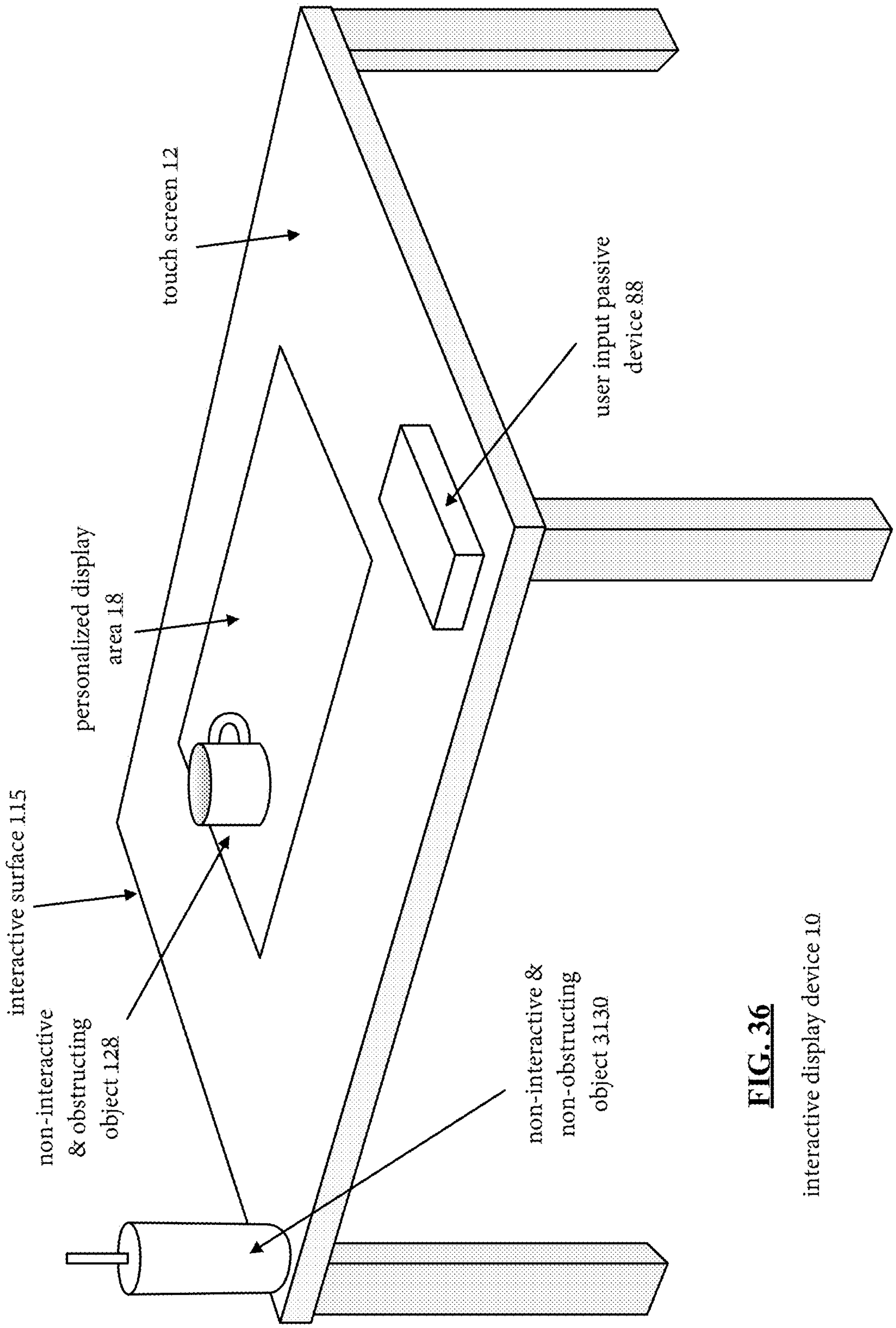
FIG. 36 is a schematic block diagram of another embodiment of the interactive display device in accordance with the present disclosure.

FIG. 36 is a schematic block diagram of another embodiment of the interactive display device 10 that includes the touch screen 12, which may further include a personalized display area 18 to form interactive surface 115. The personalized display area 18 may extend to all of the touch screen 12 or a portion as shown. The interactive display device 10 is shown here as an interactive table top that has interactive functionality (i.e., a user is able to interact with the table top via the interactive surface 115) and non-interactive functionality (i.e., the interactive table top serves as a standard table top surface for supporting various objects).

In this example, the interactive display device 10 has three objects on its surface: a non-interactive and obstructing object 128 (e.g., a coffee mug), a non-interactive and non-obstructing object 3130 (e.g., a water bottle), and a user input passive device 98. In contrast to the user input passive device 88 which the interactive display device 10 recognizes as an interactive object (e.g., via a detected impedance pattern, etc.) as discussed previously, the non-interactive objects 128 and 3130 are not recognized as items that the interactive display device 10 should interact with. The non-interactive and obstructing object 128 is an obstructing object because it is obstructing at least a portion of the personalized display area 18. The non-interactive and non-obstructing object 3130 is a non-obstructing obstructing object because it is not obstructing at least a portion of the personalized display area 18.

The interactive display device 10 detects non-interactive objects via a variety of methods. For example, the interactive display device 10 detects a two-dimensional (2D) shape of an object based on capacitive imaging (e.g., the object causes changes to mutual capacitance of the electrodes in the interactive surface 115 with no change to self-capacitance as three is no path to ground). For example, a processing module of the interactive display device 10 recognizes mutual capacitance change to a set of electrodes in the interactive surface 115 and a positioning of the set of electrodes (e.g., a cluster of electrodes are affected in a circular area) that indicates an object is present.

As another example, the interactive display device 10 implements a frequency scanning technique to recognize a specific frequency of an object and/or a material of an object and further sense a three-dimensional (3D) shape of an object. The interactive display device 10 may implement deep learning and classification techniques to identify objects based on known shapes, frequencies, and/or capacitive imaging properties.

As another example, the interactive display device 10 detects a tagged object. For example, a radio frequency identification (RFID) tag can be used to transmit information about an object to the interactive display device 10. For example, the object is a product for sale and the interactive display device 10 is a product display table at a retail store. A retailer tags the product such that placing the product on the table causes the table to recognize the object and further display information pertaining to the product. One or more sensors may be incorporated into an RFID tag to convey various information to the interactive display device 10 (e.g., temperature, weight, moisture, etc.). For example, the interactive display device 10 is a dining table at a restaurant and temperature and/or weight sensor RFID tags are used on plates, coffee mugs, etc. to alert staff to cold and/or finished food and drink, etc.

As another example, an impedance pattern tag can be used to identify an object and/or convey information about an object to the interactive display device 10. For example, an impedance pattern tag has a pattern of conductive pads that when placed on the bottom of objects is detectable by the interactive display device 10 (e.g., the conductive pads affect mutual capacitance of electrodes of the interactive display device 10 in a recognizable pattern). The impedance pattern can alert the interactive display device 10 that an object is present and/or convey other information pertaining to the object (e.g., physical characteristics of the object, an object identification (ID), etc.). As such, tagging (e.g., via RFID, impedance pattern, etc.) can change a non-interactive object into an interactive object.

As another example of an interactive object, a light pipe is a passive device that implements optical and capacitive coupling in order to extend the touch and display properties of the interactive display device beyond its surface. For example, a light pipe is a cylindrical glass that is recognizable to the interactive display device (e.g., via a tag, capacitive imaging, dielectric sensing, etc.) and may further include conductive and/or dielectric properties such that a user can touch the surface of the light pipe and convey functions to the touch screen. When placed on the interactive display device over an image intended for display, the light pipe is operable to display the image with a projected image/3-dimensional effect. The user can then interact with the projected image using the touch sense properties of touch screen via the light pipe.

When a non-interactive object and obstructing object 128 is detected by the interactive display device 10, the interactive display device 10 is operable to adjust the personalized display area 18 based on a position of a user such that the object is no longer obstructing the personalized display area 18. Examples of adjusting the personalized display area 18 such that an obstructing object is no longer obstructing the personalized display area 18 are discussed with reference to FIGS. 37A-37D.

FIGS. 37A-37D are schematic block diagrams of examples of adjusting a personalized display area 18 such that an obstructing object 128 is no longer obstructing the personalized display area 18. The interactive surface 115 of the interactive display device 10 (e.g., of FIG. 36) detects a two-dimensional shape of an object via one of the methods discussed with reference to FIG. 36. For example, an object changes mutual capacitance in electrodes of the interactive surface 115 such that the interactive surface 115 develops a capacitive image of the object. Because the personalized display area 18 is oriented toward a particular user, this known orientation is used to adjust the personalized display area with respect to the user's view. In the examples of FIGS. 37A-37D, the adjusting is done assuming a user is looking straight across from or straight down at the personalized display area 18. Generating personalized display areas according to user orientations are discussed with more detail in reference to FIGS. 45-48.

Figure 37A:
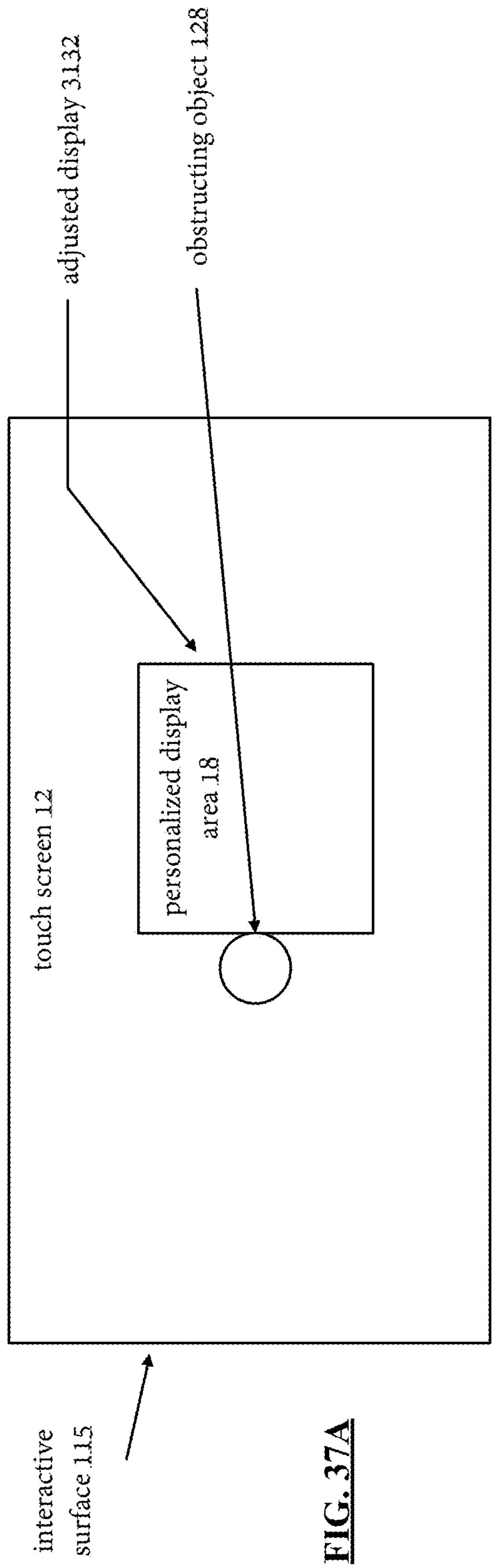
FIGS. 37A-37D are schematic block diagrams of examples of adjusting a personalized display area in accordance with the present disclosure.

In FIG. 37A, an obstructing object 128 (e.g., the coffee mug of FIG. 36) is detected and the personalized display area 18 is shifted over to create an adjusted display 3132 such that the obstructing object 128 is no longer obstructing the personalized display area 18. Adjusting the personalized display area 18 also includes determining available display space of the interactive display device 10. For example, when there is limited available space (e.g., other objects and personalized display areas are detected) the personalized display area 18 may be adjusted such that the adjusted personalized display area 18 takes up less space.

Figure 37B:
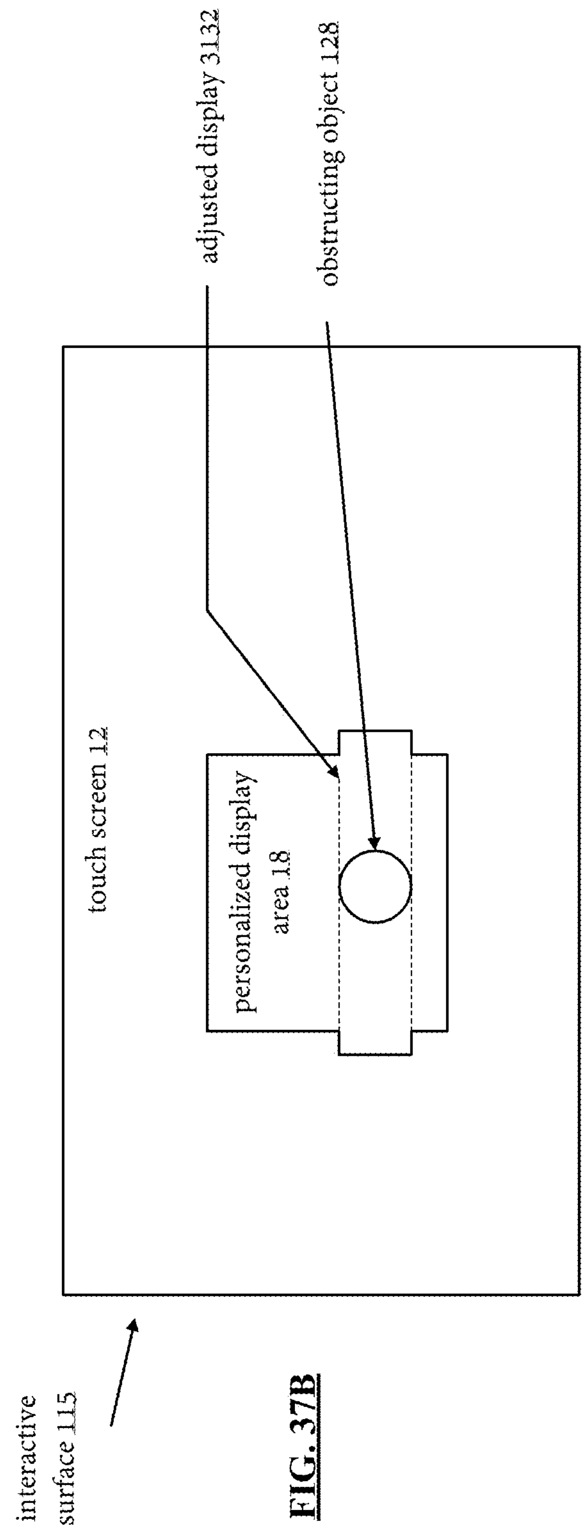

For example, in FIG. 37B, the obstructing object 128 is detected and the personalized display area 18 wraps around the obstructing object 128 to create the adjusted display 3132. The type of adjustment may also depend on the type of data that is displayed in the personalized display area 18. For example, if the personalized display area 18 displays a word document consisting of text, the best adjustment may be the example of FIG. 37A so that the text displays correctly.

Figure 37C:
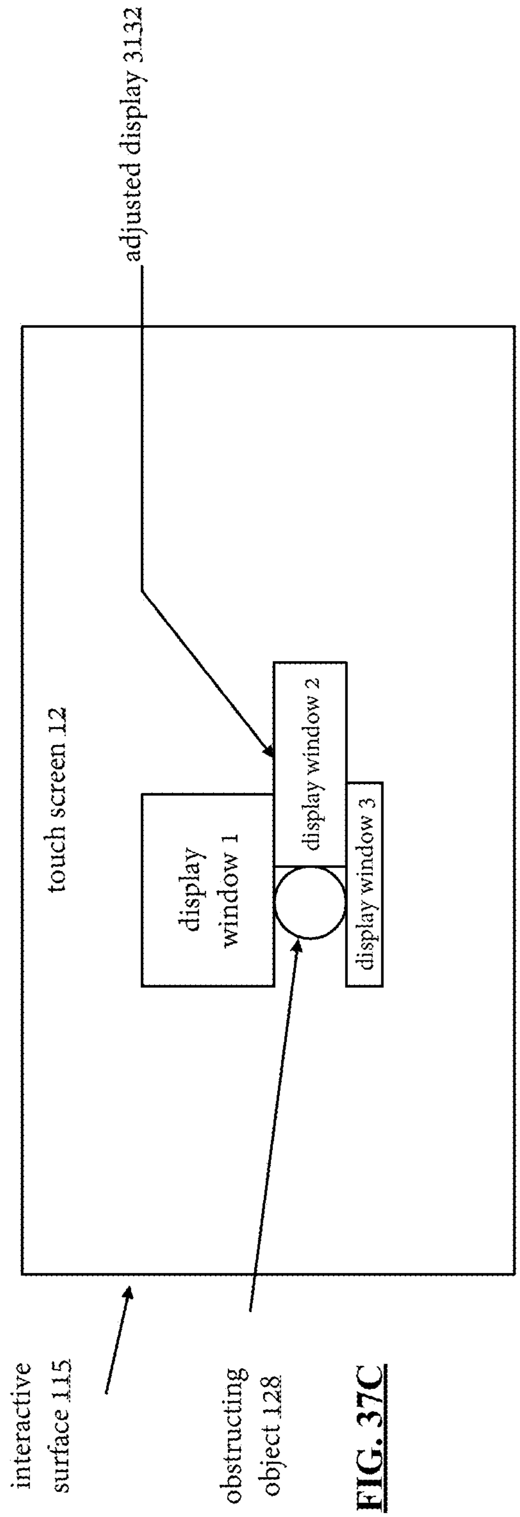
Figure 37D:
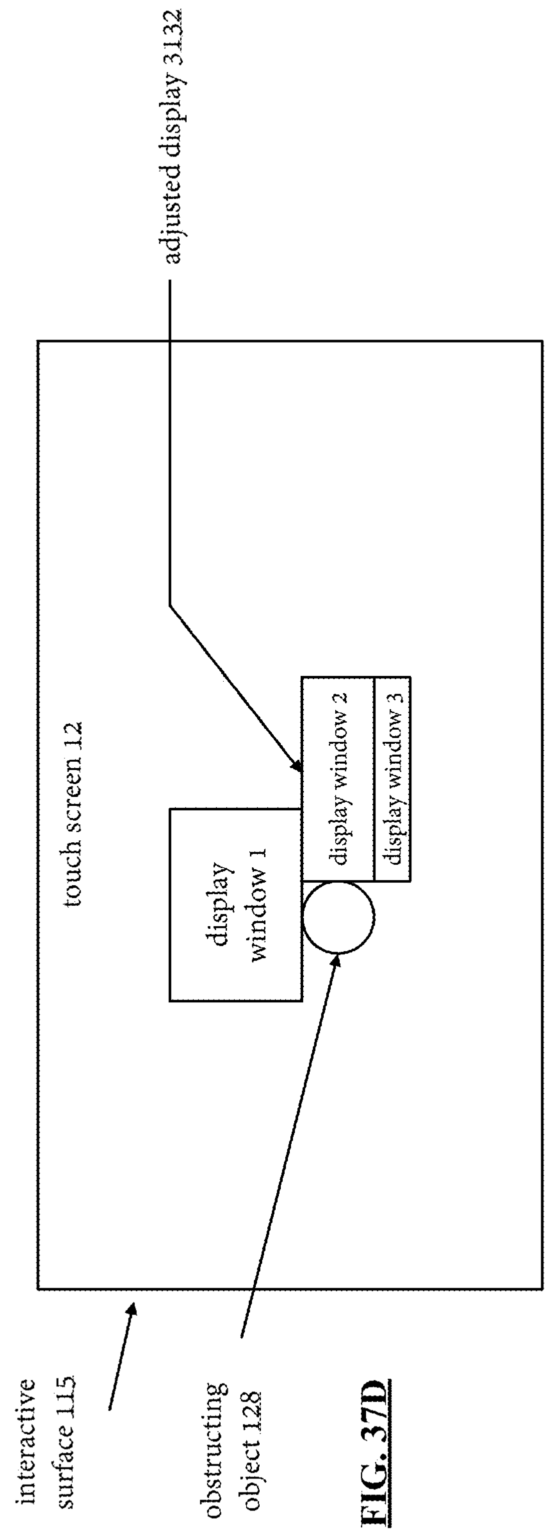

In FIG. 37C, the obstructing object 128 is detected and the personalized display area 18 is broken into three display windows where display window 2 is shifted over such that the obstructing object 128 is no longer obstructing the personalized display area 18. In FIG. 37D, the obstructing object 128 is detected and the personalized display area 18 is broken into three display windows to create adjusted display 3132 where display windows 2 and 3 are shifted over such that the obstructing object 128 is no longer obstructing the personalized display area 18.

Figure 38:
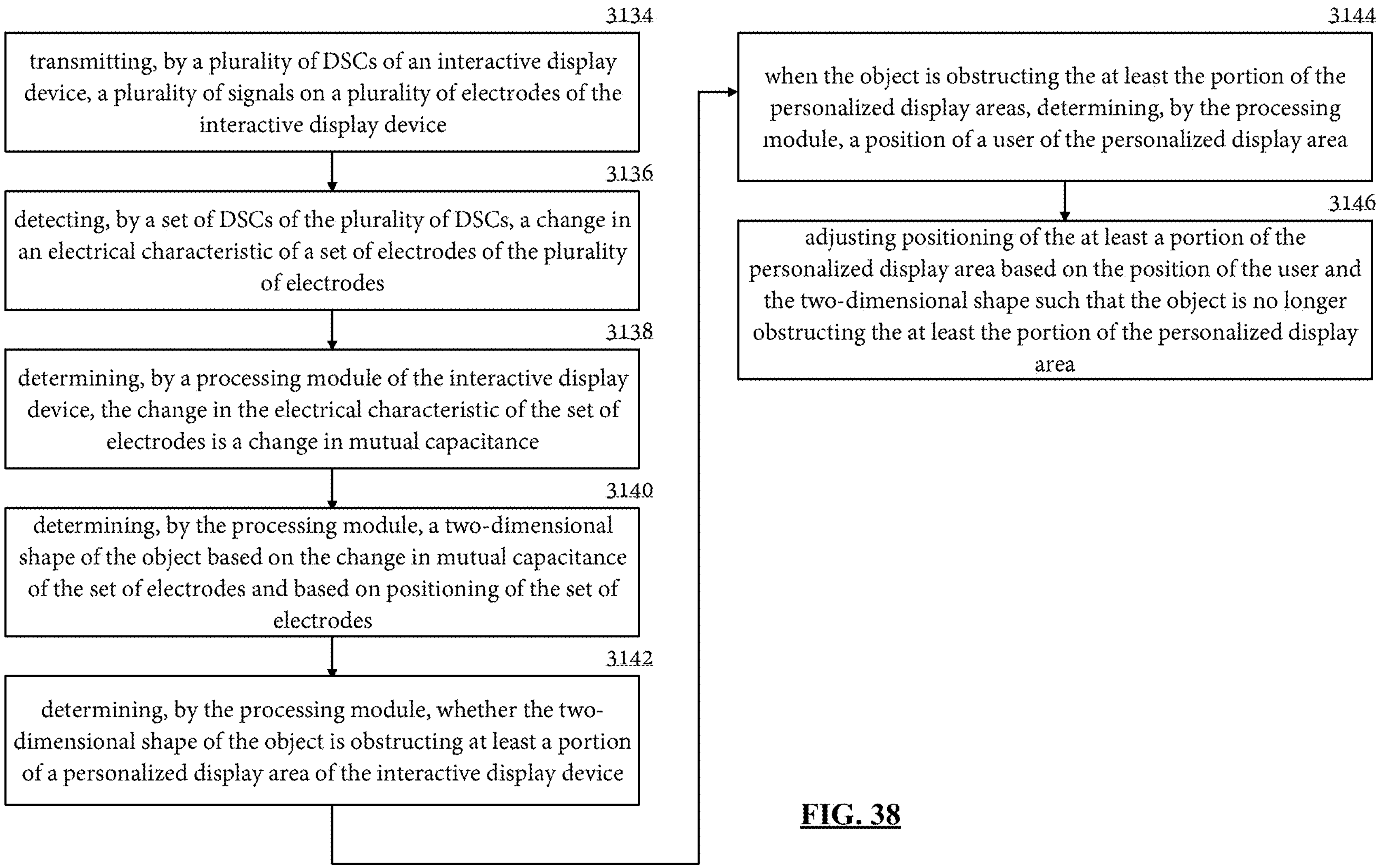
FIG. 38 is a logic diagram of an example of a method of adjusting a personalized display area based on detected obstructing objects in accordance with the present disclosure.

FIG. 38 is a logic diagram of an example of a method of adjusting a personalized display area based on detected obstructing objects. The method begins with step 3134 where a plurality of drive sense circuits (DSCs) of an interactive display device (e.g., an interactive table top such as a dining table, coffee table, end table, etc.) transmit a plurality of signals on a plurality of electrodes of the interactive display device (e.g., where the electrodes include one or more of wire trace, diamond pattern, capacitive sense plates, etc.).

The method continues with step 3136 where a set of DSCs of the plurality of DSCs detect a change in an electrical characteristic of a set of electrodes of the plurality of electrodes. The method continues with step 3138 where a processing module of the interactive display device determines that the change in the electrical characteristic of the set of electrodes is a change in mutual capacitance. The method continues with step 140 where the processing module determines a two-dimensional shape of an object based on the change in mutual capacitance of the set of electrodes and based on positioning of the set of electrodes (e.g., a cluster of electrodes are affected in a circular area).

The method continues with step 3142 where the processing module determines whether the two dimensional shape of the object is obstructing at least a portion of a personalized display area of the interactive display device. When the object is obstructing the at least the portion of the personalized display area of the interactive display device, the method continues with step 3144 where the processing module determines a position of a user of the personalized display area. For example, the personalized display area is oriented toward a particular user. Therefore, the processing module assumes a user is looking straight across from or straight down at the personalized display area from that known orientation.

The method continues with step 3146 where the processing module adjusts positioning of at least a portion of the personalized display area based on the position of the user and the two-dimensional shape, such that the object is no longer obstructing the at least the portion of the personalized display area. For example, the personalized display area is adjusted to create an adjusted display as in one or more of the examples described in FIGS. 37A-37D.

As another example, if the detected obstructing object is larger than or smaller than a certain size, the processing module can choose to ignore the item (e.g., for a certain period) and not adjust the personalized display area. For example, a briefcase is placed on the interactive display device entirely obstructing the personalized display area 18. Instead of adjusting the personalized display area 18 when the object is detected, the user is given a certain amount of time to move the item.

Figure 39:
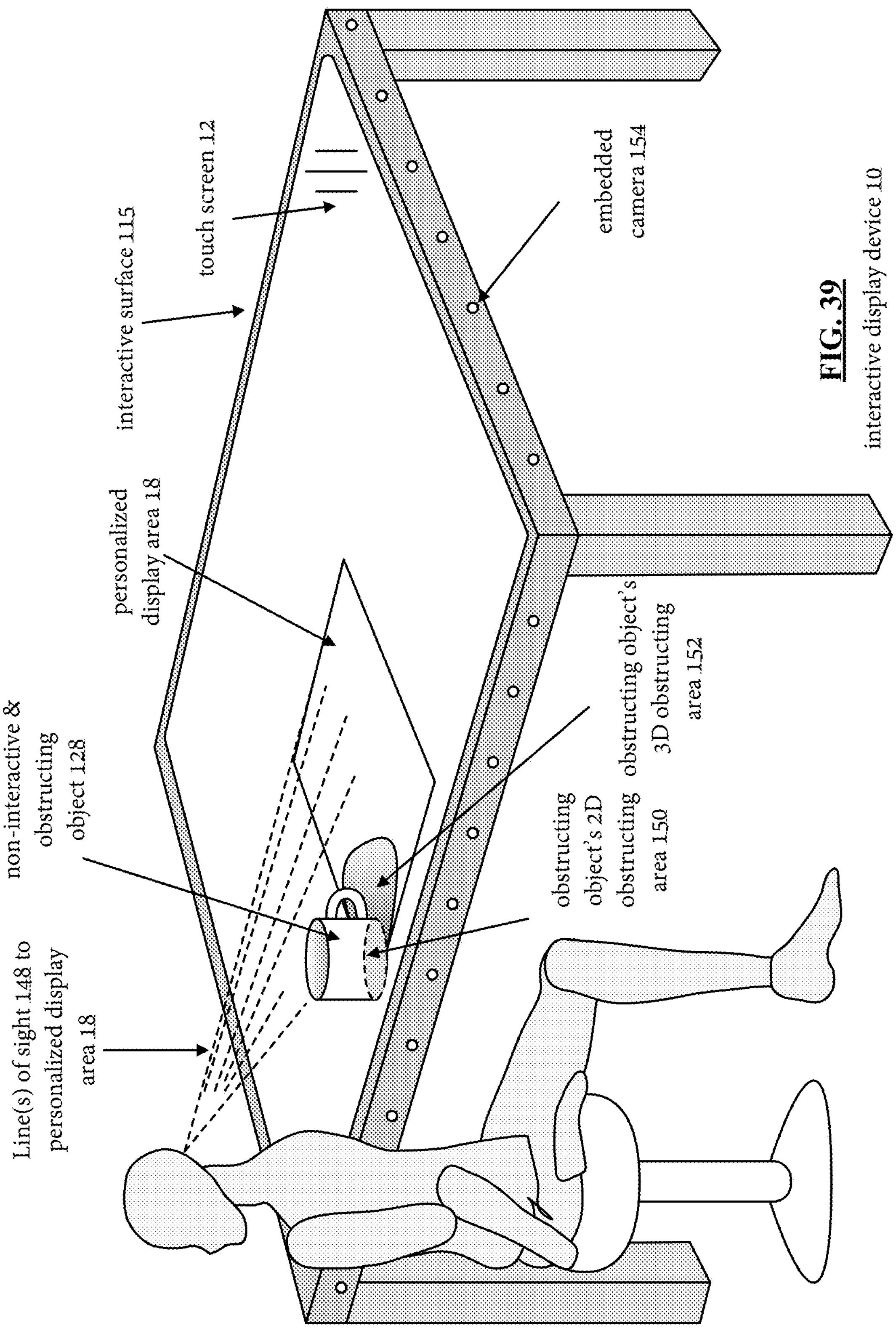
FIG. 39 is a schematic block diagram of another embodiment of the interactive display device in accordance with the present disclosure.

FIG. 39 is a schematic block diagram of another embodiment of the interactive display device 10 that includes the touch screen 12, which may further include a personalized display area 18 to form an interactive surface 115. The personalized display area 18 may extend to all of the touch screen 12 or a portion as shown. The interactive display device 10 is shown here as an interactive table top that has interactive functionality (i.e., a user is able to interact with the table top via the interactive surface 115) and non-interactive functionality (i.e., the interactive table top serves as a standard table top surface for supporting various objects). The interactive display device 10 further includes an array of embedded cameras 154 facing outward from a border of the interactive display device 10 separate from the interactive surface 115 (e.g., not incorporated into a top or bottom surface of the interactive display device 10).

In this example, a user is seated at the interactive display device 10 such that the user has line(s) of sight 148 to a personalized display area 18 on the interactive surface 115. The interactive display device 10 detects a non-interactive and obstructing object 128 (e.g., a coffee mug) in any method described with reference to FIG. 36 (e.g., capacitive imaging). The detection provides the obstructing object's two-dimensional (2D) obstructing area 150. The methods discussed with reference to FIG. 36 can determine three-dimensional (3D) characteristics of an object (e.g., via frequency scanning, classification, deep learning, and/or tagging, etc.). However, the obstructing object's 3D obstructing area 152 changes based on the user's lines of sight 148 to the personalized display area 18. The user's line of sight 148 changes based on the height of the user, whether the user is sitting or standing, a position of the user (e.g., whether the user is leaning onto the table top or sitting back in a chair), etc.

Here, the user is shown sitting straight up in a chair and looking directly down at the personalized display area 18 such that the obstructing object 128 is between the lines of sight 148 and the personalized display area 18. Thus, the obstructing object's 3D obstructing area 152 is a small shadow behind the obstructing object 128. In order to gain information regarding a user's line(s) of sight, the interactive display device 10 includes an array of embedded cameras 154. Image data from the embedded cameras 154 is analyzed to determine a position of the user with respect to the personalized display area 18, an estimated height of the user, whether the user is sitting or standing, etc. The image data is then used to determine the obstructing object's 3D obstructing area 152 in order to adjust the personalized display area 18 accordingly.

Figure 40:
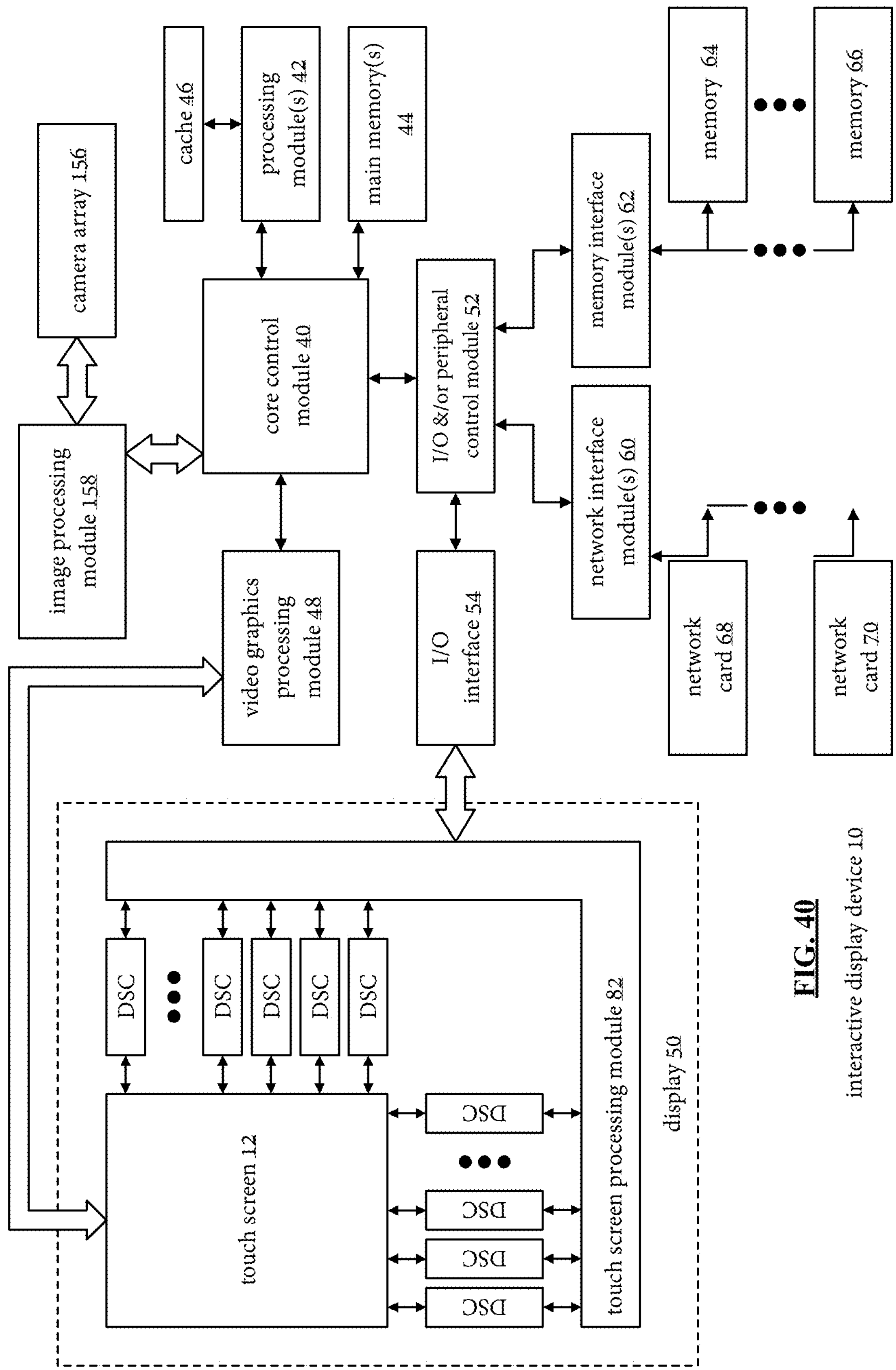
FIG. 40 is a schematic block diagram of another embodiment of the interactive display device in accordance with the present disclosure.

FIG. 40 is a schematic block diagram of another embodiment of the interactive display device 10 that includes a core control module 40, one or more processing modules 42, one or more main memories 44, cache memory 46, a video graphics processing module 48, a display 50, an Input-Output (I/O) peripheral control module 52, one or more input interface modules, one or more output interface modules, one or more network interface modules 60, one or more memory interface modules 62, an image processing module 158, and a camera array 156.

The interactive display device 10 operates similarly to the example of FIG. 2 except the interactive display device 10 of FIG. 40 includes the image processing module 158 and the camera array 156. The camera array 156 includes a plurality of embedded cameras. The cameras are embedded in a portion of the interactive display device 10 to capture images surrounding the interactive display device 10. For example, the interactive display device 10 is an interactive table top (e.g., a coffee table, a dining table, etc.) and the cameras are embedded into a structural side perimeter/border of the table (e.g., not embedded into the interactive surface of the interactive display device 10).

The cameras of the camera array 156 are small and may be motion activated such that when a user approaches the interactive display device 10, the cameras activated by the motion capture a series of images of the user. Alternatively, the cameras of the camera array 156 may capture images at predetermined intervals and/or in response to a command. The camera array 156 is coupled to the image processing module 158 and communicates captured images to the image processing module 158. The image processing module 158 processes the captured images to determine user characteristics (e.g., height, etc.) and positional information (e.g., seated, standing, distance, etc.) at the interactive display device 10 and sends the information to the core module 40 for further processing.

The image processing module 158 is coupled to the core module 40 where the core module 40 processes data communications between the image processing module 158, processing modules 42, and video graphics processing module 48. For example, the processing modules 42 detects a two dimensional object is obstructing a personalized display area 18 of the interactive display device 10. The user characteristics and/or positional information from image processing module 158 are used to further determine a three-dimensional obstructed area of the personalized display area 18 where the processing modules 42 and video graphics processing module 48 can produce an adjusted personalized display area based on the three-dimensional obstructed area for display to the user accordingly.

Figure 41:
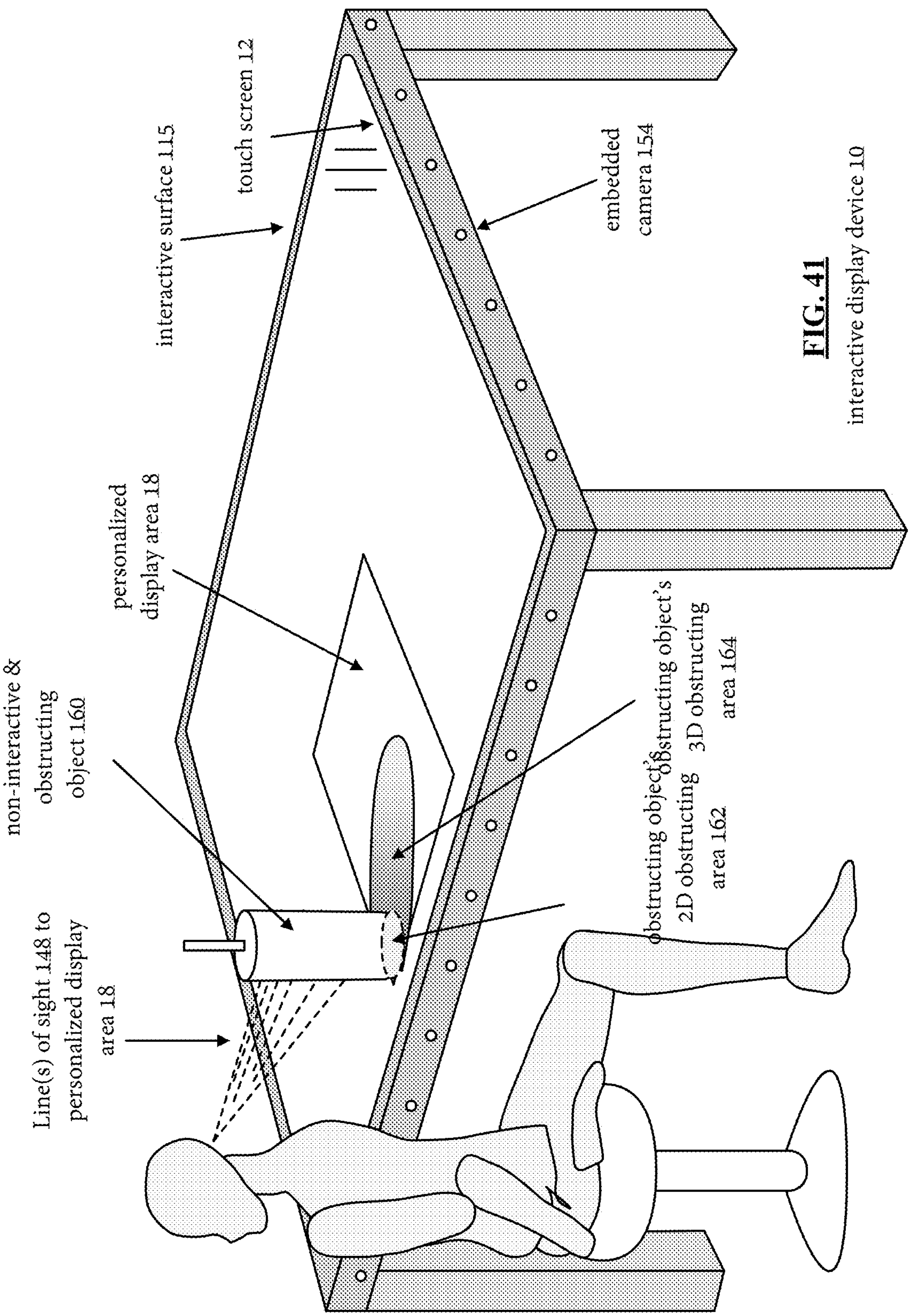
FIG. 41 is a schematic block diagram of another embodiment of the interactive display device in accordance with the present disclosure.

FIG. 41 is a schematic block diagram of another embodiment of the interactive display device 10 that includes the touch screen 12, which may further include a personalized display area 18 to form an interactive surface 115. FIG. 41 is similar to the example of FIG. 39 except that a taller non-interactive and obstructing object 160 is depicted (e.g., a water bottle) on the interactive surface 115. In comparison to FIG. 39, the obstructing object's two dimensional (2D) obstructing area 162 is approximately the same however the obstructing object's three dimensional (3D) obstructing area 164 is much larger due to the height of the obstructing object 160.

The object detection methods discussed with reference to FIG. 36 can determine 3D characteristics of an object 160 (e.g., via frequency scanning, classification, deep learning, and/or tagging, etc.). Once 3D characteristics are determined, an estimation of the obstructing object's 3D obstructing area 164 can be determined based on a predicted user orientation to the personalized display area 18. However, a more accurate obstructing object 3D obstructing area 164 can be determined by determining the user's line of sight 148 to the personalized display area 18 based on image data captured by the embedded cameras 154. For example, the image data can show that the user is sitting off to the side of the personalized display area 18 looking down such that the obstructing object 160 is directly between the user's line of sight 148 and the personalized display area 18.

Figure 42:
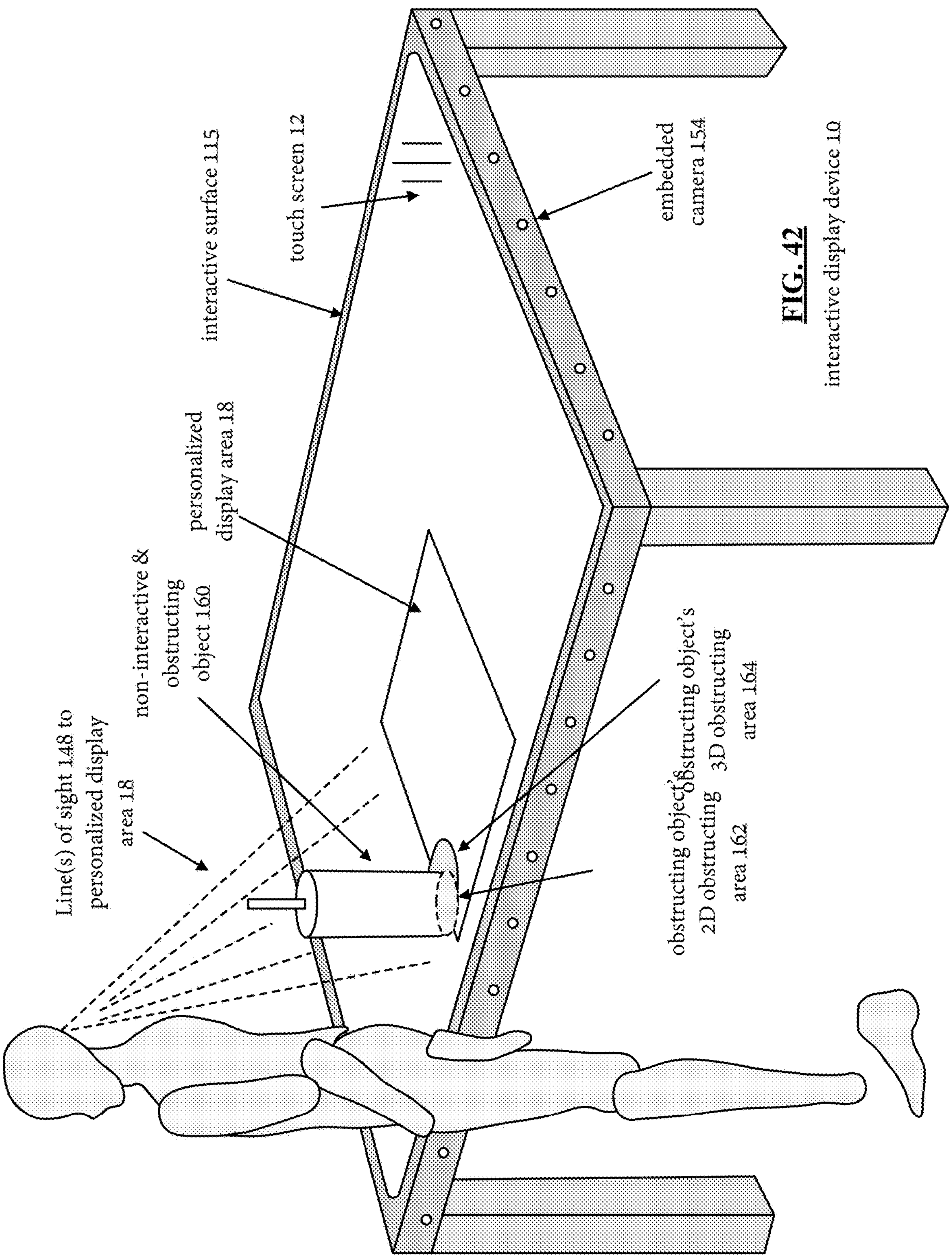
FIG. 42 is a schematic block diagram of another embodiment of the interactive display device in accordance with the present disclosure.

FIG. 42 is a schematic block diagram of another embodiment of the interactive display device 10 that includes the touch screen 12, which may further include a personalized display area 18 to form an interactive surface 115. FIG. 42 is similar to FIG. 41 except that the user is now standing at the interactive display device 10 instead of sitting. In comparison to FIG. 41, the obstructing object's two dimensional (2D) obstructing area 162 is approximately the same however the obstructing object's three dimensional (3D) obstructing area 164 is now much smaller due to the user's improved line of sight 148 to the personalized display area 18.

Therefore, FIG. 42 illustrates that to determine an accurate obstructing object 3D obstructing area 164, a user's line of sight 148 to the personalized display area 18 needs to be determined (e.g., by capturing image data by the embedded cameras 154 for analysis).

FIGS. 43A-43E are schematic block diagrams of examples of adjusting a personalized display area 18 such that an obstructing object's two-dimensional (2D) obstructing area and three-dimensional (3D) obstructing area (e.g., obstructing object's 2D obstructing area 162 and obstructing object's 3D obstructing area 164 of FIG. 42) are no longer obstructing the personalized display area 18.

Figure 43A:
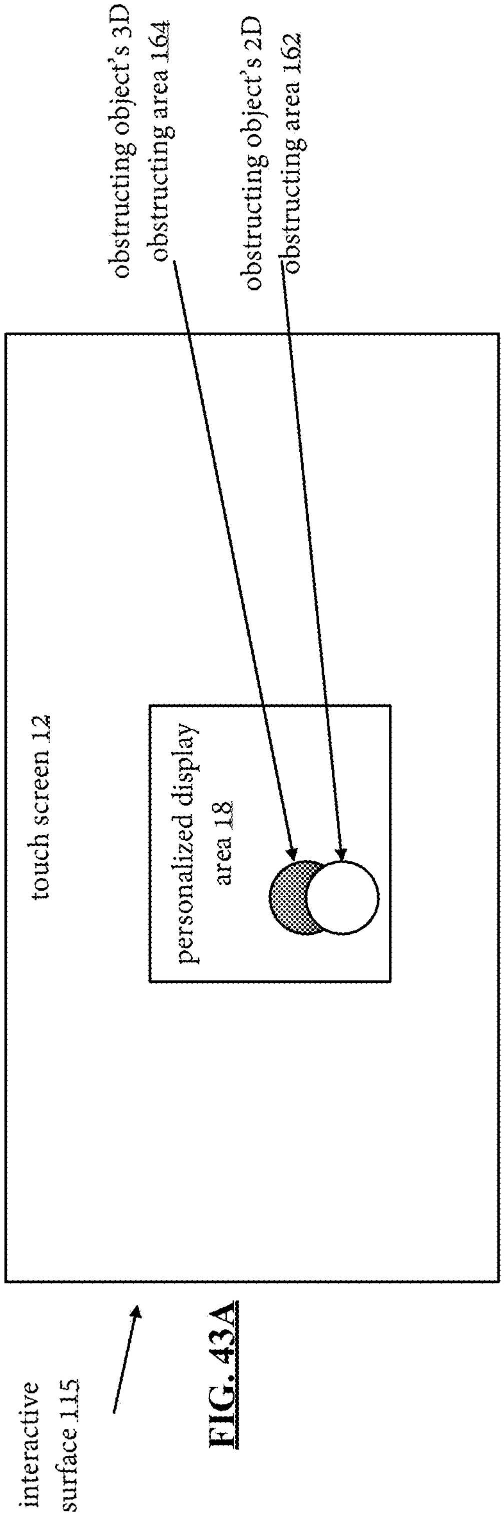
FIGS. 43A-43E are schematic block diagrams of examples of adjusting a personalized display area in accordance with the present disclosure.

In FIG. 43A, the interactive surface 115 detects a 2D and/or 3D shape of an object via one of the methods discussed previously. For example, an object changes mutual capacitance in electrodes of the interactive surface 115 such that the interactive surface 115 develops a 2D capacitive image of the object. The interactive surface 115 also processes image data captured by a camera array to determine an accurate 3D obstructing area based on a user's line of sight, user characteristics, and/or other user positional information. The personalized display area 18 is then adjusted accordingly.

Figure 43B:
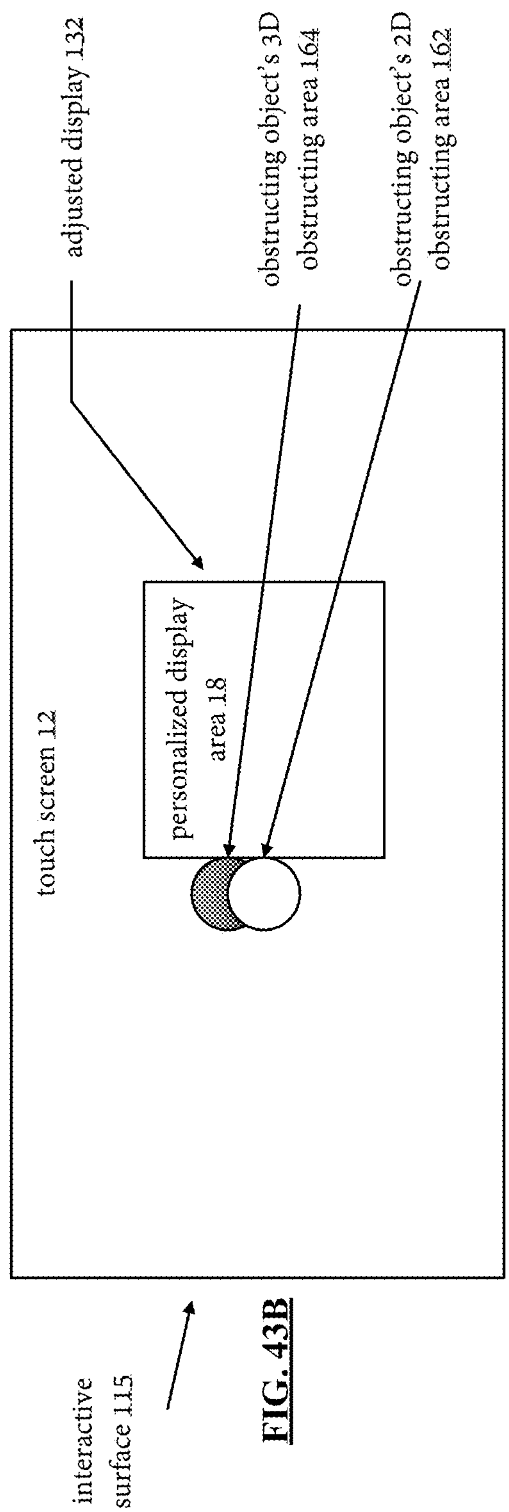

In FIG. 43B, the obstructing object's 2D obstructing area 162 and the obstructing object's 3D obstructing area 164 are detected and the personalized display area 18 is shifted over to create an adjusted display 3132 such that the obstructing object's 2D obstructing area 162 and the obstructing object's 3D obstructing area 164 are no longer obstructing the personalized display area 18. Adjusting the personalized display area 18 also includes determining available display space of the interactive display device 10. For example, when there is limited available space (e.g., other objects and personalized display areas are detected) the personalized display area 18 may be adjusted in a way that takes up less space on the interactive surface 115.

Figure 43C:
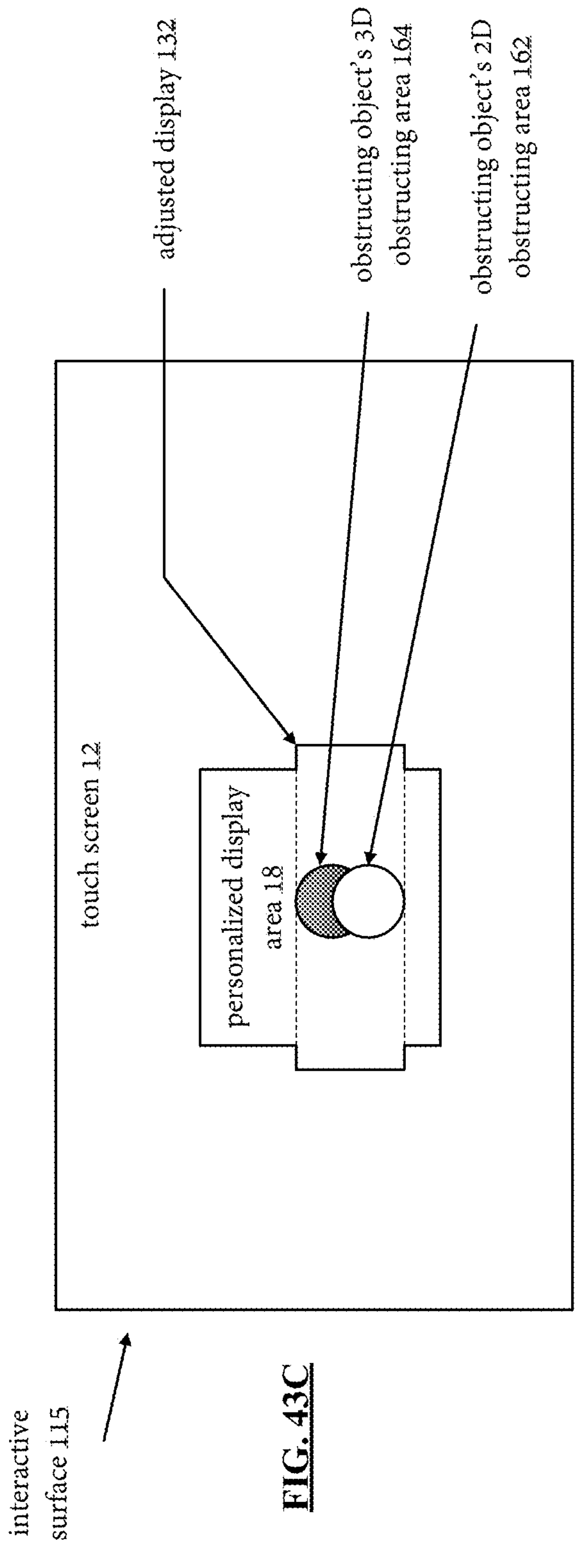

For example, in FIG. 43C, the obstructing object's 2D obstructing area 162 and the obstructing object's 3D obstructing area 164 are detected and the personalized display area 18 wraps around the obstructing object's 2D obstructing area 162 and the obstructing object's 3D obstructing area 164 to create an adjusted display 3132. The type of adjustment may also depend on the type of data that is displayed in the personalized display area 18. For example, if the personalized display area 18 displays a word document consisting of text, the best adjustment may be the example of FIG. 43B so that the text displays correctly.

Figure 43D:
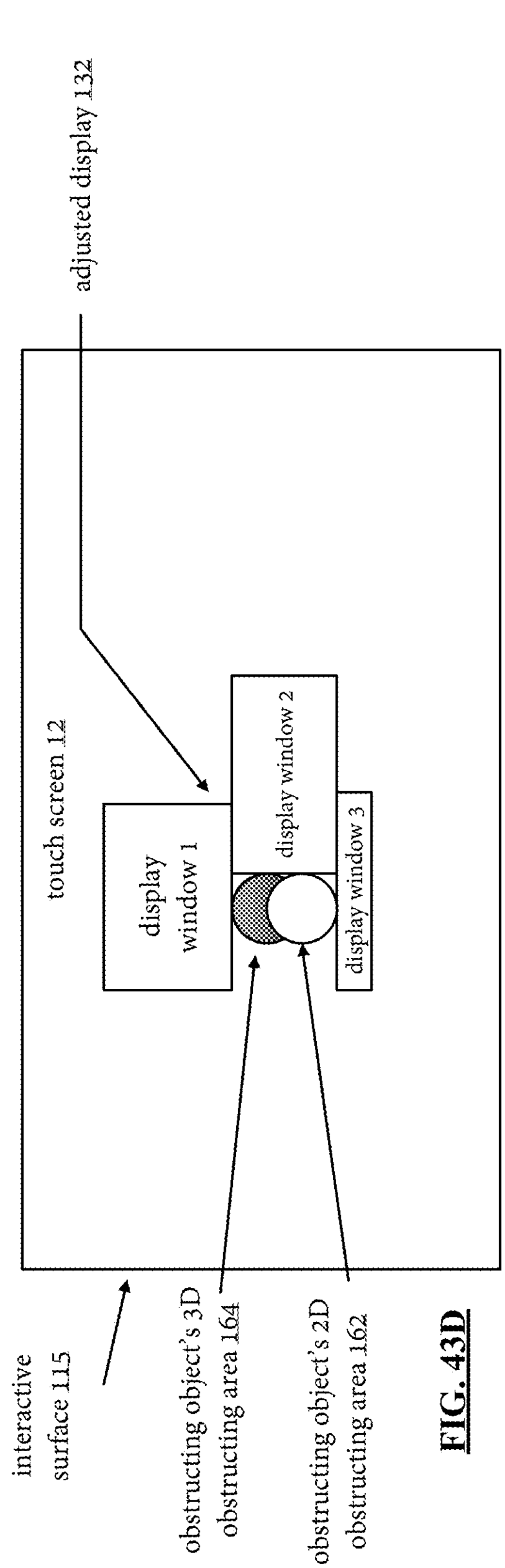

In FIG. 43D, the obstructing object's 2D obstructing area 162 and the obstructing object's 3D obstructing area 164 are detected and the personalized display area 18 is broken into three display windows where display window 2 is shifted over such that the obstructing object's 2D obstructing area 162 and the obstructing object's 3D obstructing area 164 are no longer obstructing the personalized display area 18.

Figure 43E:
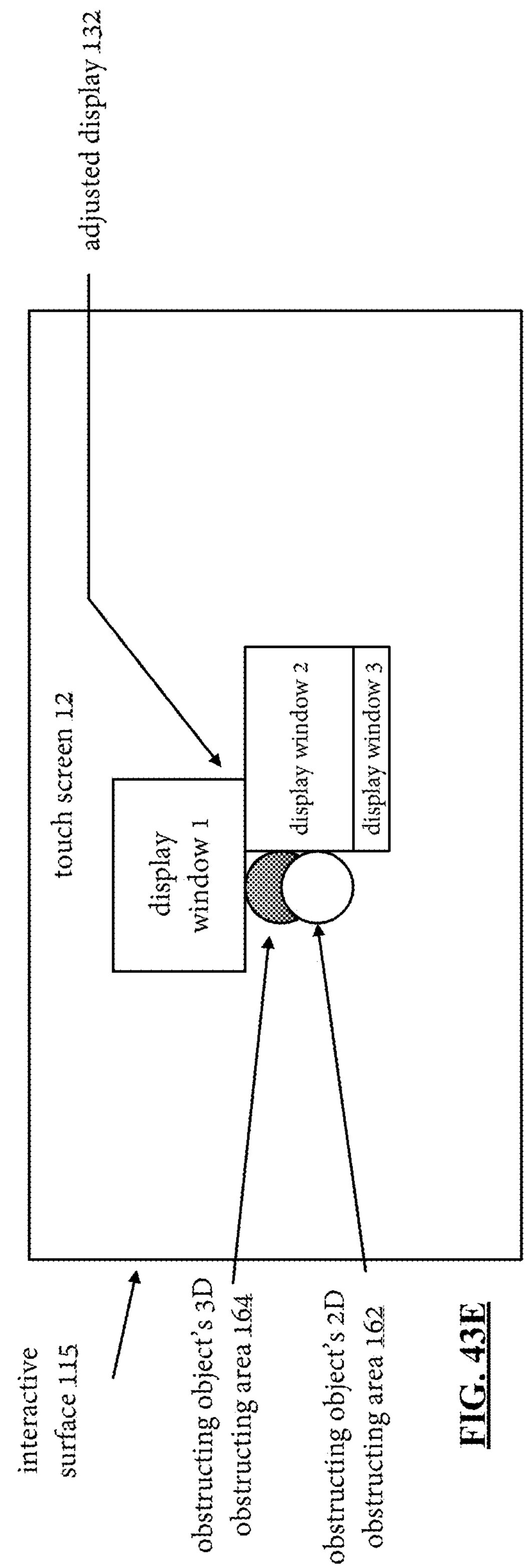

In FIG. 43E, the obstructing object's 2D obstructing area 162 and the obstructing object's 3D obstructing area 164 are detected and the personalized display area 18 is broken into three display windows to create an adjusted display 3132 where display windows 2 and 3 are shifted over such that the obstructing object's 2D obstructing area 162 and the obstructing object's 3D obstructing area 164 are no longer obstructing the personalized display area 18.

Figure 44:
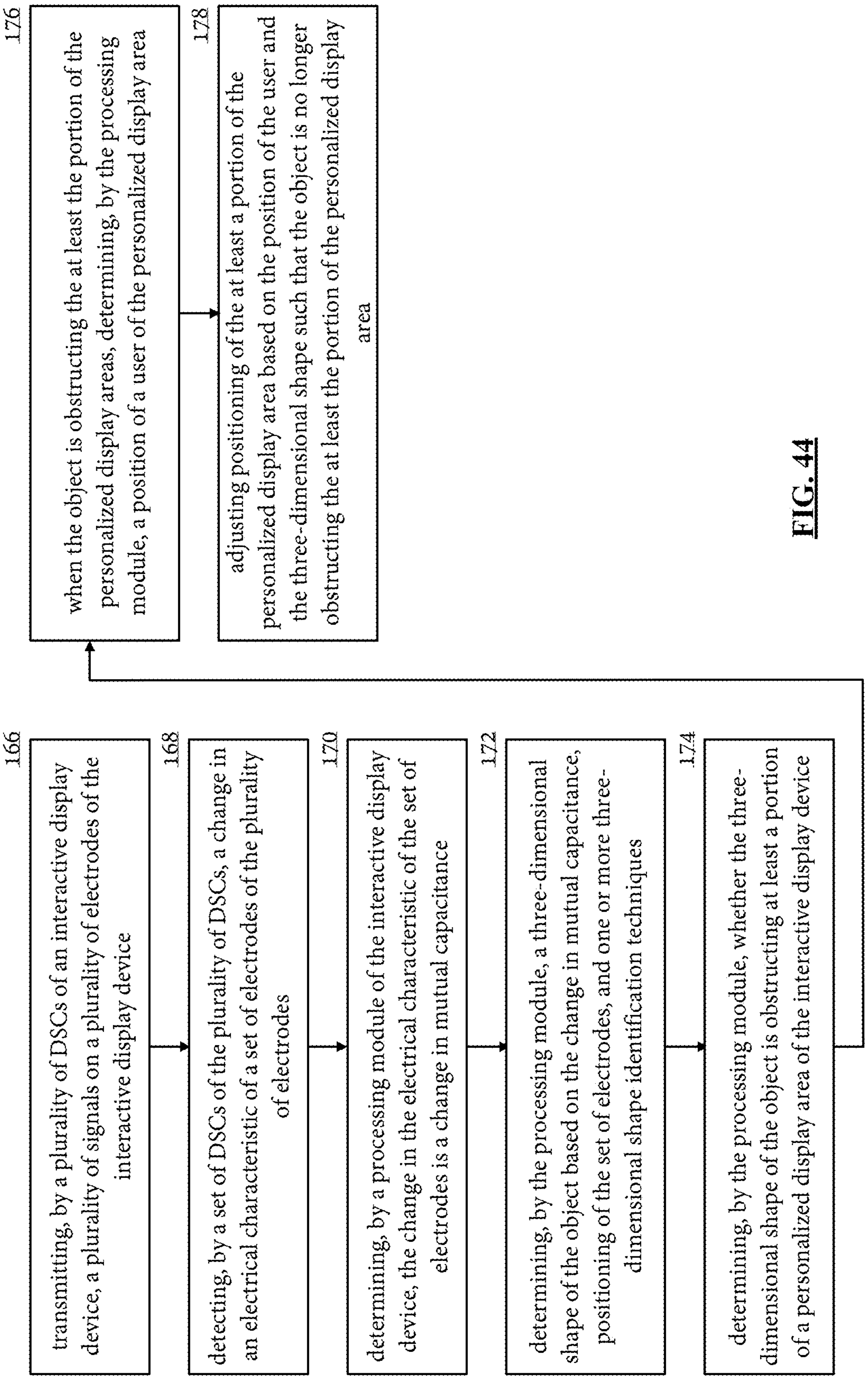
FIG. 44 is a logic diagram of an example of a method of adjusting a personalized display area based on a three-dimensional shape of an object in accordance with the present disclosure.

FIG. 44 is a logic diagram of an example of a method of adjusting a personalized display area based on a three-dimensional shape of an object. The method begins with step 166 where a plurality of drive sense circuits (DSCs) of an interactive display device (e.g., an interactive table top such as a dining table, coffee table, end table, etc.) transmit a plurality of signals on a plurality of electrodes of the interactive display device (e.g., where the electrodes may be wire trace, diamond pattern, capacitive sense plates, etc.).

The method continues with step 168 where a set of DSCs of the plurality of DSCs detect a change in an electrical characteristic of a set of electrodes of the plurality of electrodes. The method continues with step 170 where a processing module of the interactive display device determines that the change in the electrical characteristic of the set of electrodes is a change in mutual capacitance.

The method continues with step 172 where the processing module determines a three-dimensional shape of an object based on the change in mutual capacitance of the set of electrodes (e.g., 2D capacitive imaging), based on positioning of the set of electrodes (e.g., a cluster of electrodes are affected in a circular area), and one or more three-dimensional shape identification techniques.

The one or more three-dimensional shape identification techniques include one or more of: frequency scanning, classification and deep learning, image data collected from a camera array of the interactive display device indicating line of sight of a user to the personalized display area (e.g., based on position, distance, height of user, etc.), and an identifying tag (e.g., an RFID tag, an impedance pattern tag, etc.).

The method continues with step 174 where the processing module determines whether the three-dimensional shape of the object is obstructing at least a portion of a personalized display area of the interactive display device. When the three-dimensional shape of the object is obstructing the at least the portion of the personalized display area of the interactive display device, the method continues with step 176 where the processing module determines a position of a user of the personalized display area. For example, the personalized display area is oriented toward a particular user with a known orientation. Therefore, the processing module assumes a user is looking straight across from or straight down at the personalized display area. As another example, image data collected from a camera array of the interactive display device indicates a more accurate position of a user including a line of sight of a user to the personalized display area (e.g., based on user position, distance, height, etc.).

The method continues with step 178 where the processing module adjusts positioning of at least a portion of the personalized display area based on the position of the user and the three-dimensional shape, such that the object is no longer obstructing the at least the portion of the personalized display area. For example, the personalized display area is adjusted to create an adjusted display as in one or more of the examples described in FIGS. 43A-43E.

As another example, if the detected obstructing three-dimensional object is larger than or smaller than a certain size, the processing module can choose to ignore the item (e.g., for a certain period) and not adjust the personalized display area. For example, a briefcase is placed on the interactive display device entirely obstructing the personalized display area 18. Instead of adjusting the personalized display area 18 when the object is detected, the user is given a certain amount of time to move the item.

Figure 45:
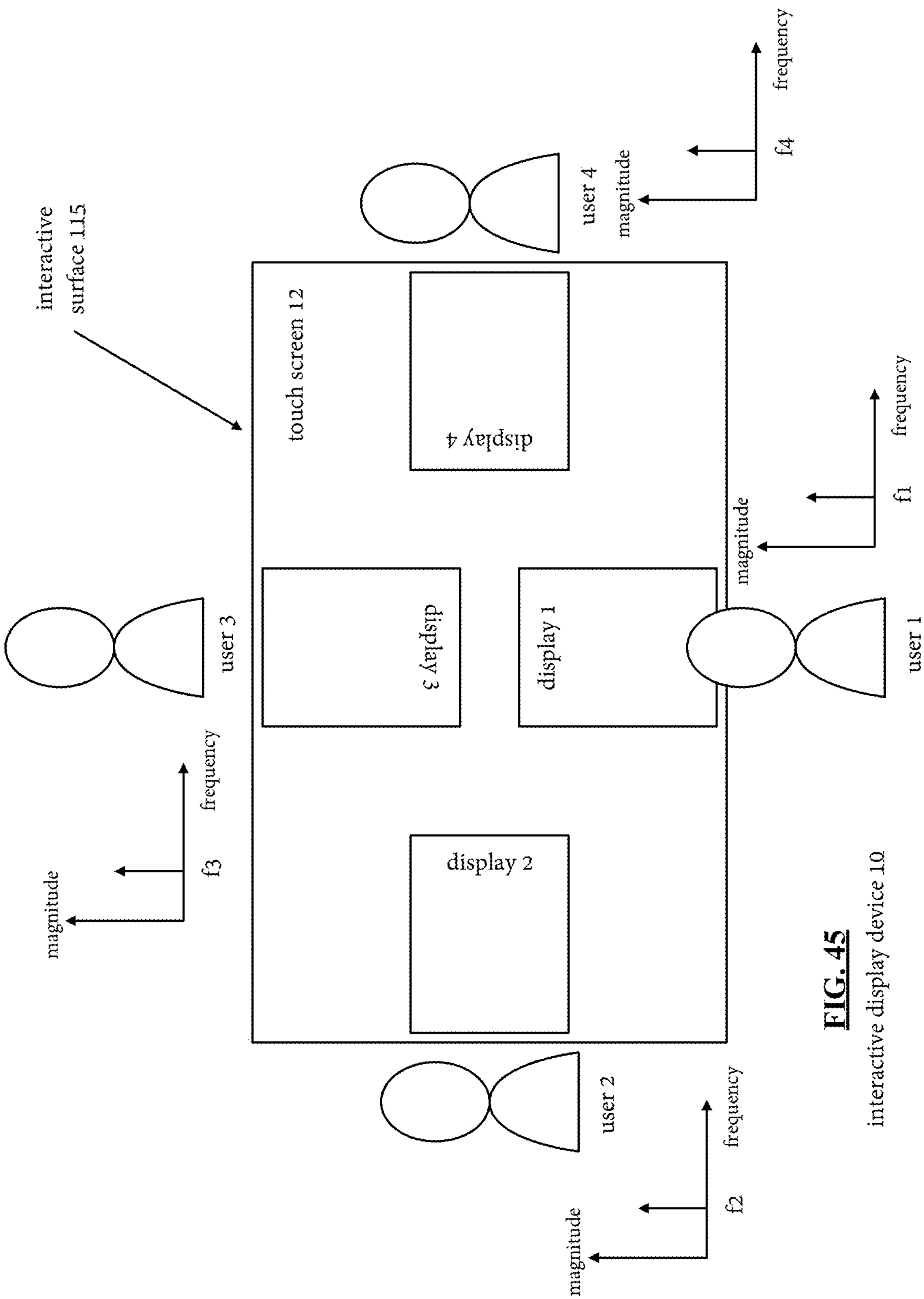
FIG. 45 is a schematic block diagram of another embodiment of the interactive display device in accordance with the present disclosure.

FIG. 45 is a schematic block diagram of another embodiment of the interactive display device 10 that includes the touch screen 12, which further includes multiple personalized display areas 18 (e.g., displays 1-4) corresponding to multiple users (e.g., users 1-4) to form as interactive surface 115. In this example, interactive display device 10 is an interactive table top (e.g., a dining table, coffee table, large gaming table, etc.). The interactive display device 10 can optionally be any other type of interactive display device 10 described herein.

Users 1-4 can each be associated with a particular frequency (e.g., f1-f4). For example, users 1-4 are sitting in chairs around the interactive display device 10 where each chair includes a pressure sensor to sense when the chair is occupied. When occupancy is detected, a sinusoidal signal with a frequency (e.g., f1-f4) is sent to the interactive display device 10. The chair may be in a fixed position (e.g., a booth seat at a restaurant) such that the signal corresponds to a particular position on the interactive display device 10 having a particular orientation with respect to the user. When f1-f4 are detected, the interactive display device 10 is operable to automatically generate personalized display areas (e.g., displays 1-4) of an appropriate size and in accordance with user 1-4's detected positions and orientations. Alternatively, when f1-f4 are detected, the interactive display device 10 is operable to provide users 1-4 various personalized display area options (e.g., each user is able to select his or her own desired orientation, size, etc., of the display).

As another example, one or more of users 1-4 may be associated with a user device (e.g., a user input passive device, an active device, a game piece, a wristband, a card, a mobile device or other computing device carried by the user and/or in proximity to the user, a device that can be attached to an article of clothing/accessory, etc.) that transmits a frequency or is otherwise associated with a frequency (e.g., a resonant frequency of a user input passive device is detectable) when used on and/or near the interactive display device 10. For example, the user puts the user device upon the table, above the table, or near the table. When the particular frequency is detected, the interactive display device 10 is operable to automatically generate a personalized display area in accordance with a corresponding user's detected position and orientation. For example, a user's position and orientation are assumed from a detected location of the user device. In such embodiments, detection of particular users can be based on accessing user profile data, for example, of a user database stored in memory accessible by the interactive display device 10 and/or stored in a server system accessible via a network with which the interactive display device 10 communicates, where user profile data indicates identification data for each user, such as their corresponding frequency.

As another example, one or more users 1-4 can be associated with a user device that is otherwise uniquely detectable when placed upon and/or in proximity to the table. For example, the user device is a passive device, such as a user input passive device, an ID card, a tag, a wristband, or other object. For example, this user device includes conductive pads in a unique configuration, or otherwise has physical shape, size and/or characteristics, that render an impedance pattern and/or capacitance image data detected by DSCs due to corresponding electrical characteristics induced upon electrodes when in proximity to these electrodes that is identifiable from that of other user devices associated with other users. In such embodiments, detection of particular users can be based on accessing user profile data, where user profile data indicates identification data for each user, such as a unique shape, size, impedance pattern and/or other detectable characteristics induced by their corresponding passive device or other user device. As a particular example, an ID card or badge includes a set of conductive plates forming a QR code or other unique pattern that identifies a given user, where different users carry different ID cards with their own unique pattern of conductive plates.

In cases where particular users are detected, some or all data displayed by the personalized display area can be different for different users based on having different configuration data in their user profile data, or otherwise determining to display different personalized display area based on other identified characteristics of the different identified users. Some or all means by which data is processed, such as processing of touch-based or touchless gestures, processing of input via a passive user input device, or other processing of user interactions with the personalized display area and/or other portions of the interactive display device 10 can be different for different users based on having different configuration data in their user profile data, or otherwise determining to process such user interactions differently based on other identified characteristics of the different identified users. Some or all functionality of the interactive display device 10 can be different for different users by based on having different configuration data in their user profile data, or otherwise determining to enable and/or disable various functionality based on other identified characteristics of the different identified users.

As another example, interactive display device 10 includes one or more cameras, antennas, and/or other sensors (e.g., infrared, ultrasound, etc.) for sensing a user's presence at the interactive display device. Based on user image data and/or assumptions from sensed data (e.g., via one or more antennas), the interactive display device 10 assigns a frequency to a user and automatically generates personalized display areas of an appropriate size, positions, and orientation for each user.

As another example, the interactive display device 10 generates personalized display areas of an appropriate size, positions, and orientation based on a user input (e.g., a particular gesture, command, a hand drawn area, etc.) that indicates generation of a personalized display area is desired. Alternatively, or in addition to, the interactive display device 10 is operable to track the range of a user's touches to estimate and display an appropriate personalized display area and/or make other assumptions about the user (e.g., size, position, location, dominant hand usage, etc.). The personalized display area can be automatically adjusted based on continual user touch tracking.

In all of the examples above, the interactive display device 10 is operable to determine the overall available display area of the interactive display device 10 and generate and/or adjust personalized display areas accordingly. As a specific example, if another user (e.g., user 5) were to join the interactive display device 10 in a chair to the right of user 1, user 2 and 4's personalized display areas may reduce in height due to display 1 moving towards display 2 and the addition of display 5 moving toward display 4. Alternatively, user 2 and 4's personalized display areas may shift over to accommodate the additional display without reducing in height.

In some embodiments, users, passive devices, and/or other objects are detected and/or identified via a plurality of sensors integrated within the sides of the table, for example along the sides of the table perpendicular to the tabletop surface of the table and/or perpendicular to the ground, within the legs of the table, and/or in one or more portions of the table. For example, sensors are integrated into the sides of the table to detect objects and/or users around the sides table, rather than hovering above or placed upon the table, alternatively or in addition to being integrated within tabletop surface. These sensors can be implemented via one or more electrode arrays and corresponding DSCs in a same or similar fashion as the electrode arrays and corresponding DSCs integrated within a tabletop surface of the table or other display surface. These sensors can be implemented as cameras, optical sensors, occupancy sensors, receivers, RFID sensors, or other sensors operable to receive transmitted signals and/or detect the presence of objects or users around the sides of the table. Any interactive display device 10 described herein can similarly have additional sensors integrated around one or more of its sides or other parts.

Such sensors can alternatively or additionally be integrated within in one or more chairs or seats in proximity to the interactive display device 10, or other furniture or object in proximity to the interactive display device 10, for example, that are operable to transmit detection data to the table and/or receive control data from the table. An example of an embodiment of a user chair that communicates with a corresponding interactive tabletop 5505 and/or other interactive display device 10 is illustrated in FIGS. 55C and 55D.

Figure 46:
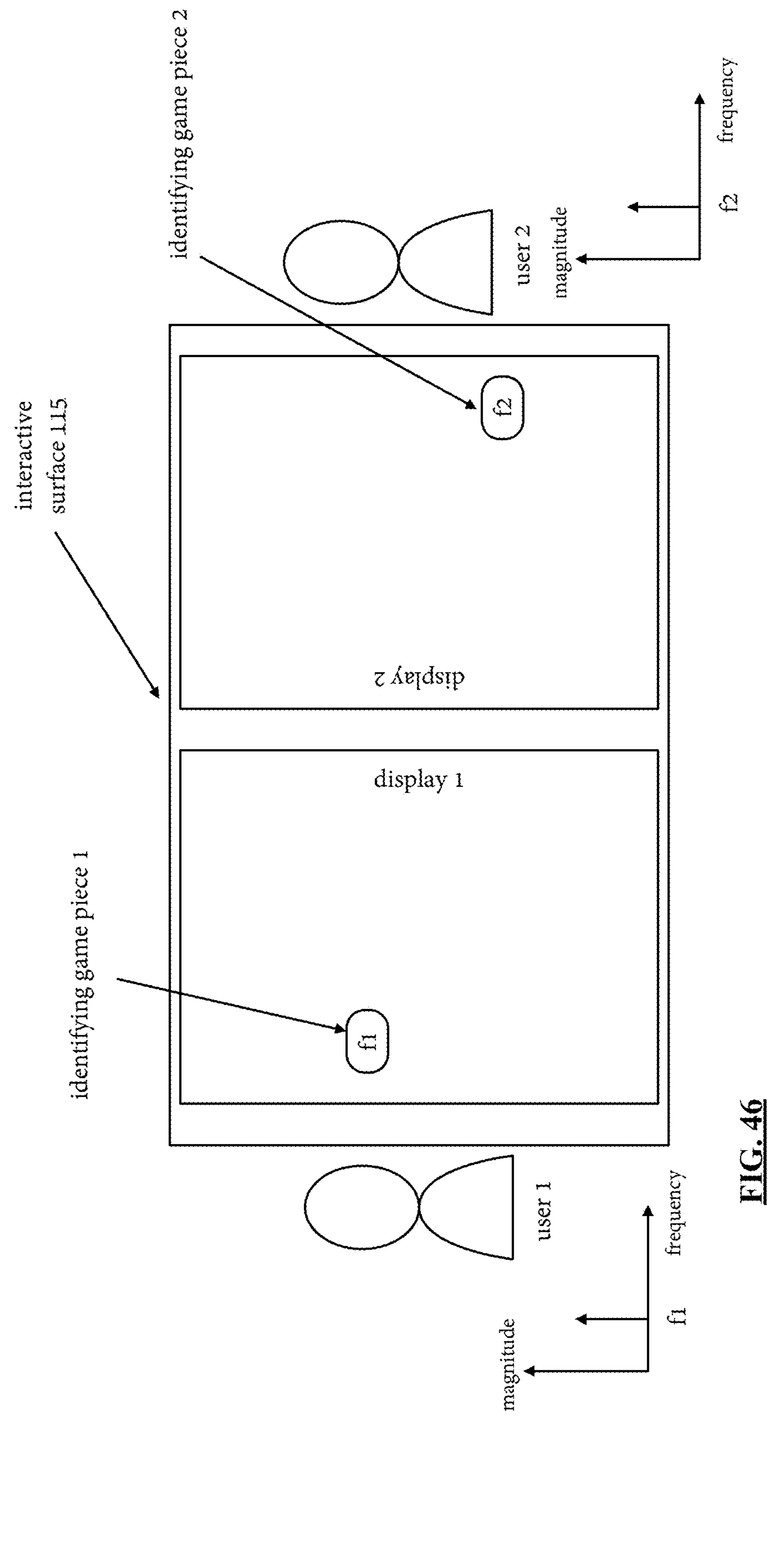
FIG. 46 is a schematic block diagram of another embodiment of the interactive display device in accordance with the present disclosure.

FIG. 46 is a schematic block diagram of another embodiment of the interactive display device 10 that includes the touch screen 12, which further includes multiple personalized display areas 18 (e.g., displays 1 and 2) corresponding to multiple users (e.g., users 1 and 2) to form an interactive surface 115. In this example, interactive display device 10 is an interactive table top (e.g., a dining table, coffee table, large gaming table, etc.).

In this example, user 1 is associated with an identifying user device (e.g., identifying game piece 1) that transmits a frequency f1 or is otherwise associated with a frequency f1 (e.g., a resonant frequency of a user input passive device is detectable) that is detectable by the interactive display device 10 when used on and/or near the interactive display device 10. User 2 is associated with an identifying user device (e.g., identifying game piece 2) that transmits a frequency f2 or is otherwise associated with a frequency f2 (e.g., a resonant frequency of a user input passive device is detectable) that is detectable by interactive display device 10 when used on and/or near the interactive display device 10.

When frequencies f1 and f2 are detected, the interactive display device 10 automatically generates a personalized display area (display 1) in accordance with user 1's detected position and orientation and a personalized display area (display 2) in accordance with user 2's detected position and orientation. For example, a user 1 and 2's positions and orientations are assumed from the detected location of each user device. In addition to generating personalized display areas of appropriate size and orientation based on sensing frequencies f1 and f2, the interactive display device 10 is further operable to generate personalized display areas in accordance with a game or other application triggered by frequencies f1 and f2. For example, identifying game pieces 1 and 2 are air hockey strikers that, when used on the interactive display device 10, generate an air hockey table for use by the two players (users 1 and 2).

Figure 47:
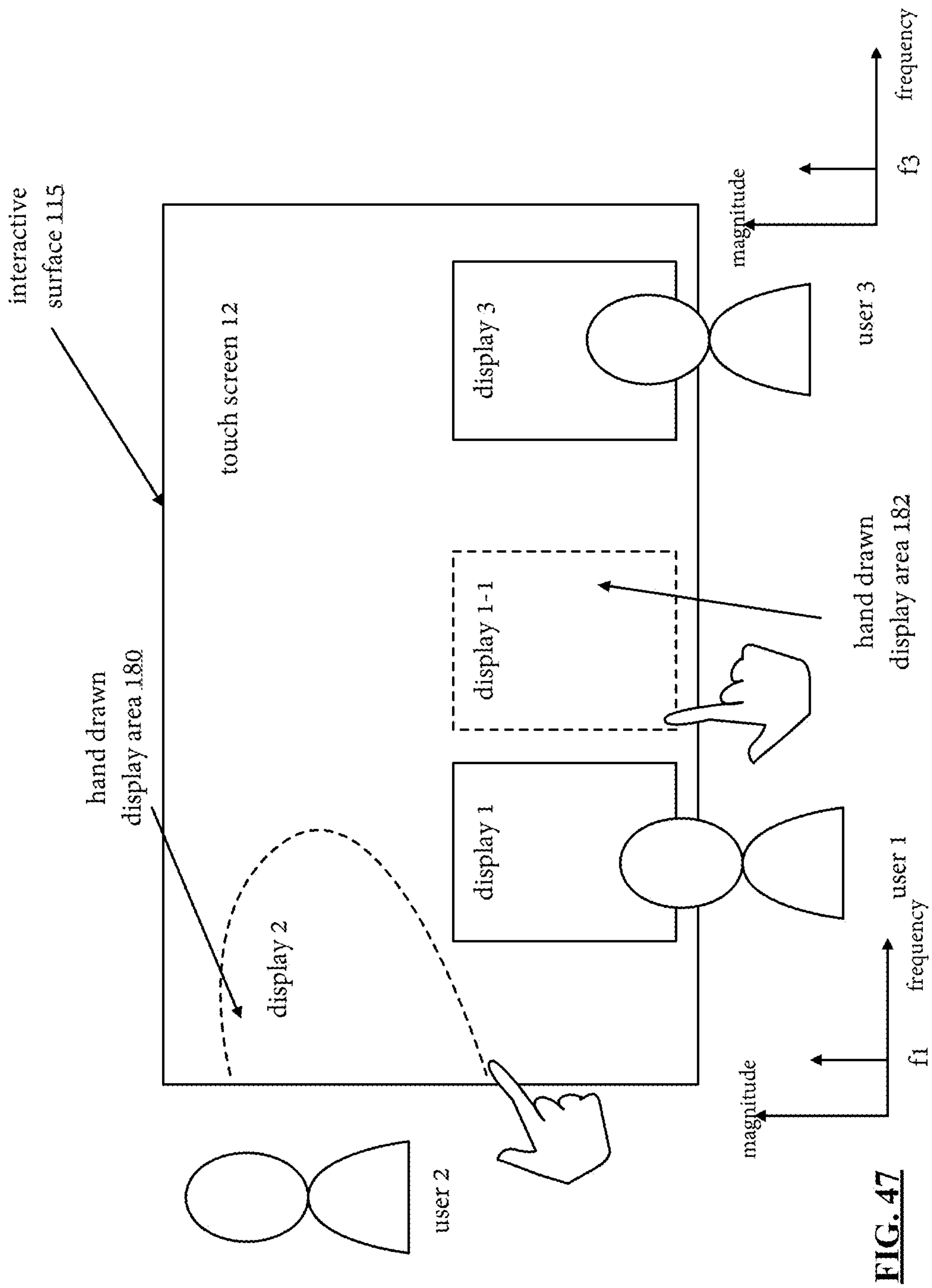
FIG. 47 is a schematic block diagram of another embodiment of the interactive display device in accordance with the present disclosure.

FIG. 47 is a schematic block diagram of another embodiment of the interactive display device 10 that includes the touch screen 12, which further includes multiple personalized display areas 18 (e.g., displays 1, 1-1, 2 and 3) corresponding to multiple users (e.g., users 1-3) to form interactive surface 115. In this example, interactive display device 10 is an interactive table top (e.g., a dining table, coffee table, large gaming table, etc.).

Users 1 and 3 are located on the same side of the interactive display device 10. Personalized display areas display 1 and display 3 are generated based on detecting a particular frequency associated with users 1 and 3 (e.g., generated by sitting in a chair, associated with a particular user device, etc.) and/or sensing user 1 and/or user 2's presence at the table via cameras, antennas, and/or sensors in the interactive display device 10. The interactive display device 10 scales and positions display 1 and display 2 in accordance with available space detected on the interactive display device 10.

User 2 hand draws a hand drawn display area 180 (display 2) on a portion of available space of the interactive display device and user 1 hand draws a hand drawn display area 182 (display 1-1) on a portion of the interactive display device near display 1. User 1 has one personalized display area (display 1) that was automatically generated and one personalized display area (display 1-1) that was user input generated. User 2's hand drawn display area 180 depicts an example where the display is a unique shape created by the user. Based on how the display area is hand drawn, an orientation is determined. For example, a right handed user may initiate drawing from a lower left corner. Alternatively, the user selects a correct orientation for the hand drawn display area. As another example, a user orientation is determined based on imaging or sensed data from one or more cameras, antenna, and/or sensors of the interactive display device 10.

If a user generated display area overlaps with unavailable space of the interactive display device, the display area can be rejected, auto-scaled to an available area, and/or display areas on the unavailable space can scale to accommodate the new display area.

Figure 48:
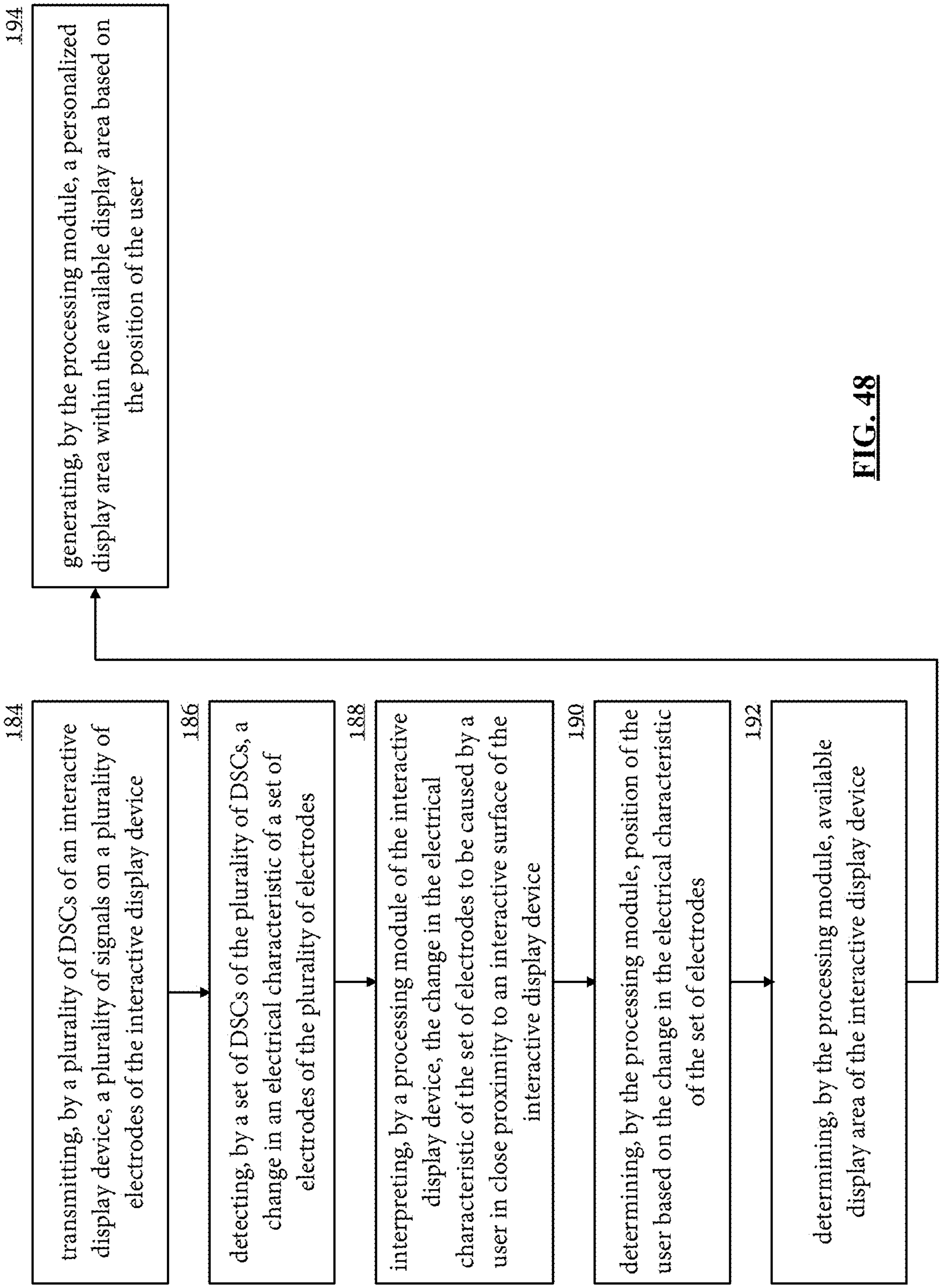
FIG. 48 is a logic diagram of an example of a method of generating a personalized display area in accordance with the present disclosure.

FIG. 48 is a logic diagram of an example of a method of generating a personalized display area on an interactive display device. The method begins with step 184 where a plurality of drive sense circuits (DSCs) of an interactive display device (e.g., an interactive table top such as a dining table, coffee table, end table, gaming table, etc.) transmit a plurality of signals on a plurality of electrodes (e.g., wire trace, diamond pattern, capacitive sense plates, etc.) of the interactive display device.

The method continues with step 186 where a set of DSCs of the plurality of DSCs detect a change in an electrical characteristic of a set of electrodes of the plurality of electrodes. The method continues with step 198 where a processing module of the interactive display device determines that the change in the electrical characteristic of the set of electrodes to be caused by a user of the interactive display device in close proximity (i.e., in contact with or near contact) to an interactive surface of the interactive display device.

For example, a user is sitting in a chair at the interactive display device where the chair includes a pressure sensor to sense when the chair is occupied. When occupied, the chair to conveys a sinusoidal signal including a frequency to the interactive display device alerting the interactive display device to a user's presence, location, and likely orientation. The chair may be in a fixed position (e.g., a booth seat at a restaurant) such that the signal corresponds to a particular position on the interactive display device having a particular orientation with respect to the user.

As another example, a user may be associated with a user device (e.g., user input passive device, an active device, a game piece, a wristband, etc.) that transmits a frequency or is otherwise associated with a frequency (e.g., a resonant frequency of a user input passive device is detectable) that is detectable by the interactive display device when used on and/or near the interactive display device.

As another example, the interactive display device includes one or more cameras and/or antennas for sensing a user's presence at the interactive display device. As yet another example, a user inputs a command to the interactive display device to alert the interactive display device to the user's presence, position, etc.

The method continues with step 190 where the processing module determines a position of the user based on the change in the electrical characteristics of the set of electrodes. For example, the chair sending the frequency is in a fixed position (e.g., a booth seat at a restaurant) that corresponds to a particular position on the interactive display device having a particular orientation with respect to the user. As another example, the user's position and orientation are assumed from a detected location of a user device. As another example, the user's position and orientation are detected from imaging and/or sensed data from the one or more cameras, antennas and/or sensors of the interactive display device. As a further example, a user input indicates a position and/or orientation of a personalized display area (e.g., a direct command, information obtained from the way a display area is hand drawn, location of the user input, etc.).

The method continues with step 192 where the processing module determines an available display area of the interactive display device. For example, the processing module detects whether there are objects and/or personalized display areas taking up space on the interactive surface of the interactive display device.

The method continues with step 194 where the processing module generates a personalized display area within the available display area based on the position of the user. For example, the interactive display device automatically generates a personalized display area of an appropriate size, position, and orientation based on the position of the user (e.g., determined by a particular frequency, device, user input, sensed data, image data, etc.) and the available space. Alternatively, when a user is detected, the processing module is operable to provide the user with various personalized display area options (e.g., a user is able to select his or her own desired orientation, size, etc., of the personalized display area).

Figure 49A:
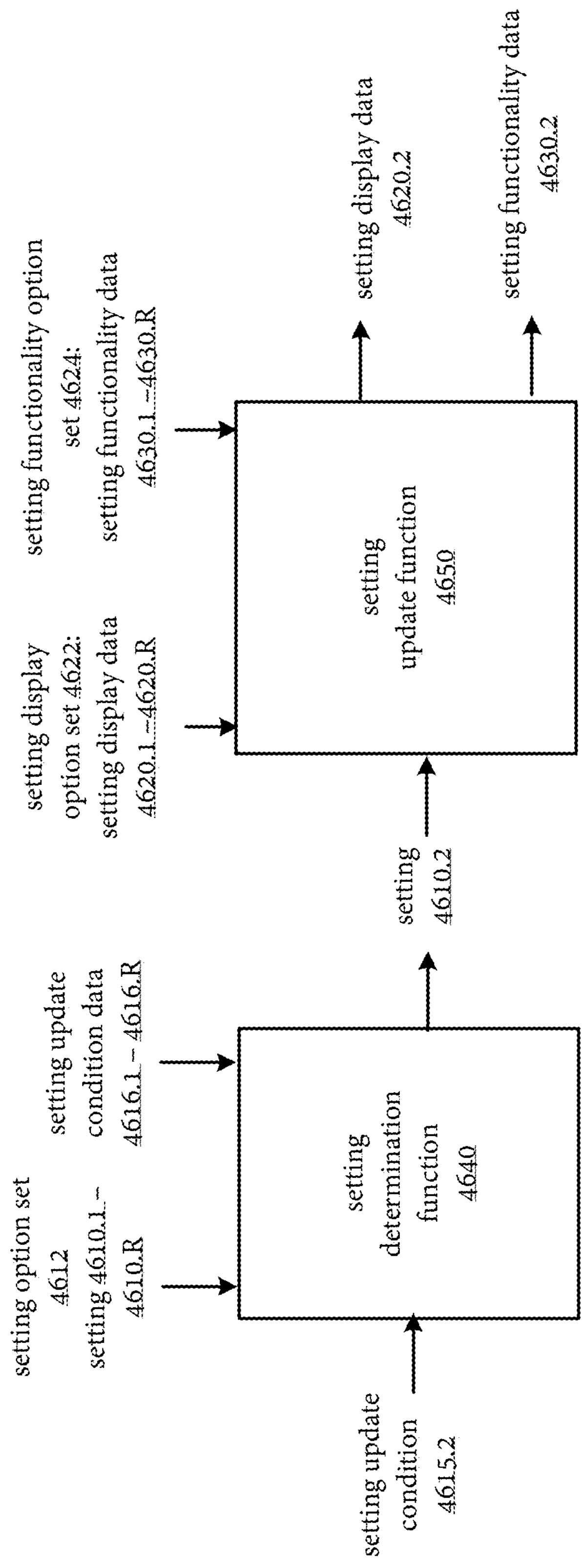
FIG. 49A is a schematic block diagram of a setting determination function and a setting update function in accordance with the present disclosure.
Figure 49B:
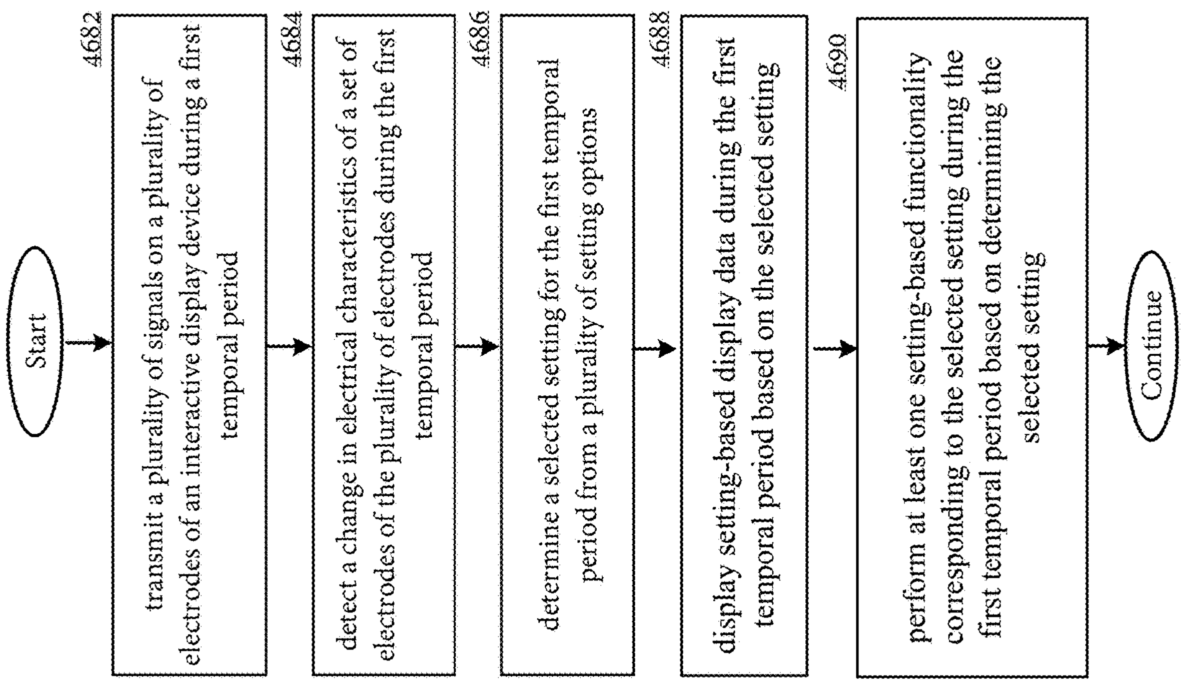
FIG. 49B is a logic diagram of an example of a method in accordance with the present disclosure.
Figure 49C:
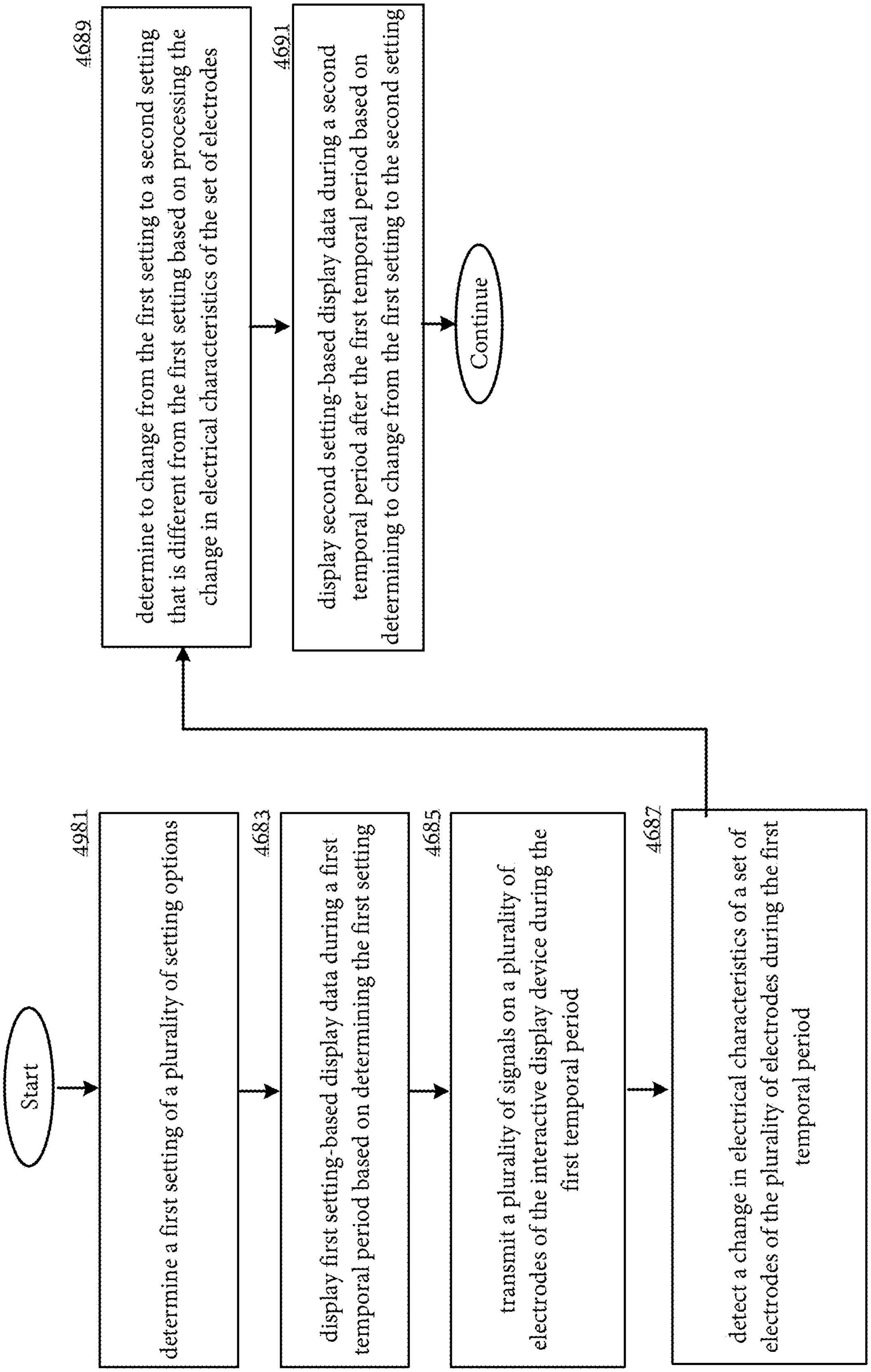
FIG. 49C is a logic diagram of an example of a method in accordance with the present disclosure.

FIGS. 49A-49C present embodiments of an interactive display device 10 that is operable to determine one of a set of settings from a plurality of settings 4610.1-4610.R of a setting option set 4612. For any given setting, the interactive display device 10 can display corresponding display data and/or can function via corresponding functionality.

FIG. 49A illustrates functions performed to enable the interactive display device 10 to change from one setting to another. The interactive display device 10 can determine to change from one setting to another via performance of a setting determination function 4640, for example, via one or more processing modules 48 and/or other processing resources of the interactive display device 10. Performing the setting determination function 4640 can include detecting a setting update condition 4615 for a particular one of the set of settings that denotes transition into the corresponding one of the set of settings. For example, each setting 4610 can have setting update condition data 4616 that indicates one or more conditions that, when determined to be met, causes the interactive display device 10 to transition into the corresponding setting via setting update function 4650.

Some or all of a set of setting update condition data 4616.1-4616.R corresponding to the set of R settings 4610.1-4610.R of setting option set 4612 can be: received via a communication interface of the interactive display device 10; stored in memory of the interactive display device 10; configured via user input to interactive display device 10; automatically determined by interactive display device 10, for example, based on performing an analytics function, machine learning function, and/or artificial intelligence function; retrieved from memory accessible by the interactive display device 10; and/or otherwise determined by the interactive display device 10.

Setting update condition data 4616 for one or more different settings 4610 can indicate conditions such as: particular times of day that trigger the entering into and/or exiting out of a given setting, for example, in accordance with a determined schedule such as a schedule configured by a user via user input and/or a schedule received from a computing device and/or via a network; particular user identifiers for one or more particular users that, when detected to be seated at and/or in proximity to the interactive display device 10, trigger the entering into and/or exiting out of a given setting; a particular number of users that, when detected to be seated at and/or in proximity to the interactive display device 10, trigger the entering into and/or exiting out of a given setting; a particular portion of the interactive display device 10, such as a side and/or seat of a corresponding tabletop, that when detected to be occupied by a user, trigger the entering into and/or exiting out of a given setting; particular computing devices that, when detected and/or when communication is initiated via screen to screen communication or another type of communication, trigger the entering into and/or exiting out of a given setting; a particular time period minimum that must be met for a given setting before exiting the setting or entering into another setting; a particular time period maximum for a given setting that must not be exceeded that, when met, triggers the exiting from the given setting and/or the entering into another setting; passive devices and/or other objects such as plates, cups, silverware, game boards, game pieces, and/or other identifiable objects that, when detected to be upon the tabletop and/or otherwise detected to be in proximity to touchscreen of the interactive display device 10, trigger the entering into and/or exiting out of a given setting; particular user input, such as a user selection from a displayed set of options in display data displayed by the interactive display device 10, that, when detected to be entered by a user, for example, via touch-based or touchless user input to touch screen 12, trigger the entering into and/or exiting out of a given setting; particular touch-based and/or touchless gestures that, when detected to be performed by one or more users in proximity to the interactive display device 10, trigger the entering into a given setting; particular sensor data that, when detected by one or more electrodes or other sensors of the interactive display device 10, trigger the entering into and/or exiting out of a given setting; particular instructions and/or commands that, when received via a communication interface of the interactive display device 10, trigger the entering into and/or exiting out of a given setting; and/or other types of detectable conditions.

In the example of FIG. 49A, setting condition data 4615.2 is detected, which is determined to match and/or compares favorably to the required conditions of setting update condition data 4616.2. Thus, the corresponding setting 4610.2 is identified, and the interactive display device 10 facilitates transition into the corresponding setting 4610.2 via setting update function 4650.

Once the determined setting 4610 is identified, the interactive display device 10 can update its display data and/or functionality accordingly to transition into the determined setting 4610 via performance of a setting update function 4650, for example, via one or more processing modules 48 and/or other processing resources of the interactive display device 10. Performing the setting determination function 4640 can include determining setting display data and setting functionality data for a given setting 4610, such as setting 2610.2 in this example. For example, each setting 4610 can have corresponding setting display data 4620 that indicates display data for display by the display of interactive display device 10. Each setting 4610 can alternatively or additionally have corresponding setting functionality data 4630 that indicates functionality for performance by processing module 42 and/or executable instructions that, when executed by processing resources of the interactive display device 10, cause the interactive display device 10 to function in accordance with corresponding functionality.

A set of setting display data 4620.1-4620.R corresponding to the set of R settings 4610.1-4610.R of setting option set 4612 can be included in a setting display option set 4622. Some or all setting display data 4620 of setting display option set 4622 can be: received via a communication interface of the interactive display device 10; stored in memory of the interactive display device 10; configured via user input to interactive display device 10; automatically determined by interactive display device 10, for example, based on performing an analytics function, machine learning function, and/or artificial intelligence function; retrieved from memory accessible by the interactive display device 10; and/or otherwise determined by the interactive display device 10.

A set of setting functionality data 4630.1-4630.R corresponding to the set of R settings 4610.1-4610.R of setting option set 4612 can be included in a setting functionality option set 4624. Some or all setting functionality data 4630 of setting functionality option set 4624 can be: received via a communication interface of the interactive display device 10; stored in memory of the interactive display device 10; configured via user input to interactive display device 10; automatically determined by interactive display device 10, for example, based on performing an analytics function, machine learning function, and/or artificial intelligence function; retrieved from memory accessible by the interactive display device 10; and/or otherwise determined by the interactive display device 10.

The setting display data 4620 and/or setting functionality data 4630 for a given setting can optionally indicate particular functionality or settings for different users and/or different seats or locations around a corresponding tabletop where users may elect to sit during the given setting. For example, a first user may have first display data displayed via their personalized display area while a second user may have second display data displayed via their personalized display area that is different from the first display data based on this different display data being configured for their respective user identifiers while in the corresponding setting and/or based on these users sitting in different locations around the table, where the first display data is configured to be displayed at a first location where the first user is sitting and where second display data is configured to be displayed at a second location where a second user is sitting. As another example, a first user may have first functionality enabled, for example, via touch or touchless interaction with their personalized display area, while a second user may have second functionality enabled that is different from the first functionality based on this different functionality data being configured for their respective user identifiers while in the corresponding setting and/or based on these users sitting in different locations around the table, where the first functionality is configured for the first location where the first user is sitting and where the second functionality data is configured at a second location where a second user is sitting.

In cases where the display data and/or functionality is different for particular users, each user can configure their own display data as user preference data in a user profile stored in memory accessible by the interactive display device 10, for example, locally or via a network connection. Alternatively, a master user, such as a parent of the household, can configure the display data and/or functionality data for other members of the household.

In the example of FIG. 49A, after setting 4610.2 is identified via setting determination function 4640, the interactive display device 10 facilitates transition into the corresponding setting 4610.2 via setting update function 4650 by displaying setting display data 4620.2 via the display of interactive display device 10 and/or by configuring interactive display device 10 to perform with setting functionality data 4630.2. At a later time, for example, when the setting is determined to end and/or when a new setting is determined, the setting update function 4650 can be performed to cause the interactive display device 10 to display other setting display data 4620 and other to function in accordance with other setting functionality data 4630 for another corresponding setting.

In some embodiments, the set of possible settings includes a default setting, for example, that is assumed when no setting condition data corresponding to any of the setting condition option data is detected and/or that is assumed based on determining to enter the default setting. In some embodiments, one or more of the various types of detectable conditions discussed above can optionally further denote exit from a given setting, for example, for transition back into the default setting. The setting display data 4620 for the default setting can correspond to the display being off, being in a screen saver mode, listing a set of options of settings for selection by a user, or assuming another configured default display data. The setting functionality data 4630 for the default setting can correspond to enabling entering into another setting when a corresponding setting update condition is detected, for example, where sensors and/or processing remains active even when not assuming a particular setting to ensure that corresponding setting update conditions can be detected and processed at any time.

In some embodiments, entering a given setting causes the entire display and functionality of the interactive display device 10 as a whole to assume the corresponding display data and functionality of the corresponding setting. In other embodiments, a given setting can be entered by different portions of the interactive display device 10, for example, corresponding to different locations upon the display corresponding to positions of different users, where corresponding personalized display areas display data and assume functionality corresponding to a given setting, and where different personalized display areas of different users optionally operate in accordance with different settings at a given time.

The interactive display device 10 of FIGS. 49A-49C can be implemented as and/or integrated within a tabletop device, such as a dining table, a large coffee table, a bar table, a countertop, a gaming table, a desk, or other tabletop furnishing. The interactive display device 10 of FIGS. 49A-49B can be implemented to support user input by one user, and/or simultaneous user input of multiple users. For example, the interactive display device 10 is implemented to operate via some or all features and/or functionality of the tabletop interactive display device 10 of FIGS. 45, 46, and/or 47. Some or all features and/or functionality of the interactive display device 10 of FIGS. 49A-49C can be utilized to implement the interactive display device 10 of FIGS. 45, 46, and/or 47. For example, the embodiments of the interactive display devices 10 of FIGS. 45, 46, and/or 47 can be implemented based on corresponding to different settings 4610 of the setting option set 4612. Some or all features and/or functionality of any other interactive display device 10, touch screen 12, processing module 42, and/or other elements described herein can implement the interactive display device 10 of FIGS. 49A-49C.

In some embodiments, the interactive display device 10 is implemented for home and/or family use. For example, the interactive display device 10 is implemented as and/or integrated within a dining room table, kitchen table, coffee table, or other large table within a family home around which family members can congregate while participating in various activities, such as dining, doing work or homework, or playing games. In such embodiments, the plurality of settings 4610 can include one or more of: a dining setting, a game play setting, a work setting, or a homework setting.

In some embodiments, when determining to be in the dining setting, virtual placemats are displayed as setting display data 4620. This can include determining locations of different users and displaying the placemats in their display area accordingly as discussed in conjunction with FIG. 45. The placemat display data can optionally indicate information regarding the meal for dinner. As another example, a family discussion or to-do list can be displayed to prompt family members to discuss particular topics during dinner. As another example, some or all features and/or functionality of the interactive display device 10 of FIGS. 53A-53E can be implemented by the interactive display device 10 while in the dining setting, for example, as one or more different phases of the family dinner. Alternatively, no display data is displayed, as to not be a distraction to family members during meal time. For example, the display 50 of the interactive display device 10 is off and/or non-interactive during the dining phase.

In some embodiments, the plurality of settings 4610 can include different types of dining settings. For example, the different types of dining settings can include a breakfast setting, a lunch setting and/or a dinner setting, and can different corresponding display data and/or functionality. As a particular example, during the breakfast setting and/or a morning coffee setting, weather data and/or news articles can be displayed via the display, for example, to one or more users via their own personalized display areas as illustrated in FIG. 45, where different data, or no data, is displayed during the dinner setting. In some embodiments, the type of news and/or weather displayed to different users is configured differently for different users based on their preferences. In other embodiments, the different types of dining settings can correspond to different types of meals and/or cuisines, and/or whether a meal is served family style, buffet style, and/or in a plated fashion. In other embodiments, the different types of dining settings can include a casual setting and a formal setting. In other embodiments, the different types of dining settings can include a family setting and a dinner party setting. For example, during the dinner party setting, some or all features and/or functionality of the interactive display device 10 of FIGS. 53A-53E can be implemented by the interactive display device 10, as the owners of the interactive display device 10 may be hosting multiple guests and wish to serve them in a restaurant-style accordingly, while less extravagant features are implemented in the family setting, as this corresponds to a more casual affair.

In some embodiments, setting functionality data 4630 for the dining setting is implemented to cause some or all functionality of the interactive display device 10 to be disabled while in the dining setting, for example, where no network connection is enabled, where users cannot interact with the interactive display device 10 via user input to the touch screen 12 and/or to their own computing devices that communicate with interactive display device 10. This can be ideal in ensuring family members are not distracted during mealtime and/or in encouraging family members to converse during mealtime rather than engage in virtual activities. In some embodiments, such functionality is configured differently for different family members based on detecting the location of different family members, for example, where some or all children's personalized display areas are non-interactive during mealtime and/or where parent's personalized display areas remain interactive.

In some embodiments, the corresponding setting update condition data for the dining setting can include detection of plates, silverware, cups, glasses, placemats, food, napkin rings, napkins, or other objects that are placed on a table during a meal. In some embodiments, the corresponding setting update condition data for the dining setting can include a scheduled dinner time. In some embodiments, other user input and/or configured setting update condition data is utilized to determine to transition into the dining setting.

In some embodiments, when determining to be in the game play setting, a virtual game board for a board game, or other virtual elements of a board game, can be displayed, as denoted in corresponding setting display data 4620. Alternatively, a physical game board atop the interactive display device 10 can be utilized while in the game play setting. In some embodiments, the corresponding setting functionality data 4630 can cause game state data to be updated based on detecting user interaction with physical passive devices upon the tabletop that corresponding to game-pieces of a corresponding board game. In some embodiments, the game-pieces of a corresponding board game are implemented as configurable game-piece display devices. For example, the corresponding setting functionality data 4630 for a board game play setting can cause the interactive display device 10 to generate and communicate display control data to the configurable game-piece display devices to cause the configurable game-piece display devices to display corresponding display data, and/or to otherwise perform some or all functionality as described in conjunction with FIGS. 50A-50K.

In some embodiments, graphics corresponding to a video game can be displayed, as denoted in corresponding setting display data 4620. In some embodiments, the corresponding setting functionality data 4630 can enable users to interact with their own computing devices communicating with the interactive display device 10 to control virtual elements of a corresponding video game. For example, the setting functionality data 4630 for one or more video game play settings enables some or all functionality of interactive display device 10 described in conjunction with FIGS. 51A-51F. Alternatively or in addition, the corresponding setting functionality data 4630 can enable users to interact with the touch screen 12 to control virtual elements of a corresponding video game via touch-based and/or touchless gestures. For example, the setting functionality data 4630 for one or more video game play settings enables some or all functionality of interactive display device 10 described in conjunction with FIGS. 52A-52E.

In some embodiments, the setting option set 4612 includes at least one board game setting and at least one video game setting, where corresponding display data and functionality for playing a board game is different from that of playing a video game. Different types of board games and/or video games can optionally correspond to their own different settings 4610, and can have different corresponding setting display data and/or different corresponding setting functionality data 4630.

In some embodiments, the corresponding setting update condition data for the game play setting can include detection of physical game elements such as physical board game boards, dice, cards, spinners, and/or game-pieces. In such cases, different physical game elements of different games can be distinguished based on having different physical characteristics and/or other distinguishable characteristics as discussed previously with regards to identifying different objects, and different game setting data for one or a set of different corresponding games can be determined and utilized to render corresponding display data and/or functionality accordingly. In some embodiments, the corresponding setting update condition data for the game play setting can include detection of screen to screen communication with computing devices and/or other user input configuring selection to play a video game and/or selection of a particular video game. In some embodiments, the corresponding setting update condition data for the game play setting can include determining that the current time matches a scheduled game play period, and/or a scheduled break during a homework period in which the homework setting is assumed. In some embodiments, the corresponding setting update condition data for the game play setting can include determining that the amount of time in the game play setting, for example, since a start of entering the game play setting or accumulated over the course of a given day, week, or other timespan, has not exceeded a threshold, for example, for a particular user and/or for the family as a whole. In some embodiments, the corresponding setting update condition data for the game play setting can include determining that the amount of time in the homework setting has met a minimum threshold, where the user is allowed to end and/or break from the homework setting and play a game. In some embodiments, the corresponding setting update condition data for the game play setting can include determining that a corresponding user has completed their work and/or homework assignments, for example, based on user interaction with the interactive display device 10 while in the homework setting. In some embodiments, other user input and/or configured setting update condition data is utilized to determine to transition into the game play setting.

In some embodiments, when determining to be in the work setting and/or homework setting, educational materials can be displayed to users via their personalized display areas, enabling users to work on their homework or professional work while seated around the interactive display device 10. The setting functionality data 4630 can enable a user to interact with their personalized display area to write via a passive device and/or type via a virtual keyboard or a physical keyboard communicating with the interactive display device 10. For example, the user can complete work and/or homework assignments, or otherwise study and/or engage in educational activity, by reviewing displayed educational materials and/or by writing notes, essays, solutions to math problems, labeling displayed diagrams, or other notation for other assignments. In some embodiments, the setting display data 4620 and/or setting functionality data 4630 can enable the interactive display device 10 to receive, generate, and/or display user notation data and/or session materials data generated by the user, by a teacher, or by another person, by implementing some or all functionality of primary interactive display device or secondary interactive display device as discussed in conjunction with FIGS. 54A-61H. Completed assignments can optionally be transmitted to a memory module for grading by a teacher, for example, as discussed in conjunction with FIGS. 56A-56M, and/or can be automatically graded and/or corrected, with corrections optionally displayed to the user for study purposes, as discussed in conjunction with FIGS. 61A-61H. Adult users can similarly perform professional work tasks via interactive display device 10 in accordance with same or similar functionality.

In some embodiments, the corresponding setting update condition data for the homework setting can include determining that the current time matches a scheduled homework period, and/or elapsing of a scheduled break during a homework period in which the homework setting is assumed. In some embodiments, the corresponding setting update condition data for the homework setting can include determining that the amount of time in the homework setting, for example, since a start of entering the homework setting, has not exceeded a minimum threshold, for example, for a particular user, where the user must remain in the homework setting until the minimum threshold amount of time has been met. In some embodiments, the corresponding setting update condition data for the homework setting can include determining that the amount of time in the game play setting has met a maximum threshold, where the user must enter the homework setting due to spending their allotted amount of time in the game play setting. In some embodiments, the corresponding setting update condition data for the homework setting can include determining that a corresponding user has been assigned homework assignments for completion, for example, as session materials data transmitted to the interactive display device 10, to memory accessible by the interactive display device 10 via a network, and/or corresponding to a user account associated with the user. In some embodiments, the corresponding setting update condition data for the work and/or homework setting can include determining that a keyboard, mouse, writing passive device, computing device, or other device utilized for work and/or homework is in proximity of the interactive display device 10 and/or has established communication with the interactive display device 10. In some embodiments, other user input and/or configured setting update condition data is utilized to determine to transition into the work and/or homework setting.

As discussed previously, different users sitting around the tabletop of interactive display device 10 may have personalized display areas displaying data and/or operating with functionality in accordance with different settings at a particular time. For example, a first user is playing a video game via their personalized display area in accordance with a game play phase, while a second user is completing a homework assignment, for example, based on the first user having completed their homework assignment, and based on the second user having not yet completed their homework assignment. As another example, the first user and a third user play a board game via respective seats at the table via a shared personalized display area between them in the game play setting, while the second user is studying in the homework setting.

In other embodiments, the interactive display device 10 can have one or more different settings, for example, based on being located in a different location. This can include different settings at a commercial establishment, such as an information setting where information is presented to the user and/or where the user can interact with a map, a transaction setting where users can perform financial transactions to purchase goods or services from the commercial establishment, and/or other settings.

This can alternatively or additionally include different settings at an office establishment, such as a business meeting setting, a presentation setting, a work setting, a design setting, and/or a hot desk setting, for example, where the interactive display device 10 is implemented as a large conference room table and/or as a desk around which one or more users can sit, and/or where the interactive display device 10 is implemented as a large whiteboard or other vertical board. The presentation setting and/or business meeting setting can be implemented via some or all functionality of the primary and/or secondary interactive display device 10 of FIGS. 54A-61H. The work setting, design setting, and/or hot desk setting can be implemented to enable users to interact with a personalized display area to perform workplace activities in a same or similar fashion as discussed in conjunction with the homework setting, for example, while temporarily visiting the office in lieu of working via a desktop or laptop, where the user interacts with personalized display area to view and/or download files, browse the internet, interact with executed applications corresponding to their type of work, or perform other work. An identifier determined for the user can be utilized to customize the user's experience and/or enable user login to their work account, access to their email and/or files for display and/or manipulation via user input to their personalized display area, and/or other tasks requiring user credentials and/or specific to the user's identity. The user can upload and/or download files and/or other data to and/or from their personal computing device via screen to screen communication, via a wired and/or wireless network, and/or via other communication, for example, as discussed in further detail herein.

FIG. 49B illustrates a flow diagram of an embodiment of a method in accordance with the present disclosure. In particular, a method is presented for execution by and/or use in conjunction with the interactive display device 10, processing module 42, touch screen 12, and/or other processing modules and/or touch screen displays disclosed herein. Some or all steps of FIG. 49B can be performed in conjunction with some or all steps of one or more other methods described herein.

Step 4682 includes transmitting a plurality of signals on a plurality of electrodes of an interactive display device during a first temporal period. For example, the plurality of signals are transmitted via a plurality of drive sense circuits (DSCs) of the interactive display device.

Step 4684 includes detecting a change in electrical characteristics of a set of electrodes of the plurality of electrodes during the first temporal period. For example, the change is detected via a set of DSCs of the plurality of DSCs of the of the interactive display device.

Step 4686 includes determining a selected setting for the first temporal period from a plurality of setting options. The setting can be determined by at least one processing module of the interactive display device, for example, based on at least one processing module 42 of the interactive display device performing the setting determination function 4640 and/or based on the processing module 42 determining the selected setting has setting update condition data that corresponds to a detected setting update condition.

Determining a selected setting for the first temporal period from a plurality of setting options can be based on the change in electrical characteristics. For example, the change in electrical characteristics indicates the detected setting update condition, for example, where the detected setting update condition corresponds to: user input to a touch screen selecting the option via a set of options presented via a corresponding display, a gesture performed by the user in proximity to the touch screen, a particular object detected upon the touch screen that corresponds to the selected setting, such as a plate, glass, silverware, game board, game piece, or other object, or other changes to the electrical characteristics denoting a corresponding setting update condition. Alternatively or in addition, determining a selected setting for the first temporal period from a plurality of setting options can be based on other conditions that are not based on the change in electrical characteristics, such as a time of day, wireless communication data received via a communication interface, or other conditions.

Step 4688 includes displaying setting-based display data during the first temporal period based on the selected setting. For example, the setting-based display data is based on setting display data 4920 of the selected setting, and/or is displayed via a display 50 of the interactive display device, such as an entire tabletop display and/or a personalized display area of the tabletop display. Step 4688 can be performed based on performance of setting update function 4650.

Step 4690 includes performing at least one setting-based functionality corresponding to the selected setting during the first temporal period based on determining the selected setting. For example, the setting-based functionality is based on setting functionality data 4930 of the selected setting, and/or is performed by at least one processing module of the interactive display device. Step 4690 can be performed based on performance of setting update function 4650.

In various embodiments, the plurality of setting options include at least two of: a game setting; a dining setting; a homework setting; a presentation setting; a business meeting setting, a hot desk setting, a design setting, or a work setting.

In various embodiments, the setting-based display data is based on a number of users in a set of users in proximity to the interactive display device and/or a set of locations of the set of users in relation to the interactive display device. For example, the setting-based display data includes a personalized display area for each of the set of users.

In various embodiments, the method further includes transmitting, by a plurality of drive sense circuits of an interactive display device, a plurality of signals on a plurality of electrodes of the first interactive display device during a second temporal period after the first temporal period. The method can further include detecting, by a set of drive sense circuits of the plurality of drive sense circuits, a change in electrical characteristics of a set of electrodes of the plurality of electrodes during the second temporal period. The method can further include determining an updated selected setting for the second temporal period from the plurality of setting options, wherein the updated selected setting is different from the selected setting. The method can further include processing, via a processing device of the interactive display device, the change in electrical characteristics to perform at least one other setting-based functionality during the second temporal period based on the updated selected setting. The method can further include displaying, via display 50 of the interactive display device, other setting-based display data during the second temporal period based on the updated selected setting.

FIG. 49C illustrates a flow diagram of an embodiment of a method in accordance with the present disclosure. In particular, a method is presented for execution by and/or use in conjunction with the interactive display device 10, processing module 42, touch screen 12, and/or other processing modules and/or touch screen displays disclosed herein. Some or all steps of FIG. 49C can be performed in conjunction with some or all steps of FIG. 49B, and/or of one or more other methods described herein.

Step 4681 includes determining a first setting of a plurality of setting options. For example, step 4681 can be performed by at least one processing module of an interactive display device, for example, based on at least one processing module 42 of the interactive display device performing the setting determination function 4640 and/or based on the processing module 42 determining the selected setting has setting update condition data that corresponds to a detected setting update condition.

Step 4683 includes displaying first setting-based display data during a first temporal period based on determining the first setting. For example, the setting-based display data is based on setting display data 4920 of the first setting, and/or is displayed via a display of the interactive display device, such as an entire tabletop display and/or a personalized display area of the tabletop display. Step 4683 can be performed based on performance of setting update function 4650.

Step 4685 includes transmitting a plurality of signals on a plurality of electrodes of the interactive display device during the first temporal period. For example, the plurality of signals are transmitted by a plurality of DSCs of the interactive display device.

Step 4687 includes detecting a change in electrical characteristics of a set of electrodes of the plurality of electrodes during the first temporal period. For example, the change in electrical characteristics is detected by a set of DSCs of the plurality of DSCs.

Step 4689 includes determining to change from the first setting to a second setting that is different from the first setting based on processing the change in electrical characteristics of the set of electrodes. For example, step 4789 can be performed by at least one processing module of an interactive display device, for example, based on at least one processing module 42 of the interactive display device performing the setting determination function 4640 and/or based on the processing module 42 determining the selected setting has setting update condition data that corresponds to a detected setting update condition.

Step 4691 includes displaying second setting-based display data during a second temporal period after the first temporal period based on determining to change from the first setting to the second setting. For example, the setting-based display data is based on setting display data 4920 of the second setting, and/or is displayed via a display of the interactive display device, such as an entire tabletop display and/or a personalized display area of the tabletop display. Step 4691 can be performed based on performance of setting update function 4650.

FIGS. 50A-50K present embodiments of an interactive tabletop 5505 that generates and sends display control data to a plurality of configurable game-piece display devices 4710.1-4710.G. Each configurable game-piece display device can display corresponding display data based on the received display control data. This can enable a set of generic configurable game-piece display device to be utilized as game-pieces for numerous different board games played upon the interactive tabletop 5505, for example, based on being identifiable for a particular player and/or particular game-piece time in conjunction with a corresponding board game based on each displaying an image or other data configured for its use in the particular game and/or by a particular user playing the game. In other embodiments, board games can be played via other game pieces, such as detectable passive user input devices, that do not have their own display that displays display data.

Figure 50A:
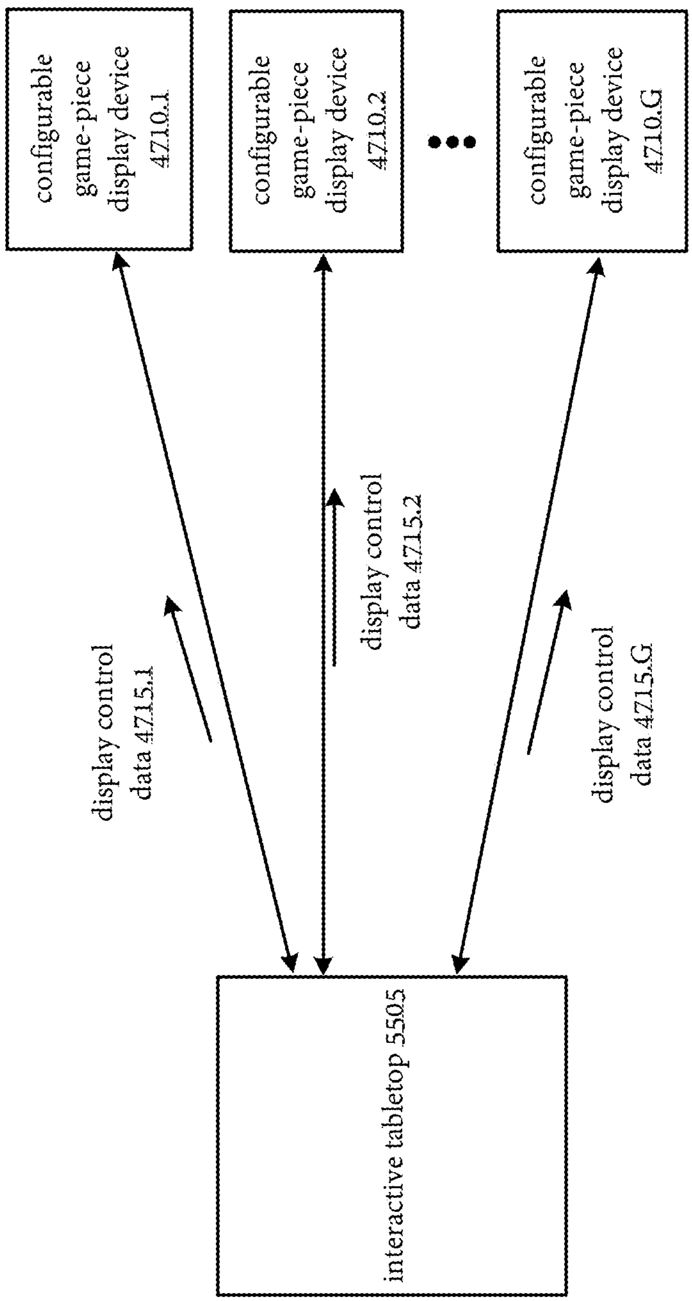
FIG. 50A is a schematic block diagram illustrating communication between an interactive tabletop and a plurality of configurable game-piece display devices in accordance with the present disclosure.

As illustrated in FIG. 50A, interactive tabletop 5505 can send data to and/or receive data from a plurality of configurable game-piece display devices 4710.1-4710.G. As illustrated in FIG. 50A, the interactive tabletop 5505 can transmit display control data 4710.1-4710.G to the plurality of configurable game-piece display devices 4710.1-4710.G. For example, the interactive tabletop 5505 can transmit to the plurality of configurable game-piece display devices 4710 via a short range wireless signal, via a local area network that includes the interactive tabletop 5505 and the configurable game-piece display devices 4710.1-4710.G, via screen to screen communications as discussed in further detail herein when the game-piece display devices 4710 are atop the table, being touched by a user also touching the table, or in proximity to the table, or via other means. The interactive tabletop 5505 can include a transmitter and/or communication interface operable to send the display control data to each configurable game-piece display device 4710.

The interactive tabletop 5505 can transmit display control data to configurable game-piece display devices 4710 based on detecting the configurable game-piece display devices 4710. For example, the configurable game-piece display devices 4710 are implemented to be detected based on implementing some or all features and/or functionality of passive user input devices and/or non-interactive objects described herein, where interactive tabletop 5505 is implemented via some or all features and/or functionality of the interactive display device 10 described herein to detect the configurable game-piece display devices 4710 accordingly. Alternatively or in addition, the configurable game-piece display devices 4710 can have a distinguishing and detectable shape, size, color, pattern on their underside that the tabletop of interactive tabletop 5505, RFID, transmitted signal, or other distinguishing feature.

Such distinguishing features can further distinguish the different configurable game-piece display devices 4710 from each other. Different configurable game-piece display devices 4710 can have their own respective identifier and/or can otherwise be operable to only receive and/or process their own display control data, and/or to otherwise distinguish their own display control data from other display control data designated for other configurable game-piece display devices 4710. In some embodiments, drive sense circuits of the interactive tabletop 5505 transmit each different display control data 4715 at a corresponding frequency and/or modulated with a corresponding frequency associated with a corresponding configurable game-piece display device, where a given configurable game-piece display device demodulates the display control data 4715 that was transmitted at its respective frequency. In other embodiments, each display control data 4715 is otherwise identified via identifying data of the corresponding configurable game-piece display device.

The interactive tabletop 5505 of FIGS. 50A-50K can be implemented as an interactive display device 10 and/or can be implemented to have some or all features and/or functionality of interactive display device 10. For example, the interactive tabletop 5505 can have a display, for example, where a corresponding virtual game board is displayed via the display, and where the configurable game-piece display devices are placed atop the virtual game board. Some or all features and/or functionality of the interactive tabletop 5505 of FIGS. 50A-50K can be utilized to implement any other embodiment of interactive display devices, touch screen displays, and/or computing devices described herein.

Alternatively, the interactive tabletop 5505 does not have a display. For example, the surface of interactive tabletop 5505 can be opaque or look like ordinary furniture. This can be preferred in cases where the interactive tabletop 5505 need not display a virtual game board, and where a physical game board, or by one or more configurable game-piece display devices 4710 being implemented as a game board by displaying image data corresponding to a layout of the game board, being placed atop the interactive tabletop 5505. Any interactive display device 10 described herein can similarly be implemented as any non-display surface, for example, that still functions to detect objects and/or identify users and discussed herein based on including an array of electrodes and/or corresponding DSCs to generate capacitance image data and/or otherwise detect users and/or objects in proximity as described herein, even if no corresponding graphical image data is displayed via a display.

In some embodiments, the interactive tabletop 5505 has a plurality of drive sense circuits that enable detection of various touch and/or objects upon the tabletop as discussed herein, for example, where these DSCs are utilized to detect the configurable game-piece display devices and/or to distinguish the configurable game-piece display devices from different objects. For example, the game-piece display devices are detected via the DSCs of the interactive tabletop 5505 based on implementing the DSCs to detect electric characteristics of the set of electrodes and their changes over time to detect the game-piece display devices, for example, based on their shape and/or size, a unique impedance pattern based on an impedance tag and/or conductive pads upon the bottom of the game-piece display devices in an identifiable configuration, a frequency of a signal or other information in a signal transmitted by game-piece display devices, a resonant frequency of the game-piece display devices, or other means of identifying the game-piece display devices when placed upon and/or in proximity to the table in a same or similar fashion as detecting passive devices or other objects as described herein.

Implementing a plurality of DSCs and an array of electrodes in interactive tabletop 5505 can be preferred in embodiments where detection of users, their respective positions, and/or the detection of game pieces, such as the configurable game-piece display devices 4710, have their respective positions and movements detected to track the game play by players and the respective game state of the game, regardless of whether the corresponding game board is virtually displayed or is implemented via a separate, physical game board with the game board layout printed upon the top. In particular, game state data such as: game piece positions; movement of game pieces; touching of or movement of particular game pieces by particular players based on detecting a frequency associated with the given player propagating through the piece, or based on determining the piece is assigned to the user as one of the user's pieces for play; current score, health, or other status of each player, current health or status of each game piece; and/or some or all of the entirety set of game movements and/or turns throughout the game can be tracked based on detecting movements of the pieces in relation to the game board, by particular players, and/or in the context of the game rules. For example, a set of moves of a chess game can be tracked by the interactive tabletop 5505 and optionally transmitted to memory for download at a later time, enabling users to review their respective chess moves at a later time and/or enabling tournament officials to track chess moves across all players playing at interactive tabletop 5505 at a chess tournament. In cases where the interactive tabletop 5505 includes a display, some or all game state data, such as the current score, can be displayed via the display for view by the users, for example, adjacent to the game board.

In some embodiments, alternatively or in addition to including a plurality of drive sense circuits and/or a corresponding array of electrodes enabling detection of various touch and/or objects upon the tabletop as discussed herein, the interactive tabletop can include one or more other types of sensors. For example, the interactive tabletop detects presence of the configurable game-piece display devices 4710 via other means, such as via RFID sensors, pressure sensors, optical sensors, or other sensing capabilities utilized to detect presence of object and/or to identify objects upon a tabletop as described herein.

In some embodiments, users, game controllers, game-piece display devices, and/or other objects are detected and/or identified via a plurality of sensors integrated within the sides of the table, for example along the sides of the table perpendicular to the tabletop surface of the table and/or perpendicular to the ground, within the legs of the table, and/or in one or more portions of the table. For example, sensors are integrated into the sides of the table to detect objects and/or users around the sides table, rather than hovering above or placed upon the table, alternatively or in addition to being integrated within tabletop surface. These sensors can be implemented via one or more electrode arrays and corresponding DSCs. These sensors can be implemented as, optical sensors, occupancy sensors, receivers, RFID sensors, or other sensors operable to receive transmitted signals and/or detect the presence of objects or users around the sides of the table. Any interactive display device 10 described herein can similarly have additional sensors integrated around one or more of its sides.

Figure 50B:
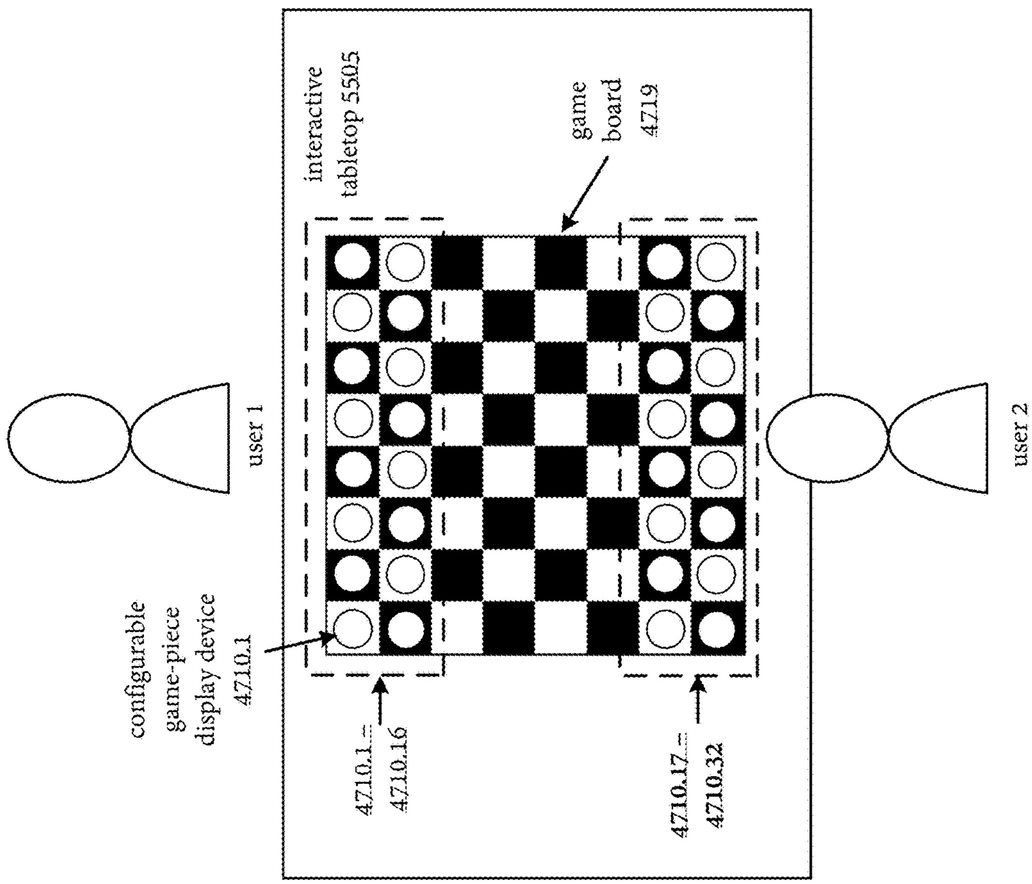
FIG. 50B is a pictorial diagram illustrating a top view of an embodiment of configurable game-piece display devices atop an interactive tabletop in accordance with the present disclosure.
Figure 50C:
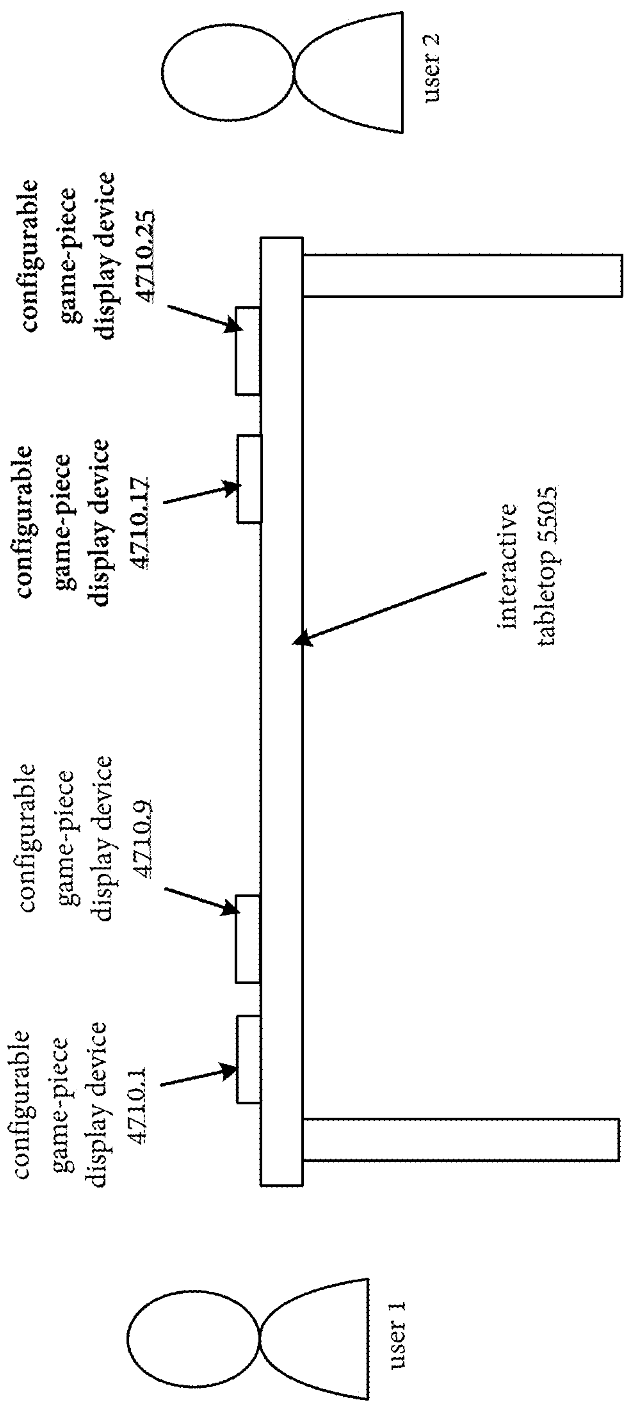
FIG. 50C is a pictorial diagram illustrating an embodiment of an interactive tabletop in accordance with the present disclosure.

FIGS. 50B and 50C illustrates an example use of configurable game-piece display devices 4710 atop an interactive tabletop 5505 during game play. FIG. 50B presents a top view, while FIG. 50C presents a side view. In particular, as illustrated in FIG. 50C, the configurable game-piece display devices 4710 are separate physical devices that are placed atop the interactive tabletop 5505.

In other embodiments, other interactive boards can be implemented as interactive tabletop 5505, such as interactive game boards that are placed atop tables, vertical magnet boards that support use of magnetic configurable game-piece display devices 4710, or other boards that enable the configurable game-piece display devices 4710 being placed upon and moved upon the board in conjunction with playing a game. The configurable game-piece display devices 4710 can be approximately the size of respective game pieces, for example, with diameter less than 3 inches and/or with a height less than 1 inch. The configurable game-piece display devices 4710 can optionally be any other size.

While FIGS. 50B and 50C depict configurable game-piece display devices 4710 as having a disk shape, other embodiments of configurable game-piece display devices 4710 can have any size and/or shape, such as a tile shape, square shape, hexagonal shape, triangular shape, custom shape for a game-piece of a particular game, or any other shape. While FIGS. 50B and 50C depict configurable game-piece display devices 4710 as having a same shape and size, other embodiments of configurable game-piece display devices 4710 can be configured to have different shapes and sizes from each other, for example, for use in a same game as different types of pieces, and/or for use in different games requiring different sizes and/or shapes of pieces. In some embodiments, configurable game-piece display devices 4710 can be configured to attach to and/or detach from each other at the sides and/or to attach in a stack, enabling customization of shapes and sizes of the configurable game-piece display devices 4710 for different games. In such cases, their display can correspond to components of a full display displayed by the full set of attached pieces. As a particular example, a set of square configurable game-piece display devices 4710 can remain detached for use as tiles in Scrabble, but can be attached along one side in groups of two to form a set of rectangular configurable game-piece display devices 4710 for use in Dominos, where each piece in a corresponding pair displays one of the two different numbers of a given Domino tile via a corresponding set of dots denoting the given number.

In the example, of FIGS. 50B and 50C, a set of 32 configurable game-piece display devices 4710.1-4710.32 are placed atop the interactive tabletop 5505 for use by users 1 and 2 in playing a game of chess or checkers. While not displayed in this example, the display data displayed by configurable game-piece display device 4710.1-4710.32 can distinguish the game pieces as necessary in accordance with playing the corresponding game. The display data can optionally be static for the entire game or otherwise distinguish particular game pieces from start to finish of a particular game, so that game pieces are not confused as they are moved by players.

For example, in the case of checkers, configurable game-piece display devices 4710.1-4710.16 each display the same display data, such as a common color, symbol, or other common image for the entirely, and configurable game-piece display devices 4710.17-4710.32 also each display the same display data that is different from that of configurable game-piece display devices 4710.1-4710.16. For example, all of the configurable game-piece display devices 4710.1-4710.16 display a black image, and all of the all of the configurable game-piece display devices 4710.17-4710.32 display a red image. In some embodiments, the corresponding control data sent to 4710.1-4710.16 is different from that sent to 4710.17-4710.32 to distinguish the two players pieces based on: sending first control data denoting the first common image to exactly 16 pieces and sending second control data denoting the second common image to exactly 16 other pieces based on each player using 16 pieces for checkers; sending control data to each set of 16 pieces denoting the common image based on checkers pieces not needing to be distinguishable from each other for a given player, based on detecting configurable game-piece display devices 4710.1-4710.16 as being positioned closer to user 1 and/or detecting configurable game-piece display devices 4710.1-4710.32 as being positioned closer to user 2; based on detecting configurable game-piece display devices 4710.1-4710.16 as being touched by user 1 due to detection of a frequency associated user 1, and/or detecting configurable game-piece display devices 4710.1-4710.32 as being as being touched by user 2 due to detection of a frequency associated user 2; and/or other determinations.

In the case of chess, in addition to different players pieces being distinguished in display data displayed by configurable game-piece display devices 4710, for example, via different colors, different types of pieces are further distinguishable from each other via corresponding symbols. An example embodiment of display data for use in chess is illustrated in FIG. 50H. The corresponding control data can be further configured to include differing control data for different types of pieces controlled by a same user.

In cases where the required number of configurable game-piece display devices 4710 are not detected by interactive tabletop 5505 to be on top of or in proximity to the interactive tabletop 5505, the interactive tabletop can display a notification indicating more pieces are necessary to play. In cases where the interactive tabletop does not have its own display, such a notification can be transmitted to one or more of the detected configurable game-piece display devices 4710 for display.

The game of chess or checkers in this example can be played by utilizing a corresponding chess and/or checkers game board 4719, where the configurable game-piece display devices 4710.1-4710.32 are moved by players to different positions atop the chess and/or checkers game board 4719 as the game progresses. Other types of boards with different design and layout can be implemented as game board 4719 in other embodiments where configurable game-piece display devices 4710.1-4710.32 are utilized to play different board games.

In some embodiments, game board 4719 is displayed via a display of interactive tabletop 5505 based on being implemented as an interactive display device 10, for example, when operating in accordance with a game play setting as discussed in conjunction with FIGS. 49A-49C. In such cases, the display can be rendered to a size based on the known and/or detected shape and/or size of configurable game-piece display devices 4710, for example, where each chess square has dimensions when displayed based on the physical dimension of the configurable game-piece display devices 4710.

As another example, the game board 4719 is a separate physical element atop the interactive tabletop 5505, for example, where the checkered pattern is permanently printed upon this separate physical element, and/or where the checkered pattern is displayed upon this separate physical element based on this separate physical element including a display that renders image data corresponding to the checkered pattern. For example, based on the game board 4719 itself being implemented as a single additional, larger configurable game-piece display device 4710, based on the game board 4719 itself being implemented as a plurality of smaller configurable game-piece display devices 4710, such as sixty-four adjacent square configurable game-piece display devices 4710 that each display either black or white based on corresponding control data, other interactive display device 10, or another set of adjacent configurable game-piece display devices 4710 that result in the full game board 4719 when combined.

Figure 50D:
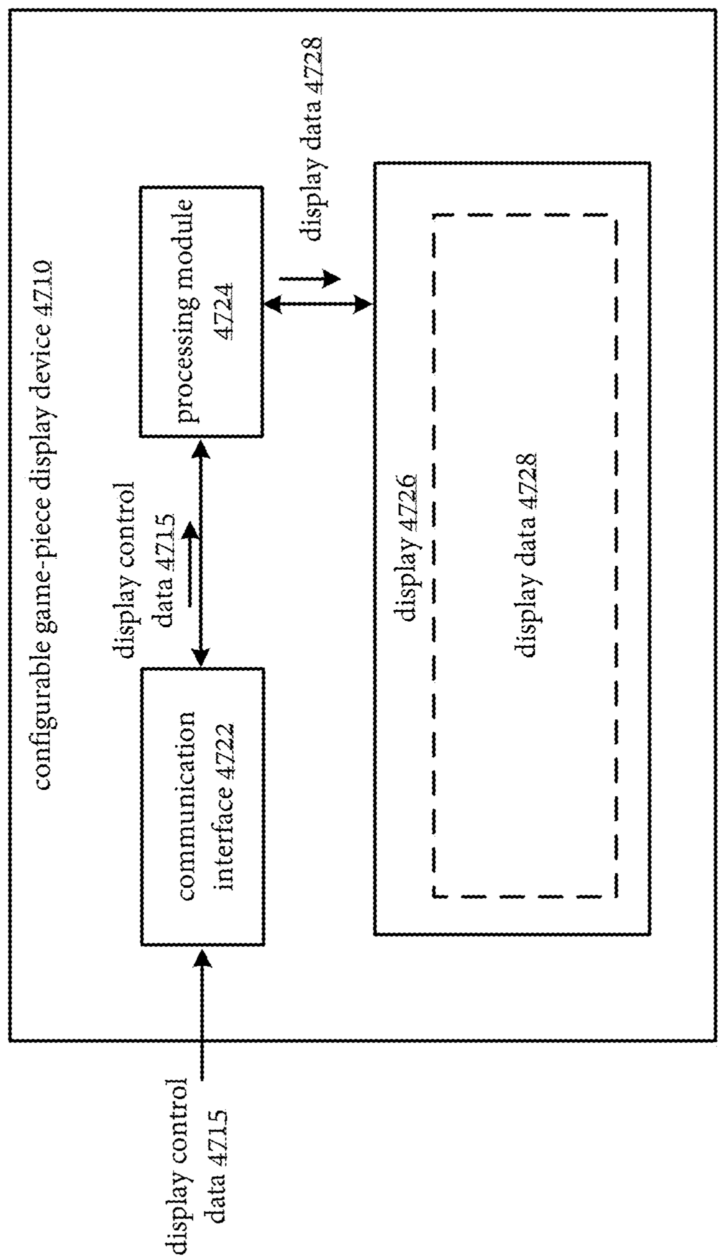
FIG. 50D is a schematic block diagram of an embodiment of a configurable game-piece display device in accordance with the present disclosure.

FIG. 50D illustrates an embodiment of a configurable game-piece display device 4710. The configurable game-piece display device can include a communication interface 4722 and/or receiver operable to receive display control data 4715 from the interactive tabletop 5505. The received display control data 4715 can be processed via at least one processing module 4724 to extract and/or determine corresponding display data 4728 to be rendered via a corresponding display 4726 of the configurable game-piece display device 4710. The configurable game-piece display device 4710 can optionally implemented via additional components and/or functionality of any embodiment of interactive display device 10 described herein, for example, where configurable game-piece display devices 4710 are optionally implemented as interactive display devices 10.

Figure 50E:
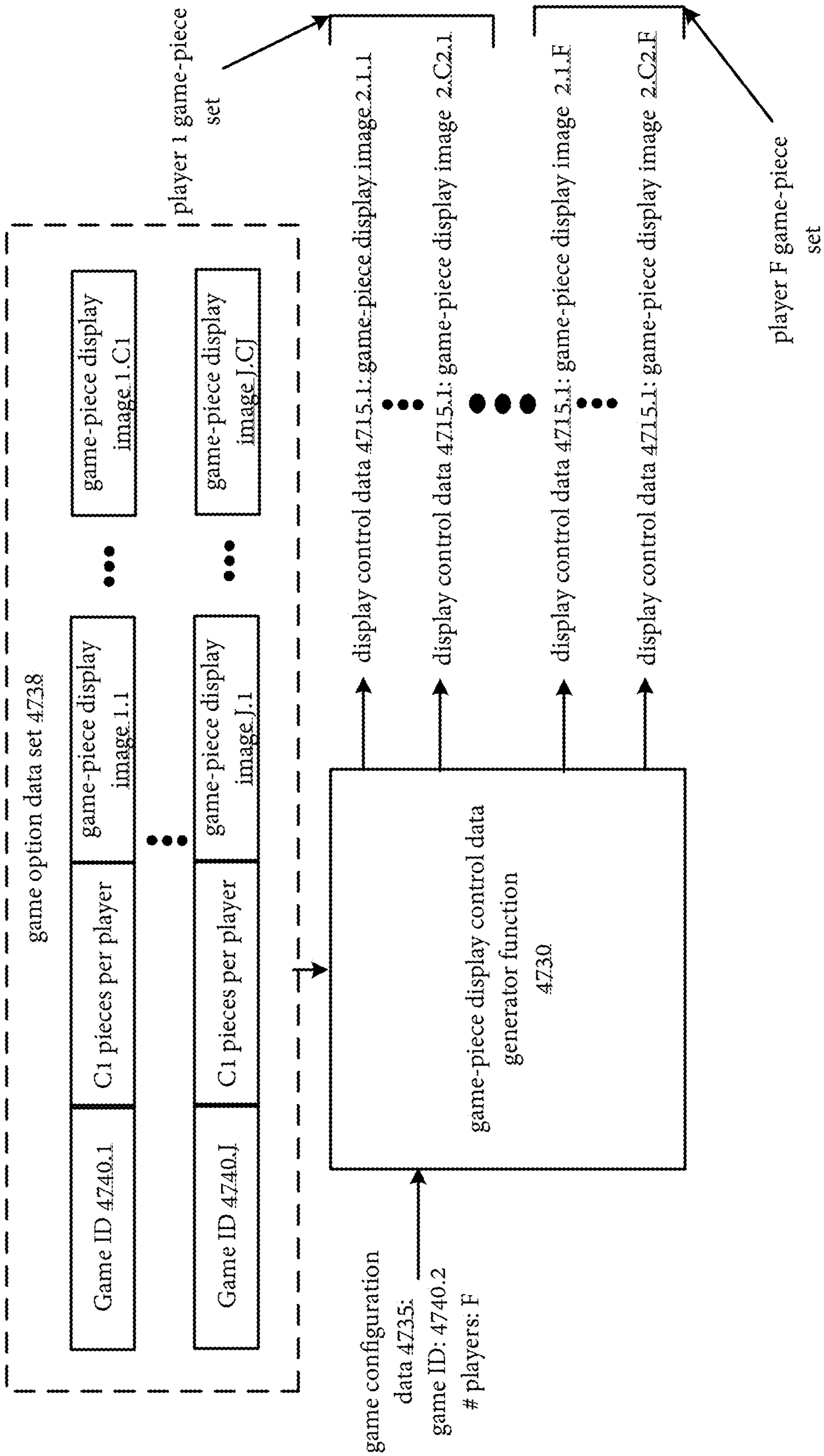
FIG. 50E is a schematic block diagram of an embodiment of a game-piece display control data generator function device in accordance with the present disclosure.

FIG. 50E illustrates an embodiment of a game-piece control data generator function 4730 utilized to generate the display control data 4715. For example, the game-piece control data generator function 4730 is performed by at least one processing module 42 of interactive tabletop 5505.

The game-piece control data generator function 4730 can generate display control data 4715 based on game configuration data 4735. The game configuration data 4735 can indicate which type of game is being played, how many players are playing and/or other information regarding how many pieces are required and what their respective display data should be. In particular, the game configuration data 4735 can indicate a game identifier 4740 denoting a particular game, and a number of players. The game configuration data 4735 can be generated based on user input to the interactive tabletop 5505, such as to a displayed set of option displayed by a touch screen 12, where a user select which game they wish to play and/or how many players will be playing. Alternatively or in addition, the game is detected based on use of a corresponding physical game board or other custom physical pieces that correspond to the particular game, for example, as passive devices or other distinguishable objects as discussed in conjunction with FIGS. 45-48, where these pieces are detected by and identified by interactive tabletop 5505, and where the corresponding game is thus determined. Alternatively or in addition, the number of players is determined based on detecting different players around the table and/or detecting their respective positions, for example, as discussed in conjunction with FIGS. 45-48. The game configuration data 4735 can optionally correspond to a setting update condition 4615 and/or a determined setting 4610, for example, where the given game is a setting 4610 of setting option set 4612.

A game option data set 4738 of J games having identifiers 4740.1-4740.J can be: received via a communication interface of the interactive display device 10; stored in memory of the interactive display device 10; configured via user input to interactive display device 10; automatically determined by interactive display device 10, for example, based on performing an analytics function, machine learning function, and/or artificial intelligence function; retrieved from memory accessible by the interactive display device 10; and/or otherwise determined by the interactive display device 10. Each game option data set 4738 can indicate a set of game piece display images 1-C displayed in each of C pieces for a given player. The C pieces for different players can be further distinguished, for example, via the images being displayed via different colors, based on corresponding information in the game option data set 4738 or another determination.

In some embodiments, the number of players is predetermined for a given game, such as in the case of checkers where the number of players is always two. In other games, as the number of players is variable, the number of required pieces is also variable. The number of players for a given game can be selected via user input or detected based on a number of users sitting at or in proximity to the interactive tabletop as discussed previously, and a corresponding number F of sets of set of C display control data can be sent to C×F configurable game-piece display devices 4710 accordingly. For example, while the game of Sorry or Parcheesi can be played via four players, only twelve display control data indicating three sets of four colors pawn for three players is sent to twelve corresponding configurable game-piece display devices 4710 based on detecting only three players around the table, or otherwise determining a selection to play via three players. In cases where the corresponding game has a maximum number of players exceeded by the number of people detected to be sitting at the table, F can be set as the maximum number of players. For example, when the game of Parcheesi is selected and five people are detected to be seated at the interactive tabletop 5505, only sixteen display control data is generated because Parcheesi only supports four players. Alternatively, the interactive tabletop 5505 can generate display data for display indicating game options of the game option data set 4738 that support the detected five players, enabling players to optionally select another game presented via the game options, such as the game of Clue, to be selected instead as game configuration data.

As some games do not have pieces assigned to individual players, where players instead draw tiles randomly from a pool of tiles as in Scrabble, Rummikub, or Dominos, games using a standard deck of 52 cards, or other games with a shared pool of tiles, the game option data set 4738 can indicate game-piece display images for these random, shared tiles and/or cards. In such cases, the display of image data by configurable game-piece display devices 4710 implementing these tiles is optionally not rendered and/or the control data is not generated or sent to the corresponding game-piece until being detected to be touched, or otherwise selected, by a player. In such cases, one of a remaining set of possible pieces can be selected via a random function for a given, newly selected configurable game-piece display devices 4710, where the corresponding display image of the randomly selected piece is indicated in the control data. Alternatively, the configurable game-piece display devices are optionally flipped with their display-side down or otherwise obstructed. The game-piece display images for a given game can otherwise correspond to any set of random and/or predetermined pieces for a game. In cases where the values or other information regarding the used pieces is random, a random function utilizing a distribution based on that of the corresponding game can be utilized to select which values and/or pieces will be used in play, and/or which values and/or pieces will be assigned to players starting hands and/or set of tiles.

Figure 50F:
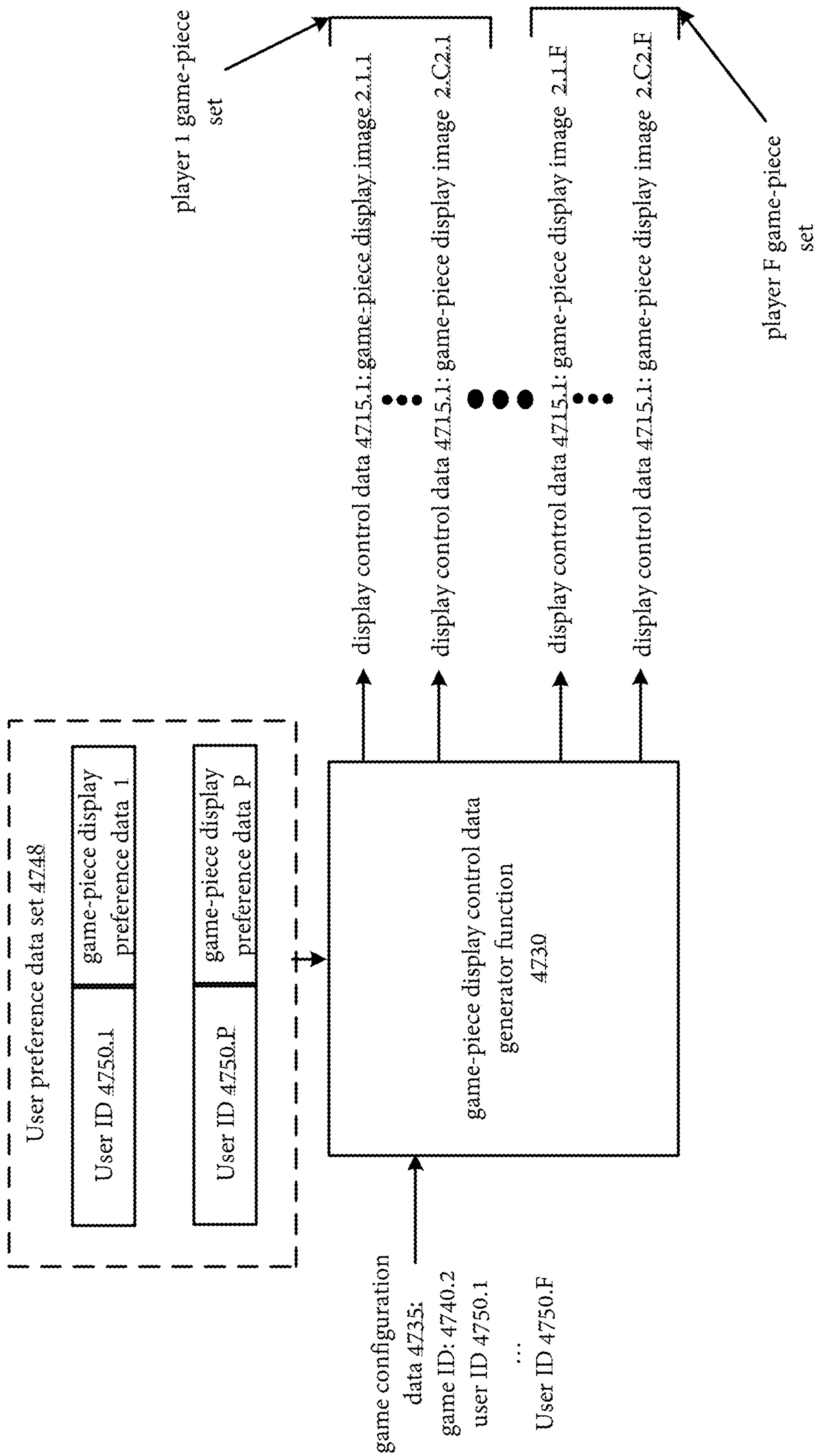
FIG. 50F is a schematic block diagram of an embodiment of a game-piece display control data generator function device in accordance with the present disclosure.

FIG. 50F illustrates an embodiment of game-piece control data generator function 4730 that further utilizes a user preference data set 4748 to generate display control data 4715, for example, instead or in addition to utilizing the information of game option data set 4738 as illustrated in FIG. 50E. In particular, different users can configure their own color preferences and/or image preferences to be displayed as their game pieces for one or more different games, for example, via user input to displayed options displayed via touch screen 12 and/or via other user configuration sent to and/or accessible by the interactive tabletop 5505.

A corresponding user preference data set 4748 indicating game-piece display preference data for P users having user identifiers 4750.1-4750.P can be: received via a communication interface of the interactive display device 10; stored in memory of the interactive display device 10; configured via user input to interactive display device 10; automatically determined by interactive display device 10, for example, based on performing an analytics function, machine learning function, and/or artificial intelligence function; retrieved from memory accessible by the interactive display device 10; and/or otherwise determined by the interactive display device 10. Each game option data set 4738 can indicate a set of game piece display images 1-C displayed in each of C pieces for a given player. The C pieces for different players can be further distinguished, for example, via the images being displayed via different colors, based on corresponding information in the game option data set 4738 or another determination.

When particular players are detected as being present, for example, based on detection of their corresponding frequency as discussed in conjunction with FIG. 45 based on their proximity to or user interaction with touch screen 12 and/or the DSCs of interactive tabletop 5505, and/or otherwise based on determining their user ID 4750, the display control data for each player's pieces can be further generated based on their game-piece display preference data, such as the preferred style of images, selected colors, custom picture or illustration of the user, name of the user, or other configured and/or determined preference data for the user. For example, user 1 of FIGS. 50B and 50C has user preference data indicating their preferred piece color for all games is pink, and display control data is generated for configurable game-piece display device 4710.1-4710.16 indicating pink display data, rather than red or black, based on user 1 being detected as the player sitting in at their respective location. As another example, a user indicates their preferred Monopoly include uploaded video data of their pet dog, and a corresponding display control data is generated to indicate this video data be displayed for the player's configurable game-piece display device 4710 based on detecting the user, and based on the game configuration data indicating selection of Monopoly.

Figure 50G:
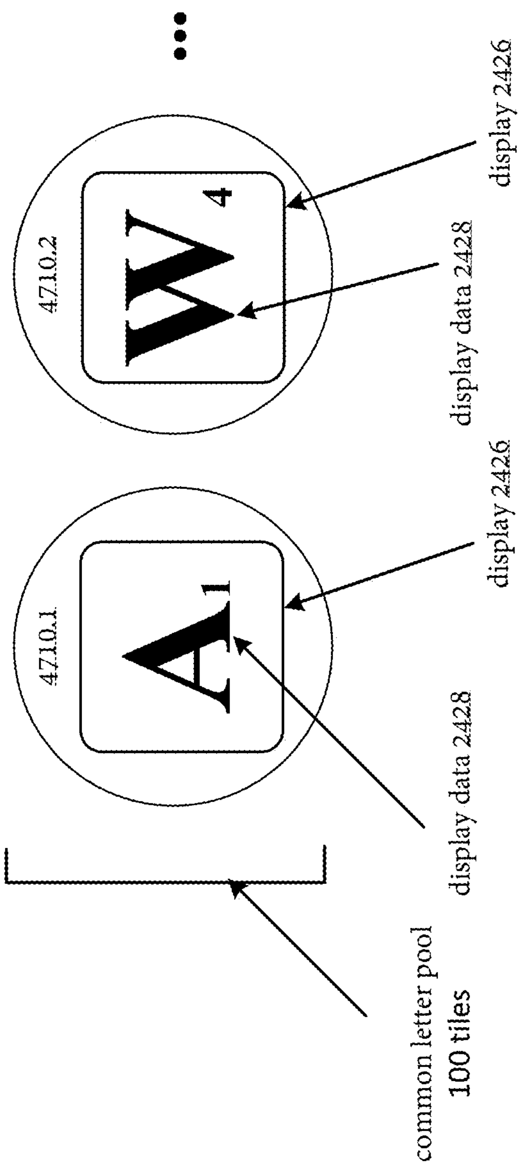
FIGS. 50G-50I are pictorial diagrams illustrating example embodiments of a set of configurable game-piece display device in accordance with the present disclosure.
Figure 50H:
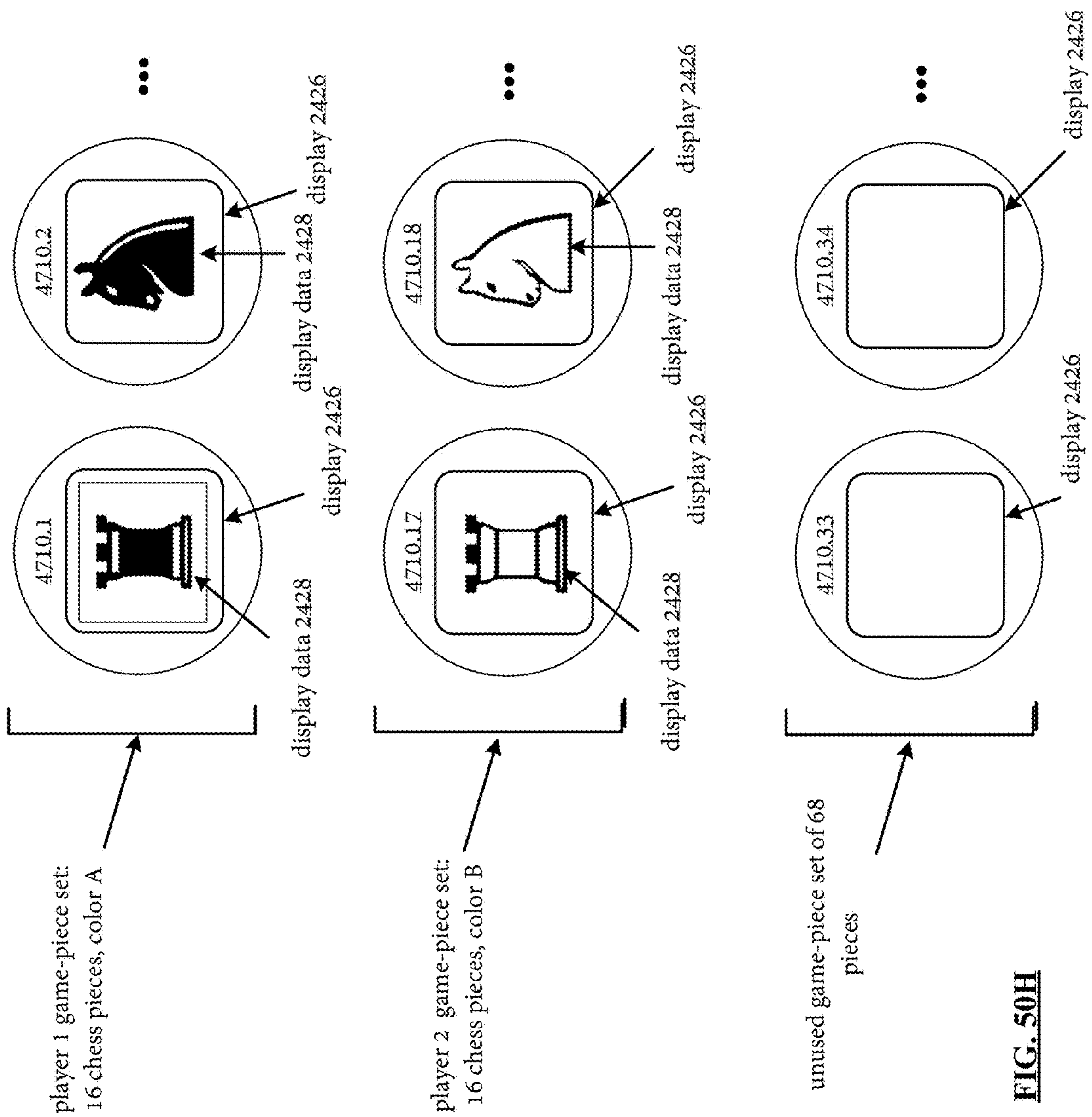
Figure 50I:
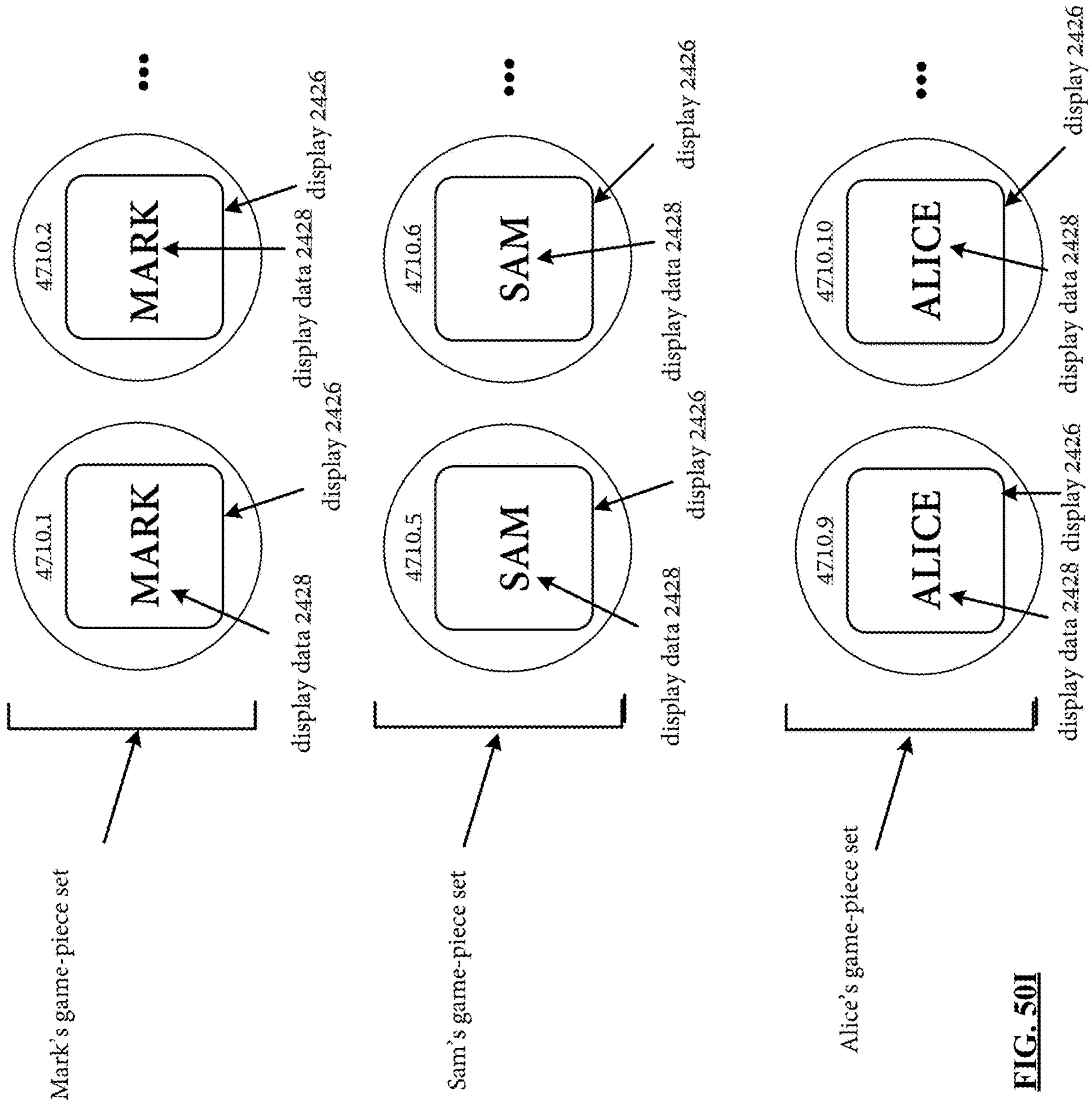

FIGS. 50G-50I illustrate an example embodiment of a set of 100 configurable game-piece display device 4710.1-4710.100 that render different display data for use in playing different games over time, for example, based on receiving different corresponding display control data generated in response to determining to play each different game. As illustrated in FIG. 50G, the configurable game-piece display devices 4710.1-4710.100 can be implemented as a set of 100 Scrabble tiles while playing Scrabble, for example, during a first temporal period. As illustrated in FIG. 50H, the configurable game-piece display devices 4710.1-4710.100 can be implemented as a set of 32 Chess pieces while playing Chess, for example, during a second temporal period after the first temporal period, where the remaining 68 configurable game-piece display devices 4710 remain unused and/or can be removed from the table as they are not necessary. As illustrated in FIG. 50I, the configurable game-piece display devices 4710.1-4710.100 can be implemented as three sets of four player pawns while playing Parcheesi, for example, during a third temporal period after the second temporal period, where the remaining 88 configurable game-piece display devices 4710 remain unused and/or can be removed from the table as they are not necessary. In this example, each player's set is configured based on user preference data to display their name, or other configured image data custom to the corresponding user, rather than a generic color. Other display data for different members of configurable game-piece display devices 4710 can be displayed for use in any other board game not described herein.

In some embodiments, during a given game, updated display control data for one or more configurable game-piece display devices 4710 can be generated and transmitted to the one or more configurable game-piece display devices 4710 based on updated game state data, for example, based on tracking piece movement and the state of the game as discussed previously. For example, as a Chess piece is killed, its display data can be updated to denote a skull and crossbones, to be blank, or otherwise indicate the corresponding piece is killed and no longer in play. As another example, as a checkers piece is kinged, a crown icon or other display can be displayed as part of its display data. As another example, as a set of random, hidden tiles are each "drawn" and revealed their display control data can indicate display of their assigned value, or can be generated to randomly assign their value for the first time as it was not necessary prior to being drawn, for example, based on detecting it is a new users turn, based on the user touching or selecting the piece, or another determination. As another example, as a set of tiles are "reshuffled" to begin a new round of play, for example, of cards, dominos, or Rummikub, the unique values and/or pieces assigned to each configurable game-piece display devices 4710 can be randomly reassigned to remove the necessity to physically shuffle the pieces. As another example, as game state data is tracked over time, the players score, health, or other metric can be computed for each player, where this data is indicated in the updated display data sent to player pieces over time, where a player's piece display's the player's most updated score as the game progresses, or where different pieces having different heath or other changing status each display their respective health or other status as the game progresses. As another example, as a user is detected to attempt an illegal move via a given configurable game-piece display devices 4710 in tracking the game state data, the updated display control data can be generated for the given configurable game-piece display devices 4710 to have display data that indicates the illegal move and/or advise the user to make a different move. For example, the illegal move is based on a player moving their piece via an illegal movement, or based on a player attempting to move a different player's piece.

Figure 50J:
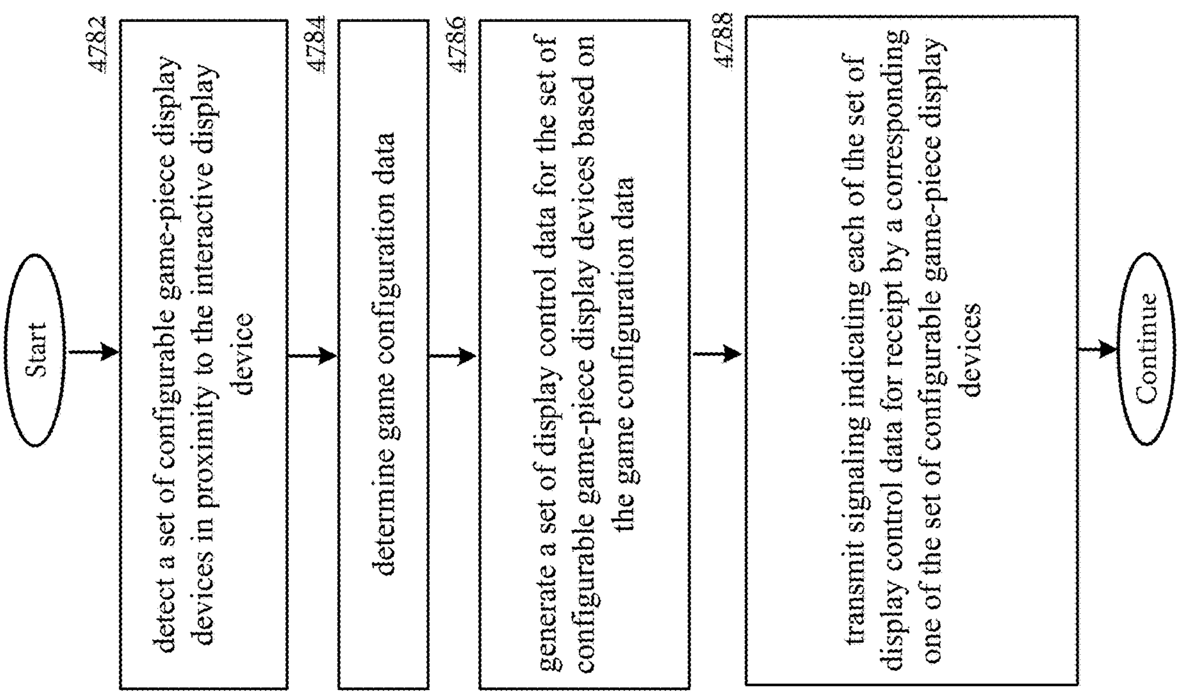
FIG. 50J is a logic diagram of an example of a method in accordance with the present disclosure.

FIG. 50J illustrates a flow diagram of an embodiment of a method in accordance with the present disclosure. In particular, a method is presented for execution by and/or use in conjunction with the interactive tabletop 5505, interactive display device 10, processing module 42, touch screen 12, and/or other processing modules and/or touch screen displays disclosed herein. Some or all steps of FIG. 50J can be performed in conjunction with some or all steps of one or more other methods described herein.

Step 4782 includes detecting a set of configurable game-piece display devices in proximity to the interactive display device. Step 4784 includes determining game configuration data Step 4786 includes generating a set of display control data for the set of configurable game-piece display devices based on the game configuration data. Step 4788 includes transmitting signaling indicating each of the set of display control data for receipt by a corresponding one of the set of configurable game-piece display devices. A display of each one of the set of configurable game-piece display devices can display corresponding display data based on a corresponding one of the set of display control data.

In various embodiments, the method further includes transmitting, by a plurality of drive sense circuits of an interactive display device, a plurality of signals on a plurality of electrodes of the first interactive display device during the first temporal period. In various embodiments, the method can further include detecting, by a set of drive sense circuits of the plurality of drive sense circuits, a change in electrical characteristics of a set of electrodes of the plurality of electrodes.

In various embodiments, the game configuration data is determined based on the change in electrical characteristics of the set of electrodes. In various embodiments, the method includes displaying, via a display of the interactive display device, game configuration option data In various embodiments, the game configuration data corresponds to user selections via user input to a touchscreen of the display.

In various embodiments, the set of configurable game-piece display devices are detected based on the change in electrical characteristics of the set of electrodes. In various embodiments, the set of configurable game-piece display devices are detected based on screen to screen communication with the set of configurable game-piece display devices.

Figure 50K:
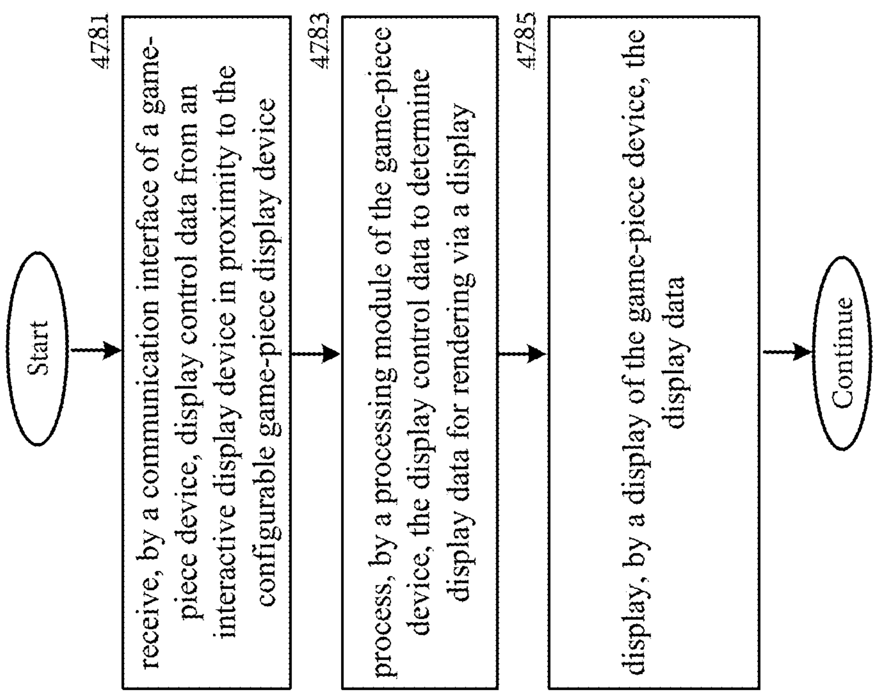
FIG. 50K is a logic diagram of an example of a method in accordance with the present disclosure.

FIG. 50K illustrates a flow diagram of an embodiment of a method in accordance with the present disclosure. In particular, a method is presented for execution by and/or use in conjunction with a configurable game-piece display device 4710, processing module 4724, communication interface 4722, and/or display 4726, processing module 42, and/or other processing resources and/or display devices described herein. Some or all steps of FIG. 50K can be performed in conjunction with some or all steps of FIG. 50J based on communication with an interactive tabletop, and/or one or more other methods described herein.

Step 4781 includes receiving, by a communication interface of a game-piece device, display control data from an interactive display device in proximity to the configurable game-piece display device. Step 4783 includes processing, by a processing module of the game-piece device, the display control data to determine display data for rendering via a display. Step 4785 includes displaying, by a display of the game-piece device, the display data.

FIGS. 51A-52E illustrate embodiments of an interactive display device 10 that enables users to play computer games or video games, where graphics corresponding to these computer games or video games are displayed via display 50. For example, a game played by users can have virtual elements alternatively or in addition to physical elements, such as the physical game board or the physical game pieces as described in conjunction with FIGS. 50A-50K. In particular, a game played by users can optionally be entirely virtual, even if the game corresponds to a board game such as chess, where all pieces and the board are entirely virtual. Any other computer games or video games can similarly be presented as entirely virtual games. Users can control virtual elements of the game based on user input to their own computing devices communicating with the interactive display device 10 as discussed in conjunction with 51C-51F; via touch-based and/or touchless gestures via their passive user input device, hand, finger, or other body part as discussed in conjunction with 52A-52E, and/or via other types of user input.

The interactive display device 10 can be implemented as a tabletop, or can be implemented in another configuration. Some or all features and/or functionality of the interactive display device 10 of FIGS. 45-48 can be utilized to implement the interactive display device 10 of FIGS. 51A-52E. Some or all features and/or functionality of the interactive display device 10 of FIGS. 51A-52E can be utilized to implement any embodiment of interactive display device 10 and/or touch screen display described herein. In some embodiments, features and/or functionality of the interactive display device 10 of FIGS. 51A-52E are implemented in conjunction with a game play setting of the interactive display device 10 as discussed in conjunction with FIGS. 49A-49C.

Figure 51A:
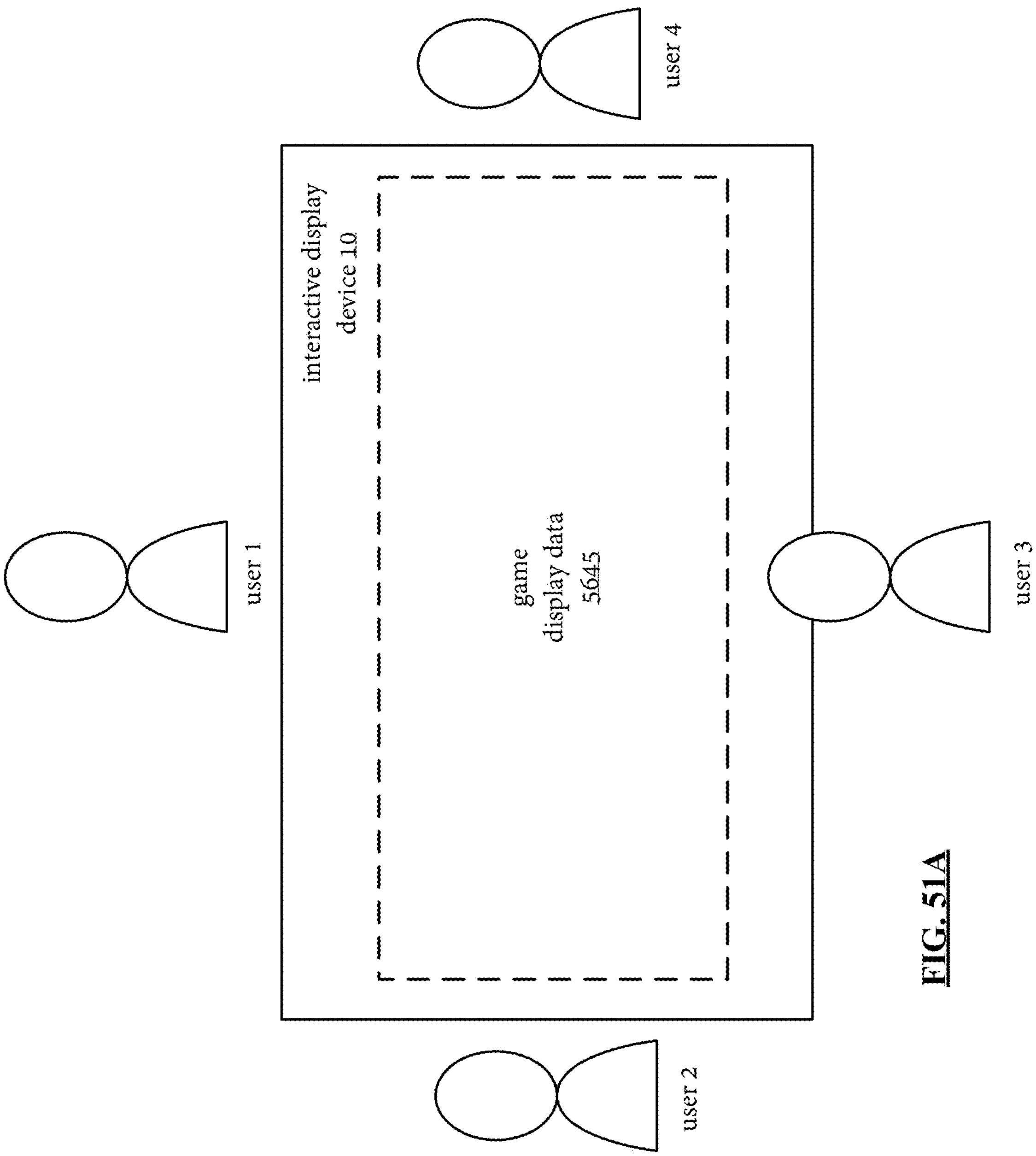
Figure 51B:
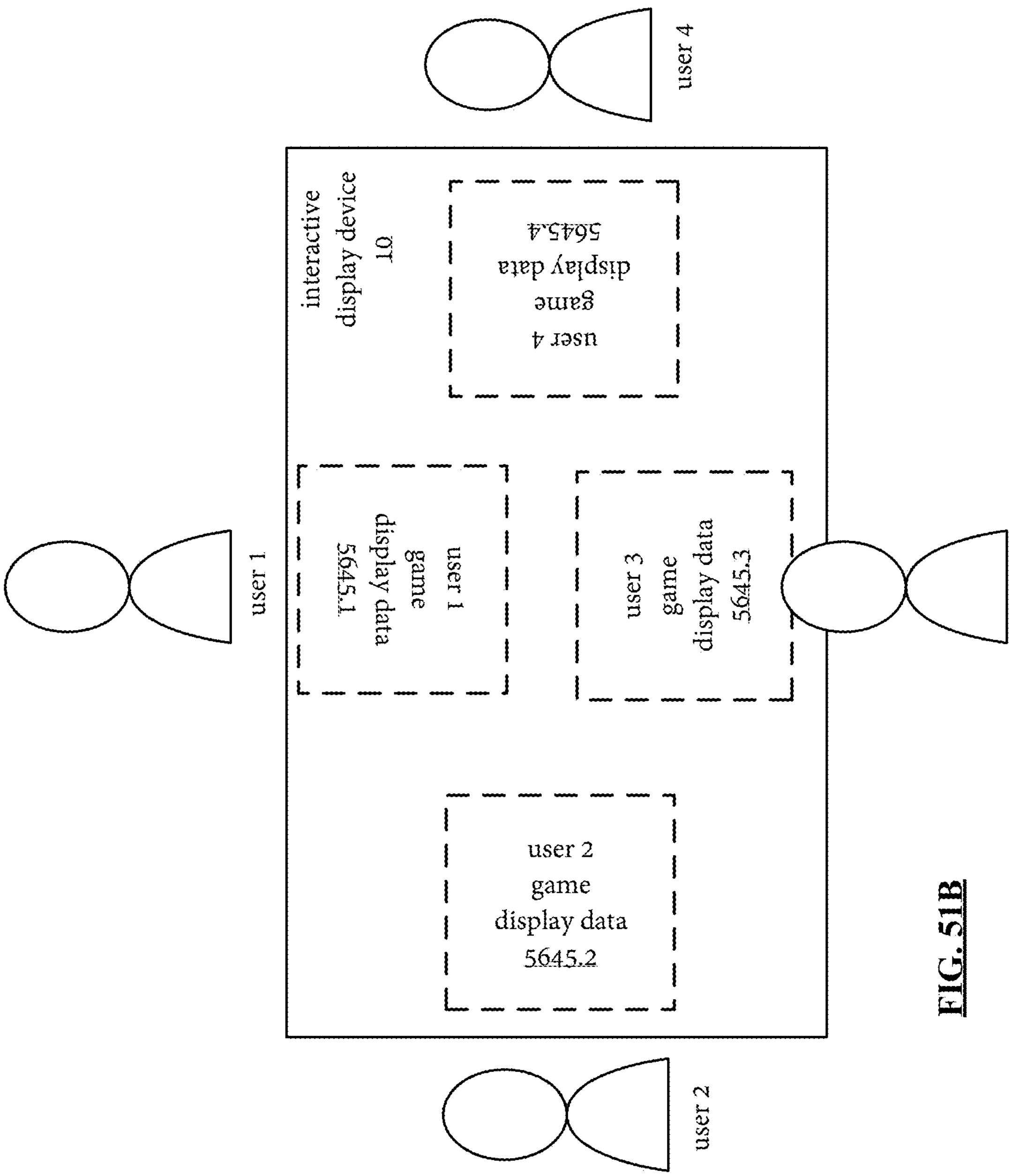

FIGS. 5A and 51B illustrate different embodiments of game display data 5645. In particular, in cases where the interactive display device 10 is implemented as a tabletop as discussed previously, challenges can arise in presenting a video game to players when players are viewing the game from above, at different orientations based on being at different sides of a table. These challenges are unique to the tabletop implementation, as other group-based video games are configured for play via an upright display, where all players view the display from a same, upright orientation.

FIG. 51A illustrates an embodiment where a set of users play a video game or computer game displayed as shared game display data 5645, for example, as a single common display in one orientation, despite users being seated at different sides of a corresponding table. For example, the shared game display data 5645 depicts a top view of a virtual world having avatars or vehicles controlled by users to navigate through the virtual world, for example, simultaneously or in accordance with rules of the video game. The top view can be preferred, as users can control their avatars with respect to their own top view orientation with respect to the table. For example, the top view is configured for a video game based on the video game being configured for play by users at a tabletop viewing the shared game display data 5645 at different angles. As another example, the shared game display data 5645 depicts a top view of a virtual game board, such as game board 4719, having virtual game-pieces controlled by users to move upon the game board, for example, in a turn based fashion or in accordance with rules of the corresponding board game.

In some embodiments, the orientation of shared game display data 5645 can optionally rotate for each player's turn, for example, based on the relative viewing angle from the player's position at the table. This can be ideal in cases where viewing a virtual game board via given orientation is preferred, such as in Scrabble, where it can be preferred to view words in an upright orientation relative from a given playing position. For example, a virtual game board and the pieces upon it rotate by 90 degrees each turn based on each of four players being seated at four sides of the table and playing the game, as depicted in FIG. 5A. Different rotations can commerce based on the number of players and detection of each players position relative to the table. The rotation can further be based on user preference data indicating how a player wishes to view the board relative to their position during their turn. Alternatively, the game board is naturally situated for viewing at a constant orientation, such as in chess or checkers or in a top view game of controlled avatars or vehicles, and the orientation of the shared game display data 5645 remains constant.

In some embodiments, directional movement of each player's avatar, game-piece, vehicle, or other virtual elements are controlled via a computing device held by the player, such as a gaming controller, joystick, a smart phone, a tablet, a mouse, a keyboard, or other user device utilized by the user to generate game control data to control movement and/or other game actions of their avatar, game-piece, vehicle, or other virtual element. The computing device can include physical directional movement controllers, such as up, down, left and right buttons and/or a joystick, or corresponding virtual directional movement controllers, for example, displayed on a touchscreen display of their smart phone and/or tablet that the user can select via touch and/or touchless indications.

In some embodiments, the corresponding directional movement of the avatar in the virtual world can be relative to the orientation of the user viewing the tabletop. In particular, different user's sitting around the table viewing the game display data from different angles may each direct their respective virtual avatar to move "right" by clicking a right arrow, moving their joystick right, or otherwise indicating the right direction via interaction with their computing device. However, these identical commands can correspond to different directional movements by each respective avatar based on applying a coordinate transformation or otherwise processing the "right" command relative to the known and/or detected position of the user with respect to the tabletop. For example, two users that each sit at opposite sides of an interactive tabletop and each direct their avatars to the "right" renders each avatar moving in opposite directions in the game display data, and in the virtual world, based on the two avatars moving in the right direction relative to the two opposite viewing angles of the two users. In other embodiments, the corresponding directional movement of each avatar is instead based on an orientation of each avatar in the virtual world, where such commands are processed with respect to the orientation of the given avatar, where the orientation of the given avatar can further be changed via user input to their computing device.

FIG. 51B illustrates an embodiment where a set of users play a video game or computer game displayed as different game display data 5645 for each player. For example, each game display data 5645 is displayed in a personalized display area for the user as illustrated in FIG. 45, and is further oriented such that a preferred orientation is facing the user. Thus, in an embodiment where view of a virtual world is from a first-person perspective or other perspective having a top and bottom, the orientation of each players view of the virtual world can be presented in accordance with an orientation based on the user's viewing angle. For example, each of four players at four sides of interactive tabletop each have game display data 5645.1-5645.4 presented at an orientation such that the bottom view is closest to the edge of the tabletop, such as in the orientation that the labels of this game display data 5645.1-5645.4 is presented in FIG. 51B. Thus, when split screen play of a first-person game, such as a first-person shooter game, driving game, or other game is employed some or all different split screens are presented in different orientations with respect to the tabletop of the interactive display device due to different users viewing the tabletop from different orientations, unlike split screen embodiments where an upright monitor displays all split screens with a same orientation due to the monitor being viewed by all users from a same orientation. In some embodiments, identical game display data, for example, of all avatars in a virtual world at a front-facing perspective, are duplicated into game display data 5645 presented in via each personalized display area at each respective orientation to ensure all players are viewing the front-facing display data of the game appropriately from their respective viewing position.

In some embodiments, an identifier of a corresponding user can further be determined and processed to configure the personalized display, for example, based on detecting characteristics of a corresponding user device, based on detecting a corresponding frequency, and/or based on other means of detecting the given user as described herein. For example, user profile data for different users indicates how the game data be displayed for different users based on their configured and/or learned preferences over time. The experiences for users can further be customized during play, for example, where gambling choices are automatically suggested and/or populated for different users based on their historical gambling decisions in prior play of the game at the same or different interactive display device 10 implemented as a poker table, for example, at a commercial establishment such as a casino, or at a table at the user's home during a remote poker game. As another example, a list of suggested games and/or corresponding settings for the game are automatically presented and/or initiated by the interactive display device 10, and/or payment data for gambling and/or for purchase of food and/or drinks is automatically utilized, based on being determined and utilized by interactive display device 10 in response to detecting the given user in proximity to the interactive display device 10, and based on being indicated in user profile data for the user, for example, where a virtual game of black jack commences by an interactive display device 10 for a user while at a casino based on detecting the user, and where funds to play in each virtual game of blackjack is automatically paid for via a financial transaction utilizing the payment data in the user's account.

FIGS. 51C-51F illustrate embodiments of an interactive display device 10 that enables users to play computer games or video games via user input to computing devices communicating with the interactive display device 10. Some or all features and/or functionality of the interactive display device 10 and/or computing device 4942 can be utilized to implement any other embodiment of interactive display devices, touch screen displays, and/or computing devices described herein.

Figure 51C:
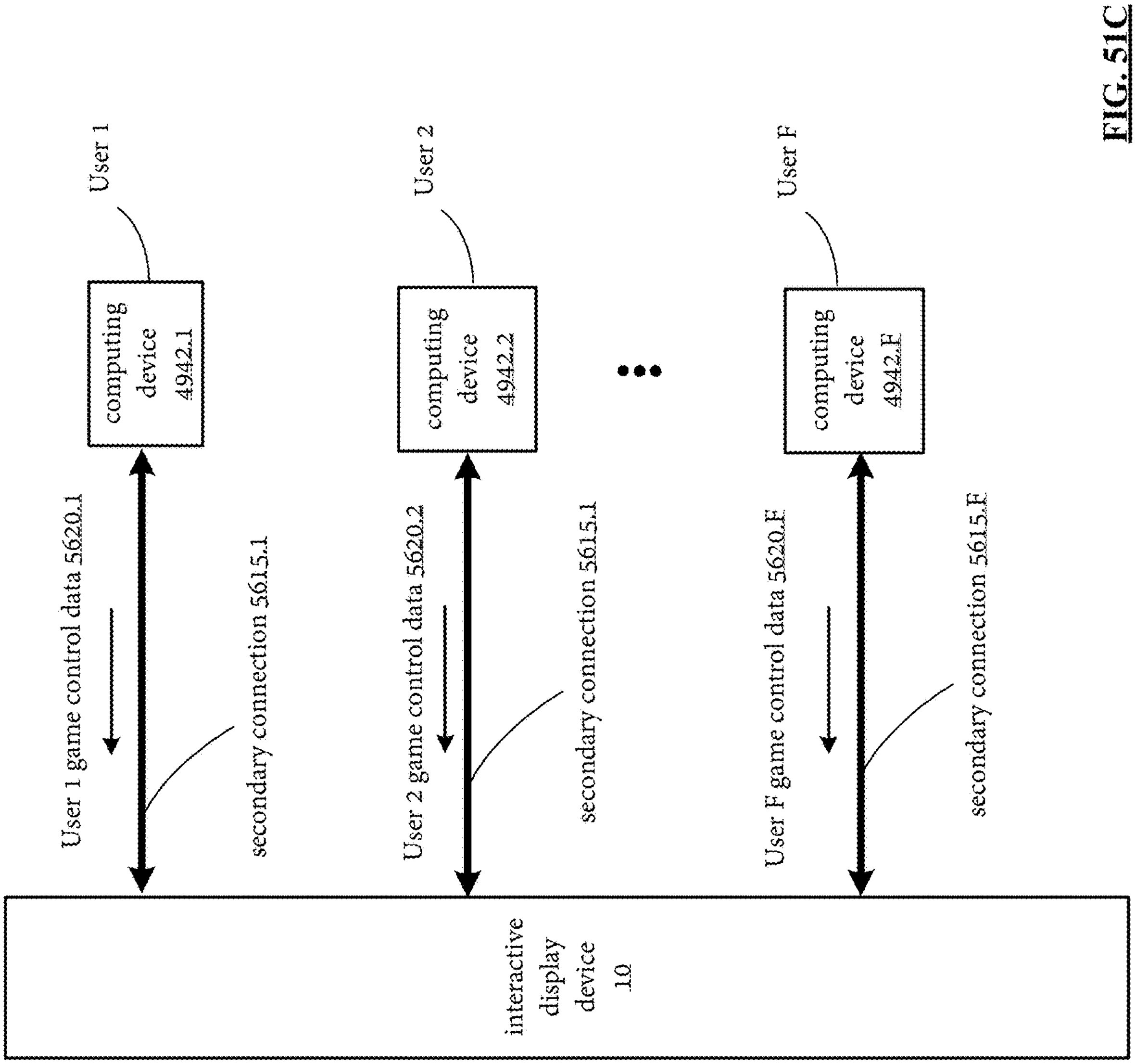
FIG. 51C is a schematic block diagram illustrating communication between an interactive display device and a plurality of computing devices in accordance with the present disclosure.

As illustrated in FIG. 51C, an interactive display device 10 can receive game control data 5620 generated by computing devices 4942 of one or more users 1-F playing a computer game or video game via one or more corresponding secondary connections 5615.1-5615.F. The interactive display device 10 can update game state data and corresponding graphics of the computer game or video game accordingly. The interactive display device 10 can process the game control data 5620 in conjunction with facilitating play of a corresponding game, for example, while in the game play setting as discussed in conjunction with FIGS. 49A-49C.

Each computing device 4942 can be implemented as any device utilized by the user as a game controller, such as: a gaming controller that includes buttons and/or a joystick that, when pushed or moved by the user, induces movement commands, action commands, or other commands of game control data 5620; a smart phone, tablet, other interactive display device 10, and/or other touchscreen device that displays virtual buttons, a virtual joystick for interaction by the user via user input to the touchscreen via touch-based and/or touchless interaction to induce movement commands, action commands, or other commands of game control data 5620; a smart phone, tablet, hand-held gaming stick, or other device that includes gyroscopes, accelerometers, and/or inertial measurement units (IMUs) that, when moved and/or rotated by the user, induces corresponding movement commands, action commands, or other commands as game control data 5620; a keyboard and/or mouse that the user interacts with to induce corresponding movement commands, action commands, or other commands as game control data 5620; and/or other computing device having means of user input to generate game control data 5620.

The secondary connections 5615.1-5615.F can each correspond to the same or different type of communications connection, and can be implemented via a local area network, short range wireless communications, screen to screen (STS) wireless connections, the Internet, a wired connection, another wired and/or wireless communication connection, and/or via another communication connection. For example, each computing device can pair with the interactive display device 10 for use by the user as a controller for playing the corresponding computer game or video game via the secondary connections 5615. This communication via the secondary connections 5615 can be established via a corresponding secondary type of communications, or via another type of communications, such as via screen to screen wireless connections, as discussed in conjunction with FIG. 51E.

In some embodiments, each computing device can further receive control data from the interactive display device 10 indicating interactive display data for display by the computing device in conjunction with generating game control data. This can include display data that includes a virtual joystick or virtual buttons. This can alternatively or additionally include display data that corresponds to a screen mirroring of some or all of the game display data displayed by the interactive tabletop, and/or first-person view of the game. In such embodiments, an orientation of the display data can further be indicated in the control data sent by the interactive display device 10, where the orientation of the display data is selected by the interactive display device 10 and/or computing device based on the detected viewing angle of the user relative to the table, for example, in a same or similar fashion on determining an orientation of the personalized display area based on the user's position with respect to the table, such as the side of the table at which the user is sitting.

Figure 51D:
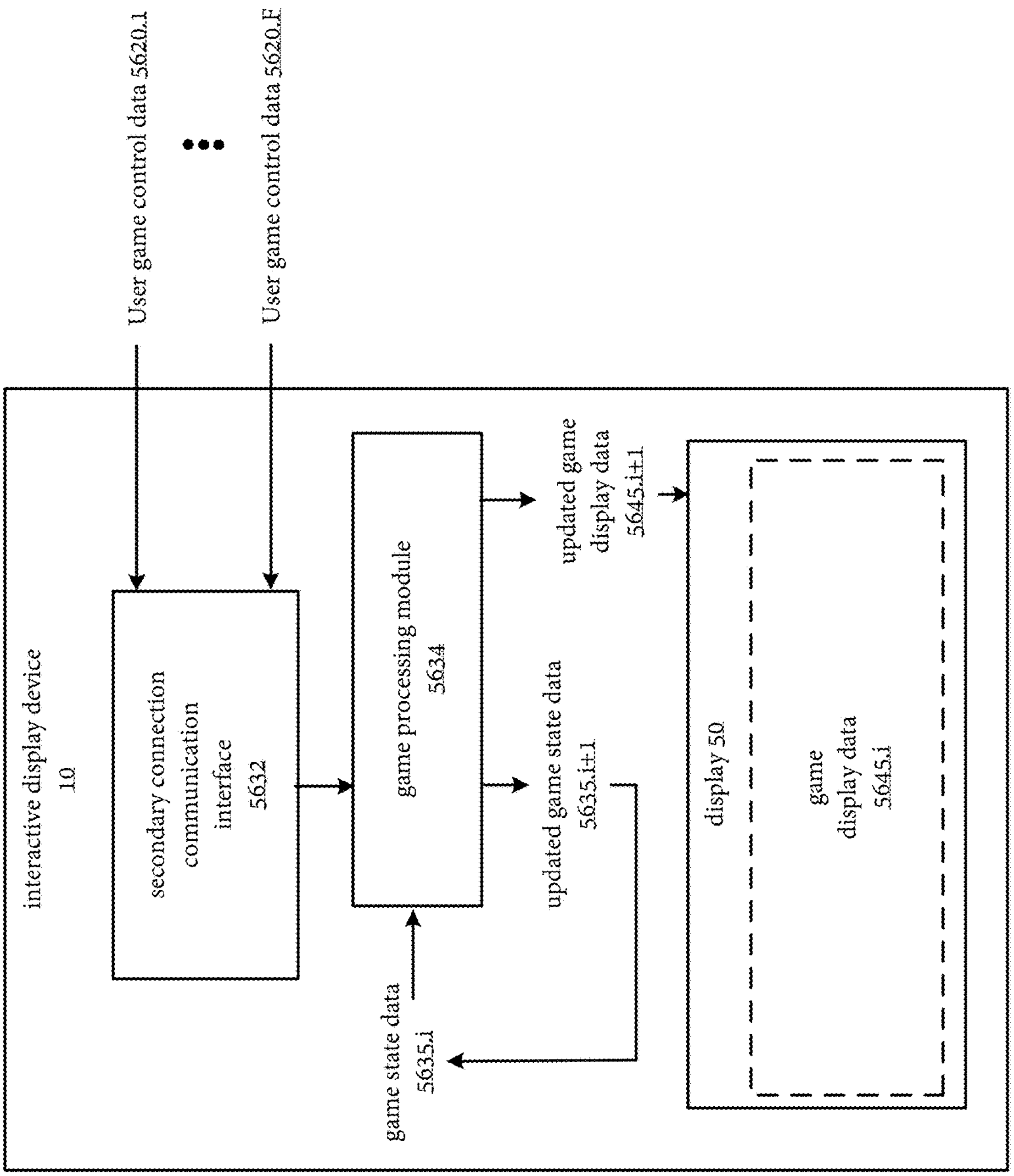
FIG. 51D is a schematic block diagram of an embodiment of an interactive display device that implements a game processing module in accordance with the present disclosure.

As illustrated in FIG. 51D, the interactive display device 10 can implement a game processing module 5634, for example, via one or more processing modules 42 or other processing resources, to generate game state data 5635, and corresponding game display data 5645 displayed by display 50, over time as user game control data 5620 is received from one or more users over time. As new user game control data 5620 is received and processed, updated game state data 5635.$i$+1 and correspondingly updated game display data 5645.$i$+1 can be generated based on updating the most current game state data 5635.$i$ and most recent game display data 5645.$i$ in accordance with commands indicated in the new game control data 5620, such as commands to control a virtual avatar, vehicle, or game-piece of a corresponding user, or to control other interactable virtual game elements. Other updates to game state data 5635 can occur based on other game elements not controlled by the users, such as via AI players, updates to the virtual world, random game elements, or other game elements.

Figure 51E:
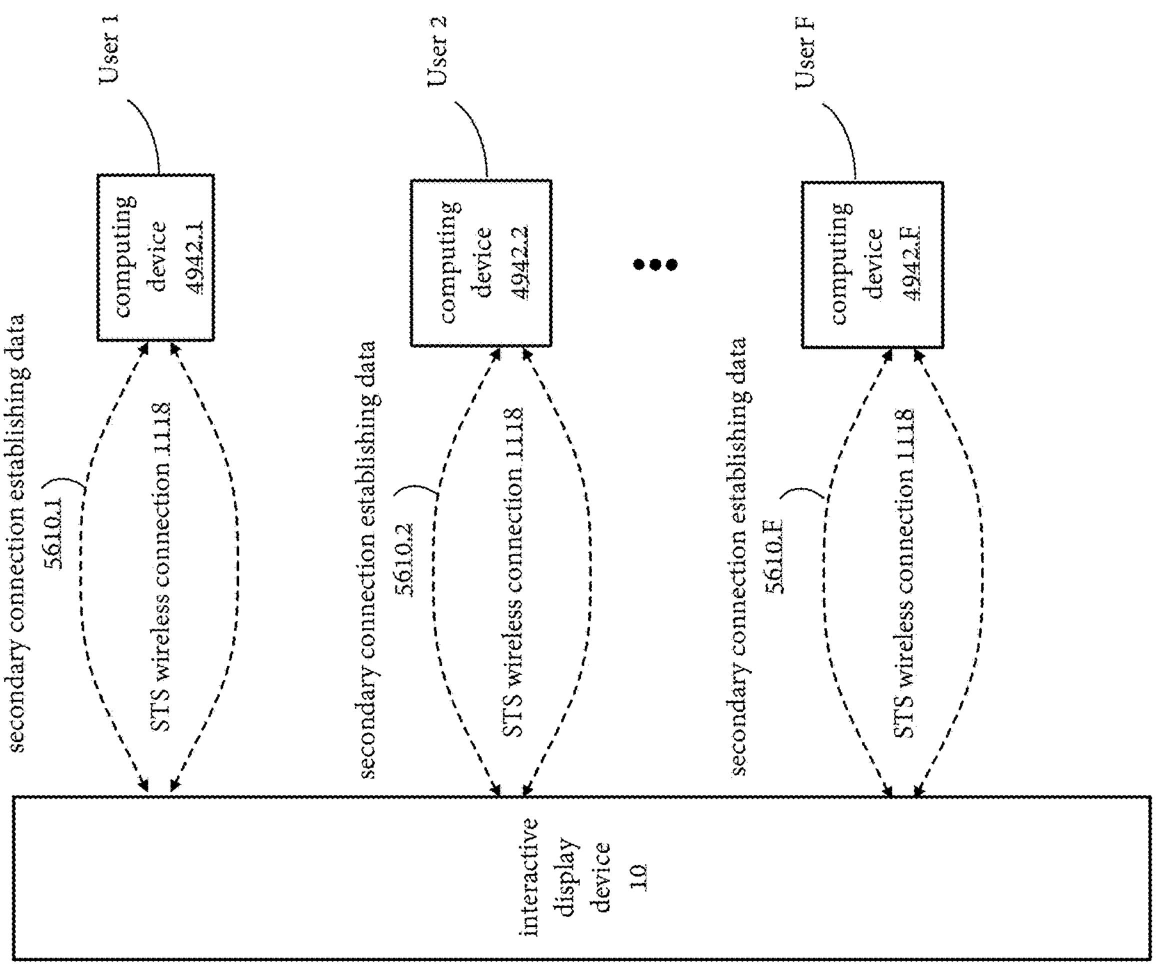
FIG. 51E is a schematic block diagram illustrating communication between an interactive display device and a plurality of computing devices in accordance with the present disclosure.

FIG. 51E illustrates an embodiment of computing devices 4942 and interactive display device 10 establishing their secondary connections 5615 based on screen to screen (STS) wireless connections 1118. The STS wireless connections can each include the computing device 4942 being in proximity to the interactive display device 10 and/or can include communication via a communications medium such as the user's body touching both the computing device 4942 being in proximity to the interactive display device 10 and/or proximity of the computing device 4942 being in proximity to the interactive display device 10.

For example, at least one signal transmitted on electrodes or other sensors of a sensor array of the interactive display device 10, for example, via a plurality of DSCs of interactive display device 10, can be modulated with secondary connection establishing data 5610 for detection by electrodes or other sensors of a sensor array of a given computing device 4942 and/or for demodulation by a processing module of the given computing device 4942 to enable the given computing device 4942 to determine and utilize the secondary connection establishing data 5610 to establish the secondary connection with the interactive display device 10. Alternatively or in addition, Aa least one signal transmitted on electrodes or other sensors of a sensor array of a computing device 4942, for example, via a plurality of DSCs of interactive computing device 4942, can be modulated with secondary connection establishing data 5610 for detection by electrodes or other sensors of a sensor array of the interactive display device 10 and/or for demodulation by a processing module of the interactive display device 10 to enable the interactive display device 10 to determine and utilize the secondary connection establishing data 5610 to establish the secondary connection with the given computing device 4942.

The STS wireless connections 1118 can be implemented utilizing some or all features and/or functionality of the STS wireless connections 1118 and corresponding STS communications discussed in conjunction with FIGS. 62A-62BM. For example, each computing device 4942 and/or the interactive display device 10 includes a touch screen sensor array, such as the touch screen sensor array discussed in conjunction with FIGS. 62A-62BM, which can be implemented by utilizing the plurality of electrodes and/or the plurality of DSCs discussed previously. Some or all features and/or functionality of the user computing devices of FIGS. 62A-62BM can be utilized to implement the computing devices 4942 of FIG. 51E and/or any other embodiments of computing devices discussed herein. Some or all features and/or functionality of the user computing devices of FIGS. 62A-62BM can be utilized to implement the computing devices 4942 of FIG. 51E and/or any other embodiments of computing devices discussed herein. Some or all features and/or functionality of the interactive computing devices of FIGS. 62A-62BM can be utilized to implement the interactive display device 10 of FIG. 51E and/or any other embodiments of interactive display device 10 and/or interactive tabletop 5505 discussed herein.

Each STS wireless connection 1118 can be utilized to establish the corresponding secondary connection 5615 of FIG. 51C, for example, based on transmitting of secondary connection establishing data 5610 via the STS wireless connection 1118 from the computing device 4942 to the interactive display device 10 and/or from the interactive display device 10 to the computing device 4942. For example, each given secondary connection establishing data 5610 is utilized to facilitate communication between the interactive display device 10 and the given computing device 4942 via the secondary connection 5615. As a particular example, the secondary connections 5615 are different from the screen to screen communications, and are implemented instead via a local area network and/or via short range wireless communications such as Bluetooth communications, based on the secondary connection establishing data 5610 being utilized by the interactive display device 10 and/or the computing device 4942 to establish communications via this secondary connection. Alternatively, game control data can be transmitted via the STS wireless connection 1118, where the STS wireless connection 1118 is implemented as the secondary connection 5615 of FIG. 51C.

The secondary connection establishing data 5610 can optionally include game application data sent by the interactive display device 10 to the given computing device 4942 for execution by the given computing device 4942 to enable the given computing device 4942 to generate game control data based on user input to the computing device 4942. For example, graphical user interface data can be by the interactive display device 10 to the given computing device 4942 for display by a touchscreen of the given computing device 4942 to enable the user to select various movements and/or actions in conjunction with the corresponding video game and/or computer game.

Each STS wireless connection 1118 can alternatively or additionally be utilized to determine a position of a corresponding user with respect to the table. For example, the computing device 4942 and/or body part of a corresponding user can be detected in a given position upon the tabletop and/or in proximity to the tabletop to determine which side of the table a user is sitting and/or which position at the table the user is sitting closest to. This determined position of the user can be utilized to generate the personalized display area for the user and/or to establish the orientation at which the personalized display area be displayed, as discussed in conjunction with FIG. 51B. Alternatively or in addition, this determined position of the user can be utilized to determine the viewing angle of the user, which can be utilized to determine the type of coordinate transformation to be applied to the user's directional commands to their virtual avatar in the virtual world as discussed in conjunction with FIG. 51A.

Figure 51F:
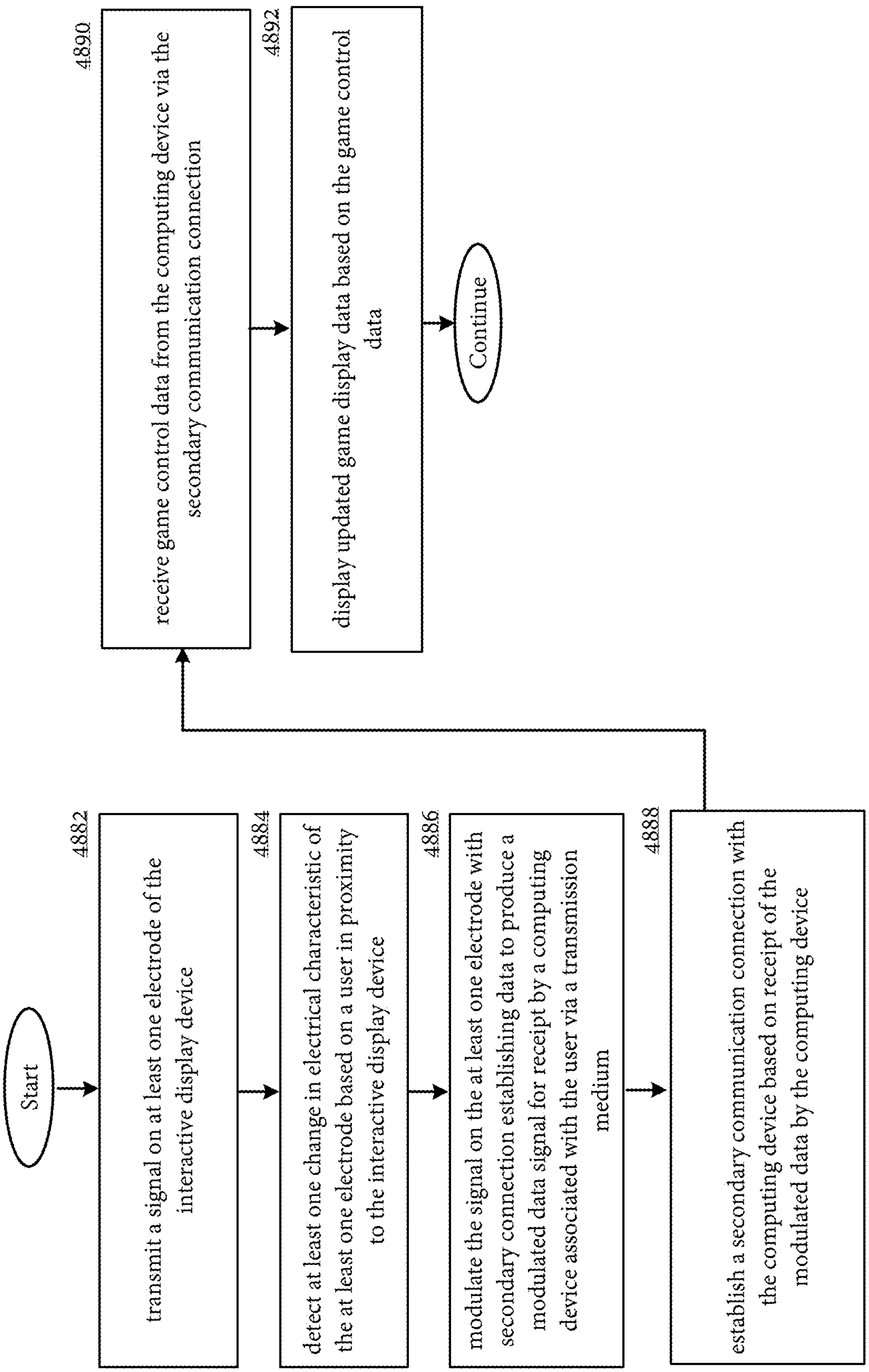
FIG. 51F is a logic diagram of an example of a method in accordance with the present disclosure.

FIG. 51F illustrates a flow diagram of an embodiment of a method in accordance with the present disclosure. In particular, a method is presented for execution by and/or use in conjunction with an interactive display device 10, interactive computing device, processing module 42, and/or other processing resources and/or display devices described herein. Some or all steps of FIG. 51F can be performed in conjunction with some or all steps of FIG. 62X, FIG. 62AF, FIG. 62AH, FIG. 62A, FIG. 62AV, FIG. 62AW, FIG. 62AX, FIG. 62BL, FIG. 62BM, and/or one or more other methods described herein.

Step 4882 includes transmitting a signal on at least one electrode of the interactive display device. Step 4884 includes detecting at least one change in electrical characteristic of the at least one electrode based on a user in proximity to the interactive display device. Step 4886 includes modulating the signal on the at least one electrode with secondary connection establishing data to produce a modulated data signal for receipt by a computing device associated with the user via a transmission medium. Step 4988 includes establishing a secondary communication connection with the computing device based on receipt of the modulated data by the computing device. Step 4890 includes receiving game control data from the computing device via the secondary communication connection. Step 4892 includes displaying, via a display of the interactive display device, updated game display data based on the game control data.

In various embodiments, the method includes determining a position of the user based on a position of the at least one electrode; determining a display region, such as a personalized display area, based on the position of the user, and/or determining a display orientation based on the position of the user. The updated game display data can be displayed in the display region and in the display orientation.

FIGS. 52A-52E present embodiments of an interactive display device 10 that processes touch-based or touchless gestures by a user with respect to a touch screen 12 of the interactive display device 10 to control game elements displayed in game display data by a corresponding display 50. Some or all features and/or functionality of the interactive display device 10 of FIGS. 52A-52E can be utilized to implement any other embodiment of interactive display devices, touch screen displays, and/or computing devices described herein. Some or all features and/or functionality of the interactive display device 10 of FIGS. 52A-52E can be implemented via some or all features and/or functionality of the interactive display device 10 of FIGS. 45-48 and/or FIGS. 51A-51B, for example, where the interactive display device 10 is implemented as a tabletop display device that supports interaction by one or more people seated at and/or otherwise in proximity to the tabletop, for example, simultaneously, to facilitate play of a video game, virtual board game, and/or computer game, for example, in conjunction with the game play setting of FIGS. 49A-49C.

Figure 52A:
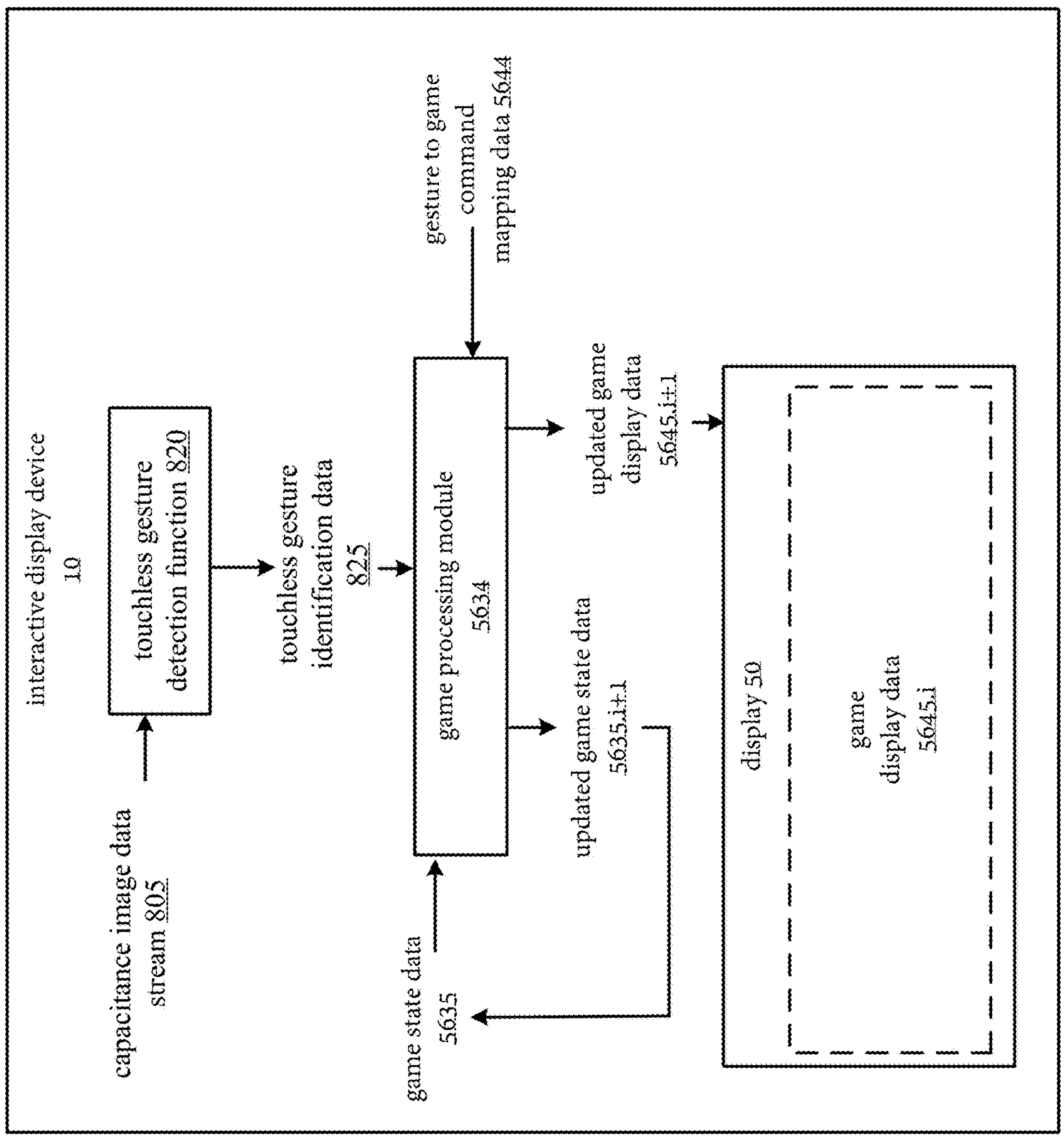
FIG. 52A is a schematic block diagram of an embodiment of an interactive display device that performs a touchless gesture detection function in accordance with the present disclosure.

FIG. 52A illustrates an embodiment of an interactive display device that implements a touchless gesture detection function 820. For example, the touchless gesture detection function 820 can be implemented as discussed in conjunction with FIG. 64BB to generate touchless gesture identification data 825. The gesture identification data 825 can indicate a particular gesture as one of a set of possible gestures corresponding to a particular game control of a virtual avatar, vehicle, game-piece, or any other virtual game element, and can thus be processed in a same or similar fashion as the game control data of FIGS. 51C-51F. For example, the game processing module 5634 can process gesture identification data 825 as game command data due to different types of gestures being mapped to corresponding different types of game commands, such as different movements and/or actions, in gesture to game command mapping data 5644 that maps some or all different possible gestures detectable by the gesture detection function 820 to corresponding game commands. The gesture to game command mapping data 5644 can be received via a communication interface of the interactive display device 10; stored in memory of the interactive display device 10; configured via user input to interactive display device 10; and/or otherwise determined by the interactive display device 10.

The gesture to game command mapping data 5644 can be different for different games, where different gestures are performed in different games to perform a same type of action, where a same gesture corresponds to different types of actions in different games, where some types of gestures are utilized to control game elements in some games and not others, and/or where some game actions are enabled via gesture control in some games and not in others. The gesture to game command mapping data 5644 for a given game can optionally be different for different users, for example, based on different users having different configured preference data and/or based on the roles of different players in a given game inducing different actions and corresponding gestures.

Some or all of the possible gestures detectable by the gesture identification data 825 and/or indicated in the gesture to game command mapping data 5644 can be entirely touchless, entirely touch-based, and/or can utilize a combination of touchless and touch-based indications as discussed in conjunction with FIGS. 64BB-64BD. Identical touchless gestures and touch-based gestures can be treated as the same gesture and thus the same game command, or as two different gestures and thus different types of game commands for example, as discussed in conjunction with FIGS. 64BE-64BF. Some gestures can be based on an orientation and/or configuration of the hand and/or one or more fingers, for example, based on anatomical feature mapping data as discussed in conjunction with FIGS. 64AO-64AQ. The particular virtual feature and/or other position in which the user intends to control, and/or a corresponding action or movement, can optionally be detected based on determining a hover region, determining a corresponding touch point within the hover region, and/or tracking the hover region and/or corresponding touch point as discussed in conjunction with FIGS. 64AK-64AM and/or FIGS. 64AR-64BA, for example to determine a corresponding movement, such as a corresponding game command corresponding to a movement command of a virtual element in the corresponding direction.

Figure 52B:
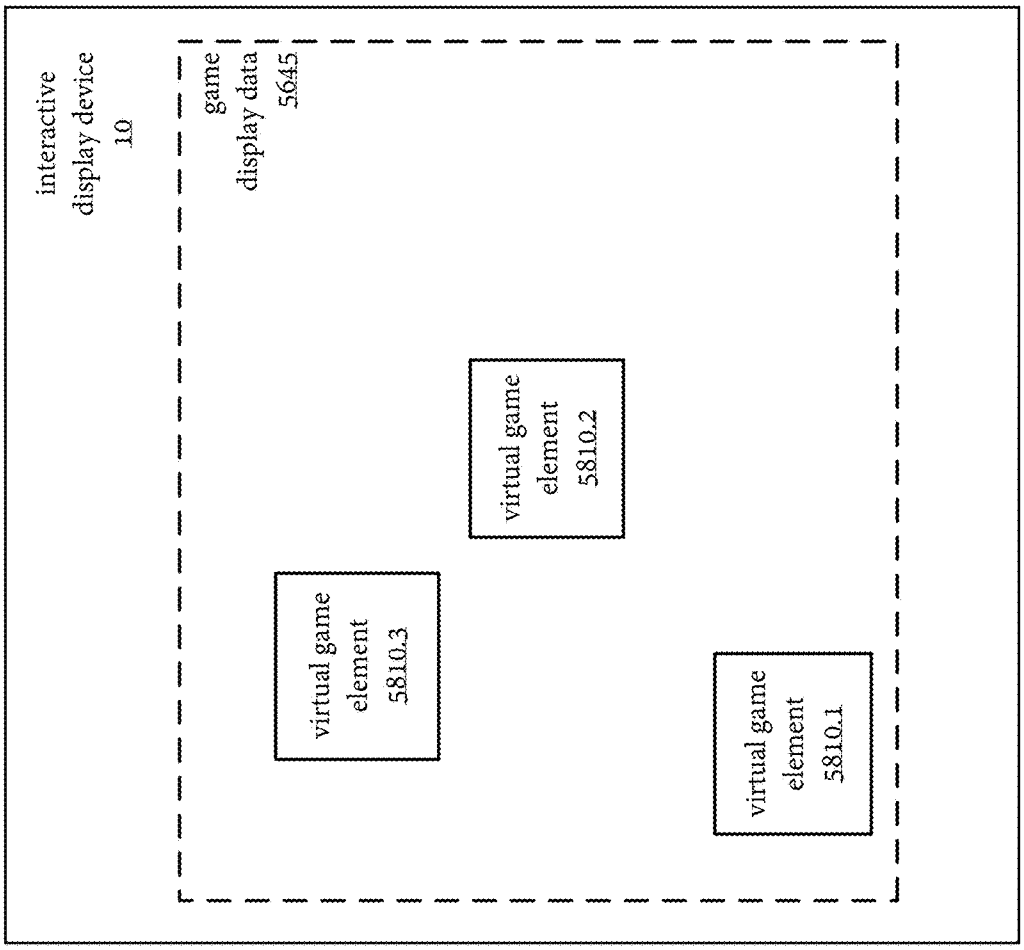
FIG. 52B is a pictorial diagram illustrating an example display of an interactive display device in accordance with the present disclosure.
Figure 52C:
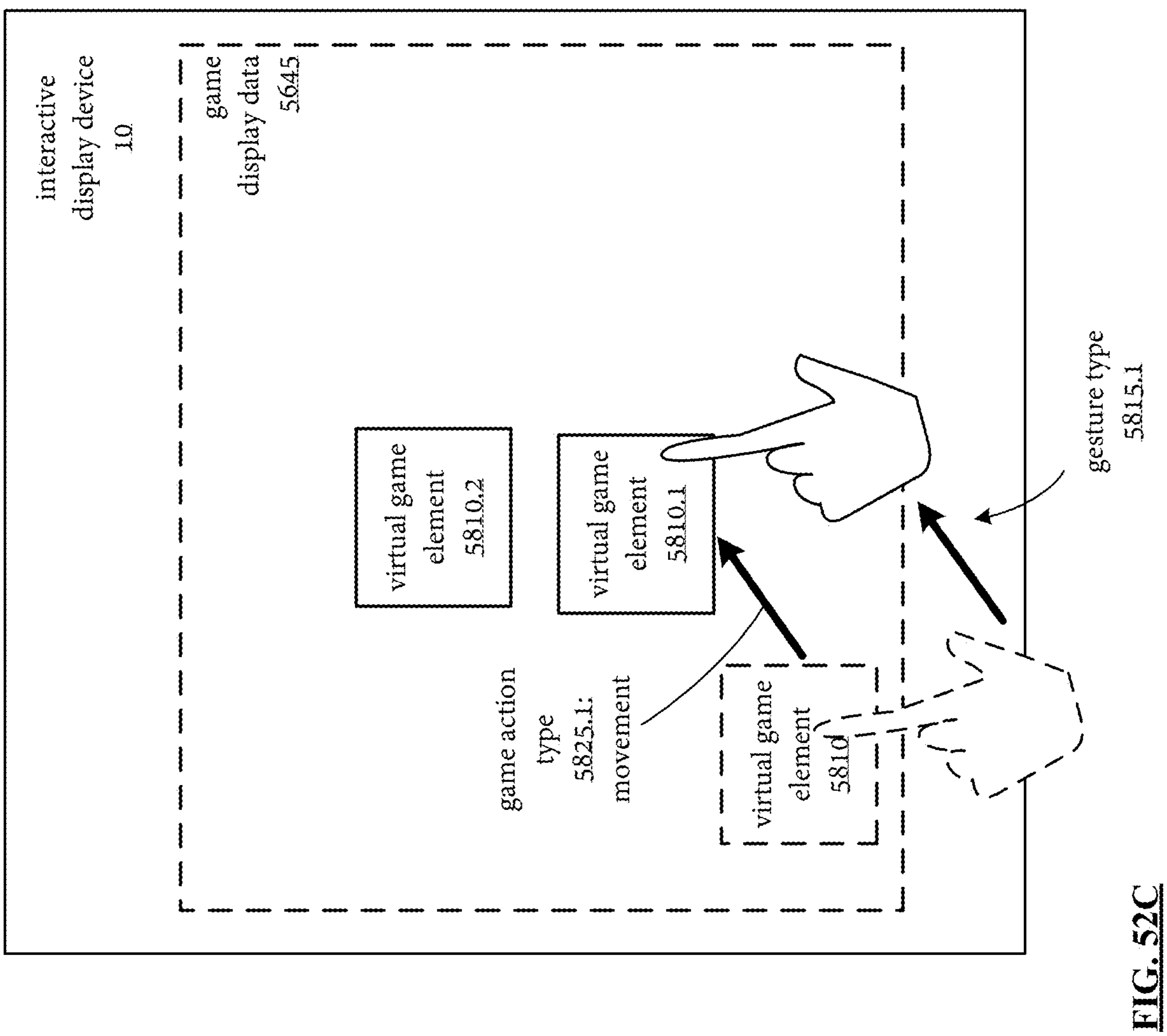
FIGS. 52C-52D are pictorial diagrams illustrating example gesture-based interaction with a display of an interactive display device in accordance with the present disclosure.
Figure 52D:
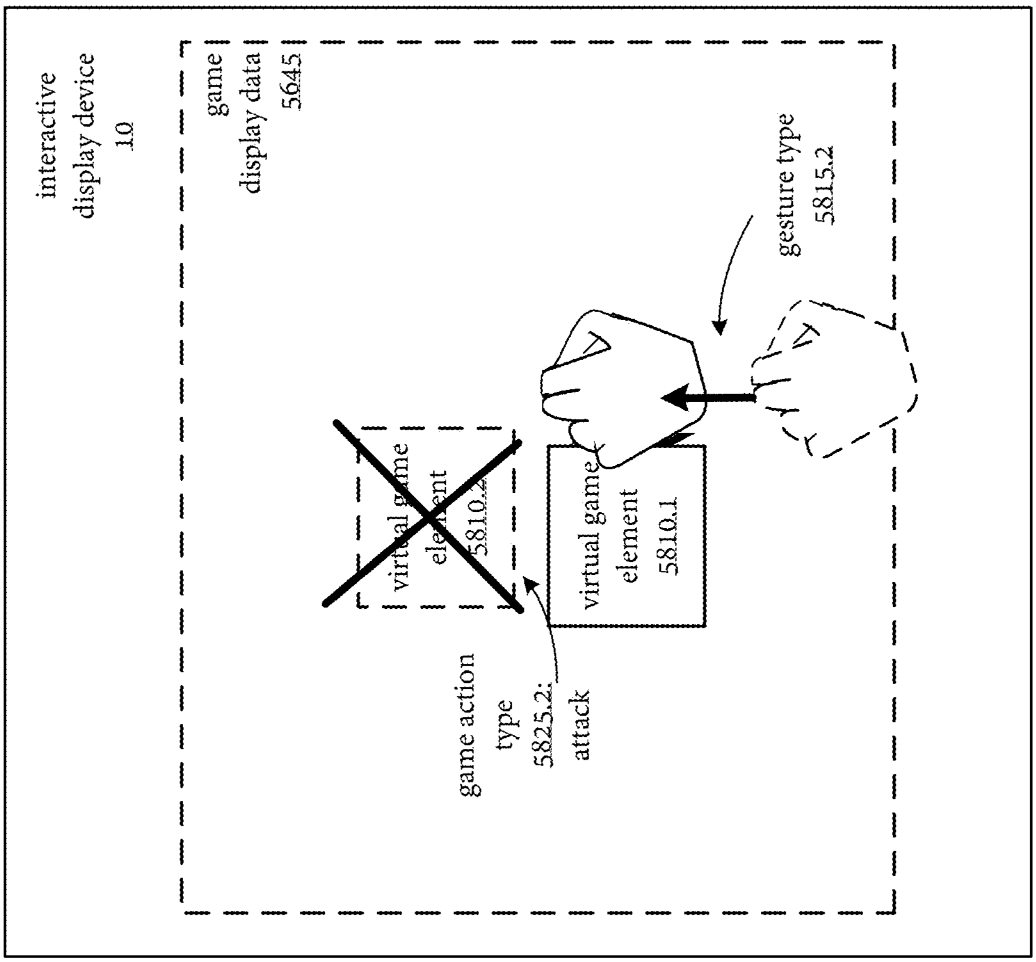

FIGS. 52B-52D illustrate example touch-based and/or touchless gestures utilized to control virtual game elements displayed in game display data 5645, for example, shared for multiple users or in an individual user's personalized display area. As illustrated in FIG. 52B, various virtual game elements 5810, such as user avatars, user game pieces, or other elements controllable by one or more users playing the game, can have various locations and other various states, for example, as indicated by game state data, and can be displayed accordingly, for example, to graphically indicate their location with respect to a virtual world and/or virtual game board.

As illustrated in FIG. 52C, a user controls virtual game element 5810.1 via a first gesture type 5815.1, which can correspond to a movement of their forefinger in a direction and/or distance by which they intend the virtual game element 5810.1 to move in performing a movement game action type 5825.1. For example, the first gesture type 5815.1 is mapped to this movement game action type 5825.1 in the gesture to game command mapping data 5644.

As illustrated in FIG. 52D, the user further controls virtual game element 5810.1 via a second gesture type 5815.2, which can correspond to a punching action by their hand while forming a first towards another virtual game element they wish to attack in performing an attack game action type 5825.2. As denoted by the 'X' in FIG. 52D, performance of this attack game action type 5825.2 can render killing of or removal of virtual game element 5810.2, such as the avatar or game piece of another player, an AI game element, or other element of the game. While not illustrated, other users can similarly interact with the same or different game element 5810, for example, simultaneously or in a turn based fashion.

Other possible game action types 5825 can be based on the given game, and can include any other types of control of game elements such as causing game elements to move in one or more directions, to change their orientation, to jump, to duck, to punch, to kick, to accelerate, to brake, to drift, to shoot, to draw cards, to change weapons, to pick up an item, to pay for an item, to perform a board game action of a corresponding board game, to perform a video game action of a corresponding video game, or to perform any other action corresponding to the game. Furthermore, additional action such as starting a game, pausing the game, resuming the game, saving the game, changing game settings, changing player settings, configuring an avatar or vehicle, or other additional actions can similarly be performed by via touch-based and/or touchless gestures. In some embodiments, touch-based gestures are only utilized when interacting with such additional actions, while touchless gestures are utilized to control virtual game elements, or vice versa.

In some embodiments where multiple users interact with same game display data 5645 as discussed in conjunction with FIG. 51A, some elements can be controlled by some players, while other elements can be controlled by other players. For example, a given user can control only their own virtual avatar, vehicle, or game piece, and cannot control the avatars, vehicles, or game pieces of other players. Detection of player actions performed on such virtual game elements 5810 can further include determining which one or more players are allowed to control each given virtual game elements 5810, and identifying which player is performing the gesture based on further detecting a frequency associated with the given user as discussed in conjunction with FIGS. 45-48. For example, a signal at the player's frequency propagates through the players body, for example, based on being transmitted through a chair of the user, as discussed in conjunction with FIGS. 55C-55D and/or in conjunction with FIGS. 63A-63S. Performing a given action can include not only detecting the given gesture, but can further include detecting that a frequency detected in conjunction with the given gesture matches that of a user determined to be assigned to control the corresponding virtual game elements 5810, where the corresponding game action is only performed when the frequency matches to ensure players only control their own virtual game elements 5810, such as their own avatars or game pieces. As another example, only one or more players serving as game administrators are allowed to pause the game, resume the game, change game settings, or perform additional actions, where corresponding gestures for such actions are only processed when the corresponding detected frequency corresponds to a game administrator. As another example, performing a given action can include not only detecting the given gesture, but can further include determining whether a frequency is detected in conjunction with the given gesture, where the corresponding game action is only performed when a frequency is detected to ensure the game action was induced by a person sitting at a chair configured to play the game and thus transmit a frequency, for example, where only players of the game have propagated frequencies through their body and/or otherwise have associated frequencies, and where gestures performed by other people not playing the game based on not sitting at the table and/or sitting in chairs not configured to be for players of this given game are thus unable to perform any game actions.

Figure 52E:
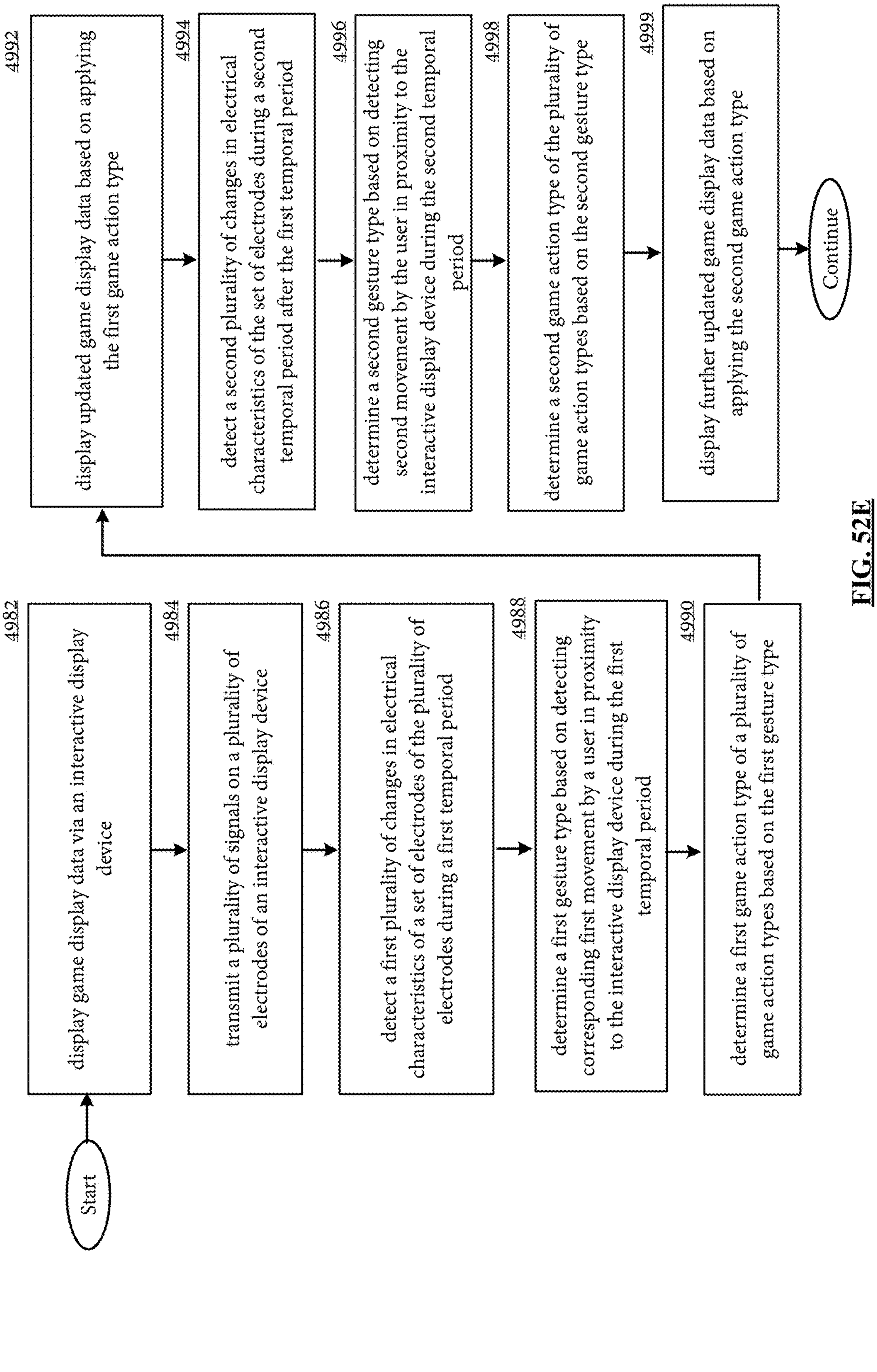
FIG. 52E is a logic diagram of an example of a method in accordance with the present disclosure.

FIG. 52E illustrates a flow diagram of an embodiment of a method in accordance with the present disclosure. In particular, a method is presented for execution by and/or use in conjunction with an interactive display device 10, interactive computing device, processing module 42, and/or other processing resources and/or display devices described herein. Some or all steps of FIG. 52E can be performed in conjunction with some or all steps of FIG. 64AK, FIG. 64AN, FIG. 64AQ, FIG. 64BA, FIG. 64BD, FIG. 64BF, and/or one or more other methods described herein.

Step 4982 includes displaying game display data via an interactive display device. For example, the game display data is displayed via a display of the interactive display device in a shared display area or in one or more personalized display areas. Step 4984 includes transmitting a plurality of signals on a plurality of electrodes of the interactive display device. For example, the plurality of signals are transmitted by a plurality of DSCs of the interactive display device. Step 4986 includes detecting a first plurality of changes in electrical characteristics of a set of electrodes of the plurality of electrodes during a first temporal period. For example, the first plurality of changes in electrical characteristics are detected by a set of DSCs of the plurality of DSCs. Step 4988 includes determining a first gesture type based on detecting corresponding first movement by a user in proximity to the interactive display device during the first temporal period. For example, the first gesture type is determined by a processing module of the interactive display device, for example, based on performing the touchless gesture detection function 820. Step 4990 includes determining a first game action type of a plurality of game action types based on the first gesture type. For example, the first game action type is determined by a game processing module of the interactive display device, for example, based on gesture to game command mapping data Step 4992 includes displaying updated game display data based on applying the first game action type. For example, the updated game display data is displayed via the display of the interactive display device. The updated game display data can be generated by the game processing module in conjunction with generating updated game state data by applying the first game action type.

Step 4994 includes detecting a second plurality of changes in electrical characteristics of the set of electrodes during a second temporal period after the first temporal period. For example, the second plurality of changes in electrical characteristics is detected by at least some of the set of DSCs. Step 4996 includes determining a second gesture type based on detecting second movement by the user in proximity to the interactive display device during the second temporal period. For example, the processing module determines the second gesture type based on based on performing the touchless gesture detection function 820. Step 4998 includes determining a second game action type of the plurality of game action types based on the second gesture type, for example, via the game processing module based on the gesture to game command mapping data. The second game action type can be different from the first game action type based on the second gesture type being different from the first gesture type. Step 4999 includes displaying, further updated game display data based on applying the second game action type. For example, the further updated game display data is displayed via the display of the interactive display device. The updated game display data can be generated by the game processing module in conjunction with generating further updated game state data by applying the first game action type, for example, to the most recent game state data, which can result from having previously applied the first game action type.

In various embodiments, both the first gesture type and the second gesture type are touchless gesture types. In some embodiments, both the first gesture type and the second gesture types are touch-based gesture types. In some embodiments, the first gesture type is a touchless gesture, and the second gesture type is a touch-based gesture. In some embodiments, the first gesture type and/or second gesture type is based on performance of a gesture by a user with a single hand, multiple hands, a single finger, multiple fingers, and/or via a passive device held by the user. In various embodiments, a movement of in performing the first gesture type is tracked, and a movement of a virtual game element is performed as the first game action type based on the movement. In various embodiments, the virtual game element is selected from a plurality of virtual game elements based on a detected starting position of the movement in performing the first gesture type.

In various embodiments the method further includes detection of an additional gesture types based on gestures performed by another users in proximity to the interactive display device during the first temporal period, where the updated game display data is further based on determining an additional game action type of the plurality of game action types based on this additional gesture type and applying this additional game action type, for example, simultaneously to applying the first game action type and/or after applying the first game action type.

FIGS. 53A-53E present embodiments of interactive display devices 10 implemented in a restaurant setting, such as at a restaurant, bar, winery, plane, train, and/or other establishment that sells and/or serves food and/or drinks. Some or all features and/or functionality of the interactive display device 10 of FIGS. 53A-53E can be utilized to implement any other embodiment of interactive display devices, touch screen displays, and/or computing devices described herein. Some or all features and/or functionality of the interactive display device 10 of FIGS. 53A-53E can be implemented via some or all features and/or functionality of the interactive display device 10 of FIGS. 45-48, for example, where the interactive display device 10 is implemented as a tabletop display device that supports interaction by one or more people seated at and/or otherwise in proximity to the tabletop while dining. Some or all features and/or functionality of the interactive display device 10 of FIGS. 53A-53E can be utilized to implement the interactive display device 10 of FIGS. 49A-49C, for example, while in the dining setting.

Figure 53A:
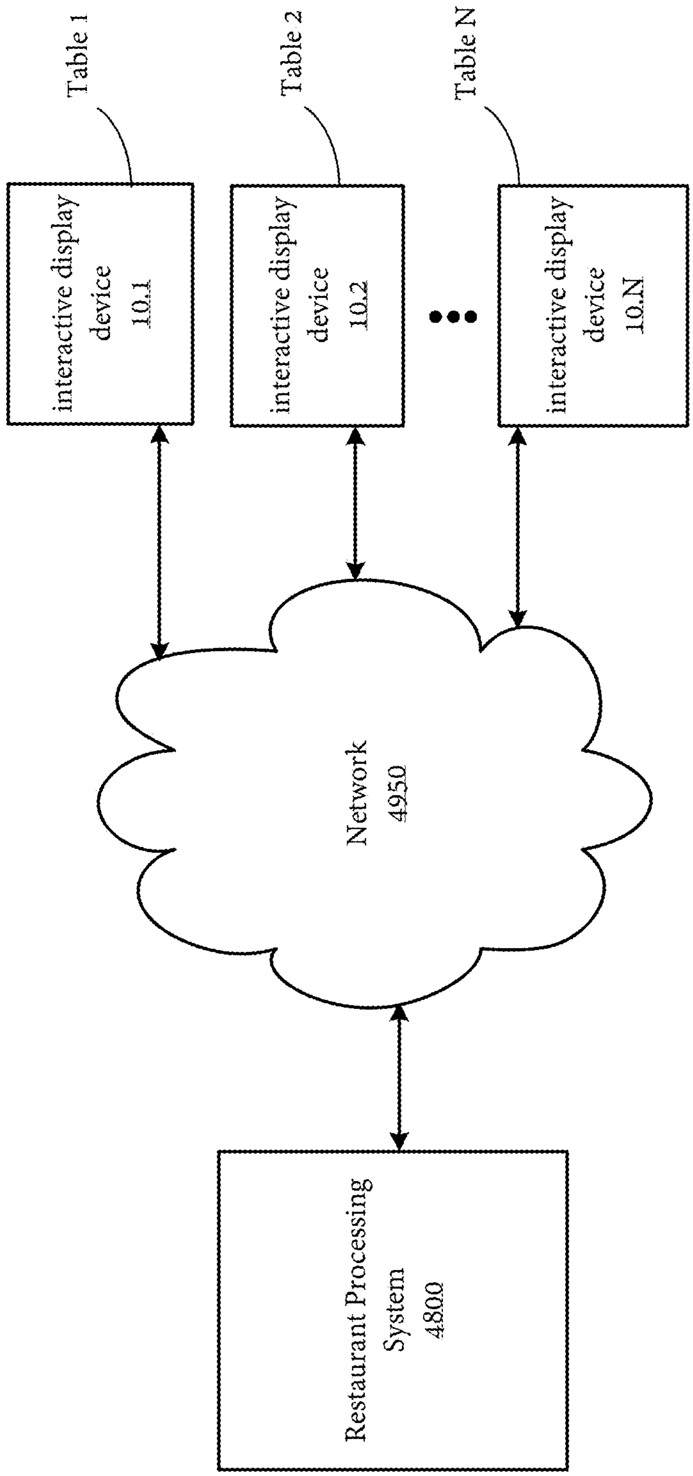
FIG. 53A is a schematic block diagram illustrating communication between a restaurant processing system and a plurality of interactive display devices in accordance with the present disclosure.

As illustrated in FIG. 53A, a plurality of interactive display devices 10.1-10.N can communicate with a restaurant processing system 4800 via a network 4950. The network 4950 can correspond to a communication network, for example, of the corresponding restaurant and/or a network of multiple restaurants. The network 4950 can be implemented via a local area network, via the Internet, and/or via a wired and/or wireless communication system.

The restaurant processing system 4800 can be implemented via at least one computing device and/or a server system that includes at least one processor and/or memory. The restaurant processing system 4800 can be operable to perform table management, server management, reservation management, billing, and/or transactions to pay for goods and/or services. The restaurant processing system 4800 can optionally include and/or communicate with a display the display data regarding status at various tables, such as what food was ordered, whether meals are complete, and/or billing data for the tables. As discussed in further detail herein, the restaurant processing system 4800 can be operable to receive various status data for various tables generated by interactive display devices 10.1-10.N, where this status data can be processed by the restaurant processing system 4800, displayed via the display, and/or communicated to restaurant personnel.

The plurality of interactive display devices 10.1-10.N can each be implemented as tabletop interactive displays, for example, as discussed in conjunction with FIGS. 45-48. The plurality of interactive display devices 10.1-10.N can be implemented via any of the functionality of interactive display devices, touch screen display, and/or processing modules 42 described herein. Some or all of the interactive display devices 10.1-10.N can alternatively or additionally be implemented as interactive tabletops 5505, for example, without having a display and/or without being operable to display data and instead having an opaque top, while still being able to detect various objects upon the table and/or various users at the table via DSCs and electrodes as discussed previously.

Seats, such as chairs, stools, and/or booths, can be positioned around each table implementing an interactive display devices 10. These seats can optionally include sensors, for example, for presence detection. These seats can optionally be operable to transmit a frequency when detected to be occupied for sensing by the interactive display devices 10, for example, based on being propagated through a corresponding user. Seats around each table can be implemented via some or all feature and/or functionality of Figures in conjunction with FIGS. 55C-55D. Users can otherwise be detected as being present at particular positions around the table by interactive display device 10, and can optionally be identified via user identifiers, for example, as discussed in conjunction with FIGS. 45-48. In embodiments where particular users are identified, corresponding user profile data and/or user accounts for the identified users can be accessed via a corresponding user identifier by interactive display device 10, for example, via access to a user profile database stored in memory accessible via network 4950.

Figure 53B:
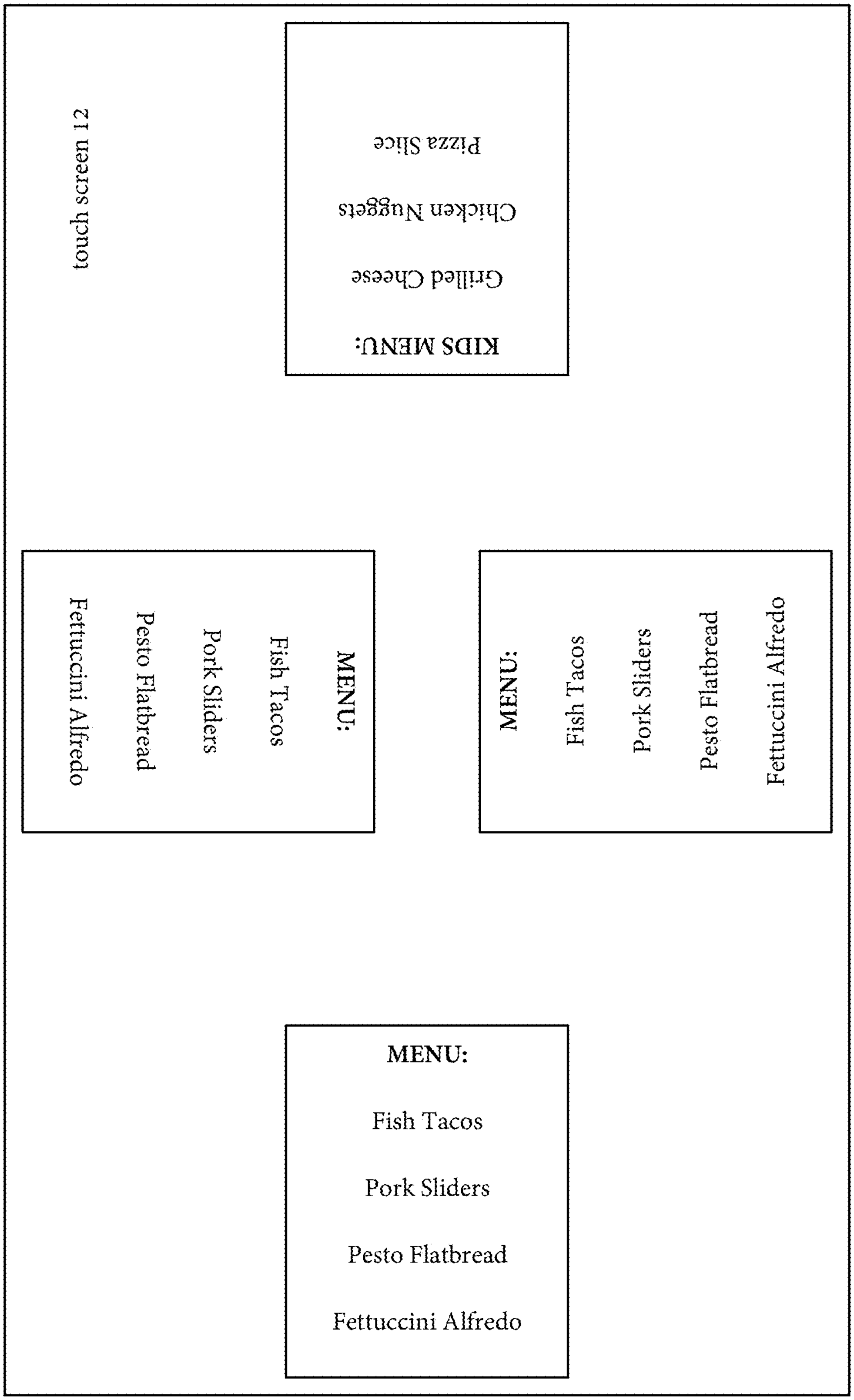
FIGS. 53B-53D are pictorial diagrams illustrating example display by an interactive display device in accordance with the present disclosure.
Figure 53C:
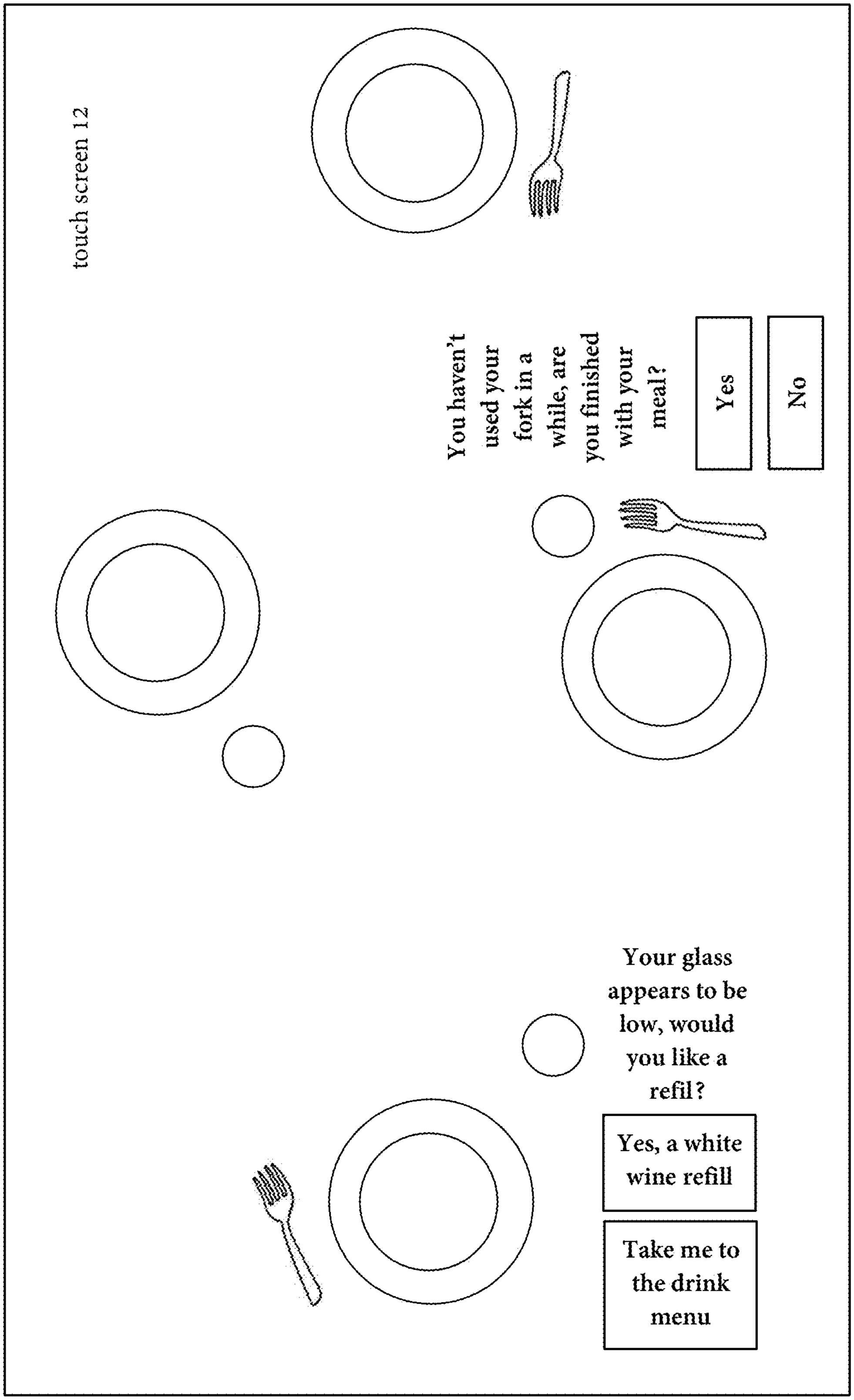
Figure 53D:
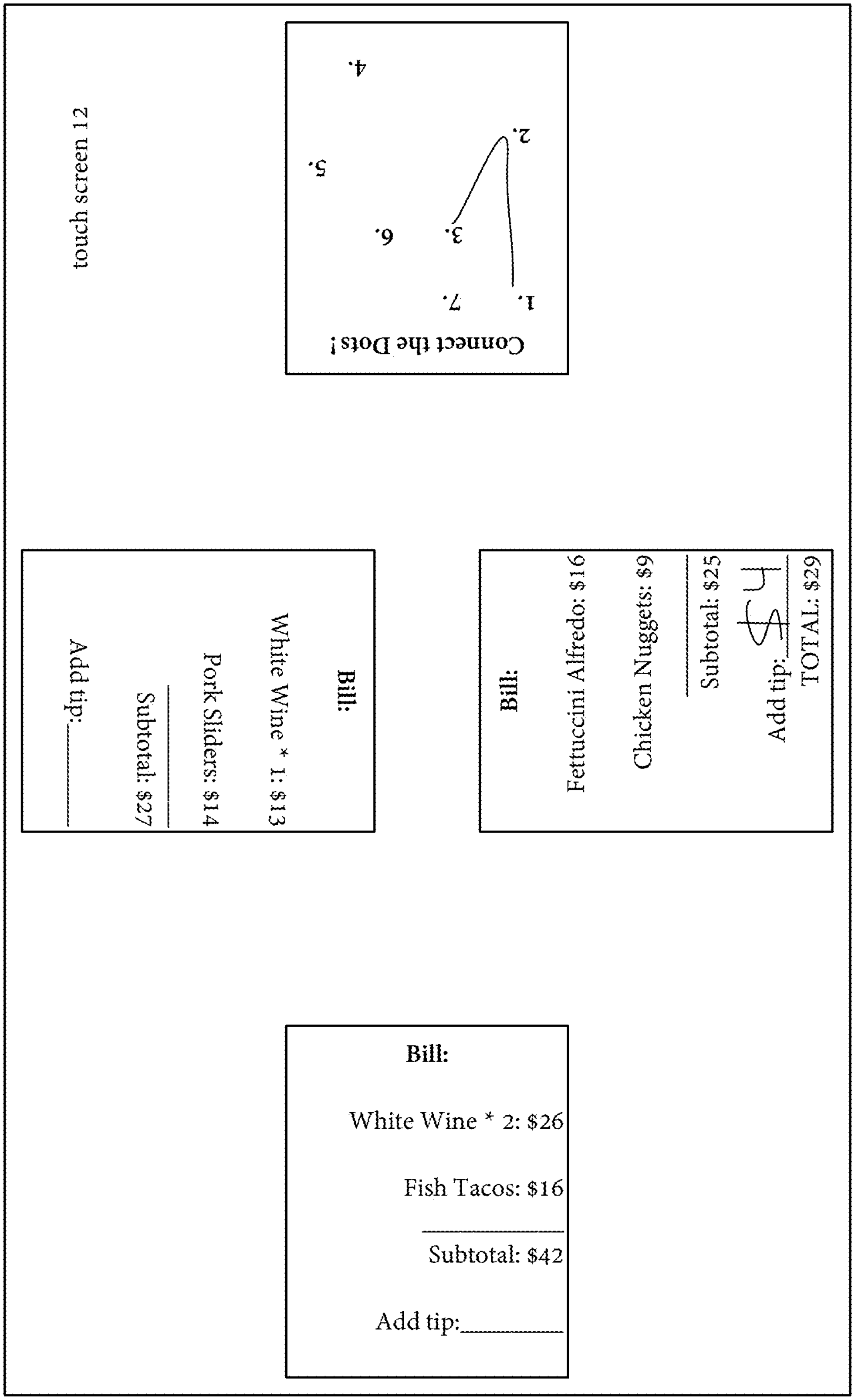

FIGS. 53B-53D illustrate example embodiments of example display data displayed via a touch screen 12 and/or corresponding display of an interactive display devices 10 of FIG. 53A, for example, at different points of time throughout the progression of a given meal with a set of participating customers seated around the table.

In particular, the interactive display devices 10 can be operable to display various data and/or implement various functionality throughout different restaurant serving phases for the participating set of customers while dining at the restaurant. The transition between restaurant serving phases can be automatically detected by the interactive display device based on changes in electrical characteristics of electrodes detected by DCSs of the tabletop and/or based on other sensor da. The restaurant serving phases can optionally be implemented in a same or similar fashion as the plurality of settings of FIGS. 49A-49C which are transitioned between based on detection of setting update conditions 4615. The transition between restaurant serving phases can be further based on a known ordering of the set of restaurant serving phases alternatively or in addition to corresponding setting update conditions being detected to have been met. In some cases, the transition between restaurant serving phases can be different for different users seated at the table, for example, based on different users ordering at different times, receiving food and/or drinks at different times, finishing food and/or drinks at different times, or otherwise being in different dining phases at different times.

In various embodiments, the set of restaurant serving phases can include a welcome phase, for example, prior to and/or when guests are initially seated. In some embodiments, while in the welcome phase, the interactive display device can display a screensaver, an indication that the table is free, an indication that the table is reserved and/or welcome message. The interactive display device can determine to be in the welcome phase based on receiving corresponding control data from the restaurant processing system 4800 indicating guests are assigned to the table, indicating that guests are being led to the table, and/or indicating that the table is or is not reserved. The interactive display device can determine to be in the welcome phase based on detecting that no users are seated in chairs of the table and/or that no users are in proximity to the table. The interactive display device can determine to be in the welcome phase based on detecting users have just arrived in at the table and/or have just sat in chairs of the table. The interactive display device can determine to be in the welcome phase based on not detecting that the ordering phase has not yet begun. The interactive display device can determine to be in the welcome phase based on one or more conditions discussed in conjunction with one or more other possible restaurant serving phases.

In various embodiments, the set of restaurant serving phases can alternatively or additionally include a mem viewing phase, for example, where guests view mem data. The interactive display device can determine to be in the menu viewing phase based on: determining to end the welcome phase; detecting the presence of corresponding users at the table; and/or receiving user input by users indicating they wish to view the mem via interaction with the touchscreen. The menu viewing phase can optionally be entered based on one or more other conditions discussed in conjunction with one or more other possible restaurant serving phases, and/or can be implemented in conjunction with one or more other possible restaurant serving phases, such as the welcome phase and/or the ordering phase.

An example embodiment of display data displayed by the interactive display device 10 is illustrated in FIG. 53B. As illustrated in FIG. 53B, mem data can be displayed via display 50 of interactive display device 10, for example, in personalized display areas at different orientations corresponding to the viewing angle of a corresponding user. The personalized display areas for the menu data can be determined based on detecting the positions at which users are seated and/or detecting which chairs around the table are occupied by users. This can be based on detecting corresponding frequencies for different users at different positions around the table as discussed in conjunction with FIG. 45.

Different menu data can optionally be displayed for different users, for example, where a kids menu is displayed for a child user while adult menus are displayed for adult users as illustrated in FIG. 53B, for example, based on detecting that the user at the corresponding position is shorter than a height threshold, based on detecting presence of a booster seat in a corresponding chair, based on identifying the corresponding user via a corresponding frequency and/or other identifier data associated with the user and accessing user profile data indicating the user is a child, and/or based on another determination. Different menu data can optionally be displayed for different users based on user profile data determined based on user identifiers for different users, for example, where corresponding menu data is filtered to only include types of dishes the user can eat based on dietary restriction data accessed in the corresponding user's user profile data and/or where the corresponding menu data recommends previously ordered dishes and/or recommended dishes for the user based on the user's user profile data.

Users can optionally interact with the displayed men data via touch-based and/or touchless indications and/or gestures to scroll through the menu, filter the menu by price and/or dietary restrictions, view different menus for different courses, view a drinks menu, select items to view a picture of the menu item and/or a detailed description of the mem item, and/or otherwise interact with the displayed mem data.

In various embodiments, the set of restaurant serving phases can alternatively or additionally include an ordering phase, for example, where guests select which food or drink they wish to order, for example, for consumption in one or more courses. The interactive display device can determine to be in the ordering phase based on: receiving user input to displayed menu data of the menu viewing phase indicating one or more items to be ordered by one or more users; receiving user input indicating they wish to be serviced by a server to take their order, determining to end the menu viewing phase; and/or another determination. The menu viewing phase can optionally be entered based on one or more other conditions discussed in conjunction with one or more other possible restaurant serving phases, and/or can be implemented in conjunction with one or more other possible restaurant serving phases, such as the menu viewing phase.

When in the ordering phase, a processing module of the interactive display device 10 can generate ordering data based on determining selections to displayed menu data by users based on user interaction with touch screen 12, for example, as touch-based and/or touchless indications selecting particular menu items. The interactive display device 10 can transmit order data to the restaurant processing system 4800, for example, where the restaurant processing system 4800 displays the order data and/or otherwise communicates the order data to staff members that then prepare and serve the corresponding food. Alternatively or in addition, a processing module of the interactive display device 10 can generate a notification that guests are ready to place orders verbally to wait staff, for example, based on detecting that physical mems have been set down by some or all guests upon the table rather than being held by the guests due to detecting corresponding changes in electrical characteristics of electrodes or otherwise detecting the presence of mems upon the table, where the interactive display device 10 can transmit a notification to the restaurant processing system 4800 indicating that guests are ready to place orders and/or are ready to be serviced by personnel of the restaurant. Alternatively or in addition, guests can indicate they wish to place and order with and/or otherwise consult personnel of the restaurant based on a selection to a displayed option in the display data of the touchscreen.

In various embodiments, the set of restaurant serving phases can alternatively or additionally include at least one food and/or drink delivery phase for at least one food course and/or drink course, for example, where one or more servers supply food and/or corresponding dishes to guests, for example, based on the food and/or drinks they ordered. The interactive display device can determine to be in the food and/or drink delivery phase based on: detecting the presence of plates, glasses, or other dishes upon the table based on detecting corresponding changes in electrical characteristics of electrodes or otherwise detecting the presence of these objects as non-interactive objects, for example, as discussed in conjunction with FIGS. 45-48; and/or based on receiving a notification from the restaurant processing system 4800 that food and/or drinks are prepared. The interactive display device can optionally remove display data from the display, for example, due to detecting the presence of and position of dishes and glasses, and/or can shift the position of personalized display areas, for example, due to the obstruction of its previous position by the newly added plates and/or glasses, and discussed in conjunction with FIGS. 43A-44. The interactive display device can optionally display a notification that food and/or drink is ready for pickup at a bar and/or counter by guests in cases where personnel do not serve the food to the table.

In various embodiments, the set of restaurant serving phases can alternatively or additionally include at least one food and/or drink refill phase, for example, where one or more servers refill guest's drink glasses and/or supply new drinks when the guests existing drinks are low and/or empty. For example, as guests consume beverages, the interactive display device can detect changes in electrical characteristics of electrodes in proximity to the glass placed upon the table induced by containing a different amount of liquid, and/or in containing liquid vs no longer containing liquid, as a guest consumes their beverage over time. This can be caused by changes in electromagnetic fields due to the presence of liquid in the glass vs the presence of only air in the glass, and/or amount of liquid in the glass. Values and/or changes to electrical characteristics over time, for example, induced by an object detected to be a glass, can be compared to threshold values and/or changes that when met, cause a processing module of the interactive display device 10 to determine that the corresponding glass is empty and/or near empty. Alternatively, other sensors of the table such as pressure sensors and/or optical sensors can detect changes in weight and/or color of the detected glasses to determine whether glasses are empty. Similar changes can be detected for plates, bowls or other vessels in which food and/or drinks are initially contained, such as a basket containing tortilla chips consumed by guests and/or a small bowl containing salsa consumed by guests, to similarly detect whether these plates and/or bowls are empty and/or low on corresponding food, and need to be refilled. Alternatively or in addition, guests can indicate they wish to have a drink refill orders via interaction with the interactive user interface.

When this detected condition is met, the interactive display device 10 can enter a drink and/or food refill phase. An example of the interactive display device in the drink refill phase is illustrated in FIG. 53C, where the interactive display device displays options to a user whose glass is detected to be empty and/or low to order a drink refill of the same drink or order a new drink from the drink menu. Note that the plates, glasses, and forks depicted in FIG. 53C correspond to physical objects placed upon the tabletop, rather than display data displayed by the touchscreen.

Alternatively or in addition, a processing module of the interactive display device 10 automatically generates a notification for transmission to the restaurant processing system 4800 indicating the glass is low and/or empty, and/or that a food vessel is low and/or empty, and/or otherwise communicates to restaurant staff that a guest's drink is low, for example, where the staff automatically brings new drinks and/or food to these guests to refill the glass and/or food vessels, and/or arrives at the table to take a new drink order from the guest. In some embodiments, the interactive display device 10 and/or restaurant processing system 4800 can determine whether to automatically order new drinks and/or which types of drink with which to replenish guests' prior drinks based on user profile data of a corresponding user detected to be in the corresponding seat. For example, some users wish to always be provided with refills automatically as to not need to further interact with wait staff of options presented via the display while dining, while other users wish to contemplate whether they would like drink refills or new drinks to be provided based on whether they are still thirsty and/or wish to pay more for additional beverages.

In various embodiments, the set of restaurant serving phases can alternatively or additionally include at least one at least one dish clearing phase for the at least one food course, for example, where servers clear plates, glasses, napkins, and/or silverware after guests have completed eating and/or prior to another course. For example, upon detecting that guests have finished eating, the interactive display device 10 can enter the dish clearing phase, which can include transmitting a notification to the restaurant processing system and/or otherwise communicate to restaurant staff that guests are finished with a course and/or that dishes are ready to be cleared, where wait staff arrives at the table to clear dishes in response. This can be based on detecting that drink glasses and/or plates, bowls, and/or other food vessels are empty and/or low, and that guests have thus finished consuming their meal, for example, in a similar fashion as discussed in conjunction with the food and/or drink refill phase, where the corresponding dishes are cleared by wait staff rather than being refilled.

Alternatively or in addition, the dish clearing phase can be entered based on interactive display device 10 detecting silverware placed on the table can be tracked over time to determine whether the silverware has been picked up and/or utilized recently, where if the silverware remains in a same position for at least a threshold amount of time after food has arrived, the interactive display device 10 can detect that the corresponding guests is finished eating their meal. The silverware can be detected as non-interactive objects detected upon the table by at least one of the means discussed previously. Such an example is illustrated in FIG. 53C, where the interactive display device 10 automatically displays an indication asking the corresponding guest whether they have finished eating their meal. When a user indicates that they are finished based on a touch-based and/or touchless interaction with the touch screen 12, a notification can be generated for transmission to the restaurant processing system indicating a guest's plates are ready to be cleared and/or staff of the restaurant can otherwise be notified. Alternatively or in addition, rather than requiring this guest's user input indicating they are finished, the notification can be generated for transmission to the restaurant processing system based on detecting that the silverware has not been used in at least the threshold amount of time. Alternatively or in addition to tracking the position of silverware to determine this condition, the movement of user's hands and/or arms hovering over the table while eating can be tracked to determine whether the user is continuing to interact with the food on their plate, where a mapping of the user's hands and/or arms over the interactive display device is detected based on inducing corresponding changes to electrical characteristics of electrodes as discussed herein. For example, when the user's hands arms are not detected to move and/or interact with the plate for at least a threshold amount of time, the interactive display device 10 can similarly determine to enter the dish clearing phase.

In various embodiments, the set of restaurant serving phases can alternatively or additionally include at least one call for service phase, for example, where guests request service by servers. The interactive display device 10 can display options to request service, for example, displayed during one or more other phases. When selected by one or more users, additional options can be presented for selection and/or a notification can be transmitted to the restaurant processing system 4800 and/or personnel can otherwise be notified that one or more guests at the table request service.

In various embodiments, the set of restaurant serving phases can alternatively or additionally include a payment phase, for example, where guests pay for their meal. The payment phase can automatically be entered based on detecting some or all plates have been cleared by wait staff in the dish clearing phase and/or based on detecting that guests have completed their meals for example, as discussed in conjunction with the dish clearing phase. The payment phase can include display of guests bills, for example, where all guests' bills are combined and displayed together or where different guests' bills are displayed in their own personalized display areas, for example, based on determining to split checks for users and/or based on detecting which users are in the same party. This can be determined based on user profile data of detected users and/or based on user input to touch screen 12 during this phase or a different phase of the dining experience.

FIG. 53D illustrates an embodiment of display by interactive display device 10, where personalized display areas for different guests present corresponding bills, for example, based on which corresponding menu items of FIG. 53B were ordered by these users at these seats and/or were delivered to these users at these seats. As illustrated in FIG. 53B, the one guest pays for their own fettuccini alfredo and also for chicken nuggets ordered by the child user, for example, based on determining the child user was in the same party as the adult user and/or based on the child user being detected as a child, and thus not being expected to pay for their own meal. As illustrated in FIG. 53D, users can enter their own tip amount, for example, as written data via user input to touch screen via a corresponding touch-based and/or touchless indication, and/or based on displaying a number pad where the user enters corresponding numbers. In the case presented in FIG. 53D, the tip amount of $4 can be entered as user notation data, which can automatically be processed to automatically calculate the payment total for the corresponding user, for example, via some or all features and/or functionality discussed in conjunction with FIGS. 61A-61H.

The payment phase can alternatively or additionally include payment of meals by guests, for example, via credit card, debit card, or other payment means at their table, for example, where contactless payment is facilitated via at least one sensor at and/or in proximity to the interactive display device 10 operable to read credit cards via a contactless payment transaction and/or where credit card information can otherwise be read and processed by the interactive display device 10. Alternatively or in addition, payment is facilitated based on payment information stored in a user profile of one or more guests. Alternatively or in addition, payment is facilitated via handing a credit card, debit card, cash, or other payment means to a server, where the server facilitates the payment. Some or all of the payment can be facilitated based on generating and sending of payment transaction information via the interactive display device 10 and/or the restaurant processing system 4800.

In various embodiments, the set of restaurant serving phases can alternatively or additionally include at least one entertainment phase, for example, where guests play games, browse the internet, and/or participate in other entertaining activities, for example, during the meal and/or while waiting for food to arrive. The entertainment phase can include display of game data, such as video game and/or computer game data, puzzle data, or other interactive entertainment such as an interactive display device enabling a user to, via touchless and/or touch-based interaction with touch screen 12: color a picture, interact with a connect the dots, complete a displayed maze, complete a crossword puzzle, interact with a word search, or engage in other displayed game and/or puzzle data Such puzzle data of the entertainment phase, such as that displayed in FIG. 53D can optionally be utilized to implement the game play setting of FIGS. 49A-49C and/or via any embodiment of facilitating play of board games and/or virtually displayed video games and/or computer games as discussed in conjunction with some or all of FIGS. 50A-52E. The entertainment phase can be implemented via some or all features and/or functionality of the game play setting of FIGS. 49A-49C and/or via any embodiment of facilitating play of board games and/or virtually displayed video games and/or computer games as discussed in conjunction with some or all of FIGS. 50A-52E.

The entertainment phase can be entered for one or more users and/or the table as a whole based on determining the menu viewing phase and/or ordering phase has completed, based on determining the food delivery phase has not yet begun, and/or based on determining the food clearing phase has completed and the payment phase has not yet completed. The entertainment phase can be entered based on user input to touch screen 12 indicating they wish to enter the entertainment phase, for example, at any time. The entertainment phase can be entered based on user profile data and/or detecting particular characteristics of a user, such as that the user is identified as a child user, for example as illustrated in the example of FIG. 53D where dot-to-dot entertainment data is displayed for interaction by a user to connect the dots via user interaction with their finger, for example, while adult users at the table are in the payment phase, as the child is not expected to pay their own bill. While FIG. 53D illustrates a game played via a single user in their own personalized display area, a shared display area can enable game play of a same game by multiple different users, for example, as illustrated in FIG. 51A.

Figure 53E:
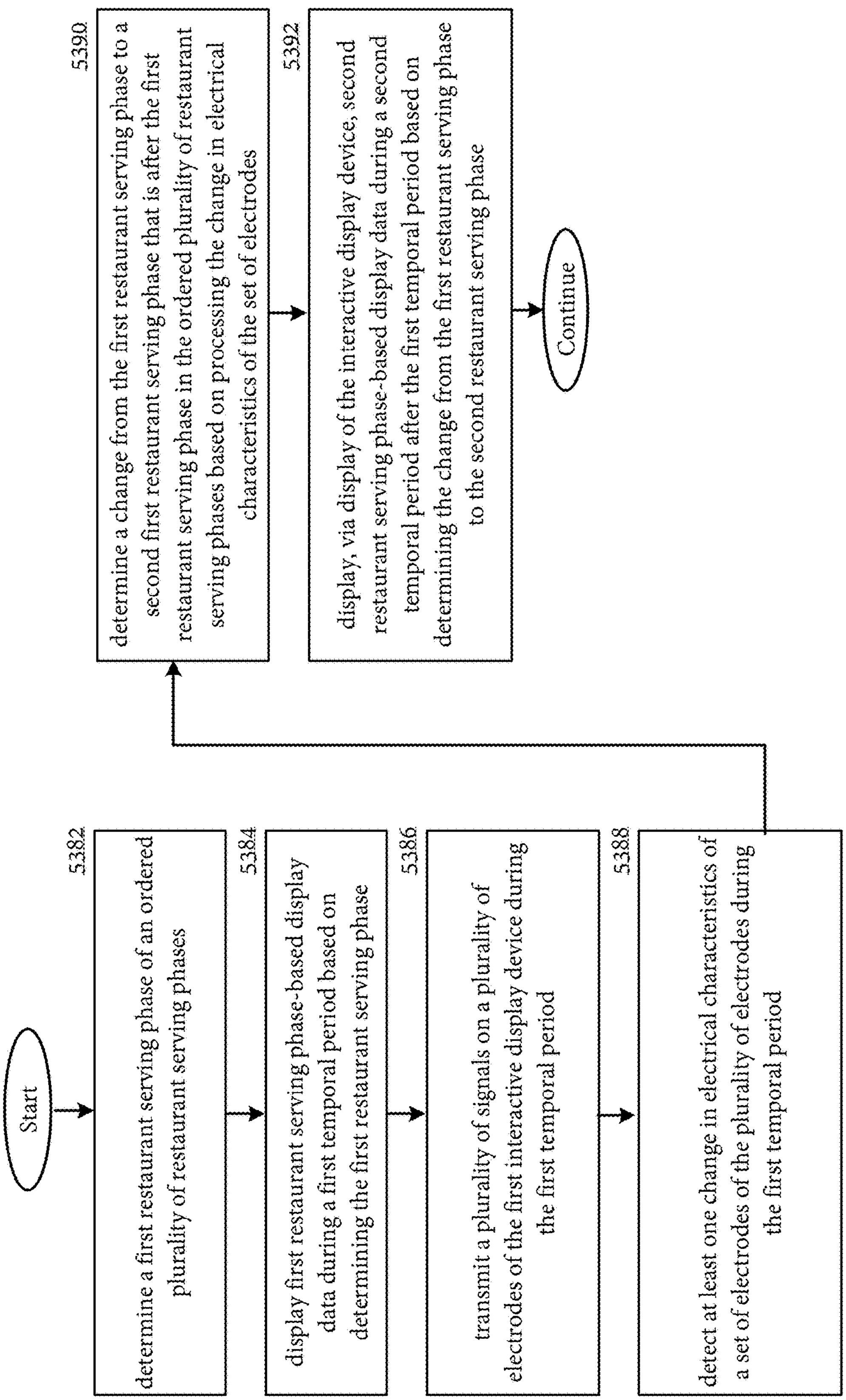
FIG. 53E is a logic diagram of an example of a method in accordance with the present disclosure.

FIG. 53E illustrates a flow diagram of an embodiment of a method in accordance with the present disclosure. In particular, a method is presented for execution by and/or use in conjunction with an interactive display device 10, interactive tabletop 5505, interactive computing device, processing module 42, and/or other processing resources and/or display devices described herein. Some or all steps of FIG. 53E can be performed in conjunction with some or all steps of FIG. 49C and/or of one or more other methods described herein.

Step 5382 includes determining a first restaurant serving phase of an ordered plurality of restaurant serving phases. For example, step 5382 is performed via at least one processing module of an interactive display device. Step 5384 includes displaying first restaurant serving phase-based display data during a first temporal period based on determining the first restaurant serving phase. For example, step 5384 is performed via a display of the interactive display device. Step 5386 includes transmitting a plurality of signals on a plurality of electrodes of the first interactive display device during the first temporal period. For example, step 5386 is performed by a plurality of drive sense circuits of the interactive display device. Step 5388 includes detecting at least one change in electrical characteristics of a set of electrodes of the plurality of electrodes during the first temporal period. For example, the at least one change in electrical characteristics is detected by a set of drive sense circuits of the plurality of drive sense circuits. Step 5390 includes determining a change from the first restaurant serving phase to a second first restaurant serving phase that is after the first restaurant serving phase in the ordered plurality of restaurant serving phases based on processing the at least one change in electrical characteristics of the set of electrodes. For example, step 5390 is performed by at least one processing module of the interactive display device. In some embodiments, determining a change from the first restaurant serving phase to a second first restaurant serving phase is alternatively or additionally based on other types of detected conditions. Step 5392 includes displaying second restaurant serving phase-based display data during a second temporal period after the first temporal period based on determining the change from the first restaurant serving phase to the second restaurant serving phase. For example, step 5392 is performed via a display of the interactive display device.

In various embodiments, the ordered plurality of restaurant serving phases includes at least some of: a welcome phase; a menu viewing phase; an ordering phase; at least one drink delivery phase; at least one food delivery phase for at least one food course; at least one drink refill phase; at least one food refill phase; at least one plate clearing phase for the at least one food course; at least one entertainment phase; at least one call for service phase; and/or a payment phase.

In various embodiments, the method further includes identifying a set of positions of a set of users in proximity to the interactive display device based on change in electrical characteristics of a set of electrodes of the plurality of electrodes during the first temporal period. The second restaurant service phase can correspond to a menu viewing phase, where the second restaurant serving phase-based display data includes menu data displayed at each of plurality of display regions corresponding to the set of positions of the set of users.

In various embodiments, the method further includes detecting a glass upon the interactive display device based on the change in electrical characteristics of a set of electrodes of the plurality of electrodes during the first temporal period. The method can further include determining a low drink threshold is met for the glass based on the change in electrical characteristics of a set of electrodes of the plurality of electrodes during the first temporal period. The second restaurant service phase can correspond to a drink refill phase, where the second restaurant serving phase-based display data includes drink refill option data displayed at a position based on a detected position of the glass.

In various embodiments, the method further includes detecting at least one utensil based on the change in electrical characteristics of a set of electrodes of the plurality of electrodes during the first temporal period. The method can further include determining a static position threshold is met for the at least one utensil based on the change in electrical characteristics of a set of electrodes of the plurality of electrodes during the first temporal period. The second restaurant service phase can correspond to a plate clearing phase based on determining a static position threshold is met for the at least one utensil. The method can further include transmitting a plate clearing notification via a network interface of the interactive display device to a restaurant computing system for display.

In various embodiments, the method further includes detecting at least one plate upon the interactive display device based on the change in electrical characteristics of a set of electrodes of the plurality of electrodes during the first temporal period. The method can further include detecting removal of the at least one plate based on the change in electrical characteristics of a set of electrodes of the plurality of electrodes during the first temporal period. The second restaurant service phase can correspond to a payment phase based on detecting the removal of the at least one plate. The second restaurant serving phase-based display data includes restaurant bill data displayed at a position based on a detected position of the at least one plate prior to its removal. In various embodiments, the second restaurant serving phase-based display data includes different restaurant bill data for each of a plurality of positions based on different food ordered by each of a corresponding set of users FIGS. 54A-61H present various embodiments of interactive display devices 10 implemented in an educational setting, seminar setting, presentation setting, conference room setting, and/or other setting where one or more teachers, lecturers, and/or presenters generate and/or present materials for a corresponding session attended by a plurality of other people, such as students, meeting, conference, and/or presentation attendees, and/or other people. Some or all features and/or functionality of the interactive display device 10 of FIGS. 53A-53E can be utilized to implement any other embodiment of interactive display devices, touch screen displays, and/or computing devices described herein. Some or all features and/or functionality of one or more interactive display devices 10 of FIGS. 54A-61H can be implemented via the interactive display device 10 of FIG. 49A-49C, for example, operating in accordance with a homework setting, work setting, meeting setting, educational setting, or other corresponding setting.

Figure 54A:
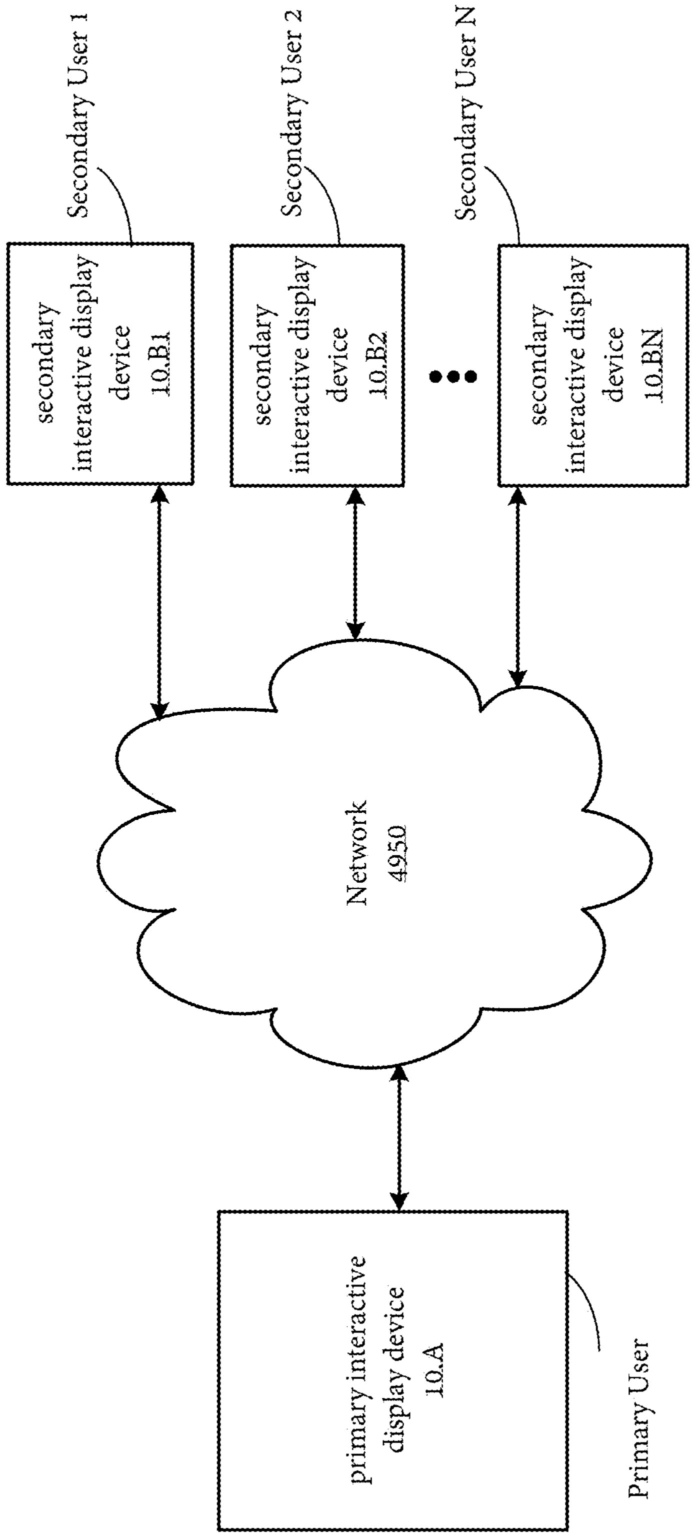
FIG. 54A is a schematic block diagram illustrating communication between a primary interactive display device and a plurality of secondary interactive display devices in accordance with the present disclosure.

FIG. 54A illustrates communication between a primary interactive display device 10.A and one or more secondary interactive display devices 10.B1-10.BN. The primary interactive display device 10.A can be used by, controlled by, and/or can correspond to a primary user, such as a teacher, lecturer, speaker, presenter, or other person leading and/or presenting materials at a corresponding class session, seminar, meeting, presentation, or other event. Each secondary interactive display device can correspond to and/or be used by one of a set of one or more secondary users 1-N.

The primary interactive display device 10.A can send the same or different data to one or more secondary interactive display devices 10.B1-10.BN via a network 4950. Alternatively or in addition, one or more secondary interactive display devices 10.B1-10.BN can send data to primary interactive display device 10.A via the network 4950. Alternatively or in addition, one or more secondary interactive display devices 10.B1-10.BN can send data to one another directly via network 4950.

Network 4950 can be implemented via: a local area network, for example, of a corresponding classroom, building, and/or institution; a wired and/or wireless network that includes the various interactive display devices 10; short range wireless communication signals transmitted by and received by the various interactive display devices 10; and/or other wired and/or communications between interactive display devices 10. For example, the primary interactive display device 10.A and all secondary interactive display devices 10.B1-10.BN are located in a same classroom, lecture hall, conference room, building, and/or indoor and/or outdoor facility, for example, in conjunction with an in-person class, seminar, presentation and/or meeting, where all secondary users 1-N can view the primary display device 10.A and the primary user while seated at and in proximity to their respective secondary interactive display devices 10.B based on the physical proximity of primary interactive display device 10.A with some or all secondary interactive display devices 10.B-10.BN.

In other embodiments, remote learning, such as remote classes, meetings, seminars, and/or presentations are facilitated, where some or all secondary interactive display devices 10.B are implemented as desktops or other devices that are not in view of and/or not in the same building as the primary display device 10.A and/or some or all other secondary interactive display devices 10.B. For example, one or more users interacts with secondary interactive display device 10.B and/or primary interactive display 10.A while at their own home, for example, by utilizing the interactive display device 10 of FIGS. 49A-49C while in their own home while in the homework setting or other educational setting. In such embodiments, network 4950 can be implemented via the Internet, a cellular network, and/or another wired and/or wireless communication network that facilitates this longer range communication.

Figure 54B:
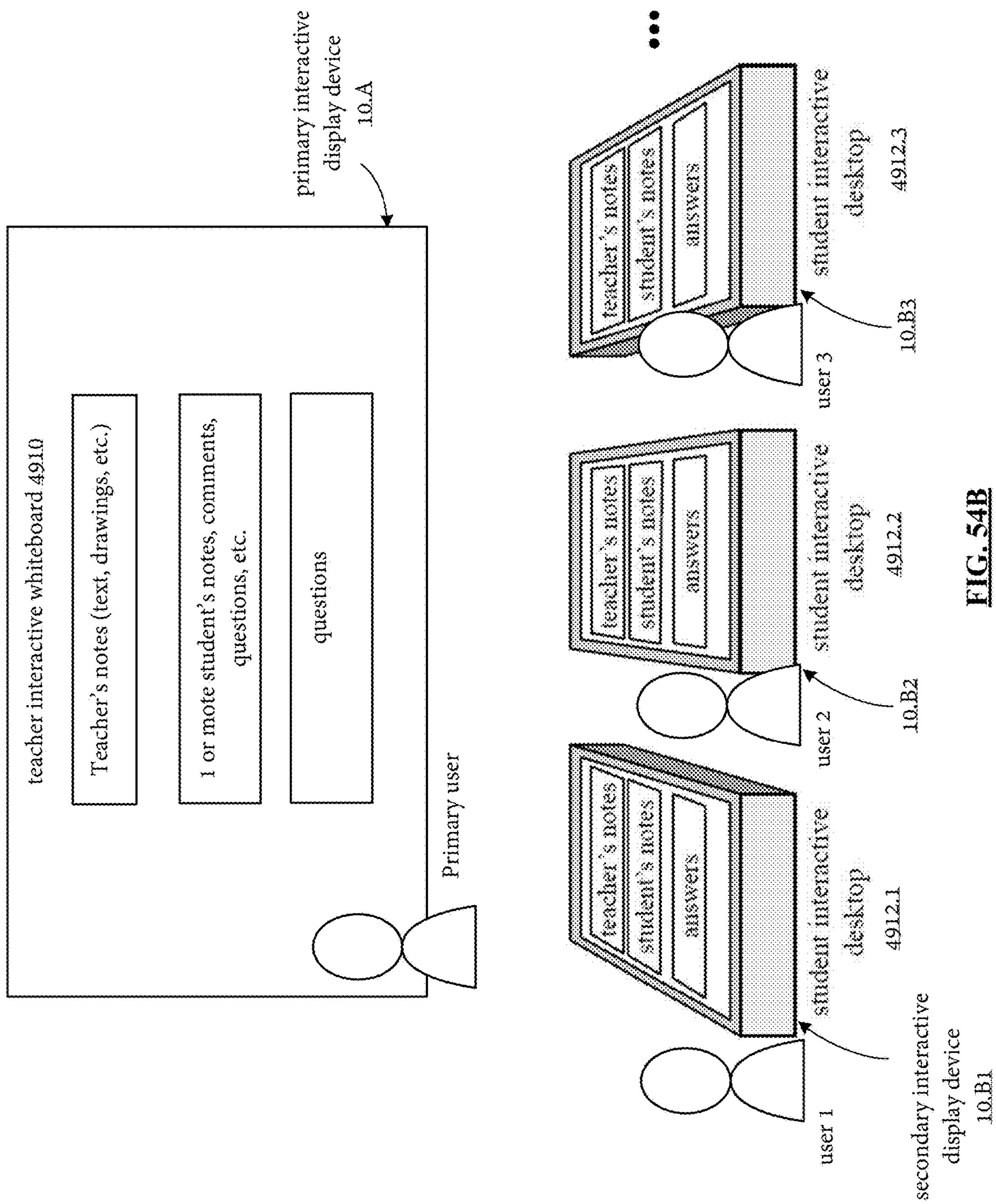
FIG. 54B is a pictorial diagram illustrating an embodiment of a teacher interactive whiteboard and an embodiment of a plurality of student interactive desktops in accordance with the present disclosure.
Figure 54C:
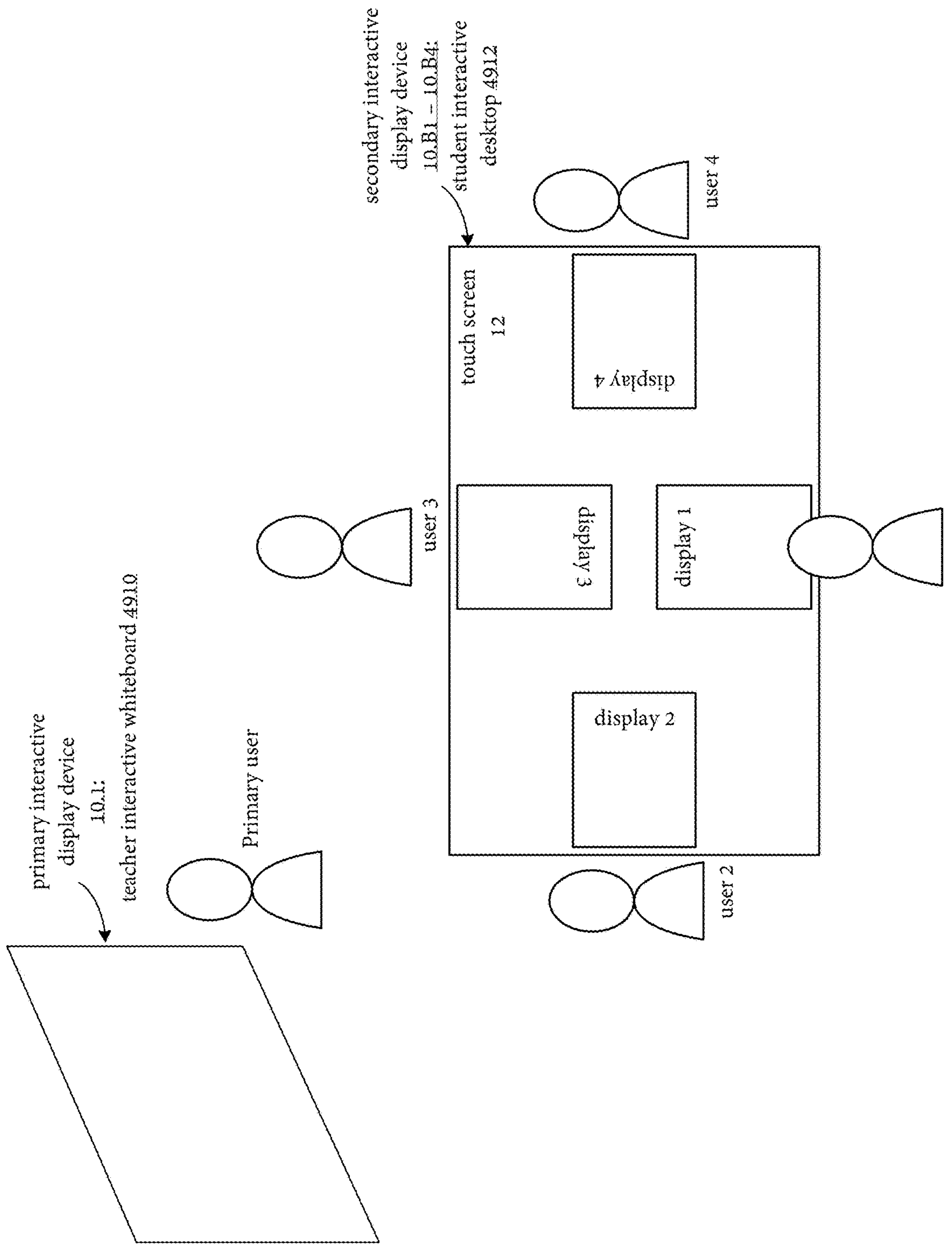
FIG. 54C is a pictorial diagram illustrating an embodiment of a primary interactive display device and an embodiment of a secondary interactive display device in accordance with the present disclosure.

FIGS. 54B and 54C illustrate examples of the primary interactive display device 10.A and a set of secondary interactive display devices that includes at least three secondary interactive display devices 10.B, 10.B2, and 10.B3 implemented in a classroom setting, presentation setting, lecture hall setting, or other setting. Some or all features and/or functionality of primary interactive display device 10.A and/or one or more secondary interactive display devices 10.B of FIG. 54B can be utilized to implement the primary interactive display device 10.A and/or some or all of the set of secondary interactive display devices 10.B of FIG. 54A and/or any other embodiment of interactive display device 10 described herein.

As illustrated in FIG. 54B and FIG. 54C, the primary interactive display devices 10.A of FIG. 54A can be implemented as a teacher interactive whiteboard 4910. For example, in such embodiments, primary interactive display device 10.A can otherwise be implemented in a vertical orientation, such as upon a wall and/or with the display parallel to the wall and/or perpendicular to the floor, enabling students in a corresponding classroom and/or lecture hall to view the interactive display device 10.A in a same or similar fashion as viewing a whiteboard, chalkboard, large monitor, and/or projector screen. Primary interactive display device 10.A can be implemented to have a same and/or similar size as a whiteboard, chalkboard, large monitor, and/or projector screen; can otherwise be implemented with a size such that most and/or all students or other attendees in the room can view the primary interactive display device 10.A; and/or can otherwise be implemented with a size and/or height such that a corresponding primary user can notate upon the primary interactive display device via touch-based and/or touchless indications via their finger, hand, and/or while holding a passive user input device while standing in front of, next to, and/or in proximity to the primary interactive display device 10A.

As illustrated in FIGS. 54B and 54C, one or more secondary interactive display devices 10.B can be implemented as a student interactive desktop 4912. For example, in such embodiments, secondary interactive display device 10.B can otherwise be implemented in a horizontal tabletop orientation, such as upon a desktop and/or with the display parallel to the floor and/or perpendicular to the walls, enabling one or more students in a corresponding classroom and/or lecture hall seated at the corresponding student interactive desktop to interact with and/or view data displayed upon their student interactive desktop. Secondary interactive display device 10.A can be implemented to have a same and/or similar size as a desk, lab table, conference room table, and/or can otherwise be implemented with a size such that most and/or all students or other attendees in the room can be seated at and interact with some or all portions of the surface of the student interactive desktop via touch-based and/or touchless indications via their finger, hand, and/or while holding a passive user input device while sitting behind and/or while being in proximity to the secondary interactive display device 10.B. Some or all features and/or functionality of interactive tabletop 5505 can be utilized to implement the secondary interactive display device 10.B.

In some embodiments, as illustrated in FIG. 54B, each secondary interactive display device 10.B is implemented as a student desk with a surface size implemented to support a single user, for example, where the single user sits behind the corresponding desk and interacts with the secondary interactive display device 10.B by notating upon the interactive desktop surface of their own interactive display device 10.B. In some embodiments, as illustrated in FIG. 54C, one or more secondary interactive display devices 10.B can be implemented as a larger table, such as a lab table or conference room table, with a surface size implemented to support multiple user, for example, where each user sits at different locations of the table and interacts with the secondary interactive display device 10.B by notating upon the interactive desktop surface of their own interactive display device 10.B via their own personalized display area as discussed previously.

Teacher interactive whiteboard 4910 can be implemented to generate and display teacher notes generated by the teacher or other presenter implementing the primary user such as text, and/or drawings notated upon a corresponding surface and detected via a plurality of electrodes by the primary user, for example, based on corresponding touch-based and/or touchless indications via a finger, hand, and/or passive user input device such as a passive pen and/or stylus as described herein. Student interactive desktops 4912 can be implemented to receive the teacher notes from the teacher interactive whiteboard 4910 via network 4950 and display these teacher notes via its own display surface.

Alternatively or in addition, student interactive desktops 4912 can be implemented to generate and display student notes, as text, and/or drawings notated upon a corresponding surface by a corresponding student or attendee implementing the secondary user, which can be detected via a plurality of electrodes as described herein, for example, based on corresponding touch-based and/or touchless indications via a finger, hand, and/or passive user input device such as a passive pen and/or stylus as described herein. In such embodiments, the teacher interactive whiteboard 4910 can be implemented to receive and display these notes, comments, and/or questions generated by student interactive desktops.

Alternatively or in addition, teacher interactive whiteboard 4910 can be implemented to generate and display questions notated upon a corresponding surface by a corresponding teacher or presenter implementing the primary user, which can be detected via a plurality of electrodes as described herein, for example, based on corresponding touch-based and/or touchless indications via a finger, hand, and/or passive user input device such as a passive pen and/or stylus as described herein. In such embodiments, the student interactive desktops 4912 can be implemented to generate and display corresponding answers to these questions notated upon a corresponding surface by a corresponding student or attendee implementing a secondary user, which can be detected via a plurality of electrodes as described herein, for example, based on corresponding touch-based and/or touchless indications via a finger, hand, and/or passive user input device such as a passive pen and/or stylus as described herein. For example, the questions and corresponding answers are generated and processed in conjunction with a quiz, test, and/or examination conducted by the primary user and/or otherwise conducted in a corresponding room and/or facility that includes the teacher interactive whiteboard and student interactive desktops.

Figure 54D:
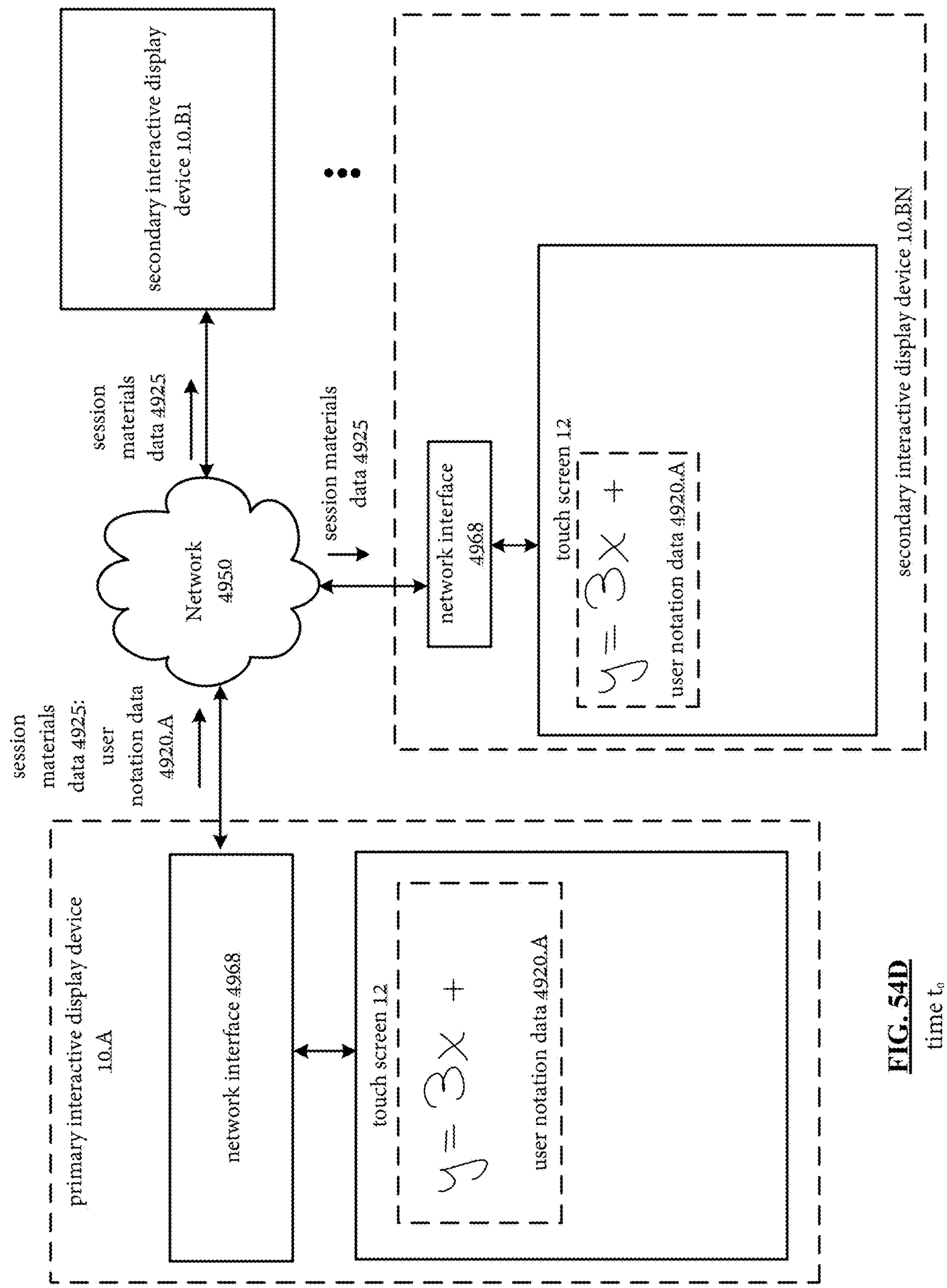
FIGS. 54D-54F are schematic block diagrams illustrating communication of example session materials data between a primary interactive display device and a plurality of secondary interactive display devices in accordance with the present disclosure.
Figure 54E:
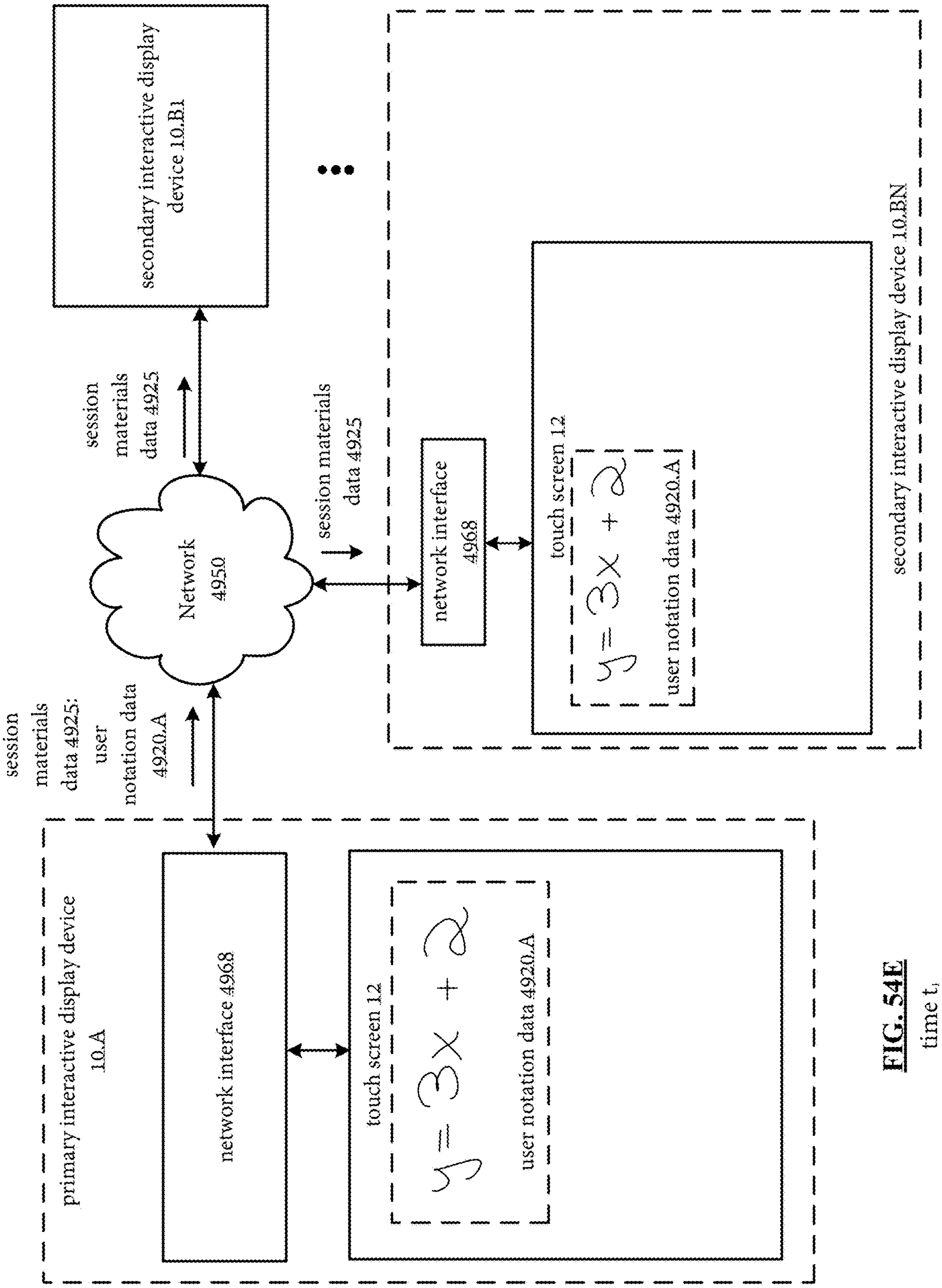

FIGS. 54D and 54E illustrate embodiments where user notation data, such as notes, drawings, or other materials generated by a teacher or other presenter via touch-based and/or touchless interactions with touch screen 12 via one or more fingers, hands, and/or passive user input device of the teacher or other presenter, is generated over time as the teacher and/or other presenter "writes" and/or "draws" upon the primary interactive display device via these touchless and/or touch-based interaction to a corresponding touch screen 12, for example, in a same or similar fashion as writing upon or drawing upon a whiteboard or chalkboard in giving a lecture or presentation. As the movement of the hands, fingers, and/or other passive user input device is detected by interactive display device 10.A, the display can display user notation data 4920.A reflecting these detected movements.

Furthermore, some or all secondary interactive display devices 10.B can be operable to receive and display user notation data 4920.A as session materials data 4925 that includes a user notation data stream over time, where their corresponding displays mirror some or all of the display of interactive display devices 10.A based on receiving and displaying the user notation data stream of this session materials data 4925 in real-time and/or near real-time, with delays imposed by processing and transmitting the user notation data to the secondary interactive display devices 10.B. For example, the user notation data 4920.A is displayed by and transmitted by primary interactive display device 10 as a stream at a rate that corresponding capacitance image data is generated, and/or at a rate that other corresponding changes in electrical characteristics of electrodes are detected by DSCs, and/or at a rate of new user notation data per small unit of time, such as a unit of time less than a second and/or less than a millisecond. For example, the user notation data 4920.A can be displayed and transmitted at a rate where, as each character, such as each letter, number or symbol in a word or mathematical expression is written by a user while notating, the letters are displayed one at a time in different data of the user notation data stream. The stream of user notation data 4920.A transmitted to secondary display devices 10.B can be generated to indicate the full user notation data 4920.A at each given time or can indicate only changes from prior user notation data 4920.A, where the secondary display devices 10.B process the stream and display the most updated user notation data 4920.A accordingly via display 50.

This session materials data 4925 can be transmitted by primary interactive display device 10.A via a network interface 4968 of the primary interactive display device 10.A and/or other transmitter and/or communication interface of the primary interactive display device 10.A. This session materials data 4925 can be received by secondary interactive display devices 10.B via their own network interfaces 4968 other receiver and/or communication interface of the secondary interactive display devices 10.B.

This user notation data mirroring can be useful in settings where students or other attendees are in back rows or far away from the primary display device, where it can be difficult for these attendees to read the notations by the presenter upon the primary interactive display device 10.A from their seats in a corresponding lecture hall or other large room. This can alternatively or additionally be useful in enabling the user to notate upon the presenters notes directly in generating their own notes during a corresponding session, as described in further detail herein.

In the example illustrated in FIGS. 54D-54E, at time to illustrated in FIG. 54D, the display 50 corresponding to touch screen 12 of interactive display device 10.A displays user notation data 4920.A of "y=3x+", where the primary user of interactive display device 10.A previously wrote and/or drew this notation data upon the touch screen 12 via corresponding touch-based and/or touchless movement of their finger, hand, and/or passive user input device in proximity to the surface of touch screen 12 of interactive display device 10.A, for example, while giving a lecture in a mathematics class. This may be the most recent user notation data 4920.A, where the primary user has not yet completed writing the given expression. As these characters are written, the user notation data 4920.A is transmitted as a stream to the secondary interactive display devices 10.B1-10.BN, where at time to this same user notation data 4920.A of "y=3x+" is displayed upon displays of secondary interactive display devices 10.B1-10.BN, for example, based on the stream being transmitted in real-time and/or near real-time to enable the secondary interactive display devices 10.B1-10.BN to mirror the display of user notation data 4920.A of primary interactive display device 10.A At time $t_1$ after $t_0$ illustrated in FIG. 54B, the display 50 corresponding to touch screen 12 of interactive display device 10.A displays user notation data 4920.A of "y=3x+2", where the primary user of interactive display device 10.A wrote and/or drew the "2" as new notation data upon the touch screen 12 via corresponding touch-based and/or touchless movement of their finger, hand, and/or passive user input device in proximity to the surface of touch screen 12 after time to. This updated user notation data 4920.A is transmitted to the secondary interactive display devices 10.B1-10.BN that mirror the display of user notation data 4920.A of primary interactive display device 10.A, where these secondary interactive display devices 10.B1-10.BN also display the user notation data 4920.A of "y=3x+2" accordingly.

Figure 54F:
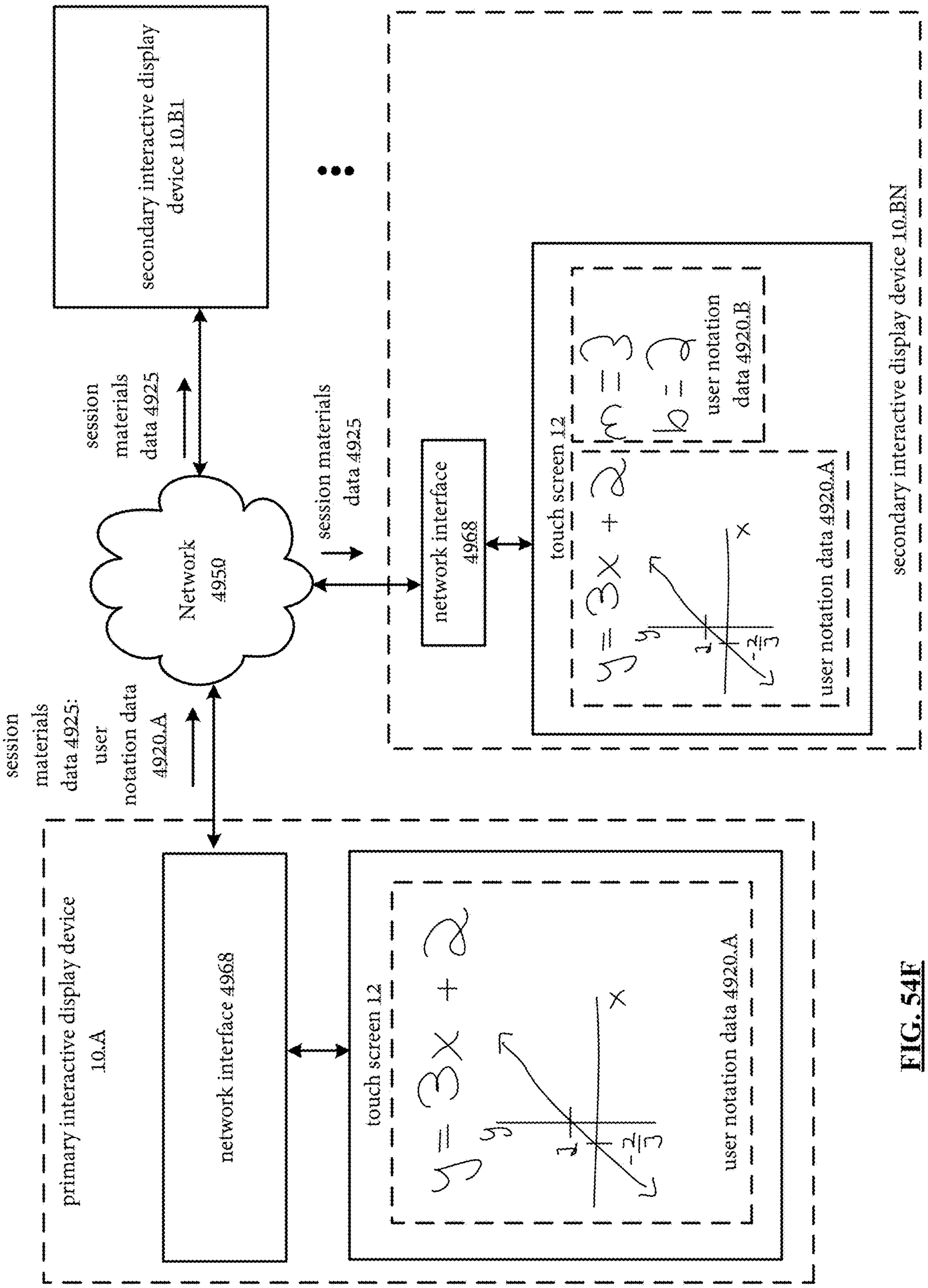

FIG. 54F illustrates an example where some or all secondary interactive display devices 10.B are further operable to detect and display their own user notation data 4920.A, for example, by similarly detecting corresponding touch-based and/or touchless movement of a corresponding secondary user's finger, hand, and/or passive user input device in proximity to the surface of touch screen 12, and by displaying this user notation data 4920.B in the respective detected portion of the touch screen 12. In this example, the user notation data 4920.A received in session materials data 4925 by secondary interactive display devices 10B1-10.BN includes the expression y=3x+2 of FIG. 54E, and further includes a corresponding line graph drawn by the primary user, for example, after time $t_1$. The user of secondary interactive display device 10.BN, in taking their own notes for the respective lecture, indicates that the value of m equals 3 and that the value of b equals 2 in this expression, for example, to aid in their own learning and/or future study. Other users of other secondary interactive display devices 10.B and/or of different personalized display areas of the same secondary interactive display device can optionally write their own user notation data 4920.B, which may be different for different users based on what they choose to notate and/or based on having different handwriting.

The user notation data 4920.B can be generated as a stream of user notation data in a same or similar fashion as the stream of user notation data 4920.A. The stream of user notation data 4920.B can be generated in an overlapping temporal period with a temporal period in which the stream of user notation data 4920.A is generated by primary interactive display device 10.A, is received by the corresponding secondary interactive display device 10.B, and is displayed by the corresponding secondary interactive display device 10.B. In particular, as the teacher or presenter interacts with the primary interactive display device to render user notation data 4920.A over the course of a class, presentation, or other session, a student or attendee using the secondary interactive display device 10.B is simultaneously notating their own notes via their own interaction with their secondary interactive display device to render user notation data 4920.B.

For example, the user of secondary interactive display device 10.BN wrote the user notation data 4920.BN of FIG. 54F while the stream of user notation data 4920.A was generated transmitted and displayed, for example, prior to the drawing of some or all of the plot of user notation data 4920.A by the primary user.

The secondary users can optionally configure which portions of the screen display the session materials data received from primary interactive display device 10.A and/or the size of the primary interactive display device 10.A, for example, where some users prefer to have teacher notes on one side of the display and their own notes on the other, while other users prefer to have the teacher notes on the full display with their own notes superimposed on top. The user notation data 4920.B can optionally be displayed in a different color from user notation data 4920.A to easily differentiate student notes from teacher notes, where these colors are optionally configurable by the secondary user. Such configurations can be configured by a given secondary user via touch-based and/or touchless interaction to displayed options upon the touch screen of the corresponding secondary interactive display device 10.B and/or based on accessing user profile data for the given secondary user. For example, the secondary user draws regions via touch-based and/or touchless interaction upon touch screen 12 to designate different regions of the screen for display of teacher data and notating of their own data as discussed in conjunction with FIG. 47. Such configurations can alternatively be configured by the primary user via touch-based and/or touchless interaction to displayed options upon the touch screen of the primary interactive display device 10.A and/or based on configuring user profile data for different secondary users, for example, based on these students being young and the teacher evaluating and controlling the way that they notate during lectures.

Figure 54G:
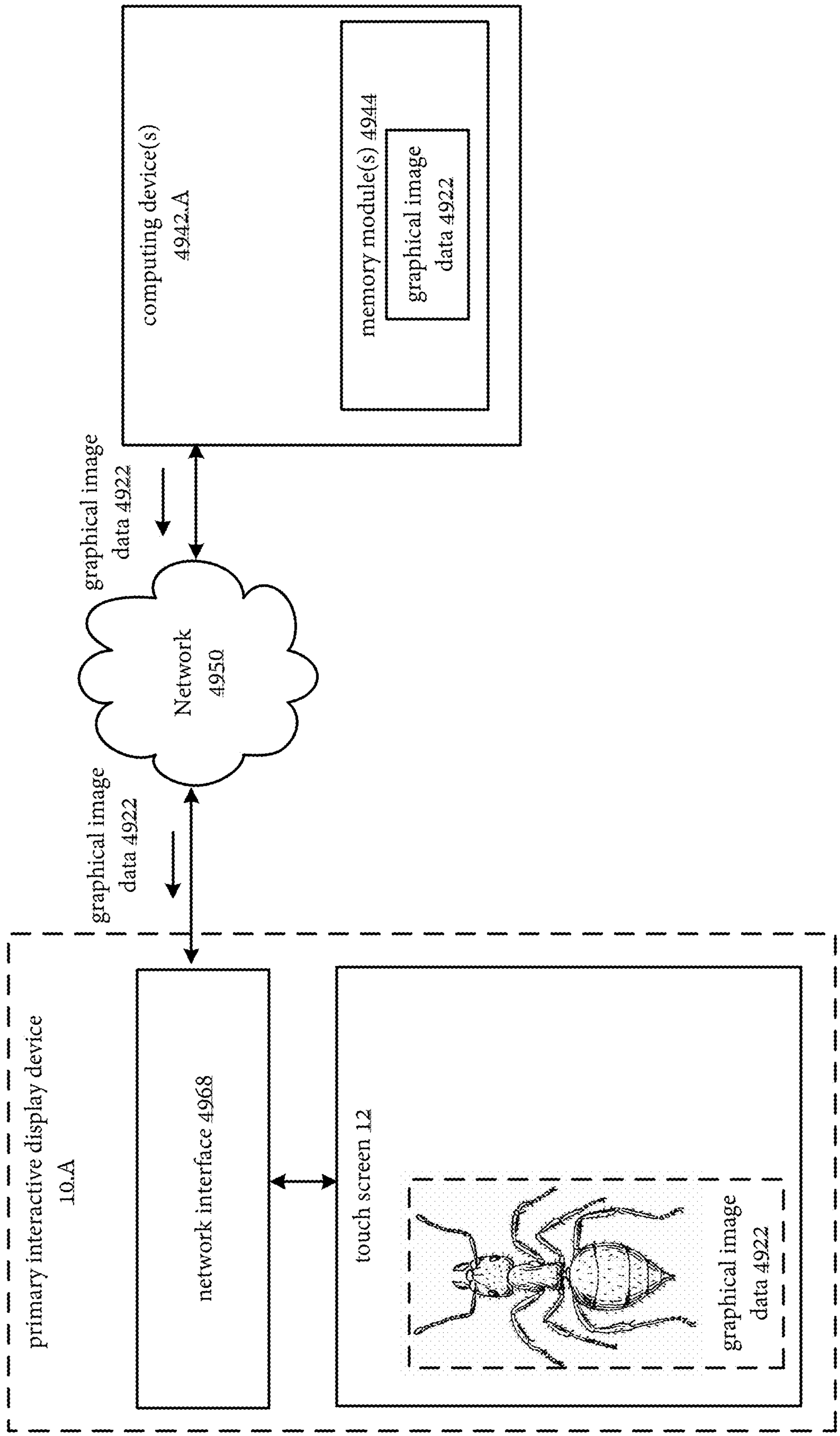
FIGS. 54G-54I are schematic block diagrams illustrating communication of example graphical image data between a primary interactive display device and one or more memory modules in accordance with the present disclosure.
Figure 54H:
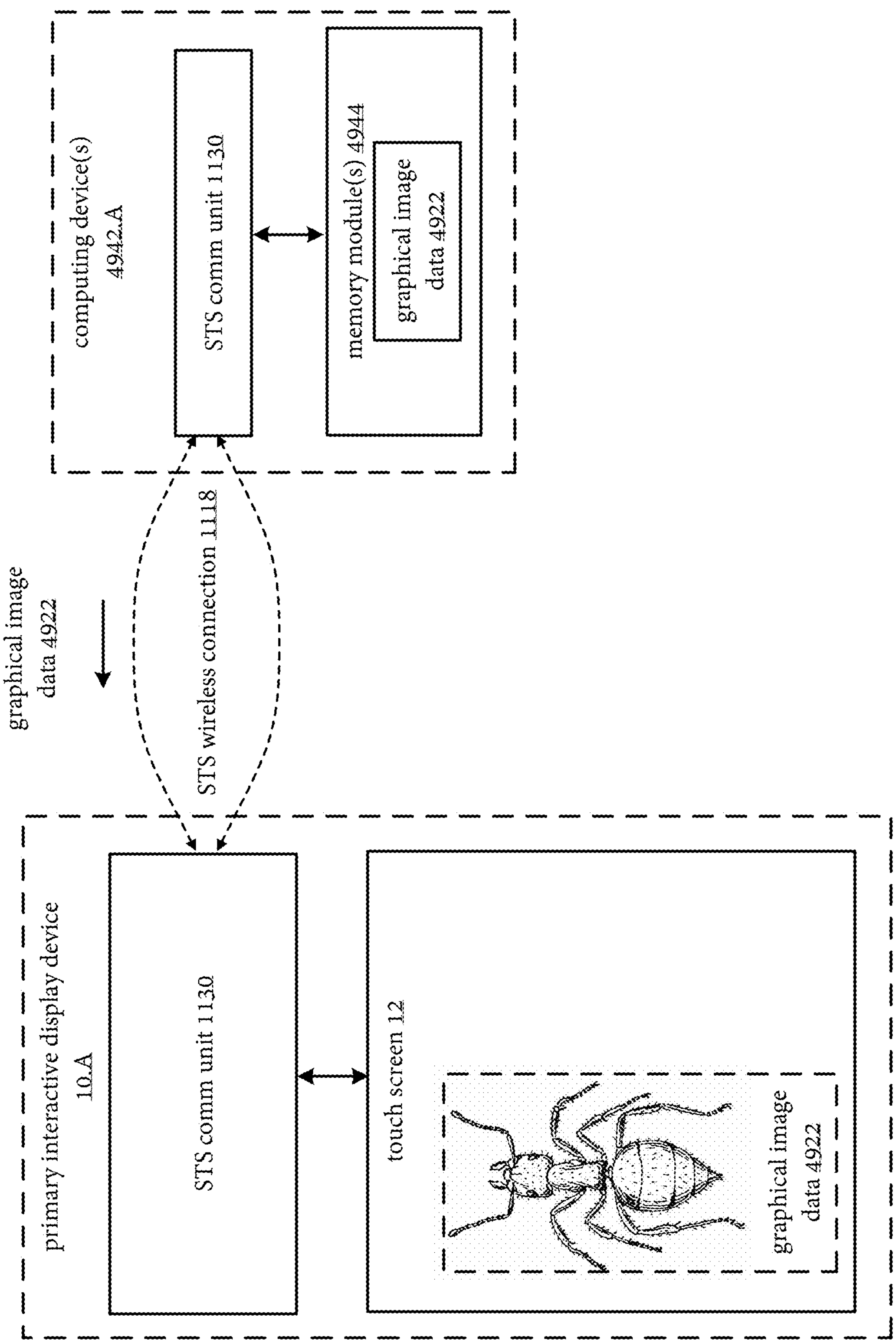
Figure 54I:
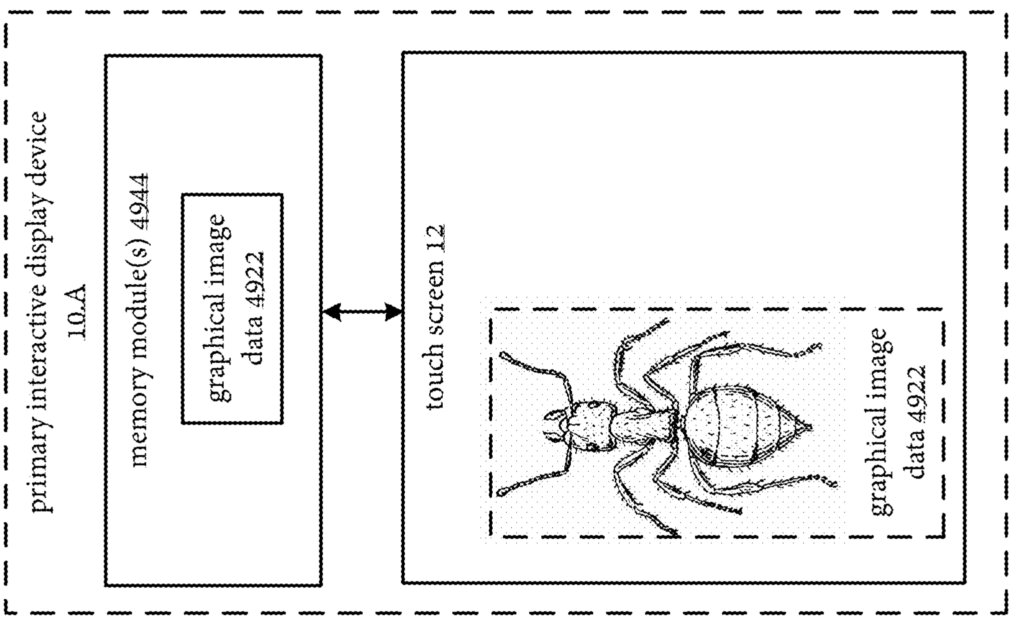

FIGS. 54G-54I illustrate examples where touch screen 12 of primary interactive display devices 10 can further display other data, such as uploaded images, videos, other media data, and/or other previously generated data for display. Some or all features and/or functionality of the interactive display devices 10 of FIGS. 54G-54I can implement the primary interactive display device 10.A and/or secondary interactive display devices 10.B of FIG. 54A and/or any other interactive display devices 10 described herein.

In the examples of FIGS. 54G-54I, graphical image data 4922 that depicts a diagram of an insect is uploaded for display by primary interactive display devices 10, for example, to enable more granular details to be displayed in teaching and/or to alleviate the primary user from having to draw the corresponding diagram in real time as user notation data 4920. The previously generated graphical image data 4922 or other media data can be stored in at least one memory module 4944 that is accessed to enable the graphical image data graphical image data 4922 or other media data to be displayed by the primary interactive display device 10.A.

For example, as illustrated in FIG. 54G, the memory module 4944 is integrated within and/or accessible via a computing device, such as a laptop computer, desktop computer, smart phone, tablet, memory drive, or other computing device 4942.A, for example own and/or used by the primary user. The graphical image data 4922 can be sent by the memory module 4944 to the primary interactive display device 10.A via network 4950 and/or via another wired and/or wireless communication connection between memory module 4944 and primary interactive display device 10.A.

As another example, as illustrated in FIG. 54H, an STS wireless connection 1118 between the computing device 4942.A and primary interactive display device 10.A is implemented via STS communication units 1130 integrated in the computing devices 4942.A and the primary interactive display device to facilitate upload of graphical image data 4922 from memory modules 4944 of the computing device 4942.A to the primary interactive display device 10.A for display. The STS wireless connection 1118 of FIG. 54H can be implemented via some or all features and/or functionality discussed in conjunction with FIGS. 62A-62BM; can be implemented based on the computing device 4942.A being touched by primary user while also touching the primary interactive display device 10; and/or can be implemented based on the computing device 4942.A being in close physical proximity to the primary interactive display device 10.

As another example, as illustrated in FIG. 54I, the memory modules 4944 storing the graphical image data 4922 is integrated within the primary interactive display device 10.A, for example as its own memory resources and/or memory resources directly accessible by the primary interactive display device 10.A. For example, the graphical image data 4922 was previous user notation data 4920 that was generated by the user in a prior session via the primary interactive display device 10.A and/or was uploaded from a computing device or other memory for local storage by primary interactive display device 10.A.

Figure 54J:
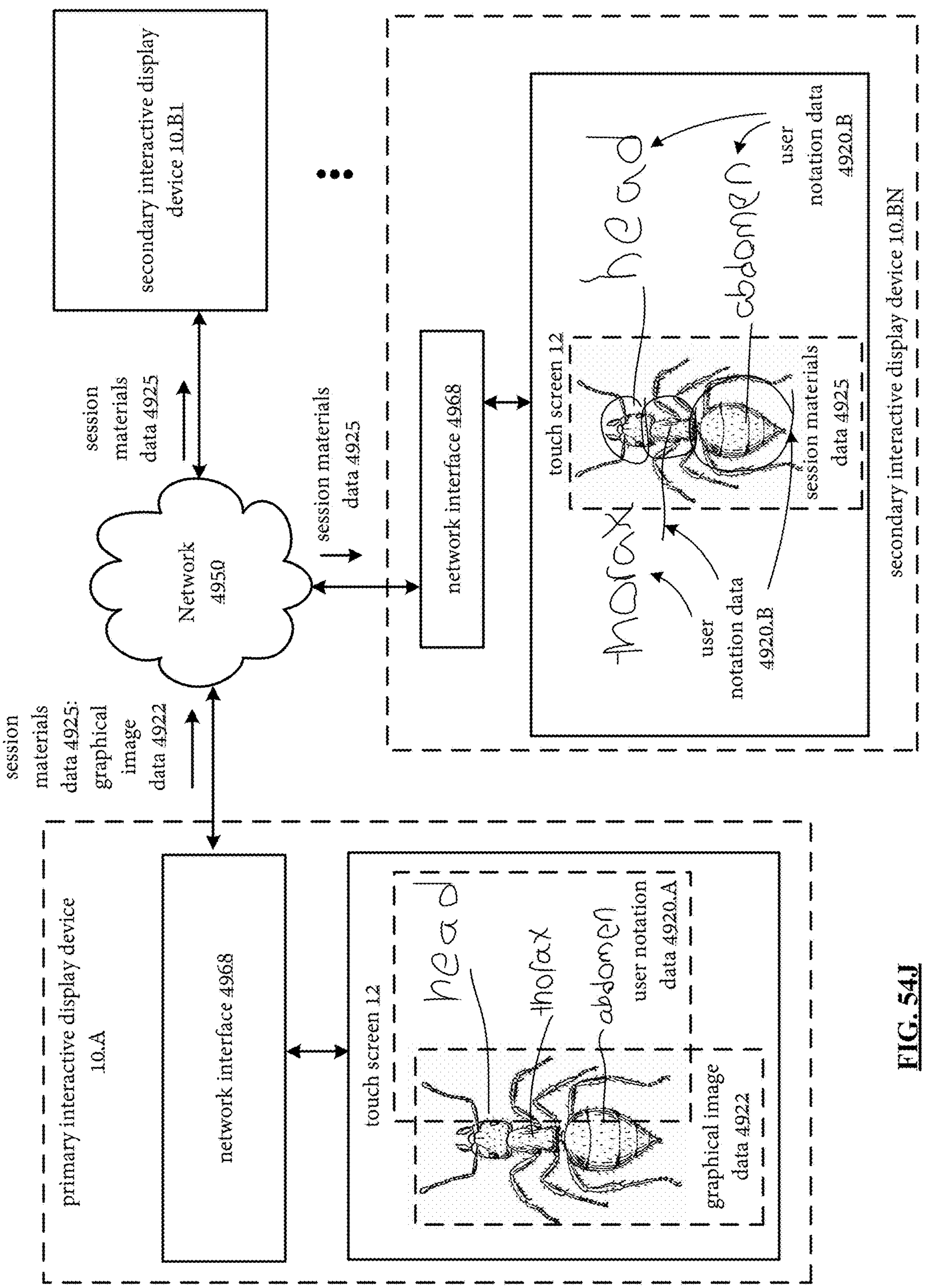
FIGS. 54J-54K are schematic block diagrams illustrating communication of example session materials data between a primary interactive display device and a plurality of secondary interactive display devices in accordance with the present disclosure.
Figure 54K:
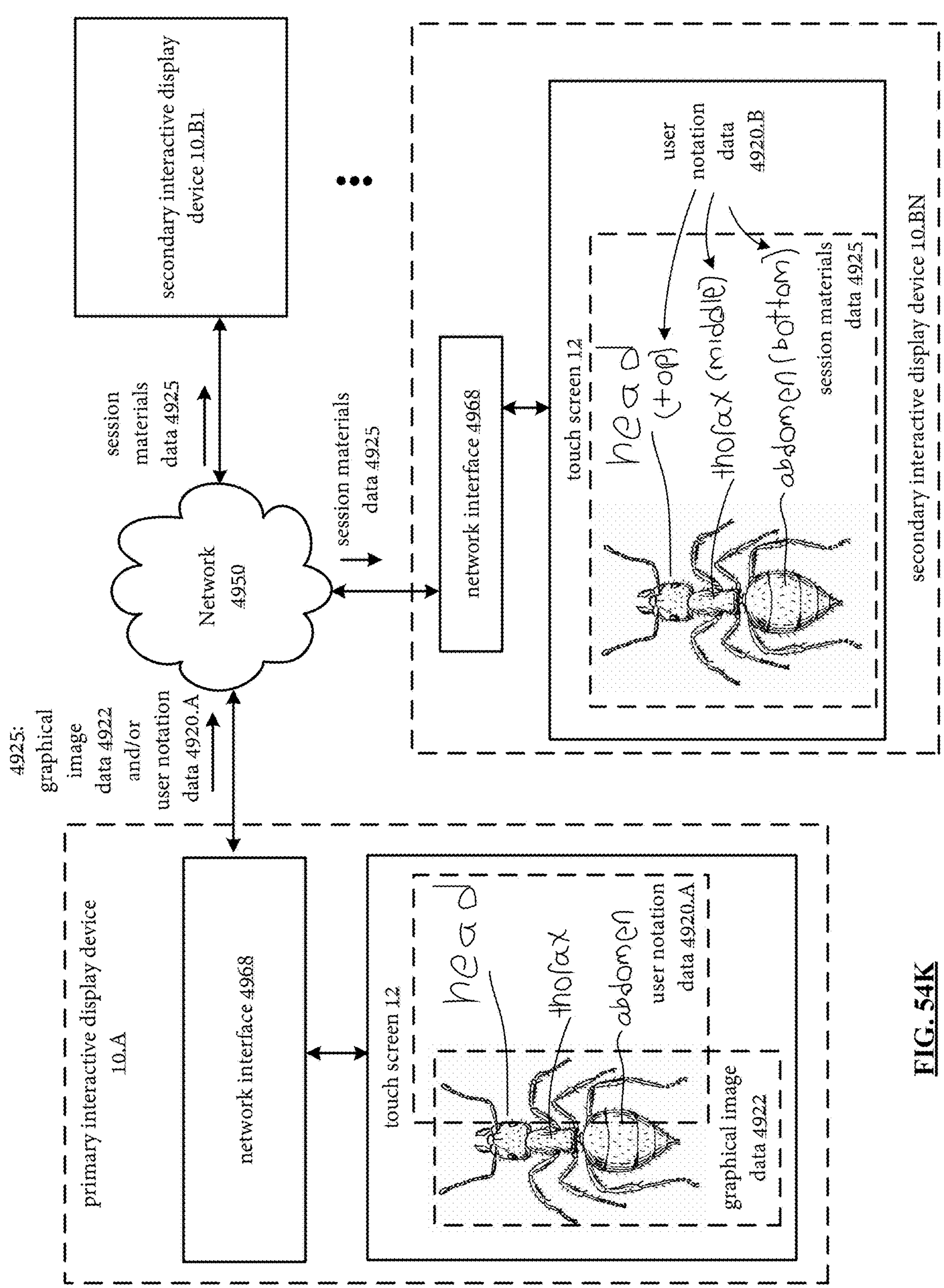

FIGS. 54J and 54K illustrate examples where the session materials data 4925 transmitted to other secondary interactive display devices 10.B includes the graphical image data 4922 downloaded by and displayed by primary interactive display device 10.A, alternatively or in addition to user notation data 4920. Some or all features and/or functionality of the interactive display devices 10 of FIGS. 54J-54K can implement the primary interactive display device 10.A and/or secondary interactive display devices 10.B of FIG. 54A and/or any other interactive display devices 10 described herein.

In the example of FIG. 54J, the session materials data 4925 only includes the graphical image data 4922 and not the user notation data 4920.A of primary interactive display device 10.A, for example, where each secondary user instead labels the graphical image data 4922 themselves during a corresponding lecture as user notation data 4920.B. In the example of FIG. 54K, the session materials data 4925 includes both the graphical image data 4922 as well as the user notation data 4920.A of primary interactive display device 10.A, for example, where each secondary user can provide additional notations themselves during a corresponding lecture as user notation data 4920.B.

For example, the primary user can configure which portions of their screen and/or which types of user notation data be transmitted for display by secondary interactive display devices via user input to the primary interactive display device 10.A via touch-based and/or touchless interaction to displayed options, such as by selecting portions of the display that be transmitted to users and other portions of the display that not be transmitted to users, and/or based on accessing user profile data for the primary user. As another example, different secondary users can configure whether they wish user notation data of the primary user to be displayed upon their touch screen or not and/or which types of session materials data be displayed, based on different students having different learning and/or note-taking preferences, via touch-based and/or touchless interaction to displayed options and/or based on accessing user profile data for the primary user.

FIGS. 54L-54O illustrate embodiments where user notation data 4920.B generated by secondary interactive display devices 10.B of secondary users can be communicated and displayed by other secondary interactive display devices 10.B and/or by primary interactive display devices 10.A. This can be ideal in facilitating interaction and discussion in a classroom and/or meeting setting, enabling students or attendees to share their thoughts and/or example solutions to problems to other users, without necessitating that these users walk to the front of the room and physically write upon a whiteboard viewed by all attendees to share this information. Some or all features and/or functionality of the interactive display devices 10 of FIGS. 54L-54O can implement the primary interactive display device 10.A and/or secondary interactive display devices 10.B of FIG. 54A and/or any other interactive display devices 10 described herein.

Figure 54L:
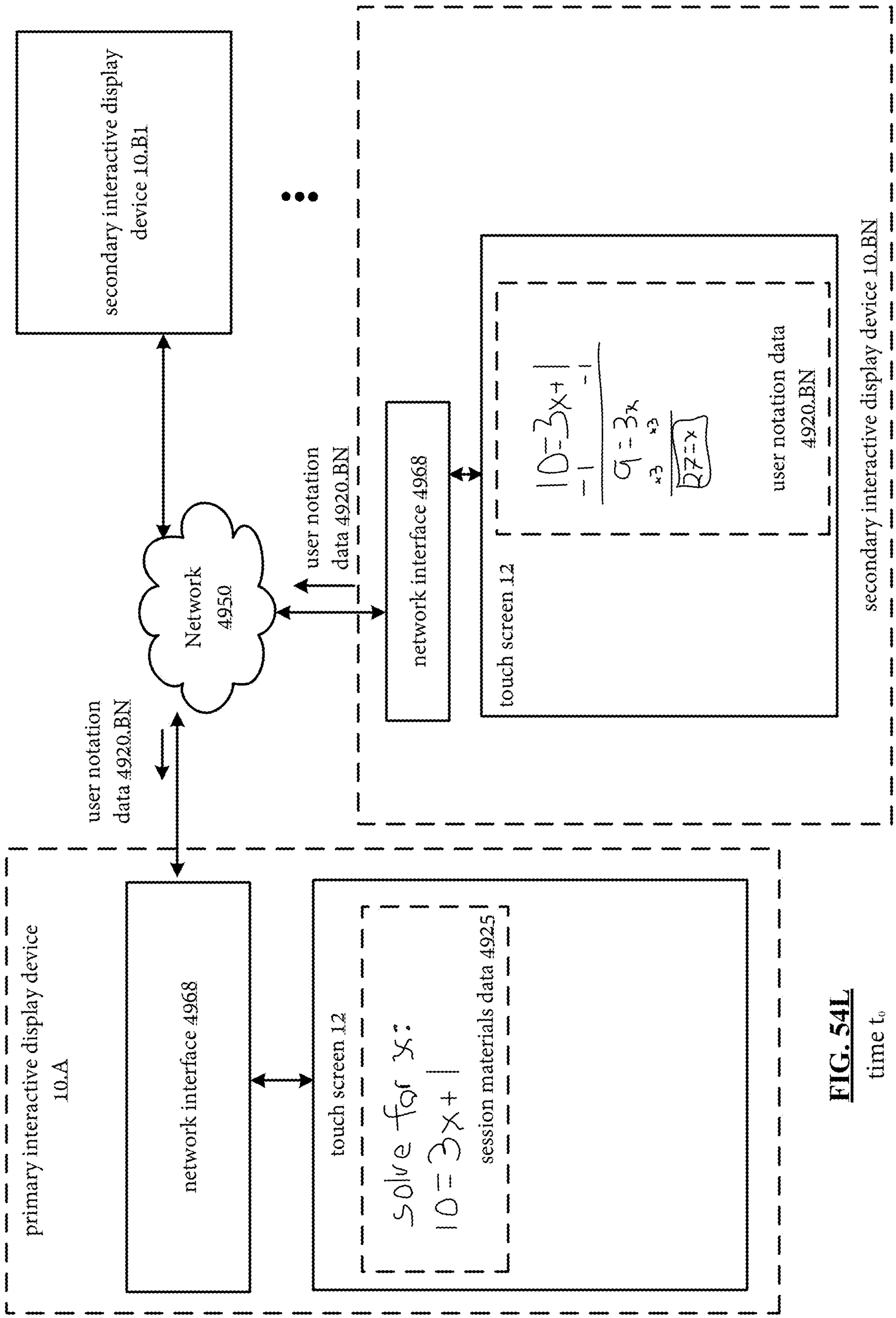
FIGS. 54L-54O are schematic block diagrams illustrating communication of example user notation data between a primary interactive display device and secondary interactive display devices in accordance with the present disclosure.

As illustrated in FIG. 54L, prior to a first time to, a user of secondary interactive display device 10.BN attempts to solve a math problem via their own user notation data 4920.BN for a corresponding equation displayed by primary interactive display device 10.A as user notation data 4920.A. At time to, this user notation data 4920.BN is transmitted by secondary interactive display device 10.BN to primary interactive display device 10.A for display once primary interactive display device 10.A receives and processes the user notation data 4920.BN at time $t_1$. For example, the teacher selects the corresponding user as the student that share their solution to the presented math problem to the class. In other embodiments, rather than only transmitting the user notation data 4920.BN for display by primary interactive display device 10 after the user has completed notating the user notation data 4920.BN, the user notation data 4920.BN is instead transmitted as a stream, so that other students and/or the teacher can view each step taken by the user in solving the problem, allowing the corresponding student to dictate their thought-process aloud to other students.

Figure 54M:
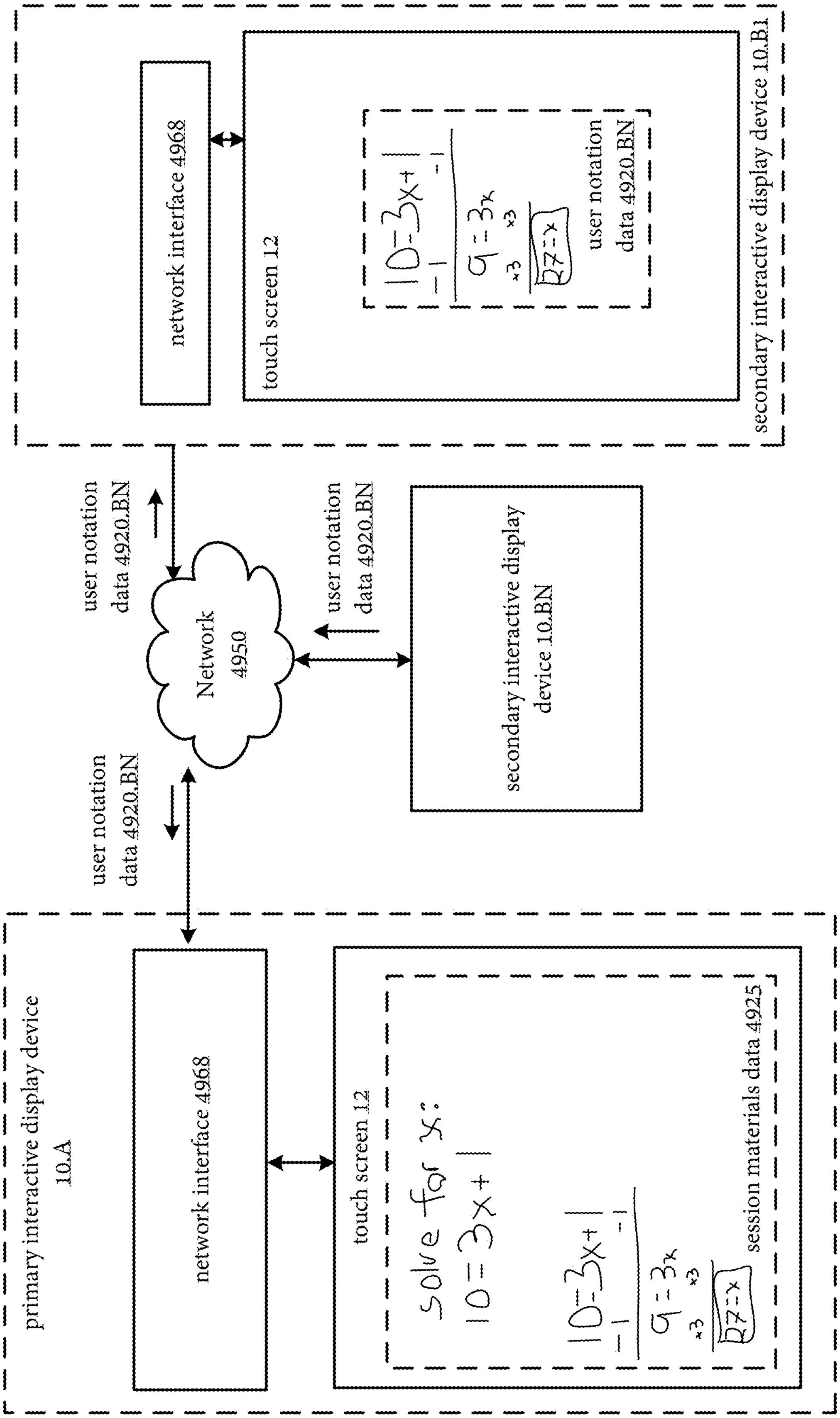
Figure 54N:
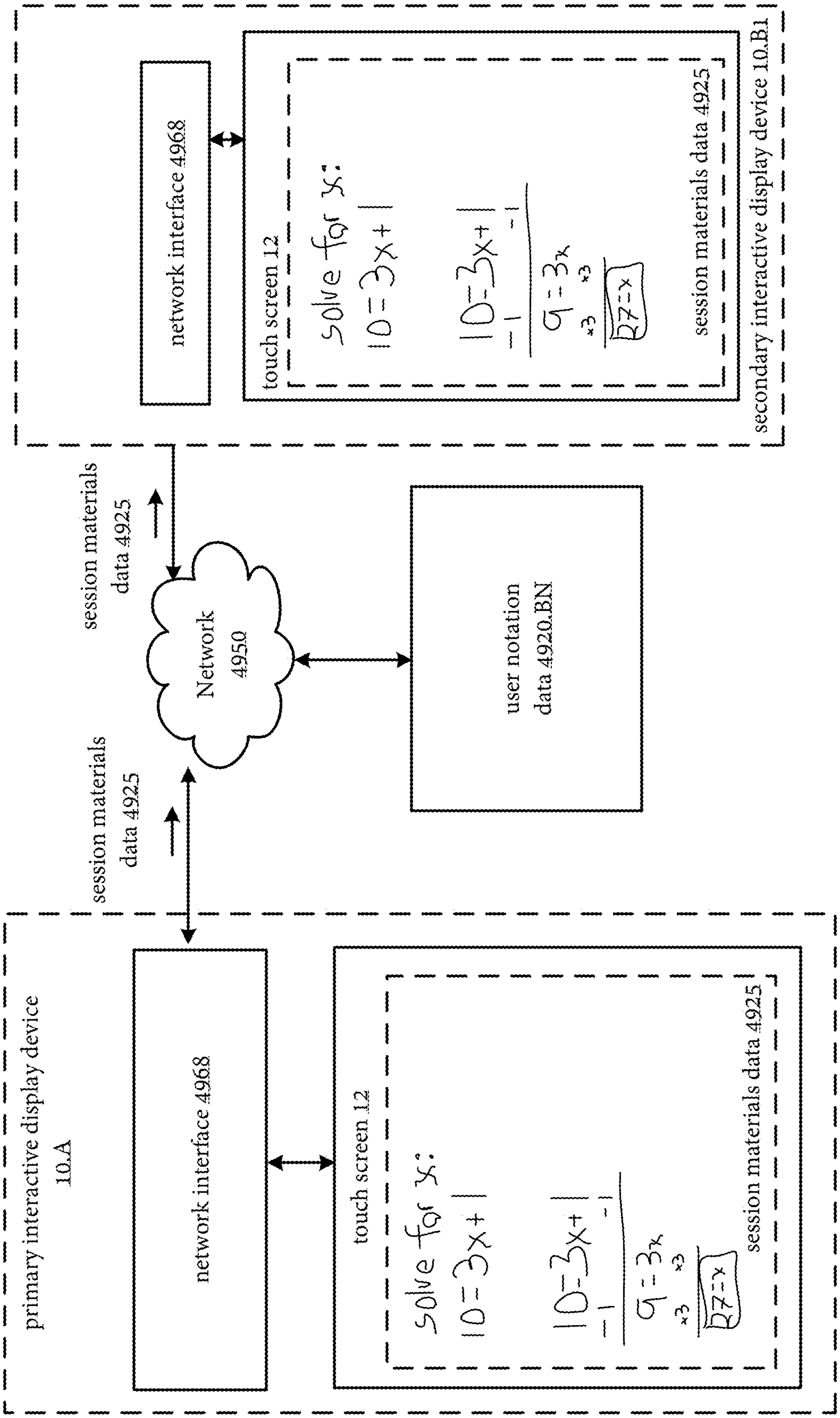

As illustrated in FIG. 54M, this user notation data 4920.BN is optionally shared with some or all other secondary users' secondary interactive display device 10.BN, where the user notation data 4920.BN is transmitted by the secondary interactive display device 10.BN to the primary interactive display device 10.A as well as some or all other secondary interactive display devices 10.B1-10.BN-1 for display at time $t_1$, where all other user devices mirror data generated by secondary interactive display device 10.BN. Alternatively, as illustrated in FIG. 54N, the primary interactive display device 10.A transmits its own display of the received user notation data 4920.BN as session materials data mirrored to other users at time $t_2$, for example, immediately after being received and displayed at time $t_1$, for example, where primary interactive display device 10.A is the only device transmitting display data for mirroring by the secondary interactive display devices 10.B. In either case, a single selected secondary interactive display device 10.B can optionally be selected to control some or all of the display of other devices at a given time, where other devices mirror the user notation data generated by this selected device, and/or optionally other media such as graphical images and/or videos uploaded to and transmitted by this selected device in a same or similar fashion as mirroring of the primary interactive display device 10.A as discussed previously.

For example, a user previously prepared materials to share with the class, and uploads their materials to their secondary interactive display device 10.B based on accessing the materials in their user account data and/or based on facilitating a screen-to-screen connection or other communications between their computing device storing these materials and their secondary interactive display device 10.B to enable upload of these materials from their computing device to the secondary interactive display device 10.B for transmission or display by the primary interactive display device 10.A. The user can further notate upon these materials as user notation data 4920.B for display superimposed upon and/or adjacent to these materials when displayed by secondary interactive display device 10.B and/or primary interactive display device 10.A.

In some embodiments, multiple different secondary interactive display device 10.B can be selected to notate simultaneously, where their respective data is mirrored in overlapping and/or distinct displays by the primary interactive display device 10.A and/or by some or all other secondary interactive display devices 10.B. User notation data generated by different users can optionally be configured for display in different colors by primary interactive display device 10.A to distinguish different notations by different users, even if noted upon each respective interactive display devices 10.B in a same color.

Figure 54O:
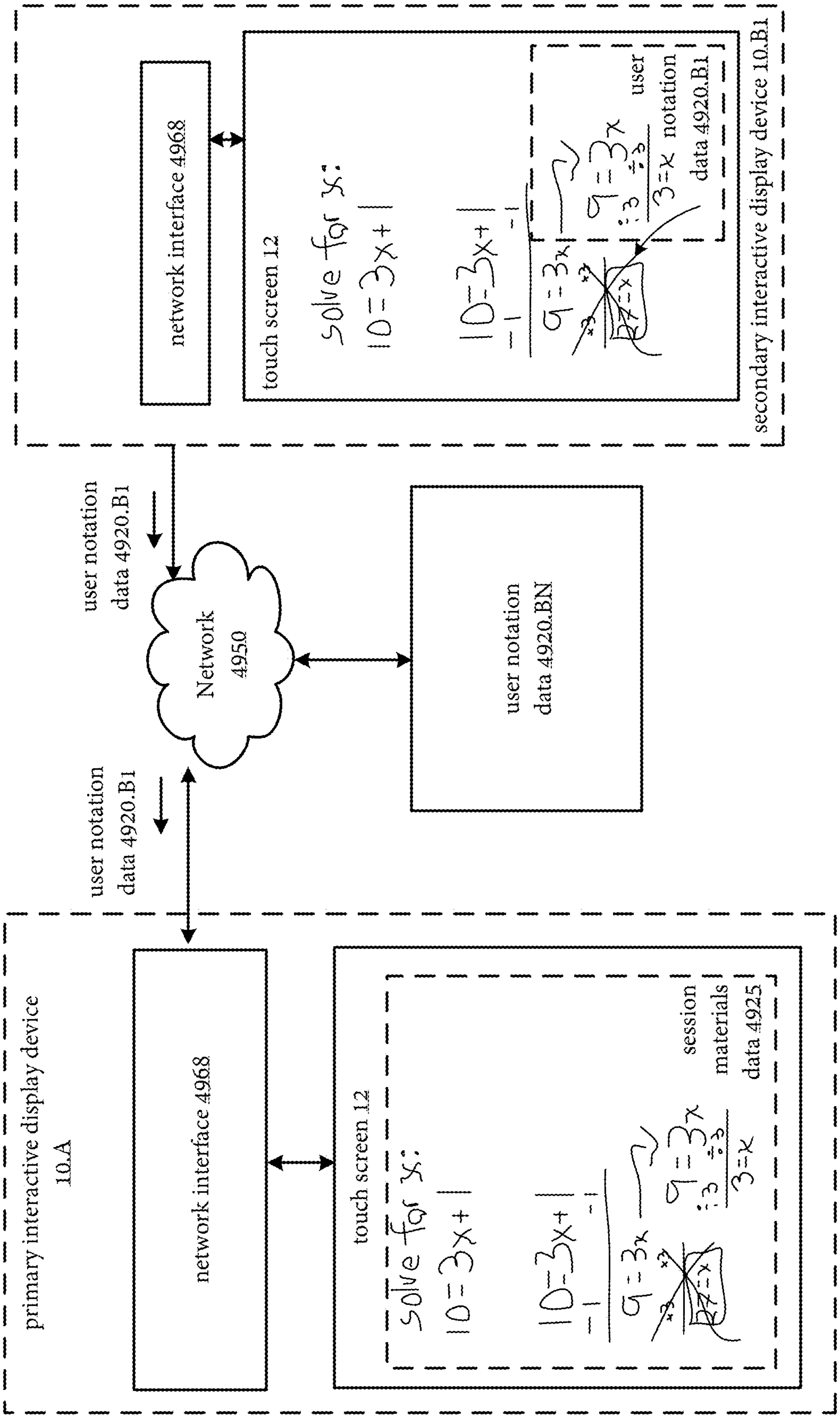

FIG. 54O illustrates how further interaction can be facilitated. In particular, as the user of secondary interactive display device 10.BN solved for x incorrectly, the teacher may call upon another user to display their own solution, or to correct the deficiencies in user N's solution as illustrated in FIG. 54O. In this example, the user of secondary interactive display device 10.B1 generates their own user notation data 4920.B1 indicating problems with the user notation data 4920.BN and rendering the correct solution. This user notation data 4920.B1 can be transmitted by secondary interactive display device 10.B1 the primary interactive display device 10.A for display as illustrated in FIG. 54O, where user notation data 4920.B1 can optionally be then transmitted by primary interactive display device 10.A to other secondary interactive display devices 10.B2-10.BN for display and/or by secondary interactive display device 10.B1 itself to other secondary interactive display devices 10.B2-10.BN for display as discussed in conjunction with FIGS. 54M and/or 54N.

Figure 54P:
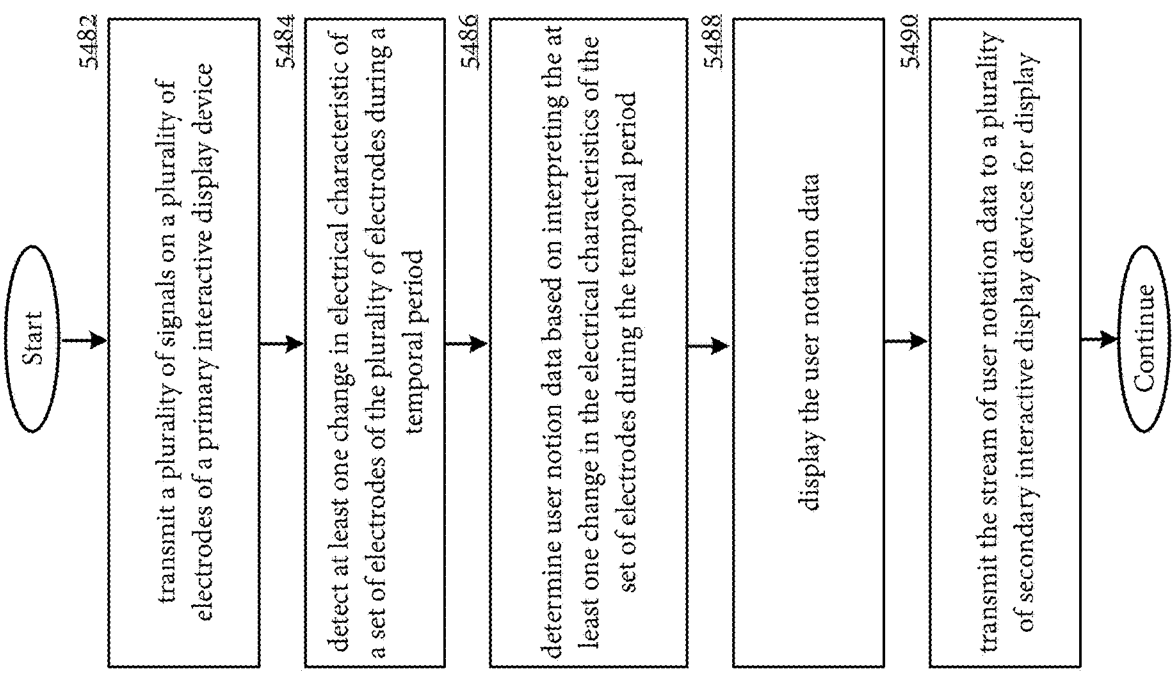
FIG. 54P is a logic diagram of an example of a method in accordance with the present disclosure.

FIG. 54P illustrates a flow diagram of an embodiment of a method in accordance with the present disclosure. In particular, a method is presented for execution by and/or use in conjunction with an interactive display device 10 such as the primary interactive display device 10.A of FIGS. 54A-54O, interactive tabletop 5505, interactive computing device, processing module 42, and/or other processing resources and/or display devices described herein. Some or all steps of FIG. 54P can be performed in conjunction with some or all steps of one or more other methods described herein.

Step 5482 includes transmitting a plurality of signals on a plurality of electrodes of a primary interactive display device. For example, the plurality of signals are transmitted by a plurality of DSCs of a primary interactive display device. Step 5484 includes detecting at least one change in electrical characteristic of a set of electrodes of the plurality of electrodes during a temporal period. For example, the at least one change is detected by a set of DSCs of the plurality of DSCs. Step 5486 includes determining user notion data based on interpreting the at least one change in the electrical characteristics of the set of electrodes during the temporal period. For example, the user notation data is determined by a processing module of the primary interactive display device. The user notation data can be implemented as a stream of user notation data generated based on detected changes overtime during the temporal period. Step 5488 includes displaying the user notation data during the temporal period. For example, the user notation data is displayed via a display of the primary interactive display device, The user notation data can be displayed as a stream of user notation data displayed during the temporal period. Step 5490 includes transmitting the user notation data to a plurality of secondary interactive display devices for display. For example, the user notation data is transmitted via a network interface of the primary interactive display device, for example, as a stream of user notation data device.

In various embodiments, the method further includes receiving, via the network interface, a second stream of user notation data from one of the plurality of secondary interactive display devices. In various embodiments, the method further includes displaying the second stream of user notation data via the display.

In various embodiments, the method further includes determining, by the processing module, secondary user display selection data based on interpreting the change in the electrical characteristics of the set of electrodes, where the second stream of user notation data is displayed via the display based on determining the secondary user display selection data In various embodiments, the secondary user display selection data indicates at least one of: a selected user identifier of a plurality of user identifiers, or a selected secondary interactive display device from the plurality of secondary interactive display devices, and wherein the second stream of user notation data is displayed via the display based on at least one of: corresponding to the selected user identifier, or being received from the selected secondary interactive display device. The secondary user display selection data can be implemented as user selection data from configuration option data, as discussed in further detail in conjunction with FIGS. 59A-59E.

In various embodiments, the method further includes receiving user identification data from the plurality of secondary interactive display devices, for example, as discussed in further detail in conjunction with FIGS. 55A-55G. The method can further include generating attendance data, such as session attendance data a discussed in conjunction with FIG. 55G, based on the user identification data In various embodiments, the plurality of secondary interactive display devices correspond to a subset, such a proper subset, of a set of secondary interactive display devices, where the stream of user notation data is transmitted to each of the plurality of secondary interactive display devices for display based on receiving the user identification data from each of the plurality of secondary interactive display devices, and where the stream of user notation data is not transmitted to each of the plurality of secondary interactive display devices for display based on receiving the user identification data from each of the plurality of secondary interactive display devices.

In various embodiments, all of the set of secondary interactive display devices are located within a bounded indoor location, such as a classroom, lecture hall, conference room, convention center, office space, or other one or more indoor rooms. In various embodiments, the bounded indoor location includes a plurality of walls, where the primary interactive display device is physically configured in a first orientation where a display surface of the primary interactive display device is parallel to one of the plurality of walls, and where the set of secondary interactive display devices are configured in at least one second orientation that is different from the first orientation.

In various embodiments, the stream of user notion data is determined based on determining movement of at least one passive user device in proximity of the display during the temporal period. For example, the at least one passive user device is implemented as a writing passive device and/or an erasing passive device as discussed in conjunction with FIGS. 58A-58G. The movement of the at least one passive user device can be tracked as discussed in conjunction with FIGS. 64AZ-64BD.

In various embodiments, a primary interactive display device 10.A includes a display configured to render frames of data into visible images. The primary interactive display device can further include a plurality of electrodes integrated into the display to facilitate touch sense functionality based on electrode signals having a drive signal component and a receive signal component. The plurality of electrodes can include a plurality of row electrodes and a plurality of column electrodes. The plurality of row electrodes can be separated from the plurality of column electrodes by a dielectric material. The plurality of row electrodes and the plurality of row electrodes can form a plurality of cross points.

In various embodiments, the primary interactive display device 10.A further includes a plurality of drive-sense circuits coupled to at least some of the plurality of electrodes to generate a plurality of sensed signals. Each the plurality of drive-sense circuits can include a first conversion circuit and a second conversion circuit. When a drive-sense circuit of the plurality of drive-sense circuits is enabled to monitor a corresponding electrode of the plurality of electrodes, the first conversion circuit can be configured to convert the receive signal component into a sensed signal of the plurality of sensed signals and/or the second conversion circuit can be configured to generate the drive signal component from the sensed signal of the plurality of sensed signals.

In various embodiments, the primary interactive display device 10.A further includes processing module that includes at least one memory that stores operational instructions and at least one processing circuit that executes the operational instructions to perform operations that include receiving the plurality of sensed signals during a temporal period, wherein the sensed signals indicate changes in electrical characteristics of the plurality of electrodes. The processing module can further determine a stream of user notion data for display by the display based on interpreting the changes in the electrical characteristics during the temporal period. The display can display this stream of user notation data during the temporal period.

In various embodiments, the primary interactive display device 10.A further includes a network interface operable to transmit the stream of user notation data to a plurality of secondary interactive display devices for display.

In various embodiments, the primary interactive display device is implemented as a teacher interactive whiteboard. In various embodiments, the primary interactive display device is configured for vertical mounting upon a wall, where the display is parallel to the wall. The sensed signals can indicate the changes in electrical characteristics associated with the plurality of cross points based on user interaction with the primary interactive display device while standing in proximity to the primary interactive display device. In various embodiments, the plurality of secondary interactive display devices have corresponding displays upon surfaces in one or more different orientations that are not parallel to the wall and/or are not parallel to the display of the primary interactive display device.

Figure 54Q:
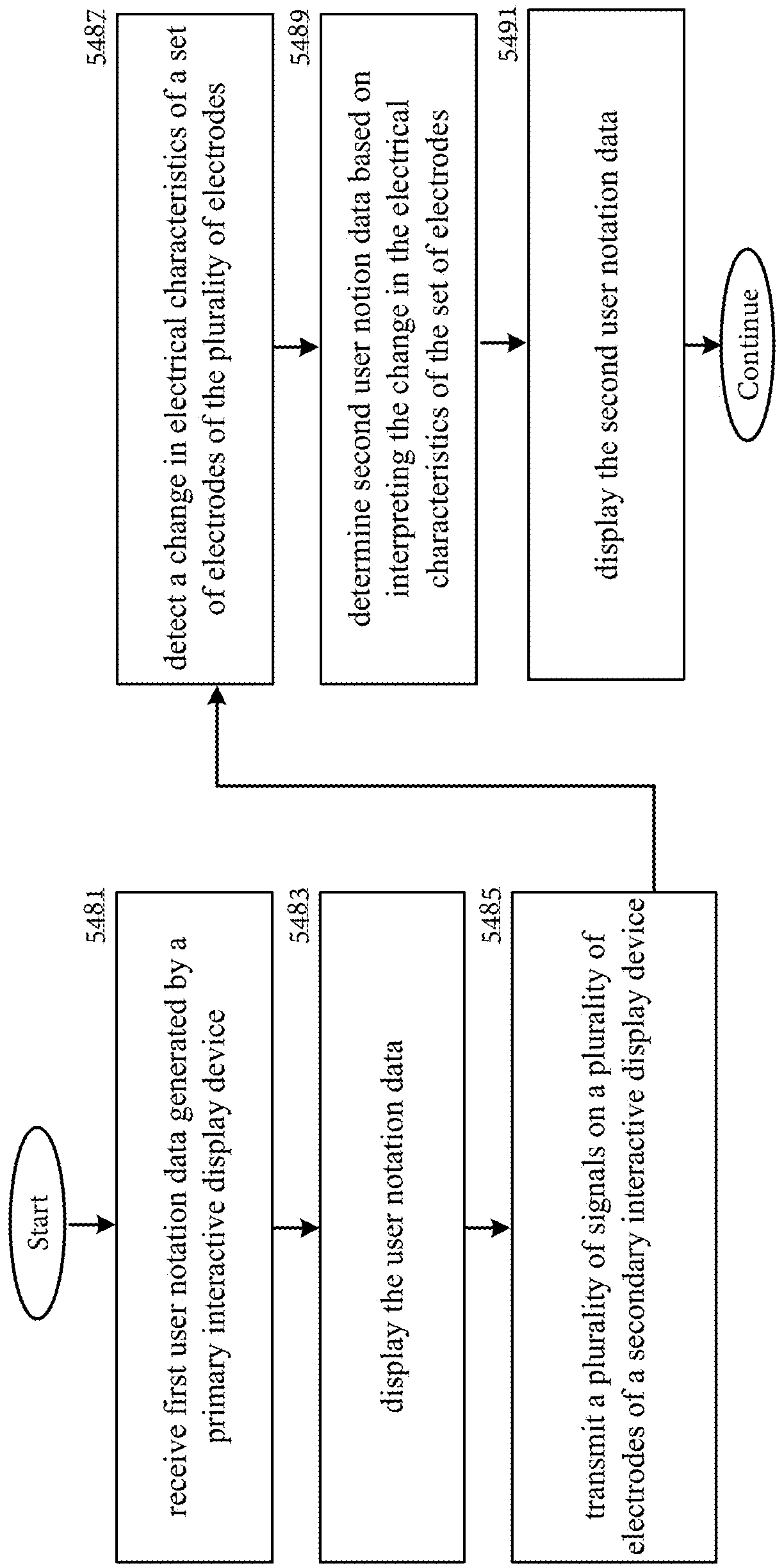
FIG. 54Q is a logic diagram of an example of a method in accordance with the present disclosure.

FIG. 54Q illustrates a flow diagram of an embodiment of a method in accordance with the present disclosure. In particular, a method is presented for execution by and/or use in conjunction with an interactive display device 10 such as a secondary interactive display device 10.B of FIGS. 54A-54O, interactive tabletop 5505, interactive computing device, processing module 42, and/or other processing resources and/or display devices described herein. Some or all steps of FIG. 54Q can be performed in conjunction with performance of FIG. 54P and/or some or all steps of one or more other methods described herein.

Step 5481 includes receiving first user notation data generated by a primary interactive display device. For example, the first user notation data is received during a temporal period as a first stream of user notation data the first user notation data can be received via a network interface of a secondary interactive display device. Step 5483 includes displaying the first user notation data. For example, the first user notation data is displayed via a display of the secondary interactive display device. The first user notation data can be displayed as a corresponding first stream of user notation data during the temporal period. Step 5485 includes transmitting a plurality of signals on a plurality of electrodes of the first interactive display device, for example, via a plurality of DSCs of the secondary interactive display device during some or all of the temporal period. Step 5487 includes detecting a change in electrical characteristics of a set of electrodes of the plurality of electrodes during some or all of the temporal period, for example, by a set of DSCs of the plurality of DSCs. Step 5489 includes determining second user notion data based on interpreting the change in the electrical characteristics of the set of electrodes, for example, during some or all of the temporal period. Step 5489 can be performed by at least one processing module of the secondary interactive display device. Step 5491 includes displaying the second stream of user notation data, for example, via a display of the secondary interactive display device during some or all of the temporal period. In various embodiments, the method further includes transmitting the second stream of user notation data to the primary interactive display device for display via the primary interactive display device.

In various embodiments, the method further includes determining a user identifier for a user causing the at least one change in electrical characteristics based on the user being in proximity to the secondary interactive display device. The method can further include transmitting, via the network interface, the user identifier for display via the primary interactive display device. For example, the user identifier is indicated in user identifier data of FIGS. 55A-55G.

In various embodiments, the user identifier is determined based on detecting, via at least some of the set of drive sense circuits of the plurality of drive sense circuits, another signal having a frequency indicating the user identifier, where the signal is generated based on the user being in proximity to the secondary interactive display device. For example, the signal is generated by a chair in proximity to the secondary interactive display device based on detecting the user being seated in the chair. As another example, the signal is generated by a computing device in proximity to the secondary interactive display device based on being owned by, held by, worn by, in proximity to, and/or otherwise or associated with the user. The frequency can be mapped to the user identifier in user profile data and/or can otherwise be associated with the user, for example, to uniquely identify the user from other users. The signal can alternatively indicate the user identifier based on the user identifier being modulated upon the signal or the signal otherwise indicating the user identifier. The signal can be generated and detected as discussed in conjunction with FIGS. 45-48 and/or FIGS. 55A-55G.

In various embodiments, the first stream of user notation data is displayed during the temporal period based on based on the user being in proximity to the secondary interactive display device and/or based on the secondary interactive display device otherwise detecting the presence of the user, for example, as discussed in conjunction with FIGS. 45-48 and/or FIGS. 55A-55G.

In various embodiments, a secondary interactive display device 10.B includes a display configured to render frames of data into visible images. The secondary interactive display device can further include a plurality of electrodes integrated into the display to facilitate touch sense functionality based on electrode signals having a drive signal component and a receive signal component. The plurality of electrodes can include a plurality of row electrodes and a plurality of column electrodes. The plurality of row electrodes can be separated from the plurality of column electrodes by a dielectric material. The plurality of row electrodes and the plurality of row electrodes can form a plurality of cross points.

In various embodiments, the secondary interactive display device 10.B further includes a plurality of drive-sense circuits coupled to at least some of the plurality of electrodes to generate a plurality of sensed signals. Each the plurality of drive-sense circuits can include a first conversion circuit and a second conversion circuit. When a drive-sense circuit of the plurality of drive-sense circuits is enabled to monitor a corresponding electrode of the plurality of electrodes, the first conversion circuit can be configured to convert the receive signal component into a sensed signal of the plurality of sensed signals and/or the second conversion circuit can be configured to generate the drive signal component from the sensed signal of the plurality of sensed signals.

In various embodiments, the secondary interactive display device 10.B further includes processing module that includes at least one memory that stores operational instructions and at least one processing circuit that executes the operational instructions to perform operations that include receiving the plurality of sensed signals during a temporal period, wherein the sensed signals indicate changes in electrical characteristics of the plurality of electrodes. The processing module can further determine a stream of user notion data for display by the display based on interpreting the changes in the electrical characteristics during the temporal period. The display can display this stream of user notation data during the temporal period.

In various embodiments, the secondary interactive display device 10.B further includes a network interface operable to transmit the stream of user notation data to a primary interactive display device for display and/or to a plurality of secondary interactive display devices for display.

In various embodiments, the secondary interactive display device is implemented as a student interactive desktop having a tabletop surface and a plurality of legs. The display of the secondary interactive display device can be integrated within the tabletop surface of the student interactive desktop, where the tabletop surface of the student interactive desktop is configured to be parallel to a floor, supported by the legs of the student interactive desktop upon the floor. The display of secondary interactive display device can also be parallel to the floor, or can be at an angle offset from a plane parallel to the floor that is substantially small, such as less than 25 degrees with from the plane parallel to the floor. The sensed signals can indicate the changes in electrical characteristics associated with the plurality of cross points based on user interaction with the secondary interactive display device while sitting in a chair or other seat in proximity to the primary interactive display device. In various embodiments, the primary interactive display device has a corresponding display upon a surface in a different orientation that is not parallel to the floor and/or is not parallel to the display of the secondary interactive display device.

FIGS. 55A-55G illustrate embodiments of secondary interactive display devices 10.B that facilitate logging of attendance data for a given session, such as a session in which user notation data is displayed and transmitted by interactive display devices as discussed in conjunction with FIGS. 54A-54Q, for example, based on each detecting whether or a person is seated at the given secondary interactive display device and/or by identifying the student sitting at the given secondary interactive display device. Some or all features and/or functionality of the interactive display devices 10 of FIGS. 55A-55G can implement the primary interactive display device 10.A and/or secondary interactive display devices 10.B of FIG. 54A and/or any other interactive display devices 10 described herein. Some or all detection and/or identification of users in proximity to an interactive display device can be performed via some or all features and/or functionality discussed in conjunction with FIGS. 45-48.

Figure 55A:
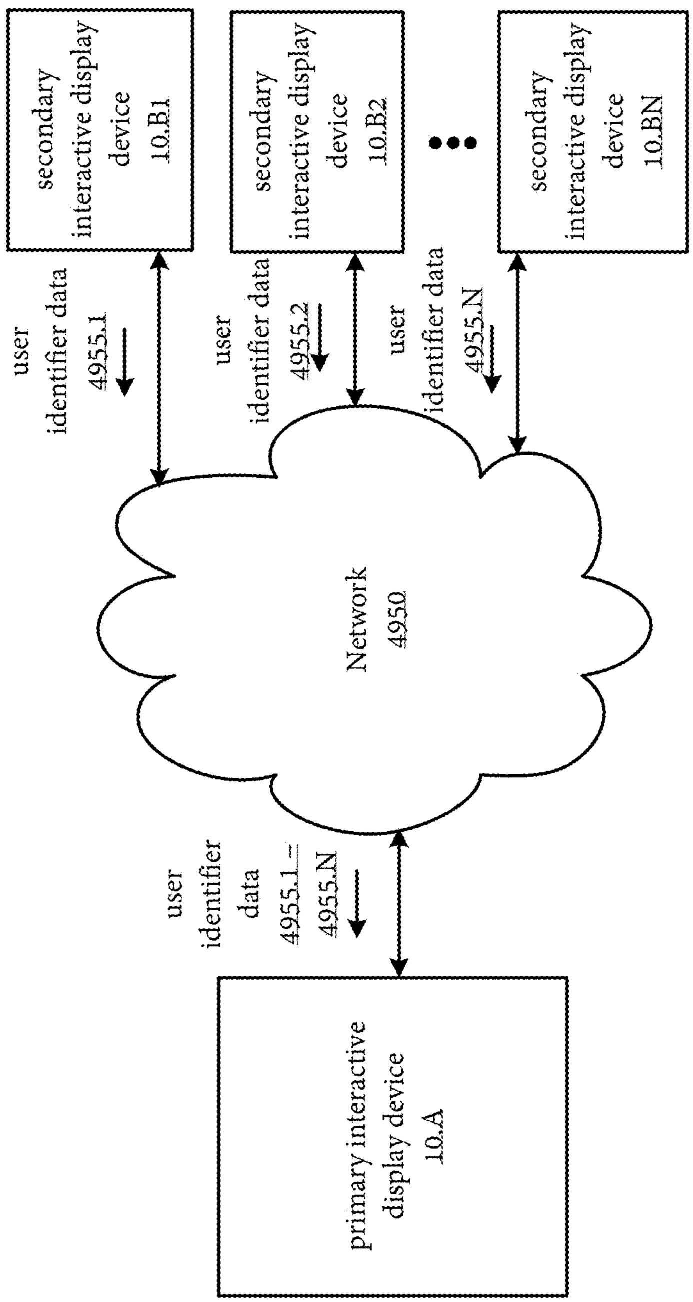
FIGS. 55A and 55B are schematic block diagrams illustrating communication of user identifier data between secondary interactive display devices and a primary interactive display device in accordance with the present disclosure.

As illustrated in FIG. 55A, some or all secondary interactive display devices can generate and transmit user identifier data 4955 identifying a particular user at the secondary interactive display device based on detection and/or identification of this user being in proximity to the secondary interactive display device during a given session, such as a given class, seminar, meeting, and/or presentation.

A primary interactive display device can receive the user identifier data 4955.1-4955.N from the set of secondary interactive display devices for processing, for download to computing device 4942.A communicating with the primary interactive display device, and/or for display to the primary user via its display. For example, the primary interactive display device displays a graphical layout of desks in the room, and highlights which desks are populated by users and/or presents a name of a user next to a graphical depiction of the corresponding desk. As another example, a list of users that are present and/or absent from the session are displayed. Alternatively the user identifier data 4955.1-4955.N is transmitted by secondary interactive display devices to a server system and/or database, for example, corresponding to the corresponding class, seminar, meeting, and/or corresponding institution, and/or for access by the primary user and/or another administrator.

The user identifier data 4955 can be generated and transmitted in conjunction with timestamp data and/or timing data, such as when the user was detected to first be in proximity and last be in proximity, for example, to identify which users were late to class and/or whether users left early. The user identifier data 4955 can be generated and transmitted in conjunction with user engagement data, for example, as discussed in conjunction with FIGS. 60A-60F.

In some cases, the user identifier data 4955 is further utilized by secondary interactive display devices themselves, for example, to function via functionality configured by the particular user, and/or the primary user, in user profile data accessed by the secondary interactive display device based on the determined user identifier for the user. Alternatively or in addition, the secondary interactive display device only functions when the user is identified as being registered for the corresponding class and/or seminar, for example, to ensure that only attendees that paid for participation in the class or session can participate. For example, the user notation data is only mirrored and/or downloadable by users via a given secondary interactive display device when the given user is identified as being one of a set of registered user for the corresponding session.

In some embodiments, a given secondary interactive display device simply detects presence of a user, for example, based on the corresponding seat detecting a person sitting in the seat via a pressure sensor or other sensor, and/or based on the secondary interactive display device generating capacitance image data detecting anatomical features of a user or other changes indicating a person is present. In some cases, each secondary interactive display device can have a corresponding user assigned for seating, for example, based on a seating chart for the class, where the user identifier data indicates an identifier for the corresponding seat.

In some embodiments, a given secondary interactive display device identifies a user based on user input to touch screen 12, for example, via one or more touch-based and/or touchless indications. For example, a user interacts with a graphical user interface to enter their name or user id, enter a password or credentials, have biometric features scanned, and/or otherwise be identified based on detecting and processing user input to touch screen 12. Users can be identified based on accessing user profile data for the user by the secondary interactive display device and/or the primary interactive display device.

Figure 55B:
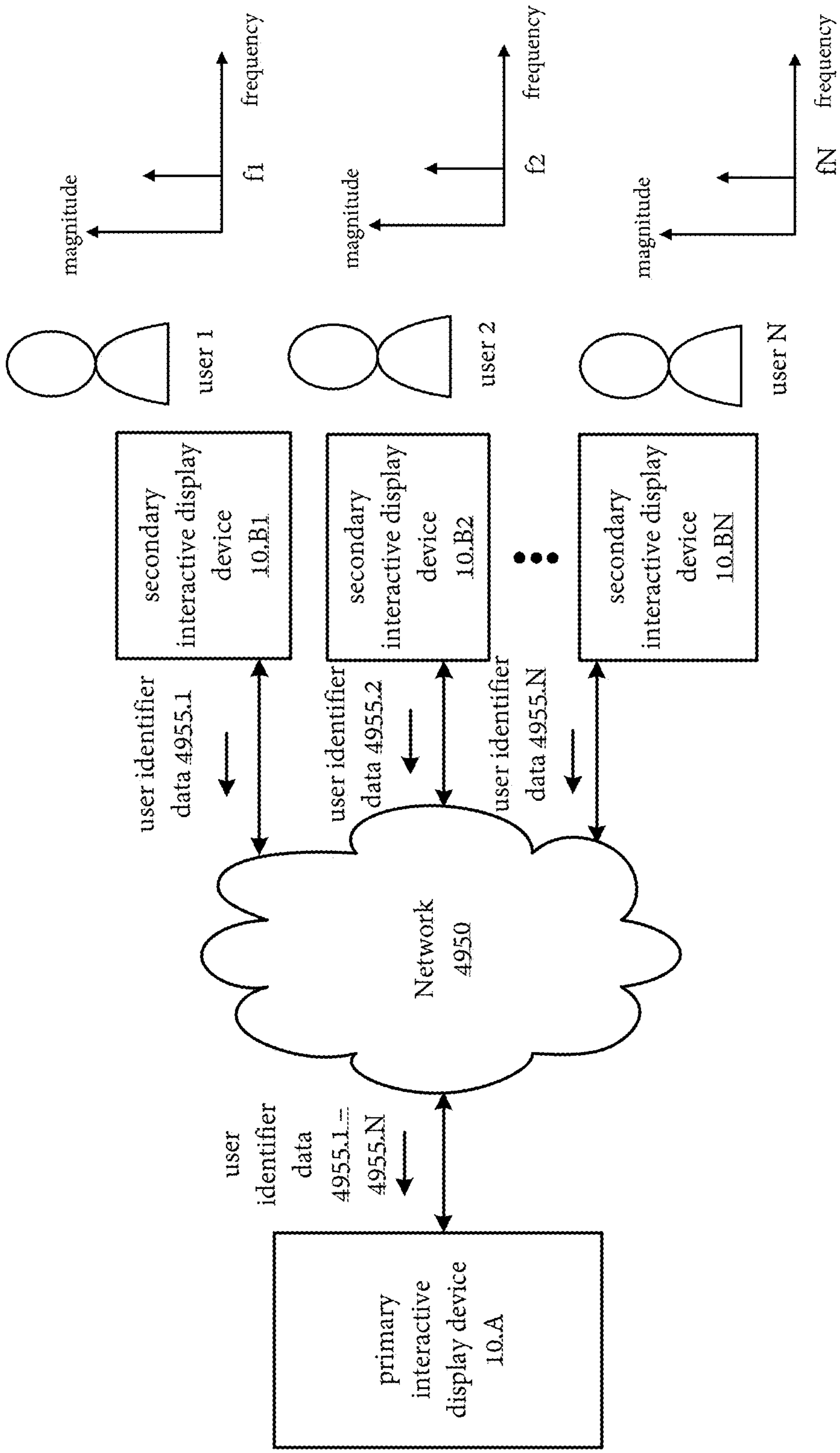
Figure 55C:
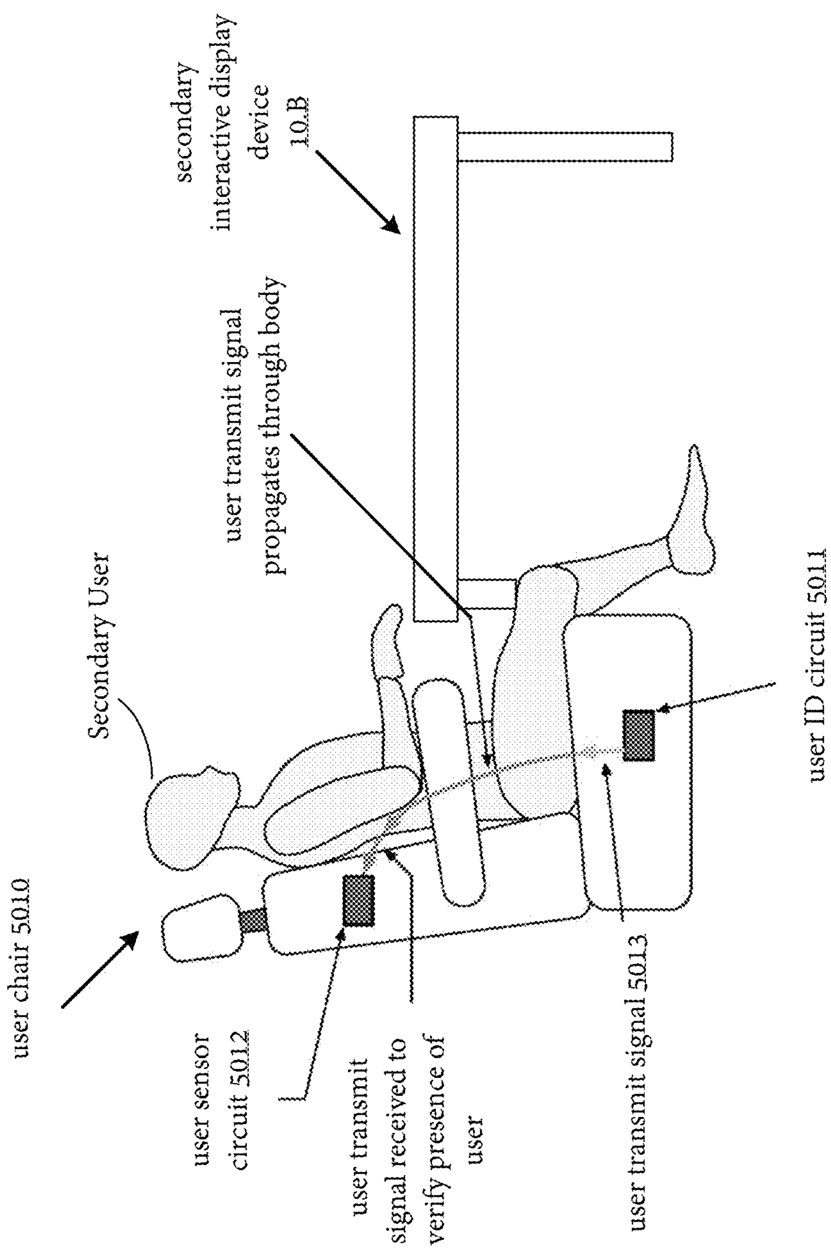
FIGS. 55C and 55D are pictorial diagram illustrating an example embodiment of a user chair in accordance with the present disclosure.
Figure 55D:
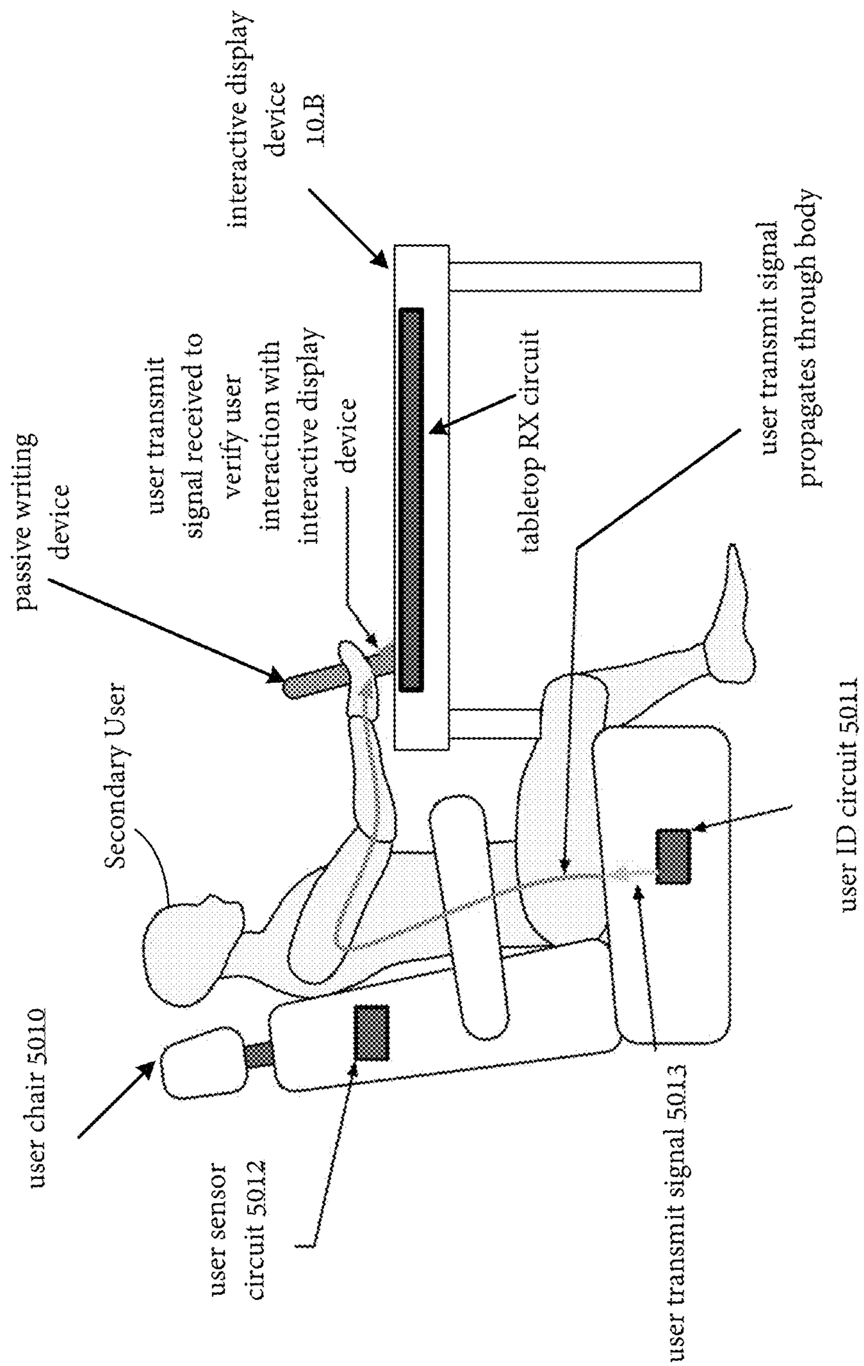
Figure 55E:
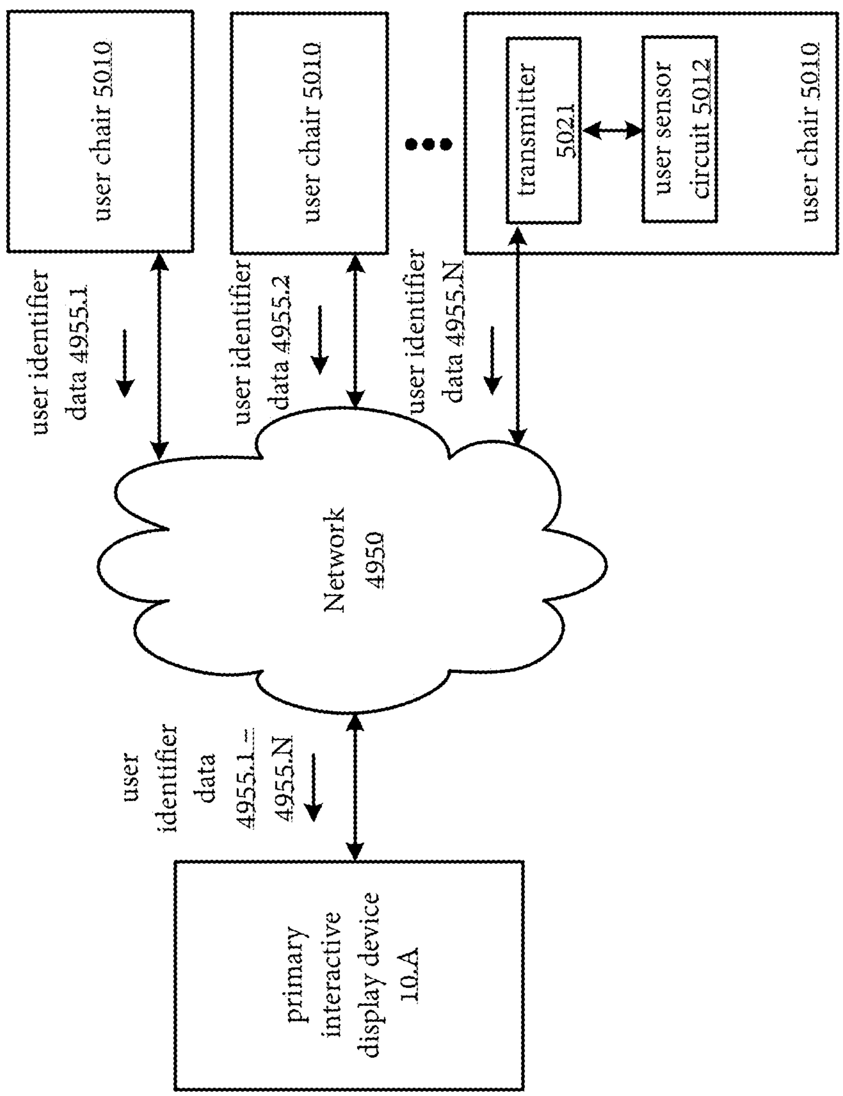
FIG. 55E is a schematic block diagrams illustrating communication of user identifier data between a plurality of user chairs and a primary interactive display device in accordance with the present disclosure.

As illustrated in FIG. 55B, each user 1-N can be associated with a corresponding frequency, for example, where each frequency f1-fN is unique to each given user to distinguish different users from each other, for example, via some or all features and/or functionality discussed in conjunction with FIGS. 45-48. A signal can be generated at the designated frequency that is detectable by a given secondary interactive display device 10.B, for example, via its DSCs, where the user identification data 4955 indicates the detected frequency and/or indicates the user based on accessing a mapping of frequencies to users, for example, in user profile data.

As a particular example, the signal is generated by a chair of the given secondary interactive display device 10.B in which a user is configured to sit at while interacting with the given secondary interactive display device 10.B. This signal can propagate through the user's body for detection by touch screen 12.

The seat can determine the frequency based on communicating with and/or receiving a communications identifying the user from a computing device 4942 associated with the user, such as an ID card, wristband, wearable device, phone, tablet, laptop, other portable computing device 4942 carried by and/or in proximity to the user while attending the session at the given seat, and/or other user device. The seat can optionally determine the frequency based on the corresponding interactive display device 10 identifying the user via a corresponding user device, corresponding passive device, or other corresponding means of identifying the user as described previously. Alternatively, the frequency is unique to and/or fixed for the corresponding seat rather than being based on a corresponding user sitting in the seat.

An example embodiment of such a chair is illustrated as user chair 5010 of FIGS. 55C and 55D, that is associated with a corresponding secondary interactive display device 10.B. As illustrated in FIG. 55C, a user transmit signal 5013 integrated within the user chair 5010 can be transmitted by a user ID circuit 5011. A user sensor circuit 5012 can be integrated within the user chair 5010 to receive the user transmit signal 5013 propagated through the user's body while seated in the user chair 5010. For example, the user sensor circuit 5012 thus only receives the user transmit signal 5013 when a secondary user's body is present and enables propagation of the user transmit signal for receipt by the user sensor circuit 5012.

As illustrated in FIG. 55D, a tabletop RX circuit integrated within the interactive display device can be implemented to receive and verify user interaction with the interactive display device via their hand and/or via a passive writing device, such as a passive pen or other passive user input device implemented for generation of user notation data. The tabletop RX circuit can similarly receive the user transmit signal 5013 propagated through the user's body while seated in the user chair 5010 based on the user's hand or arm touching and/or being in proximity to the tabletop while writing, and/or based on the passive writing device being conductive and enabling further propagation of the user transmit signal 5013 to the tabletop RX circuit. This verification can be further utilized to identify and distinguish the passive writing device from other non-interactive devices, such as notebooks or travel mugs of the user placed upon the table.

In such embodiments where user chairs 5010 are implemented to identify and/or detect users themselves, the user identifier data 4955 can be transmitted by a transmitter 5021 of a set of user chairs 5010, for example, based on receiving the user transmit signal via user sensor circuit 5012. For example, the user chairs 5010 transmit the user identifier data 4955 instead of or in addition to the secondary interactive display devices 10 as illustrated in FIG. 55A. Alternatively or in addition, the user chairs 5010 can send user identifier data 4955 or other data to the corresponding secondary interactive display devices 10, or vice versa.

As another example of generating user identifier data 4955, user identifiers can be received from computing devices 4942.B1-4942.BN communicating with secondary interactive display devices 10. For example, the signal at the distinguishing frequency is generated by a computing device 4942 of the user that is placed upon and/or that is in proximity to the secondary interactive display device 10.B for detection by the secondary interactive display device 10.B. Alternatively or in addition, the secondary interactive display device 10.B can otherwise pair to and/or receive communications from computing devices 4942, for example, via short range wireless communications and/or a wired connection with computing devices 4942 in the vicinity that are worn by, carried by, and/or in proximity to and associated with a corresponding user, where a given computing device 4942 sends identifying information and/or user credentials to the secondary interactive display device 10.B.

Figure 55F:
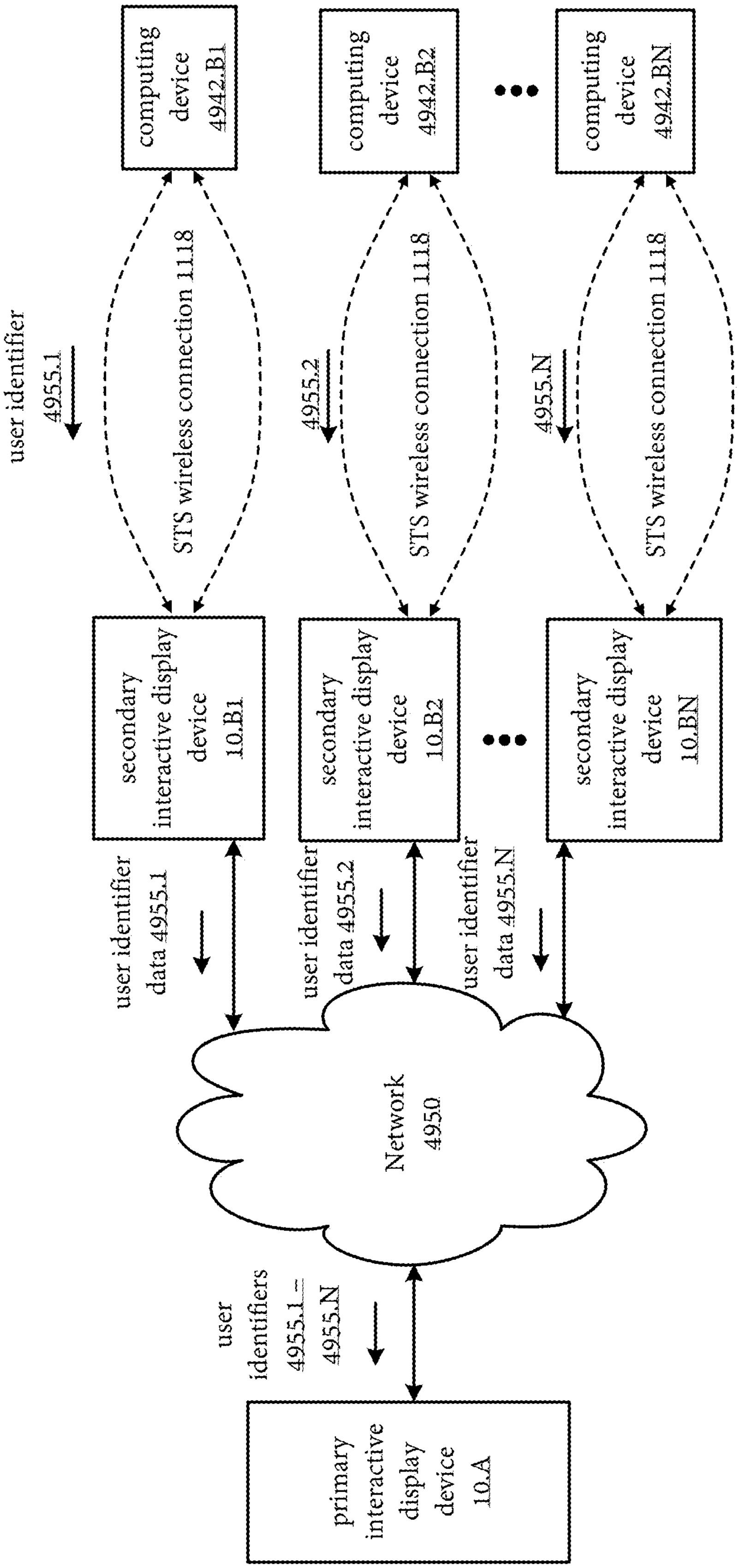
FIG. 55F is a schematic block diagrams illustrating communication of user identifier data between a plurality of secondary interactive display devices and a plurality of computing devices in accordance with the present disclosure.

In some embodiments, as illustrated in FIG. 55F, each secondary interactive display device 10.B can receive user identifier data 4955 based on STS wireless connections 1118 between a given secondary interactive display device 10.B and a given computing device 4942 that identifies the corresponding user. Some or all features and/or functionality of the STS wireless connections 1118 of FIG. 55F can be implemented via some or all features and/or functionality discussed in conjunction with FIGS. 62A-62BM.

Figure 55G:
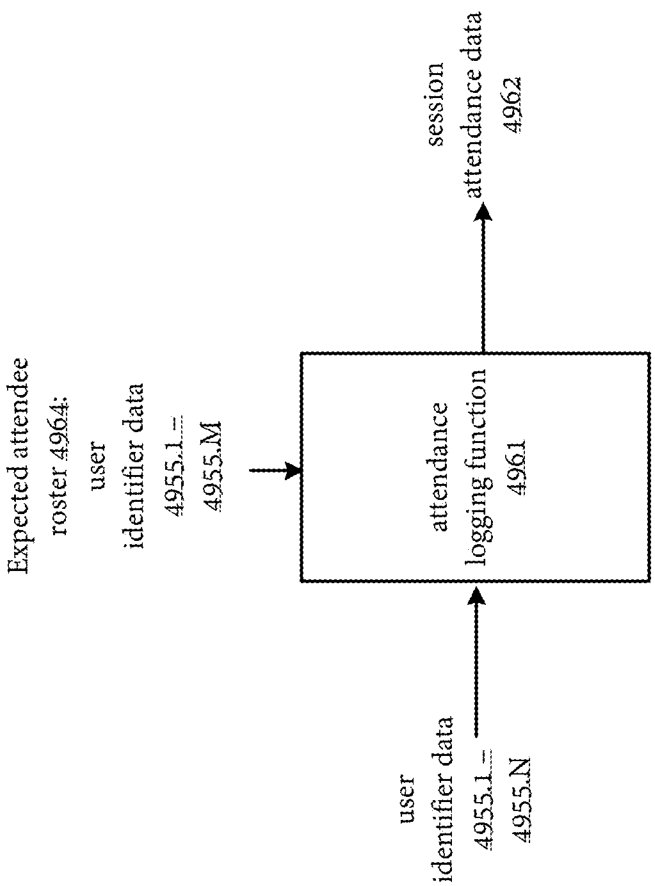
FIG. 55G is a schematic block diagrams illustrating an embodiment of an attendance logging function in accordance with the present disclosure.

FIG. 55G illustrates an example attendance logging function 4961 that can be performed by a processing module of the primary interactive display device 10.A and/or other processing module that receives the user identifier data 4955. A full expected attendee roster 4964 can indicate a full set of M user identifier data for M total users, for example, where M is greater than or equal to N. The expected attendee roster 4964 can be received from a server system, configured by an administrator and/or the primary user, and/or can be accessed in memory, such as memory modules 4944. The attendance logging function 4961 can be performed based on comparing the set of user identifier data 4955.1-4955.N for a given session to the expected attendee roster 4964 to generate session attendance data 4962 indicating which of the users in expected attendee roster 4964 were present and which were absent. The attendance logging function 4961 can further be performed to indicate in session attendance data 4962 whether, and/or identifiers of, any users of user identifier data 4955.1-4955.N are not expected users in expected attendee roster 4964. Alternatively, an expected attendee roster 4964 is not utilized, and the session attendance data 4962 simply indicates names, identifiers, or other information indicated in and/or mapped to user identifier data 4955, for example, in user profile data for users 1-N.

FIGS. 56A-56L illustrate embodiments where various user notation data generated during a session can be stored and/or downloaded for future reference by primary and/or secondary users, for example, based on being downloaded to at least one memory module 4944. Some or all memory modules 4944 of FIGS. 56A-56L can be implemented via the memory modules 4944 of FIGS. 54G-54L, via a server system, via local memory of computing devices 4942.B associated with one or more secondary users, and/or via other memory devices. Some or all features and/or functionality of the interactive display devices 10 of FIGS. 56A-56L can implement the primary interactive display device 10.A and/or secondary interactive display devices 10.B of FIG. 54A and/or any other interactive display devices 10 described herein.

Figure 56A:
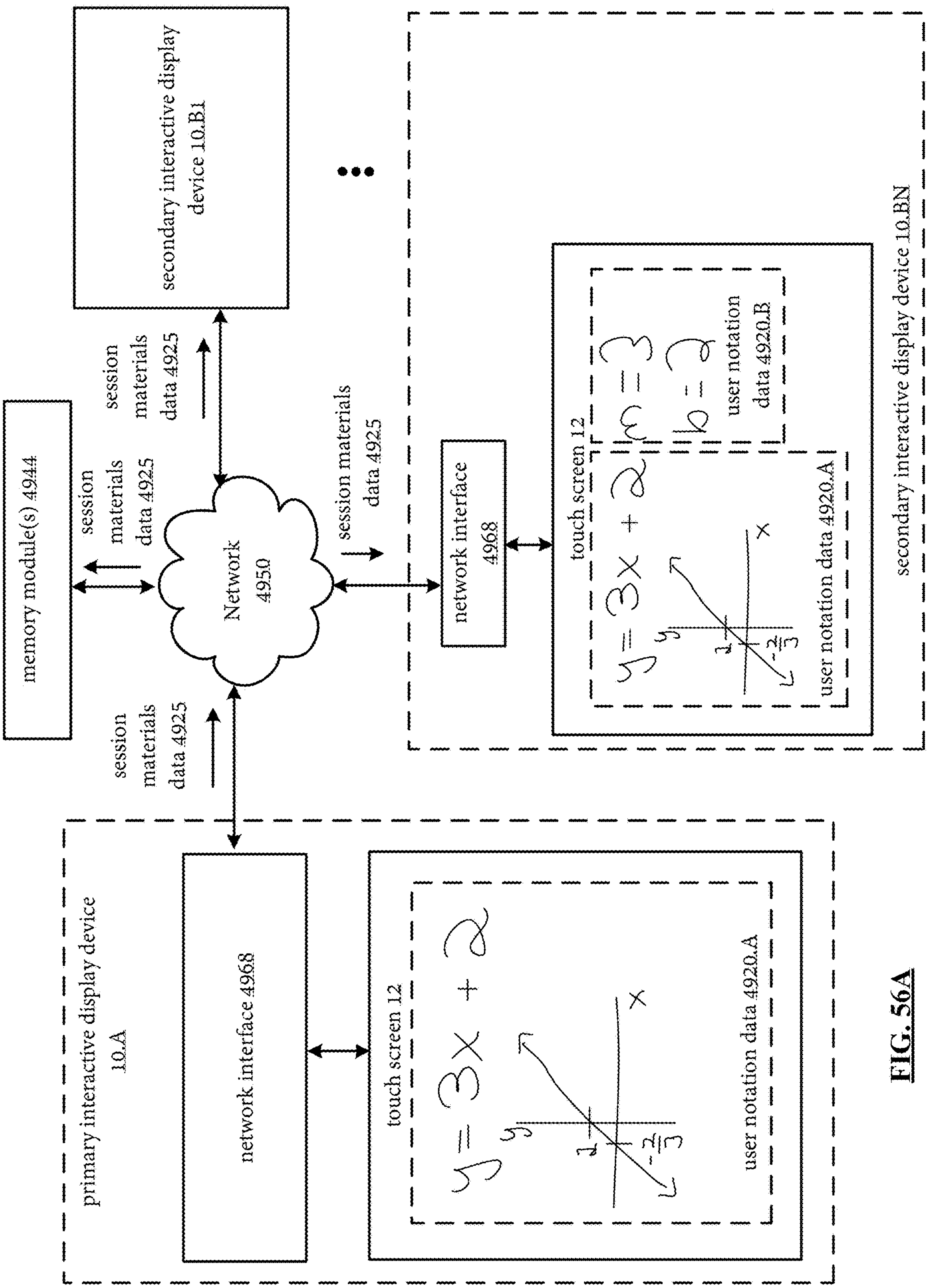
FIGS. 56A and 56B are schematic block diagrams illustrating communication of session materials data between a primary interactive display device and one or more memory modules in accordance with the present disclosure.

As illustrated in FIG. 56A, session materials data 4925 generated by a primary interactive display device 10.A can be sent to one or more memory modules 4944 for storage alternatively or in addition to being sent to secondary interactive display devices 10.B for display as discussed in conjunction with FIGS. 54A-54Q. For example, the session materials data 4925 of FIG. 54F is sent to at least one memory modules storage by interactive display device 10.A in addition to being mirrored to secondary interactive display devices 10B1-10.BN. Session materials data 4925 generated by a primary interactive display device 10.A can be sent to one or more memory modules 4944 via the network 4950 and/or via other communication with the one or more memory modules 4944, for example, as discussed in conjunction with FIGS. 54G-54I.

The stored session materials data 4925 can include user notation data 4920.A generated based on user input to the touch screen of the primary interactive display device 10.A, other user notation data 4920.B generated by and received from one or more other interactive display devices 10.B, graphical image data 4922 uploaded to and displayed by the primary interactive display device 10.A, and/or any other materials displayed by the primary interactive display device 10.A and/or sent to secondary interactive display devices 10.B by the primary interactive display device 10.A.

The session materials data 4925 can be sent to memory modules 4944 for storage as a stream of user notation data and/or other types of session materials data, for example, in a same or similar fashion as the stream of user notation data or other session materials data sent to secondary interactive display devices. In some embodiments, some or all of the full stream of session materials data 4925 is stored. For example, where a user can download the session materials data 4925 from the memory modules 4944 to "replay" the class as a video file, presentation with multiple slides, or other means with multiple captured frames, for example, to see the progression of user notation data being written over the course of the session.

In other embodiments, only the most recent session materials data 4925 is stored, for example, to overwrite or replace prior session materials data 4925 as the session materials data 4925 is updated with additional user notations as the primary user continues to write. In such embodiments, a user can download the session materials data 4925 from the memory modules 4944 to a computing device for display, for example, as a static image file or other document file displaying the final session materials data 4925, and/or multiple static files for multiple sessions materials data during the session, for example, where the primary user erased or cleared the displayed materials to write and/or present new materials multiple times, and where each final version of the session materials data 4925 prior to being cleared is available for viewing, for example, as multiple files and/or multiple pages and/or slides of a same file.

In some embodiments, alternatively to session materials data 4925 being sent to memory modules 4944 for storage as a stream, session materials data 4925 is only sent for storage at one re more discrete points, such as when the corresponding class period, meeting or other session is completed, when the primary user elects to clear and/or erase this given displayed session materials data 4925 to write and/or present new material, in response to user input to touch screen 12, for example, as a touch-based or touchless gesture and/or selection of one or more displayed options as a touch-based or touchless indication, or based on another determination, for example, determined by at least one processing module of the primary interactive display device 10.A. In some cases, multiple captured frames and/or an entire stream is captured via local processing and/or memory resources of the primary interactive display device 10.A, and is only sent to separate memory modules 4944 for storage via the network 4950 based on detecting one or more of these determined conditions and/or based on another determination.

Figure 56B:
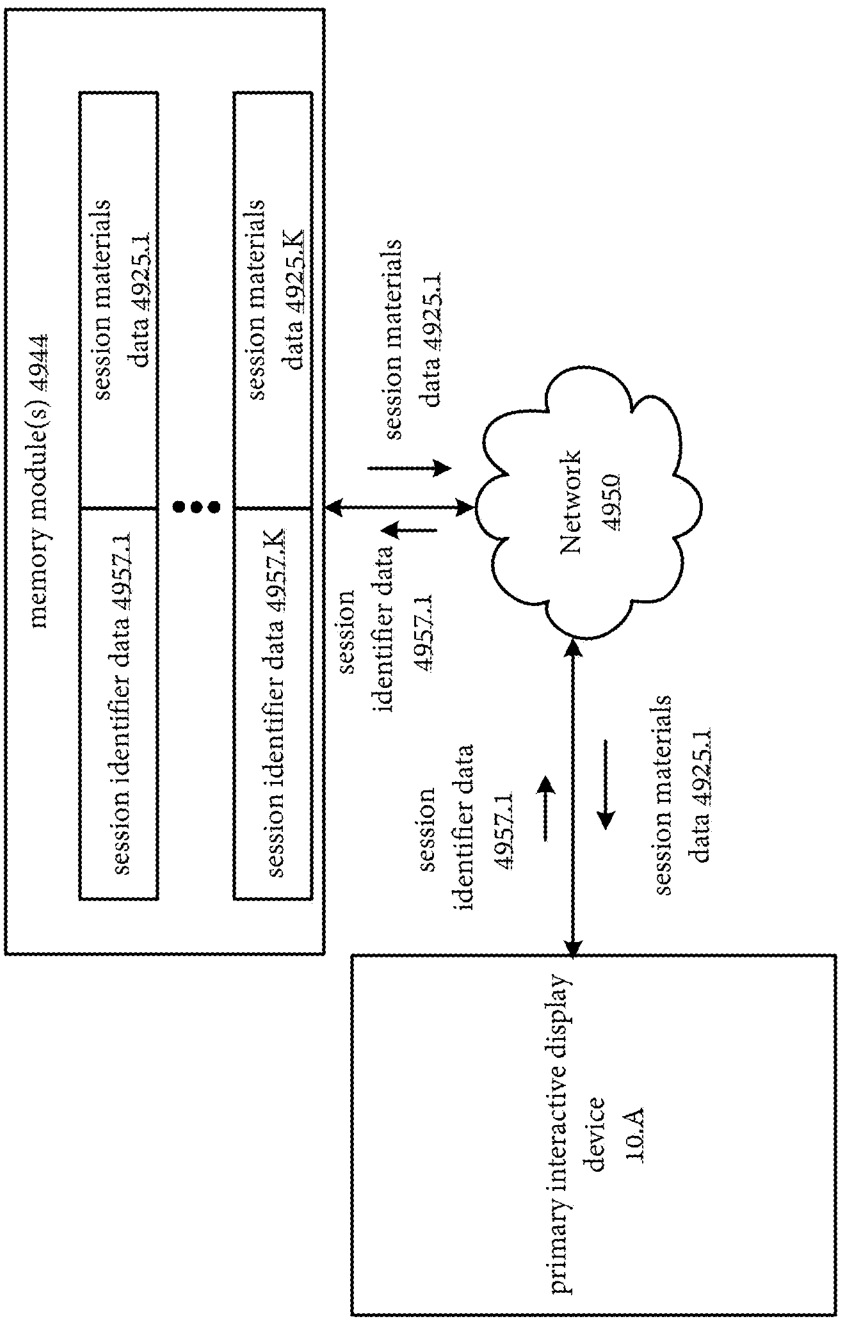

As illustrated in FIG. 56B, the session materials data 4925 can be stored in memory module 4944 in conjunction with session identifier data 4957. The session identifier data 4957 can indicate the corresponding course name and/or number, an identifier of the primary user, the corresponding academic institution and/or business, a meeting identifier, a time and/or date of the session, and/or can otherwise distinguish the session from session materials data 4925 of other sessions stored in memory modules 4944. As illustrated in FIG. 56B, the primary user accesses given session materials data 4925.1 via the same or different primary interactive display device 10.A, for example, at a time after the corresponding session is completed and after the session materials data 4925.1 for the session was stored, based on supplying the session identifier data 4957.1 for the corresponding session. This can be useful in cases where a presenter and/or teacher wishes to utilize prior user notation data 4920 or other data from a prior session in a new session, for example, rather than re-notating the materials via "writing" upon the primary interactive display device 10. The session identifier data 4957.1 can be entered via user input to the primary interactive display device 10.A and/or can be automatically generated based on detecting and identifying the corresponding primary user via primary interactive display device 10.A, for example, via one or more means discussed in conjunction with FIGS. 45-48 and/or FIGS. 55A-55G. The session identifier data 4957.1 can alternatively be downloaded to another computing device for display and/or storage based on the corresponding session identifier data 4957.

Figure 56C:
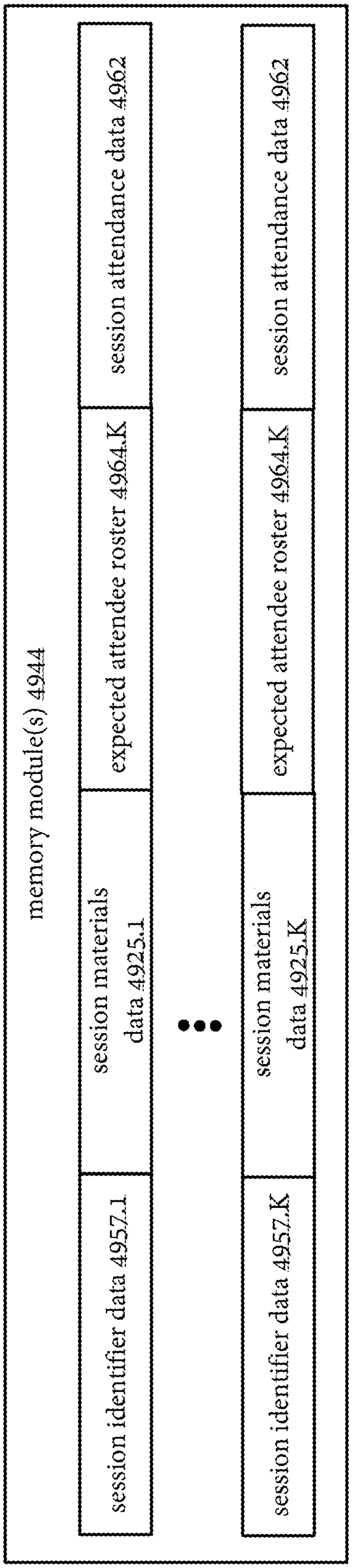
FIG. 56C is a schematic block diagram illustrating example data stored by one or more memory modules in accordance with the present disclosure.

FIG. 56C illustrates an example of various data that can be mapped to session materials data 4925 in one or more memory modules 4944, for example, via a relational and/or non-relational database structure or other organizational structure. Each session identifier data 4957 can further be mapped to an expected attendee roster 4964 and/or session attendance data 4962 determined for the corresponding session as discussed in conjunction with FIG. 55G. Any other information generated and/or determined by primary interactive display device 10.A and/or one or more secondary interactive display device 10.B relating to the session can similarly be transmitted to and stored by the one or more memory modules 4944 mapped to the session identifier data 4957 for later access by an interactive display device 10 and/or by a computing device.

Figure 56D:
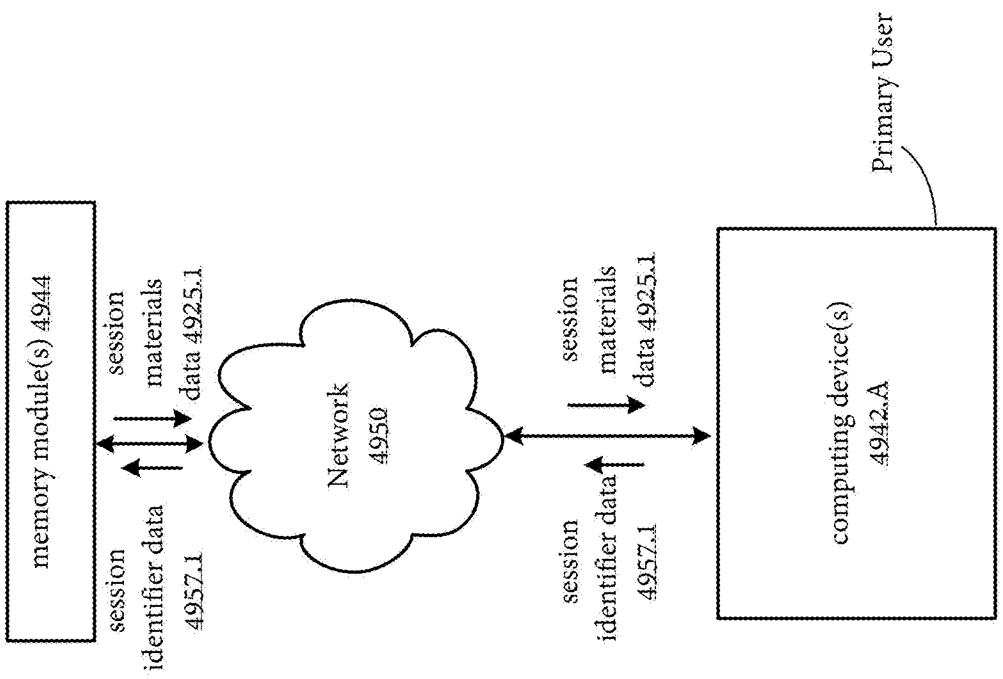
FIG. 56D is a schematic block diagrams illustrating communication between a primary interactive display device and one or more memory modules in accordance with the present disclosure.

As illustrated in FIG. 56D, any other one or more computing devices 4942.A, for example, associated with the primary user, can download session materials data and/or other corresponding data mapped to the given session identifier data based on sending or indicating other identification and/or credentials corresponding to the session identifier data. Alternatively other users, such as other teachers or administrators, can supply the session identifier data and corresponding credentials to access the session materials data via their own computing devices, for example, for use in preparing materials for their own courses.

Figure 56E:
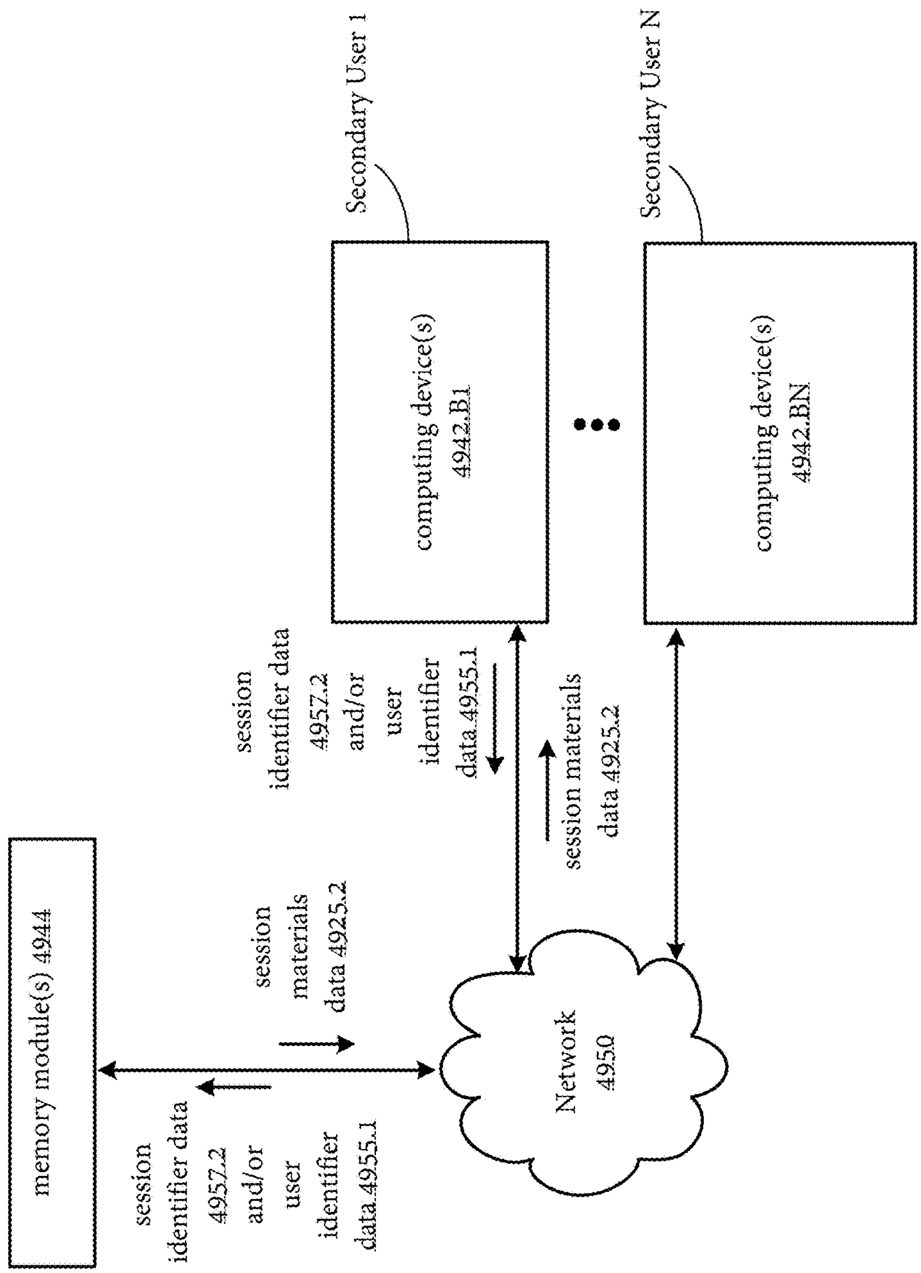
FIG. 56E is a schematic block diagrams illustrating communication between a secondary interactive display device and one or more memory modules in accordance with the present disclosure.

As illustrated in FIG. 56E, one or more additional computing devices 4942.B, for example, associated with secondary users, can download session materials data and/or other corresponding data mapped to the given session identifier data based on sending or indicating other identification and/or credentials corresponding to the session identifier data, and/or based on supplying their own user identifier data 4955. For example, the expected attendee roster 4964 and/or session attendance data 4962 for a given session materials identifier are accessed and utilized to restrict which users are allowed to access the corresponding session materials data 4925, where only users registered for the session and/or that were detected to have attended the session are allowed to download the session materials data 4925.

Figure 56F:
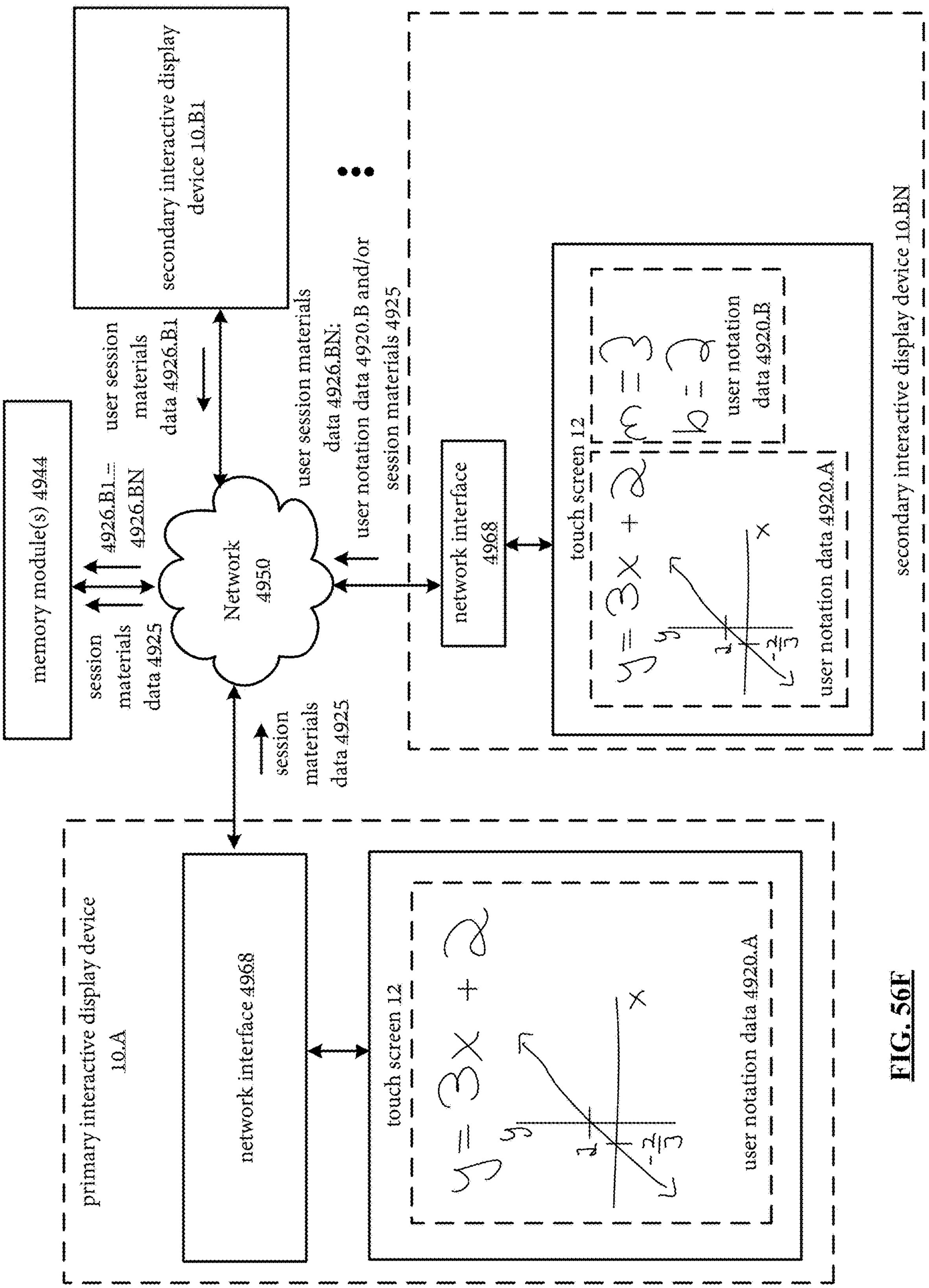
FIG. 56F-56G are schematic block diagrams illustrating communication between a primary interactive display device, one or more secondary interactive display devices, and one or more memory modules in accordance with the present disclosure.

FIG. 56F illustrates an embodiment where user session materials data 4926 is generated by some or all secondary interactive display devices 10.B, where this user session materials data 4926 is transmitted to memory modules 4944 for storage. The user session materials data 4926 can include user notation data 4920.B generated by the given secondary interactive display device, such as the user's own notes and/or answers to questions, and/or scan include one or all of the session materials data 4925 that was transmitted by and received from the primary interactive display device 10.A and/or one or more other secondary interactive display devices 10.B that mirror their own display and/or user notation data as discussed previously. The user session materials data 4926 can be generated, transmitted, and/or stored as a stream of user notation data 4920 and/or other data displayed by the corresponding display by the corresponding secondary interactive display device 10 in a same or similar fashion discussed in conjunction with the session materials data 4925.

Figure 56G:
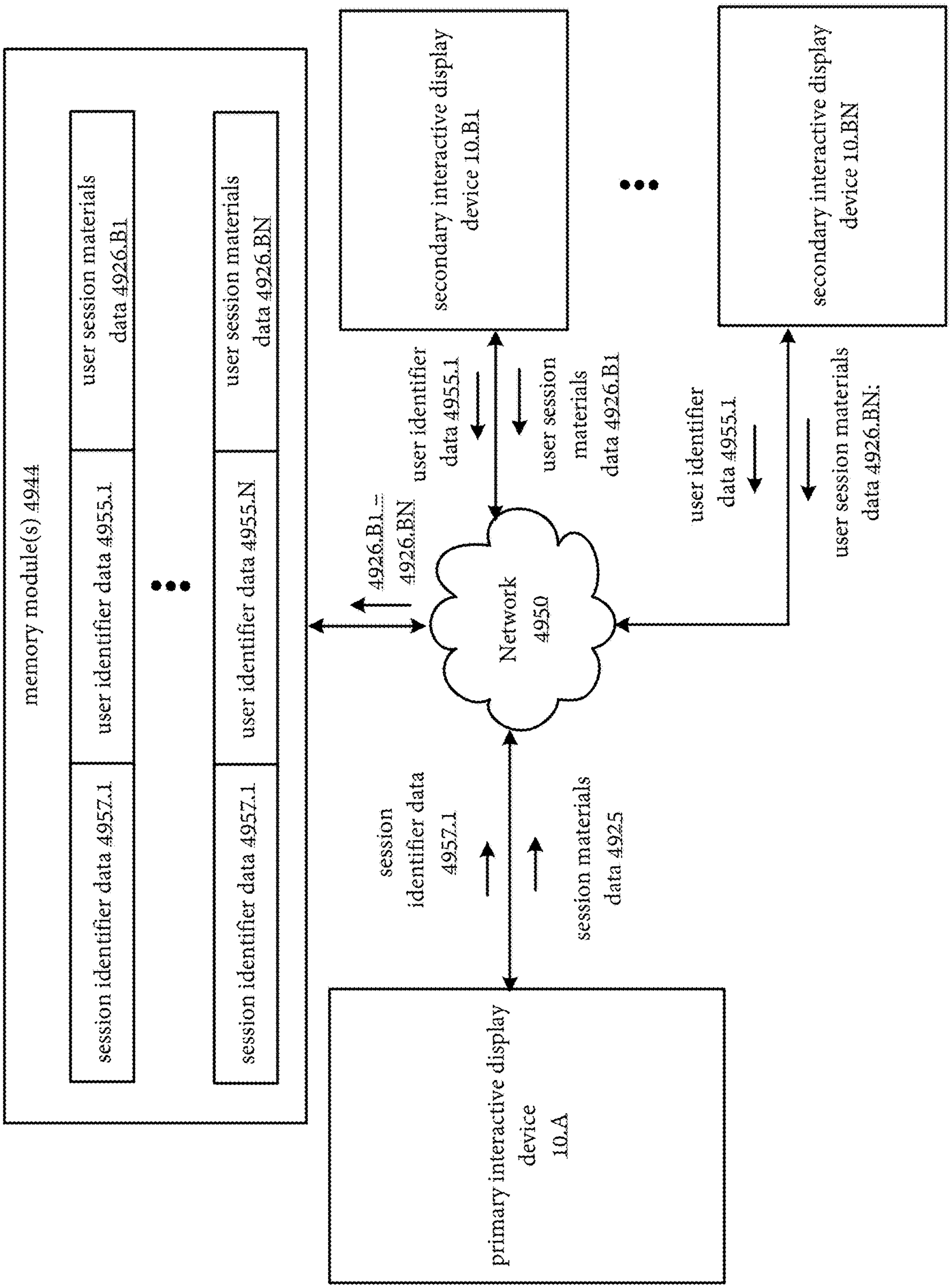
Figure 56H:
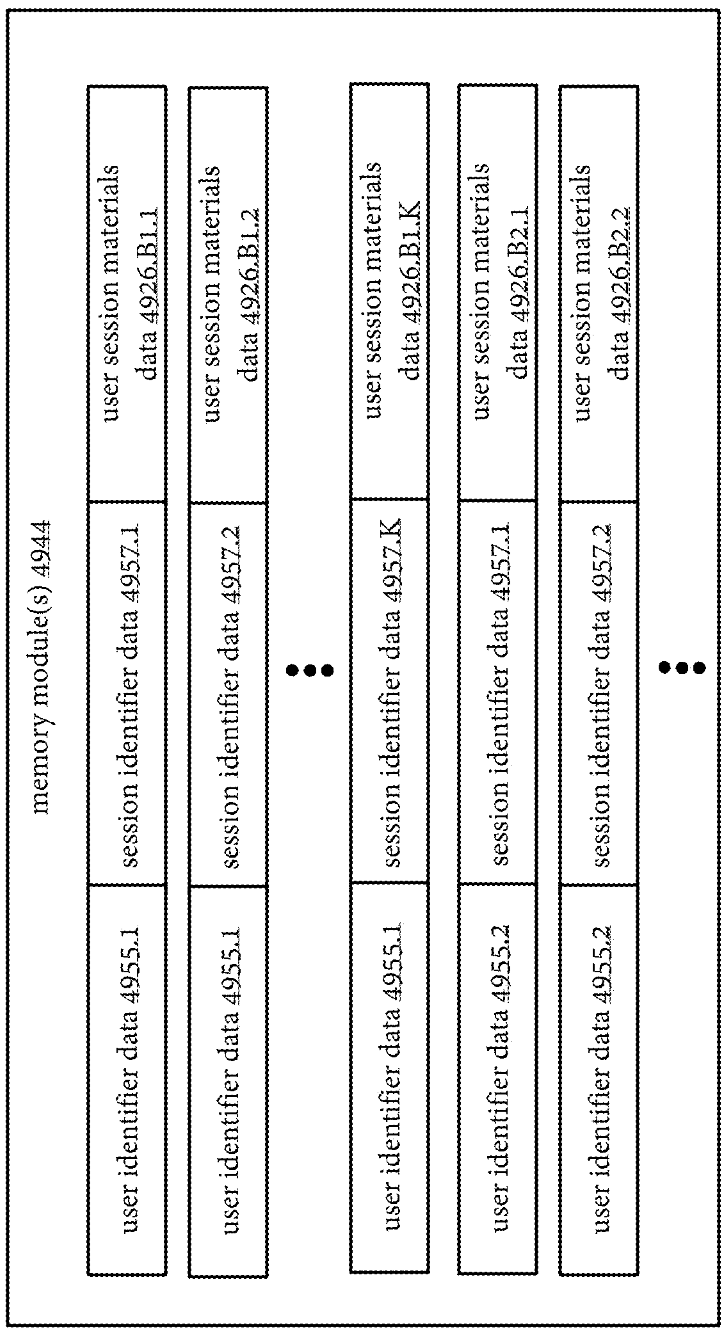
FIG. 56H is a schematic block diagram illustrating example data stored by one or more memory modules in accordance with the present disclosure.
Figure 56I:
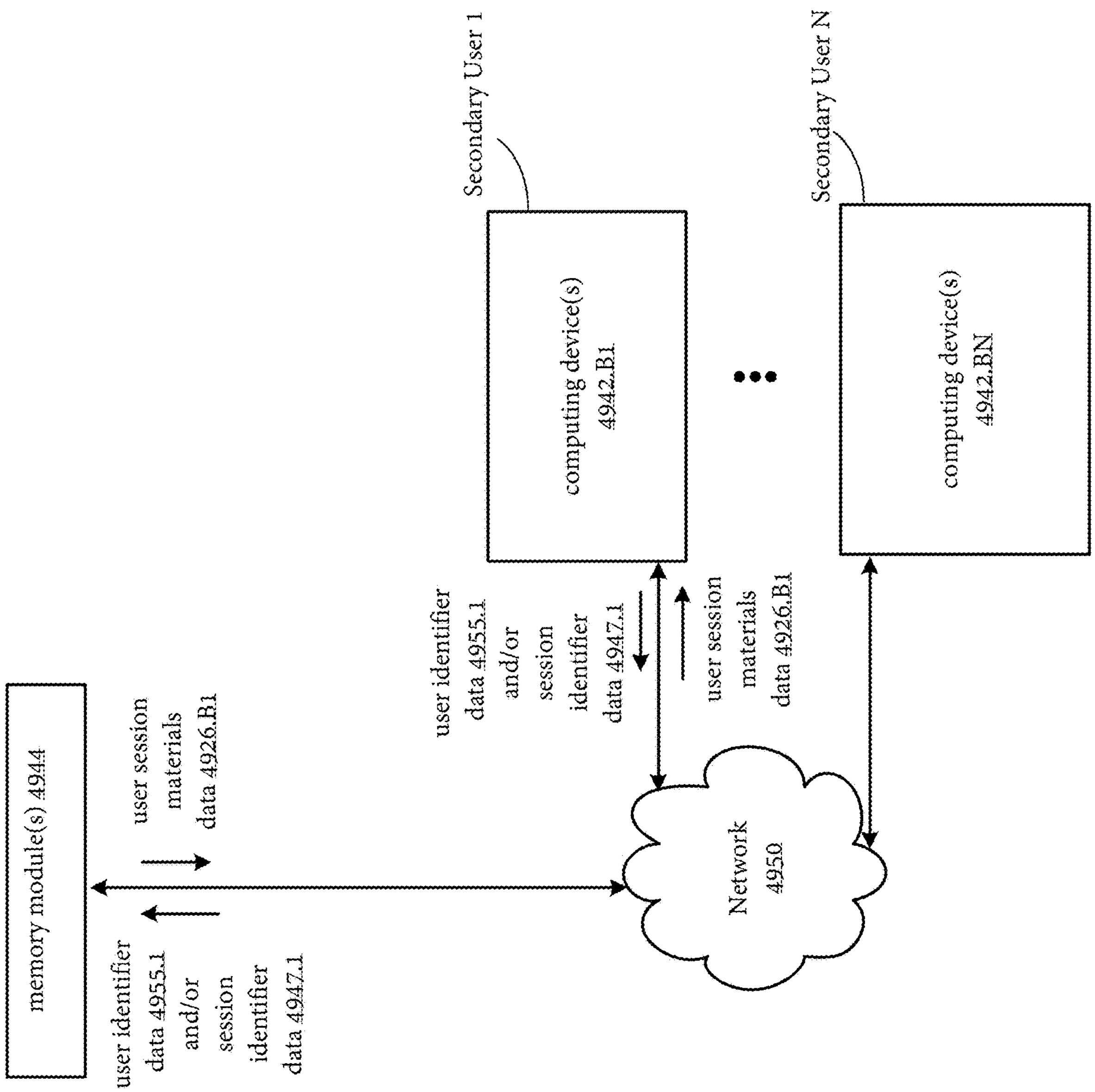
FIG. 56I is a schematic block diagrams illustrating communication between a secondary interactive display device and one or more memory modules in accordance with the present disclosure.
Figure 56J:
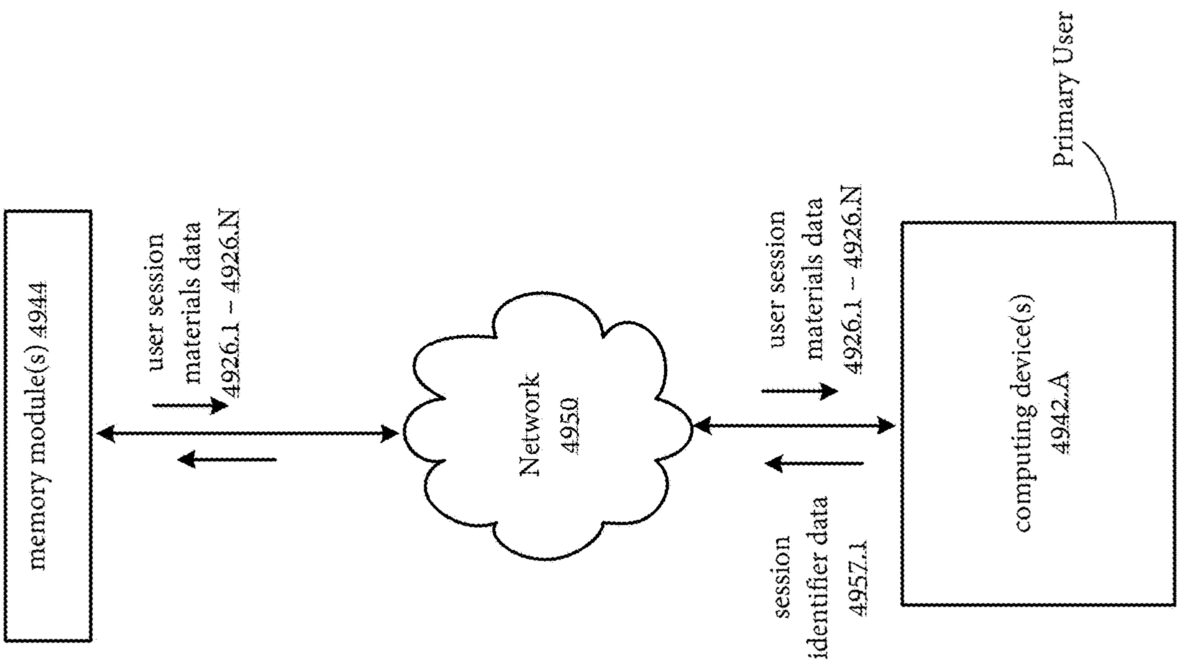
FIG. 56J is a schematic block diagrams illustrating communication between a primary interactive display device and one or more memory modules in accordance with the present disclosure.

As illustrated in FIG. 56G, for a given session, both session materials data 4925 generated by primary interactive display device 10.A and user session materials data 4926 generated by some or all secondary interactive display devices 10.B1-10.BN can be transmitted to the memory module 4944 for storage, for example, all mapped to the same session identifier data 4957 for the session in a database or other organizational structure. Each user session materials data 4926 can further be mapped to user identifier data 4955 that is determined by and sent to the memory module by secondary interactive display devices, for example, by one or more means discussed in conjunction with FIGS. 55A-55G.

As illustrated in FIG. 56G, the memory modules 4944 can thus store various user session materials data 4926 for multiple different users, and for multiple different sessions. For example, the memory modules 4944 store class notes and/or examination responses for some or all students of a given physics course across one or more different sessions of the physics course throughout a semester. As another example, the memory modules 4944 store class notes and/or examination responses for some or all students at a given university across one or more different sessions of one or more different courses, for example, where a given student's notes and/or examination answers for their English, physics, and computer science courses are all stored as user session materials data for the different courses.

Figure 56K:
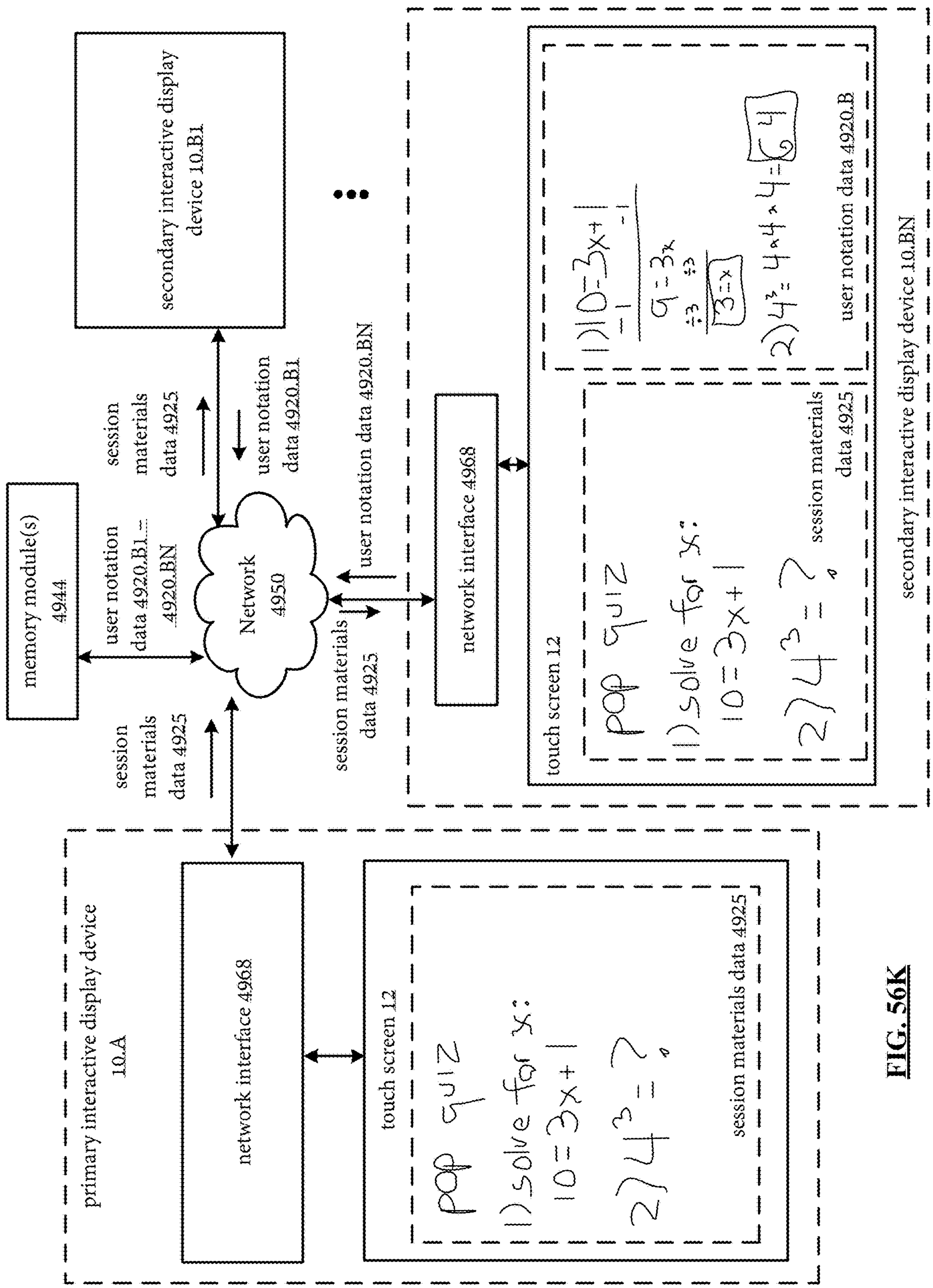
FIG. 56K is a schematic block diagram illustrating example communication between a primary interactive display device, one or more secondary interactive display devices, and one or more memory modules in accordance with the present disclosure.
Figure 56L:
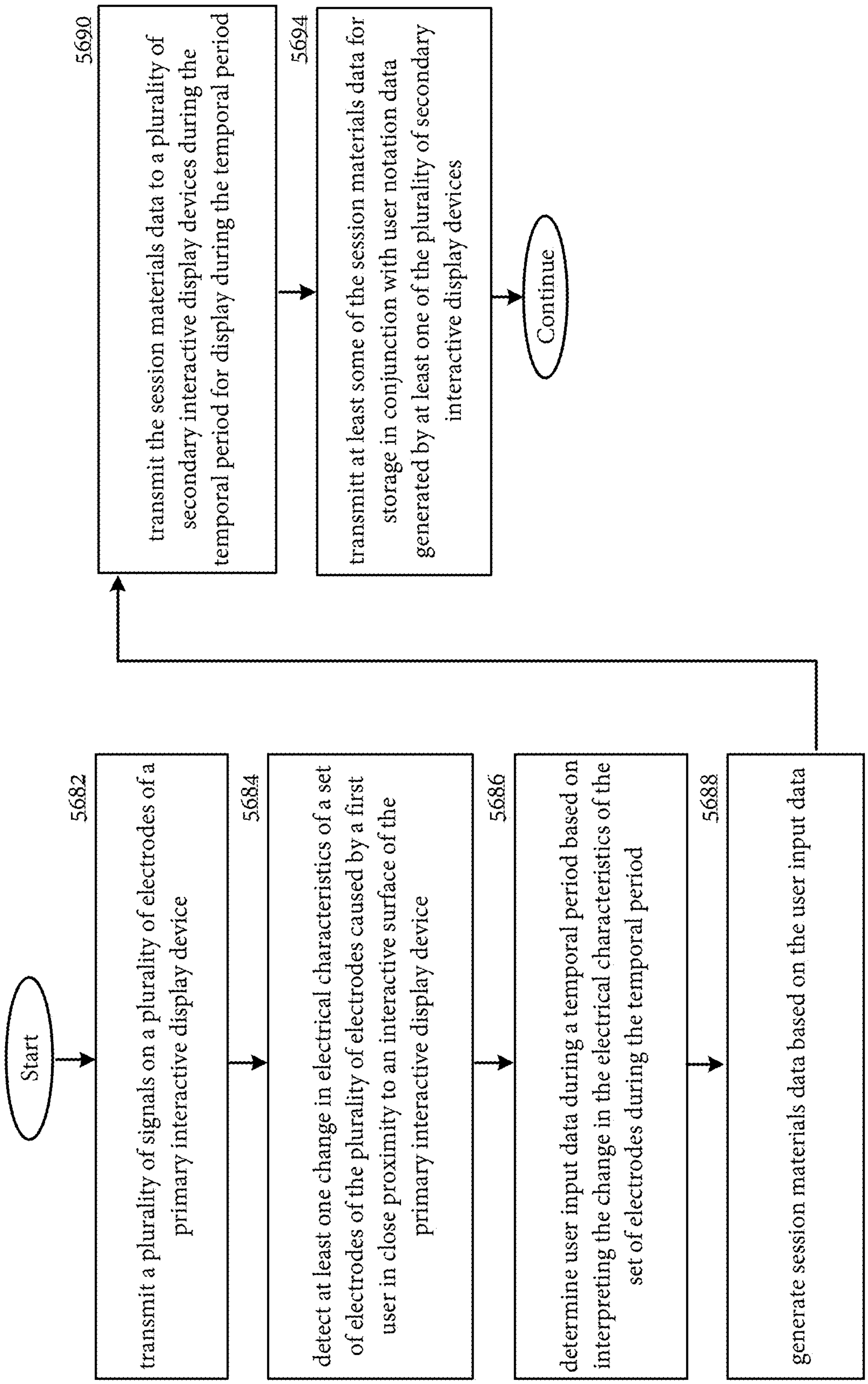
FIG. 56L is a logic diagram of an example of a method in accordance with the present disclosure.

As illustrated in FIG. 56L students can access their user session materials data 4926 for a given session based on supplying their user identifier data 4955, their session identifier data, and/or corresponding credentials. For example, students can download and review their own notes and/or answers taken during a given class via their own computing device to study for an examination, alternatively or in addition to downloading and reviewing the session materials data 4925 for the given class. The user session materials data 4926 and session materials data 4925 can optionally be bundled and/or overlaid in a same file, for example, in a similar fashion as the display of session materials data 4925 with a user's own user notation data 4920.B via their secondary interactive display device 4920 as discussed previously. In such embodiments, the user session materials data 4926 optionally only includes the user's own user notation data 4920.B for overlay and/or storage in conjunction with the session materials data 4925 that includes the user notation data 4920.A, graphical image data 4922, and/or other session materials data generated by and/or displayed by primary interactive display device 10.A during the course.

Alternatively or in addition to users downloading their own user session materials data 4926, the primary user or another administrator can download user session materials data 4926.1-4926.N for review via their own computing devices 4942.A For example, a teacher can collect user session materials data 4926 corresponding to examination answers during the class to grade a corresponding examination. As another example, a teacher can assess attentiveness, organization, and/or comprehension of the materials by different students based on reviewing their notes taken during the class.

FIG. 56K illustrates a particular example where user session materials data 4926.B1-4926.BN is generated by the set of secondary interactive display devices 10.B-10.BN to collect responses to a pop quiz. The primary interactive display device 10.A displays a series of questions of a pop quiz, which can be transmitted as session materials data 4925 for display upon displays of secondary interactive display devices 10.B1-10.BN as discussed previously. For example, the primary user either notated the series of questions as user notation data 4920.A during the class or downloaded graphical image data 4922 or other data that was pre-prepared to include this series of question for display. Each user can supply their own user notation data 4920 to supply answers to the questions, and each user notation data 4920.B can be sent to the memory module 4944 for storage, for example, mapped to user identifier data of the corresponding user. The primary user can download each user notation data 4920.B after the session via their own computing device to grade or otherwise review the student responses to the pop quiz.

FIG. 56L illustrates a flow diagram of an embodiment of a method in accordance with the present disclosure. In particular, a method is presented for execution by and/or use in conjunction with an interactive display device 10 such as a primary interactive display device 10.A of FIGS. 56A-56J, interactive tabletop 5505, interactive computing device, processing module 42, and/or other processing resources and/or display devices described herein. Some or all steps of FIG. 56L can be performed in conjunction with performance of some or all steps of FIG. 54P and/or some or all steps of one or more other methods described herein.

Step 5682 includes transmitting a plurality of signals on a plurality of electrodes of a primary interactive display device. For example, step 5682 is performed by a plurality of DSCs of the primary interactive display device. Step 5684 includes detecting at least one change in electrical characteristics of a set of electrodes of the plurality of electrodes, for example, caused by a first user in close proximity to an interactive surface of the primary interactive display device. For example, step 5684 is performed by a set of DSCs of the plurality of DSCs. Step 5686 includes determining user input data during a temporal period based on interpreting the change in the electrical characteristics of the set of electrodes during the temporal period. For example, step 5686 is performed by a processing module of the primary interactive display device. Step 5688 includes generating session materials data based on the user input data, for example, as a stream of user notation data, graphical image data, and/or media data. For example, step 5688 is performed by a processing module of the primary interactive display device. Step 5690 includes transmitting the session materials data to a plurality of secondary interactive display devices during the temporal period for display during the temporal period. For example, the session materials data is transmitted via a network interface of primary interactive display device as a stream of user notation data during the temporal period. Step 5692 includes transmitting some or all of the session material data stream for storage in conjunction with user notation data generated by at least one of the plurality of secondary interactive display devices. The session material data can be transmitted via a network interface of primary interactive display device, for example, as final user notation data at the elapsing of the temporal period and/or as a stream of user notation data throughout the temporal period.

In various embodiments, the session materials data is generated and transmitted as a session materials data stream during the temporal period. The method can further include generating final session material data based on this session material data stream after elapsing of the temporal period. In such embodiments, performing step 5692 includes transmitting this final session material data for storage in conjunction with user notation data generated by at least one of the plurality of secondary interactive display devices.

Figure 56M:
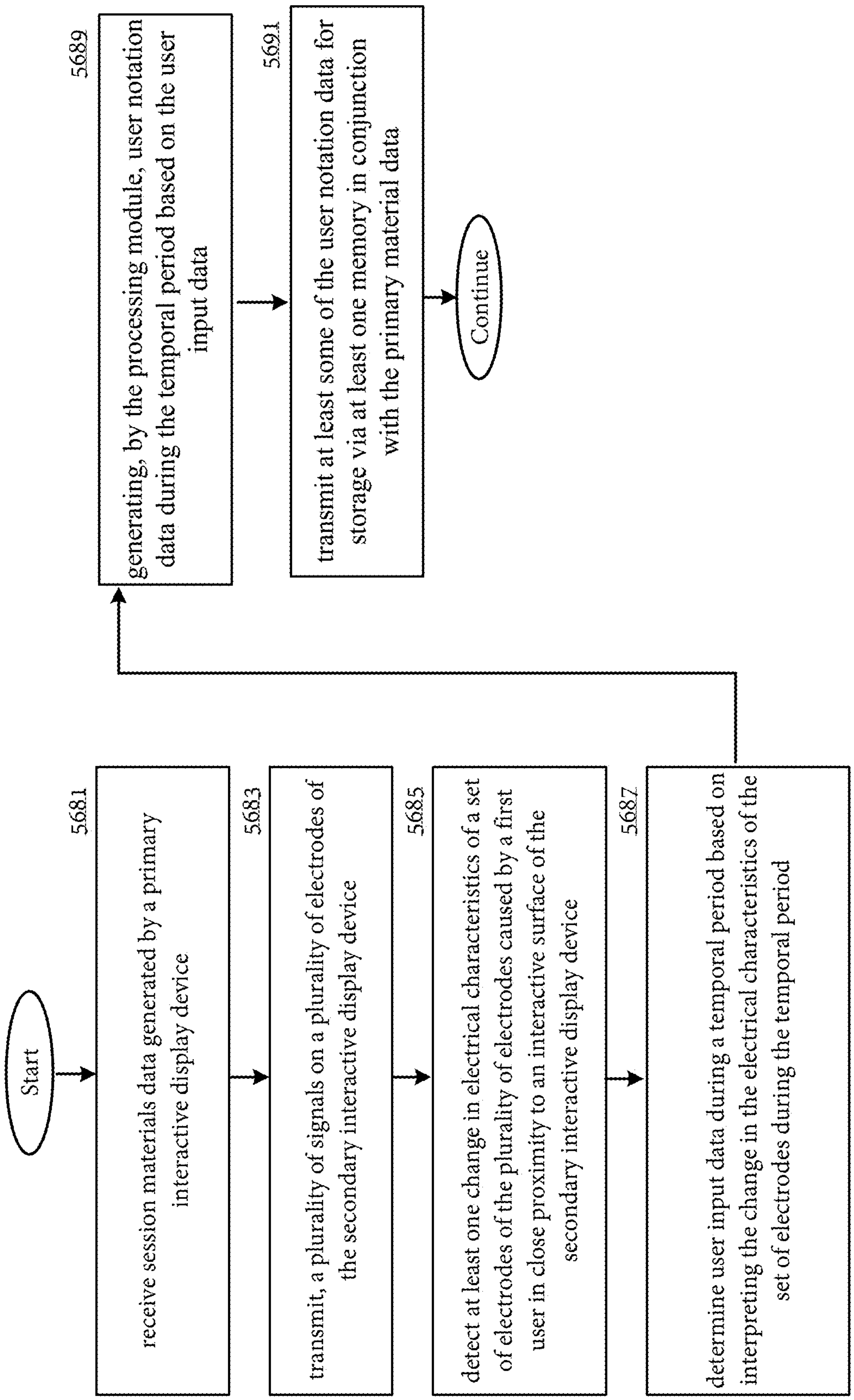
FIG. 56M is a logic diagram of an example of a method in accordance with the present disclosure.

FIG. 56M illustrates a flow diagram of an embodiment of a method in accordance with the present disclosure. In particular, a method is presented for execution by and/or use in conjunction with an interactive display device 10 such as a secondary interactive display device 10.B of FIGS. 56A-56J, interactive tabletop 5505, interactive computing device, processing module 42, and/or other processing resources and/or display devices described herein. Some or all steps of FIG. 56M can be performed in conjunction with performance of some or all steps of FIG. 54Q, some or all steps of FIG. 56L, and/or some or all steps of one or more other methods described herein.

Step 4982 includes receiving session materials data generated by a primary interactive display device. For example, step 4982 is performed by a network interface of a secondary interactive display device. Step 4982 can further include displaying the session materials data via a display of the secondary interactive display device. Step 4984 includes transmitting a plurality of signals on a plurality of electrodes of the secondary interactive display device. For example, step 4984 is performed via a plurality of DSCs of the secondary interactive display device. Step 4986 includes detecting at least one change in electrical characteristics of a set of electrodes of the plurality of electrodes caused by a first user in close proximity to an interactive surface of the secondary interactive display device. For example, step 4986 is performed by a set of DSCs of the plurality of DSCs. Step 4988 includes determining user input data during a temporal period based on interpreting the change in the electrical characteristics of the set of electrodes during the temporal period. For example, step 4988 is performed by at least one processing module of the secondary interactive display device. Step 4990 includes generating user notation data during the temporal period based on the user input data. For example, the user notation data is generated as a user notation data stream during the temporal period based on the user input data. Step 4988 can be performed by at least one processing module of the secondary interactive display device. Step 5691 includes transmitting at least some of the user notation data for storage via at least one memory in conjunction with the primary material data. The user notation data can be transmitted via a network interface of the secondary interactive display device, for example, as final user notation data at the elapsing of the temporal period and/or as a stream of user notation data throughout the temporal period.

In various embodiments, the method further includes generating, by the processing module, final user notation data based on the user notation data stream after elapsing of the temporal period. Step 5691 can include transmitting this final user notation data for storage via at least one memory in conjunction with the session materials data.

In various embodiments, the method includes generating, for example, by the processing module, compounded materials data that includes the user notation data and the primary materials data, wherein the transmitting the user notation data for storage includes transmitting the compounded materials data.

In some embodiments, rather than storage of and/or retrieval of session materials data 4925 and/or user session materials data 4926 from memory modules 4944 via computing devices 4942 as discussed in FIGS. 56A-56M, a given computing device 4942 can optionally download session materials data 4925 and/or user session materials data 4926 from a corresponding primary interactive display device 10.A and/or a corresponding secondary interactive display device 10.B via a communication connection, such as a wired communication connection and/or short range wireless communication connection with the corresponding interactive display device 10. As a particular example, this download can be accomplished via an STS wireless connection 118 between a given interactive display device 10 and a computing device 4942 of the corresponding user, for example, based on a given computing device 4942 being placed upon the and/or in proximity to the given interactive display device 10 and/or based on the corresponding user touching their computing device 4942 while also touching the given interactive display device 10.

Figure 57A:
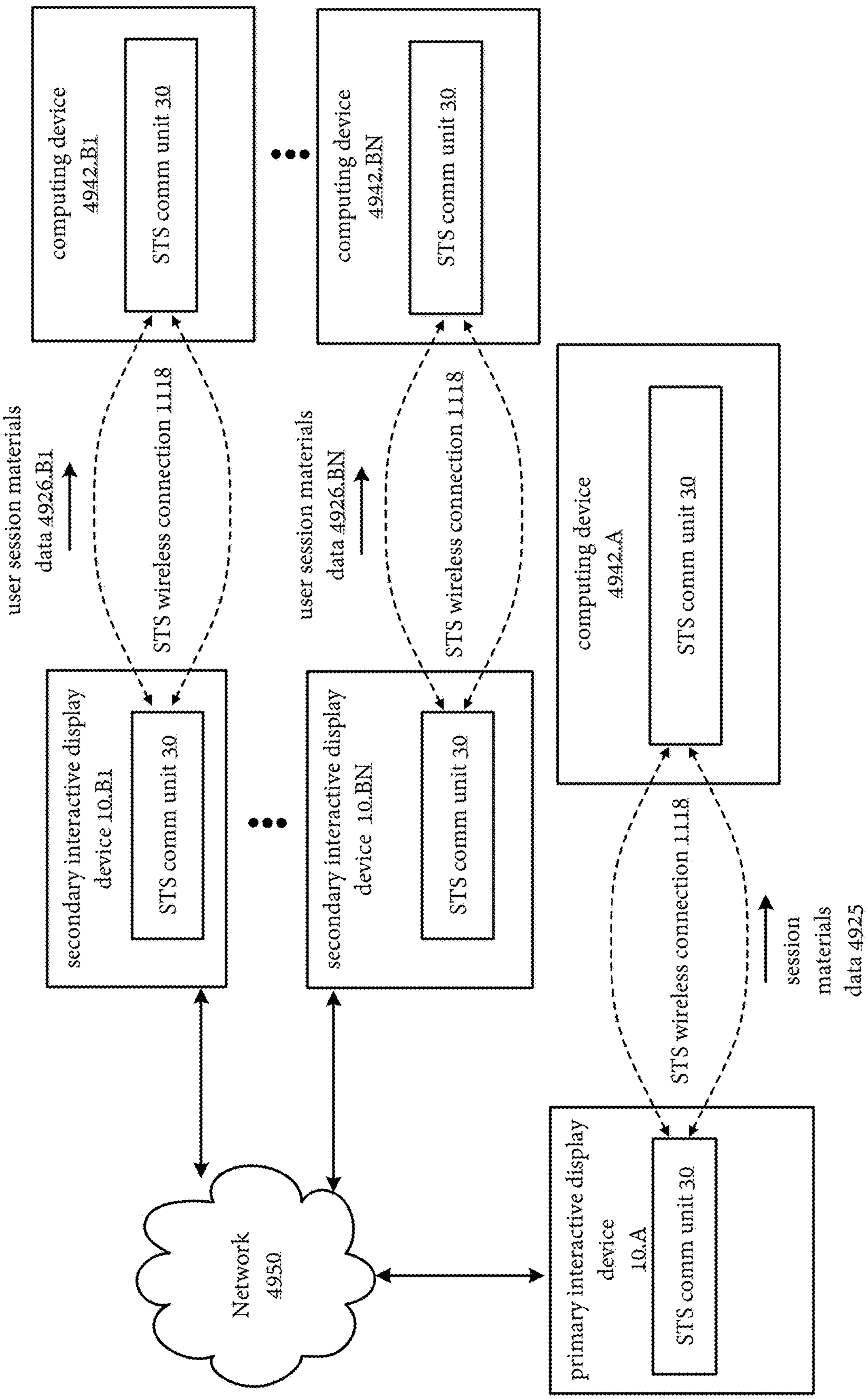
FIG. 57A is a schematic block diagram illustrating example communication between secondary interactive display devices and computing devices in accordance with the present disclosure.

Such an embodiment is illustrated in FIG. 57A, where each secondary user can download their user session materials data 4926.B and/or session materials data 4925 to their computing device 4942 for storage, future access, and/or future review, via a STS wireless connection 118 established between their computing device 4942 and secondary interactive display device 10.B at which they are seated, for example, during the corresponding session and/or at the conclusion of the corresponding session. The user session materials data 4926.B and/or session materials data 4925 can be sent to and stored by a corresponding computing device as a stream, final session materials data at the conclusion of the session, and/or discrete set of session materials data generated over time during the session in a similar fashion as discussed in conjunction with storing user session materials data 4926.B and/or session materials data 4925 via memory modules 4944 of FIGS. 56A-56M. For example, embodiments of FIGS. 56A-56M are implemented via the STS wireless connections 118 of FIG. 57A based on the memory modules 4944 being integrated within the computing device 4942, for example, as illustrated in FIG. 54H. This download by computing devices can require user credentials and can optionally include first verifying whether the user is registered for the session, for example, based on accessing the expected attendee roster 4964. Some or all features and/or functionality of interactive display devices 10 of FIG. 57A can be utilized to implement the primary interactive display device 10A and/or one or more secondary interactive display devices 10B of FIG. 54A, and/or any other interactive display devices described herein. Some or all features and/or functionality of FIGS. 62A-62BM can be utilized to implement the STS wireless connections 1118 of FIG. 57A.

Figure 57B:
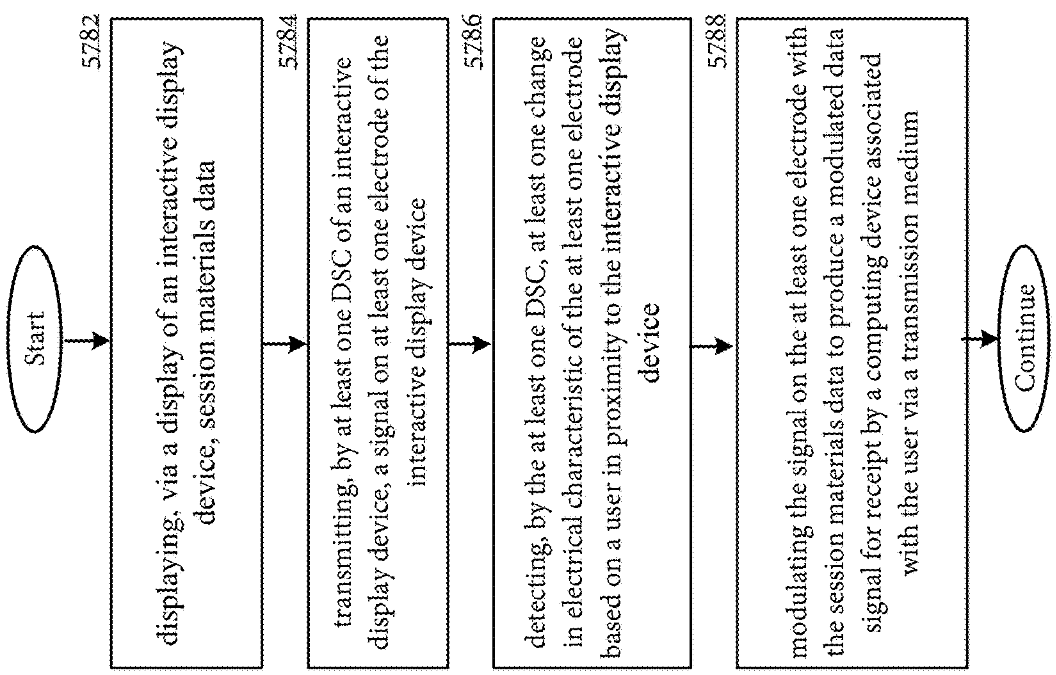
FIG. 57B is a logic diagram of an example of a method in accordance with the present disclosure.

FIG. 57B illustrates a flow diagram of an embodiment of a method in accordance with the present disclosure. In particular, a method is presented for execution by and/or use in conjunction with an interactive display device 10 such as a primary interactive display device 10.A or secondary interactive display device 10.B of FIG. 57A, interactive tabletop 5505, interactive computing device, processing module 42, and/or other processing resources and/or display devices described herein. Some or all steps of FIG. 57B can be performed in conjunction with performance of some or all steps of FIG. 54P, FIG. 54Q, FIG. 56L, FIG. 56M, and/or some or all steps of one or more other methods described herein. Some or all steps of FIG. 51F can be performed in conjunction with some or all steps of FIG. 62X, FIG. 62AF, FIG. 62AH, FIG. 62A, FIG. 62AV, FIG. 62AW, FIG. 62AX, FIG. 62BL, and/or FIG. 62BM.

Step 5782 includes displaying session materials data, for example, via a display of an interactive display device. Step 5784 includes transmitting a signal on at least one electrode of the interactive display device, for example, via at least one DSC of an interactive display device. Step 5786 includes detecting at least one change in electrical characteristic of the at least one electrode based on a user in proximity to the interactive display device, for example, by the at least one DSC. Step 5788 includes modulating the signal on the at least one electrode with the session materials data to produce a modulated data signal for receipt by a computing device associated with the user via a transmission medium. For example, step 5788 is performed via at least one processing module and/or the at least one DSC.

In various embodiments the computing device receives the session materials data via at least one touch sense element, where the computing device demodulates the session materials data from the modulated signal, and/or wherein the computing device stores the session materials data in memory and/or displays the session materials data via a display device. In various embodiments, the transmission medium includes and/or is based on a human body and/or a close proximity between the computing device and the interactive display device. In various embodiments, the computing device receives the signal based on detecting a touch by the human body.

In various embodiments, the method includes transmitting, by a plurality of drive sense circuits of the secondary interactive display device, a plurality of signals on a plurality of electrodes of the secondary interactive display device; detecting, by a set of drive sense circuits of the plurality of drive sense circuits, a change in electrical characteristics of a set of electrodes of the plurality of electrodes caused by a first user in close proximity to an interactive surface of the secondary interactive display device; determining, a processing module of the secondary interactive display device, user input data based on interpreting the change in the electrical characteristics of the set of electrodes; generating, by the processing module, user notation data based on the user input data; displaying, by a display of the secondary interactive display device, the user notation data; and/or generating the session materials data to include the user notation data.

In various embodiments, the method includes receiving, via a network interface, the session materials data from a primary interactive interface device displaying the session materials data. In various embodiments, the method includes generating, by a processing module of the interactive display device, compounded materials data that includes the user notation data and the primary materials data, where the transmitting the user notation data for storage includes transmitting the compounded materials data.

FIGS. 58A-58G illustrate embodiments where interactive display devices 10 generate user notation data 4920 based on detection of a writing passive device, and can further update user notation data 4920 by "erasing" portions of the user notation data 4920 based on detection of an erasing passive device. Some or all features and/or functionality of the interactive display devices 10 of FIGS. 58A-58G can implement the primary interactive display device 10.A and/or secondary interactive display devices 10.B of FIG. 54A and/or any other interactive display devices 10 described herein.

Figure 58A:
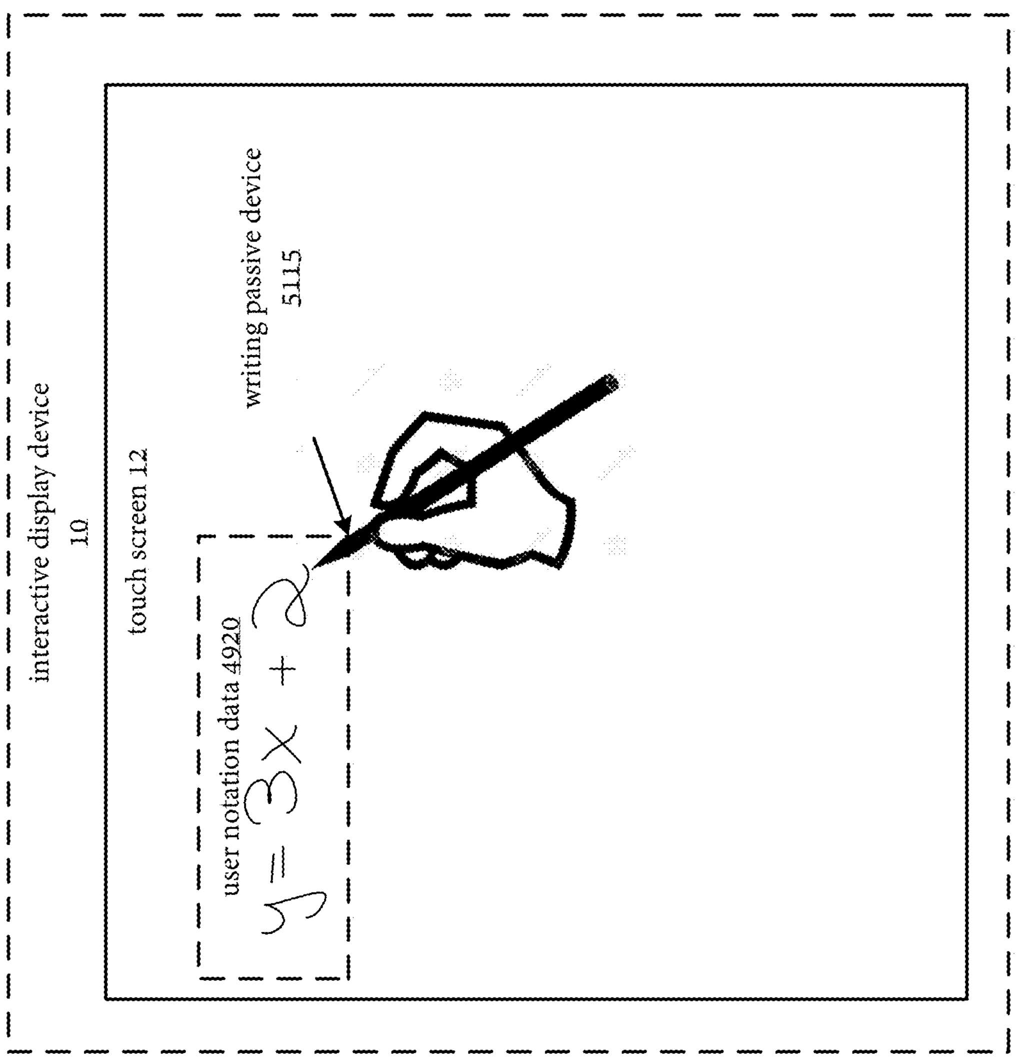
FIG. 58A is a pictorial diagram illustrating example written user annotation data generated by an interactive display device based on use of a writing passive device in accordance with the present disclosure.

FIG. 58A presents an embodiment of generation of user notation data 4920 in a first temporal period prior to a time to, where the user writes "y=3x+2" upon touch screen 12 via a writing passive device 5115. The writing passive device 5115 can be implemented via some or all features and/or functionality of the passive user input device described herein, where detection of the writing passive device 5115 and/or a frequency of a corresponding user holding the writing passive device 5115 is detected to determine where the writing passive device 5115 is touching and/or hovering over touch screen 12, and where corresponding shapes corresponding to letters, numbers, symbols, or other notations by the user occur, where these corresponding shapes are displayed via the display 50 accordingly. For example, one or more features of the writing passive device 5115 are distinguishable and are utilized to identify the writing passive device 5115 as a device by which a corresponding user supplies user input to touch screen 12 that corresponds to written user notation data 4920, such as any of the user notation data 4920 described herein.

A user can thus utilize writing passive device 5115 upon the interactive display device 10 to emulate writing upon a whiteboard via a marker or writing upon a chalkboard via a piece of chalk, for example, where the interactive display device 10 of FIG. 58A is implemented as the primary interactive display device 10.A, such as the teacher interactive whiteboard 4910 of FIG. 54B. Alternatively or in addition, the user can utilize writing passive device 5115 upon the interactive display device 10 to emulate writing upon a notebook via a pencil or pen, for example, where the interactive display device 10 of FIG. 58A is implemented as the secondary interactive display device 10.B, such as the student interactive desktop 4912 of FIG. 54B.

In some embodiments, different writing passive devices 5115 can further be implemented to supply user notation data displayed by display 50 in different colors and/or line thicknesses, for example, to emulate writing upon a whiteboard via different colored markers and/or to emulate writing upon a notebook via different colored pens. In such cases, the different writing passive devices 5115 can have different identifying characteristics that, when detected via DCSs or other sensors, are processed in conjunction with generating the user notation data to further determine the corresponding color and/or line thickness and display the user notation data in the corresponding color and line thickness accordingly.

In some embodiments, a given writing passive device 5115 can be configurable by the user to change its respective shape and/or electrical characteristics induced to configure writing via different corresponding colors and/or thicknesses, where these differences are automatically detected and render display of user notation data in different colors and/or line thicknesses accordingly. For example different caps and/or tips with different impedance characteristics or other distinguishing characteristics can be interchangeable upon a given writing passive device 5115 to induce different colors and/or thicknesses.

In embodiments where multiple users notate upon an interactive whiteboard, interactive tabletop, or other interactive display device 10 at the same time, each user's writing passive device 5115 can optionally be uniquely identified, where each corresponding user notation data automatically displayed in different colors and/or thicknesses based on the different writing passive device 5115 being uniquely identified and having their respective movement tracked. For example, the interactive display device 10 assigns different colors automatically based on detecting multiple different writing passive devices 5115 at a given time or within a given temporal period. In embodiments where each writing passive device's uniquely identifying characteristics are further mapped to a given user in user profile data, the different user notation data generated by writing passive devices 5115 of different users can automatically be processed separately and/or can be mapped separately to each user's respective user profile, for example, for download by each respective user at a later time.

In some cases, a given writing passive device 5115 is initially identified as being associated with a given user based on detecting the given user at a corresponding interactive display device via other means, such as via a unique frequency or other detected user device, where the writing passive device 5115 is detected and determined to be used by this given user, and where its unique characteristics are then mapped to the given user in the user's user profile data. For example, at a later time, the same or different interactive display device 10 detects the given writing passive device 5115, for example, without also detecting the other means of identifying the given user, where this user is identified based on the given writing passive device 5115 being detected and identified as a user device of the user, and this identified device being determined to be mapped to the given user. Such "ownership" of a given writing passive device 5115 can change overtime, for example, where a new user establishes its ownership of the given writing passive device in a similar fashion at a later time.

Figure 58B:
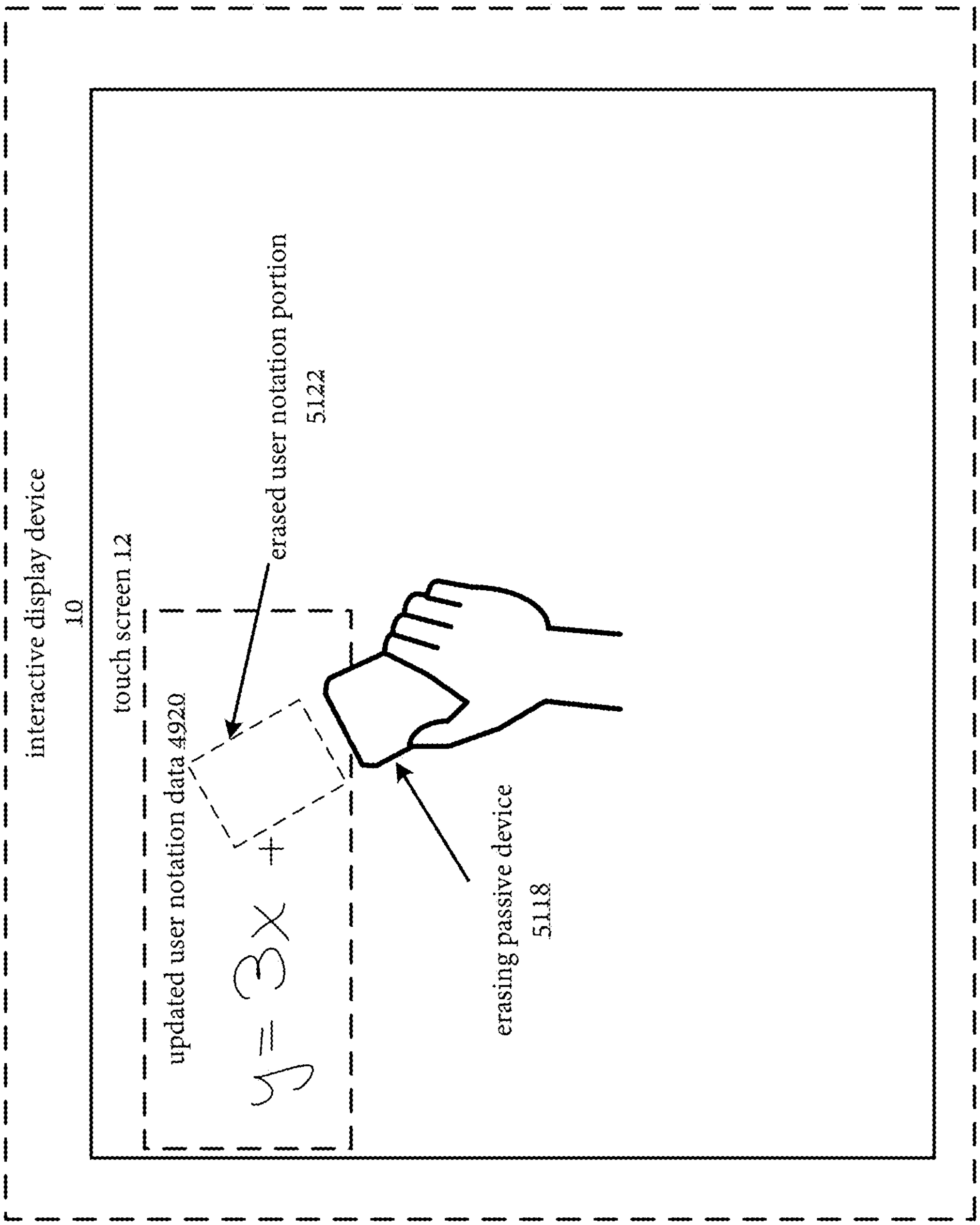
FIG. 58B is a pictorial diagram illustrating an example erased user notation portion of written user annotation data generated by an interactive display device based on use of an erasing passive device in accordance with the present disclosure.

FIG. 58B illustrates generation of updated user notation data 4920 in a second temporal period after time to of FIG. 58A and prior to a time $t_1$. Here, the user wishes to erase some or all of the previously written user notation data 4920. The user can use an erasing passive device 5118 that is different from the writing passive device 5115 and/or distinguishable from the writing passive device 5115 by the interactive display device 10. The writing passive device 5115 and erasing passive device 5118 can induce different electrical characteristics detected via DSCs, where the presence and movement of a writing passive device 5115 in proximity to touch screen 12 can be distinguished from the presence and movement of erasing passive device 5118 in proximity to touch screen 12, which can render display of user notation data being added or removed accordingly.

The erasing passive device 5118 can be implemented via some or all features and/or functionality of the passive user input device described herein, where detection of the erasing passive device 5118 and/or a frequency of a corresponding user holding the erasing passive device 5118 is detected to determine where the erasing passive device 5118 is touching and/or hovering over touch screen 12, and where corresponding notations by the user are to be removed, where these corresponding notations are removed from the via the display 50 accordingly. For example, one or more features of the erasing passive device 5118 are distinguishable and are utilized to identify the erasing passive device 5118 as a device by which a corresponding user supplies user input to touch screen 12 that corresponds to erasing of previously user notation data 4920, such as any of the user notation data 4920 described herein and/or user notation data 4920 that was written via a writing passive device 5115.

In particular, user notation data 4920 included in regions of the touch screen 12 in which the erasing passive device 5118 is detected to touch and/or hover over in its movement by the user can correspond to identified erased user notation portions 5112, where any written user notation data in this region is removed from the displayed user notation data 4920 as updated user notation data from the prior user notation data.

A user can thus utilize erasing passive device 5118 upon the interactive display device 10 to emulate erasing prior notations by a marker upon a whiteboard via an eraser, or erasing prior notations by chalk upon a chalkboard via an eraser, for example, where the interactive display device 10 of FIGS. 58A and 58B is implemented as the primary interactive display device 10.A, such as the teacher interactive whiteboard 4910 of FIG. 54B. Alternatively or in addition, the user can utilize erasing passive device 5118 upon the interactive display device 10 to emulate erasing notations by pen or pencil upon a notebook via an eraser, for example, where the interactive display device 10 of FIG. 58A is implemented as the secondary interactive display device 10.B, such as the student interactive desktop 4912 of FIG. 54B.

Figure 58C:
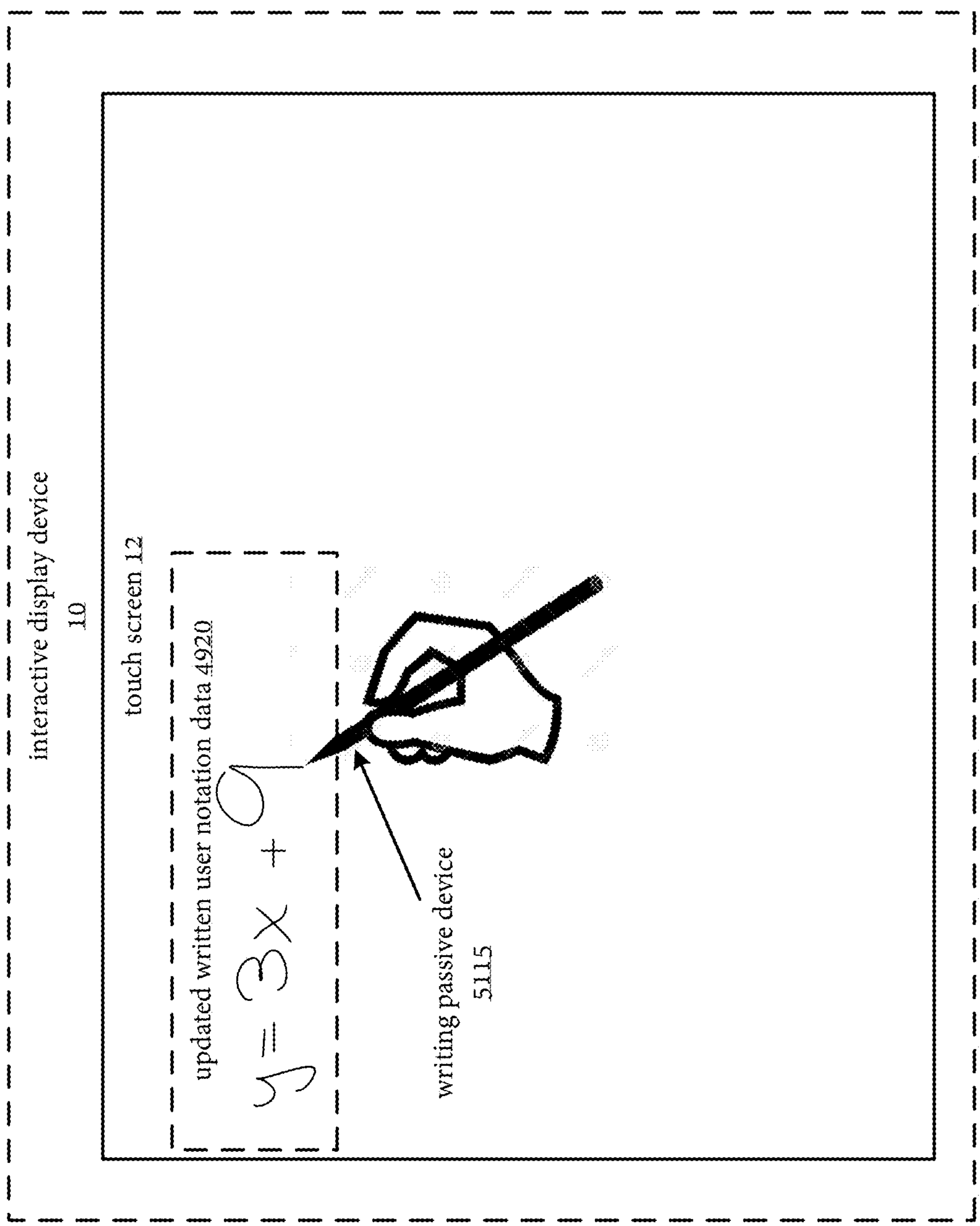
FIG. 58C is a pictorial diagram illustrating example updated written user annotation data generated by an interactive display device based on use of a writing passive device in accordance with the present disclosure.

FIG. 58C illustrates generation of further updated user notation data 4920 in a third temporal period after time $t_1$ of FIG. 58B and prior to a time $t_2$. The user can once again utilize the writing passive device 5115 of FIG. 58A to update the notation in the region of user notation data 4920 that previously included other user notation data that was erased, as illustrated in FIGS. 58A and 58B. In this example of FIGS. 58A-58C, over the temporal periods from $t_0$-$t_2$, the user thus updates their written expression displayed by interactive display device from "y=3x+2" to "y=3x+9".

Figure 58D:
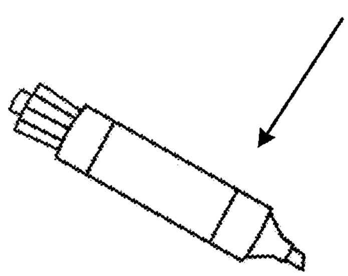
FIG. 58D is a pictorial diagram illustrating an example embodiment of a writing passive device in accordance with the present disclosure.

FIG. 58D illustrates an example embodiment of a writing passive device 5115. The writing passive device can be configured to have a same or similar size, shape, weight, material, or other physical similarities with a conventional marker, for example, such as a conventional dry erase marker utilized to notate upon conventional whiteboards. Alternatively, the writing passive device 5115 can configured to have a similar size, shape, weight, material, or other physical similarities with: a conventional piece of chalk utilized to notate upon conventional chalkboards; a conventional pencil utilized to notate upon conventional notebooks or other paper products; a conventional pen utilized to notate upon conventional notebooks or other paper products; and/or another conventional writing device. Different writing passive devices 5115 can optionally be configured for use upon primary interactive display device 10.A and secondary interactive display devices 10.B, where writing passive devices 5115 emulating markers or chalk are implemented to interact with primary interactive display devices 10.A and/or where writing passive devices 5115 emulating pencils or pens are implemented to interact with secondary interactive display devices 10.B.

Figure 58E:
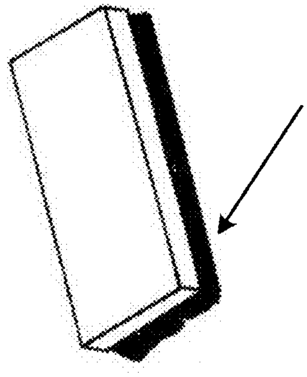
FIG. 58E is a pictorial diagram illustrating an example embodiment of an erasing passive device in accordance with the present disclosure.

FIG. 58E illustrates an example embodiment of an erasing passive device 5118. The erasing passive device can be configured to have a same or similar size, shape, weight, material, or other physical similarities with a conventional eraser, for example, such as a conventional dry erase eraser, chalkboard eraser, or other board eraser utilized to erase ink or chalk from conventional whiteboards or chalkboards. Alternatively, the erasing passive device 5118 can be configured to have a similar size, shape, weight, material such as erasing fibers, or other physical similarities with a conventional handheld eraser utilized to erase pencil notations from paper. Different erasing passive devices 5118 can optionally be configured for use upon primary interactive display device 10.A and secondary interactive display devices 10.B, where erasing passive devices 5118 emulating large board erasers are implemented to interact with primary interactive display devices 10.A and/or where erasing passive devices 5118 emulating smaller pencil erasers are implemented to interact with secondary interactive display devices 10.B.

Figure 58F:
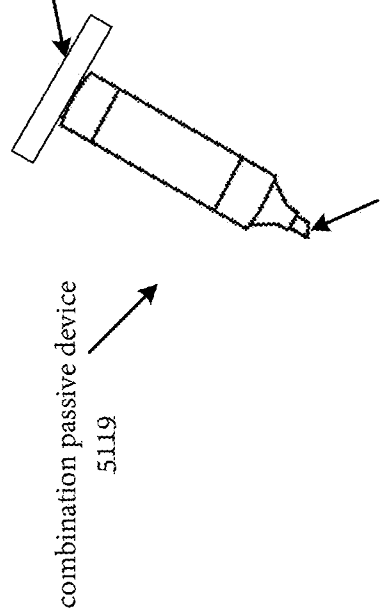
FIG. 58F is a pictorial diagram illustrating an example embodiment of a writing passive device and an erasing passive device in accordance with the present disclosure.

FIG. 58F illustrates an embodiment of a combination passive device 5119 that integrates both a writing passive device 5115 and erasing passive device 5118, for example, on either end as illustrated in FIG. 58F. This can be ideal in reducing the need for a user to pick up and put down separate writing passive devices and erasing passive devices while notating. In some embodiments, the combination passive device 5119 is configured to emulate a conventional pencil and/or can otherwise have a small tip on one side implementing the writing passive device and a larger surface of the other end implementing the erasing passive device.

The writing passive device 5115 and/or erasing passive device 5118 can further be configured to convey identifying information for a given user, for example, based on transmitting a particular frequency, having conductive pads in a unique shape and/or configuration, or otherwise being uniquely identifiable, for example, via any means of detecting particular objects and/or particular users as discussed previously. For example, the given user is identified based on detecting their corresponding writing passive device 5115 and/or erasing passive device 5118, where the characteristics for the writing passive device 5115 and/or erasing passive device 5118 for each user is stored and/or accessible via their user profile data. For example, different configuration of the corresponding interactive display device 10, such as functionality of the corresponding interactive display device 10 and/or processing of the user notation data, can be implemented by each interactive display device 10 based on different configurations set for each corresponding user.

Alternatively or in addition, the writing passive device 5115 and/or erasing passive device 5118 can distinguish a given course and/or setting, for example, where a first writing passive device 5115 identifies a mathematics course and a second writing passive device 5115 identifies an English course, and where corresponding user notation data is automatically generated and/or processed differently, for example, via different context-based processing as discussed in conjunction with FIGS. 61A-61H.

Alternatively or in addition, the writing passive device 5115 and/or erasing passive device 5118 can distinguish given permissions and/or a given status. For example, a teacher's writing passive device 5115 and/or erasing passive device 5118 are distinguishable as teacher devices that are capable of configuring secondary interactive desktop functionality when they interact with secondary interactive desktops, while student writing passive devices 5115 and/or erasing passive devices 5118, when detected, cannot control functionality of the secondary interactive desktop in this manner due to not corresponding to the same permissions.

The writing passive device 5115 can be configured such that it is incapable of producing any notation via ink, graphite, chalk, or other materials upon these conventional surfaces, for example, based on not including any ink, graphite, or chalk. In such embodiments, the writing passive device 5115 is only functional when used in conjunction with an interactive display device 10 configured to detect its presence and movement in proximity to the surface of the interactive display device 10, where the displayed notations upon interactive display device 10 that are visibly observable by the users and other users in the room are entirely implemented via digital rendering of the corresponding notations via the display 50 or other display device. In such embodiments, the erasing passive device 5118 can optionally be configured such that it is incapable of erasing any notation via ink, graphite, chalk, or other materials, based on not including fibers, rubber, or other materials operable to erase these notations.

In other embodiments, the writing passive device 5115 can be configured such that it is also capable of producing any notation via ink, graphite, chalk, or other materials upon these conventional surfaces, for example, based on including any ink, graphite, or chalk. In such embodiments, the writing passive device 5115 can be functional when used in conjunction with conventional whiteboards, chalkboard, and/or paper. In such embodiments, the erasing passive device 5118 can optionally be configured such that it is capable of erasing notations via ink, graphite, chalk, or other materials, based on including fibers, rubber, or other materials operable to erase these notations.

In some embodiments, the interactive display device 10 can be configured to include an opaque surface implemented as a chalkboard surface or whiteboard surface, where, rather than displaying detected user notation data via a digital display, the user notation data is viewable based on being physically written upon the surface via ink or chalk via such a writing passive device 5115 that is functional to write via chalk or ink based on being similar to or the same as a conventional white board marker or piece of chalk. As another example, the interactive display device 10 can be configured to include an opaque surface implemented as wooden or plastic desktop, or other material desktop, where the user notation data is viewable based on being physically written upon a piece of paper placed upon the desktop surface via graphite or ink, based on utilizing such a writing passive device 5115 that is functional to write via graphite or ink that is similar to or the same as a conventional pencil or pen.

In such embodiments, the DSCs or other sensors can still be integrated beneath the surface of the interactive display device 10, and can still be operable to detect the presence and movement of marker or chalk in proximity to the surface of the interactive display device 10, as it physically writes upon the chalkboard or whiteboard surface, or upon a piece of paper atop a tabletop surface. The erasing passive device 5118 can similarly be detected as it physically erases the chalk, ink, or graphite of the user notation data In such embodiments, the interactive display device 10 optionally does not include a display 50 and/or has portions of the surface that include these respective types of surfaces instead of a touch screen 12 or display 50. For example, the interactive display device 10 is implemented as an interactive tabletop 5505, or as an interactive whiteboard or chalkboard.

In such embodiments, user notation data 4920 can still be automatically generated over time as graphical display data discussed previously reflecting this physical writing and/or erasing upon the whiteboard or chalkboard surface. This user notation data 4920, while not displayed via a display of this interactive display device 10 itself, can still be generated for digital rendering via other display devices that can user notation data 4920. For example, the user notation data 4920 is generated for transmission to other interactive display devices such as the secondary interactive display devices 10.B for display during their displays 50 during the session as a stream of user notation data as discussed previously, and/or for transmission to one or more memory modules 4944 for storage and subsequent access by computing devices to enable users to review the user notation data 4920 via a display device of their computing devices as discussed previously.

Figure 58G:
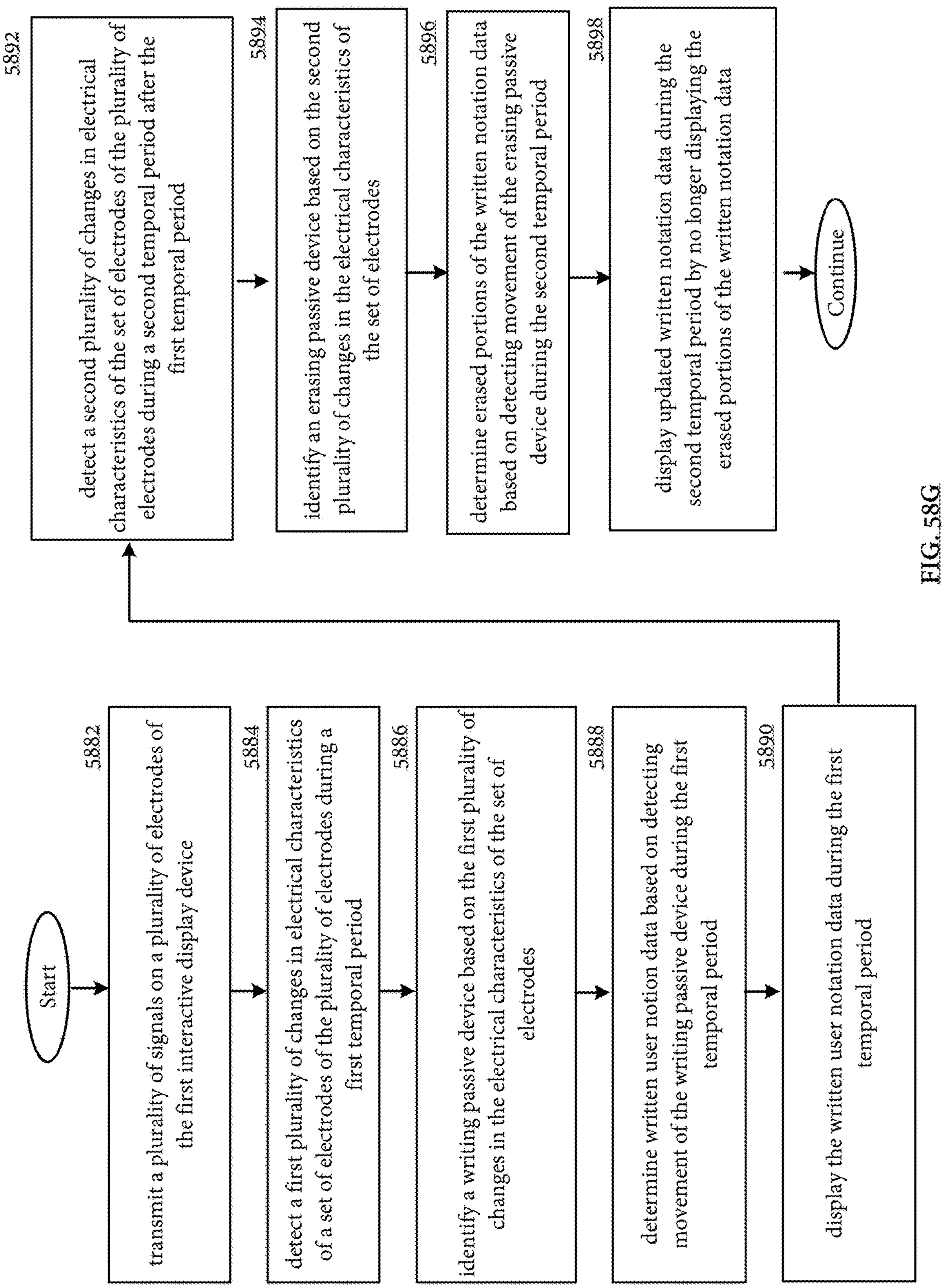
FIG. 58G is a logic diagram of an example of a method in accordance with the present disclosure.

FIG. 58G illustrates a flow diagram of an embodiment of a method in accordance with the present disclosure. In particular, a method is presented for execution by and/or use in conjunction with an interactive display device 10 such as a primary interactive display device 10.A or secondary interactive display device 10.B as discussed in conjunction with FIGS. 58A-58F, interactive tabletop 5505, interactive computing device, processing module 42, and/or other processing resources and/or display devices described herein. Some or all steps of FIG. 58G can be performed in conjunction with performance of some or all steps of FIG. 54P, FIG. 54Q, and/or some or all steps of one or more other methods described herein.

Step 5882 includes transmitting a plurality of signals on a plurality of electrodes of the first interactive display device. For example, step 5882 is performed via a plurality of DSCs of an interactive display device. Step 5884 includes detecting a first plurality of changes in electrical characteristics of a set of electrodes of the plurality of electrodes during a first temporal period. For example, step 5884 is performed a set of DSCs of the plurality of drive sense circuits. Step 5886 includes identifying a writing passive device based on the first plurality of changes in the electrical characteristics of the set of electrodes. For example, step 5886 is performed via at least one processing module of the interactive display device. Step 5888 includes determining written user notion data based on detecting movement of the writing passive device during the first temporal period. For example, step 5888 is performed via the at least one processing module of the interactive display device. Step 5890 includes displaying the written user notation data during the first temporal period. For example, step 5890 is performed via a display of the primary interactive display device.

Step 5892 includes detecting a second plurality of changes in electrical characteristics of the set of electrodes of the plurality of electrodes during a second temporal period after the first temporal period. For example, the second plurality of changes in electrical characteristics are detected via at least some of the set of drive sense circuits of the plurality of drive sense circuits. Step 5894 includes identifying an erasing passive device based on the second plurality of changes in the electrical characteristics of the set of electrodes. For example, step 5894 is performed via the at least one processing module of the interactive display device. Step 5896 includes determining erased portions of the written notation data based on detecting movement of the erasing passive device during the second temporal period. For example, step 5896 is performed via the at least one processing module of the interactive display device. Step 5898 includes displaying updated written notation data during the second temporal period by no longer displaying the erased portions of the written notation data. For example, step 5898 is performed via a display of the primary interactive display device.

FIGS. 59A-59E present embodiments of a primary interactive display device 10.A that is further operable to control functionality of secondary interactive display devices 10.B, for example, in accordance with user selection data generated based on touch-based or touchless indications to the touch screen 12 of the primary interactive display device 10.A by a primary user such as a teacher or presenter. The primary interactive display device 10.A can generate group setting control data based on the user selection data, where the group setting control data is transmitted to at least one secondary interactive display device 10.B for processing by the secondary interactive display device 10.B to configure functionality of the secondary interactive display device 10.B accordingly. Some or all features and/or functionality of the interactive display devices 10 of FIGS. 59A-59E can be utilized to implement the primary interactive display device 10.A and/or the secondary interactive display device 10.B of FIG. 54A and/or any other interactive display devices 10 described herein.

Figure 59B:
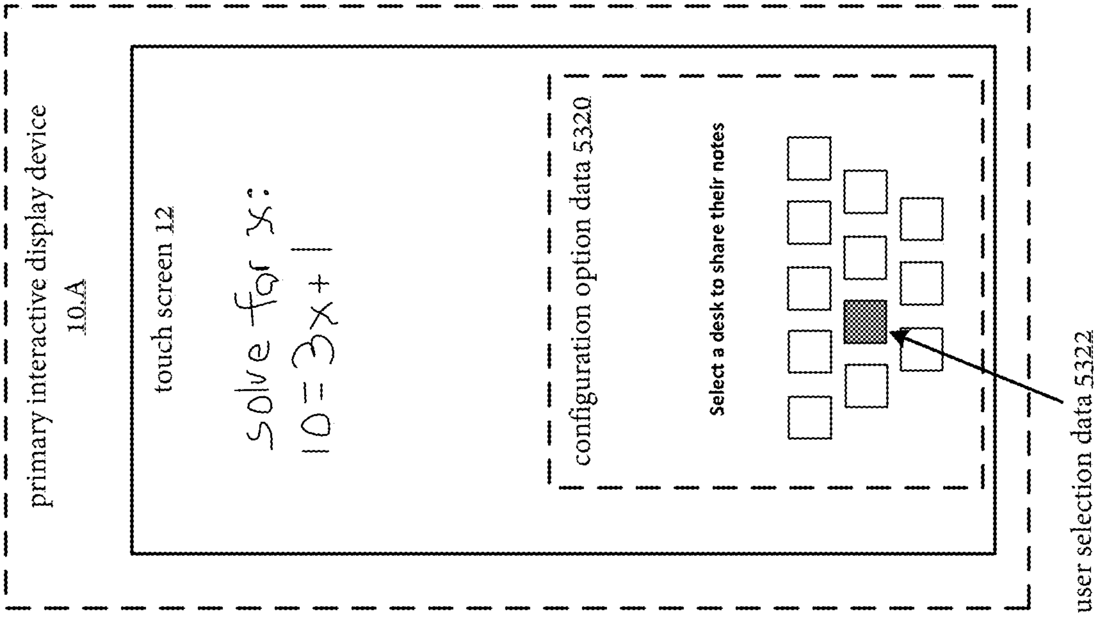
FIGS. 59A and 59B are pictorial diagrams illustrating example user selection data generated by an interactive display device in accordance with the present disclosure.
Figure 59A:
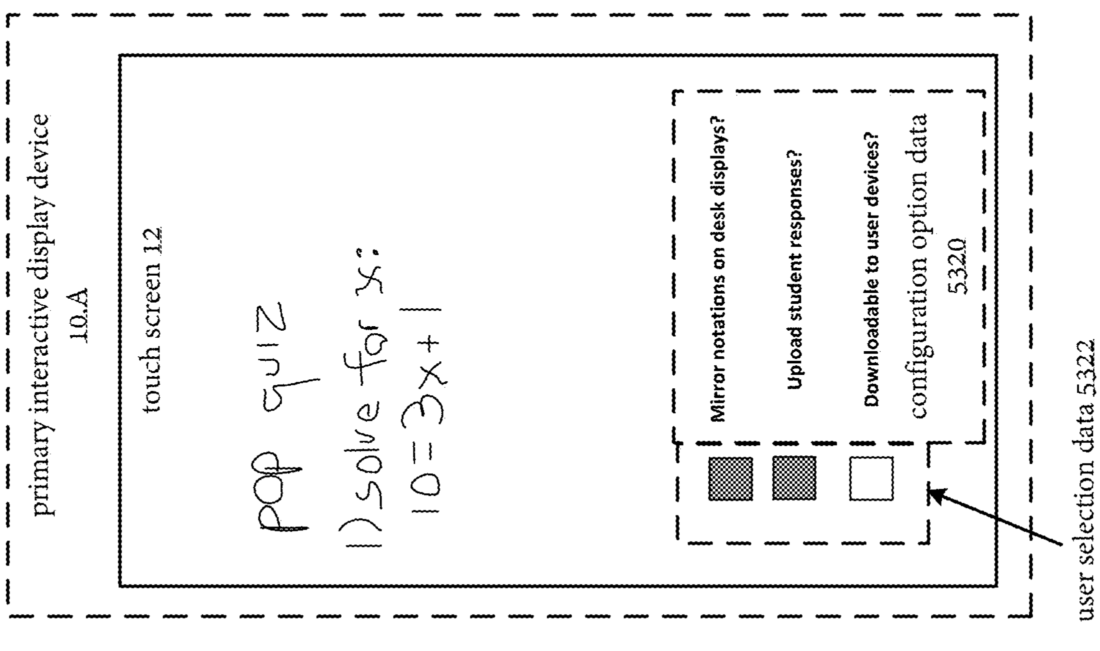

As illustrated in FIGS. 59A and 59B, the primary interactive display device 10.A can display configuration option data 5320, for example, as a graphical user interface for interaction via user input in the form of touch-based and/or touchless indications by the primary user's finger, hand, and/or passive user input device, such as a writing passive device 5115 of FIG. 58A-58G or any other passive user input device described herein. The configuration option data 5320 can be displayed in conjunction with user notation data 4920 or other session materials data 4925 described herein. The configuration option data 5320 can be presented based on detecting a touch-based and/or touchless gesture, based on detecting a corresponding condition to display the configuration option data 5320, such as a setting update condition of FIGS. 49A-49C, based on user interaction with a menu to navigate through various configuration option data 5320, or another determination. User selection data 5322 can be generated based on user input to the configuration option data 5320 via interaction with touch screen 12, for example, via a touch-based and/or touchless indication detected by DSCs of the primary interactive display device 10.A.

In the example of FIG. 59A, configuration option data 5320 enables user selection of whether the user notation data 4920.A or other session materials data 4925 displayed by the primary interactive display device 10.A be transmitted and displayed on desk displays of secondary interactive display devices 10.B. The configuration option data 5320 further enables user selection of whether the user notation data 4920.B of secondary interactive display devices 10.B be transmitted and stored in memory module 4944. The configuration option data 5320 further enables user selection of whether the session materials data 4925 and/or user notation data 4920.B of secondary interactive display devices 10.B be transmitted and downloaded to user's computing devices.

In this example, the primary user selects that the session materials data be mirrored on the display of secondary interactive display devices 10.B, where this functionality is enabled via transmitting of this session materials data by the primary interactive display device 10.A receiving and display of this session materials data by secondary interactive display devices 10.B, for example, as discussed in conjunction with FIG. 54A-54Q. In some embodiments, when this configurable option is not selected, primary interactive display device 10.A does not transmit session materials data to the secondary interactive display devices 10.B and/or the secondary interactive display devices 10.B do not display session materials data via their own display. For example, the instructor selects this option in this case because a pop quiz is presented, and the instructor wishes that users keep their eyes down on their own screen to review questions for easier reading and/or to ensure students are not tempted to cheat upon their neighbors by needing to look up at the primary interactive display device for the pop quiz questions.

In this example, the primary user also selects that the student responses be uploaded for storage via memory modules 4944, where this functionality is enabled via secondary interactive display devices 10.B transmitting their user notation data 4920.B for storage in memory modules 4944 to enable future access by the instructor or students, for example, as discussed in conjunction with FIGS. 56A-56M. In some embodiments, when this configurable option is not selected, secondary interactive display devices 10.B do not transmit user notation data 4920.B to the memory modules 4944. For example, the instructor selects this option in this case because a pop quiz is presented, and the instructor wishes to be capable of downloading and reviewing student responses to the pop quiz for grading.

In this example, the primary user also selects that the student responses not be downloadable to student's computing devices, where this functionality is enabled via secondary interactive display devices 10.B not facilitating transmission of user notation data 4920.B and/or session materials data 4925 to computing devices for download and/or student users are restricted from access the user notation data 4920.B and/or session materials data 4925 when accessing the database of user notation data 4920 and session materials data 4925 in memory modules 4944. In some embodiments, when this configurable option is selected, secondary interactive display devices 10.B transmits of user notation data 4920.B and/or session materials data 4925 to computing devices for download directly as discussed in conjunction with FIGS. 47A-47B and/or student users are allowed access to the user notation data 4920.B and/or session materials data 4925 when accessing the database of user notation data 4920 and session materials data 4925 in memory modules 4944 as discussed in conjunction with FIGS. 56A-56M. For example, the instructor does not select this option in this case because a pop quiz is presented, and the instructor plans to present the same pop quiz to other users in other sessions of the course and thus wishes the questions and student answers to remain private.

FIG. 59B illustrates an example where configuration option data 5320 is presented to configure functionality of particular secondary interactive display devices, for example, based on their location within the classroom and/or based on the names or other features of users sitting at these particular secondary interactive display devices. As illustrated in FIG. 59B, the configuration option data 5320 presents a graphical representation of desks implemented as the set of secondary interactive display devices 10.B in the classroom or lecture hall, where the user selects a particular desk to share its user notation data 4920.B. For example, the selected desk corresponds to secondary interactive display devices 10.BN of FIGS. 54L-54N, where the 4920.B of secondary interactive display device 10.BN is shared accordingly as illustrated in FIGS. 54L-54N.

The graphical representation of desks of the configuration option data 5320 of FIG. 59B can optionally be based on the session attendance data 4962, for example, where only secondary interactive display devices 10.B in the classroom or lecture hall that are detected to be occupied by and/or interacted with by users are displayed as options for selection to mirror their display, or for other configuration during the session. Alternatively or in addition, a list of student names or other identifiers are presented based on the expected attendee roster 4964 and/or the session attendance data 4962 as some or all of configuration option data 5320, where secondary interactive display devices 10.B of particular students can be configured by the user via interaction with options for different student names or identifiers presented in configuration option data 5320.

Any other functionality of secondary interactive display devices 10.B, the primary interactive display device 10.A, or any other interactive display device 10 discussed herein can be similarly configured via selection and/or other configuration of corresponding options of other configuration option data 5320 not illustrated in FIG. 59A or 59B.

Alternatively, no configuration option data 5320 is displayed by primary interactive display device 10, and other user input can be processed to render user selection data 5322. For example, a mapping of touch-based or touchless gestures to various selections of configuration option data can be utilized, where detected gestures by DCSs are processed to render the user selection data 5322. As another example, the user configures their own user profile data and/or user profile of one or more individual students, for example, via interaction with their own computing device 4942.A to access the user profile data in a database of users. As another example, the user performs other interaction with their computing device 4942.A to configure such selection, where the computing device 4942.A generates the user selection data 5322 and/or generates the corresponding group setting control data for transmission to secondary interactive display devices 10.B and/or primary interactive display device 10.A.

Figure 59C:
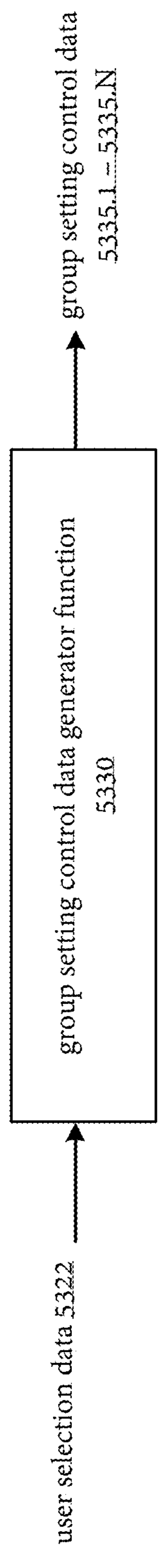
FIG. 59C is a schematic block diagram of a group setting control data generator function in accordance with the present disclosure.

FIG. 59C illustrates a group setting control data generator function 5330 that can be executed by at least one processing module, such as at least one processing module of the primary interactive display device 10.A. The group setting control data generator function can generate some or all group setting control data 5335.1-5335.N based on user selection data 5322, such as user selection data 5322 of FIGS. 59A and/or 59B or other configured selections by primary user. The group setting control data 5335.1-5335.N can correspond to the set of secondary interactive display devices 10.B1-10.BN. The group setting control data 5335.1-5335.N can be the same or different for different ones of the set of secondary interactive display devices 10.B-10.BN. Subsequent group setting control data 5335.1-5335.N can be generated via group setting control data generator function 5330 multiple times in the same session, and/or across different sessions, to reflect newly determined user selection data 5322.

The group setting control data generator function 5330 can optionally generate group setting control data 5335 for only a subset of the set of secondary interactive display devices 10.B1-10.BN and/or for a single secondary interactive display device 10.B at a given time, for example, where group setting control data 5335 is generated for and sent to a first selected secondary interactive display devices 10.B to configure this selected secondary interactive display devices 10.B to mirror its user notation data 4920.B at a first time, and where subsequent group setting control data 5335 is generated for this first selected secondary interactive display devices 10.B to disable mirroring by this selected secondary interactive display devices 10.B to mirror its user notation data 4920.B at a second time, for example, based on also generating and sending subsequent group setting control data 5335 for a second selected secondary interactive display devices 10.B to enable mirroring of its user notation data 4920.B at the second time.

Figure 59D:
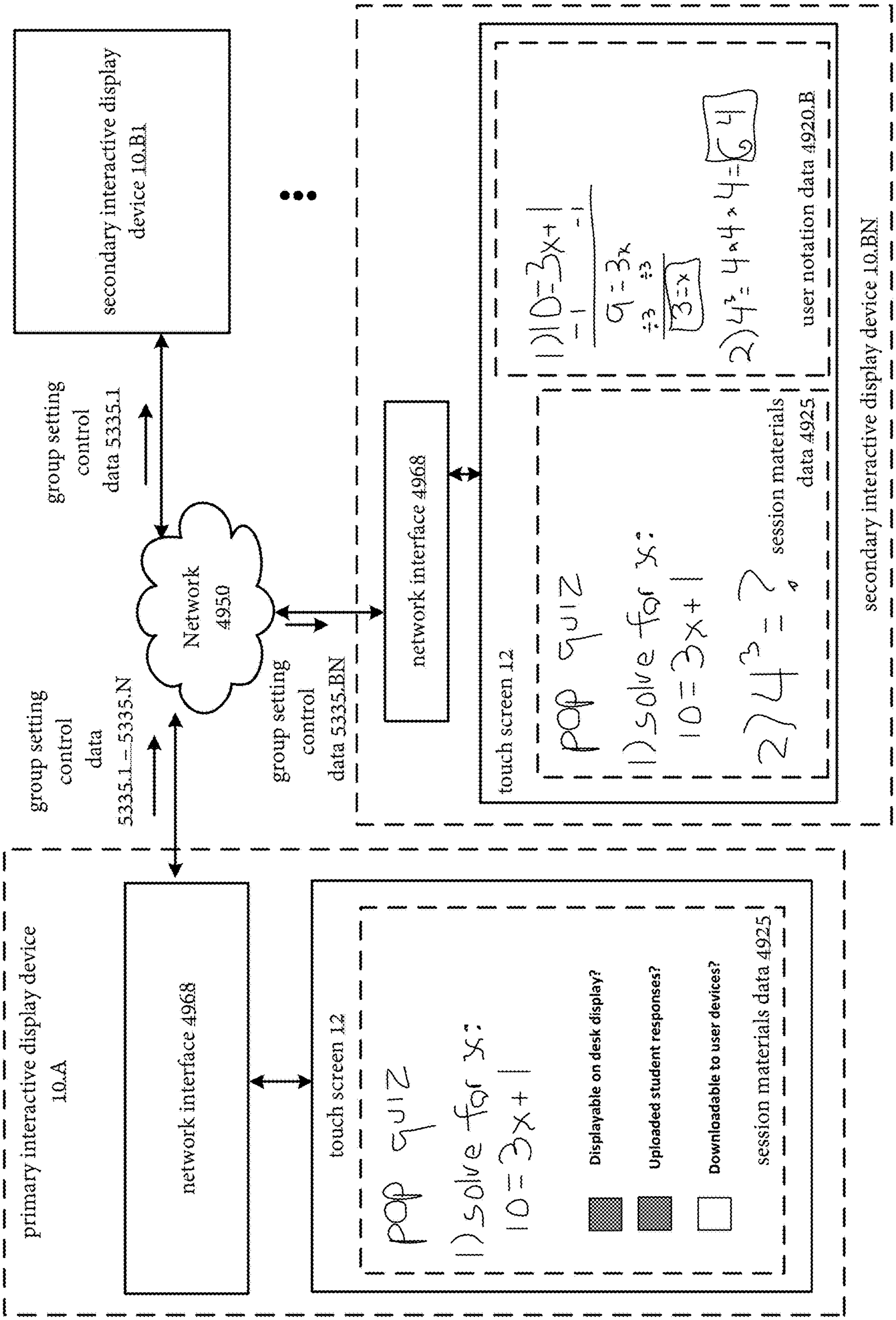
FIG. 59D is a schematic block diagram illustrating communication of example group setting control data between a primary interactive display device and a plurality of secondary interactive display devices in accordance with the present disclosure.

FIG. 59D illustrates the configuration of secondary interactive display devices resulting from on the user selection data 5322 of the example of FIG. 59A. Group setting control data 5335.1-5335.BN is generated and transmitted to the secondary interactive display devices 10.B1-10.BN based on the user selection data 5322 of FIG. 59A to configure the corresponding functionality by secondary interactive display devices 10.B-10.BN. For example, the group setting control data 5335.1-5335.BN is generated is generated based on performing the group setting control data generator function 5330 of FIG. 59C. The secondary interactive display devices 10.B1-10.BN can receive and process the group setting control data 5335.1-5335.BN to cause the secondary interactive display devices 10.B1-10.BN to operate in accordance with the configured functionality. For example, the secondary interactive display devices 10B1-10.BN display the session materials data and transmit user notation data 4920.B for storage in memory modules 4944, and further prohibit download of user notation data 4920.B and/or session materials data 4925 by computing devices of secondary users as discussed in conjunction with the example of FIG. 59A based on processing the group setting control data 5335.

The user selection data 5322 and/or corresponding group setting control data 5335 can configure other functionality such as: which portions of session materials data, such as user notation data 4920.A and/or graphical image data 4922, is displayed by secondary interactive display devices 10.B, for example to configure that only a subset of user notation data and/or a selected portion of the display 50 be included in session materials data sent to students and/or stored in memory; which portions of session materials data can be downloaded by students to their computing devices; what students can upload to their secondary interactive display devices 10.B for display, execution, and/or sharing via mirroring with the other interactive display devices 10. Group setting control data 5335 can be configured differently for different secondary interactive display devices 10.B based on different categories corresponding different attendees, such as whether they are students or teaching assistants; whether they are employees or non-employed guests at a meeting; whether they are registered to attend the session; whether the student is currently failing or passing the class; the attentiveness of the student, for example determined as discussed in conjunction with FIGS. 60A-60F, or other categorical criteria. The corresponding group setting control data 5335 can further configure features of a corresponding lecture and/or exam, such as a length of time to complete the exam or individual questions, for example, where functionality is disabled after the allotted time and/or where user notation data 4920.B is automatically finalized and sent to the memory module 4944 once the time allotment has elapsed. The group setting control data can be context based, for example, where certain functionality is always enabled or disabled during normal note taking, and where different functionality is always enabled or disabled during examinations such as pop quizzes. The group setting control data 5335 can optionally configure whether one or more types of auto-generated notation data of FIGS. 61A-61H can be generated by secondary interactive display devices 10.B for user notation data 4920.B, for example, that corrects errors or automatically solves mathematical equations, can be performed, for example, where this functionality is disabled during examinations.

Alternatively or in addition to facilitating control of secondary interactive display devices via their own primary interactive display device 10.A, a teacher or other primary user can be detectable and distinguished from students when interacting with secondary interactive display devices 10.B, which can be utilized to enable a teacher or other primary user to primary user with secondary interactive display devices 10.B to configure their settings, for example, in accordance with permissions and/or options not accessible by student users when interacting with their respective secondary interactive display devices 10.B. For example, a teacher walking around the classroom can perform configure and/or perform various functionality upon secondary interactive display devices 10.B in a same or similar fashion as controlling the secondary interactive display devices 10.B from their own primary interactive display device, where a given secondary interactive display device 10.B identifies the teacher's touch-based, touchless, and/or passive device input as being by the teacher, rather than the student, based on identifying a corresponding frequency in the input associated with the teacher, based on identifying the corresponding user device, such as a writing passive device 5115, as being associated with the teacher, based on detecting a position of the teacher and determining the input is induced by the teacher based on the position of the input, or based on other means of detecting the teacher as interacting with or being in proximity to the interactive display devices 10 as described herein.

Figure 59E:
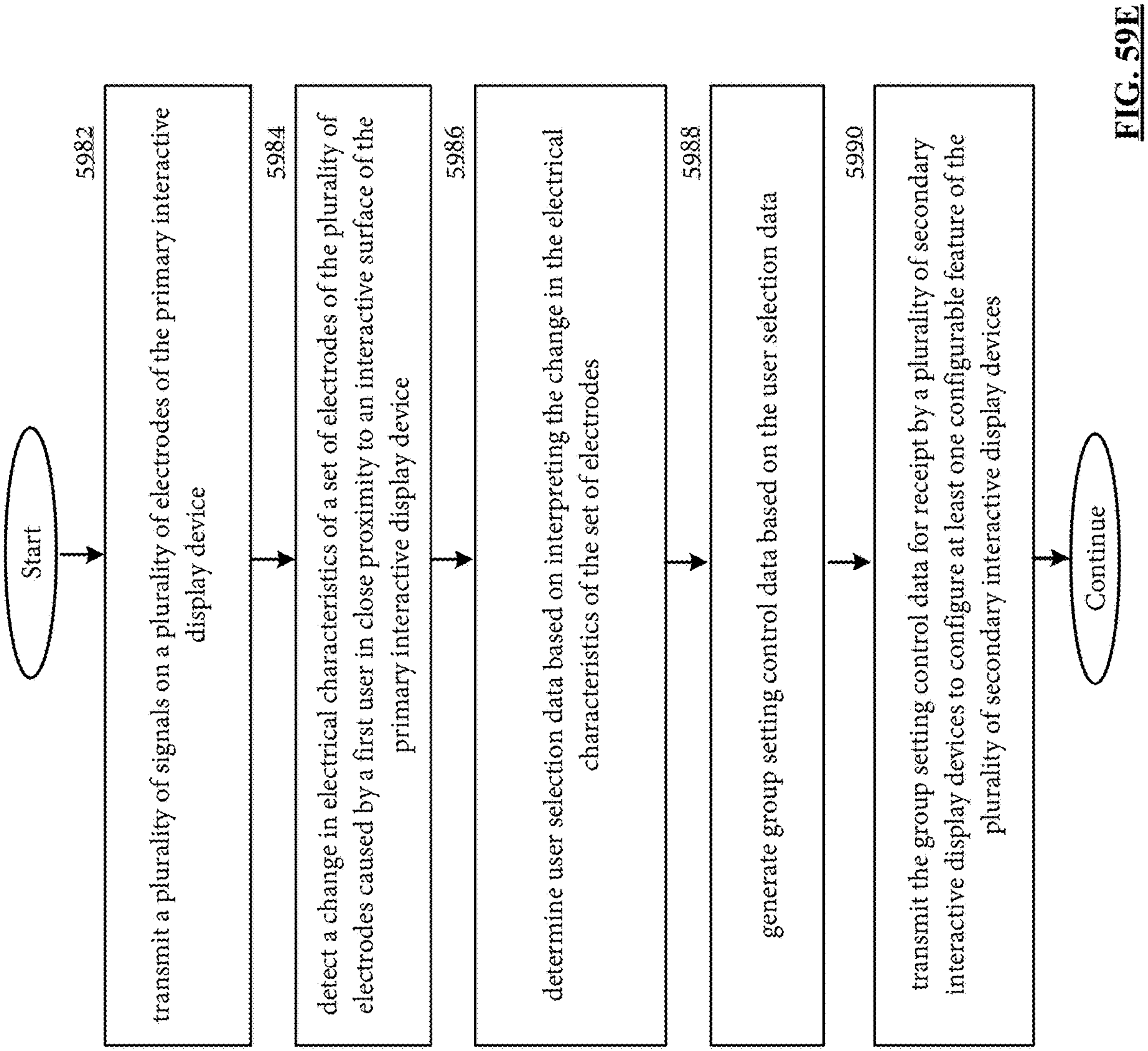
FIG. 59E is a logic diagram of an example of a method in accordance with the present disclosure.

FIG. 59E illustrates a flow diagram of an embodiment of a method in accordance with the present disclosure. In particular, a method is presented for execution by and/or use in conjunction with an interactive display device 10 such as a primary interactive display device 10.A of FIGS. 59A-59D, interactive tabletop 5505, interactive computing device, processing module 42, and/or other processing resources and/or display devices described herein. Some or all steps of FIG. 59E can be performed in conjunction with performance of some or all steps of FIG. 54P and/or some or all steps of one or more other methods described herein.

Step 5982 includes transmitting a plurality of signals on a plurality of electrodes of the primary interactive display device. For example, step 5982 is performed via a plurality of DSCs of a primary interactive display device. Step 5984 includes detecting at least one change in electrical characteristics of a set of electrodes of the plurality of electrodes caused by a first user in close proximity to an interactive surface of the primary interactive display device. For example, step 5984 is performed by a set of DSCs of the plurality of DSCs. Step 5986 includes determining user selection data based on interpreting the change in the electrical characteristics of the set of electrodes. For example, step 5986 is performed via a processing module of the primary interactive display device. Step 5988 includes generating group setting control data based on the user selection data. For example, step 5986 is performed via a processing module of the primary interactive display device. Step 5990 includes transmitting the group setting control data for receipt by a plurality of secondary interactive display devices to configure at least one configurable feature of the plurality of secondary interactive display devices. For example, step 5990 is performed via a network interface of the primary interactive display device.

FIGS. 60A-60E illustrate embodiments of secondary interactive display devices 10.B that are operable to generate user engagement data 5430 based on detecting the position of a corresponding user and/or user interaction by a corresponding user, for example, during a session. The user engagement data 5430 can indicate whether the user is likely to be attentive and engaged, or whether the user is likely to instead be inattentive, distracted, or asleep. For example, various anatomical features of the user that are touching and/or hovering over the touch screen display of a secondary interactive display devices 10.B can be detected and processed to determine a position of the user while seated at a corresponding desk, for example, based on generating anatomical feature mapping data as discussed in conjunction with FIGS. 64AO-64AQ, where the user engagement data 5430 is generated based on the determined position of the user. As another example, the user notation data 4920.B generated based on the user's interaction with the touch screen 12 is processed to determine: whether the user is actively taking notes; whether the user is writing letters, number, and/or mathematical symbols or is simply doodling pictures, for example, based on implementing the shape identification function of FIGS. 61A-61H; whether the user notes are relevant and/or correct in the context of the course, for example, based on implementing the context-based processing function 5540 of FIGS. 61A-61H; and/or other processing of user notation data. Some or all features and/or functionality of the interactive display devices 10 of FIGS. 60A-60H can be utilized to implement the primary interactive display device 10.A and/or the secondary interactive display device 10.B of FIG. 54A and/or any other interactive display devices 10 described herein.

Figure 60A:
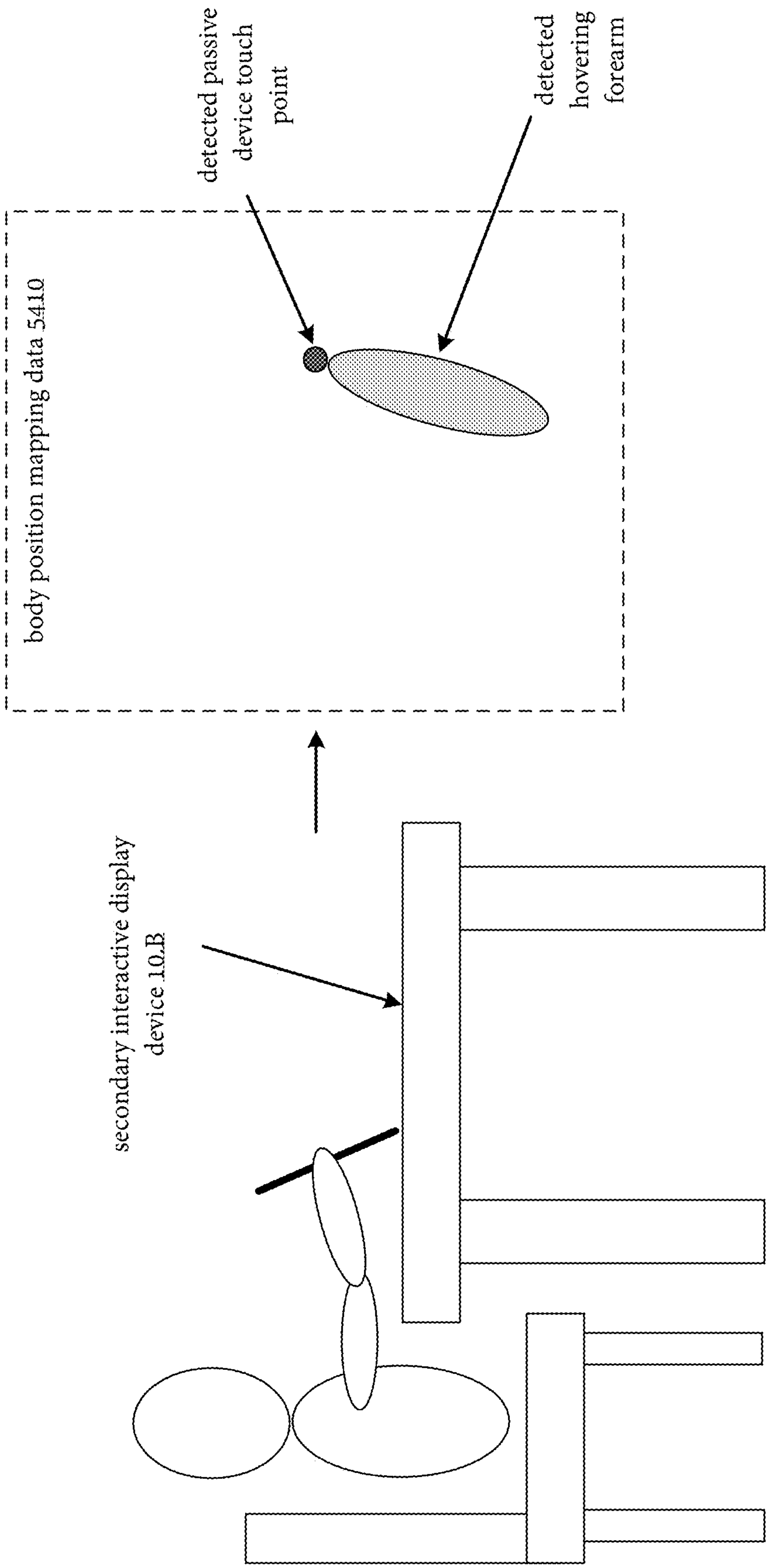
FIGS. 60A and 60B are pictorial diagrams illustrating example body position mapping data generated by an interactive display device in accordance with the present disclosure.
Figure 60B:
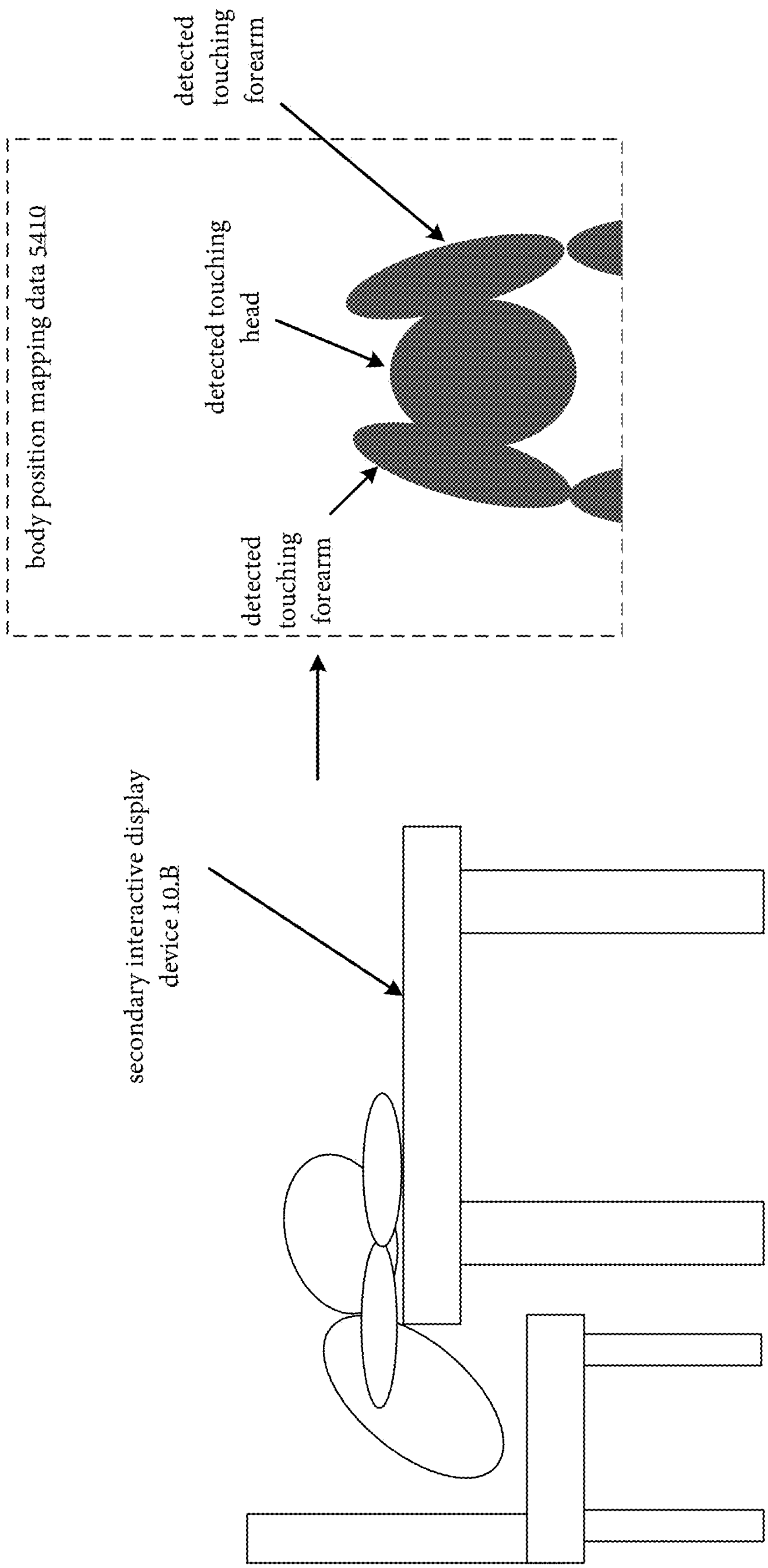

Examples of body position mapping data 5410 generated by the same or different secondary interactive display device 10.B are illustrated in FIGS. 60A and 60B. The body position mapping data 5410 can be generated based on a user's position relative to the secondary interactive display device 10.B. The body position mapping data 5410 can be generated via at least one processing module, such as at least one processing module of the corresponding secondary interactive display device 10. For example, the body position mapping data 5410 is generated in a same or similar fashion anatomical feature mapping data as discussed in conjunction with FIGS. 64AO-64AQ, is generated based on processing corresponding capacitance image data generated by DSCs of the secondary interactive display device 10.B and/or is otherwise generated to identify various hovering and/or touching body parts or passive devices based on human anatomy and/or detectable features. Lighter shading of the illustrative depiction of body position mapping data 5410 illustrates hovering features that are detected to be further away from the surface of secondary interactive display device 10.B, while darker shading illustrates hovering and/or touching features that are detected to be closer to and/or touching the surface of secondary interactive display device 10.B.

As illustrated in the example of FIG. 60A, a user's hovering forearm is detected and a passive device touch point is detected in body position mapping data 5410, where other body parts of the user are not detected, indicating the user is sitting upright and actively notating upon the secondary interactive display device 10.B. As illustrated in the example, of FIG. 60B, a user's touching forearms and touching head are detected in body position mapping data 5410, indicating the user is laying upon the secondary interactive display device 10.B with their head down.

In other embodiments, other body position mapping data 5410 can be generated via additional sensors integrated in other placed in addition to the tabletop surface of a desk, such as in the back, bottom, or arms of a user chair 5010 or other seat occupied by the user while at the corresponding secondary interactive display device; in the legs and/or sides of an interactive tabletop, in a computing device such as an interactive pad that includes its own interactive display device 10 carried by the user and optionally placed upon a table, lap of the user, or desk for use by the user, in user input devices utilized by the user while working; or other locations where a user's attentiveness can similarly be monitored via their body position. Some or all body position mapping data 5410 can be generated based on DSCs generating capacitance image data due to changes in characteristics of electrodes or a corresponding electrode array, and/or based on other types of sensors such as cameras, occupancy sensors, and/or other sensors.

Figure 60C:
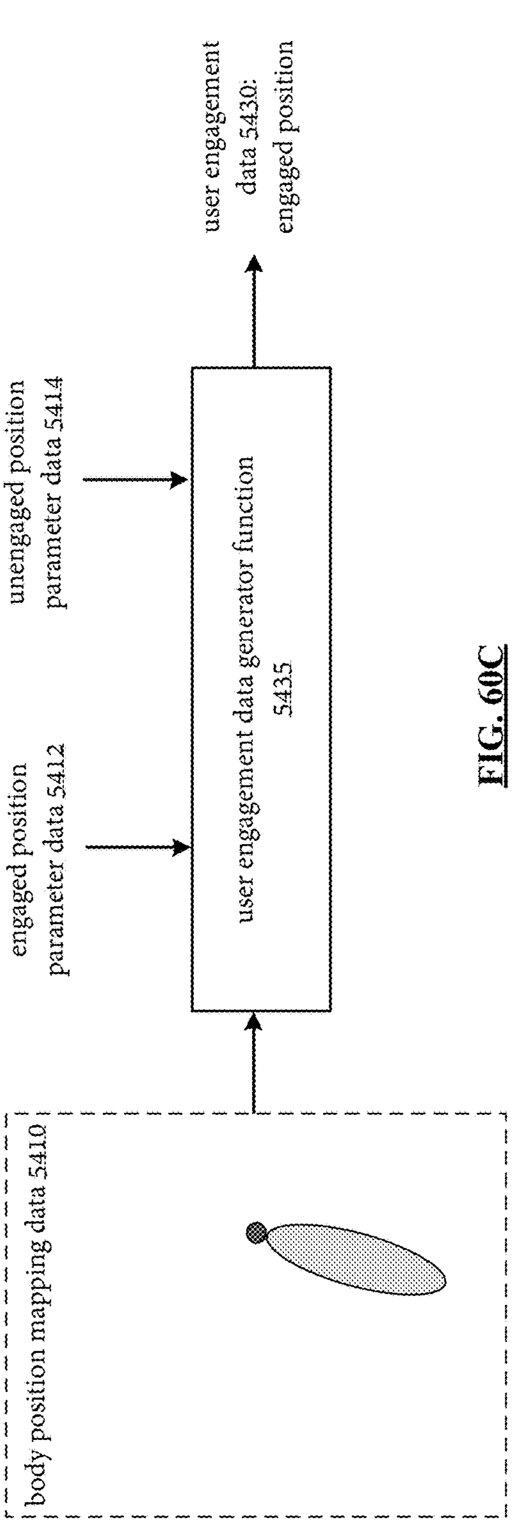
FIGS. 60C and 60D are schematic block diagrams illustrating generation of user engagement data by a user engagement generator function based on example body position mapping data in accordance with the present disclosure.
Figure 60D:
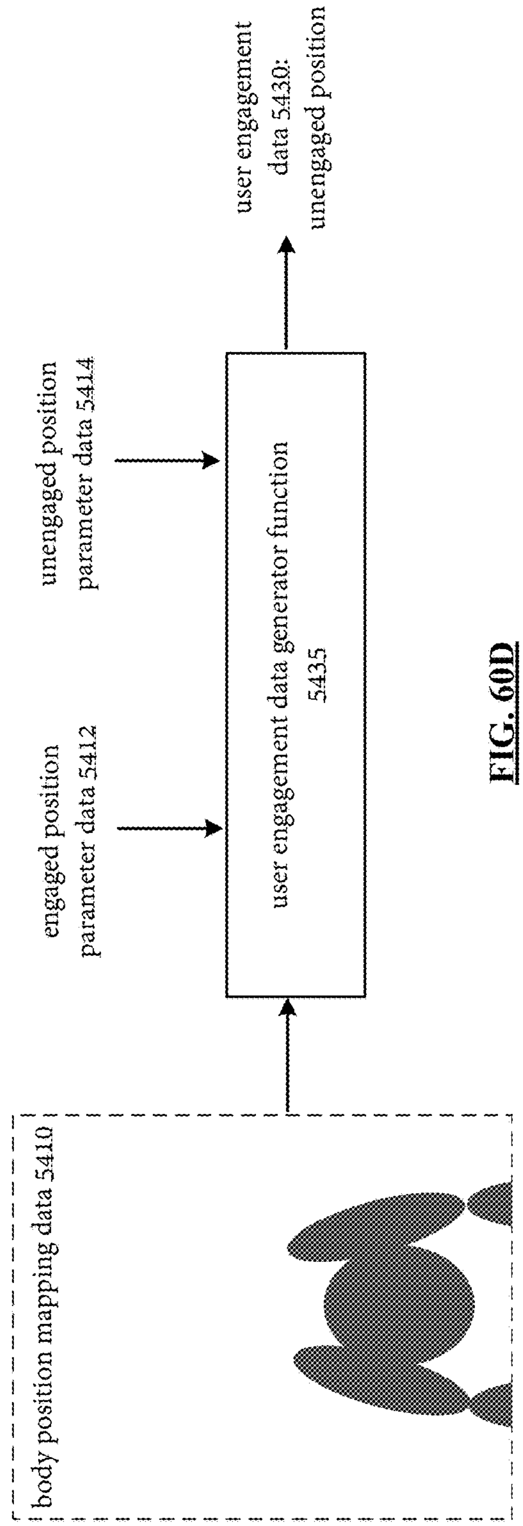

FIGS. 60C and 60D illustrate example execution of a user engagement data generator function 5435 upon the user engagement data 5430 of FIGS. 60A and 60B, respectively. The user engagement data generator function 5435 can be performed via at least one processing module, such as at least one processing module of the corresponding secondary interactive display device 10.

Performing the user engagement data generator function 5435 upon body position mapping data 5410 can render generation of corresponding user engagement data 5430, which can indicate whether or not the user is detected to be engaged. Alternatively or in addition to making this binary determination, the user engagement data 5430 can be generated as a quantitative score of a set of possible scores that includes more than two scores, for example, indicating a range of attentiveness, where higher scores indicate higher levels of attentiveness than lower scores, or vice versa.

The user engagement data generator function 5435 can be performed based on engaged position parameter data 5412 indicating one or more parameters that, when detected in the given body position mapping data 5410, indicate the user is in an engaged position. The user engagement data generator function 5435 can alternatively or additionally be performed based on unengaged position parameter data 5414 indicating one or more parameters that, when detected in the given body position mapping data 5410, indicate the user is in an unengaged position. The engaged position parameter data 5412 and/or the unengaged position parameter data 5414 can be received via the network, accessed in memory accessible by the secondary interactive display device 10, automatically generated, for example, based on performing at least one artificial intelligence function and/or machine learning function, can be configured via user input, and/or can be otherwise determined.

In some embodiments, the user engagement data generator function 5435 is performed across a stream of body position mapping data 5410 generated over time, for example corresponding to a stream of capacitance image data generated over time. For example, the movement of the user's position and/or amount of time the user assumes various position is determined and compared to engaged position parameter data 5412 and/or the unengaged position parameter data 5414

In the example of FIG. 60C, the example body position mapping data 5410 of FIG. 60A is processed via performance of user engagement data generator function 5435 to render user engagement data 5430 indicating the user is assuming an engaged position. For example, the user engagement data 5430 indicates the user is assuming an engaged position based on the body position mapping data 5410 of FIG. 60A meeting some or all parameters of the engaged position parameter data 5412, and/or based on the body position mapping data 5410 of FIG. 60A not meeting some or all parameters of the unengaged position parameter data 5414.

In the example of FIG. 60D, the example body position mapping data 5410 of FIG. 60B is processed via performance of user engagement data generator function 5435 to render user engagement data 5430 indicating the user is assuming an unengaged position. For example, the user engagement data 5430 indicates the user is assuming an unengaged position based on the body position mapping data 5410 of FIG. 60B meeting some or all parameters of the unengaged position parameter data 5414, and/or based on the body position mapping data 5410 of FIG. 60B not meeting some or all parameters of the engaged position parameter data 5412.

Figure 60E:
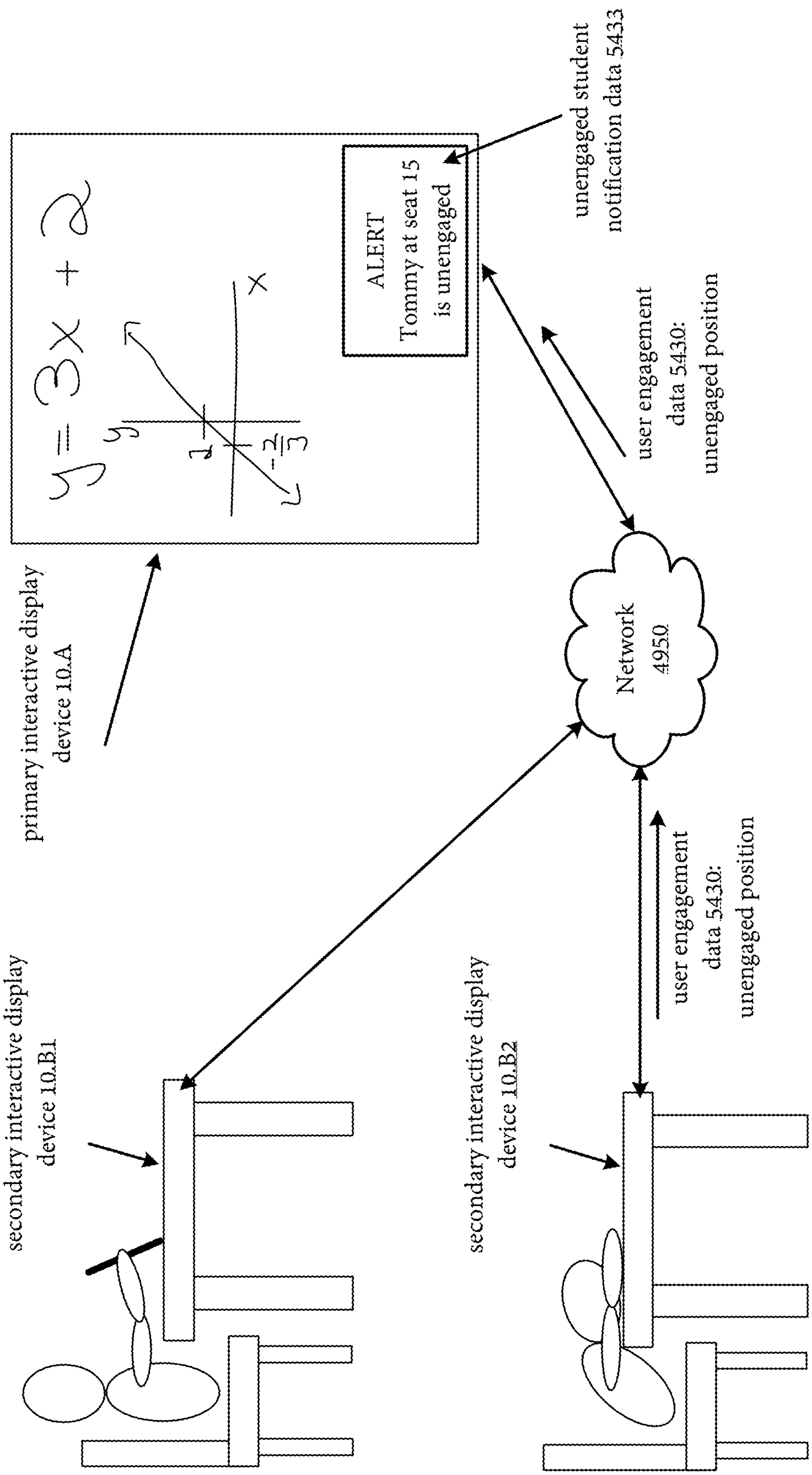
FIG. 60E is a pictorial diagram illustrating communication of example user engagement data by secondary interactive display devices in accordance with the present disclosure.

FIG. 60E illustrates an embodiment where secondary interactive display devices 10.B can be operable to transmit user engagement data 5430 to primary interactive display device 10.A to cause primary interactive display device 10.A to display unengaged student notification data 5433 accordingly, for example, to alert the teacher of inattentive students while they are turned away from the class and facing the primary interactive display device 10.A while notating. The secondary interactive display devices 10.B can transmit the user engagement data 5430 and/or a corresponding notification in response to generating user engagement data 5430 indicating an unengaged position and/or in response to determining the user engagement data 5430 for body position data over at least a threshold period of time indicates the unengaged position. The unengaged student notification data 5433 can indicate a user identifier of the user, such as the user's name, and/or can indicate an identifier or graphical position of the corresponding secondary interactive display devices 10.B.

The user engagement data can be generated and/or transmitted in an in-person learning environment or a remote learning environment. For example, the unengaged student notification data 5433 is transmitted to a teacher's interactive display device or computing device, such as their personal computer, while at home or in another location teaching a remote class to students that are participating while at their own homes or other remote locations from the teacher's location. Similarly, such user engagement data can be generated and/or transmitted in other remote environments such as telephone or video calls by employees at a meeting or other users engaging in a work meeting.

In embodiments where the user engagement data is generated in remote work and/or educational environments, the user engagement data can simply indicate whether the user is seated in the chair and/or looking at their device, to detect user engagement in environments where users can optionally mute their audio recording or turn off their video. For example, the user engagement data simply indicates whether the given user is present or absent from being seated at and/or in proximity to the secondary user device, and/or their computing device utilized to display video data and/or project audio data of the corresponding remote class and/or meeting. Other people, such as bosses, management, staff, parents, or other people responsible for the user can be notified of the user's detected engagement via notifications sent to and/or displayed by their respective computing devices, such as their cell phone and/or computer, for example, even if these users are not present at the meeting and/or class themselves. Such people to be notified for a given user can be configured in each user's user profile data and/or can be configured by a corresponding primary user.

The user engagement data 5430 and/or unengaged student notification data 5433 can alternatively or additionally be displayed by the corresponding secondary interactive display device 10 to alert the secondary user that they are not attentive. The user engagement data 5430 and/or unengaged student notification data 5433 can alternatively or additionally be transmitted to and/or be displayed by a computing device 4942.A of the primary user. The user engagement data 5430 and/or unengaged student notification data 5433 can alternatively or additionally be sent to and displayed by a computing device 4942.B of the secondary user to alert the secondary user of their unengaged position. The user engagement data 5430 and/or unengaged student notification data 5433 can alternatively or additionally be transmitted to and/or be stored in user profile data of the corresponding secondary user and/or can be mapped to the session identifier data and/or the user identifier data in a database or other organizational structure stored by of memory modules 4944.

Figure 60F:
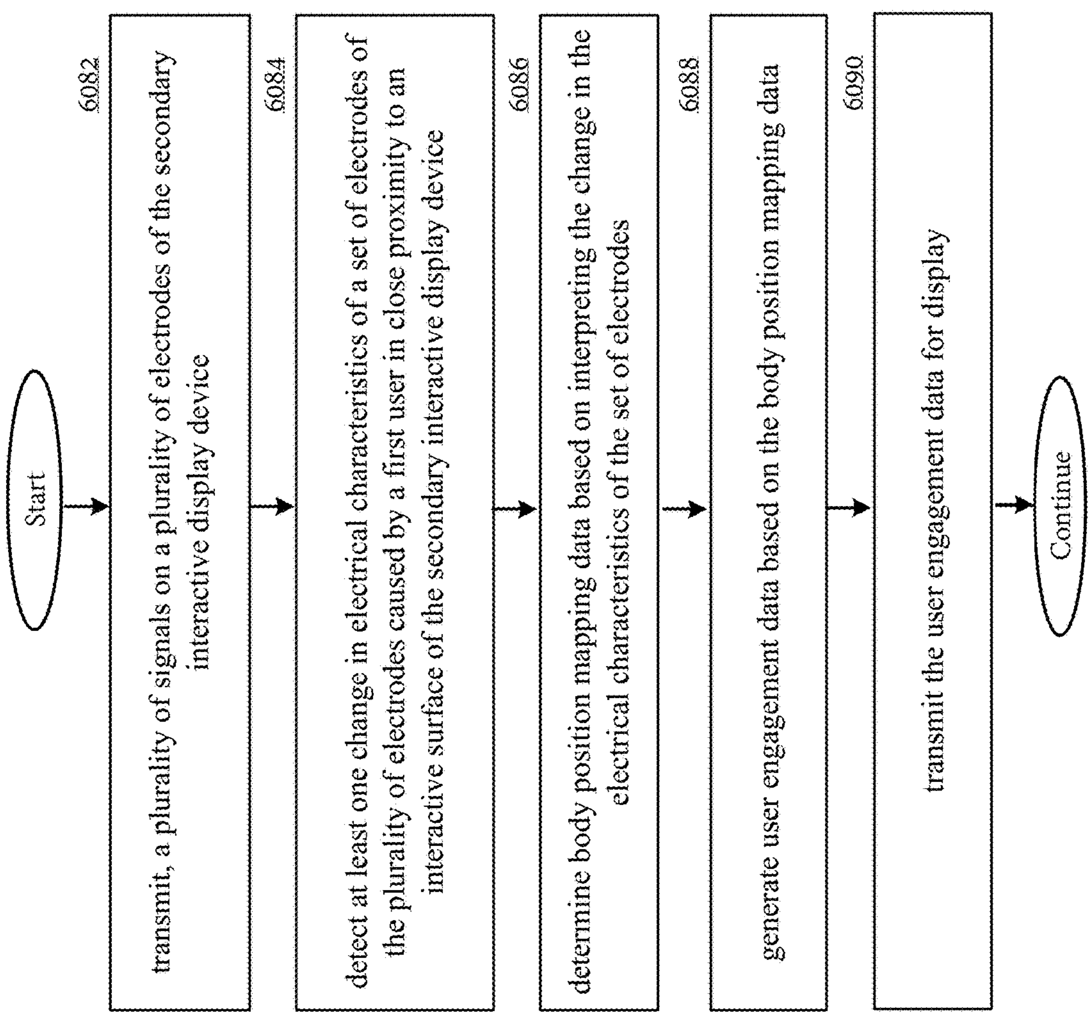
FIG. 60F is a logic diagram of an example of a method in accordance with the present disclosure.

FIG. 60F illustrates a flow diagram of an embodiment of a method in accordance with the present disclosure. In particular, a method is presented for execution by and/or use in conjunction with an interactive display device 10 such as a secondary interactive display device 10.B of FIGS. 60A-60E, interactive tabletop 5505, interactive computing device, processing module 42, and/or other processing resources and/or display devices described herein. Some or all steps of FIG. 59E can be performed in conjunction with performance of some or all steps of FIG. 54Q and/or some or all steps of one or more other methods described herein.

Step 6082 includes transmitting a plurality of signals on a plurality of electrodes of a secondary interactive display device. For example, step 6082 is performed by a plurality of DSCs of the secondary interactive display device. Step 6084 includes detecting at least one change in electrical characteristics of a set of electrodes of the plurality of electrodes caused by a first user in close proximity to an interactive surface of the secondary interactive display device. For example, step 6084 is performed via a set of drive sense circuits of the plurality of drive sense circuits. Step 6086 includes determining body position mapping data based on interpreting the change in the electrical characteristics of the set of electrodes. For example, step 6086 is performed via at least one processing module of the secondary interactive display device. Step 6098 includes generating user engagement data based on the body position mapping data. For example, step 6098 is performed via the at least one processing module. Step 6090 includes transmitting the user engagement data for display. For example, step 6090 is performed via a network interface of the secondary interactive display device.

In various embodiments, the user engagement data is generated to indicate whether the user body position corresponds to an engaged position or an unengaged position based on determining whether the body position mapping data meets and/or otherwise compares favorably to engaged position parameter data and/or unengaged position parameter data.

In various embodiments, the engaged position parameter data indicates and/or is based on at least one of: an upright position of the torso or a forward-facing position of the head. In various embodiments, the unengaged position parameter data indicates and/or is based on at least one of: a slumped position of the torso, a forward leaning position of the head, a backward leaning position of the head, a left-turned position of the head, a right-turned position of the head, or a personal device interaction position. In various embodiments, the unengaged position parameter data is determined based on determining a portion of the user's body in contact with the surface of the interactive surface corresponds to at least one of: a forehead, a face, one or two forearms, one or two elbows, a contacting surface area that is greater than a threshold area, and/or a temporal period that the portion of the user's body is detected to be in contact with the surface exceeding a threshold length of time.

In various embodiments, the method further includes determining a user identifier of the user based on the user and/or a computing device of the user being in proximity of the secondary interactive display device. The method can further include generating the user engagement data to further indicate the user identifier.

In various embodiments, the user engagement data is transmitted based on determining the user engagement data indicates the unengaged position. In various embodiments, the user engagement data is transmitted to a primary interactive display device, where the primary interactive display device displays unengaged student notification data based on the user engagement data.

In various embodiments, the method includes generating updated configuration data for the secondary interactive display device to update at least one functionality of the secondary interactive display device based on determining the user engagement data indicates the unengaged position.

In various embodiments, the method further includes determining, by the processing module, user notation data based on further interpreting the change in the electrical characteristics of the set of electrodes. The method can further include displaying, via the display, the user notation data. The user engagement data can indicate the user body position corresponds to an engaged position or an unengaged position based on the user notation data.

In various embodiments, the method includes processing the user notation data to determine one of: the user notation data compares favorably to a context of the session materials data, or the user notation data compares unfavorably to a context of the session materials data. The user engagement data can indicate the user body position corresponds to an engaged position based on the user notation data being determined to compare favorably to the context of the session materials data. The user engagement data can indicate the user body position corresponds to an unengaged position based on the user notation data being determined to compare unfavorably to the context of the session materials data.

FIGS. 61A-61H illustrate embodiments where user notation data 4920 generated by an interactive display device 10 can be automatically processed via processing resources, such as at least one processing module of the interactive display device 10. This processing can render generation of auto-generated notation data 5545, which can correspond to corrections to the user notation data 4920 and/or computed results and/or data corresponding to the user notation data 4920. Some or all features and/or functionality of the interactive display devices 10 of FIGS. 61A-61H can be utilized to implement the primary interactive display device 10.A and/or the secondary interactive display device 10.B of FIG. 54A and/or any other interactive display devices 10 described herein.

The auto-generated notation data 5545 can be generated by the at least one processing module based on performing a shape identification function 5530 upon user notation data to generate processed notation data 5535 and/or based on performing a context-based processing function 5540 upon the processed notation data 5535 to generate the auto-generated notation data 5545. The shape identification function 5530 can be performed based on identifying known characters, symbols, diagrams, or other recognizable shapes in the user notation data, where the processed notation data 5535 indicates these identified shapes. The context-based processing function can be performed based on processing the processed notation data 5535 by detecting errors in the processed notation data 5535, solving and/or plotting a corresponding mathematical equation, executing corresponding computer code, propagating updated symbols across the entirety of the notation data, updating the size, shape, or handwriting of the user notation data, or performing other processing of the processed notation data in the context of the corresponding type of data, the corresponding course, and/or other context.

Figure 61A:
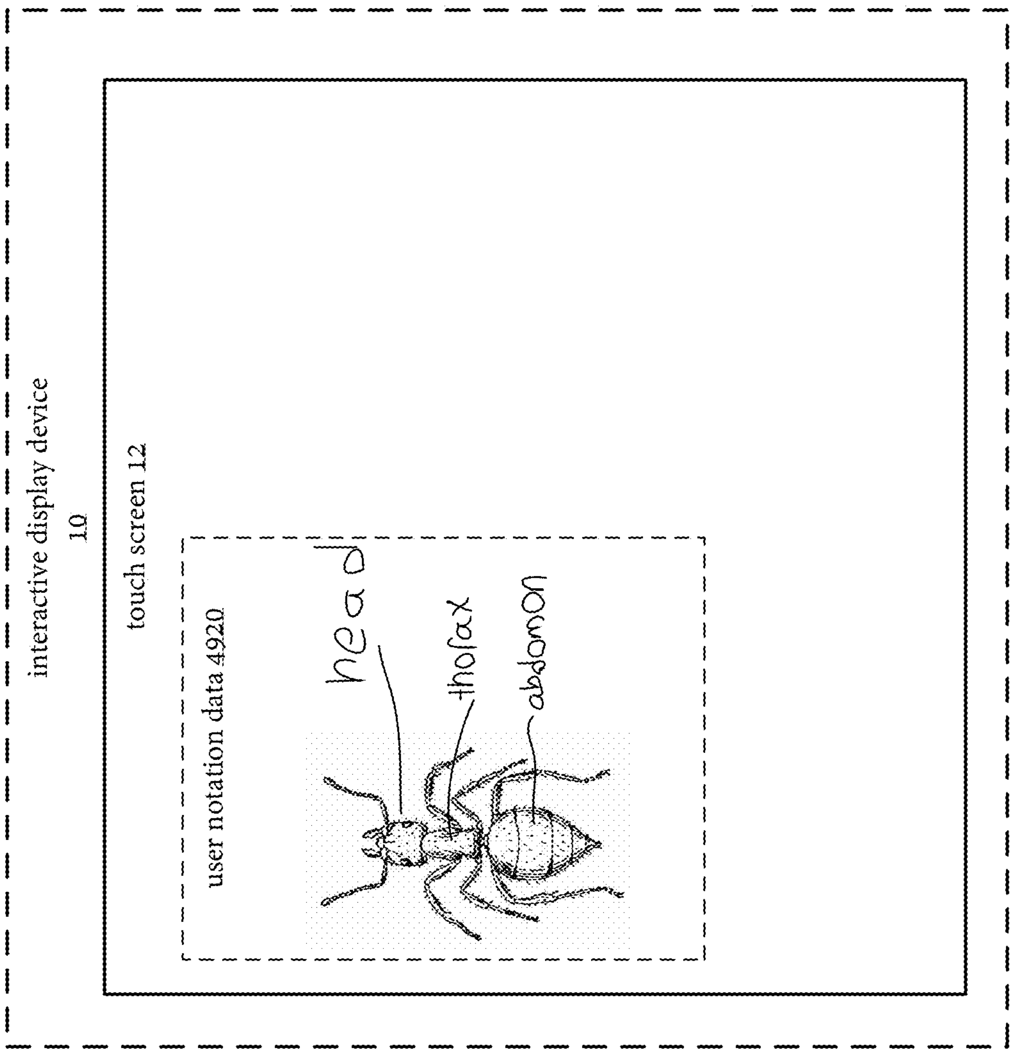
FIG. 61A is a pictorial diagram illustrating display of example user notation data by an interactive display device in accordance with the present disclosure.
Figure 61B:
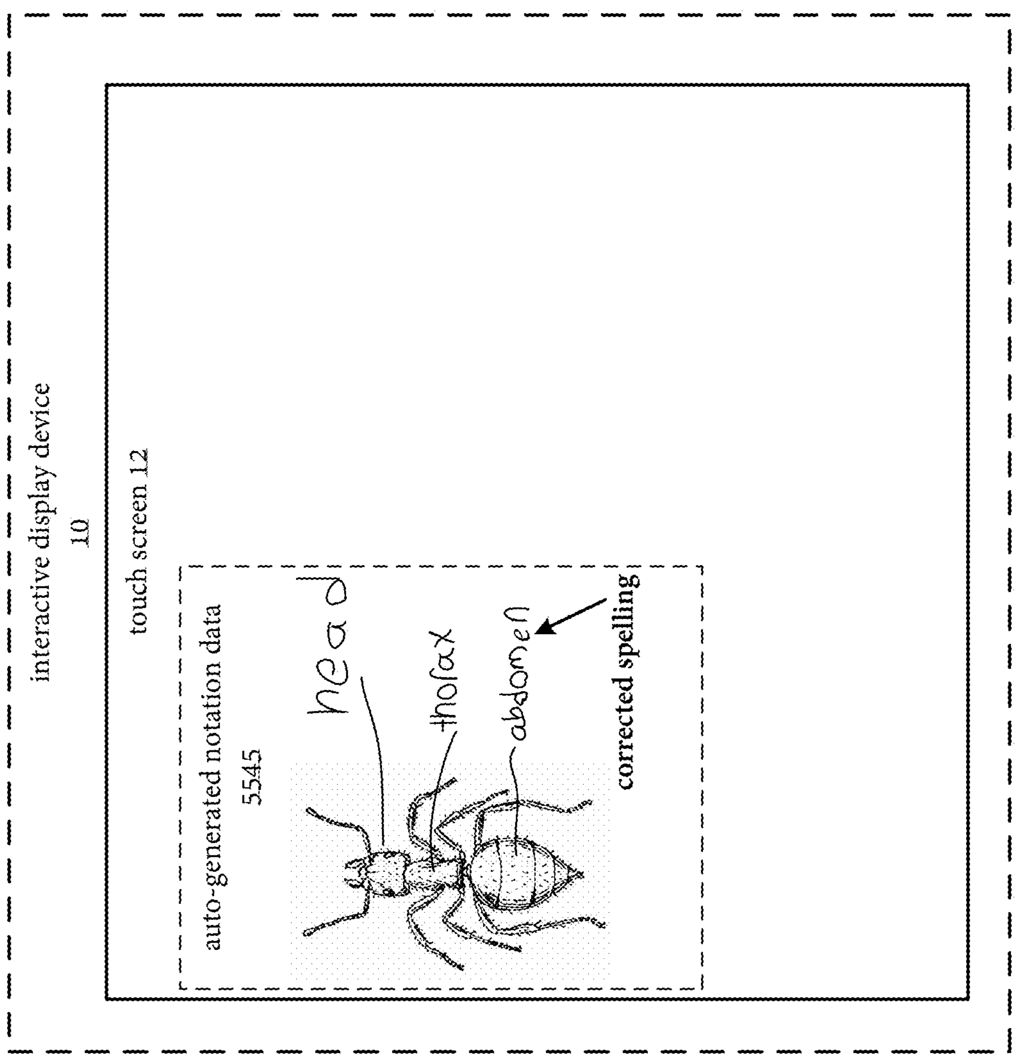
FIG. 61B is a is a pictorial diagram illustrating display of example auto-generated user notation data by an interactive display device in accordance with the present disclosure.

FIGS. 61A and 61B illustrate an example of generating auto-generated notation data 5545 to correct a detected error in user notation data 4920 generated by the interactive display device, FIG. 61A illustrates user notation data 4920 at time $t_0$, where a diagram, such as graphical image data uploaded from a memory module, is labeled by a user via user input to touch screen 12 as discussed previously, such as via a teacher interacting with a corresponding primary interactive display device 10.A or via a student interacting with a corresponding primary interactive display device 10.B. The user notation data 4920 can be processed by at least one processing module of the interactive display device 10 to detect a spelling error in the corresponding text, where the word "abdomen" is determined to be misspelled as "abdomon" in the user notation data 4920.

At time $t_1$ after $t_0$, the user notation data 4920 is automatically updated as auto-generated notation data 5545 displayed by the interactive display device 10 to correct the spelling detected in the user notation data 4920, as illustrated in FIG. 61B. The auto-generated notation data 5545 can be generated immediately after the notation of the word "abdomon" is completed by the user and/or as the user continues to notate, for example, where such errors are corrected as the user continues to notate, to enable seamless notating during a lecture without necessitating erasing of such errors. Alternatively or in addition, the auto-generated notation data 5545 can be generated after some or all user notation data 4920, for example, prior to sending to memory for storage and/or prior to download by a user device.

Figure 61C:
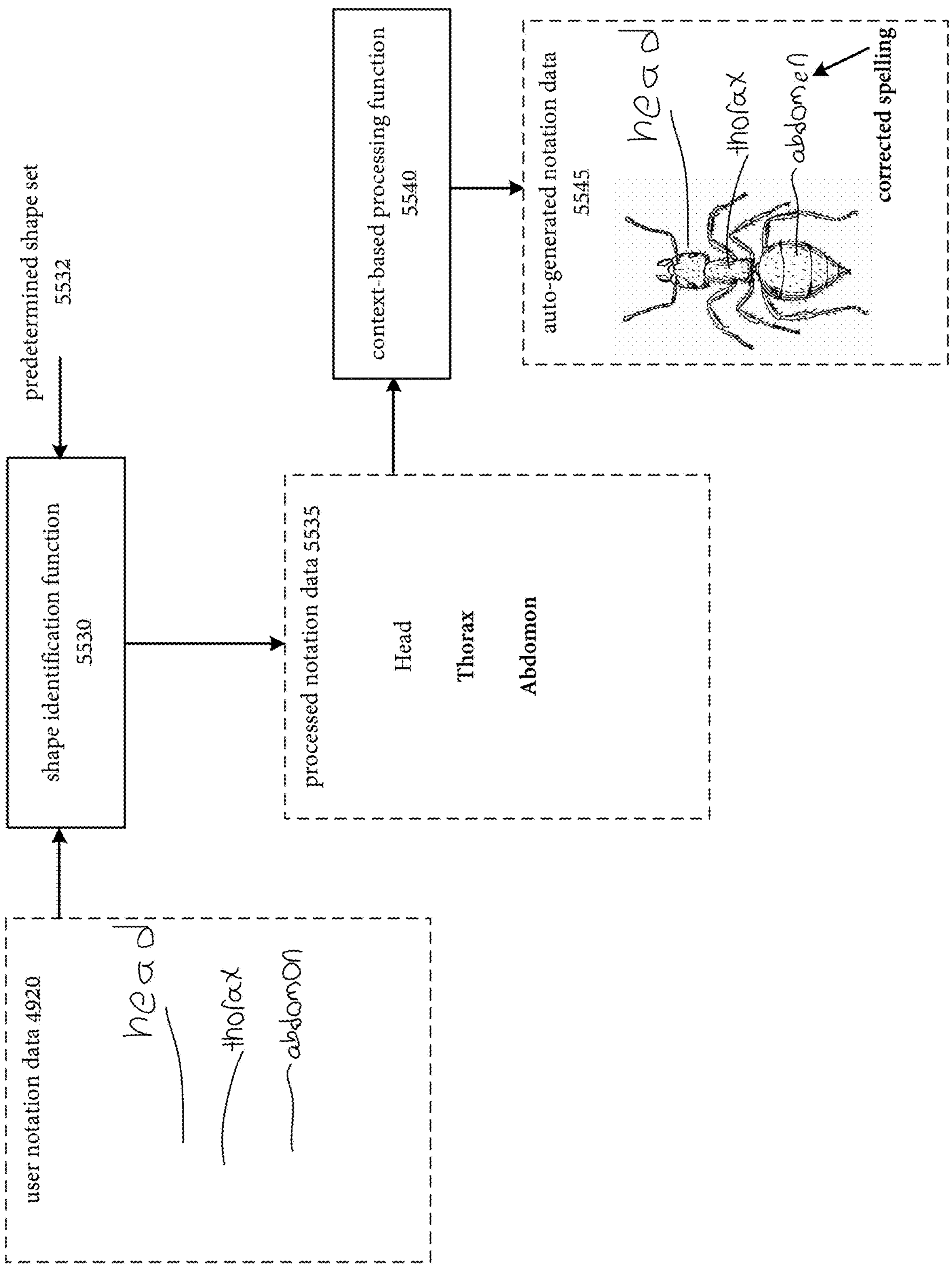
FIGS. 61C-61G are schematic block diagrams illustrating generation of processed notation data and auto-generated notation data via a shape identification function and a context-based processing function in accordance with the present disclosure.

FIG. 61C illustrates example execution of a shape identification function 5530 and a context-based processing function 5540, for example, via at least one processing module of the given interactive display device 10. Performance of the shape identification function 5530 upon the example user notation data 4920 renders detection of the words "head", "thorax" and "abdomon", for example, based on processing the notated handwriting and detecting the corresponding letters of these words. The context-based processing function 5540 can process these words to identify and correct misspellings, for example, where "abdomon" is corrected as "abdomon" in generating the auto-generated notation data 5545 to replace the user notation data 4920.

The corrected spelling, such as the deletion of the 'o' and insertion of the 'e' can be in the user's handwriting, where another instance of the letter 'e' or average version of the user's writing of the letter 'e' is copied to substitute the prior 'o'. Alternatively a standard font for the 'e' is utilized for the 'e' replacing the 'o'. The size of the 'e' can be selected automatically based on the size of the respective other letters in the corrected word. In some embodiments, some or all other letters can optionally be replaced with an average version of the user's writing and/or a standard font to make the words more legible. This can be useful in correcting inadvertent errors by the instructor in giving a lecture or students in taking notes.

Alternatively or in addition to generating the auto-generated notation data 5545 for display, the context-based processing function 5540 can be implemented to generate a user correctness score based on the detected errors. For example, the user correctness score is utilized to generate a grade for the user in accordance with a corresponding examination. The primary user can indicate types of errors to be checked for correctness and/or can indicate an answer key for use by context-based processing function to auto-grade the user notation data 4920. In such embodiments, the auto-generated notation data 5545 is optionally not displayed via the display device 10.B.

Figure 61D:
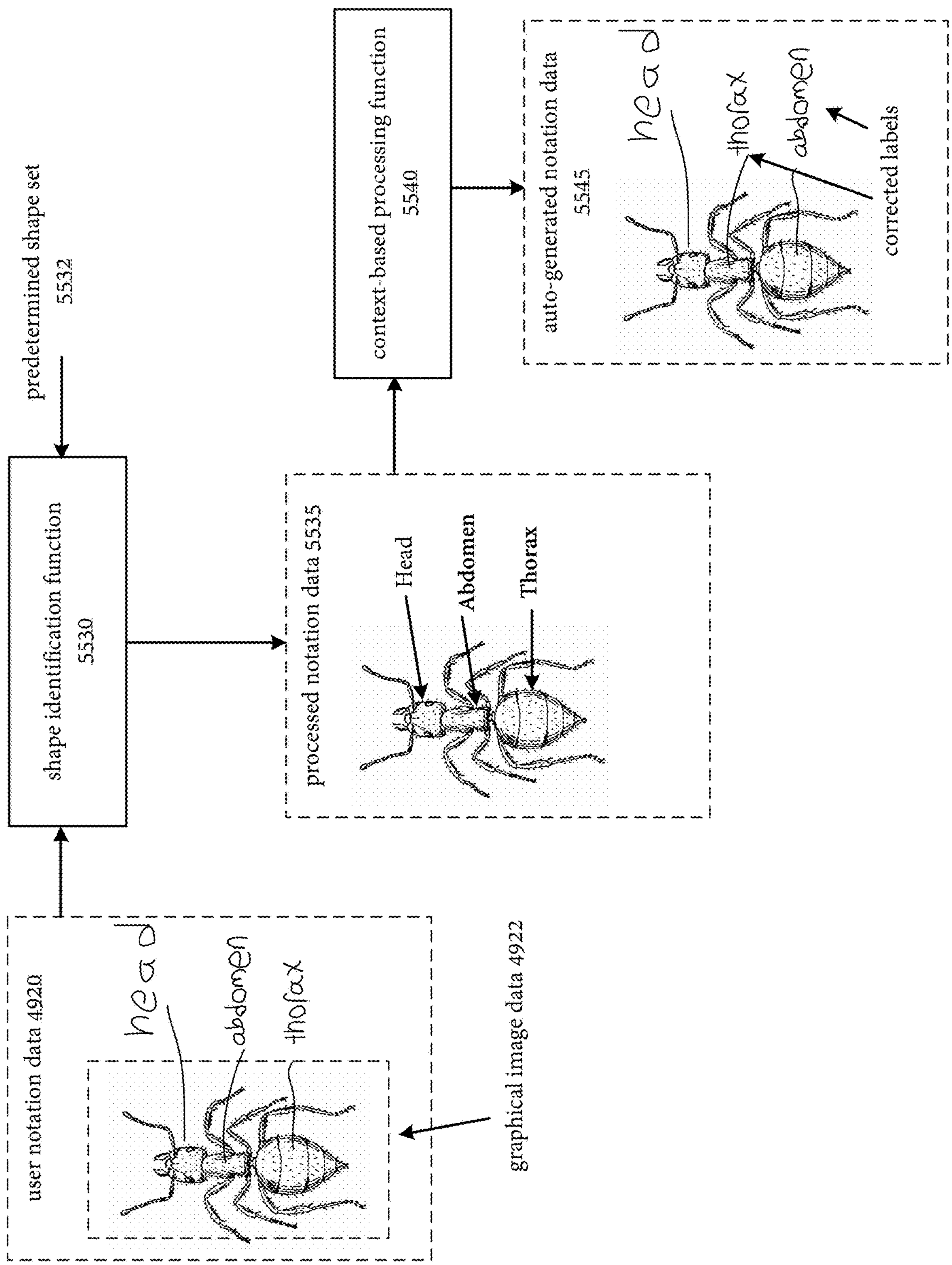

FIG. 61D illustrates another example of generating auto-generated notation data 5545, where user notation data 4920 is processed in the context of corresponding graphical image data 4922, such as a known diagram with known labels. In this example, the user notation data 4920 includes a labeling error, where abdomen and thorax are flipped. The processed notation data 5535 can again identify the corresponding words, and can further indicate the labeling of each word as a label of a corresponding part of the diagram. The context-based processing function 5540 can detect the mislabeling, for example, based on determining and/or accessing known diagram labeling data for the diagram, and can correct the mislabeling accordingly. The words in the user's own handwriting can optionally be shifted to the correct positions to maintain the user's own handwriting. Alternatively, the words are replaced with words in a standardized font. This auto-generated notation data 5545 can be displayed to replace the user notation data 4920 in correcting an inadvertent error in labeling, and/or is utilized to generate a user correctness score during an examination.

Figure 61E:
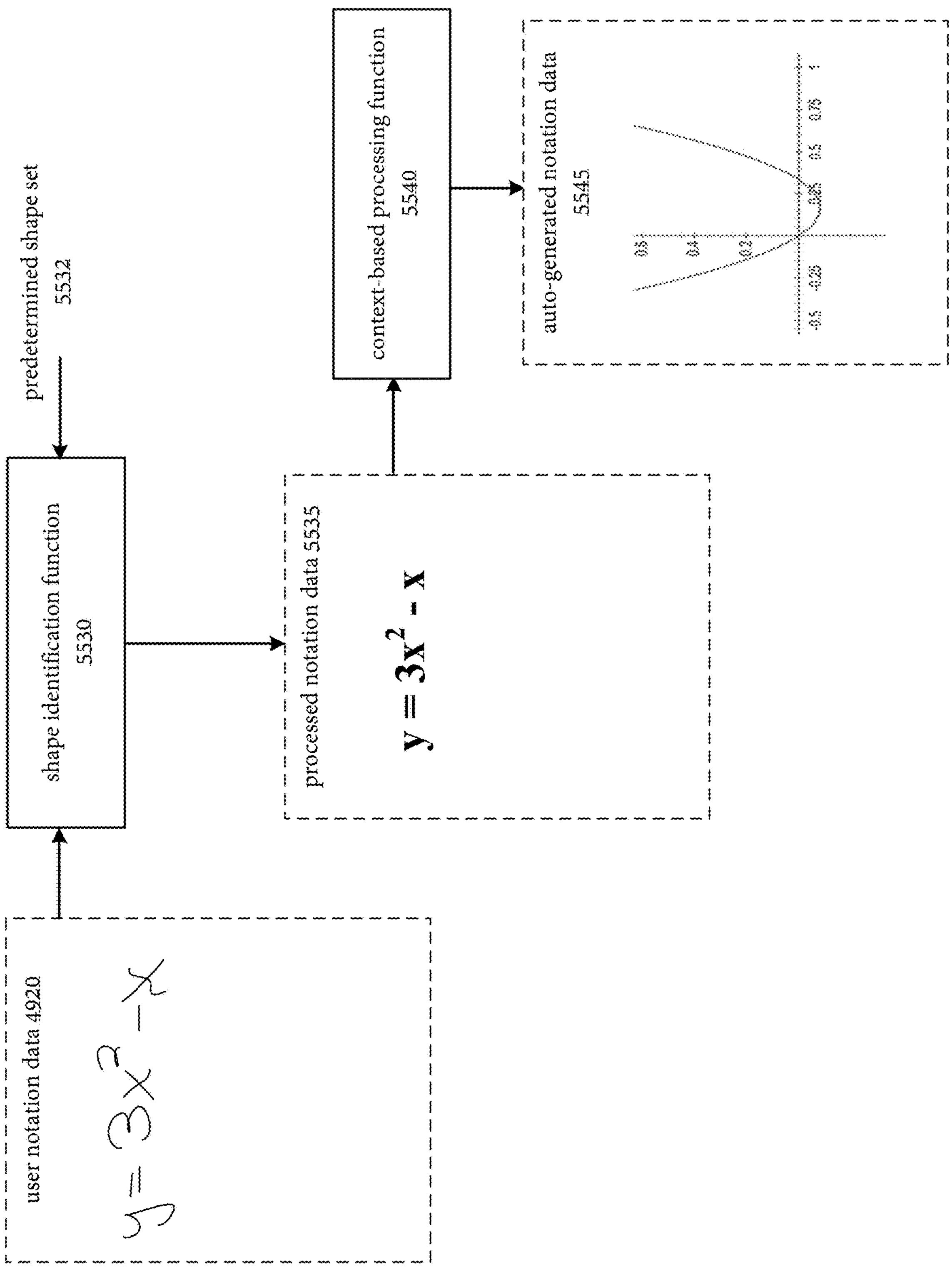

FIG. 61E illustrates another example of generating auto-generated notation data 5545, where a mathematical equation is processed and plotted based on detecting and plotting a corresponding mathematical equation. In this case the auto-generated notation data 5545 can supplement the user notation data, where this auto-generated notation data 5545 is displayed below and/or next to the user notation data 4920. This can be useful in quickly enabling generation of a plot, for example, to alleviate a lecturer or student from having to supply this graph themselves during a lecture, particularly when plotting curves of parabolic or other higher order functions can be more complicated.

Figure 61F:
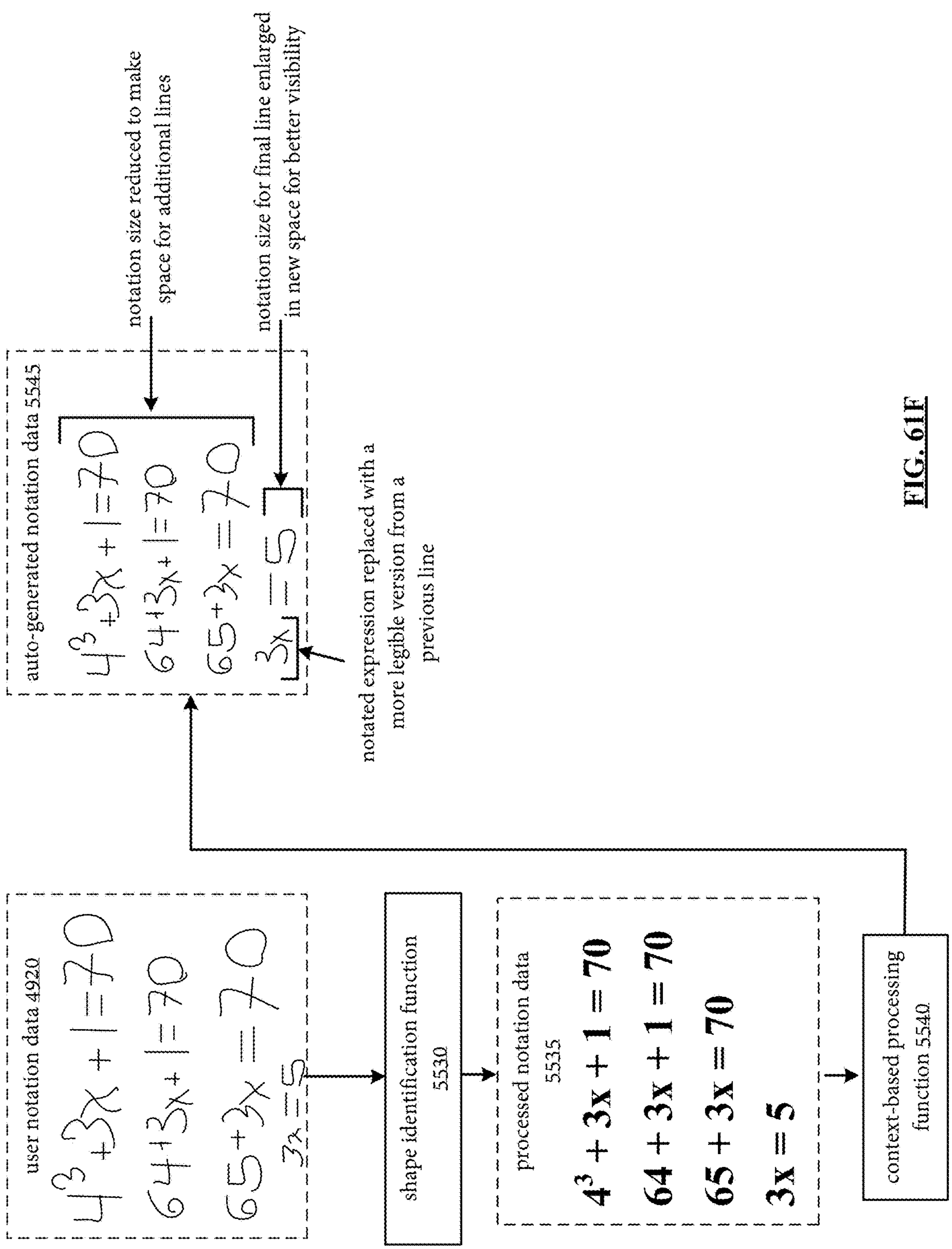
Figure 61G:
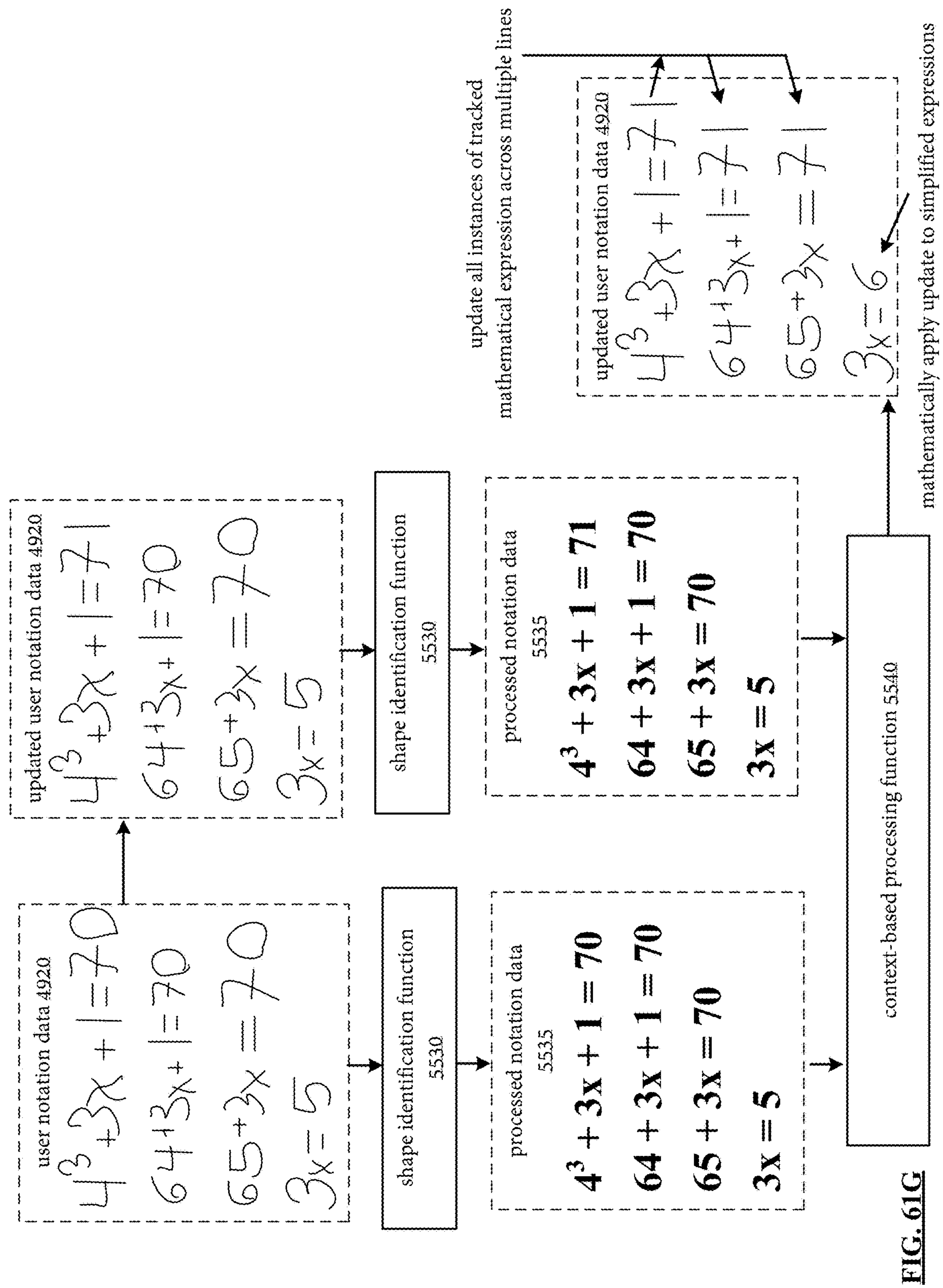

FIG. 61F illustrates another example of generating auto-generated notation data 5545, where a series of steps in solving a mathematical equation are processed to identify that the user is running out of space in the touch screen display to continue writing. Here, a final line is substantially smaller and potentially illegible. Rather than necessitating that a user, such as a lecturer at a teacher interactive whiteboard, erase the equation and begin again, the auto-generated notation data 5545 can be generated to resize the prior lines to make them smaller, enabling the final line to be larger. Furthermore, an illegible expression is replaced with a more legible version of this expression from a prior line.

In some embodiments, the user can alternatively or additionally interact with the touch screen 12 via touch-based and/or touch-based gestures to resize particular user notation data, such as circling regions of the display via a circling gesture to select the region, moving the corresponding selected region via a movement gesture to move the circled region to another location, and/or making the selected region larger or smaller via a magnification gesture or demagnification gesture, for example, via the widening or narrowing of both hands and/or of fingers on a single hand.

FIG. 61F illustrates an embodiment where a correction of or update to a mathematical term by a user can be propagated through multiple lines in simplifying a corresponding mathematical expression. For example, an instructor may wish to change variable names, may inadvertently drop a negation while resolving an expression, or may wish to change the value of one or more mathematical terms. In this example, in reaching the simplified expression "3x=5", the instructor wishes that the example equation resolved with x being equal to an integer number, and corrects the first line of the expression as setting the equality equal to "71" rather than "70" accordingly, for example, via utilizing of both a writing passive device and erasing passive device as discussed previously. Rather than the user further needing to replace all instances of "71" with "70" and update one or more mathematical simplification steps accordingly, the context-based processing function can automatically identify this change in term of updated user notation data 4920 from prior user notation data 4920, and can propagate this change automatically in the updated user notation data 4920. This can include updating simplified expressions to reflect the change based on automatically solving and/or simplifying the mathematical equation.

Other types of processing of various other types of user notation data 4920 can similarly be performed to render other types of auto-generated notation data for display to supplement and/or replace existing user notation data 4920, and/or can be utilized to score the user notation data 4920.

Figure 61H:
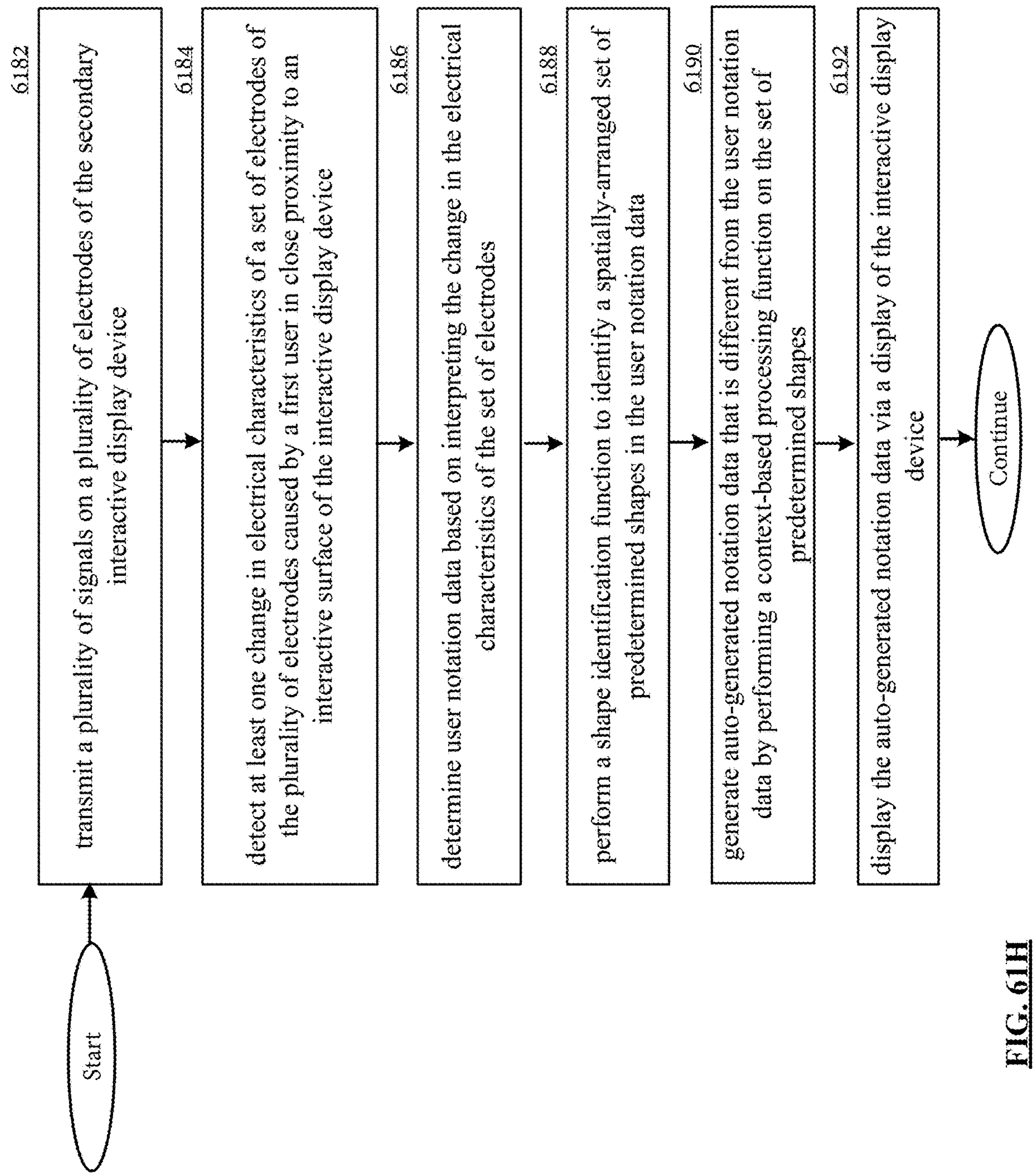
FIG. 61H is a logic diagram of an example of a method in accordance with the present disclosure.

FIG. 61H illustrates a flow diagram of an embodiment of a method in accordance with the present disclosure. In particular, a method is presented for execution by and/or use in conjunction with an interactive display device 10 such as a primary interactive display device 10.A secondary interactive display device 10.B or other interactive display device 10 of FIGS. 61A-61G, interactive tabletop 5505, interactive computing device, processing module 42, and/or other processing resources and/or display devices described herein. Some or all steps of FIG. 51H can be performed in conjunction with performance of some or all steps of FIG. 54P, FIG. 54Q, and/or some or all steps of one or more other methods described herein.

Step 6182 includes transmitting a plurality of signals on a plurality of electrodes of an interactive display device. For example, step 6182 is performed via a plurality of DSCs of the interactive display device. Step 6184 includes detecting at least one change in electrical characteristics of a set of electrodes of the plurality of electrodes caused by a first user in close proximity to an interactive surface of the interactive display device. For example, step 6184 is performed via a set of DSCs of the plurality of DSCs. Step 6186 includes determining user notation data based on interpreting the change in the electrical characteristics of the set of electrodes. For example, step 6186 is performed via at least one processing module of the interactive display device. Step 6188 includes performing a shape identification function to identify a spatially-arranged set of predetermined shapes in the user notation data. For example, step 6198 is performed via the at least one processing module of the interactive display device. Step 6190 includes generating auto-generated notation data that is different from the user notation data by performing a context-based processing function on the set of predetermined shapes. For example, step 6190 is performed via the at least one processing module of the interactive display device. Step 6192 includes displaying the auto-generated notation data via a display of the interactive display device.

In various embodiments, the auto-generated notation data is displayed instead of the user notation data In various embodiments, the auto-generated notation data is displayed in conjunction with, such as adjacent to, the user notation data.

In various embodiments, the spatially-arranged set of predetermined shapes corresponds to at least one character. Generating the auto-generated notation data can include rendering the at least one letter character in accordance with a predefined font.

In various embodiments, the spatially-arranged set of predetermined shapes corresponds to at least one word that includes an ordered set of letter characters. The auto-generated notation data can be generated based on identifying a misspelled word in the at least one word and replacing the misspelled word with a correctly spelled word.

In various embodiments, the spatially-arranged set of predetermined shapes corresponds to at least one mathematical expression that includes at least one of: at least one numeric character, at least one mathematical operator, or at least one Greek variable character. The auto-generated notation data can generated based on at least one of: identifying a mathematical error in the at least one mathematical expression and correcting the mathematical error, generating a solution of the mathematical expression based on processing the mathematical expression, wherein the auto-generated notation data indicates the solution of the mathematical expression; generating graphical plot data for the mathematical expression based on processing the mathematical expression, wherein the auto-generated notation data includes the graphical plot data; identifying a variable character in the in the at least one mathematical expression and replacing all instances of the variable character with a new variable character, and/or identifying subsequent user notation data editing one mathematical expression of a plurality of related mathematical expressions and updating other ones of the plurality of related mathematical expressions based on the subsequent user notation data.

In various embodiments, the spatially-arranged set of predetermined shapes corresponds to at least one expression of a computer programming language. The auto-generated notation data can be generated based on: identifying a compile error in the at least one expression of the computer programming language based on syntax rules associated with the computer programming language and correcting the compile error, executing the at least one expression in accordance with the of the computer programming language, wherein the auto-generated notation data indicates an output of the computer programming language; identifying a variable name in the in the at least one mathematical expression and replacing all instances of the variable name with a new variable character, and/or identifying subsequent user notation data editing one expression of a plurality of related expressions, and updating other ones of the plurality of related expressions based on the subsequent user notation data.

In various embodiments, the user notation data is determined as being notated upon session material image data displayed by the display, where the spatially-arranged set of predetermined shapes corresponds to at least one label upon a portion session material image data. The auto-generated notation data can be generated based on identifying a labeling error in the at least one label and correcting the labeling error. In various embodiments, the labeling error is corrected based on: moving the label to label a different portion of the session material image data, or changing at least one character of the label. In various embodiments, the session material image data corresponds to an image of at least one of: a diagram, a plot, a graph, a map, a drawing, a painting, a musical score, or a photograph.

In various embodiments, the user notation data is determined as being notated as a set of user responses to session material image data displayed by the display that includes a set of examination questions. The processed user notation data can be generated based on comparing the set of user responses of the user notation data to corresponding examination answer key data of the set of examination questions. The processed user notation data can indicate whether each of the set of user responses is correct or incorrect.

In various embodiments, the auto-generated notation data is generated in response to determining to process the user notation data. Determining to process the user notation data can be based on at least one of: detecting the user has completed notating a given character, wherein the auto-generated notation data is generated based on processing the given character, detecting the user has completed notating a given word, wherein the auto-generated notation data is generated based on processing the given word; detecting the user has completed notating a given expression, wherein the auto-generated notation data is generated based on processing the given expression; or detecting a user command via user input to process the user notation data.

In various embodiments, detecting the user has completed notating a given character is based on detecting a passive device has lifted away from the interactive surface. In various embodiments, detecting the user has completed notating a given character is based on a horizontal spacing between a prior word and the start of a next word exceeding a threshold. In various embodiments, detecting the user has completed notating a given expression based on one of: the user notating a line ending character, and/or the user beginning notation by starting notation at a new line that is below a prior line of the given expression.

FIGS. 62A-62BM present other embodiments of screen-to-screen (STS) wireless connections 1118, touchscreen processing modules, touchscreen displays, processing modules, drive sense circuits, and other features. Some or all features and/or functionality of the touchscreen processing modules, touchscreen displays, processing modules, drive sense circuits, and other features presented in 62A-62BM can be utilized to implement any other embodiments of the screen-to-screen (STS) wireless connections 1118, touchscreen processing modules, touchscreen displays, processing modules, drive sense circuits, and other corresponding features described herein. For example, the STS wireless connections 1118 of FIGS. 51E and 51F can be implemented based on the computing devices 4942 being implemented to have some or all feature and/or functionality of the computing devices and/or user computing device of FIGS. 62A-62BM and/or based on the interactive tabletop 5505 being implemented to have some or all feature and/or functionality of the computing devices and/or interactive computing device of FIGS. 62A-62BM. As another example, the game-pieces of FIGS. 50A-50J can be implemented to detect, and/or be detected by, the interactive tabletop 5505 based on being implemented to have some or all feature and/or functionality of the computing devices and/or user computing device of FIGS. 62A-62BM and/or based on the interactive tabletop 5505 being implemented to have some or all feature and/or functionality of the computing devices and/or interactive computing device of FIGS. 62A-62BM. As another example, graphical image data or other prepared session materials data stored on a computing device is uploaded to an interactive display device 10 based on initiating a communication connection, and/or facilitating the entire data transfer, via a screen-to-screen (STS) wireless connection 1118 as discussed in conjunction with FIGS. 62A-62BM. As another example, user notation data and/or other session materials data generated and/or received by an interactive display device is downloaded to a computing device 10 based on initiating a communication connection, and/or facilitating the entire data transfer, via screen-to-screen (STS) wireless connections 1118 as discussed in conjunction with FIGS. 62A-62BM.

FIG. 62A is a schematic block diagram of an embodiment of a communication system 1110 that includes a plurality of interactive computing devices 1112, a personal private cloud 1113, a plurality of user computing devices 1114, networks 1115, a cloud service host device 1116, a plurality of interaction application servers 1120, a plurality of screen-to-screen (STS) communication servers 1122, a plurality of payment processing servers 1124, an independent server 1126 and a database 1127. In an embodiment, computing devices 1112-14 include a touch screen with sensors and drive-sense modules. In another embodiment, computing devices 1112-14 include a touch & tactic screen that includes sensors, actuators, and drive sense modules. In yet another embodiment, computing devices 1112-14 include a touch sensor with a display and/or a display without a touch screen.

The computing devices 1112 and 1114 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a point-of-sale equipment, interactive touch screens, a satellite receiver, a television set, a printer, a fax machine, home entertainment equipment, a video game console, and/or any type of home or office computing equipment.

An interactive computing device 1112 performs screen-to-screen (STS) communications with a user computing device 1114 via an STS wireless connection 1118. Although not explicitly shown, the STS wireless connection may be formed between two or more ICDs and/or two or more UCDs. The term wireless indicates the communication is performed at least in part without a wire. For example, the STS wireless connection is via a transmission medium (e.g., one or more of a human body, close proximity (e.g., within a few inches), a surface (for vibration encoding, etc.). In an embodiment, the STS wireless connection 1118 is performed via a local direct communication (e.g., not performed via network 1115). The STS wireless connection 1118 may be in accordance with a data protocol (e.g., data format, encoding parameters, frequency range, etc.), which will be discussed in further detail with reference to one or more subsequent figures.

The interactive computing device 1112 also stores data that enables a user and/or a user computing device to use and/or interact with the interactive computing device in a variety of ways. For example, the stored data includes system applications (e.g. operation system, etc.), user applications (e.g., restaurant menus, etc.), payment processing applications, etc. The data may be stored locally (e.g., within the interactive computing device) and/or externally (e.g., within one or more interaction application servers, etc.).

A user computing device 1114 is also operable to perform screen-to-screen (STS) communications with one or more other user computing devices 1114 and/or interactive computing devices 1112 via an STS wireless connection 1118. The user computing device 1114 also stores data to enable a user to use the computing device in a variety of ways. For example, the stored data includes system applications (e.g., operating system, etc.), user applications (e.g., word processing, email, web browser, etc.), personal information (e.g., contact list, personal data), and/or payment information (e.g., credit card information etc.). The data may be stored locally (e.g., within the computing device) and/or externally. For instance, at least some of the data is stored in a personal private cloud 1113, which is hosted by a cloud service host device 1116. As a specific example, a word processing application is stored in a personal account hosted by the vendor of the word processing application. As another specific example, payment information for a credit card is stored in a private account hosted by the credit card company and/or by the vendor of the computing device. The computing devices 1112-14 will be discussed in greater detail with reference to one or more subsequent figures.

A server 1120-26 is a type of computing device that processes large amounts of data requests in parallel. A server 1120-26 includes similar components to that of the computing devices 1112 and 1114 with more robust processing modules, more main memory, and/or more hard drive memory (e.g., solid state, hard drives, etc.). Further, a server 1120-26 is typically accessed remotely; as such it does not generally include user input devices and/or user output devices. In addition, a server 1120-26 may be a standalone separate computing device and/or may be a cloud computing device.

The screen-to-screen (STS) communication server 1122 supports and administers STS communications between UCDs and ICDs. For instance, the STS communication server 1122 stores an STS communication application that may be installed and/or run on the user computing device 1114 and the interactive computing device 1112. As a specific example, the STS communication server is a cellular provider server (e.g., Verizon, T-Mobile, etc.). In an example, a user of a user computing device 1114 registers with the STS communication server 1122 to install and/or run the STS communication application on the user computing device 1114. The UCD and/or the ICD may utilize a cellular connection (e.g., network 1115) to download the STS communication application. In an embodiment, the STS communication server 1122 functions to perform a patch distribution of the STS application for the interactive computing device 1112 via an agreement between the interactive application server 1120 and STS communication server 1122.

The interaction application server 1120 supports transactions between a UCD and an ICD that are communicating via an STS wireless connection. For example, the UCD using its user interaction application to interface with the ICD to buy items at a coffee shop and the ICD accesses its operator interaction application to support the purchase. In addition, the UCD (e.g., cell phone of a user) and/or ICD (e.g., POS device of a coffee shop) accesses the interaction application server to retrieve personal preferences of the user. (e.g., likes weather information, likes headlines news, ordering preferences, etc.). The transaction is completed via the STS wireless connection.

The payment processing server 1124 stores information on one or more of cardholders, merchants, acquirers, credit card networks and issuing banks in order to process transactions in the communication network. For example, a payment processing server 1124 is a bank server that stores user information (e.g., account information, account balances, personal information (e.g., social security number, birthday, address, etc.), etc.) and user card information for use in a transaction. As another example, a payment processing server is a merchant server that stores good information (e.g., price, quantity, etc.) and may also store certain user information (e.g., credit card information, billing address, shipping address, etc.) acquired from the user.

The independent server 1126 stores publicly available data (e.g., weather reports, stock market information, traffic information, public social media information, etc.). The publicly available data may be free or may be for a fee (e.g., subscription, one-time payment, etc.). In an example, the publicly available data is used in setting up an STS communication. For example, a tag in a social media post associated with a user of the UCD initiates an update check to interactive applications installed on the UCD that are associated with nearby companies. This ensures STS communications are enabled on the UCD for a more seamless STS transaction when the user is ready to transmit data via an STS connection. As another example, when a user is en route to a restaurant, weather information and traffic information are utilized to determine an estimated time to place a pre-order for one or more menu items from the restaurant that is to be completed (e.g., paid for, authorize a payment, etc.) utilizing an STS wireless connection.

A database 1127 is a special type of computing device that is optimized for large scale data storage and retrieval. A database 1127 includes similar components to that of the computing devices 1112 and 1114 with more hard drive memory (e.g., solid state, hard drives, etc.) and potentially with more processing modules and/or main memory. Further, a database 1127 is typically accessed remotely; as such it does not generally include user input devices and/or user output devices. In addition, a database 1127 may be a standalone separate computing device and/or may be a cloud computing device.

The network 1115 includes one more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a WAN may be a personal home or business's wireless network and a WAN is the Internet, cellular telephone infrastructure, and/or satellite communication infrastructure.

FIG. 62B is a schematic block diagram of an embodiment of a computing device 1112-14. The computing device 1112-14 includes a screen-to-screen (STS) communication unit 1130, a core control module 1140, one or more processing modules 1142, one or more main memories 1144, cache memory 1146, a video graphics processing module 1148, an input/output (I/O) peripheral control module 1150, one or more input/output (I/O) interfaces 1152, one or more network interface modules 1154, one or more network cards 1156-58, one or more memory interface modules 1162 and one or more memories 1164-66. A processing module 1142 is described in greater detail at the end of the detailed description of the invention section and, in an alternative embodiment, has a direction connection to the main memory(s) 1144. In an alternate embodiment, the core control module 1140 and the I/O and/or peripheral control module 1150 are one module, such as a chipset, a quick path interconnect (QPI), and/or an ultra-path interconnect (UPI).

The STS communication unit 1130 includes a display 1132 with a touch screen sensor array 1134, a plurality of drive-sense modules (DSM), and a touch screen processing module 1136. In general, the sensors (e.g., electrodes, capacitor sensing cells, capacitor sensors, inductive sensors, etc.) of the touch screen sensor array 1134 detect a proximal touch of the screen. For example, when one or more fingers touches (e.g., direct contact or very close (e.g., a few millimeters to a centimeter)) the screen, capacitance of sensors proximal to the touch(es) are affected (e.g., impedance changes). The drive-sense modules (DSM) coupled to the affected sensors detect the change and provide a representation of the change to the touch screen processing module 1136, which may be a separate processing module or integrated into the processing module 1142.

The touch screen processing module 1136 processes the representative signals from the drive-sense modules (DSM) to determine the location of the touch(es). This information is inputted to the processing module 1142 for processing as an input. For example, a touch represents a selection of a button on screen, a scroll function, a zoom in-out function, an unlock function, a signature function, etc. In an example, a DSM includes a drive sense circuit (DSC) and a signal source. In a further example, one signal source is utilized for more than one DSM. The DSM allows for communication with a better signal to noise ratio (SNR) (e.g., >11100 dB) due at least in part to the low voltage required to drive the DSM. The drive sense module is discussed in greater detail with reference to one or more subsequent figures.

Each of the main memories 1144 includes one or more Random Access Memory (RAM) integrated circuits, or chips. For example, a main memory 1144 includes four DDR4 ($4^{th}$ generation of double data rate) RAM chips, each running at a rate of 112,400 MHz. In general, the main memory 1144 stores data and operational instructions most relevant for the processing module 1142. For example, the core control module 1140 coordinates the transfer of data and/or operational instructions from the main memory 1144 and the memory 1164-1166. The data and/or operational instructions retrieved from memory 1164-1166 are the data and/or operational instructions requested by the processing module or will most likely be needed by the processing module. When the processing module is done with the data and/or operational instructions in main memory, the core control module 1140 coordinates sending updated data to the memory 1164-1166 for storage.

The memory 1164-1166 includes one or more hard drives, one or more solid state memory chips, and/or one or more other large capacity storage devices that, in comparison to cache memory and main memory devices, is/are relatively inexpensive with respect to cost per amount of data stored. The memory 1164-1166 is coupled to the core control module 1140 via the I/O and/or peripheral control module 1150 and via one or more memory interface modules 1162. In an embodiment, the I/O and/or peripheral control module 1150 includes one or more Peripheral Component Interface (PCI) buses to which peripheral components connect to the core control module 1140. A memory interface module 1162 includes a software driver and a hardware connector for coupling a memory device to the I/O and/or peripheral control module 1150. For example, a memory interface module 1162 is in accordance with a Serial Advanced Technology Attachment (SATA) port.

The core control module 1140 coordinates data communications between the processing module(s) 1142 and the network(s) 1115 via the I/O and/or peripheral control module 1150, the network interface module(s) 1154, and network cards 1156 and/or 1158. A network card 1156-1158 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 1154 includes a software driver and a hardware connector for coupling the network card to the I/O and/or peripheral control module 1150. For example, the network interface module 1154 is in accordance with one or more versions of IEEE 11802.11, cellular telephone protocols, 1110/100/1000 Gigabit LAN protocols, etc.

The core control module 1140 coordinates data communications between the processing module(s) 1142 and the STS communication unit 1130 via the video graphics processing module 1148, and the I/O interface module(s) 1152 and the I/O and/or peripheral control module 1150. In an embodiment, the STS communication unit 1130 includes or is connected (e.g., operably coupled) to a keypad, a keyboard, control switches, a touchpad, a microphone, a camera, speaker, etc. An I/O interface 1152 includes a software driver and a hardware connector for coupling the STS communications unit 1130 to the I/O and/or peripheral control module 1150. In an embodiment, an input/output interface 1152 is in accordance with one or more Universal Serial Bus (USB) protocols. In another embodiment, input/output interface 1152 is in accordance with one or more audio codec protocols.

The processing module 1142 communicates with a video graphics processing module 1148 to display data on the display 1132. The display 1132 includes an LED (light emitting diode) display, an LCD (liquid crystal display), and/or other type of display technology. The display 1132 has a resolution, an aspect ratio, and other features that affect the quality of the display. The video graphics processing module 1148 receives data from the processing module 1142, processes the data to produce rendered data in accordance with the characteristics of the display, and provides the rendered data to the display 1132.

Figure 62C:
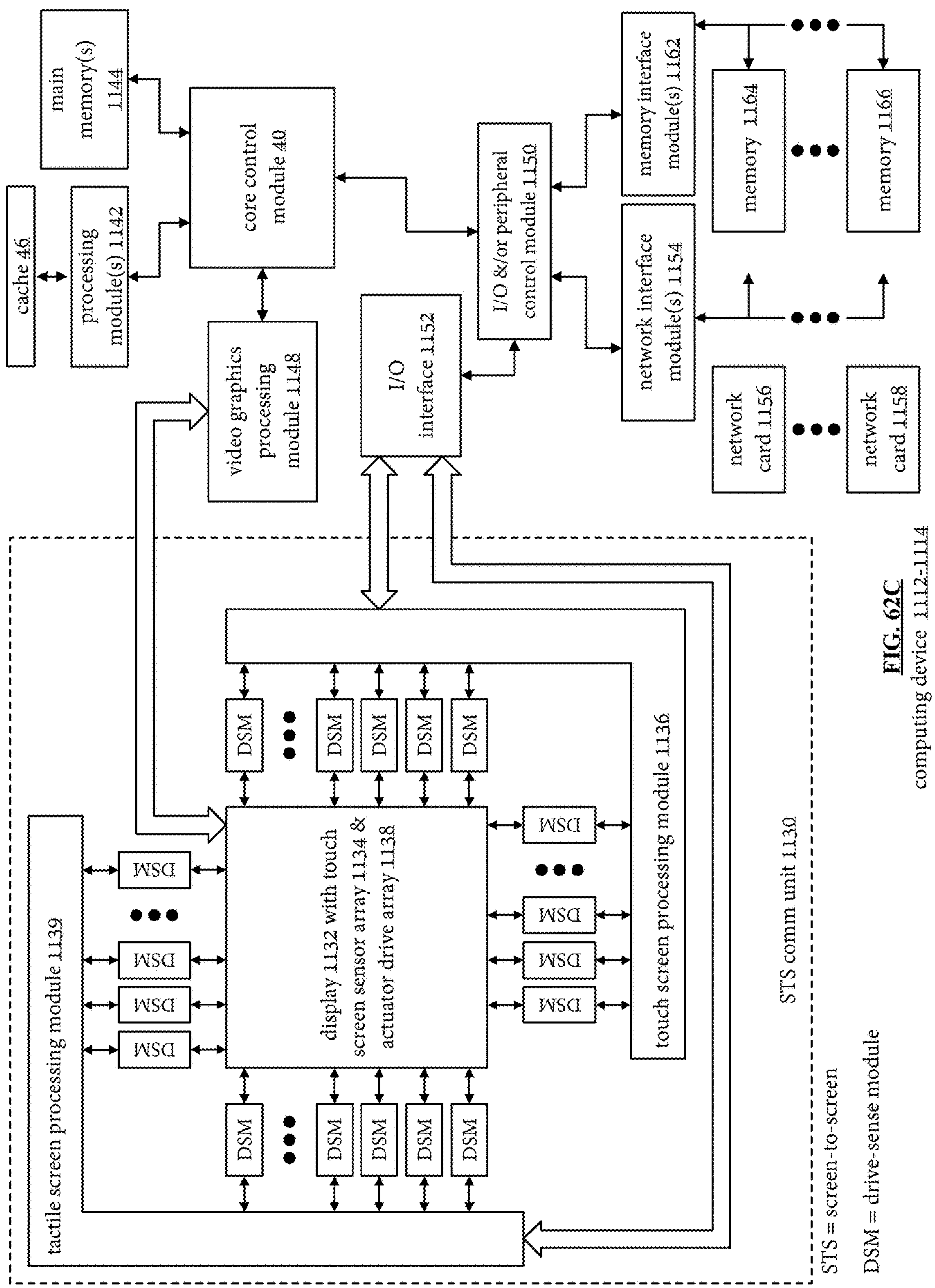
FIG. 62C is a schematic block diagram of another embodiment of a computing device in accordance with the present disclosure.

FIG. 62C is a schematic block diagram of another embodiment of a computing device 1112-14 that includes a screen-to-screen (STS) communication unit 1130, a core control module 1140, one or more processing modules 1142, one or more main memories 1144, cache memory 1146, a video graphics processing module 1148, one or more input/output (I/O) peripheral control modules 1150, one or more input/output (I/O) interface modules 1152, one or more network interface modules 1154, one or more memory interface modules 1162, network cards 1156-58 and memories 1164-66. The STS communication unit 1130 includes a display 1132 with touch screen sensor array 1134 and actuator drive array 1138, a touch screen processing module 1136, a tactile screen processing module 1139, and a plurality of drive-sense modules (DSM).

Computing device 1112-14 operates similarly to computing device 1112-14 of FIG. 62B with the addition of a tactile aspect to the screen 1120 as an output device. The tactile portion of the display 1132 includes a plurality of actuators (e.g., piezoelectric transducers to create vibrations, solenoids to create movement, etc.) to provide a tactile feel to the display 1132. To do so, the processing module creates tactile data, which is provided to the appropriate drive-sense modules (DSM) via the tactile screen processing module 1139 which may be a stand-alone processing module or integrated into processing module 1142. The drive-sense modules (DSM) convert the tactile data into drive-actuate signals and provide them to the appropriate actuators to create the desired tactile feel on the display 1132. In an example, the actuators also may encode data into a vibration to produce a vibration encoded data signal. For example, a binary 1 is represented as a first vibration frequency and a binary 0 is represented as a second vibration frequency. In an instance, the vibration data encoded signal is transmitted to another computing device via a screen to screen (STS) connection.

A sensor 1134 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, vibration, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linearity are factors for interpreting the measure of the physical condition based on the received electrical and/or optical signal (e.g., measure of temperature, pressure, etc.).

An actuator 1138 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 1138 may be one of a variety of actuators. For example, an actuator is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

As a specific example of operation, the actuators 1138 generate a vibration encoded signal based on digital data as part of a screen to screen (STS) communication with another computing device 1112-14. The vibration encoded signal vibrates through and/or across a transmission medium (e.g., surface (e.g., of table, of a body, etc.) from a computing 1112-14 to another computing device 1112-14. The other computing device 1112-14 receives the vibration encoded signal via its sensors 1134 (e.g., transducers) and decodes the vibration encoded data signal to recover the digital data.

Figure 62D:
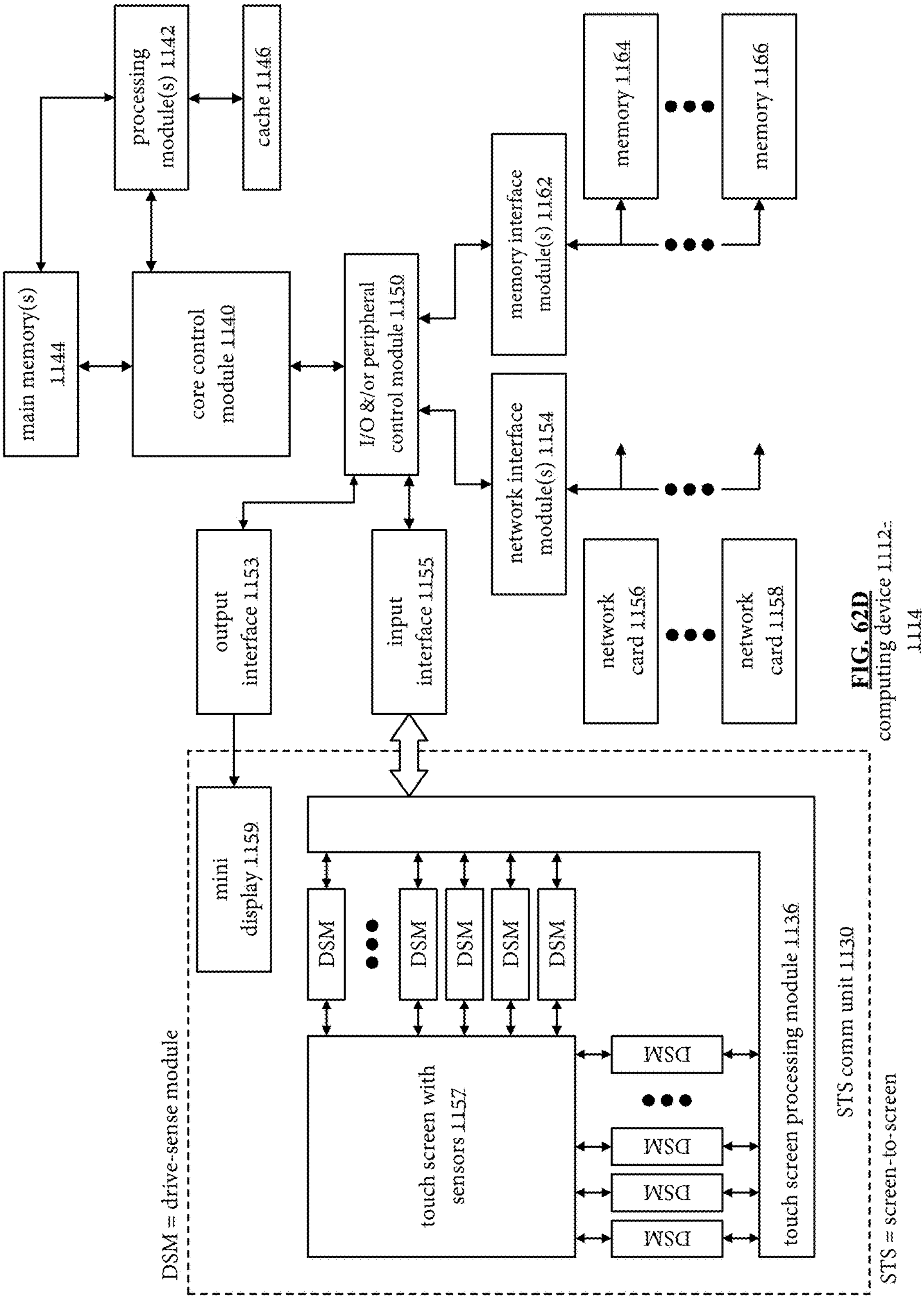
FIG. 62D is a schematic block diagram of another embodiment of a computing device in accordance with the present disclosure.

FIG. 62D is a schematic block diagram of another embodiment of a computing device 1112-14 that includes a screen-to-screen (STS) communication unit 1130, a core control module 1140, one or more processing modules 1142, one or more main memories 1144, cache memory 1146, one or more input/output (I/O) peripheral control modules 1150, an output interface module 1153, an input interface module 1155, one or more network interface modules 1154, and one or more memory interface modules 1162, network cards 1156-58 and memories 1164-66. In this embodiment, the STS communication unit 1130 includes a mini display 1159, a touch screen processing module 1136, a touch screen with sensors 1157, and a plurality of drive sense modules.

Figure 62E:
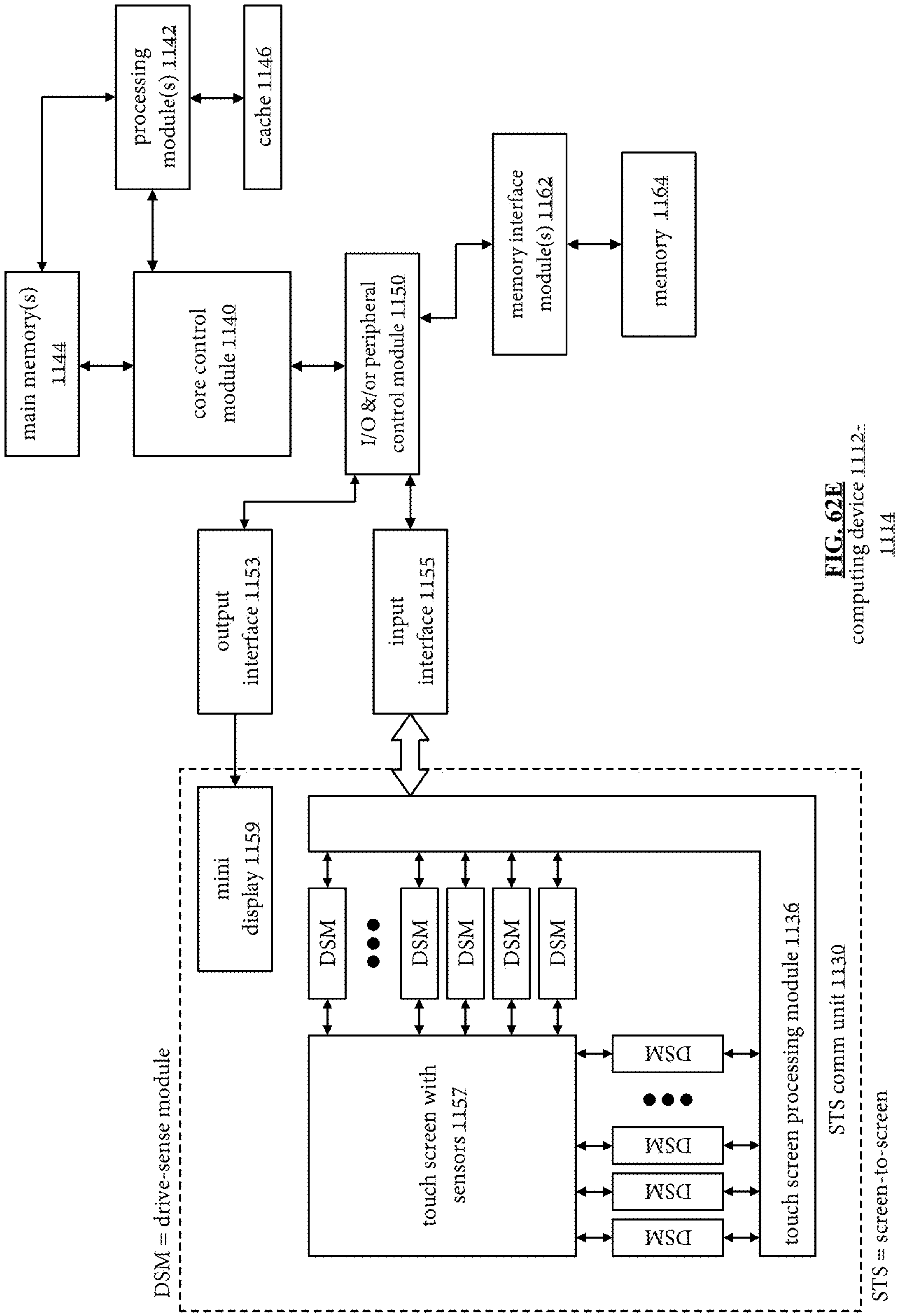
FIG. 62E is a schematic block diagram of another embodiment of a computing device in accordance with the present disclosure.

FIG. 62E is a schematic block diagram of another embodiment of a computing device 1112-14 that includes a screen-to-screen (STS) communication unit 1130, a core control module 1140, one or more processing modules 1142, one or more main memories 1144, cache memory 1146, one or more input/output (I/O) peripheral control modules 1150, an output interface module 1153, an input interface module 1155, one or more memory interface modules 1162, and memory 1164. The STS communication unit 1130 includes mini display 1159, a touch screen with sensors 1157, a touch screen processing module 1136 and a plurality of drive sense modules (DSM).

Figure 62F:
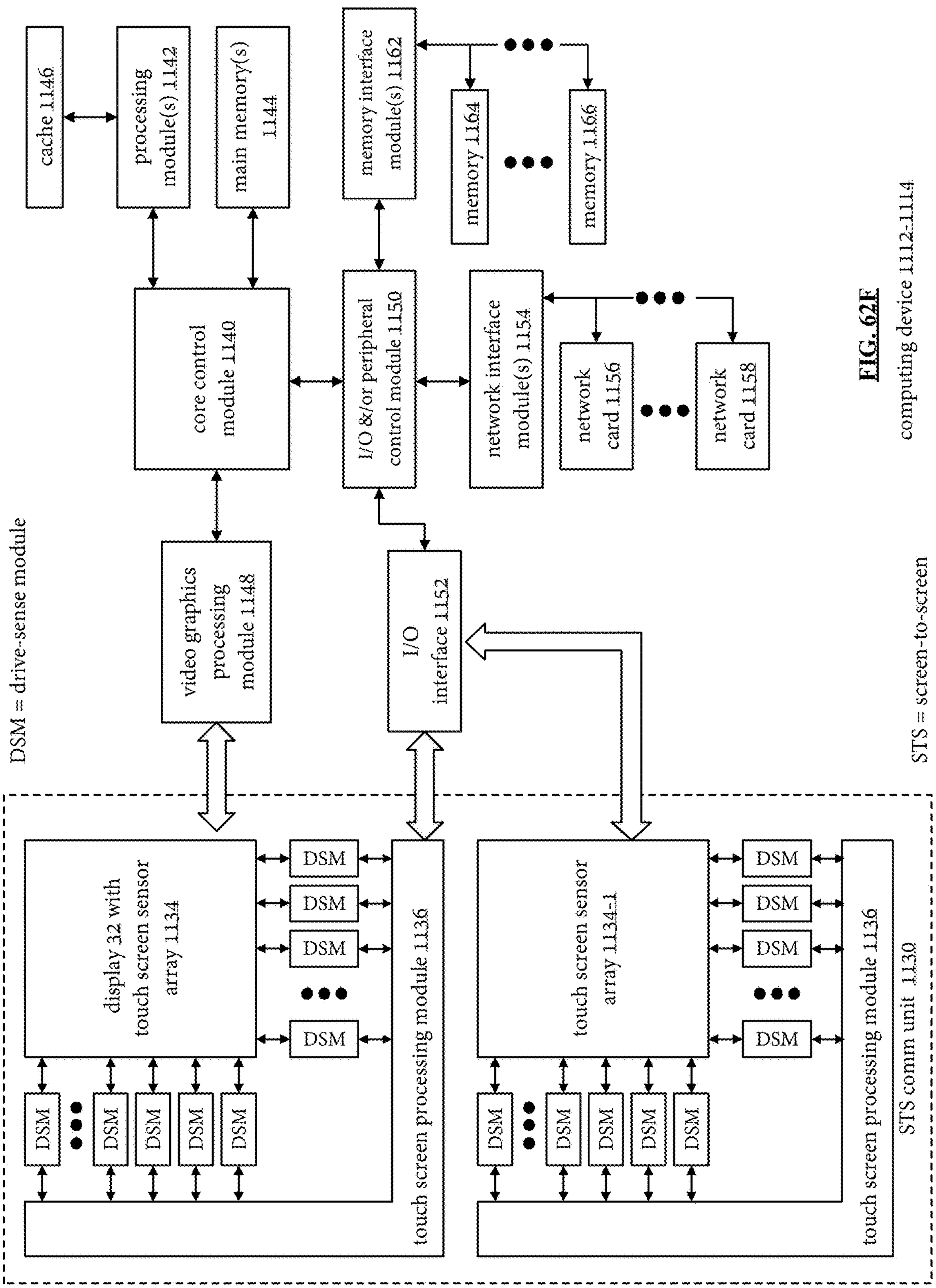
FIG. 62F is a schematic block diagram of another embodiment of a computing device in accordance with the present disclosure.

FIG. 62F is a schematic block diagram of another embodiment of a computing device 1112-14 that includes a screen-to-screen (STS) communication unit 1130, a core control module 1140, one or more processing modules 1142, one or more main memories 1144, cache memory 1146, a video graphics processing module 1148, one or more input/output (I/O) peripheral control modules 1150, one or more input/ output (I/O) interface modules 1152, one or more network interface modules 1154, one or more memory interface modules 1162, network cards 1156-58 and memories 1164-66.

In this embodiment, the STS communication unit has a display 1132 with touch screen sensor array 1134 and a separate touch screen sensor array 1134-1. Each of the display 1132 with touch screen sensor array 1134 and touch screen sensor array 1134-1 are connected to a touch screen processing module 1136 via a plurality of drive sense modules (DSM). In a specific example, the touch screen sensor array 1134-1 is a single electrode or sensor (e.g., button, control point, etc.).

There is a variety of locations for which to locate the display 1132 and the touch screen senor array 1134-1 on the computing device 1112-14. Some examples include, but are not limited to the following. In a first example, the display 1132 with touch screen sensor array 1134 is located on a front the computing device and the touch screen with sensor array 1134-1 is located on a side of the computing device. In a second example, the display 1132 with touch screen sensor array 1134 is located on a front the computing device and the touch screen with sensor array 1134-1 is located on a back of the computing device. In a third example, the display 1132 with touch screen sensor array 1134 is located on a front and/or side the computing device and the touch screen with sensor array 1134-1 is located on a front of the computing device.

Figure 62G:
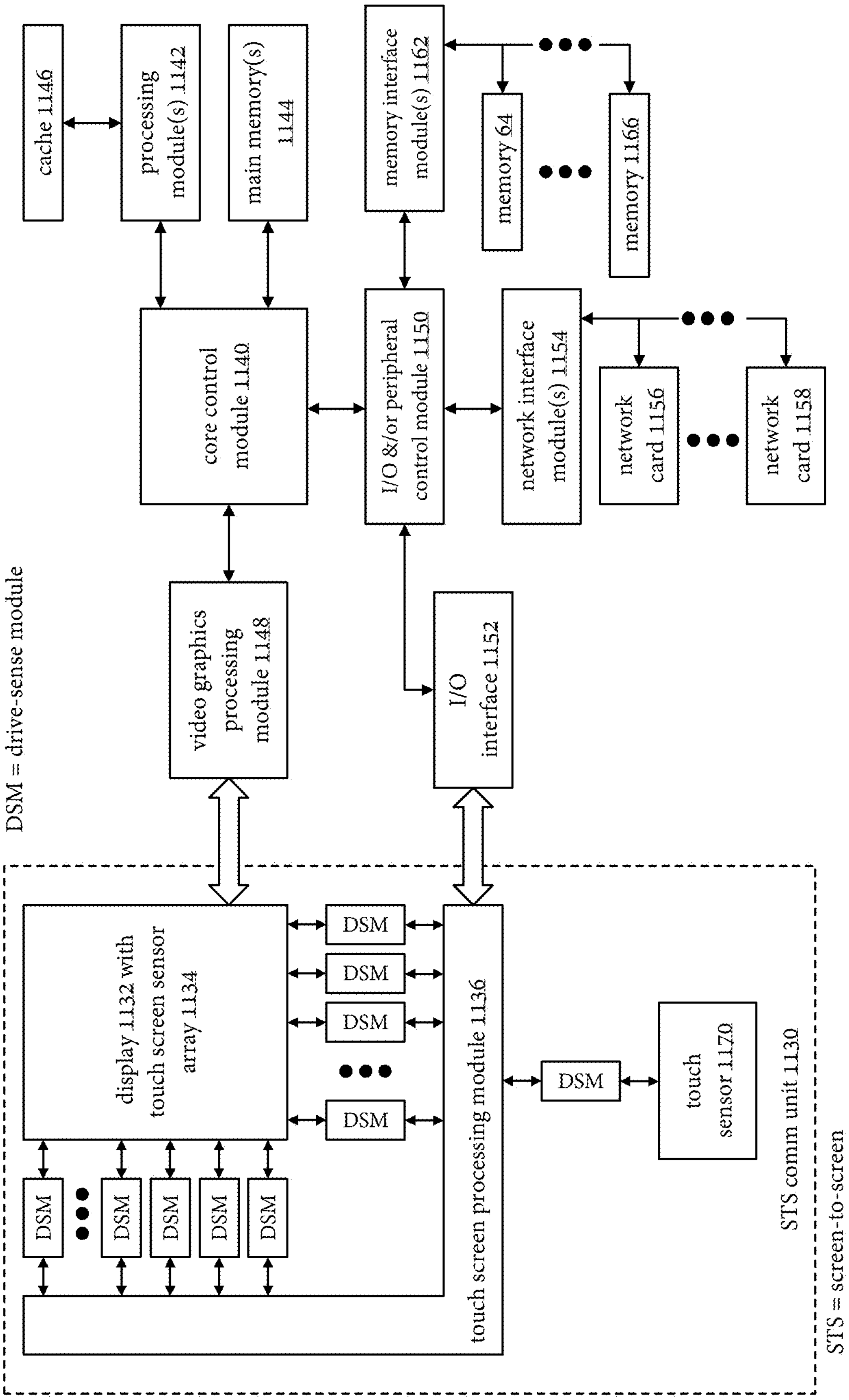
FIG. 62G is a schematic block diagram of another embodiment of a computing device in accordance with the present disclosure.

FIG. 62G is a schematic block diagram of another embodiment of a computing device 1112-14 that includes a screen-to-screen (STS) communication unit 1130, a core control module 1140, one or more processing modules 1142, one or more main memories 1144, cache memory 1146, a video graphics processing module 1148, one or more input/output (I/O) peripheral control modules 1150, one or more input/output (I/O) interface modules 1152, one or more network interface modules 1154, one or more memory interface modules 1162, network cards 1156-58 and memories 1164-66.

In this embodiment, the STS communication unit 1130 has a display 1132 with touch screen sensor array 1134 and touch sensor 1170. The display 1132 with touch screen sensor array 1134 and touch screen sensor array 1134 are connected to a touch screen processing module 1136 via a plurality of drive sense modules (DSM) and the touch sensor 1170 is also operable coupled to the touch screen processing module 1136 via another DSM.

In an example, the touch sensor 1170 is a single electrode. In another example, the touch sensor is a capacitive sensor. The touch sensor 1170 may be on the front of computing device 1112-14, may be on the back of computing device 1112-14 and/or may be on one or more sides of the computing device 1112-14. As a specific embodiment, the computing device is a cell phone with a display on the front and the touch sensor on the side.

Figure 62H:
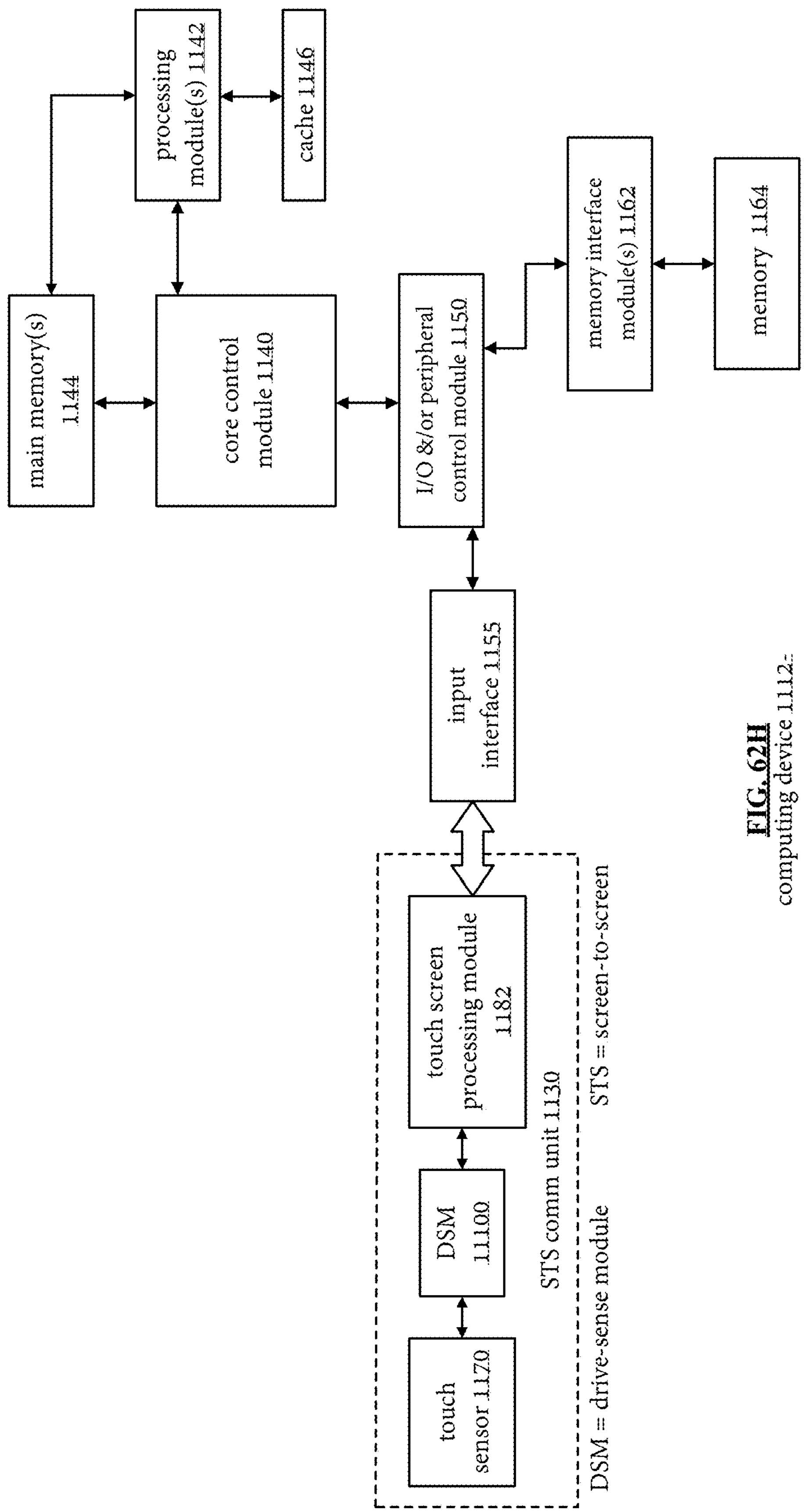
FIG. 62H is a schematic block diagram of another embodiment of a computing device in accordance with the present disclosure.

FIG. 62H is a schematic block diagram of another embodiment of a computing device 1112-14 that includes a screen-to-screen (STS) communication unit 1130, a core control module 1140, one or more processing modules 1142, one or more main memories 1144, cache memory 1146, one or more input/output (I/O) peripheral control modules 1150, an output interface 1153, an input interface 1155, one or more memory interface modules 1162, and a memory 1164. The STS communication unit 1130 includes a touch screen processing module 1182, a drive sense module 11100 (e.g., the drive sense module (DSM) of FIG. 1), and a touch sensor 1170. In an example, the touch sensor 1170 is a single electrode. In another example, the touch sensor is a capacitive sensor.

Figure 62I:
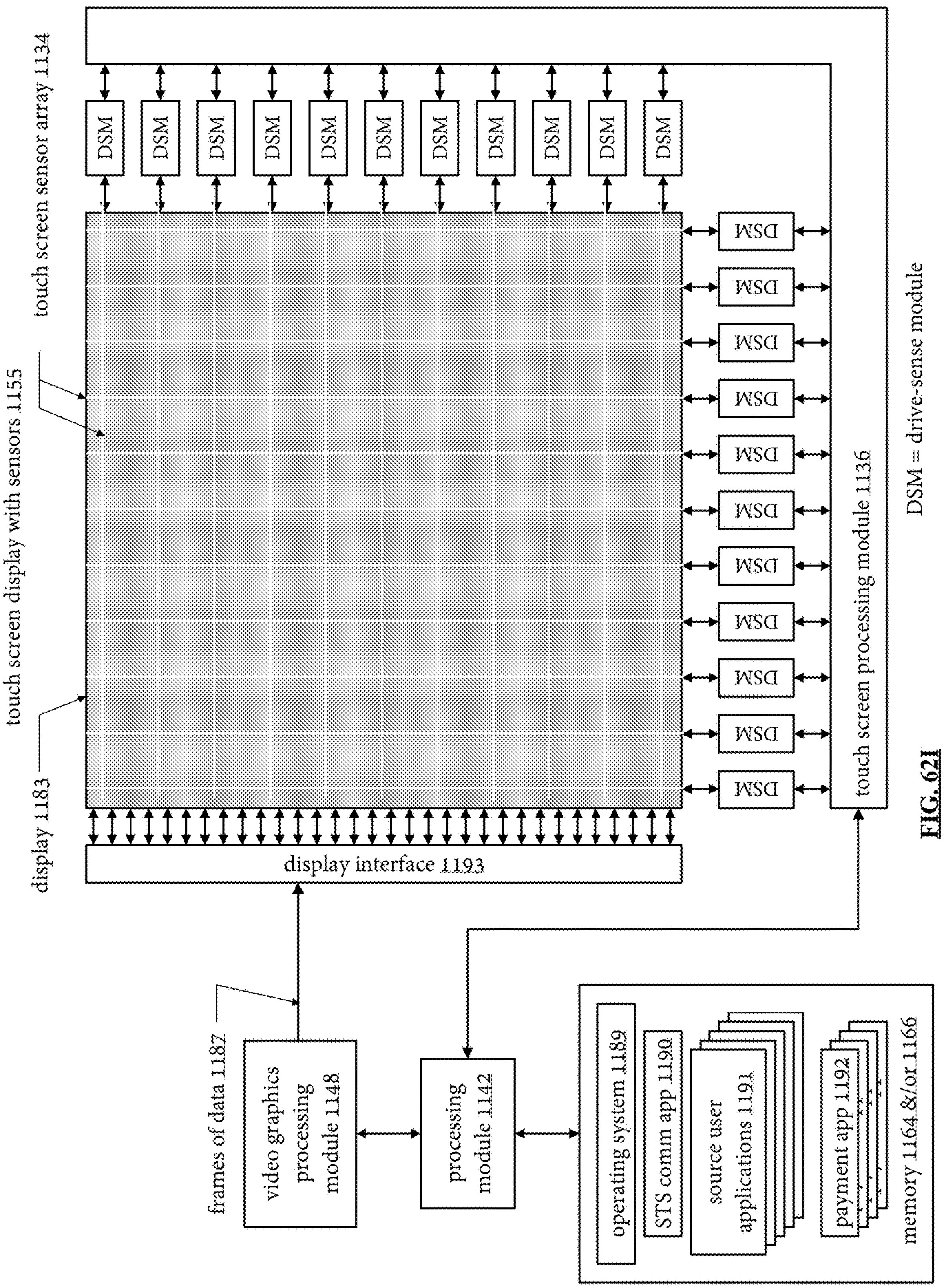
FIG. 62I is a schematic block diagram of an embodiment of a touch screen display in accordance with the present disclosure.

FIG. 62I is a schematic block diagram of an embodiment of a touch screen display with sensors 1155 that includes a plurality of drive-sense modules (DSM), a touch screen processing module 1136, a display 1183, and a touch screen sensor array 1134. The touch screen display with sensors 1155 is coupled to a processing module 1142, a video graphics processing module 1148, and memory 1164 and/or 1166, which are components of a computing device (e.g., 1112-14), an interactive display, or other device that includes a touch screen display. An interactive display functions to provide users with an interactive experience (e.g., touch the screen to obtain information, to input information, to be entertained, to complete a transaction, etc.). For example, a store provides interactive displays for customers to order products, to find certain products, to obtain coupons, to enter contests, to sign up for store rewards, to learn information associated with a product, and many other functions.

There are a variety of other devices that include a touch screen display. For example, a vending machine includes a touch screen display to select and/or pay for an item. As another example of a device having a touch screen display is an Automated Teller Machine (ATM). As yet another example, an automobile includes a touch screen display for entertainment media control, navigation, climate control, vehicle information (e.g., tire air pressure, gas levels, etc.), etc. As a still further example, a smart device (e.g., light switch, home security control hub, thermostat, etc.) within a home includes a touch screen.

In an example, the touch screen display with sensors 1155 includes a large display 1183 that has a resolution equal to or greater than full high-definition (HD), an aspect ratio of a set of aspect ratios, and a screen size equal to or greater than thirty-two inches.

The display 1183 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 1183 further includes touch screen sensor array 1134 that provide the sensors 1134 for the touch sense part of the touch screen display. The sensor array 1134 is distributed throughout the display area or where touch screen functionality is desired. For example, a first group of sensors of the sensor array 1134 are arranged in rows and a second group of sensors of the sensor array 1134 are arranged in columns. Note the row sensors may be separated from the column sensors by a dielectric material.

The sensor array 1134 is comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, a sensor of the sensor array 1134 is an electrode and is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example, the sensors are electrodes. As such, the rows of electrodes intersecting with the column of electrodes form a capacitive grid. For each intersection of a row and column electrode, a mutual capacitance (Cm) exists. In addition, each electrode (row and column) has a self-capacitance (Cs) with respect to a ground reference of the touch screen. As such, the touch screen senor array includes a plurality of mutual capacitances (Cm) and a plurality of self-capacitances (Cs), where the number of mutual capacitances equals the number of rows multiplied by the number of columns and the number self-capacitances equals the number of rows plus the number of columns.

In general, changes to the self and/or mutual capacitances result from changes in the dielectric properties of the capacitances. For example, when a human touches the touch screen, self-capacitance increases and mutual capacitance decreases due the dielectric properties of the person and the coupling of the person to the ground reference of the computing device. In another example, when an object is placed on the touch screen without a connection to ground, the mutual capacitances will increase or decrease depending on the dielectric properties of the object. This allows for different types of objects to be identified (e.g., touch screen pen, finger, another computing device proximal to touch screen for setting up an STS connection, etc.).

The memory 1164 and/or 1166 store an operating system 1189, a screen-to-screen (STS) communication application 1190, one or more STS source user applications 1191 and one or more payment applications 1192. The STS communication application 1190 functions to allow STS communications from one computing device to another. For example, the STS communication application 1190 works with an STS communication application on the other device to establish an STS communication protocol for the STS wireless connection 1118. As a further example, the STS communication application stores and/or has access to verify personal data (e.g., biometric data, password, etc.) of an authorized user of the device before enabling the STS communication.

The source user applications 1191 includes, but ae not limited to, a video playback application, a spreadsheet application, a word processing application, a computer aided drawing application, a photo display application, an image processing application, a database application, and a plurality of interactive user applications, etc. While executing a source user application 1191, the processing module generates data for display (e.g., video data, image data, text data, etc.). The payment applications 1192 includes, but are not limited to, a bank application, a peer-to-peer payment application, a credit card payment application, a debit card payment application, a gift card payment application, etc. Note the STS communication applications 1190 and source user applications 1191 are OS agnostic (e.g., ae operable to function on a variety of operating systems (e.g., Mac OS, Window OS, Linux OS, etc.)).

In an example of operation of an STS communication, the touch screen processing module 1136 sends display data to the video graphics processing module 1148, which converts the data into frames of video 1187. The video graphics processing module 1148 sends the frames of video 1187 (e.g., frames of a video file, refresh rate for a word processing document, a series of images, etc.) to the display interface 1193. The display interface 1193 provides the frames of video to the display 1183, which renders the frames of video into visible images.

While the display 1183 is rendering the frames of video into visible images, the drive-sense modules (DSM) provide outbound signals of the STS communication to the sensors of the touch screen sensor array 1134 and receive inbound signals of the STS communication from the sensors. When the screen is proximal to another screen or receiving signals via body as a network (BaaN), capacitance of the sensors ae changed by the signals from the other screen. The DSMs detect the capacitance change for affected sensors and provide the detected change to the touch screen processing module 1136.

The touch screen processing module 1136 processes the capacitance change of the affected sensors to determine one or more specific elements (e.g., bit, byte, data word, symbol, etc.) of the STS communication and provides this information to the processing module 1136. Processing module 1136 processes the one or more specific elements to determine a portion of the STS communication. For example, the specific element indicates one or more of a purchase, a quantity, an edit, an identity of an item, a purchase price, a digital signature, a security code, and an acknowledgement.

Figure 62J:
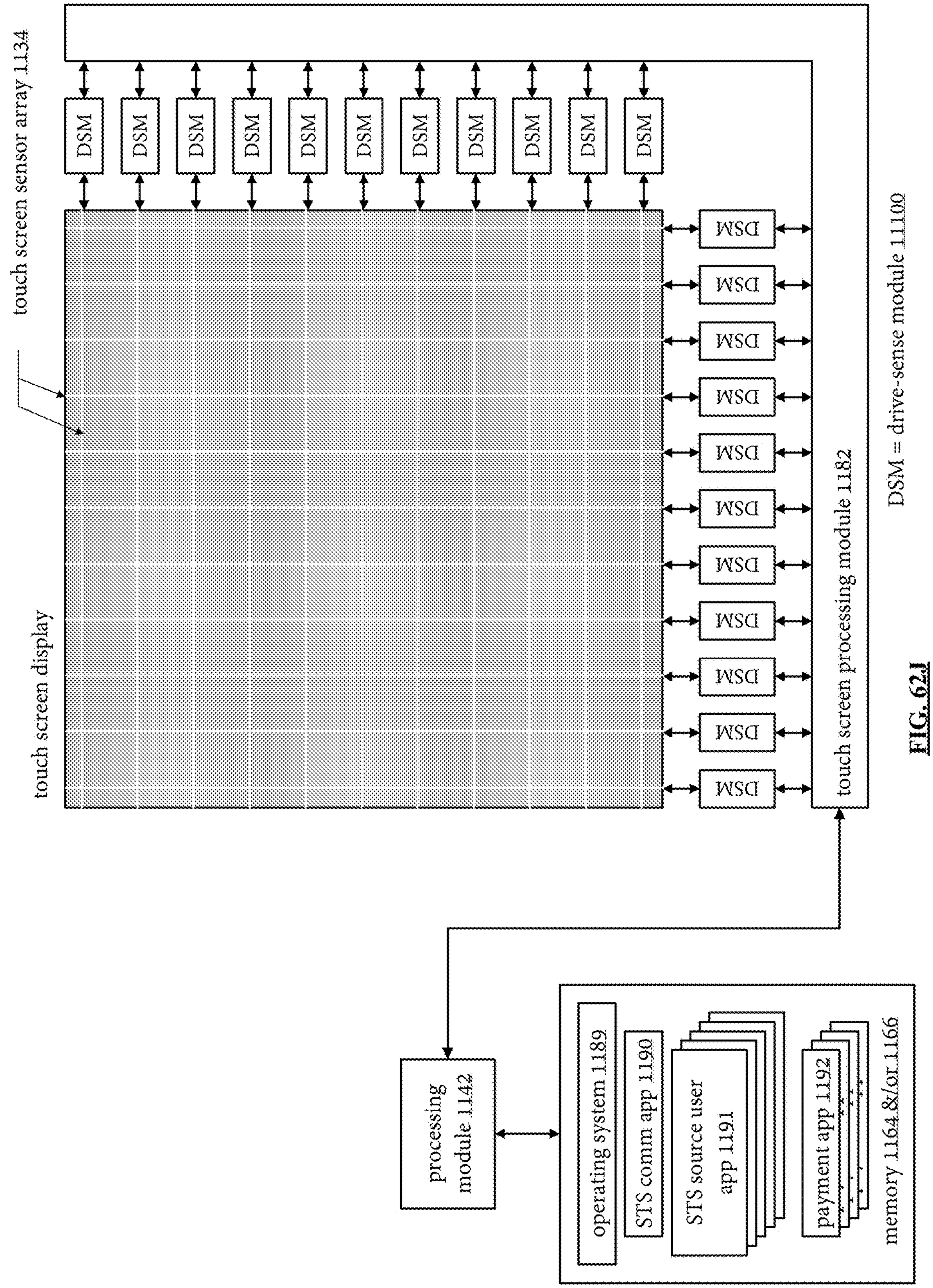
FIG. 62J is a schematic block diagram of an embodiment of a touch screen in accordance with the present disclosure.

FIG. 62J is a schematic block diagram of another embodiment of a touch screen sensor array 1134 that includes a plurality of drive-sense modules (DSM), the processing module 1142, and memory 1164 and/or 1166. The touch screen display operates similarly to the touch screen display of FIG. 62I without the display 1183, display interface 1193 and video graphics processing module 1148.

Figure 62K:
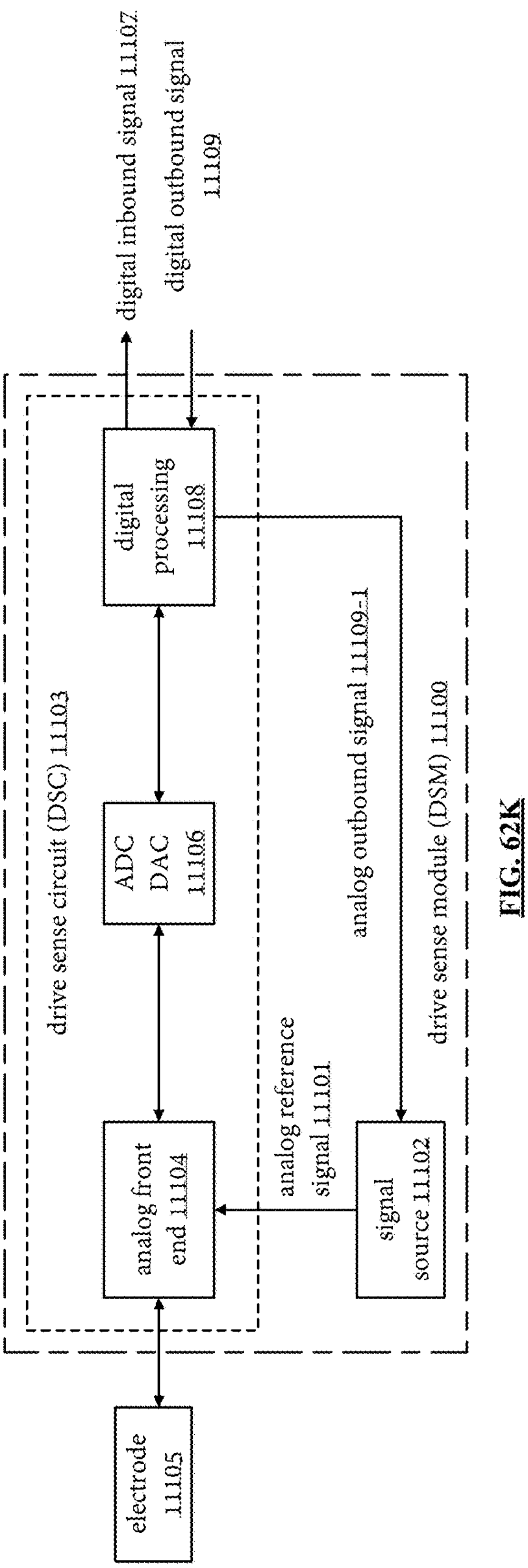
FIG. 62K is a schematic block diagram of an embodiment of a drive sense module in accordance with the present disclosure.

FIG. 62K is a schematic block diagram of an embodiment of a drive sense module (DSM) 11100 connected to an electrode 11105. The DSM 11100 includes a signal source circuit 11102 and a drive sense circuit (DSC) 11103. The signal source 11102 includes an alternate current (AC) signal generator, an existing element of computing device 1112-14, display data that is emanated from a display, and/or another signal source.

The DSC 11103 includes an analog front end 11104, an analog to digital converter (ADC) & digital to analog converter (DAC) 11106, and a digital processing circuit 11108. The analog front end includes one or more amplifiers, filters, mixers, oscillators, converters, voltage sources, current sources, etc. For example, the analog front end 11104 includes a current source, an ADC, a DAC and a comparator.

The analog to digital converter (ADC) 11106 may be implemented in a variety of ways. For example, the (ADC) 11106 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 11106 be implemented in a variety of ways. For example, the DAC 11106 is one of: a sigma-delta DAC, a pulse width modulator DAC, a binary weighted DAC, a successive approximation DAC, and/or a thermometer-coded DAC. The digital processing circuit 11108 includes one or more of digital filtering (e.g., decimation and/or bandpass filtering), format shifting, buffering, etc. Note in an embodiment, the digital processing circuit includes the ADC DAC 11106.

In an example of operation, the DSM produces a digital inbound signal 11107 that is representative of changes to an electrical characteristic (e.g., an impedance, a current, a reactance, a voltage, a frequency response, etc.) of the electrode 11105 due to an STS communication. In particular, the analog front end 11104 receives an analog reference signal 11101 from the signal source 11102 and utilizes it to determine the change in the electrical characteristic of the electrode. The analog front end 11104 outputs a representation of the change to the ADC DAC 11106, which converts it into a digital signal. The digital processing 11108 processes the digital signal to produce digital inbound signal 11107, which represents an element of the STS communication.

To transmit an element of the STS communication, the digital processing converts digital outbound signal 11109 (e.g., representation of the element) into an analog outbound signal 11109-1. The signal source 11102 generates an analog reference signal 11101 based on the analog outbound signal 11109-1. For example, the analog outbound signal 11109-1 indicates whether an analog reference signal is to be generated, and if so, at what frequency. As another example, the signal source 11102 modulates a carrier signal with the analog outbound signal 11109-1 to produce the analog reference signal 11101. The analog front end 11104 processes the analog reference signal to drive an analog signal representing the element onto electrode 11105. Further examples of the operation of the drive sense circuit (DSC) 11103 are discussed in patent pending application number 1116/113,379, entitled Drive Sense Circuit with Drive-Sense Line, filed Aug. 27, 2018.

FIG. 1112A is an embodiment of a portion (e.g., the analog front end 11104, and an ADC 11106-1 of the ADC DAC 11106) of the drive sense circuit 11103. In this embodiment, the analog front end 11104 includes a current source 11111 and a comparator 11112.

In the example of receiving an element (e.g., bit, byte, data word, symbol, etc.) of an STS communication, the comparator 11112 produces an analog compensation signal/analog feedback signal based on comparing an analog reference signal 11101 to signaling 11110, which is indicative of an electrical characteristic (e.g., impedance (Z)) change to electrode 11105. The ADC 11106-1 converts the analog compensation signal to produce a digital inbound signal that represents the element of the STS communication. The dependent current source 11111 modifies a current (I) on the output line (e.g., connected to electrode 11105) based on the analog feedback signal so that a voltage (V) on the electrode remains substantially constant. For example, when an impedance (Z) decreases on electrode 11105, according to the formula V=I*Z, the current is increased such that the voltage on the electrode remains substantially constant.

Figure 62M:
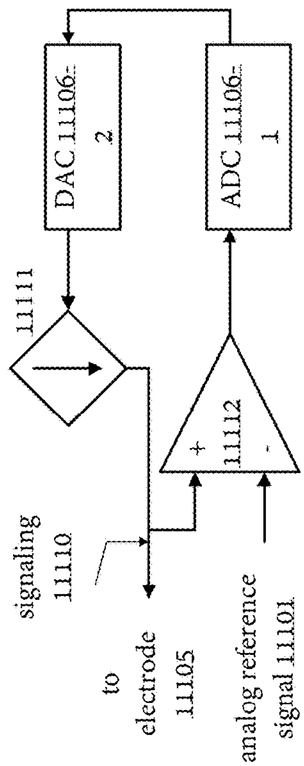
FIG. 62M is a schematic block diagram of another embodiment of a drive sense circuit in accordance with the present disclosure.
Figure 62L:
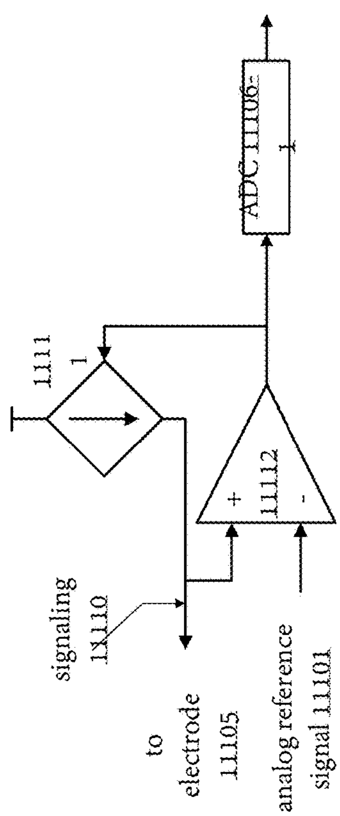
FIG. 62L is a schematic block diagram of an embodiment of a drive sense circuit in accordance with the present disclosure.

FIG. 62M is a schematic block diagram of another embodiment of a portion the drive sense circuit 11103 that includes a, ADC 11106-1, a DAC 11106-2*a* current source 11111, and a comparator 11112. This example is similar to FIG. 12A, except the feedback loop to the current source 11111 is through the ADC 11106-1 and the DAC 11106-2, instead of directly from the comparator 11112.

Figure 62N:
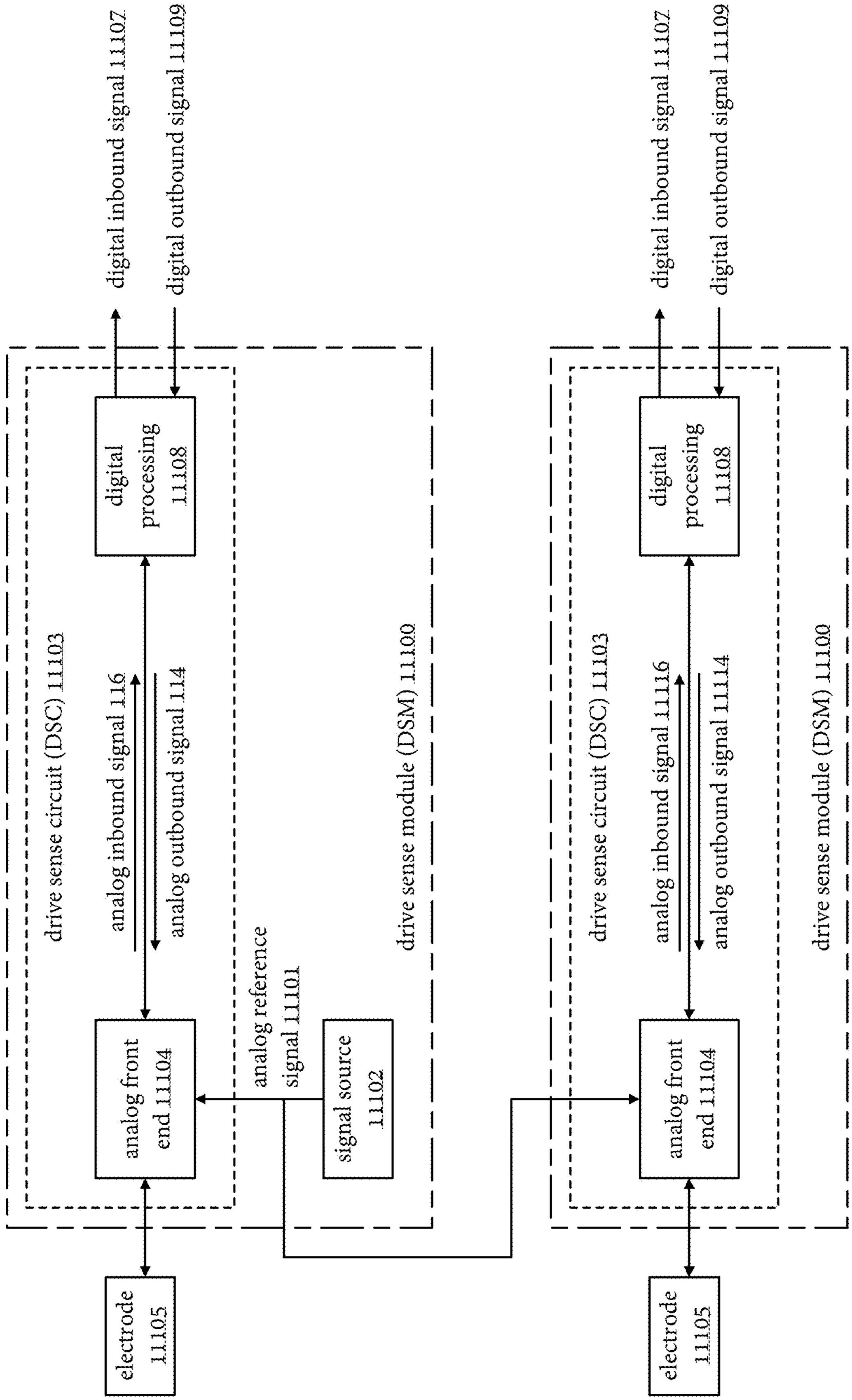
FIG. 62N is a schematic block diagram of an embodiment of drive sense modules in accordance with the present disclosure.

FIG. 62N is a schematic block diagram of a plurality of drive sense modules 11100. The drive sense modules are configured similar to FIG. 12, except that the digital processing 11108 includes an analog to digital converter and a digital to analog converter and one signal source 11102 provides the analog reference signal 11101 to more than one drive sense module (DSM) 11100. Further, analog outbound signal 11114 is sent directly to analog front end 11104. The analog front end 11104 also provides analogy inbound signal 11116 to digital processing 1108.

Figure 62O:
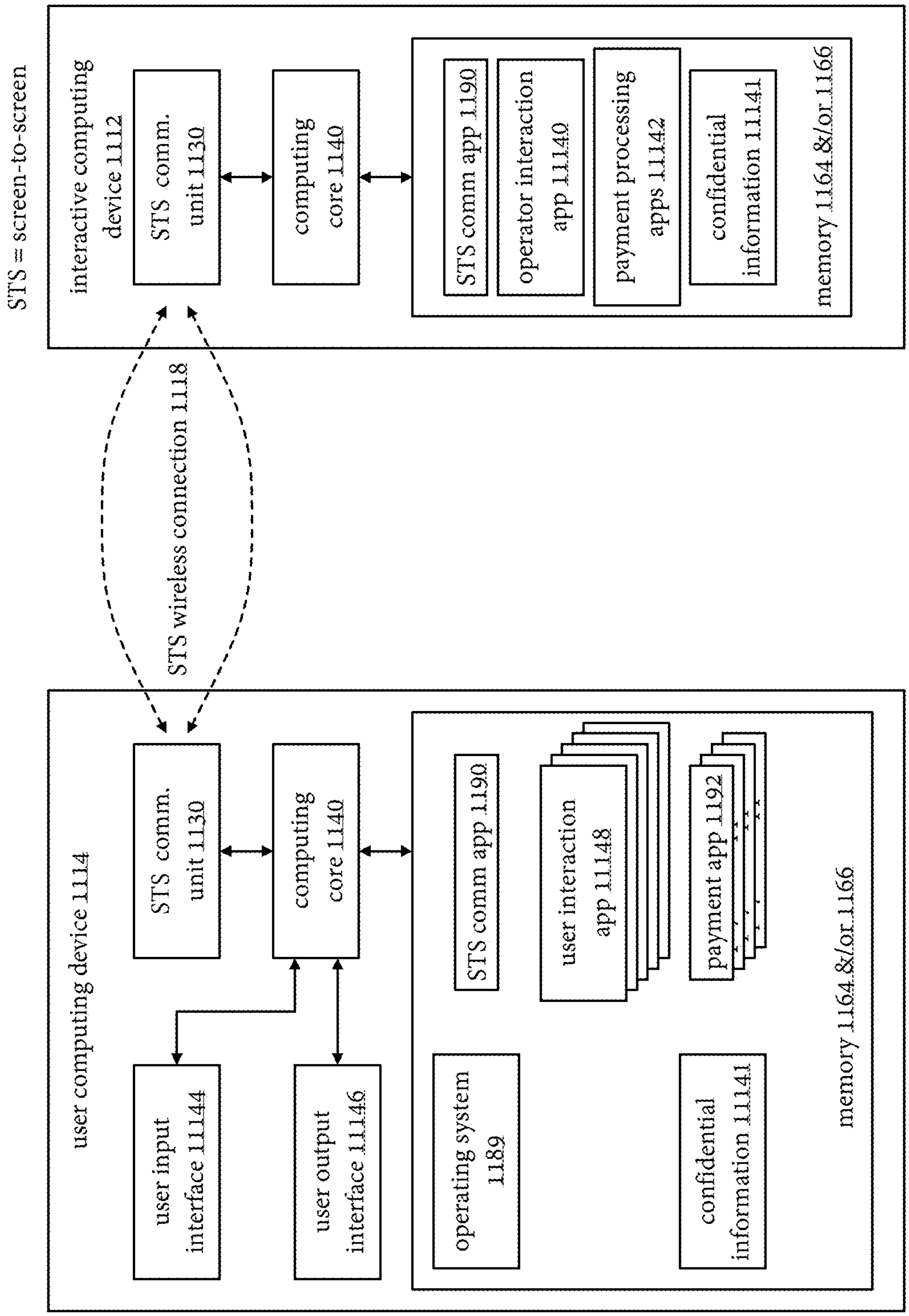
FIG. 62O is a schematic block diagram of another embodiment of a user computing device and an interactive computing device in accordance with the present disclosure.

FIG. 62O is a schematic block diagram of an example of a user computing device (UCD) 1114 communicating with an interactive computing device (ICD) 1112 via a screen-to-screen (STS) wireless connection 1118. The user computing device (UCD) 1114 may be implemented by a combination of two or more devices. For example, the user computing device 1114 is a cell phone and a fob (e.g., small security hardware device with built-in authentication (e.g., keyless entry device, remote car starter, garage door opener, etc.)). As another example, the user computing device 1114 is a cell phone and a car. Alternatively, the user computing device 1114 is an individual device such as a cell phone, a tablet, a personal touch screen device (e.g., fob), a car, etc. The user computing device 1114 includes a computing core 1140 connected to a user input interface 11144, a user output interface 11146, an STS communication unit 1130, and a memory 1164 and/or 1166.

The memory 1164 and/or 1166 of UCD 1114 includes an operating system 1189, an STS communication application 1190, a set (e.g., one or more) of user interaction applications 11148, a set of payment applications 1192, and confidential information 11141. The confidential information 11141 includes, but is not limited to, user's personal information, user computing device identification (ID), user's payment information, security information (e.g., passwords, biometric data, etc.) and user's personal preferences per user application (e.g., preference for coffee orders, fast food orders, transportation tickets, event tickets, etc.).

As some limited examples, the set of user interaction applications 11148 includes a fast food drive ordering application, a transportation ticket purchase application, an event ticket purchase application, a banking application, a point of sale payment application, a rental car enable and checkout application, an airline application, a sales information application, an interactive screen information application, a data transfer application, a meeting data exchange application, a hotel check in application, and a cell phone is hotel room key application.

The STS communication application 1190 functions as previously described to assist the UCD 1114 in setting up the communication between devices. For example, the STS communication application 1190 determines (e.g., selects a default, receives a command, etc.) one or more of a communication medium (e.g., close proximity, body as a network, surface, etc.), a communication method (e.g., cellular data, STS communication link, Bluetooth, etc.), a signaling and/or pattern protocol (e.g., amplitude shift keying (ASK) modulation, etc.), and security mechanisms (e.g., security codes, encryption, data transmission of particular data types restrictions, etc.) for which the devices utilize for the communication. The payment applications 1192 include, but are not limited to, one or more of a bank application, a credit card application, peer-to-peer payment application, and a cryptocurrency exchange application.

The interactive computing device (ICD) 1112 includes a screen to screen (STS) communication unit 1130, a computing core 1140, and a memory 1164 and/or 1166. The memory 1164 and/or 1166 of the ICD 1112 includes an STS communication application 1190, an operator interaction application 11140, a set of payment processing applications 11142, and confidential information 11141.

The STS communication application 1190 of the ICD 1112 functions similarly as the STS communication application 1190 of the UCD 1114 to setup the STS communications from an operator of the ICD's perspective. As an example in setting up communication between the devices, the STS communication application of the ICD is a leader (controls communication settings) and the STS communication application of the UCD is a follower (e.g., uses settings selected by the ICD STS communication app 1190). In another example, the STS communication application 1190 of both the UCD 1114 and the ICD 1112 need to agree on and/or have control over various settings. For example, the UCD 1114 and ICD 1112 agree to use a cellular data connection (e.g., 5G) to transmit transactional data. However, the UCD will only transmit certain confidential information via an STS wireless connection 1118 and the ICD will only accept connections with a minimum bit rate over a wireless local area network (WLAN) connection with the UCD. Thus, the ICD needs to agree to receive the certain confidential information via the STS wireless connection 1118 and the UCD needs to agree to transmit at the minimum bit rate over the WLAN to successfully perform the setup.

The operator interaction application 11140 includes an operator version of a fast food drive ordering application, a transportation ticket purchase application, an event ticket purchase application, a banking application, a point of sale payment application, a rental car enable and checkout application, an airline application, a sales information application, an interactive screen information application, a data transfer application, a meeting data exchange application, a hotel check in application, a cell phone is hotel room key application. The payment processing application 11142 includes one or more of a bank operator application, a credit card operator application, peer-to-peer payment operator application, a cryptocurrency exchange operator application, and an automated clearing house application.

Once the STS communication settings are agreed upon, the UCD 1114 and ICD 1112 may utilize the STS wireless connection 118 to transmit data of a transaction. The STS wireless connection 118 includes one or more connection types. For example, a first connection type is a body as a network (BaaN) connection. As another example, a second connection type is a touch screen to touch screen close proximity connection. As yet another example, a third connection type is a connective surface between the touch screen to touch screen (e.g., in order to transmit an encoded vibration signal). In an example, the user computing device 1114 and the interactive computing device 1112 exchange confidential information (e.g., confidential information 11141), or a portion thereof via the STS wireless connection 1118.

By using the STS wireless connection, the UCD 1114 and ICD 1112 exchange data in a secure manner and also reduce the amount of steps a user of the UCD needs to manually complete to perform a transaction. For example, using a BaaN connection, the signal is difficult for any device other than then UCD and ICD to detect. Further, when transmitting payment information during touching a screen to confirm an order of items, a user does not have to perform one or more of the steps of locating a credit card, swiping the card, verifying the amount, signing a screen or physical receipt, and returning card to a safe location.

Figure 62P:
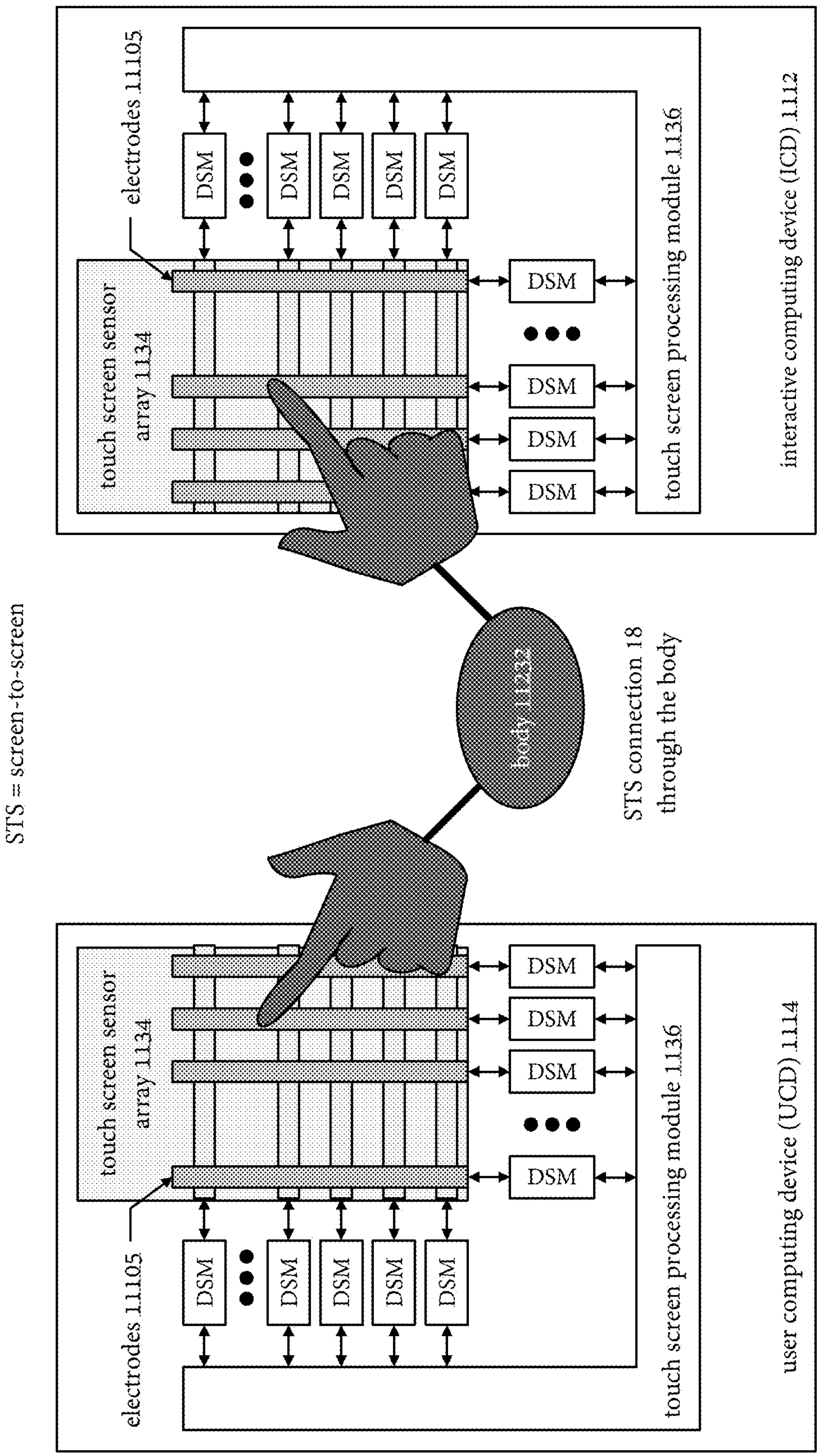
FIG. 62P is a schematic block diagram of an embodiment of a screen-to-screen (STS) connection in accordance with the present disclosure.

FIG. 62P is a schematic block diagram of an embodiment of a screen-to-screen (STS) connection 118 between a user computing device (UCD) 1114 and an interactive computing device (ICD) 1112 through a body 11232 (e.g., human body for a body as a network (BaaN) STS connection). The UCD 1114 and ICD 1112 include a touch screen sensor array 1134, drive sense modules, and a touch screen processing module 1136. The touch screen sensor array 1134 includes rows of electrodes 11105 (shown in yellow) and columns of electrodes 11105 (shown in blue).

In an example of operation, a drive sense module generates a signal having an oscillation component based on a command from the touch screen processing module 1136. The drive sense module drives the signal onto a touch sense element (e.g., one or more electrodes 11105) of the touch screen sensor array 1134. When a part of the body (e.g., finger, hand, arm, foot, etc.) touches the first touch sense element or is in close proximity (e.g., within a few millimeters to tens of millimeters), the signal on the touch sense element propagates through the body 11232. The ICD 1112 receives the signal through another part of the body 11232 (e.g., another finger) via a second touch (or close proximity connection) on the touch screen sensor array 1134 of the ICD 1112.

As such, data is securely transmitted from one device to another. The transmit of data is also more efficient for a user (e.g., body 11232) as the data can be transmitted more seamlessly than other communication types. For example, with STS communications enabled on both the UCD and the ICD, when a user of the UCD presses (e.g. touches) a payment button on the ICD, payment information may be security transmitted from the UCD to the ICD via the STS connection 1118 during the pressing without other steps (e.g., inputting payment information, selecting a payment option, scanning a bar code, swiping a card, etc.).

In a specific embodiment, the touch screen processing module may adjust the current of a signal driven onto the touch sense element based on a composition of the body in the BaaN. For example, a user's body impedance lowers as total body water of the user (e.g., stored in the user's tissues) increases. Thus, as the users' impedance changes, the touch screen processing module may adjust the current accordingly. This allows the current usage to be minimized, which may save power. This further allows for the signal to be modified to achieve desired signal characteristics (e.g., signal to noise ratio, signal strength, etc.).

Figure 62Q:
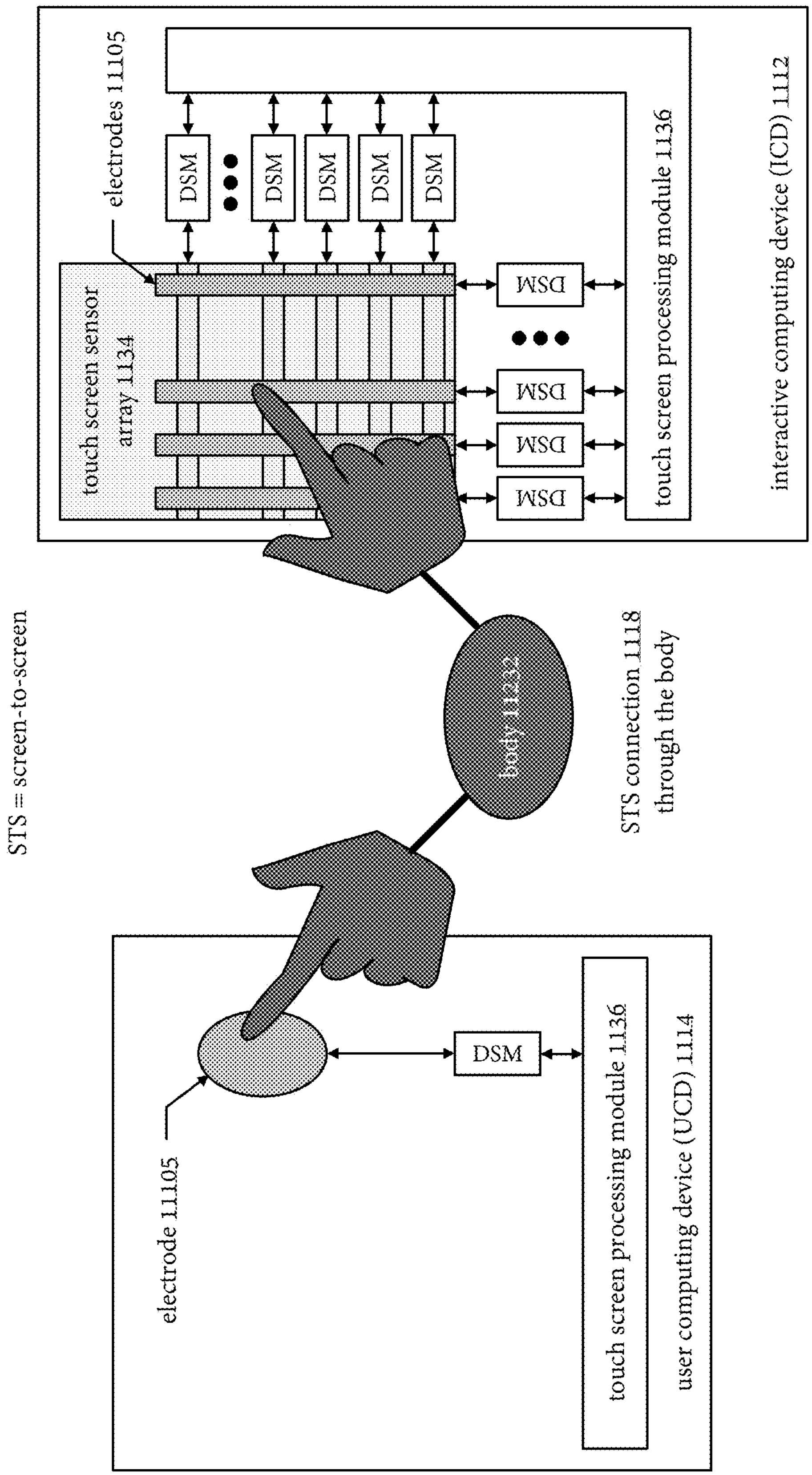
FIG. 62Q is a schematic block diagram of another embodiment of a screen-to-screen (STS) connection in accordance with the present disclosure.

FIG. 62Q is a schematic block diagram of an embodiment of a screen-to-screen (STS) connection 1118 between a user computing device (UCD) 1114 and an interactive computing device (ICD) 1112 through a human body 11232. The UCD 1114 includes an electrode 11105 (e.g., of a touch screen), a drive sense module, and a touch screen processing module 1136. The ICD 1112 includes a touch screen sensor array 1134 that includes electrodes 11105, drive sense modules (DSMs), and a touch screen processing module 1136.

In an example of operation, the STS connection 1118 is formed between an electrode 11105 of the UCD 1114 and a touch sense element (e.g., one or more electrodes) of the touch screen sensor array 1134 of the ICD 1112. The DSMs sense an impedance change of a corresponding electrode(s) 11105, which is interpreted by a touch screen processing module 1136 as a command. As a specific example, the command is a user signature. While the user is signing an area of the touch screen sensor array 1134, an STS connection 1118 is formed and data (e.g., payment data) can be exchanged between the UCD and the ICD over the STS connection. Thus, during the signature, data transmitted via the STS connection 1118 assist in completing a transaction.

Figure 62R:
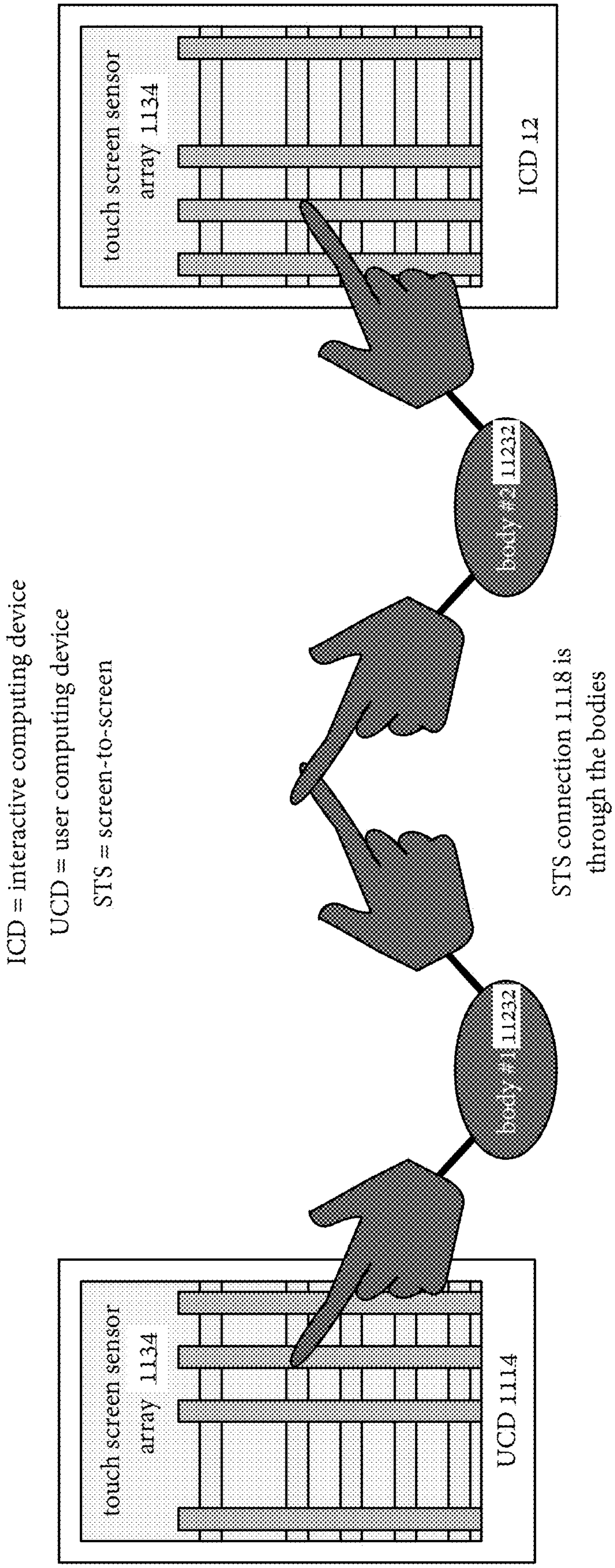
FIG. 62R is a schematic block diagram of an embodiment of another example a screen-to-screen (STS) connection in accordance with the present disclosure.

FIG. 62R is a schematic block diagram of an example of a screen-to-screen (STS) connection 1118 between a user computing device (UCD) 1114 and an interactive computing device (ICD) 1112 through multiple bodies 11232. The UCD 1114 includes a first touch screen sensor array 1134 and the ICD 1112 includes a second touch screen sensor array 1134.

In an example of operation, the STS connection 1118 is formed from the first touch sensor array 1134 through a first body 11232 and a second body 11232 to a second touch screen sensor array 1134 of ICD 1112, or vice versa. There ae various ways a connection between the bodies can occur. For example, the connection occurs when user 1 and user 2 fist bump, shake hands or otherwise have skin-to-skin contact that allows the signal (e.g., driven onto a touch sense element of the touch screen) to propagate. In a specific example, the STS connection 1118 is formed between the UCD 1114 and the ICD 1112 when the body #1 11232 is in contact with the body #2 11232 for a certain time period (e.g., 20 milliseconds, 0.2 seconds, 3 seconds, etc.).

In an embodiment, the computing device 1112-14 includes a touch button or other specific area on the computing device 1112-14 used to ensure purposeful engagement of a user in sharing data via the STS connection 1118. For example, a portion of a side of the computing device is selected (e.g., clicked, swiped, etc.) 3 times as a command to purposefully engage. As another example, a portion of a display on the computing device 1112-14 displays a share "button" for a user to select in order to purposefully engage. As yet another example, "shaking" the computing device 1112-14 indicates the user's intent to purposefully engage.

Figure 62S:
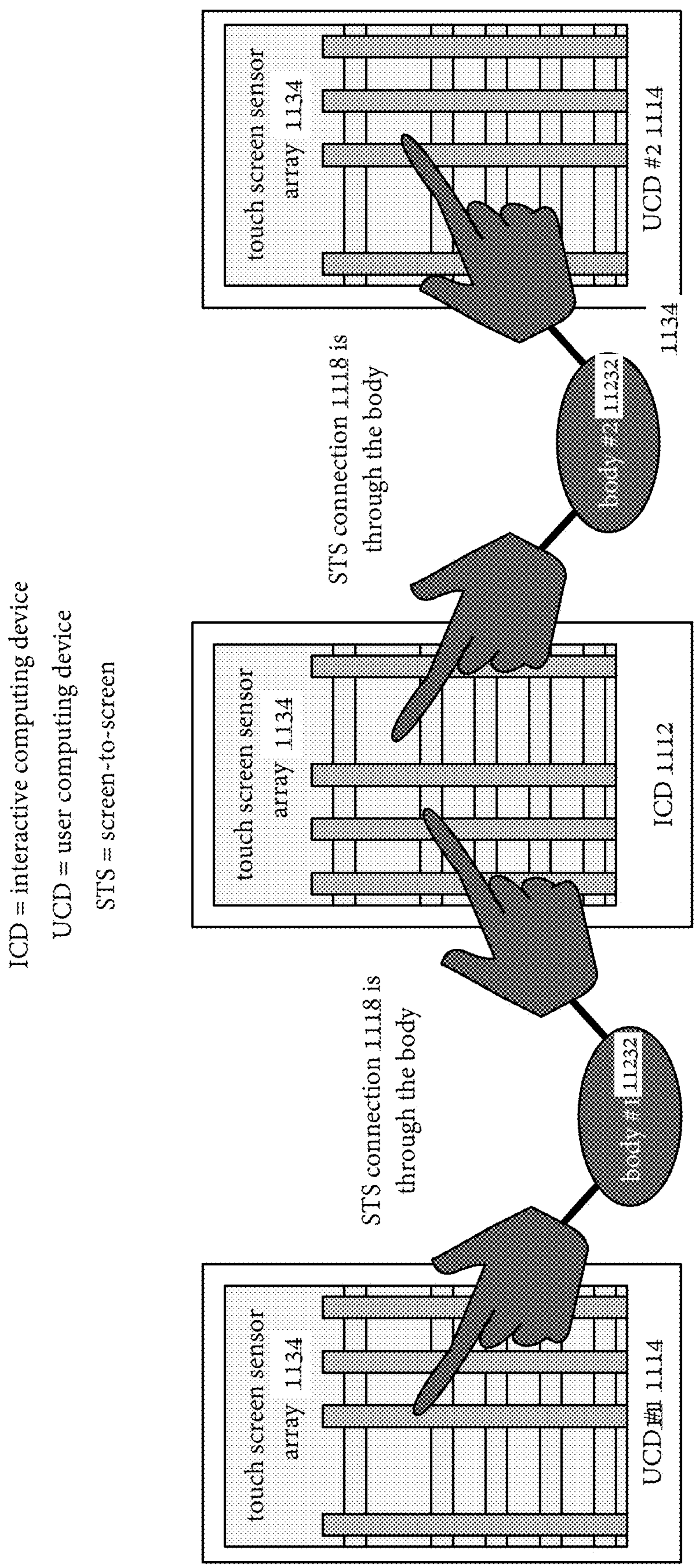
FIG. 62S is a schematic block diagram of an embodiment of an example of forming multiple screen to screen (STS) connections in accordance with the present disclosure.

FIG. 62S is a schematic block diagram of an example of forming multiple screen to screen (STS) connections 1118 for a transaction between an interactive computing device (ICD) 1112 and multiple user computing devices (UCDs) 1114. In an example, a first STS connection 1118 is formed between the UCD #1 and the ICD 1112 via a first body 11232 and a second STS connection 1118 is formed between the ICD 1112 and the UCD #2 via a second body 11232. In an example, this allows the UCD #1 and the UCD #2 to share data via the first and second STS connections 1118 and the ICD 1112.

As a specific example, multiple users determine to split a dinner bill at restaurant. For example, a user #1 of UCD #1 (a first cell phone operable to perform STS communications) and user #2 of UCD #2 (a second cell phone operable to perform STS communications) determine to split the dinner bill. The ICD 1112, which is a point-of-sale device that includes a touch screen sensor array 1134 and is operable to perform STS communications. User #1 and #2 both activate a payment transaction via a payment application on their cell phone and touch the touch screen sensor array 1134 of the point of sale device, which forms an STS connection 1118 from each cell phone to the point of sale device.

The point of sale device prompts the users to select items for which they will provide payment or prompts the users to select a percentage of the bill they will pay. For example, user #1 indicates they will pay 1160% of the bill amount and user #2 indicates they will pay 1140% of the bill amount. In a specific embodiment, the users must touch the touch screen sensor array during the same time period (e.g., simultaneously, within 1 sec, etc.) to properly validate the transaction.

Figure 62T:
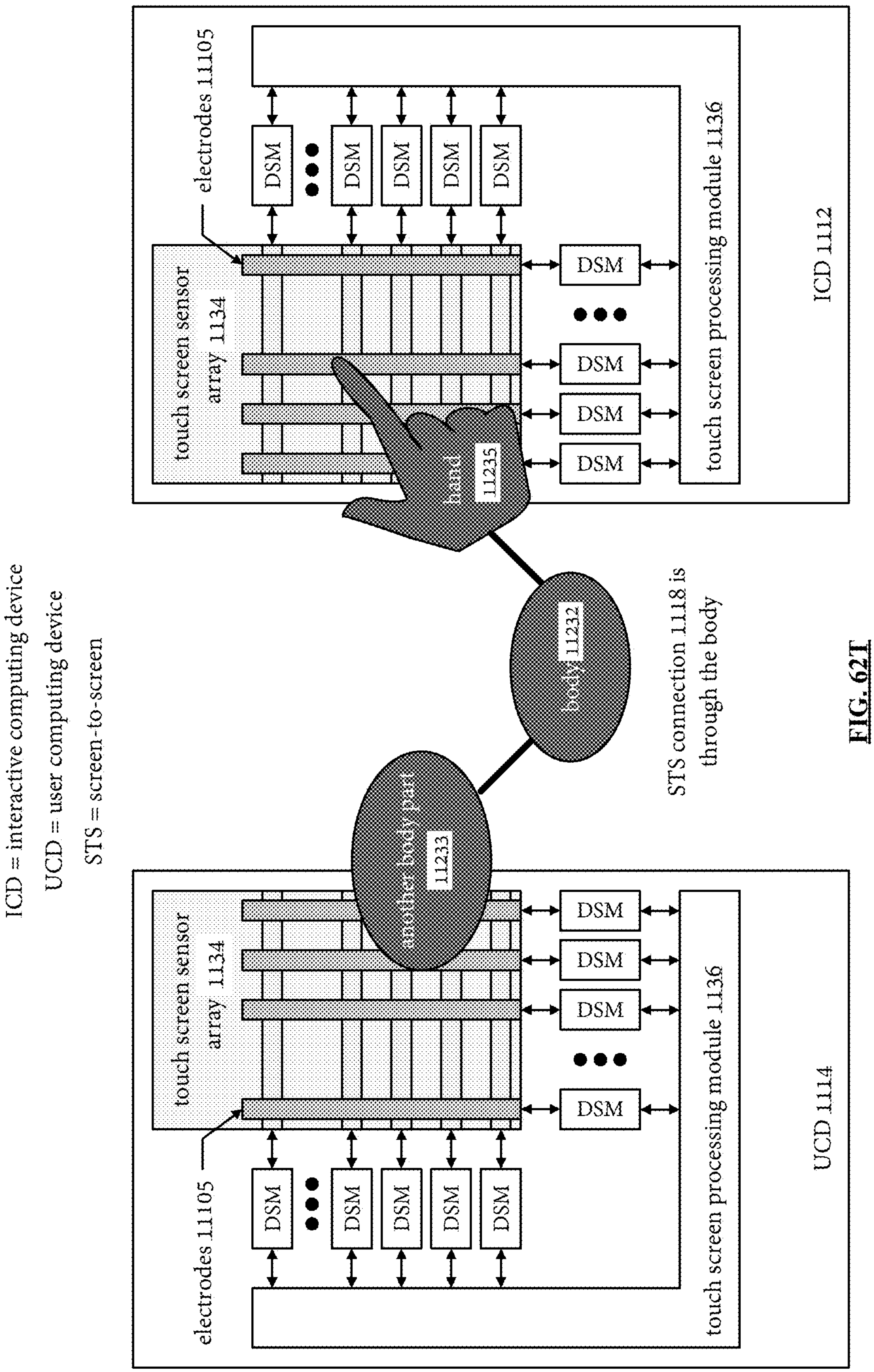
FIG. 62T is a schematic block diagram of an embodiment of another example an example of forming multiple screen to screen (STS) connections in accordance with the present disclosure.

FIG. 62T is a schematic block diagram of an example of a screen-to-screen (STS) connection 1118 between a user computing device (UCD) 1114 and an interactive computing device (ICD) 1112. In this example, another body part 11233 (e.g., leg, arm, chest, wrist, etc.) in is contact with the UCD 1114 and operates to transmit a signal between the UCD 1114 and the ICD 1112 via the STS connection 1118 that includes the other body part 11233, the body 11232, and hand 11235. As a specific example, the UCD 1114 is a cell phone in a user's pants pocket and the other body part is a leg proximal to the pants pocket, allowing the user to transmit STS communications without removing the cell phone from their pocket.

Figure 62U:
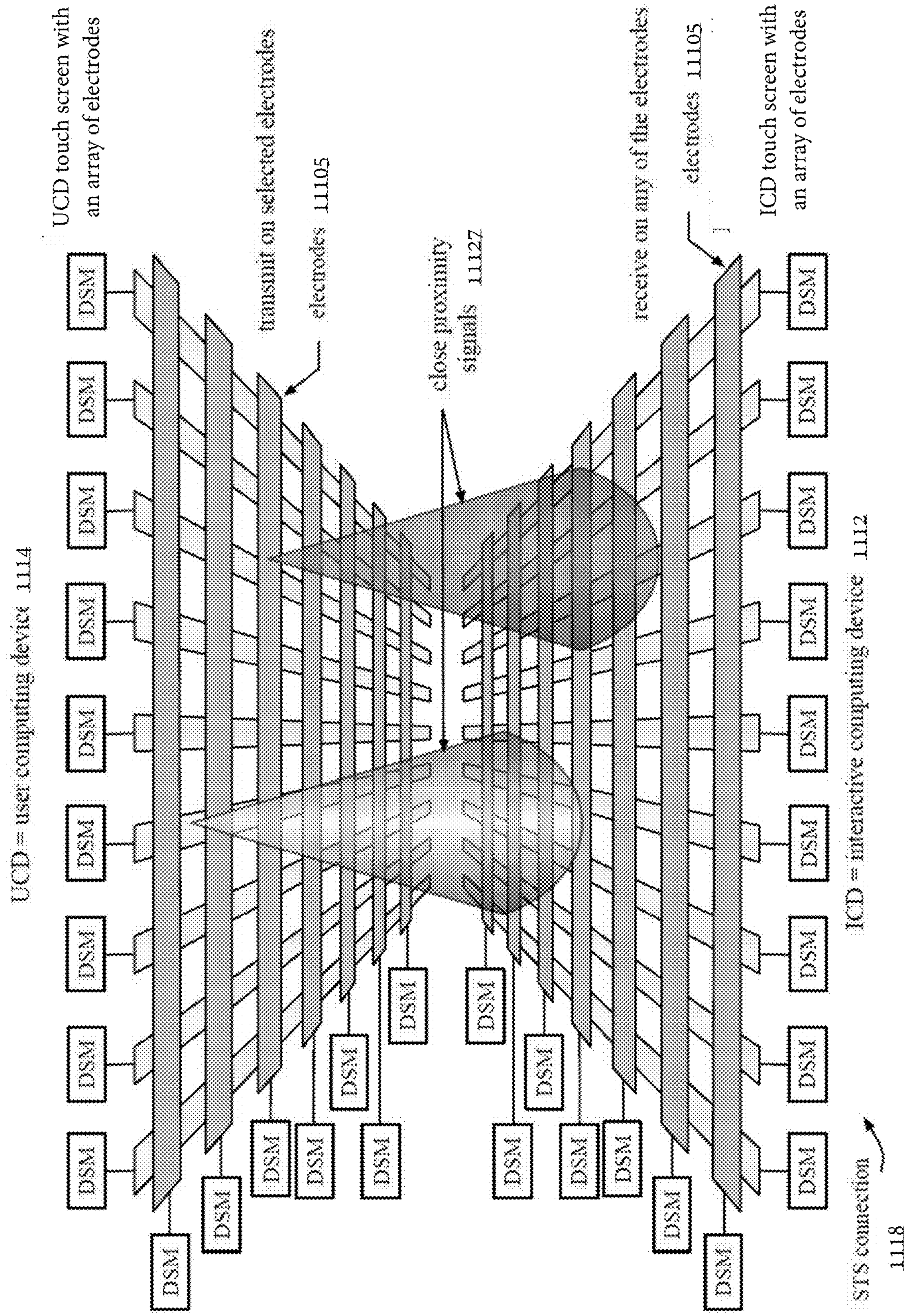
FIG. 62U is a schematic block diagram of an embodiment of an example of transmitting close proximity signals in accordance with the present disclosure.

FIG. 62U is a schematic block diagram of an example of transmitting close proximity signals 11127 from a user computing device 1114 to an interactive computing device 1112 to form a screen to screen (STS) connection 1118. The user computing device 1114 includes drive sense modules (DSMs) and a touch screen array 1134 of electrodes 11105. The interactive computing device 1112 includes drive sense modules (DSMs) and a touch screen array 1134 of electrodes 11105.

In an example of operation, data is transmitted in close proximity signals 11127 via one or more electrodes 11105 of the user computing device (UCD) 1114 touch screen with an array 1134 of electrodes 11105. The electrodes 11105 are shaped and designed for capacitance sensing (e.g., not radio frequency (RF) transmission). In an example, the electrodes of the computing device generate and shape an electric field. At close proximity (e.g., a few centimeters (cm) to 1110's of cm (e.g., 1170 cm), electrodes in another computing device will detect the electric field. In this example, the signaling is very low power and the radiated energy from the signal drops off very rapidly (e.g., less than few feet before signal to noise ratio is too low).

In an example, the UCD 1114 selects one or more of the electrodes 11105 to transmit the close proximity signals 11127. For example, the UCD 1114 determines an optimal area (e.g., which contains one or more electrodes) of the touch screen sensor array 1134 to transmit to produce the selected electrodes 11105. As another example, the UCD 1114 selects electrodes for receiving close proximity signals 11127 to be transmitted from the DC 1112. Note the UCD may select one or more different electrodes for receiving and transmitting the close proximity signals 11127.

Figure 62V:
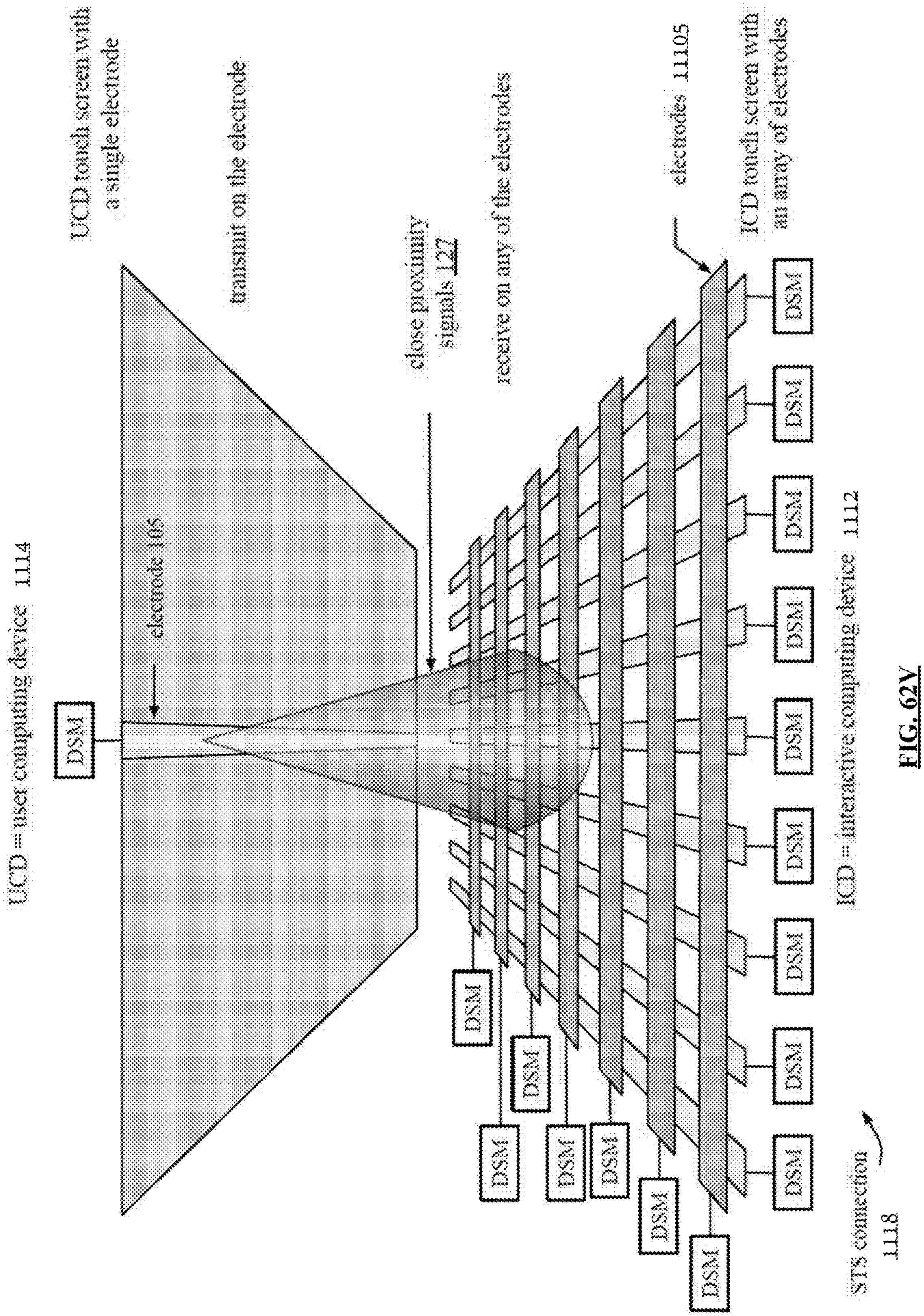
FIG. 62V is a schematic block diagram of an embodiment of another example of transmitting close proximity signals in accordance with the present disclosure.

FIG. 62V is a schematic block diagram of another example of transmitting close proximity signals 11127 between a user computing device (UCD) 1114 and an interactive computing device 1112 to form a screen to screen (STS) connection 1118. The UCD includes a single electrode 11105. The ICD 1112 includes an array of electrodes 11105 and is enabled to receive the close proximity signal 11127 on one or more of any of the electrodes 11105. The electrode 11105 of the UCD may be one of a variety of shapes. For example, the electrode shape is one or more of a rectangle, a polygon, circular, a meandering trace, and a square.

Figure 62W:
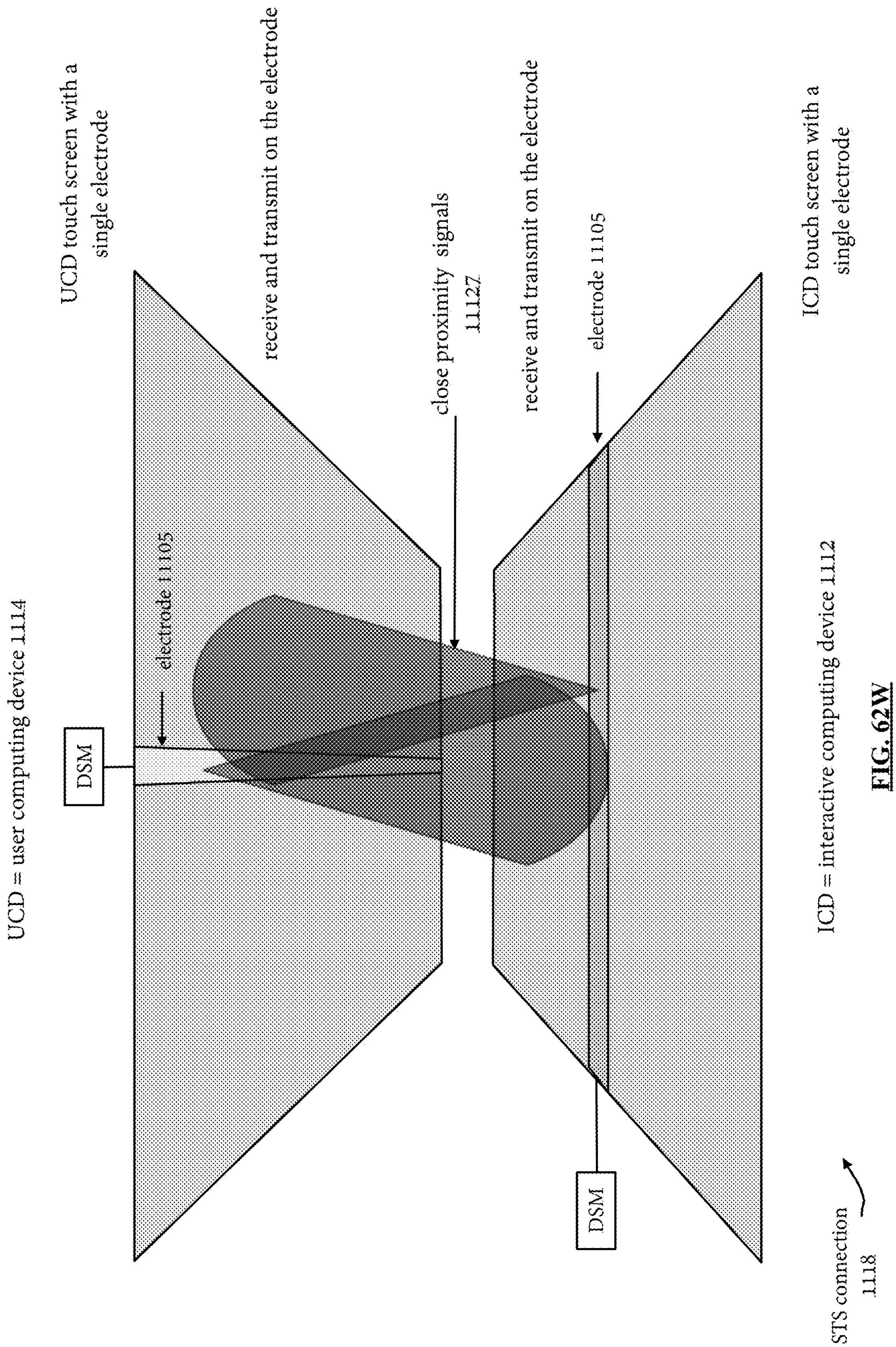
FIG. 62W is a logic flow diagram of an example of a method for determining which type of communication to use in accordance with the present disclosure.

FIG. 62W is a schematic block diagram of another example of transmitting close proximity signals 11127 between a user computing device (UCD) 1114 and an interactive computing device (ICD) 1112 to form a screen to screen (STS) connection. In this example, each touch screen (e.g., of the user computing device, of the interactive computing device) includes a single electrode 11105. The orientation of an electrode of one device can vary with an electrode of another device. For example, the electrodes may be oriented perpendicular to each other, parallel to each other, offset (e.g., from a horizontal center, from a vertical center, etc.) with respect each other, and/or a rotated a certain number of degrees with respect to each other. In this example, the electrode 11105 (shown in yellow) of the UCD 1114 transmits close proximity signals 11127 (shown as the yellow signal) to the electrode 11105 (shown in blue) of the ICD 1112. The electrode 11105 (shown in blue) of the ICD 1112 transmits close proximity signals 11127 (shown as the blue signal) to the electrode 11105 of the UCD 1114.

Figure 62X:
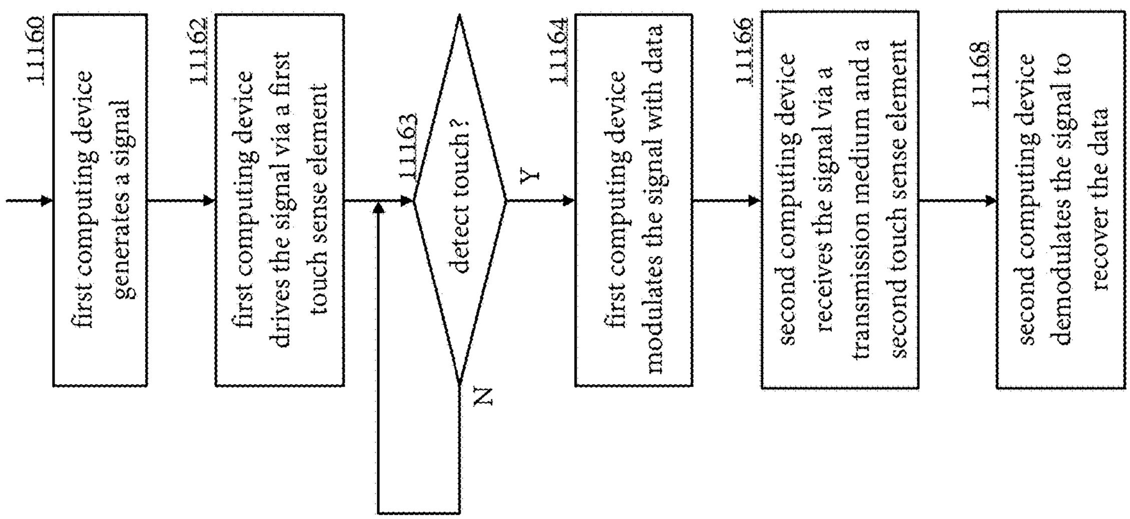
FIG. 62X is a logic flow diagram of an example of a method of a first and second computing device communicating via a screen to screen (STS) connection in accordance with the present disclosure.

FIG. 62X is a logic flow diagram of an example of a method of a first and second computing device (e.g., a user computing device, an interactive computing device, another computing device, etc.) communicating via a screen to screen (STS) connection. The method begins or continues with step 11160, where a first computing device generates a signal. For example, the signal has one or more of a direct current (DC) component and an oscillating component. The method continues with step 11162, where the first computing device drives the signal on to a first touch sense element (e.g., one or more electrodes) of the first computing device.

The method continues with step 11163, where the first computing device determines whether it detects a touch (e.g., pen, human finger, etc) on the first touch sense element based on the signal. For example, the first computing device detects the touch by determining a capacitance change (e.g., self-capacitance, mutual-capacitance) associated with the first touch sense element. When the touch is not detected, the method continues with back to step 11163. Alternatively when the touch is not detected, the method times out or loops back to steps 11160 and/or 11162.

When the touch is detected, the method continues at step 11164, where the first computing device modulates the signal with data to produce a modulated data signal. In an example, the oscillating component of the signal has a first frequency and the first computing device modulating the signal with the data to produce the modulated data signal includes mixing the signal with the data that includes a second oscillating component having a second frequency.

The method continues with step 11166, where the second computing device receives the modulated data signal via a transmission medium and a second touch sense element (e.g., one or more second electrodes) of the second computing device. The transmission medium includes at least one of a human body (e.g., body as a network (BaaN)) and a close proximity (e.g., 1170 cm or less) between the first and second computing devices. In an example, when the human body is the transmission medium, the second computing device operates to detect a second touch on the second touch sense element.

The method continues with step 11168, where the second computing device demodulates the modulated data signal to recover the data. In an example, the second computing device may respond to the data by generating a second signal having a second oscillating component. The second computing device drives the second signal on the second touch sense element and detects a second touch on the second touch sense element based on the second signal. While the second touch is detected, the second computing device modulates the second signal with second data to produce a second modulated data signal. For example, the second computing device backscatters the second data with the modulated data signal to produce the second modulated data signal. As another example, the second computing device mixes the second data with the second signal to include a second oscillating component having a second frequency.

The first computing device may then receive the second modulated data signal via the transmission medium and the first touch sense element and/or another touch sense element (e.g., touch sense element in contact with a user) of the first computing device. The first computing device demodulates the second modulated data signal to recover the second data.

Figure 62Y:
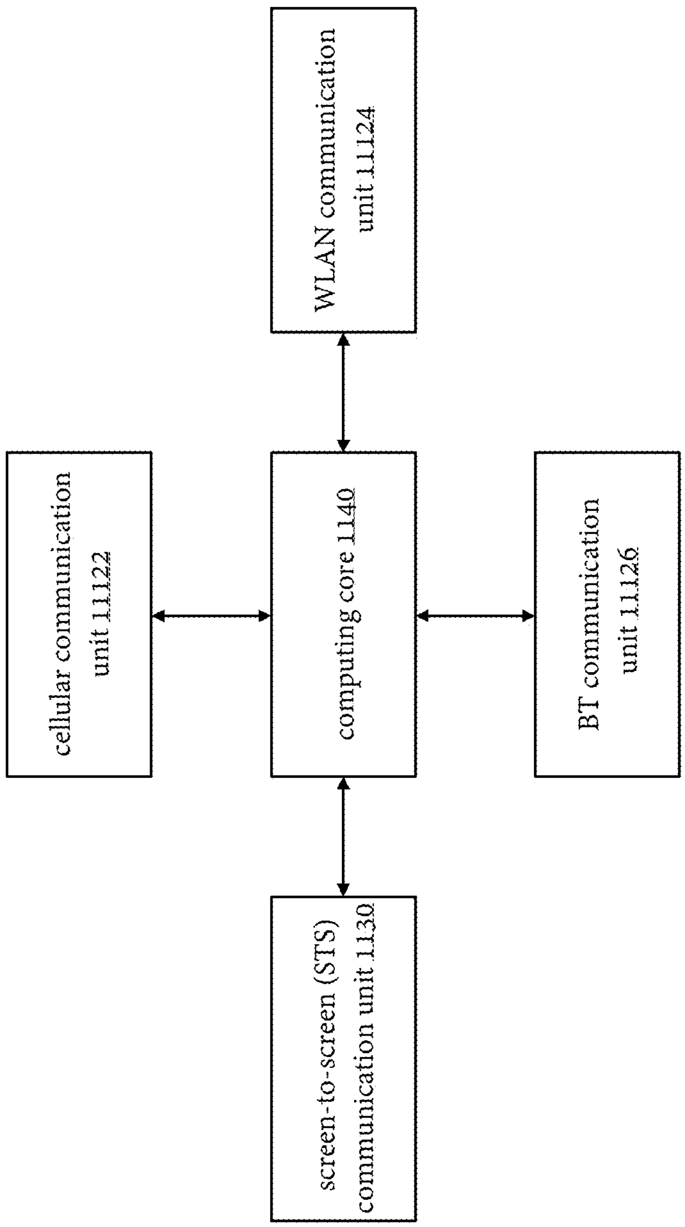
FIG. 62Y is a schematic block diagram of an embodiment of a computing device in accordance with the present disclosure.

FIG. 62Y is a schematic block diagram of a computing device 1112-14 that includes a computing core 1140, a screen-to-screen (STS) communication unit 1130, a cellular communication unit 11122, a wireless local area network (WLAN) communication unit 11124, and a Bluetooth (BT) communication unit 11126. As such, a computing device 1112-14 can communicate in various forms (e.g., via Bluetooth, via STS, etc.) with other devices (e.g., servers, other computing devices, base stations, etc.) via one or more of the communication units 11120-126. For example, a first computing device 1112-14 communicates STS data of a transaction to another computing device 1112-14 via the STS communication unit 1130. As another example, a computing device 1112-14 communicates verification data of a transaction to an interactive application server via the cellular communication unit 11122.

The computing device determines one or more of the communication options (e.g., screen-to-screen STS, Bluetooth (BT), etc.) to use based on a data type and/or a data communication protocol. For example, the data communication protocol indicates to communicate data of a private personal data type via the STS communication unit 1130. As another example, the computing device determines to communicate user computing device location information via the cellular communication unit 11122. Further examples of communicating data via the one or more communication units 11120-126 is discussed in further detail with reference to one or more subsequent figures.

Figure 62Z:
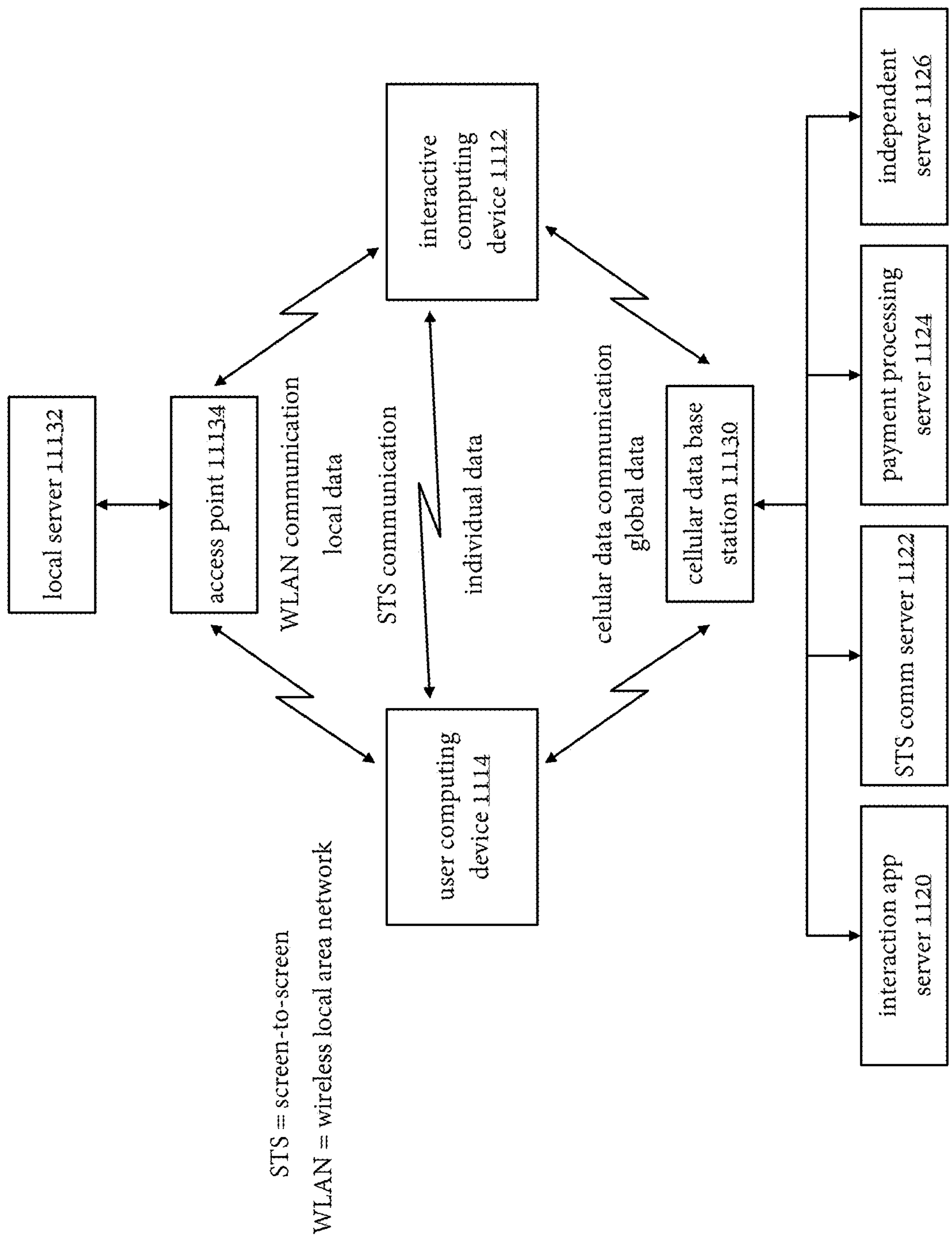
FIG. 62Z is a schematic block diagram of an embodiment of a communication in accordance with the present disclosure.
Figure 62A:
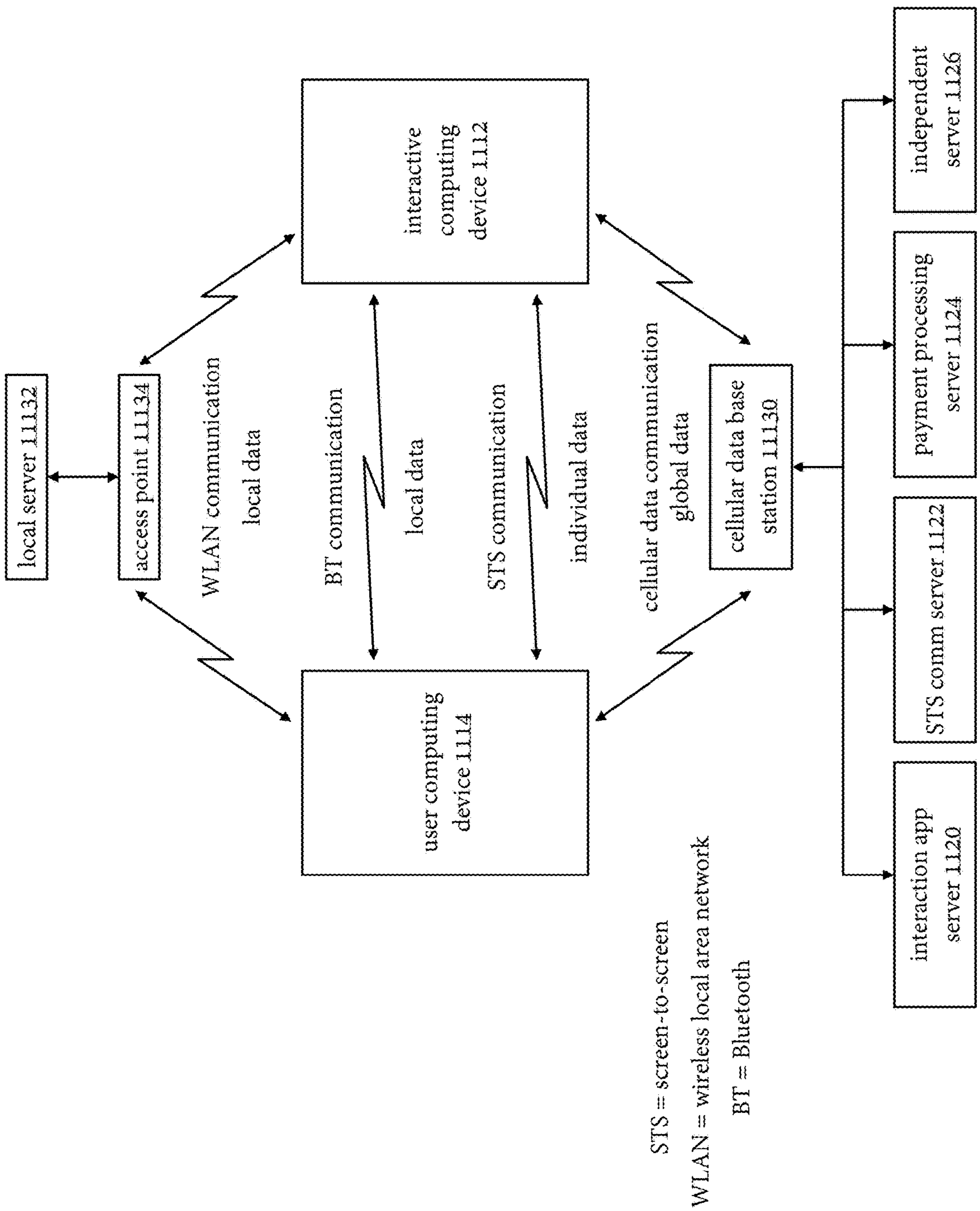
Figure 62A:
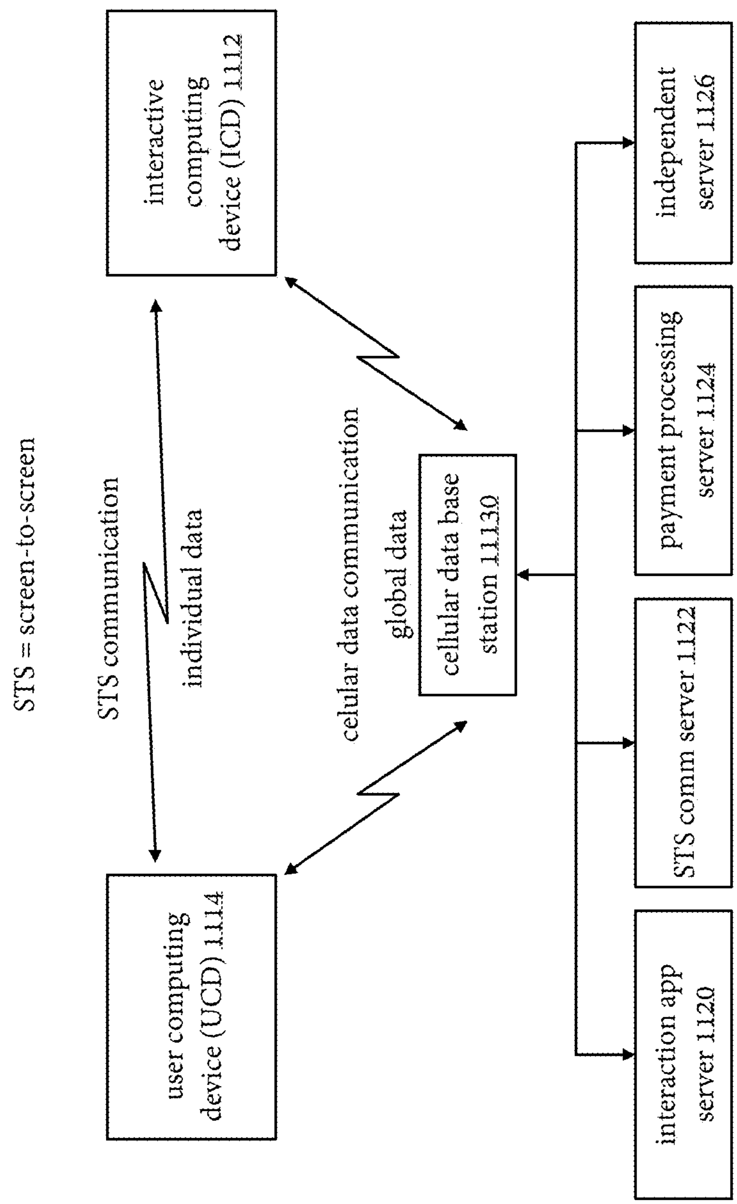
Figure 62A:
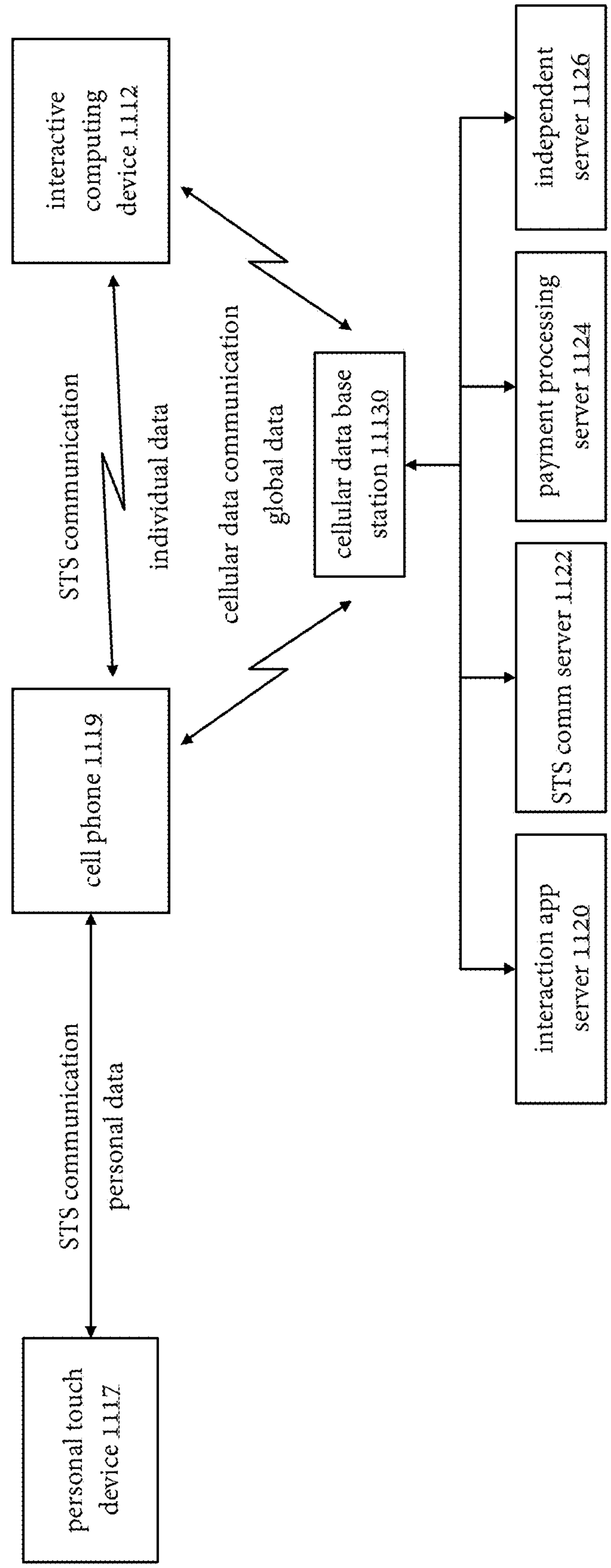
Figure 62A:
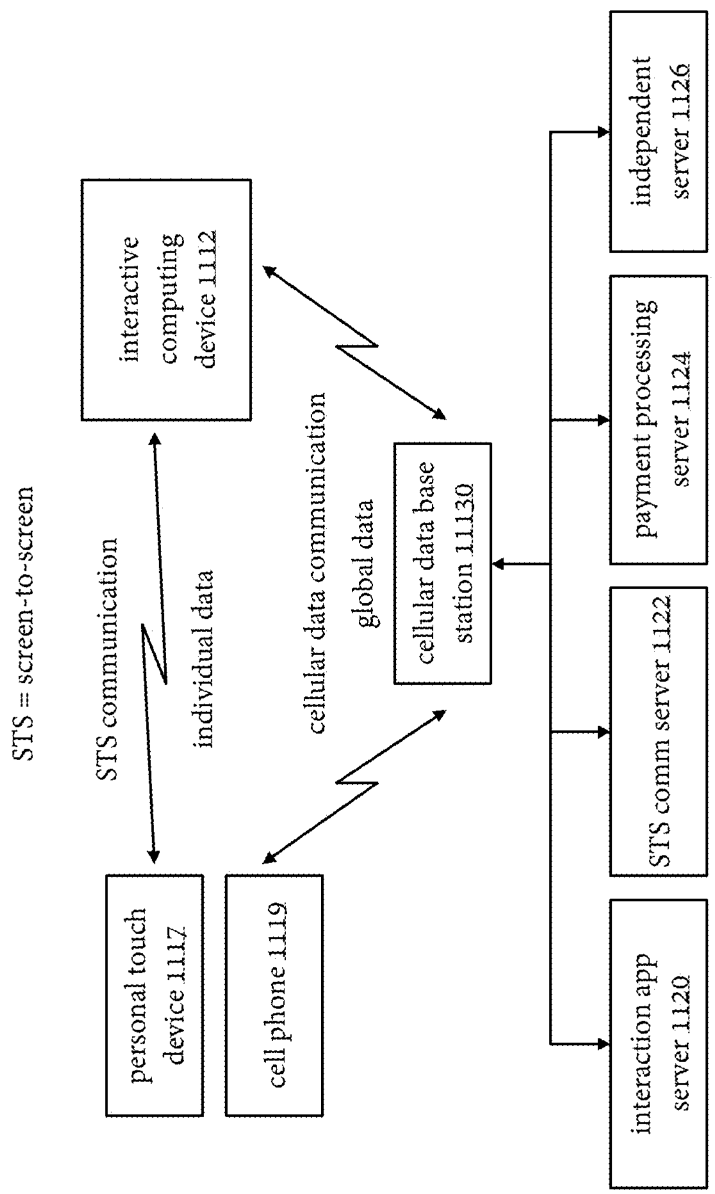
Figure 62A:
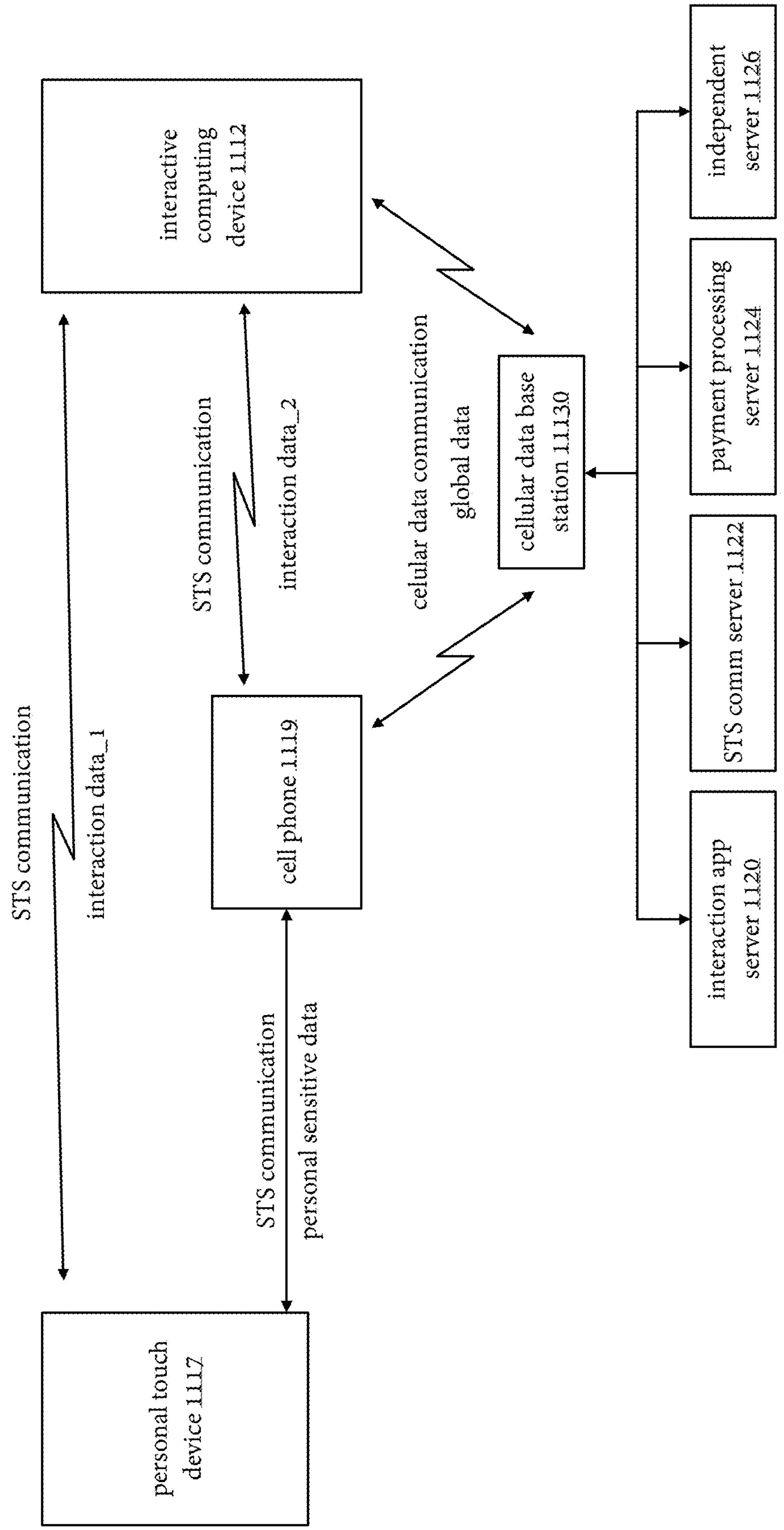
Figure 62A:
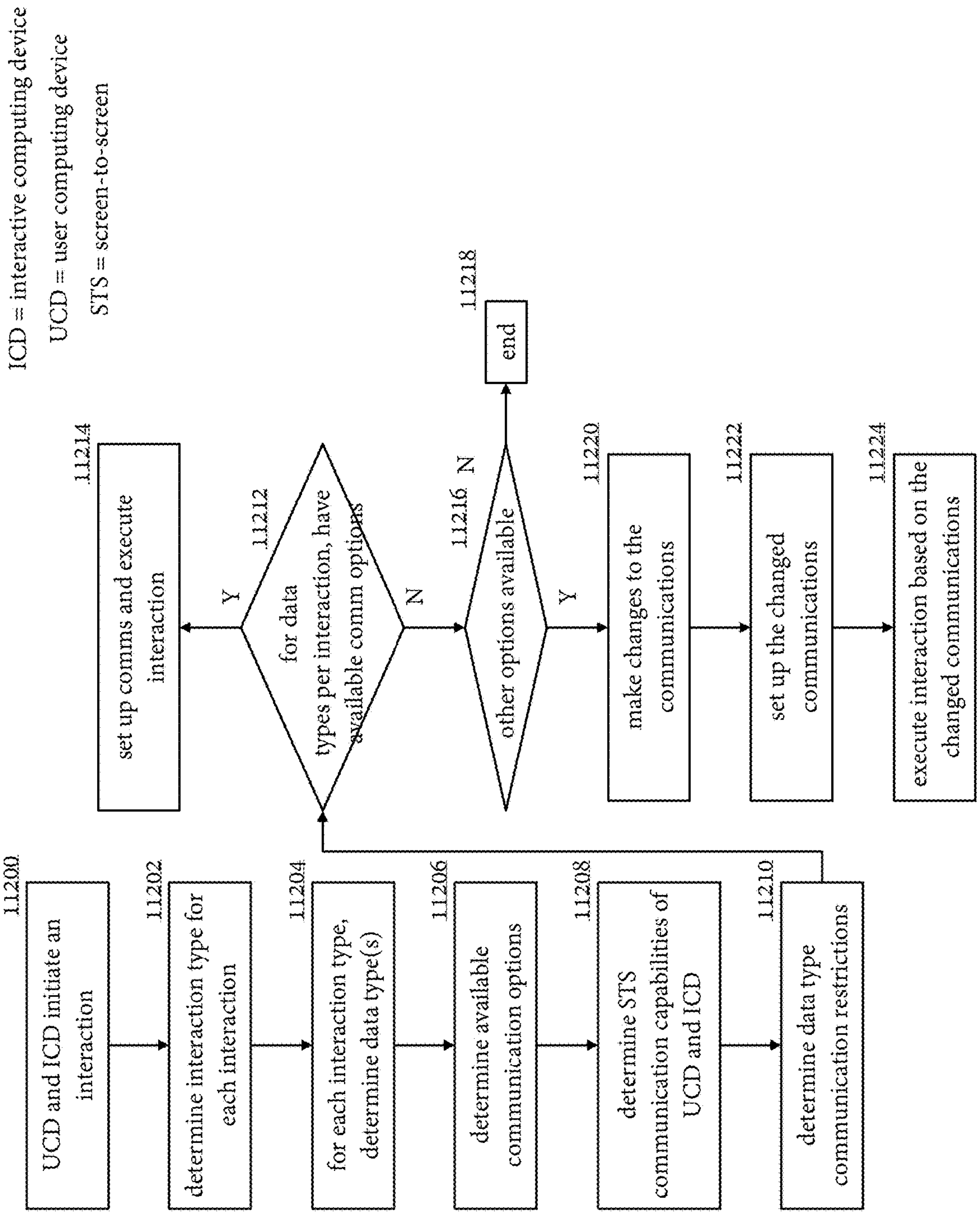
Figure 62A:
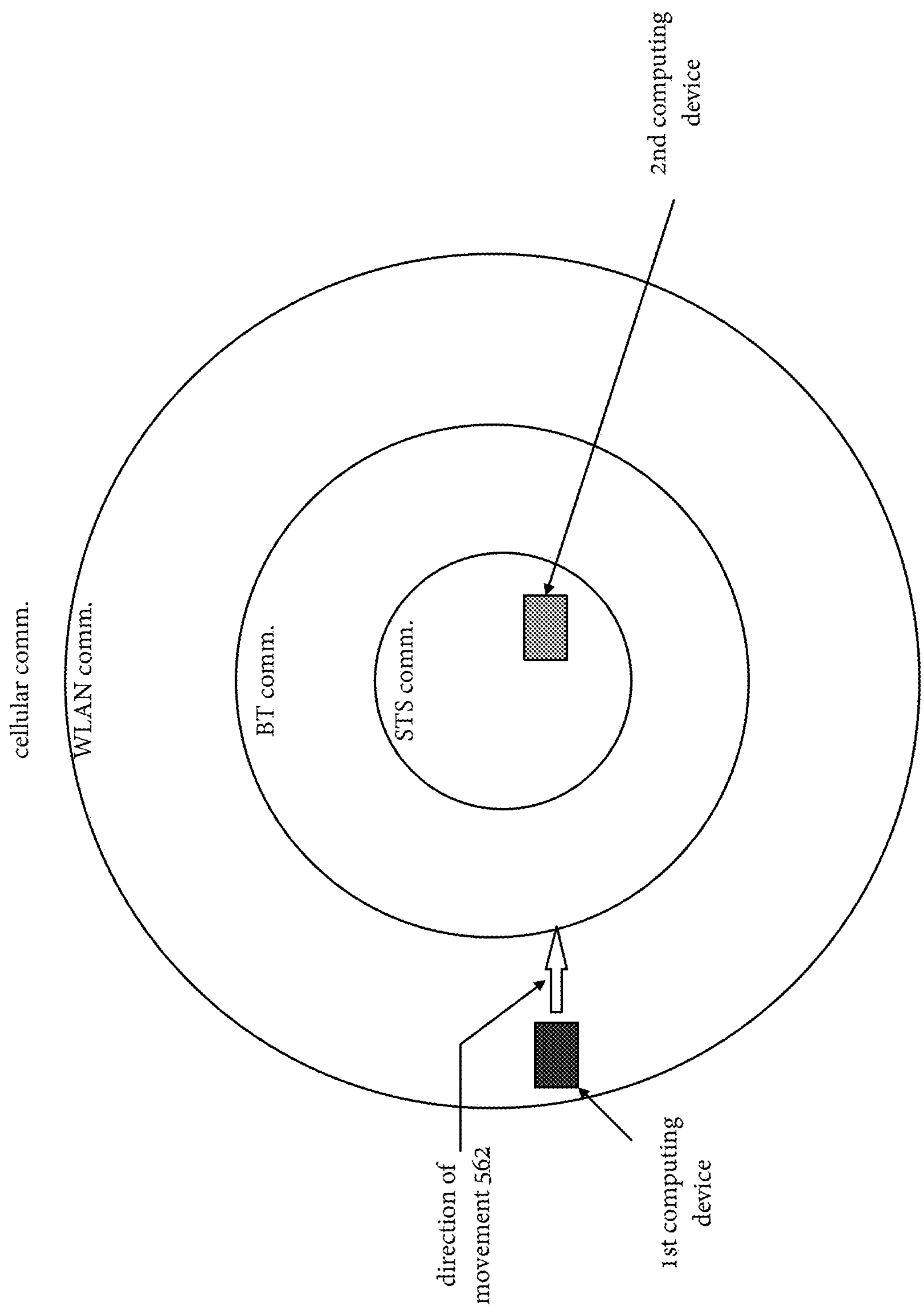
Figure 62A:
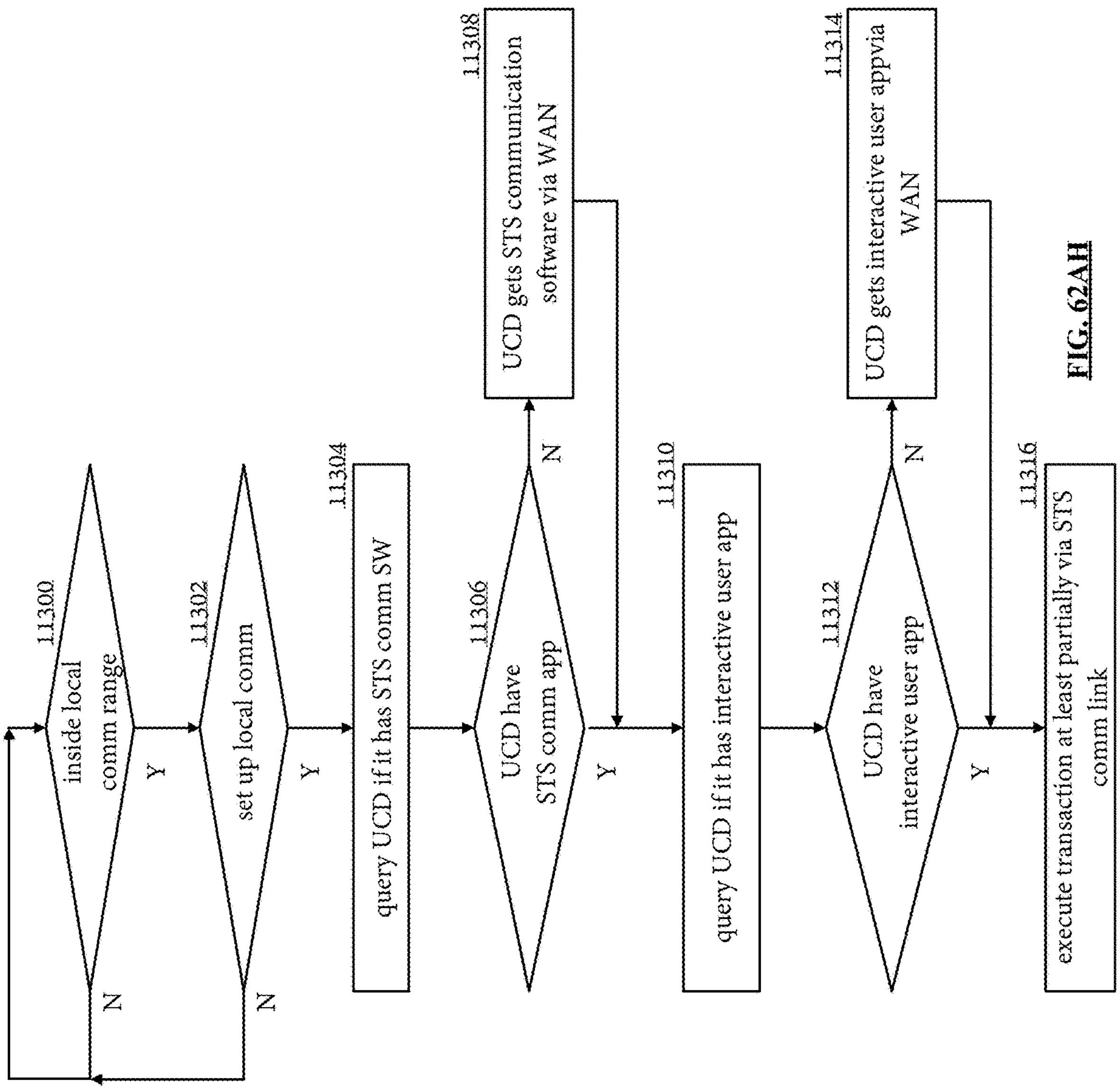
Figure 62A:
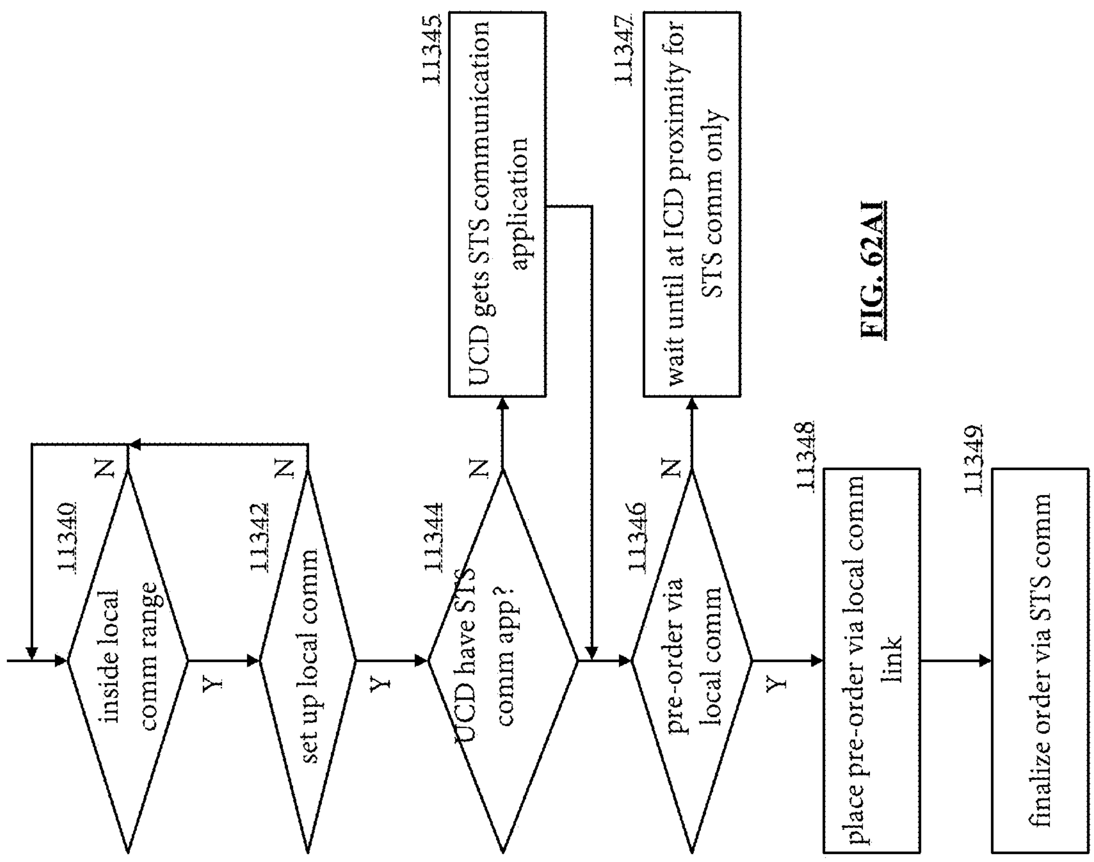
Figure 62A:
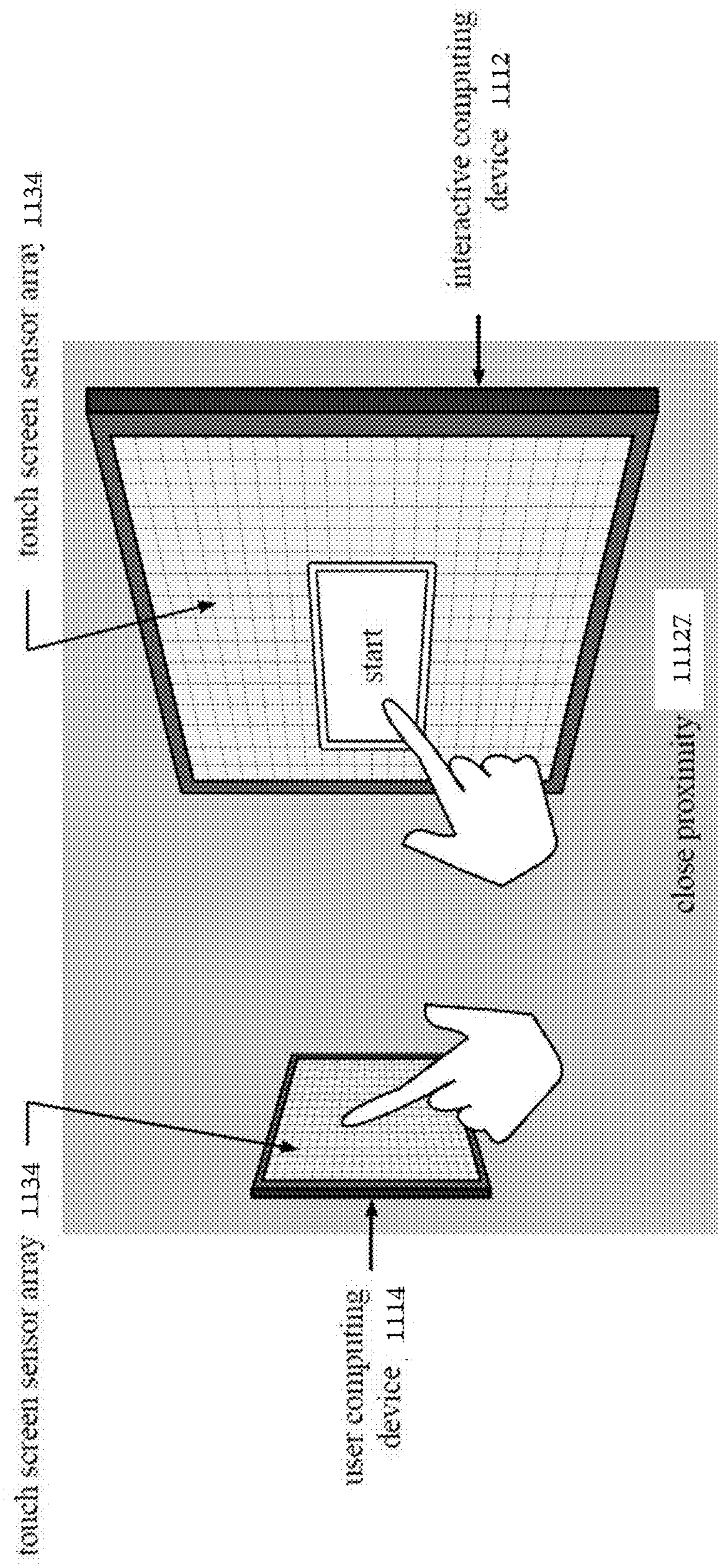
Figure 62A:
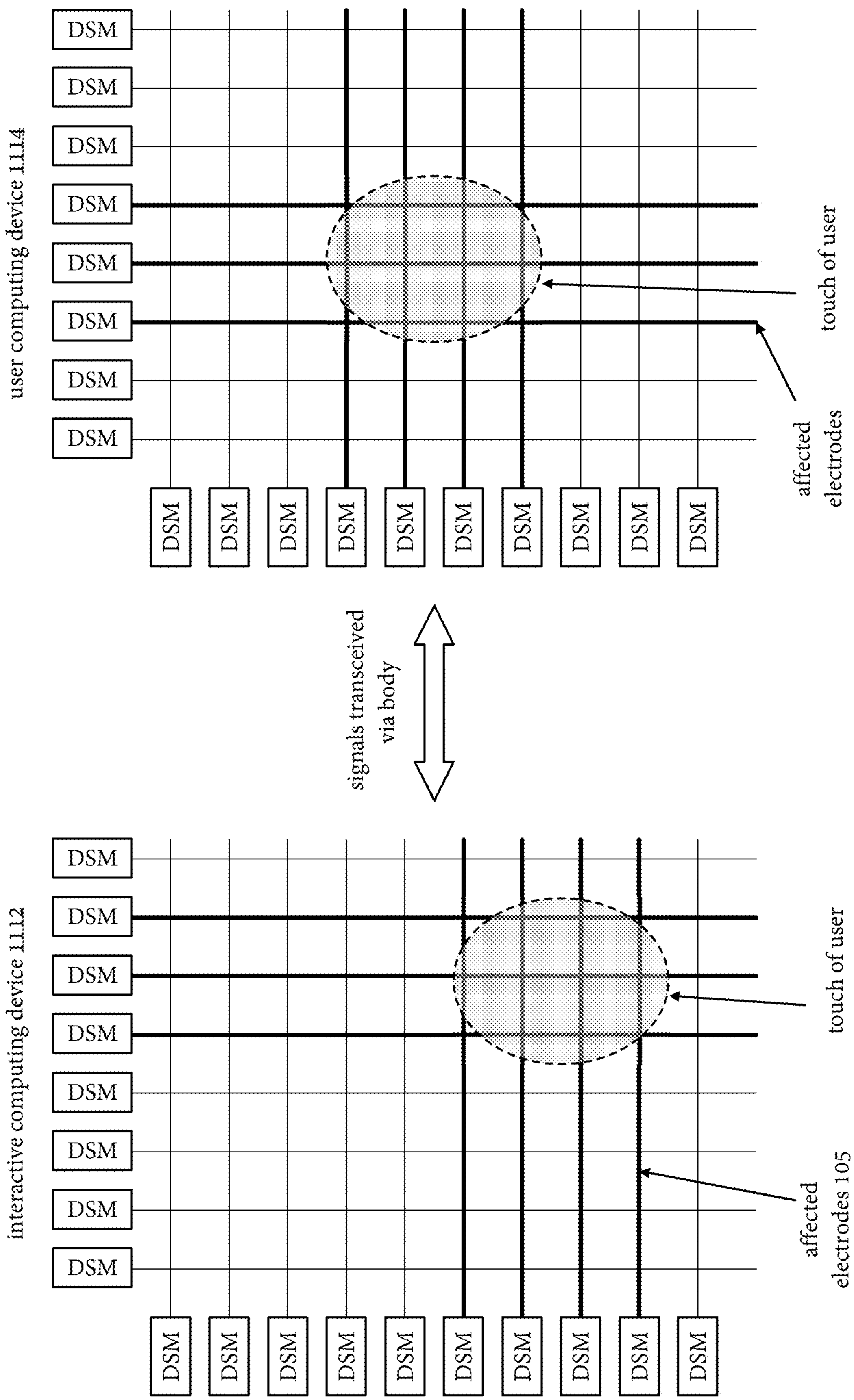
Figure 62A:
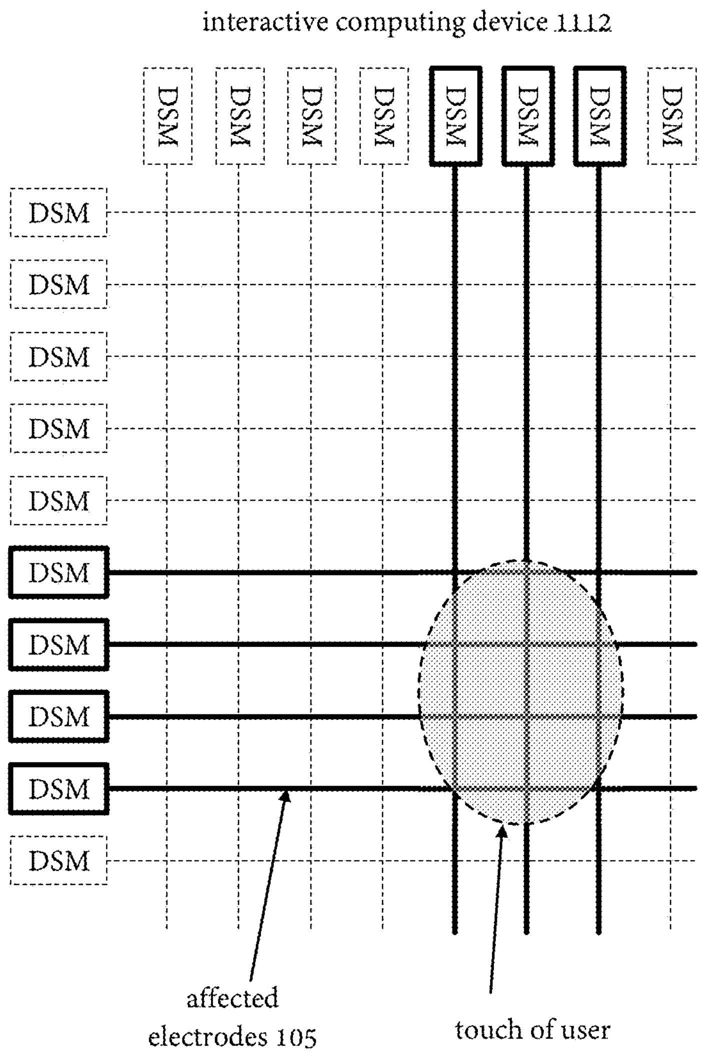
Figure 62A:
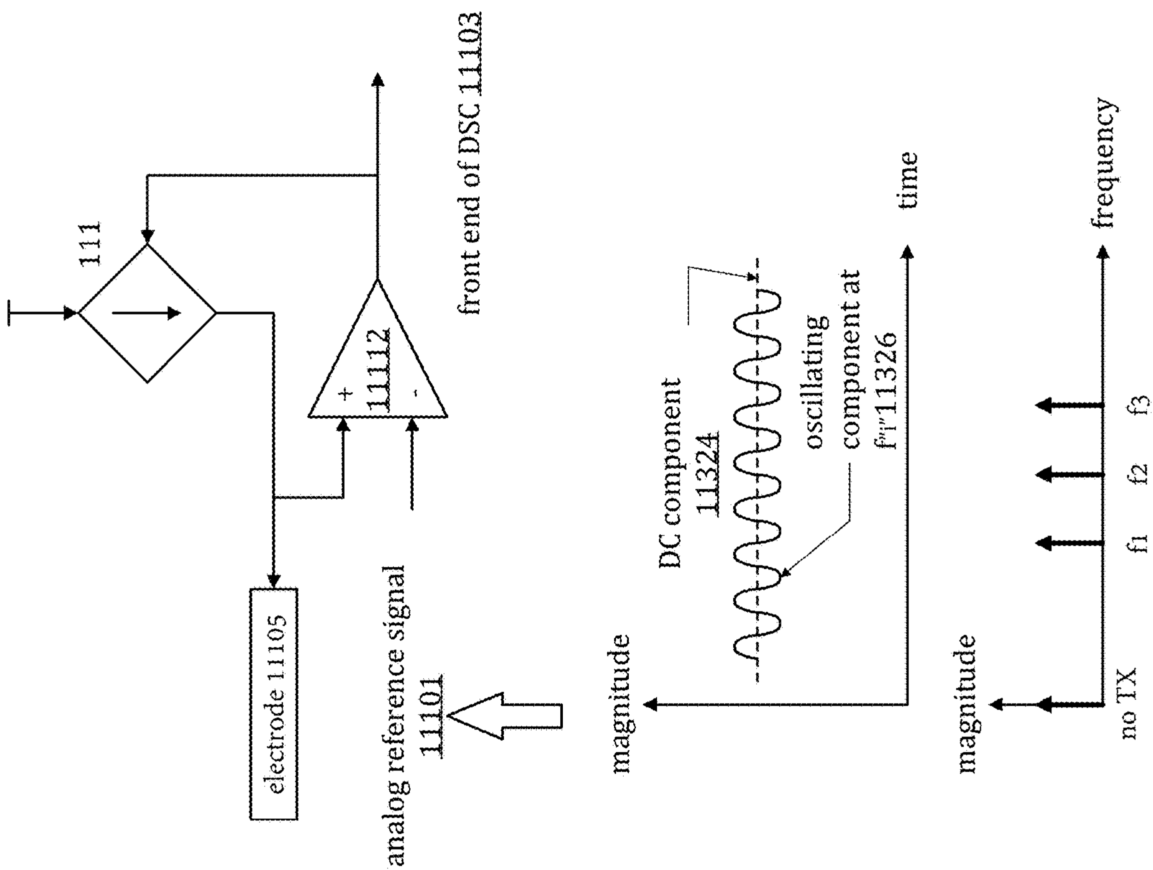
Figure 62A:
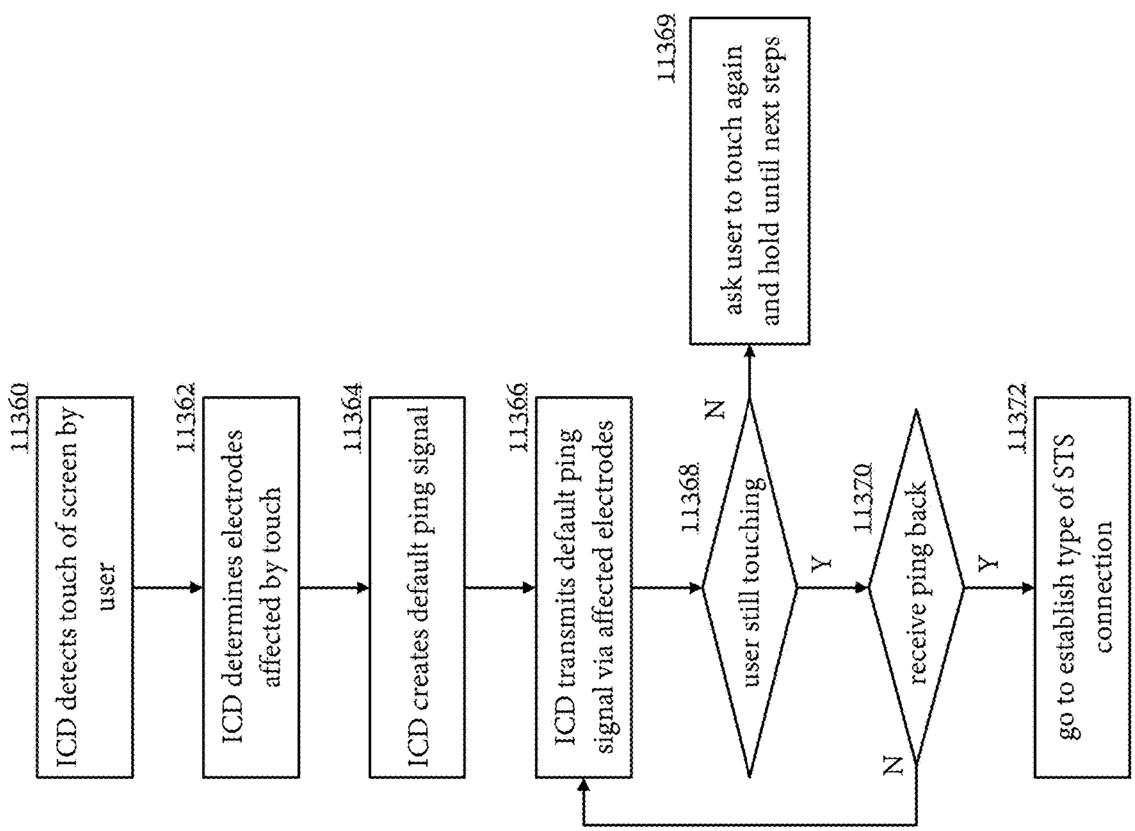
Figure 62A:
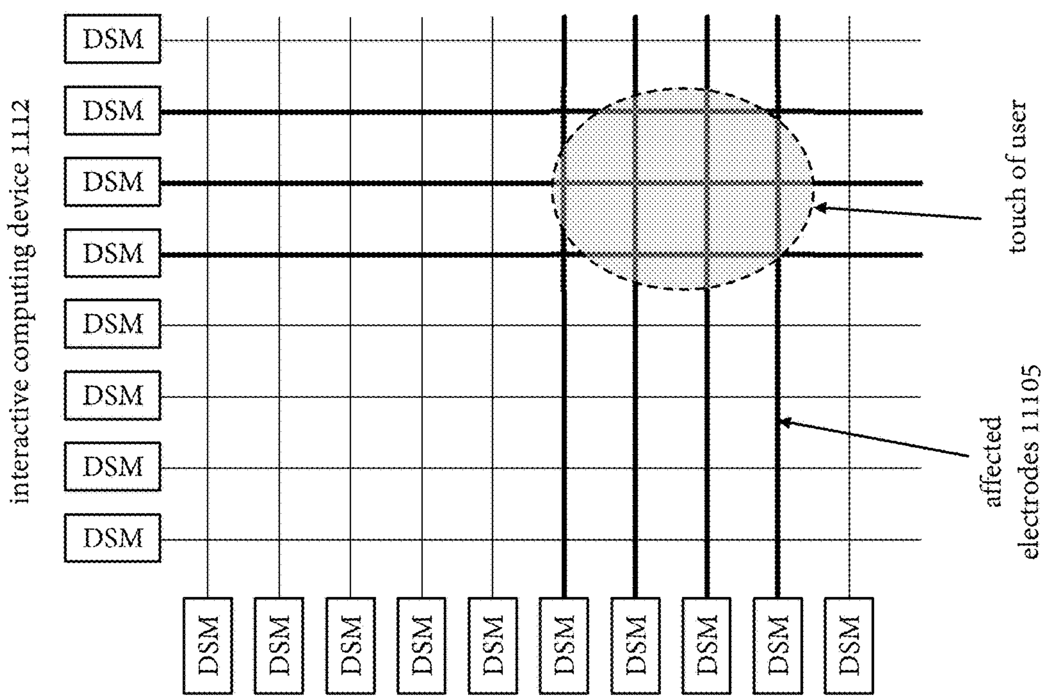
Figure 62A:
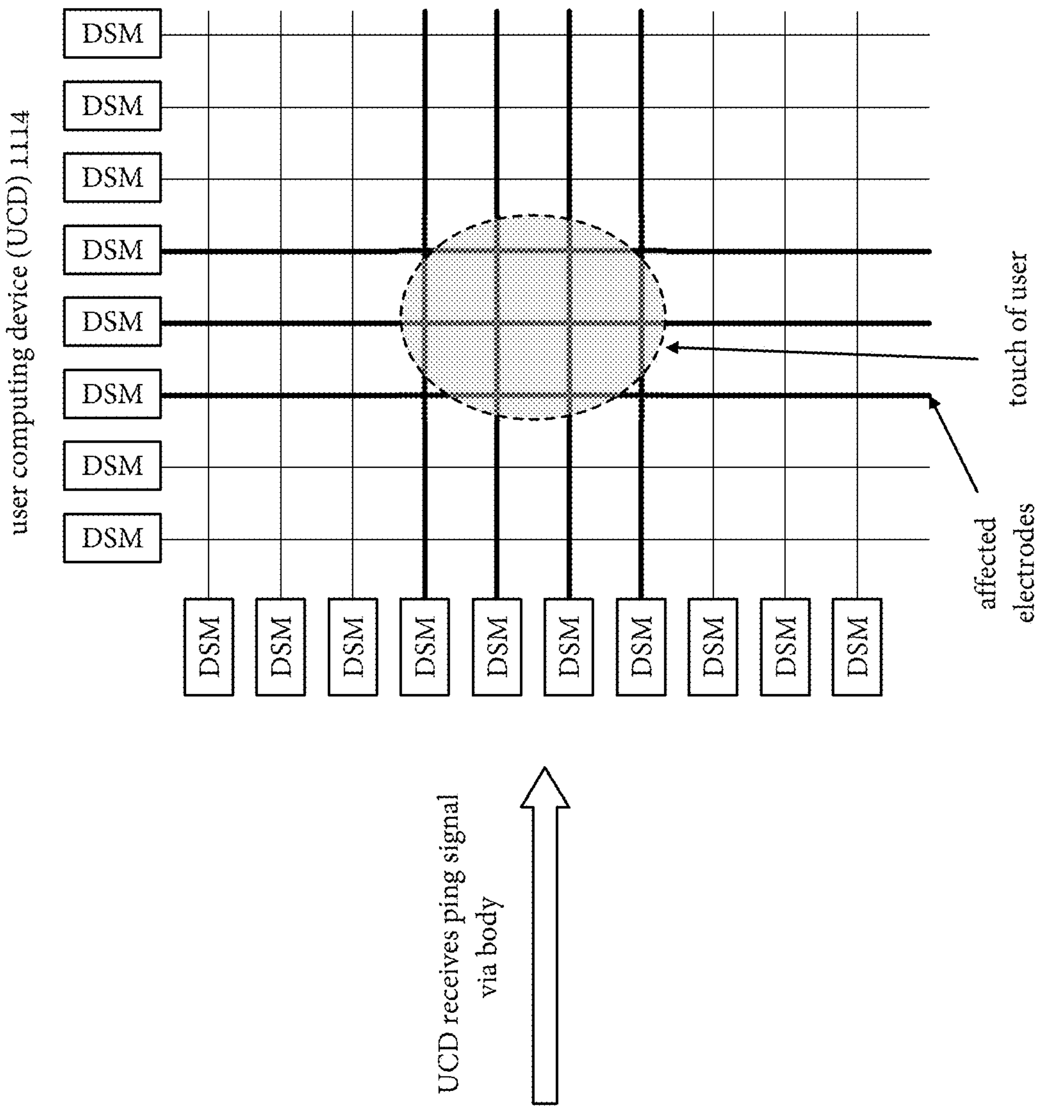
Figure 62A:
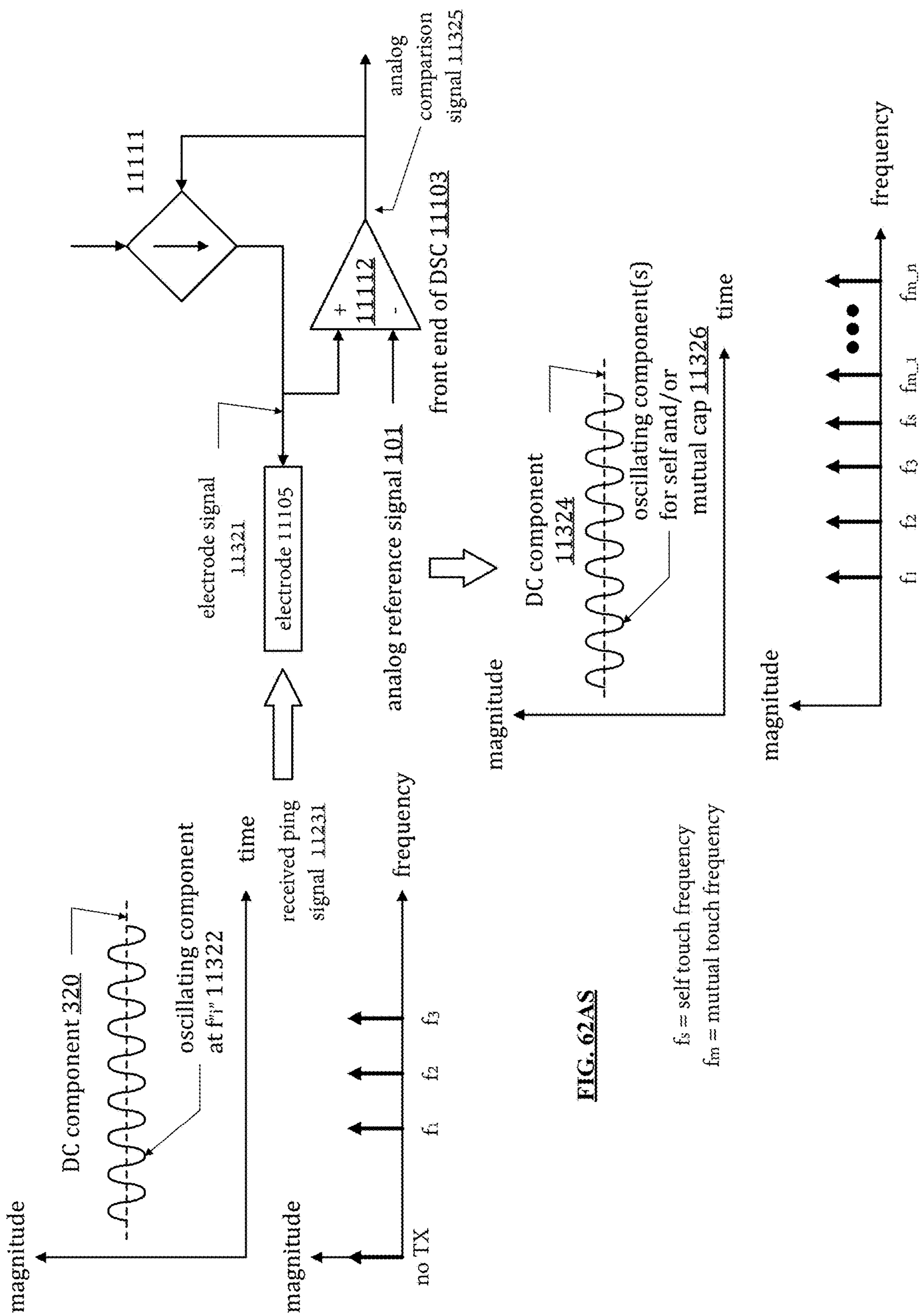
Figure 62A:
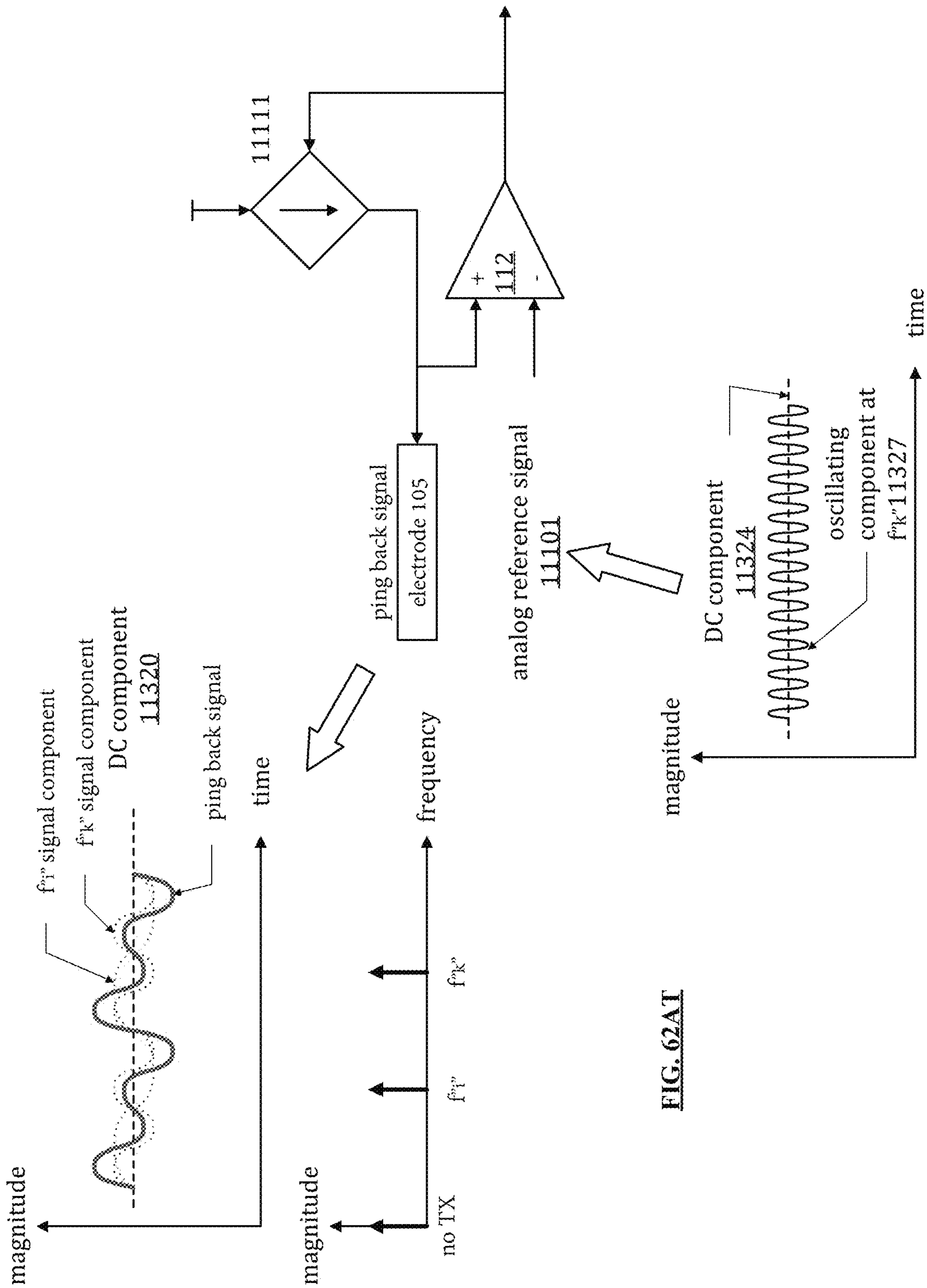
Figure 62A:
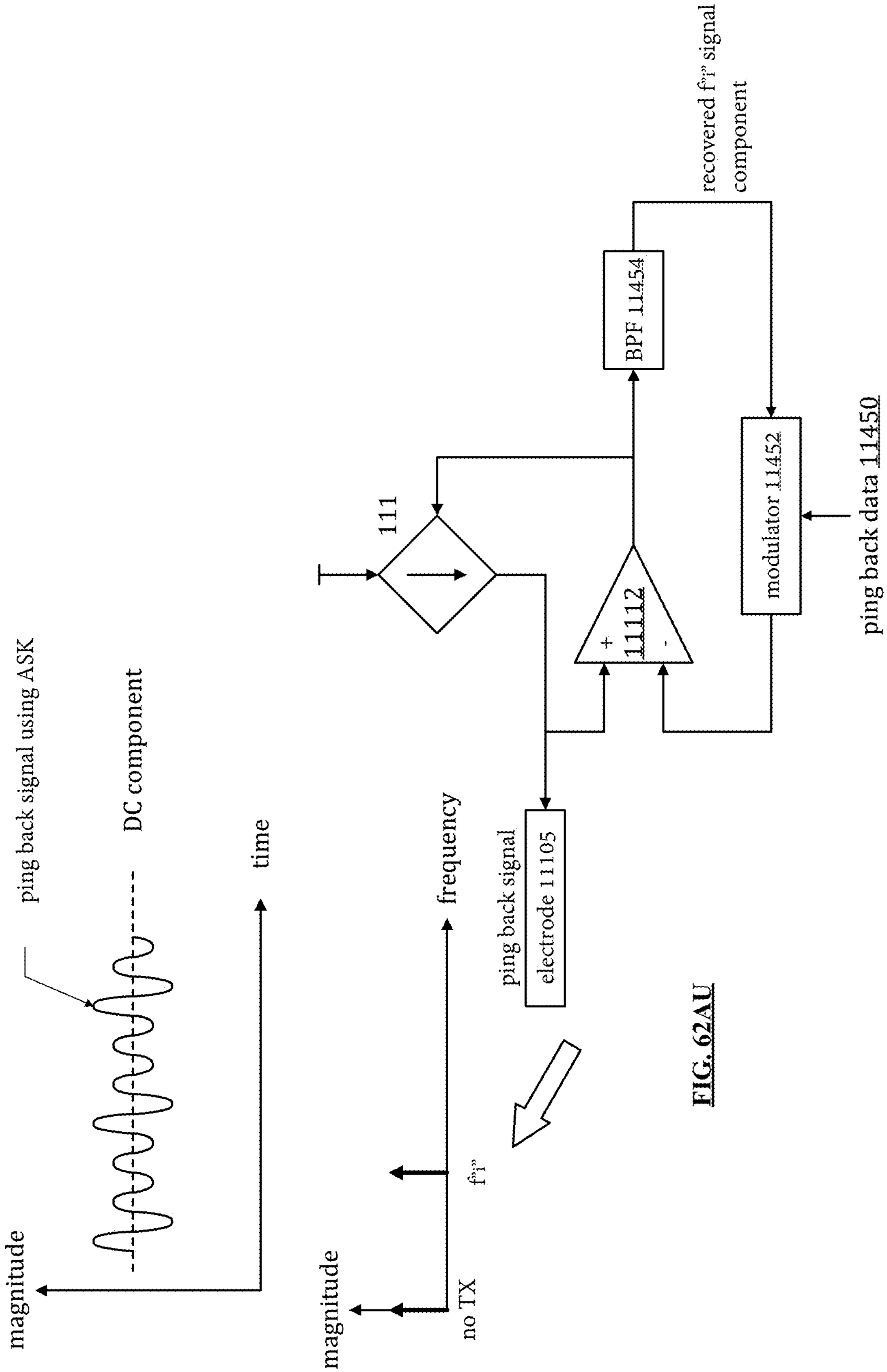
Figure 62A:
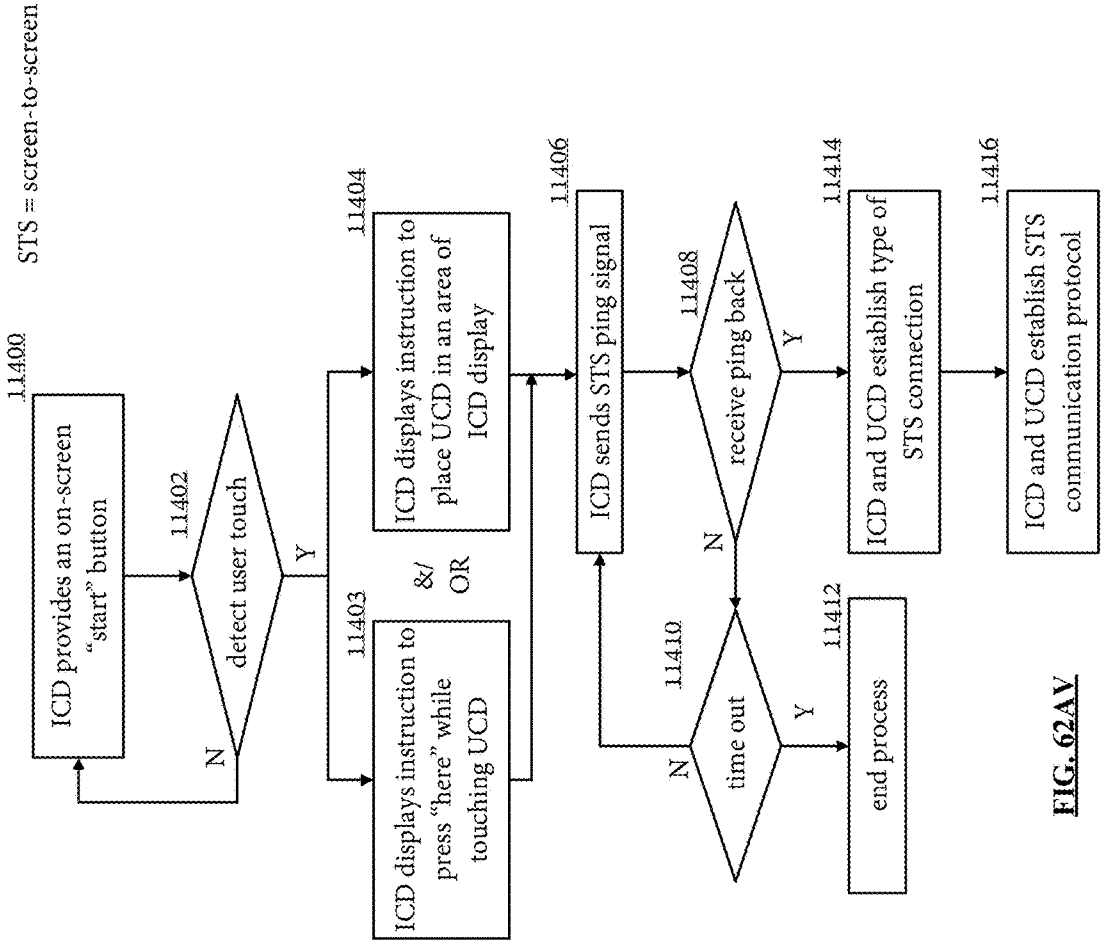
Figure 62A:
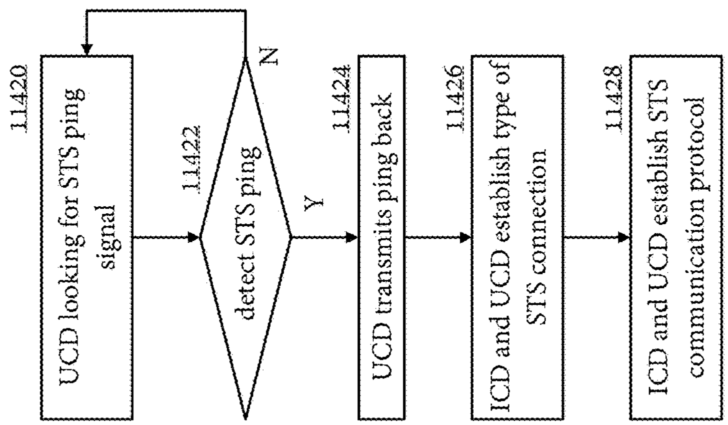
Figure 62A:
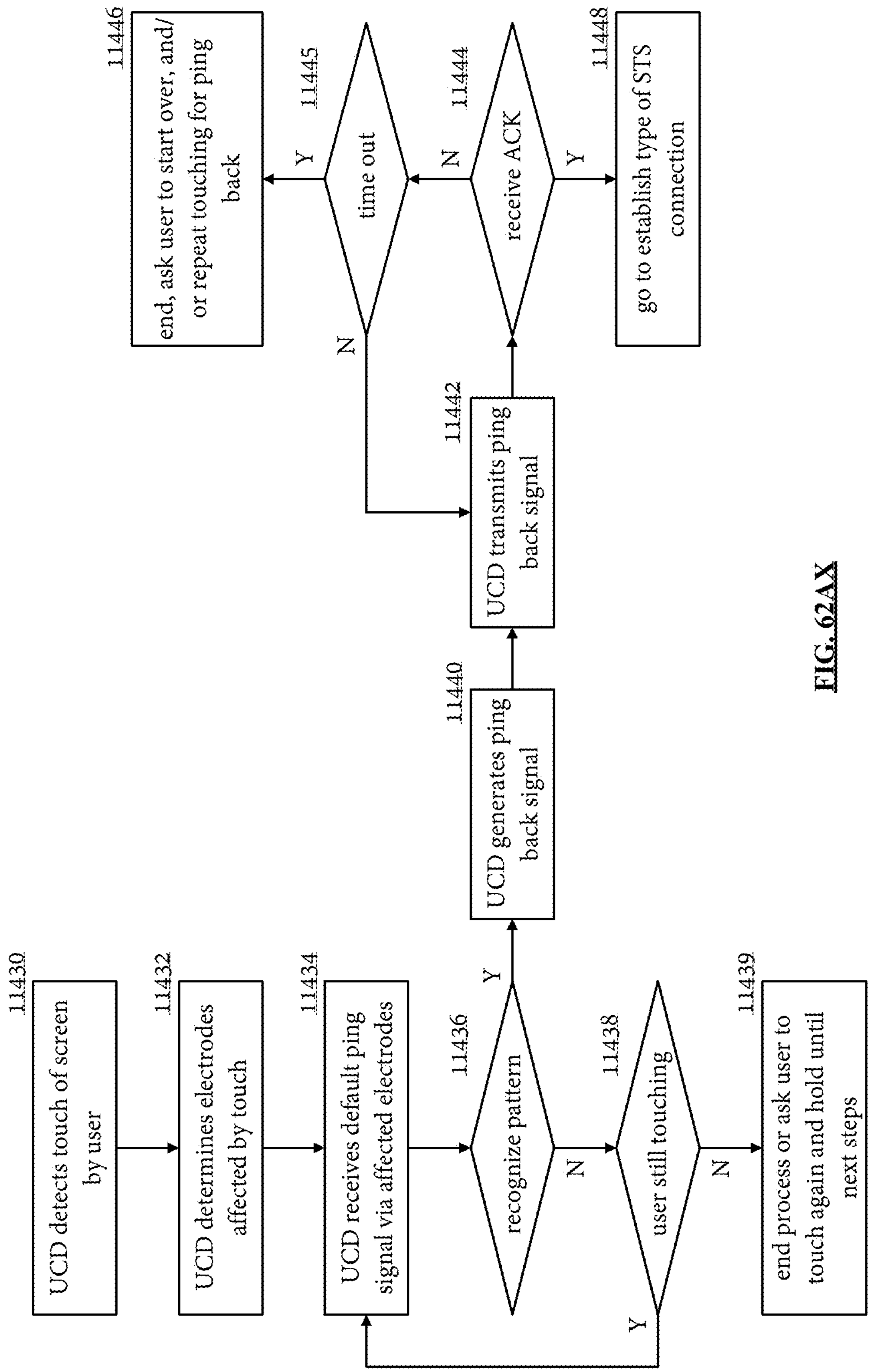
Figure 62A:
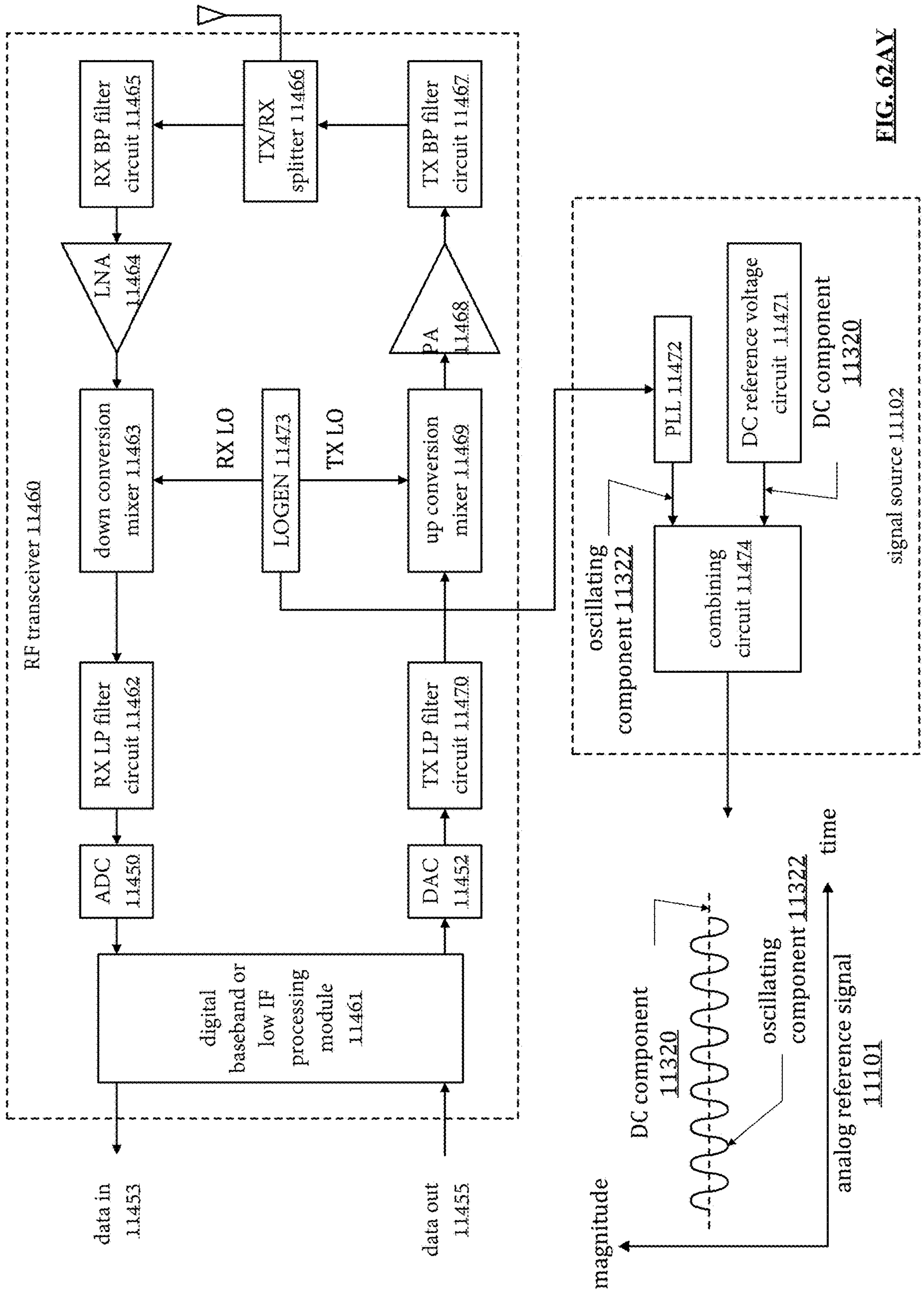
Figure 62A:
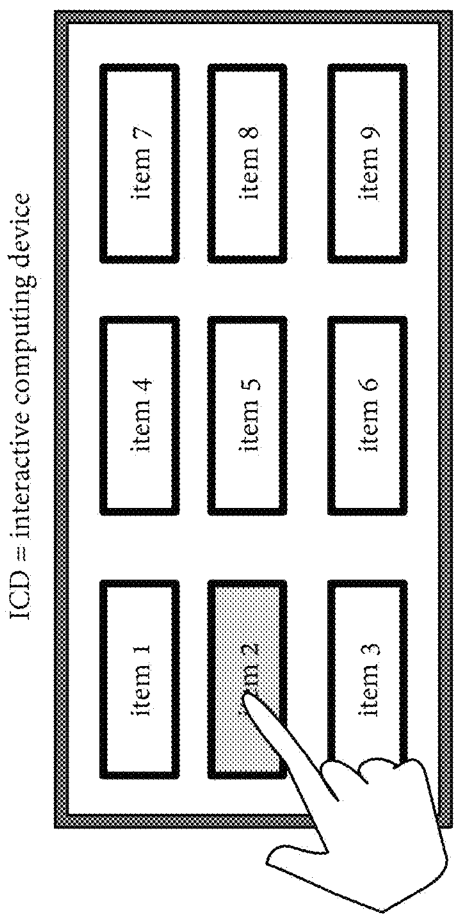
Figure 62B:
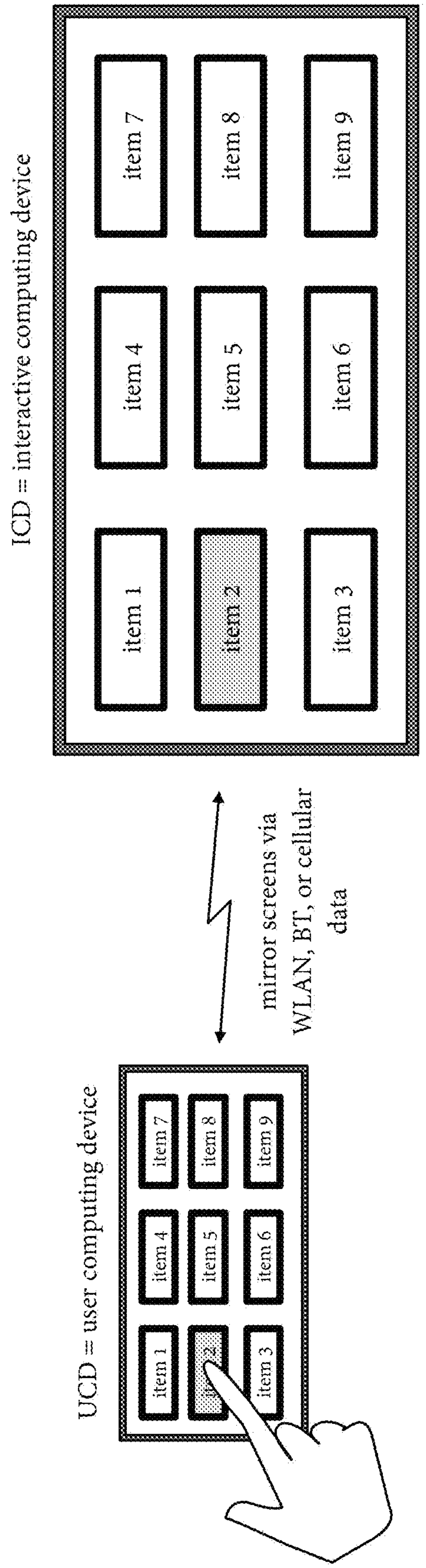
Figure 62B:
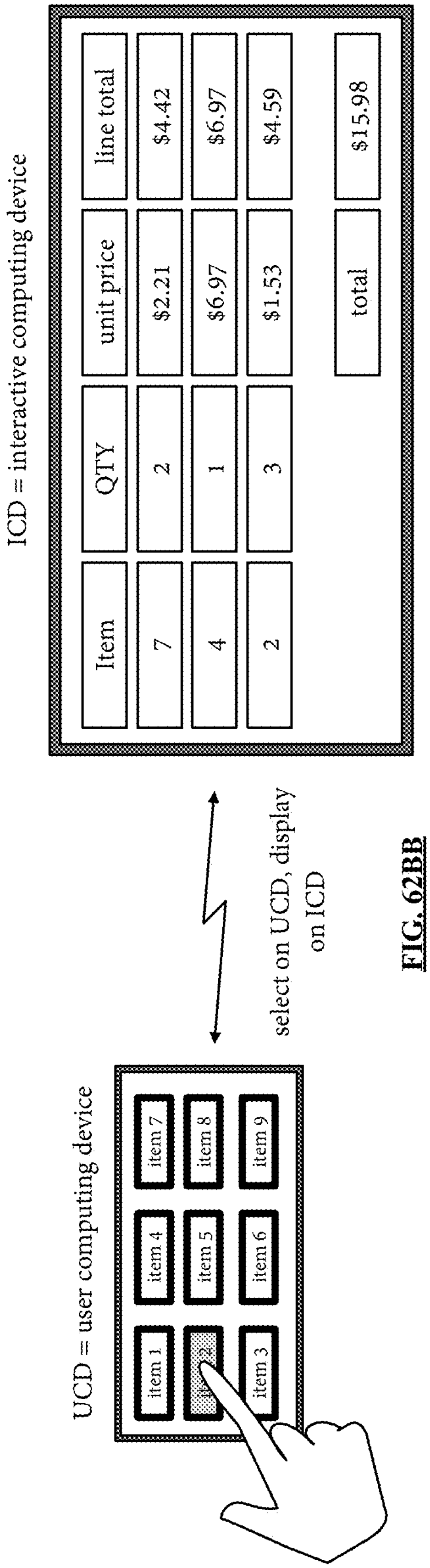
Figure 62B:
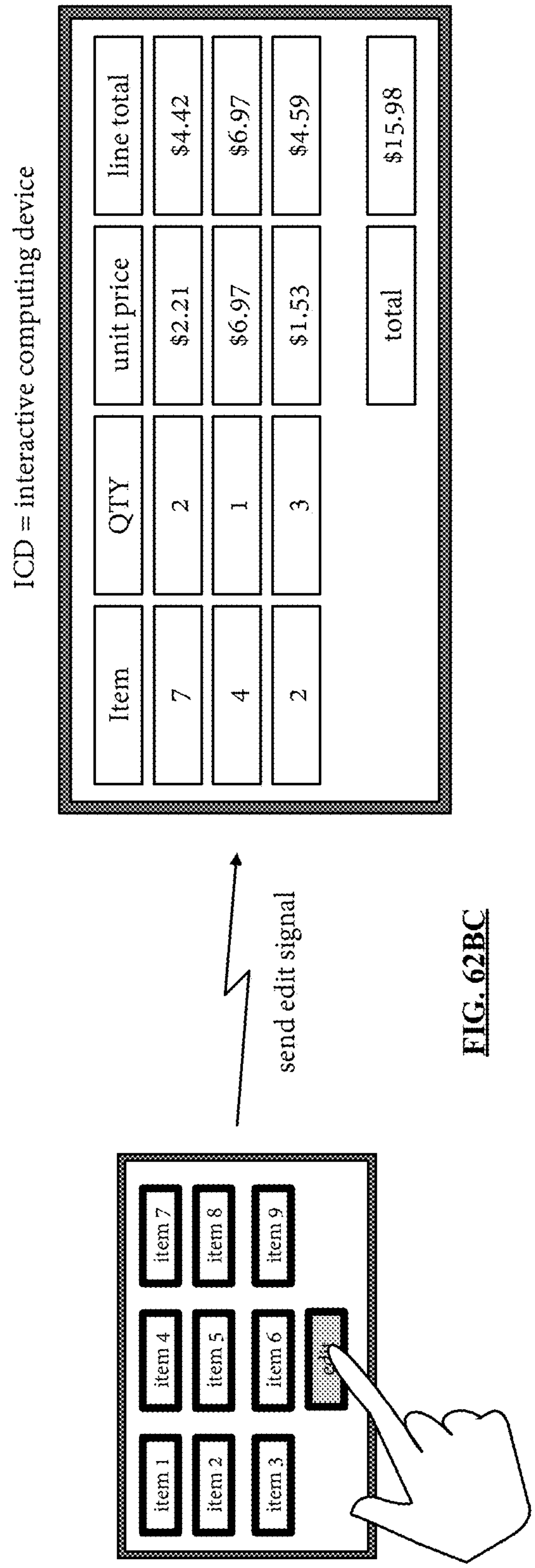
Figure 62B:
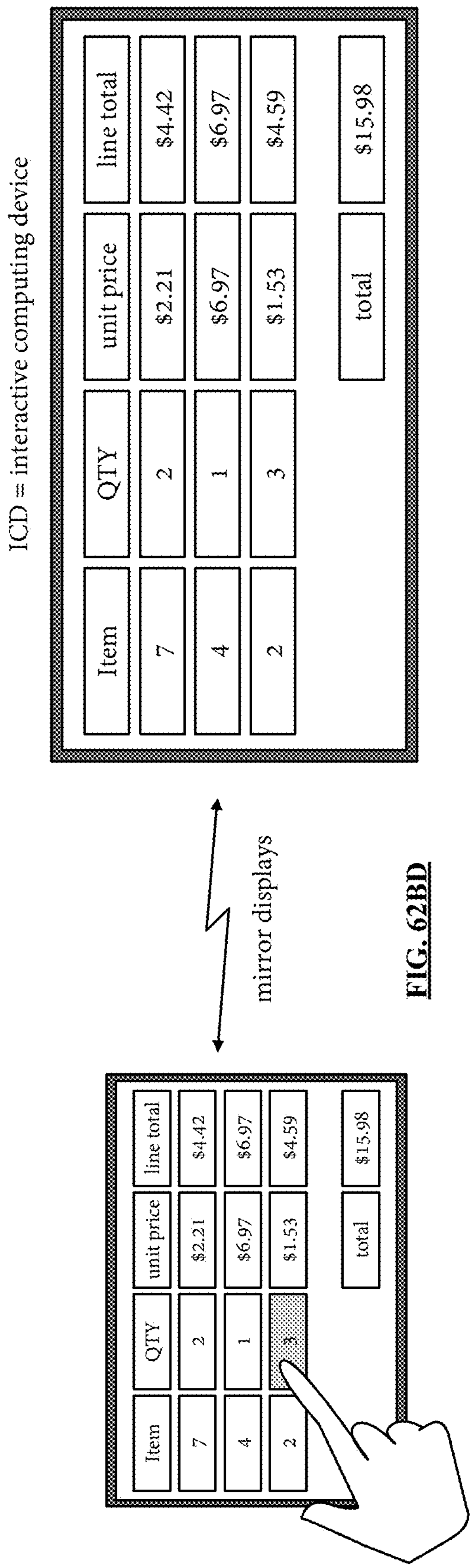
Figure 62B:
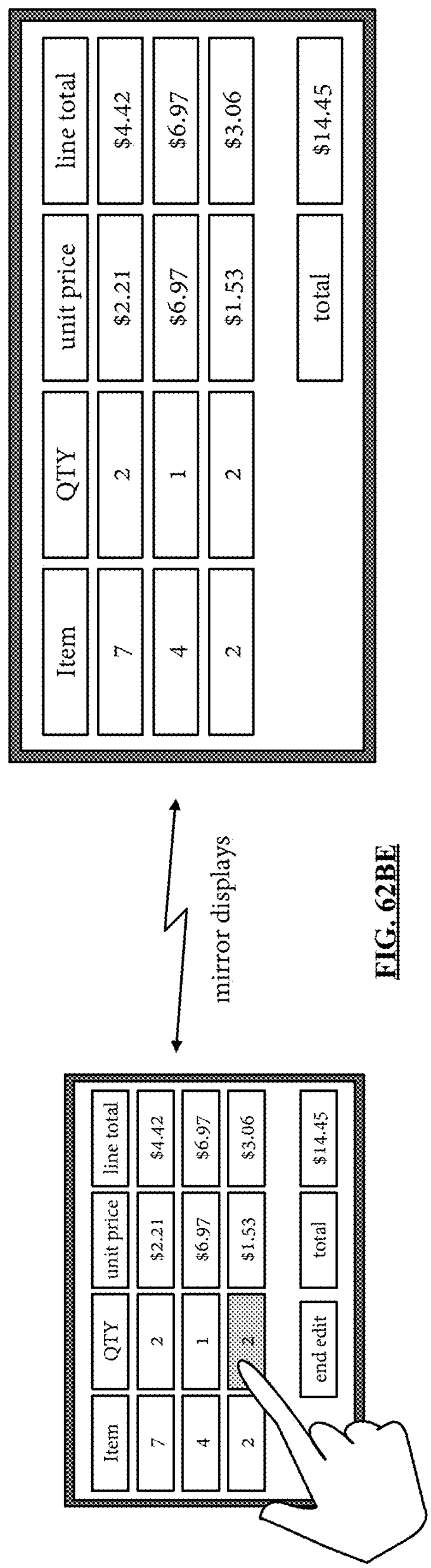
Figure 62B:
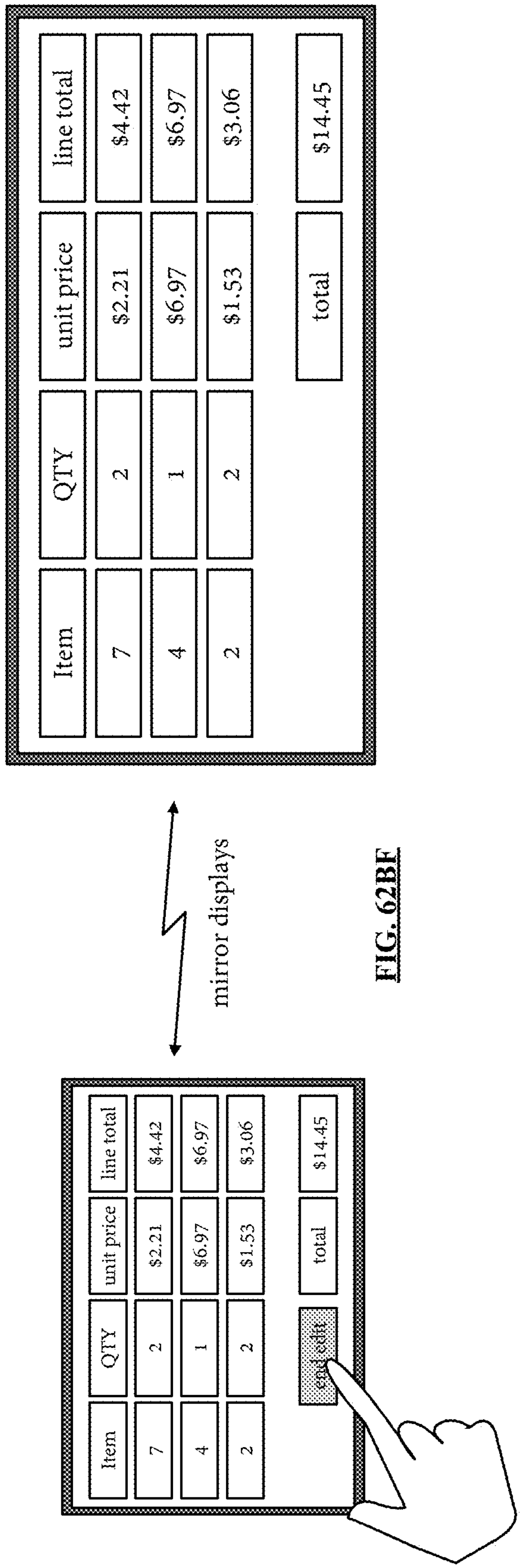
Figure 62B:
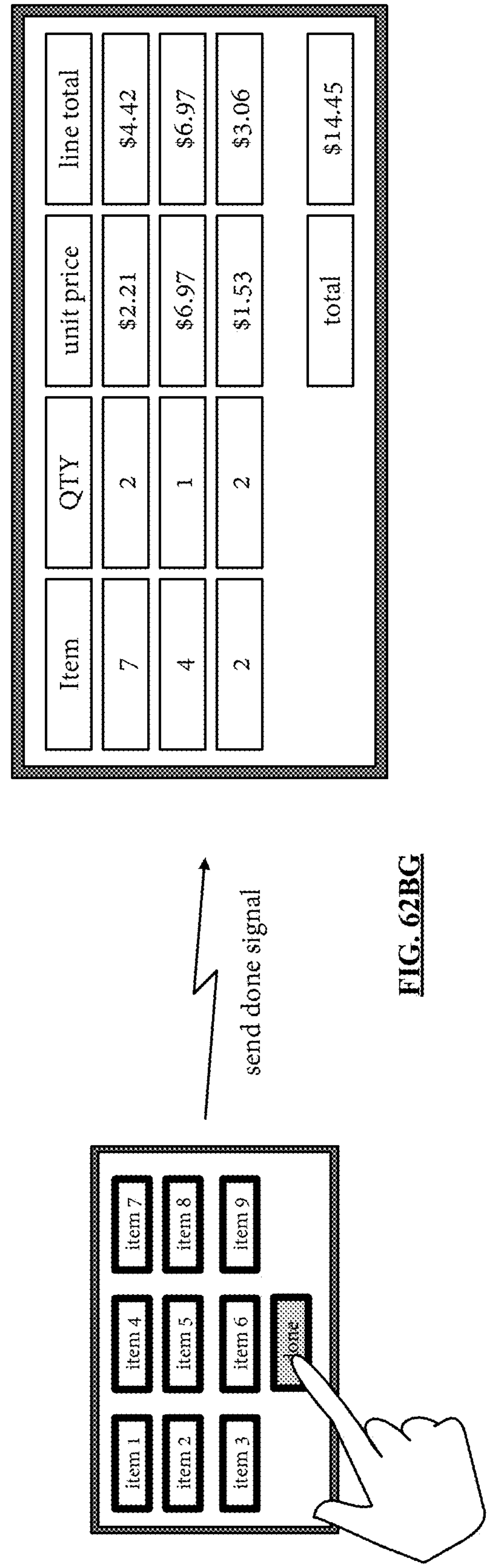
Figure 62B:
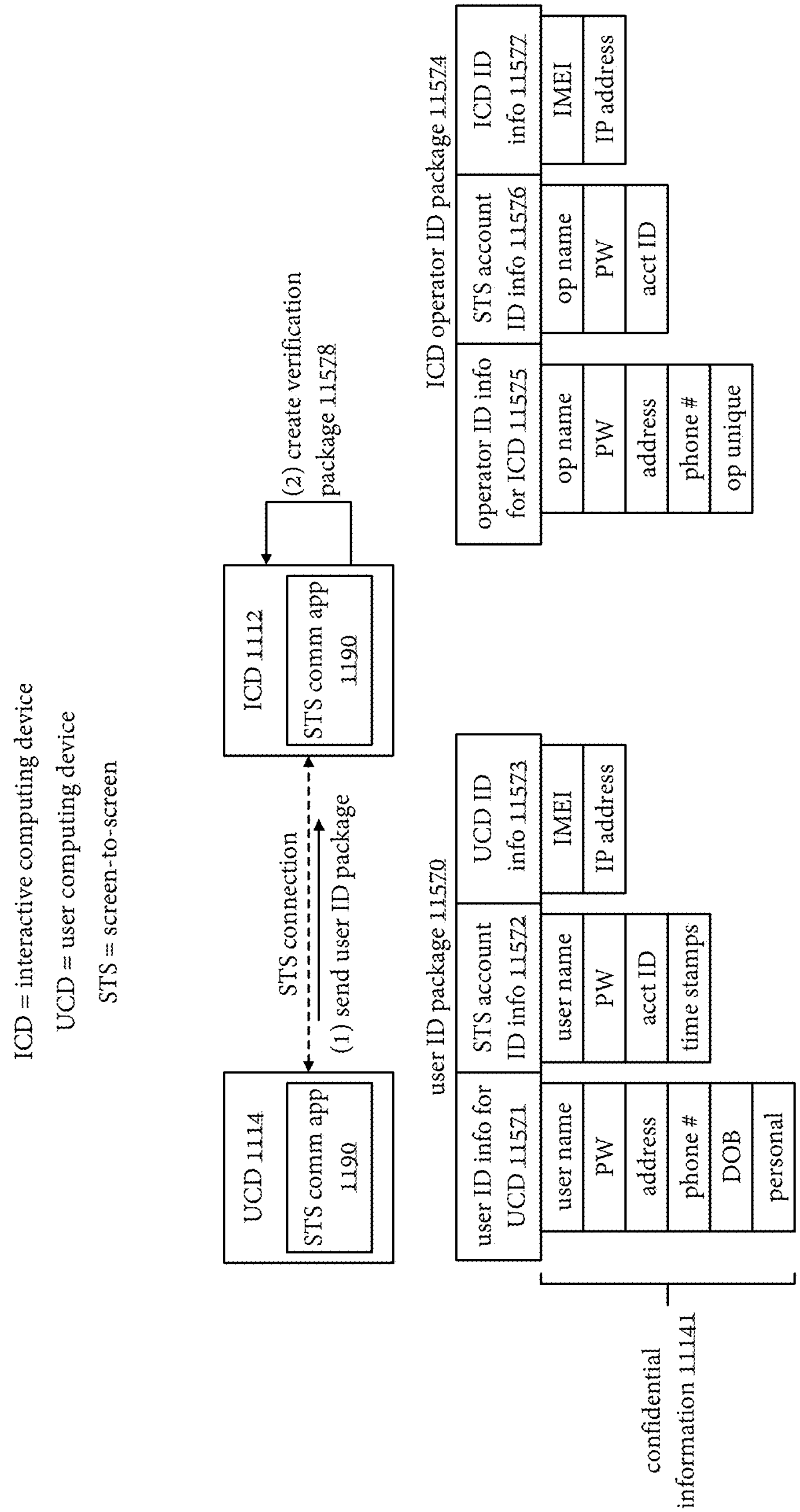
Figure 62B:
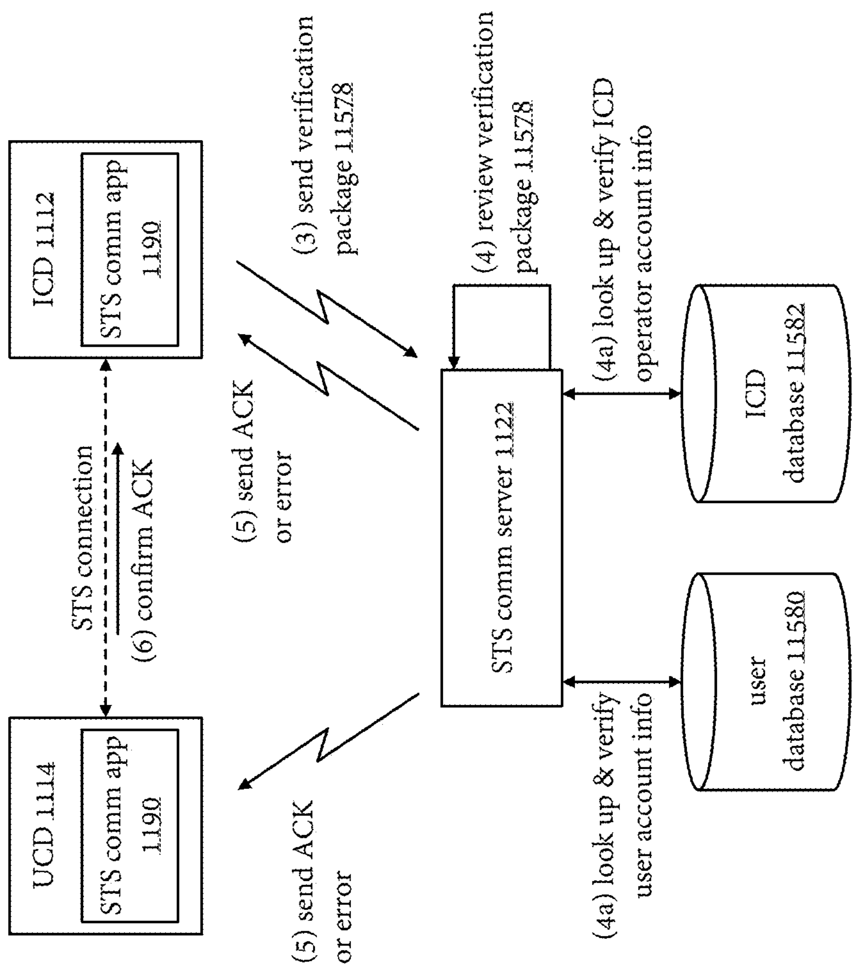
Figure 62B:
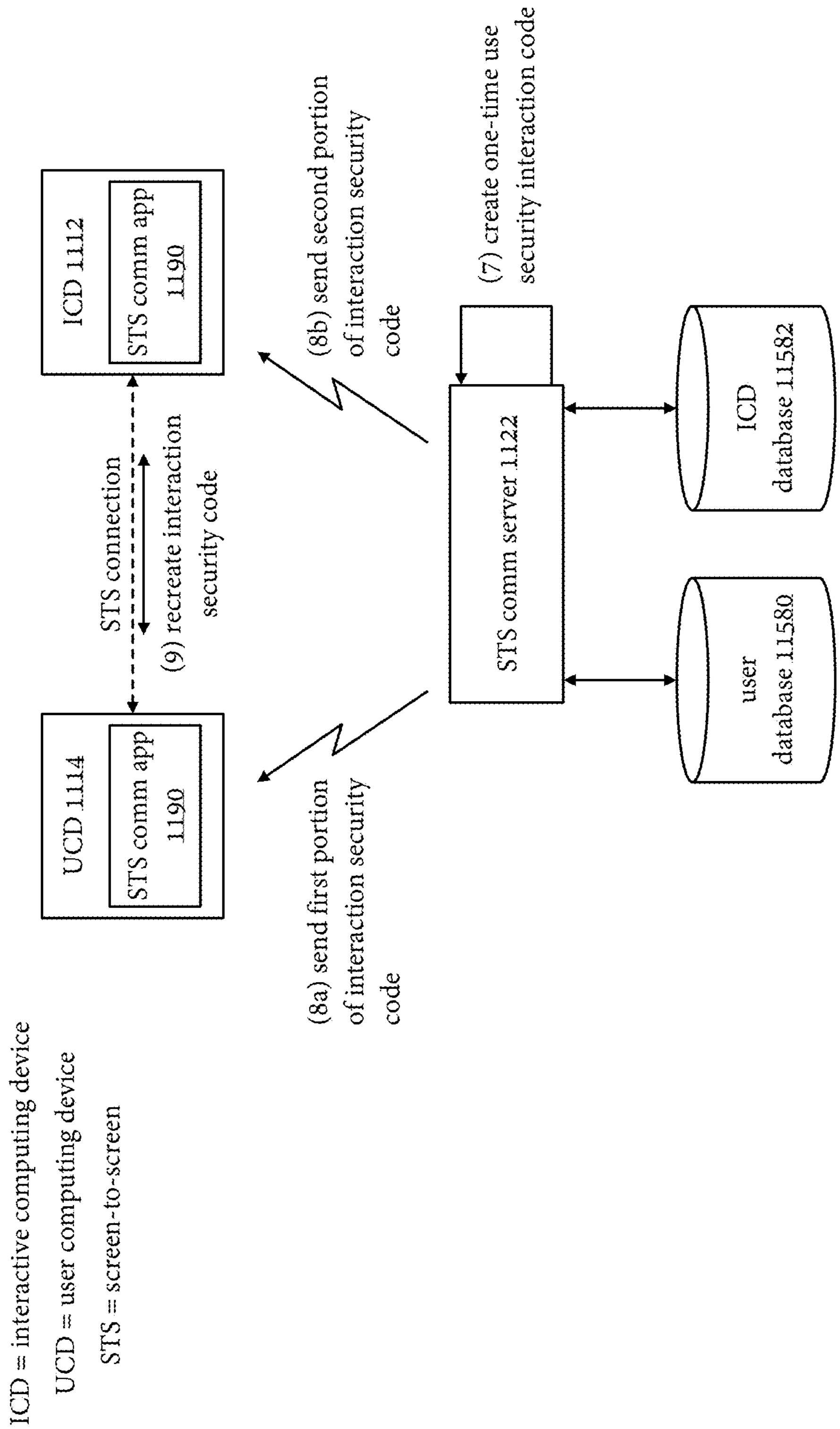
Figure 62B:
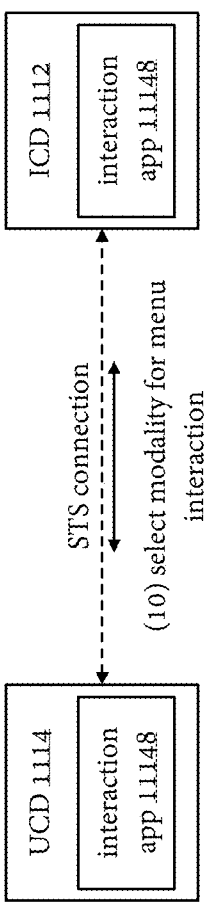
Figure 62B:
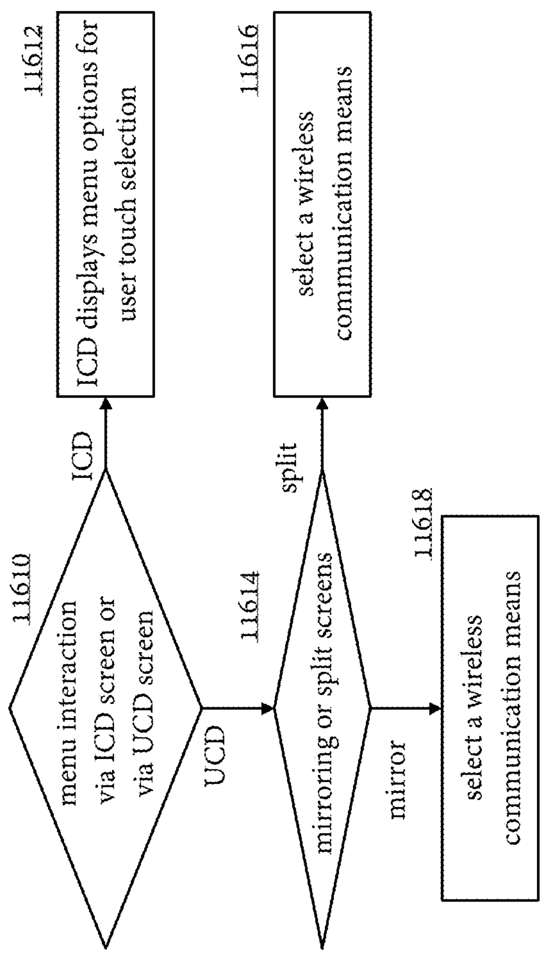
Figure 62B:
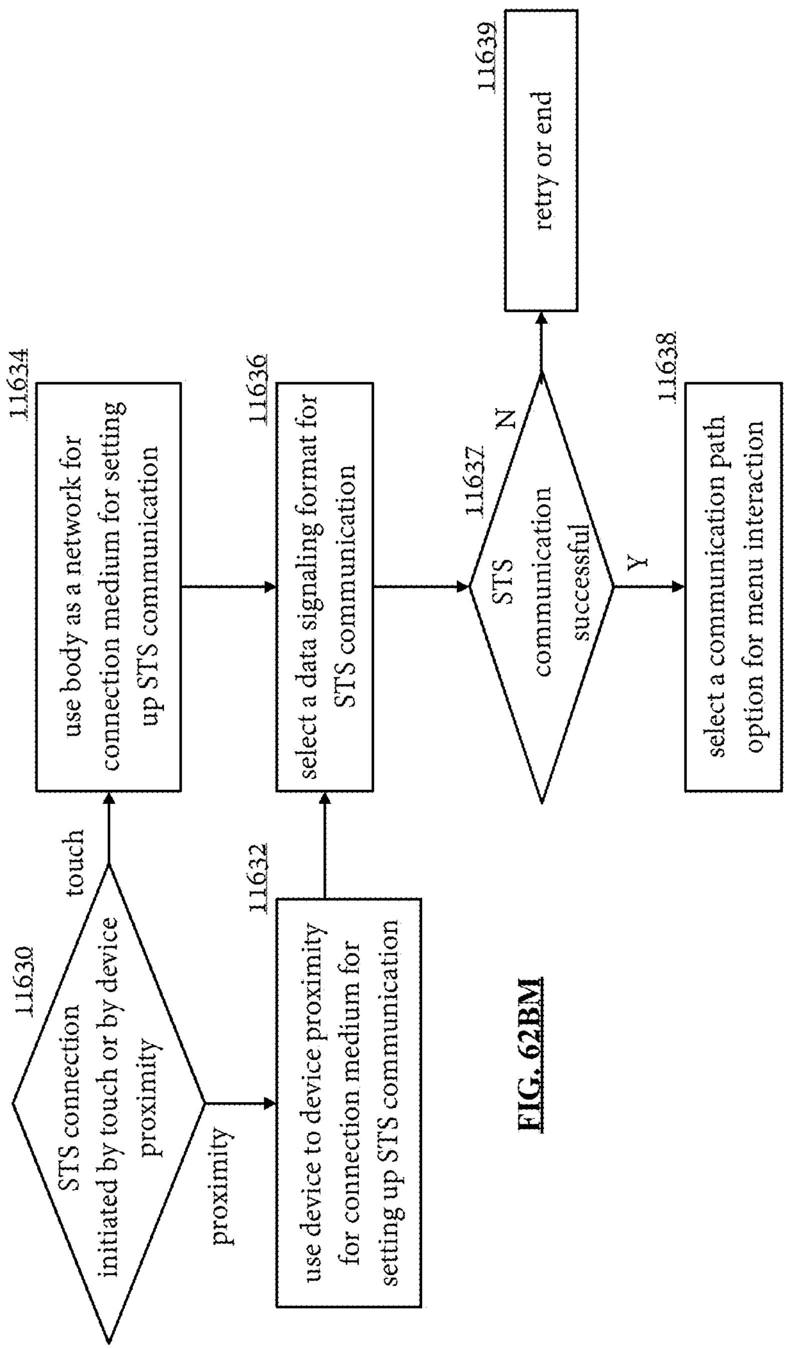

FIG. 62Z is a schematic block diagram of an embodiment of an example of a communication that includes a user computing device (UCD) 1114, an interactive computing device (ICD) 1112, an interaction application server 1120, a screen-to-screen (STS) communication server 1122, a payment processing server 1124, an independent server 1126, a local server 11132, an access point 11134, and a cellular data base station 11130. The local server 11132 and the access point 11134 may be connected via a wired and/or wireless connection. The user computing device (UCD) 1114 may be a cell phone and/or a personal device (e.g., a device that stores personal, private, confidential and/or sensitive information regarding a user).

In this example, the user computing device 1114, the interactive computing device 1112, the cellular data base station 11130 and the access point 11134 communicate with each other via one or more particular communication types in accordance with a communication protocol. The communication type is based on one or more of the type of device (e.g., ICD, UCD, server, etc.), the communication requirements (e.g., a minimum signal to noise ratio (SNR), a minimum bit rate, etc.) and the type of data (e.g., local data, individual data, global data, etc.) being communicated. For example, the user computing device 1114 and the access point 11134 communicate local data via a wireless local area network (WLAN) communication. As another example, the user computing device 1114 and the cellular data base station 11130 communicate global data via a cellular data communication. As yet another example, the user computing device 1114 and the interactive computing device 1112 communicate individual data via an STS communication. In an example, individual data is data that is personal, private, sensitive and/or otherwise confidential at the time of the conveyance of the individual data.

By using multiple communication types, data is communicated between the devices more efficiently and securely. For example, the user computing device 1114 uses a 5G communication (e.g., fastest connection available) to download global data from the interaction application server 1120 and uses an STS communication (e.g., most secure connection available) to send payment data to the interactive computing device 1112. Note the two or more of the communications may occur concurrently.

FIG. 62AA is a schematic block diagram of an example of a communication that is similar to FIG. 25, except that user computing device (UCD) 1114 and interactive computing device (ICD) 1112 also communicate the local data with each other via a Bluetooth (BT) communication. Thus, the UCD 1114 and the ICD 1112 may communicate data via one or more of a wireless local area network (WLAN) communication, a Bluetooth communication, a screen to screen (STS) communication and a cellular data communication. Note in an example, the various communication paths are utilized concurrently.

FIG. 62AB is a schematic block diagram of an example of a communication between two or more of a user computing device (UCD) 1114, an interactive computing device (ICD) 1112, an interaction application server 1120, a screen-to-screen (STS) communication server 1122, a payment processing server 1124, an independent server 1126, and a cellular data base station 11130. In an example, the cellular data base station 11130 is a network portal (e.g., point-of-sale equipment, access point, internet protocol (IP) address, etc.).

In an example of operation, the servers 1120-26, the cellular data base station 11130, the user computing device (UCD) 1114 and the interactive computing device (ICD) 1112 work in concert to exchange necessary information to setup and execute a transaction via a screen to screen (STS) communication. For example, the UCD 1114 downloads a user interaction application from interaction application server 1120 via cellular data base station 11130 and the ICD 1112 downloads a corresponding operator interaction application from interaction application server 1120 via the cellular data base station 11130. The UCD and the ICD utilize their respective interaction applications to assist in executing the transaction.

During the transaction, the UCD 1114 and the ICD 1112 utilize the STS communication path to wirelessly communicate individual data with each other. The individual data includes one or more of personal data (e.g., personal identification information, payment data, etc.), data that is confidential at time of communication (e.g., a security code), data that is particular to a transaction (e.g., payment information, selection of items information, etc.) and data that is meant only to be shared with one of or between the UCD 1114 the ICD 1112. As a specific example, a user selects items from a coffee shop user interaction application via a touch screen of UCD 1114. The UCD 1114 sends the selected items and payment information to the ICD 1112 via the STS communication.

The STS communication includes a medium for transmission and a data communication protocol. In an example, the medium is through a human body. In another example, the medium is through a close proximity (e.g., <2 ft) of the UCD 1114 and ICD 1112. In a further example, the medium is through a surface of an object (e.g., store counter top, body, etc.). The data communication protocol indicates how the data is to be communicated. For example the data communication protocol indicates what modulation scheme (e.g., amplitude shift keying, phase shift keying, frequency shift keying, amplitude modulation, 4 quadrature amplitude modulation, etc.) and carrier signal (e.g., a sinusoidal signal having a frequency in the range of 1110's of KHz to 1110's of GHz) to use for the STS communication.

Continuing with the example of operation of setting up and assisting the transaction, the UCD 1114 and ICD 1112 each wirelessly communicate global data with the cellular data base station 11130. In an example, the global data includes one or more of general data (e.g., account information, user preference information), setup data (e.g., update data, downloading applications), etc.), any data that is not the individual data, and any data communicated between the cellular data base station 11130 and the UCD 1114 and/or the ICD 1112. As a specific example, the ICD 1112 communicates with payment processing server 1124 to process the payment information.

FIG. 62AC is a schematic block diagram of an example of a communication that is similar to FIG. 27, except in this example, a personal touch device 1117 and a cell phone 1119 is utilized instead of or as the user computing device 1114. The personal touch device 1117 is one or more of a FOB, a tablet, another cell phone, a car touch screen, a watch, a ring, and any wearable device.

In an example of operation, the personal touch device 1117 and the cell phone 1119 communicate personal data via a screen-to-screen (STS) communication. In an example, the personal data is the individual data. As another example, the personal data is a subset of the individual data. As yet another example, the personal data is data that is more sensitive, private, and/or confidential than the individual data. As a specific example, the personal data is the social security number (SSN) of a user and the individual data is the last four digits of the user's SSN. As another specific example, the personal data is a password and the individual data is a hash of the password. In another specific example, the personal data is biometric information (facial recognition, fingerprint, voice frequency pattern, etc.) and the individual data is a four digit code (e.g., 117422). Note in this example, as illustrated by the linear connection between the personal touch device 1117 and the cell phone 1119, the STS communication is a wired and/or wireless connection.

FIG. 62AD is a schematic block diagram of an example of a communication that is similar to FIG. 27, except the personal touch device 1117 communicates directly with the interactive computing device (ICD) 1112 via a screen-to-screen (STS) communication. Note that although not explicitly shown, the personal touch device 1117 may communicate with the cell phone 1119 via an STS wired and/or wireless connection. Further note the connection provided by cellular data base station 11130 may be implemented by a network portal (e.g., point of sale equipment, access point, internet protocol address, etc.).

In an example of operation, a communication is completed via a combination of an STS communication of individual data (e.g., personal data for the particular transaction) between the personal touch device 1117 and the ICD 1112 and a cellular data communication of global data (e.g., downloading applications, verifying user (e.g., of cell phone) and operator information (e.g., of ICD 1112), etc.) between the cell phone 1119 and the cellular data base station 11130, and between the ICD 1112 and the cellular data base station 11130.

FIG. 62AE is a schematic block diagram an example of a communication that includes an interactive computing device (ICD) 1112, an interaction application server 1120, a screen-to-screen (STS) communication server 1122, a payment processing server 1124, an independent server 1126, a personal touch device 1117, a cell phone 1119, and a cellular data base station 11130.

In an example of operation, the personal touch device 1117 interacts with cell phone 1119 using a screen-to-screen (STS) communication (e.g., data communicated via an STS wired and/or wireless connection in accordance with an STS communication protocol). For example, the personal touch device 1117 communicates personal sensitive data (e.g., credit card information, personal identity information, etc.) via the STS communication to cell phone 1119. The personal touch device 1117 also communicates a portion of interaction data (i.e., interaction data_1 of a transaction) via another STS communication with the interactive computing device 1112. The cell phone 1119 communicates interaction data (i.e., interaction data_2 of the transaction) via another STS communication with the interactive computing device 1112.

As a specific example, the personal touch device is a hotel room key card equipped with a radio frequency identification (RFID) tag and the interactive computing device is a lock on a hotel room door. The lock requires interaction data (e.g., interaction data_1 (e.g., first portion of a code) from the hotel room key card and interaction data (e.g., interaction data_2 (e.g., second portion of the code)) from the cell phone 1119 to perform an action (e.g., lock, unlock, display do not disturb text, etc.). Note the code may indicate the action to be performed. For example, a code of 117052 indicates an unlock function. As another example, a code of V3BH8 indicates to display a "do not disturb" image on a display of the lock. In a specific instance, the lock receives the interaction data_2 from the cell phone 1119 within a timeframe of receiving the interaction data_1 from the hotel room key card to process the request.

As another specific example, the cell phone 1119 is programmed (e.g., via an STS communication application) to function a hotel room key (e.g., key for "room 112455") of a hotel. The hotel has numerous rooms that each have a lock on one or more doors that include an interactive computing device. For example, the lock is connected to an interactive computing device (ICD) that includes a touch screen. To unlock/lock the door, a user of the cell phone 1119 may form an STS connection (e.g., via the user's body as a network (BaaN)) with a touch screen of a particular interactive computing device. For example, the touch screen of the ICD receives a signal through the body of the user from the cell phone 1119. This increases security as the personal touch device and cell phone both must interact with the ICD lock via an STS communication. For example, the user may lose its hotel key, but without cell phone 1119, an unauthorized person (e.g., not the user) could not use the hotel key to operable the ICD lock of the hotel room door.

The cell phone 1119 subsequently transmits an STS communication that instructs (e.g., as a particular bit pattern and a certain frequency) the hotel room ICD lock to open. The lock may then automatically adjust (e.g., immediately upon closing, within a timeframe (e.g., 2 seconds) after closing, etc.) back to a lock position. Thus, a user is able to operate the hotel room ICD lock more efficiently utilizing the STS communication. For example, the user does not have to carry around an additional "key". As another example, the user can operate the ICD lock without removing the cell phone from their pocket (e.g., when using a body as a network (BaaN) STS connection).

FIG. 62AF is a logic flow diagram of an example of a method, executed by an interactive computing device (ICD) and/or a user computing device (UCD) (hereinafter the ICD, the UCD and/or another computing device is referred to as a computing device), of determining a type of communication to use for an interaction between the user computing device and the interactive computing device. The determination is based on one or more of a data type, a sensitivity (e.g., privacy level) of the data, a user application, an operator of interactive computing device, a bandwidth of the screen-to-screen connection and/or other parameters.

The method begins with step 11200, where the computing device initiates an interaction (e.g., a communication of data between the UCD and the ICD). In an embodiment, the interaction includes a plurality of interactions (e.g., the interaction and other interactions). For example, a purchase a cup of coffee interaction includes an information exchange interaction (e.g., selection of items) and a purchase transaction interaction (e.g., payment processing).

The method continues with step 11202, where the computing device determines an interaction type for each interaction. The interaction type includes, but is not limited to, one or more of a one-way data exchange, a two-way data exchange, a purchase transaction, a registration transaction, a physical access transaction, an equipment (e.g., device, car, scooter, etc.) enable transaction, and a pre-paid transaction.

The method continues to step 11204, where for each interaction type, the computing device determines one or more data type(s). The one or more data types include private information, publicly available information, payment information, transaction information, screen-to-screen (STS) communication account information, and user application account information. The method continues to step 11206, where the computing device determines available communication options. For example, the available communication options include a screen-to-screen (STS) communication, a cellular data communication, a Bluetooth communication, and wireless local area network (WLAN) communication.

The method continues to step 11208, where the computing device determines STS communication capabilities of the UCD and the ICD. For example, the computing device determines whether the UCD and the ICD have one or more of an STS communication unit 1130 and an STS communication application. As another example, the computing device determines whether the UCD and the ICD are able to form a body as a network (BaaN) connection. The method continues to step 11210, where the computing device determines data type communication restrictions. As a specific example, private information is restricted (e.g., in accordance with a communication protocol) to a BaaN STS connection only, publicly available information is not restricted, payment information is restricted to an STS connection only, transaction information is not restricted, however a first preference is for it to be communicated via cellular data and a second (less preferential than the first preference) preference is for it to be communication via a wireless local area network (WLAN), STS communication account information is restricted to an STS connection and/or cellular data only, and user application account information is restricted from using WLAN.

The method continues to step 11212, where for the data types to be utilized per interaction, the computing device determines whether communication options are available (e.g., unrestricted options exist). When communication options are available, the method continues to step 11214, where the computing device sets up the communications and the interaction is executed. When communication options are not available, the method continues to step 11216, where the computing device determines whether other options are available. In an example, the other options are less desirable options but still allowable in accordance with the restrictions (e.g., transaction information communicated via a WLAN connection). When no other options are available, the method ends at step 11218. In an example, step 11218 includes sending a message to the ICD and/or the UCD that indicates the interaction status (e.g., failed). When the other options are available, the method continues to step 11220 where the computing device makes changes to the communications. For example, the computing device changes the communication options for transaction information from cellular to WLAN (e.g., less preferential), when WLAN is not against the restrictions for transaction information.

The method continues to step 11222, where the computing device sets up the changed communications. For example, the computing device instructs the ICD and UCD to communicate transaction information via the WLAN connection. The method continues to step 11224, where the computing device executes the interaction based on the changed communications. For example, the ICD and the UCD perform the interaction by sending the transaction information via WLAN.

FIG. 62AG is a schematic block diagram of an embodiment of initiating and setting up screen to screen (STS) communications that includes a first computing device (e.g., a user computing device 1114) and second computing device (e.g., an interactive computing device 1112). As illustrated, various communication types generally operate within a certain type of range (e.g., distance, signal strength, power level, size of body for body as a network (BaaN) STS communications, etc.). For example, communications performed via a cellular network can be performed up to a fourth range, communications performed via a wireless local area network (WLAN) can be performed up to a third range, communications performed via Bluetooth can be performed up to a second range, and communications performed via a screen to screen (STS) connection can be performed up to a first range, where the ranges descend (e.g., are less than, decrease, etc.) in order from the fourth to the first for at least one of the certain types of range.

In an example of operation, the first computing device has a direction of movement 11562. The direction of movement includes one or more of a location, a direction, an altitude, a speed, a velocity, and an acceleration. For example, the direction of movement indicates the first computing device is increasing elevation at 112.8 miles per hour in a northwest direction. In an instance, a computing device (e.g., the first computing device, the second computing device, another computing device, etc.) determines when/whether to setup or ready STS communication abilities of the first computing device and/or the second computing device based on the direction of movement. For instance, when the direction of movement of the first computing device is toward the second computing device such that it is estimated that the first computing device will be inside an STS communication range within a first time period, an STS communication readiness check is initiated.

As an example, when the first computing device has a first trajectory and a first spatiotemporal quality (e.g., a first distance from an ICD, a first estimated time from being within a range of the ICD, etc) the first computing device is prompted to perform a first action (e.g., download an STS communication application, pre-order a typical order associated with an application regarding the second computing device, etc.). As another example, when the first computing device has the first trajectory and the first spatiotemporal quality, the second computing device is instructed to perform a first action (e.g., begin preparing an order for the customer, ensure customer database is updated with information of a user associated with the first computing device, update application on a computing device, etc.).

The direction of movement 11562 may further determine which type of communications to use. For example, the first and second computing devices determine to communicate via WLAN for a first time period and/or until the first computing device is within range of another communication type (e.g., Bluetooth, STS, etc.).

FIG. 62AH is a logic flow diagram of another example of a method of setting up a screen to screen (STS) communications between an interactive computing device (ICD) and a user computing device (UCD). Note that hereinafter in the discussion of this Figure the ICD, the UCD and/or another computing device (e.g., an interactive server, an STS communication server, etc.) are referred to as a computing device. The method begins at step 11300, where the computing device determines whether the UCD is inside a local communication range. The local communication range includes one or more of a wireless local area network (WLAN) range, a cellular data network range, a Bluetooth connection range, and an STS connection range.

In an example, the UCD periodically or continually searches for a wireless local area network (WLAN) associated with the ICD to determine whether the UCD is within the WLAN range. As another example, the computing device determines a distance (e.g., using global positioning system (GPS) data and/or direction of movement data) between the ICD and the UCD to determine whether the UCD is within an STS communication range (or a likelihood of the UCD coming within range during a time period). As a specific example, the computing device utilizes the distance of the UCD and the ICD to determine whether the UCD is in line inside a coffee shop or in a drive thru lane of the coffee shop. When the UCD is not inside the local communication range, the method continues back to step 11300.

When the UCD is inside the local communication range, the method continues to step 11302, where the computing device determines whether to set up the local communication(s). When not setting up the local communication, the method continues back to step 11300. When setting up the local communication, the method continues with step 11304, where the computing device sends a query to the UCD to determine whether the UCD has screen to screen (STS) communication software (e.g., application) installed and/or accessible. In an example, the query also asks whether the UCD has STS communication hardware (e.g., a drive sense module, a touch screen with an electrode, etc.).

The method continues with step 11306, where the computing device determines (e.g., based on a query response) whether the UCD has the STS communication application. When the UCD does not have the STS communication application, the method continues to step 11308, where the UCD obtains the STS communication application via one or more communication networks (e.g., a wide area network (WAN), a local area network (LAN), cellular data network (e.g., 5G), etc.). For example, the UCD downloads the STS communication application from an STS communication server via a 5G cellular data network connection. Alternatively at step 11308, or in addition to, when the UCD doesn't download (e.g., can't download, determines not to download, etc.) the STS communication application, the process ends and/or the computing device sends a message to the UCD for the user to go inside and interact with an ICD for further instructions.

The method continues with step 11310, where the computing device sends a query to the UCD to determine whether the UCD has an interactive user application installed or accessible. The method continues to step 11312, where the computing device determines (e.g., based on a query response) whether the UCD has the interactive user application. When the UCD does not have the interactive user application, the method continues to step 11314, where the UCD obtains (e.g., downloads, gain access to, etc.) the interactive user application via one or more of the communication networks (e.g., a wireless area network (WAN)). Alternatively, or in addition to, when the UCD doesn't download (e.g., can't download, determines not to download, etc.) the interactive user application, the process ends and/or the computing device sends a message to the UCD for the user to go inside and interact with an ICD for further instructions. The method then continues to step 11316.

When the UCD has the interactive user application, the method continues to step 11316, where the UCD and ICD execute a transaction at least partially via an STS communication link.

FIG. 62AI is a logic flow diagram of another example of a method of setting up a screen to screen (STS) communication between an interactive computing device (ICD) and a user computing device (UCD). As used in the description of this figure, the ICD, the UCD and/or another computing device are referred to as a computing device. The method begins or continues with step 11340, where the computing device determines whether a UCD is inside a local communication range (e.g., 5G, wireless local area network, wide area network, Bluetooth, etc.). When not inside the local communication range, the method continues back to step 11340. When inside the local communication range, the method continues to step 11342, where the computing device determines whether it can set up a local communication.

When the local communication cannot be setup, the method continues back to step 11340. When the local communication can be setup, the method continues to step 11344, where the computing device determines whether the UCD has an STS communication application installed and/or accessible. For example, the computing device queries the UCD to respond with an indication of whether it has the STS communication application. When the UCD does not have the STS communication application, the method continues to step 11345, where the UCD gets the STS communication application. Alternatively, when the UCD does not get the STS communication application, the process ends. When the UCD has the STS communication application, the method continues to step 11346, where the computing device determines whether to pre-order (e.g., via an interaction application) one or more items via a local communication network (e.g., 5G, WLAN of a coffee shop).

When the computing device determines not to pre-order one or more items via the local communication, the method continues to step 11347, where the computing device determines to wait until a user of a UCD is at an interactive computing device (e.g., of the coffee shop) to order via a screen to screen (STS) communication. When the computing device determines to pre-order one or more items via the local communication, the method continues to step 11348, where the computing device places a pre-order of the one or more items via a local communication link. For example, the user computing device sends a message to an ICD (or other computing device (e.g., coffee shop server)) of a coffee shop that includes data regarding a coffee order (regular order, particular order based on a day of a week and/or time of the day, etc.). The method continues with step 11349, where the computing device finalizes the order (e.g., provides payment data, provides signature, selects reward points as payment, etc.) via a screen to screen (STS) communication between the UCD and the ICD.

FIG. 62AJ is a schematic block diagram of an example of transmitting close proximity signals 11127 between a user computing device (UCD) 1114 and an interactive computing device (ICD) 1112 to form a screen to screen (STS) connection 1118. In this example, the user computing device 1114 may or may not include a display associated with the touch screen sensor array 1134 and the interactive computing device does include a display associated with its touch screen sensor array 1134.

In an example of operation, a user (e.g., of UCD 1114) touches a button (e.g., start) on a touch screen of the ICD 1112 to initiate setting up screen to screen (STS) communications (e.g., how the ICD and UCD will interact in a transaction that includes at least some data transmitted between the ICD and UCD over an STS connection). Alternatively, the user may touch a portion of the UCD 1114 touch screen to initiate setting up the STS communications. The ICD 1112 transmits a signal (e.g., a default ping signal) to the UCD 1114 to initiate an STS connection via close proximity 11127 and/or body as a network (BaaN). The UCD receives the ping signal and sends a ping back signal to the ICD. The ping signal and ping back signal are discussed in further detail with reference to one or more subsequent figures.

FIG. 62AK is a schematic block diagram of an example of transmitting ping signals via a body as a network (BaaN) screen to screen (STS) connection. As illustrated, the interactive computing device (ICD) 1112 and the user computing device (UCD) 1114 each include drive sense modules (DSMs) connected to rows of electrodes 11105 and columns of electrodes 11105. When a user touches the touch screen, the drive sense modules sense the touch based on a change in an electrical characteristic (e.g., an impedance, a current, a reactance, a voltage, a frequency response, etc.) of the affected electrodes 11105 at one or more particular frequencies (e.g., fs, fm_1 to fm_n of FIG. 32). The drive sense modules also sense a ping signal at another one or more particular frequencies (e.g., f1, f2, f3 of FIG. 32) of the affected electrodes 11105.

Based on the detected touch, the touch screen processing modules determine to drive a signal onto the affected electrodes as a method of transmitting data via the STS connection. For example, the ICD 1112 senses a ping signal at a first frequency (f1) on an electrode. The ICD drives a ping back signal onto the electrode at f1 and/or another frequency.

FIG. 62AL is a schematic block diagram of an example of an interactive computing device (ICD) 1112 generating a default ping signal and transmitting the default ping signal via electrodes that are affected by a user touch. In this example, the ICD 1112 creates the default ping signal that is to be transmitted to a user computing device (UCD) via the affected electrodes 11105. The signal may be generated in accordance with a modulation scheme. For example, the ICD utilizes an amplitude modulation (AM) scheme to produce the default ping signal. As another example, the ICD utilizes an amplitude shift keying modulation scheme to produce the default ping signal. When the ICD utilizes AM or ASK, a receiving device is able to determine the default ping signal without syncing the UCD's clock with a clock of the ICD.

FIG. 62AM is a schematic block diagram of an example of a default ping signal. The default ping signal is generated at one or more particular frequencies (e.g., 11300 cycles per second, 11300 MHz, 1 GHz, etc) and is repeated in accordance with a screen to screen (STS) communication protocol. The default ping signal indicates to another computing device to setup an STS communication.

In this example, the default ping signal is 1116 cycles using a two-level encoding. For example, the ICD transmits at no frequency or a first frequency in accordance with an on-off keying (OOK) modulation scheme, which represents the binary equivalent of 1 bit per cycle. When the ICD does not transmit the first frequency (e.g., no TX) during a cycle, this represents a binary 0. And, when the ICD transmits the first frequency during a cycle, this represents a binary 111. However, other embodiments may use more or less than 1116 cycles, more than 1 frequency, and/or more bits per cycle (e.g., four level encoding scheme to represent two bits per cycle as illustrated in FIG. 62AN).

For example, a default signal has a pattern of 8 cycles at a first frequency. As another example, a default ping signal has a pattern of 8 cycles at the first frequency and eight cycles at a second frequency. As a further example, a default ping signal has a pattern of 114 cycles at the first frequency and 114 cycles at no frequency, 114 cycles at the second frequency, 2 cycles at the no frequency and 2 cycles at the second frequency. As yet another example, a default ping signal has a pattern that repeats three total cycles of 8 cycles at the first frequency and 8 cycles at the second frequency. Note that the frequencies used in the default ping signal may be dedicated for the ping signal. Alternatively, or in addition to, the frequencies used in the default ping signal may be different from frequencies utilized to determine self and/or mutual capacitance of the electrodes.

FIG. 62AN is a schematic block diagram of an example of transmitting a default ping signal. In this example, the default ping signal is transmitted in a pattern of 1116 cycles using no frequency and a first, second and third frequency, each of which have a binary equivalent of two bits (e.g., 00, 01, 1110, 1111). The pattern may be repeated a certain number of times according to a screen to screen (STS) communication protocol to ensure a receiving computing device can receive and identify the default ping signal.

FIG. 62AO is a schematic block diagram of an example of transmitting a default ping signal shown in FIG. 62AN via an electrode 11105 that is connected to a front end of a drive sense circuit 11103. The front end of the drive sense circuit 11103 includes a current source 11111 and a comparator 11112 connected to the electrode 11105. The comparator is inputted an analog reference signal 11101 which it uses to compare to signaling on the line connected to the electrode 11105 and dependent current source 1111.

An example of the analog reference signal 11101 is shown having a direct current (DC) component 11324 that has a magnitude and an oscillating component 11326 oscillating at a frequency "i". The output of the comparator changes in part based on changes to analog reference signal 11101. For example, a processing module of an interactive computing device modulates data onto a carrier signal at none, a first, a second, and a third frequency to produce the analog reference signal 11101 (e.g., f"i"). The comparator generates an analog compensation signal based on the changes to the analog reference signal. The current source 11111 modifies (e.g., increases, decreases) an output current based on the analog compensation signal, that is driven onto electrode 11105. An electrical characteristic of the electrode is affected by the output current and is representative of the modulated data (e.g., transmitting no signal, transmitting a signal at a first frequency (e.g., f1), transmitting a signal at a second frequency (e.g., f2) and transmitting a signal at a third frequency (e.g., f3)).

FIG. 62AP is a logic flow diagram of an example of a method for establishing a screen to screen (STS) connection. FIG. 62AQ is a schematic block diagram illustrating the affected electrodes 11105 of an interactive computing device (ICD) 1112 as discussed in the example of FIG. 62AP. The method of FIG. 62AP begins with step 11360, where an interactive computing device (ICD) detects a touch by a user on a touch screen of the ICD. The method continues with step 11362, where the ICD determines the electrodes affected by the user touch. For example, a processing module of the ICD determines a change in the self and/or mutual capacitance of electrodes that are affected by the user touch and interprets the change of capacitance as representing a touch. The touch may include two or more touch points (e.g., different affected electrodes).

The method continues with step 11364, where the ICD creates a default screen to screen (STS) ping signal. For example, the ICD generates a signal with a particular frequency pattern that represents a ping signal in accordance with an STS communication protocol. The method continues with step 11366, where the ICD transmits the default STS ping signal via the affected electrodes (e.g., the bolded electrodes of FIG. 62AQ). The method continues to step 11368, where the ICD determines whether the user is still touching the touch screen (e.g., at least a portion of the affected electrodes, any electrodes of the touch screen, etc.). When the user is not touching the touch screen, the method continues to step 11369, where the ICD generates a message instructing the user to touch the touch screen again and hold until next steps. Alternatively, the method ends at step 11369.

When the user is still touching the touch screen, the method continues to step 11370, where the ICD determines whether it has received a ping back signal (e.g., from a user computing device of the user). When the ICD has not received the ping back signal (e.g., within a time frame), the method continues back to step 11366. Alternatively, when the ICD has not received the ping back signal, the method may end, or continue to step 11368. When the ICD has received the ping back signal, the method continues to step 11372, where the ICD establishes a type (e.g., close proximity, via human body, etc.) of STS connection. For example, the ICD establishes the STS connection is via a human body (e.g., body as a network (BaaN)). Note the type of connection (e.g., close proximity) for the STS may be different than a type of connection (e.g., BaaN) utilized to setup the STS communications.

FIG. 62AR is a schematic block diagram of an example of receiving a default ping signal by a user computing device (UCD) 1114. In this example, the default ping signal includes 1116 cycles of either no transmission (which represents a binary 0) or transmission at a first frequency (which represents a binary 111). The UCD 1114 receives the default ping signal via a body of a user that is touching (or close enough to transmit the default ping signal) a touch screen of the UCD 1114 and a touch screen of an interactive computing device (ICD) 1112.

FIG. 62AS is a schematic block diagram of an example of receiving a ping signal 11231 on an electrode 11105 connected to a front end of a drive sense circuit 11103 (e.g., of a user computing device 1114). The front end includes a current source 11111 and a comparator 11112.

In an example of receiving the ping signal 11231, the comparator 11112 compares an analog reference signal 11101 (e.g., a current signal or a voltage signal) to an electrode signal 11321 to produce an analog comparison signal 11325, which represents a change in an electrical characteristic of the electrode 11105. The received ping signal 11231 includes a direct current (DC) component 11320 and an oscillating component 11322. The DC component 11320 is a DC voltage in the range of a few hundred milli-volts to tens of volts or more. The oscillating component 11322 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

The oscillating component 11322 oscillates at a frequency "$f_i$". In an example, $f_i$ includes one or more of a first frequency (f1), a second frequency (f2) and a third frequency (f3) (e.g., as illustrated in the magnitude frequency graph of the ping signal). In this example, the first, second, and third frequencies are the frequencies utilized to setup screen to screen (STS) communications between devices. As another example, fi is a carrier frequency. As another example, fi is the combination of the carrier signal that is modulated with data signals at one or more frequencies (e.g., f1, f2, f3).

The analog reference signal 11101 includes a DC component 11324 and an oscillating component(s) for self and/or mutual capacitance 11326. As an example, the oscillating component(s) include a frequency (fs) for driving/sensing a self-capacitance of an electrode and one or more frequencies (fm_1 to fm_n) for driving/sensing mutual capacitances between the electrode and other electrodes. The frequencies of self and/or mutual capacitances of a touch screen are utilized to determine which electrodes are touched (e.g., affected electrodes), and/or how a touch screen is touched (e.g., motion, etc.) and further what is touching it (e.g., pen, human finger, etc.). For example, the drive sense modules that detect capacitance changes and the type of capacitance change (e.g., self, mutual) are utilized to determine which electrodes of the touch screen are affected by the touch.

Continuing with the example, the current source modifies a current based on the analog comparison signal to keep a voltage on the electrode substantially constant. A processing module determines the presence of f1, f2, and/or f3 based on the analog comparison signal 11325. The processing module further determines whether the analog comparison signal 11325 indicates the user computing device is receiving a ping signal (e.g., default bit pattern) from another computing device (e.g., an interactive computing device 1112).

FIG. 62AT is a schematic block diagram of an example of generating a ping back signal via an electrode 11105 that is connected to a comparator 11112 and a current source 1111. As illustrated, the comparator is inputted an analog reference signal 11101 and signaling on a line connected to an output of the current source 11111 and the electrode 11105. The analog reference signal 11101 includes a direct current (DC) component 11324 and an oscillating component 11327 that oscillates at a frequency "k".

The comparator 11112 outputs an analog compensation signal based on a comparison of the analog reference signal and signaling on electrode 11105. The current source 11111 adjusts a current based on the analog compensation signal to keep the inputs of the comparator substantially the same (e.g., same voltage, same current). The electrode transmits the ping back signal based on the current adjustment (e.g., current driven on electrode 11105) at one or more frequencies and/or the current adjustment based on the received ping signals.

In this example, when the electrode is effectively transmitting (at a second frequency) while receiving a signal (e.g., at a first frequency), the ping back signal (shown in green) oscillates based on a first frequency component (e.g., f"i") and a second frequency component (e.g., f"k"). For example, the signal component f"i" is combined (e.g., added, multiplied) with the signal component f"k" to produce the ping back signal.

FIG. 62AU is a schematic block diagram of an example of producing a ping back signal that includes a current source 11111, a comparator 11112, an electrode 11105, a bandpass filter 11454, and a modulator 11452. Also illustrated are a time domain graph that plots magnitude versus time for a ping back signal using amplitude shift keying (ASK), and a frequency domain graph that plots magnitude versus frequency of the ping back signal.

In an example of operation, the comparator 11112 outputs an analog comparison signal based on its inputs. For example, the electrode receives a default ping signal that changes an electrical characteristic of the electrode. The comparator outputs the analog comparison signal such that it represents a signal component of the default ping signal. The bandpass filter 11454, filters out unwanted frequencies to produce a recovered signal component at a desired frequency (e.g., f"i"). The modulator 11452 modulates the recovered f"i" signal component based on ping back data 11450 to produce a ping back reference input. The modulation includes one or more of amplitude shift keying (ASK), amplitude modulation (AM), phase shift keying (PSK), and 4-quadrature amplitude modulation (4QAM).

The comparator produces a second analog comparison signal based on the ping back reference input, which causes current source 11111 to adjust a current signal to keep the inputs to the comparator substantially constant. The current signal is driven onto electrode 11105 to produce a ping back signal that represents ping back data 11450.

FIG. 62AV is a logic flow diagram of an example of a method of setting up a screen to screen (STS) connection. In this example, the STS connection is between an interactive computing device (ICD) and a user computing device (UCD). However, in other examples, the screen to screen connection is set up between one or more UCDs and/or one or more ICDs.

The method begins at step 11400, where the interactive computing device (ICD) provides an on-screen "start" button. The "start" button may be a physical button to press, a representation of a button on the display of a touch screen of the ICD, and/or an instruction (e.g., text, voice, etc.) to place a user computing device in a particular area, such that the user computing device is orientated with respect to the ICD to enable an STS connection. In an example, the button (or additional button) further includes an indication of the STS connection type to use. For example, a first button indicates to use a close proximity connection and a second button indicates to use a human body connection. In another example, the ICD includes another mechanism (e.g., physical button, prompt to complete a Completely Automated Public Turing test to tell Computers and Humans Apart, (CAPTCHA), another digital button, a motion, a voice command, etc.), that ensures it is the intent of the user to start the STS connection process.

The method continues with step 11402, where the ICD determines whether a user touch has been detected. When the user touch has not been detected, the method continues back to step 11400. When the user touch has been detected, the method continues to one or more of steps 11403 and 11404. At step 11403, the ICD displays an instruction to touch a portion of the ICD touch screen (e.g., a touch here button) while the user is touching (e.g., body is in contact with) the user computing device (UCD). At step 11404, the ICD displays an instruction to place the UCD in an area of or adjacent to the ICD display, such that a close proximity or vibration STS connection is able to be formed.

After steps 11403 and/or 11404, the method continues to step 11406, where the ICD sends an STS ping signal to the UCD. The STS ping signal is a default signal for any type of STS connection or is a first particular signal for a first STS connection type and a second particular signal for a second STS connection type. The method continues to step 11408, where the ICD determines whether it has received a ping back signal. During step 11408, the user computing device is actively looking for the STS ping signal from the ICD. An example of the UCD looking for the STS ping signal is discussed in further detail with reference to FIG. 62AW.

When the ICD has not received the ping back signal within a time period, the method continues to step 11410, where the ICD determines whether the wait (e.g., elapsed time) looking for the ping signal has expired (e.g., timed out). When the ICD determines the wait for the receive ping signal has timed out, the method continues to step 11412, where the ICD ends the process. Alternatively, or in addition to, the ICD may display a message to download an STS communication application on the UCD, a message to start over with the user, and/or a reminder message of an action to take (e.g., place hand on screen, place phone on screen, touch physical button on side of ICD, etc.). When the ICD determines the wait for the receive ping signal has not timed out, the method continues back to step 11406, where the ICD sends another STS ping signal to the user computing device.

When the ICD has received the ping back signal within the time period, the method continues to step 11414, where the ICD and the UCD establish a type of STS connection. For example, the ICD and UCD establish to perform STS communication via close proximity STS connection. As another example, the ICD and UCD establish to perform STS communication via the user's body as a network (BaaN) STS connection.

Having established the type of STS connection, the method continues with step 11416, where the ICD and UCD establish an STS communication protocol for the STS communication. For example, the STS communication protocol establishes STS communications are to be in accordance with a particular type of one of pattern encoding, binary encoding, and symbol encoding.

FIG. 62AW is a logic flow diagram of another example of a method for use in setting up a screen to screen (STS) connection between an interactive computing device (ICD) and a user computing device (UCD). The method begins with step 11420, where a UCD periodically senses for an STS ping signal. For example, the UCD has an STS communication application installed or otherwise able to access and the STS communication application periodically wakes up to listen or is always listening for the STS ping signal.

The method continues with step 11422, where the UCD determines whether it has detected an STS ping signal. When the STS ping signal is not detected, the method continues back to step 11420. When the STS ping signal is detected, the method continues to step 11424, where the UCD transmits a ping back signal. In an example, the ping back signal is a ring back signal.

The method continues with step 11426, where the ICD and the UCD establish a type of STS connection. For example, the ICD and UCD establish to perform STS communications via a close proximity STS connection. As another example, the ICD and UCD establish to perform STS communications via the user's body as a network (BaaN) STS connection.

Having established the type of STS connection, the method continues with step 11428, where the ICD and UCD establish an STS communication protocol for the STS communication. For example, the STS communication protocol establishes STS communications are to be in accordance with one of pattern encoding, binary encoding, and symbol encoding.

FIG. 62AX is a logic flow diagram of another example of a method of setting up a screen to screen (STS) connection between an interactive computing device (ICD) and a user computing device (UCD). The method begins with step 11430, where the user computing device detects a touch of the screen by the user. For example, a touch screen processing module of the UCD interprets a capacitance (e.g., self-capacitance, mutual capacitance) change of one or more electrodes of the touch screen of the UCD to determine the touch.

The method continues with step 11432, where the UCD determines electrodes affected by the touch. For example, the UCD determines which drive sense modules that re coupled to the electrodes (e.g., coupled to an electrode, a row of electrodes, a column of electrodes, etc.) detected a capacitance change at a certain frequency to determine the affected electrodes. The method continues with step 11434, where the UCD receives a default ping signal via the affected electrodes.

The method continues with step 11436, where the UCD determines whether it recognizes a pattern (e.g., transmission cycle pattern, frequency pattern, an amplitude pattern, etc.) of the default ping signal as the default ping signal. When the UCD does not recognize the pattern, the method continues to step 11438, where the UCD determines whether the user is still touching the UCD touch screen. When the user is still touching, the method continues to step 11434. When the user is not still touching, the method continues to step 11439, where the UCD ends the process. Alternatively, the UCD prompts the user to touch the screen again and hold until the STS communication is setup or until the UCD prompts the user that it is ok to stop touching the UCD touch screen.

When the UCD does recognize the pattern, the method continues to step 11440, where the UCD generates a ping back signal. In an example, the UCD backscatters the default ping signal or pings back the signal pattern (e.g., inverse of the ping signal, same pattern as ping signal, etc.). The method continues with step 11442, where the UCD transmits a ping back signal. The method continues with step 11444, where the UCD determines whether it has received an acknowledgement from the ICD.

When the UCD has not received the acknowledgement, the method continues to step 11445, where the UCD determines whether a time period for receiving the acknowledgement has ended (e.g., the process times out). When the process has not timed out, the method continues to step 11442. When the process has timed out, the method continues to step 11446, where the UCD ends the process. In addition, the UCD may ask the user to start the STS connection process over and/or ask the user to repeat touching the touchscreen so that the UCD can retry sending the ping back signal (e.g., step 11442) to the ICD.

When the UCD has received the acknowledgement (ACK), the method continues to step 11448 where the UCD and/or ICD establishes the type of STS connection. For example, the ICD and UCD establish to perform STS communication via close proximity STS connection. As another example, the ICD and UCD establish to perform STS communication via the user's body as a network (BaaN) STS connection.

FIG. 62AY is a schematic block diagram of an embodiment of an example of a radio frequency (RF) transceiver 11460 and a signal source 11102, and an illustration of the output of the signal source 11102 (e.g., analog reference signal 11101). The RF transceiver 11460 includes a digital baseband or low IF processing module 11461, an analog to digital converter (ADC) 11450, a receive (RX) low pass (LP) filter circuit 11462, down conversion mixer 11463, a low noise amplifier 11464, a receive (RX) bandpass (BP) filter circuit 11465, a transmit (TX)/receive (RX) splitter 11466 coupled to an antenna, a transmit (TX) bandpass (BP) filter circuit 11467, a power amplifier 11468, an up conversion mixer 11469, a transmit low pass (LP) filter circuit 11470, a digital to analog converter (DAC) 11452 and a local oscillation generator (LOGEN) 11473. The signal source 11102 includes a direct current (DC) reference voltage circuit 11471, a phase locked loop (PLL) 11472, and a combining circuit 11474.

In an example of operation, the antenna of the TX/RX splitter 11466 (e.g., a balun, a duplexer, circulator, etc.) receives an inbound radio frequency (RF) signal, which is routed to the RX BP filter module 11465. The RX BP filter module 11465 is a filter that passes the inbound RF signal to the LNA 11464, which amplifies the inbound RF signal to produce an amplified inbound RF signal.

The down conversion mixer 11463 converts the amplified inbound RF signal into an inbound symbol stream corresponding to a first signal component and into a second inbound symbol stream corresponding to the second signal component. In an embodiment, the down conversion mixer 11463 mixes in-phase (I) and quadrature (Q) components of the amplified inbound RF signal with in-phase and quadrature components of local oscillation generator 11473 to produce a mixed I signal and a mixed Q signal for each component of the amplified inbound RF signal. Each pair of the mixed I and Q signals are combined to produce the first and second inbound symbol streams. In this embodiment, each of the first and second inbound symbol streams includes phase information (e.g., +/−Δθ [phase shift] and/or θ(t) [phase modulation]) and/or frequency information (e.g., +/−Δf [frequency shift] and/or f(t) [frequency modulation]). In another embodiment, the inbound RF signal includes amplitude information (e.g., +/−ΔA [amplitude shift] and/or A(t) [amplitude modulation]). The RX LP filter circuit 11462 filters the down-converted inbound signal, which is then converted into a digital inbound baseband signal by the ADC 11450.

The digital baseband or low IF processing module 11461 converts the inbound symbol stream(s) into data in 11453 (e.g., voice, text, audio, video, graphics, etc.) in accordance with one or more wireless communication standards (e.g., GSM, CDMA, WCDMA, HSUPA, HSDPA, WiMAX, EDGE, GPRS, IEEE 11802.11, Bluetooth, ZigBee, universal mobile telecommunications system (UMTS), long term evolution (LTE), IEEE 11802.16, evolution data optimized (EV-DO), etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the processing module 11461 converts a single inbound symbol stream into the inbound data for Single Input Single Output (SISO) communications and/or for Multiple Input Single Output (MISO) communications and converts the multiple inbound symbol streams into the inbound data for Single Input Multiple Output (SIMO) and Multiple Input Multiple Output (MIMO) communications.

In this example, the processing module 11461 receives data out 11455. As an example, the processing module interprets the data out 11455 as a touch of a touch screen to generate a command (e.g., pause, stop, etc.) regarding a streaming video. The processing module processes the command by converting it into one or more outbound symbol streams (e.g., outbound baseband signal) in accordance with one or more wireless communication standards (e.g., GSM, CDMA, WCDMA, HSUPA, HSDPA, WiMAX, EDGE, GPRS, IEEE 11802.11, Bluetooth, ZigBee, universal mobile telecommunications system (UMTS), long term evolution (LTE), IEEE 11802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the processing module converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and Multiple Input Multiple Output (MIMO) communications.

The DAC 11452 converts the outbound baseband signal into an analog signal, which is filtered by the TX LP filter circuit 11470. The up-conversion mixer 11469 mixes the filtered analog outbound baseband signal with a transmit local oscillation (TX LO) to produce an up-converted signal. This may be done in a variety of ways. In an embodiment, in-phase and quadrature components of the outbound baseband signal are mixed with in-phase and quadrature components of the transmit local oscillation to produce the up-converted signal. In another embodiment, the outbound baseband signal provides phase information (e.g., +/−Δθ [phase shift] and/or θ(t) [phase modulation]) that adjusts the phase of the transmit local oscillation to produce a phase adjusted up-converted signal.

In this embodiment, the phase adjusted up-converted signal provides the up-converted signal. In another embodiment, the outbound baseband signal further includes amplitude information (e.g., A(t) [amplitude modulation]), which is used to adjust the amplitude of the phase adjusted up converted signal to produce the up-converted signal. In yet another embodiment, the outbound baseband signal provides frequency information (e.g., +/−Δf [frequency shift] and/or f(t) [frequency modulation]) that adjusts the frequency of the transmit local oscillation to produce a frequency adjusted up-converted signal. In this embodiment, the frequency adjusted up-converted signal provides the up-converted signal. In another embodiment, the outbound baseband signal further includes amplitude information, which is used to adjust the amplitude of the frequency adjusted up-converted signal to produce the up-converted signal. In a further embodiment, the outbound baseband signal provides amplitude information (e.g., +/−ΔA [amplitude shift] and/or A(t) [amplitude modulation) that adjusts the amplitude of the transmit local oscillation to produce the up-converted signal.

The power amplifier (PA) 11468 amplifies the up-converted signal to produce an outbound RF signal. The TX BP filter circuit 11467 filters the outbound RF signal and provides the filtered outbound RF signal to the TX/RX splitter 11466 for transmission via the antenna that is connected to the TX/RX splitter 11466.

The LOGEN 11473 also provides a reference oscillation signal to a phase locked loop (PLL) 11472 of the signal source 11102. The phase locked loop 11472 locks onto a phase and/or frequency of the reference oscillation signal to produce an oscillating component 11322. Note the frequency of the oscillating component may be different (e.g., greater than, less than) than a frequency of the reference oscillation signal. Further note in an example, the PLL is omitted and the LOGEN 11473 provides the oscillating component 11322 to the combining circuit 11474.

The direct current (DC) reference voltage circuit 11471 produces a direct current (DC) component 11320. The combining circuit 11474 combines (e.g., adds, multiples, etc.) the oscillating component 11322 and the DC component 11320 to produce analog reference signal 11101.

FIG. 62AZ is a schematic block diagram of an example of an interactive computing device (ICD) interacting with a user computing device (UCD) to select items. As illustrated, a menu of 9 items are displayed on the ICD. Note the menu may include for each corresponding item one or more of a graphical representation, nutritional information, price information, ingredient information, and estimated completion time information. Further note a running total of a user's selections could also be displayed. For example, a sidebar of the menu displays items a user has already selected along with a total purchase price (e.g., in a currency (e.g., dollars, pounds, bitcoin, etc.) and/or rewards elements (e.g., points, stars, rewards level, etc.).

In an example of operation, the ICD provides (e.g., displays, sends to a user computing device (UCD)) a menu of options able to be selected by a user. The ICD receives one or more selections of options via a touch (e.g., BaaN) from the user on the touch screen of the ICD, a voice selection from the user, a Bluetooth communication from the UCD, and/or in combination with an STS communication.

FIG. 62BA is a schematic block diagram of an example of an interactive computing device (ICD) interacting with a user computing device (UCD) to mirror a menu of items. In an example of operation, the user of a UCD opens a coffee company application on the UCD. The coffee application is mirrored, at least partially, on an ICD associated with the coffee company (e.g., point of sale (POS) at brick and mortar location). The mirroring may be performed via a wireless local area network (WLAN), Bluetooth and/or a cellular data network (e.g., 5G network).

In an example, the UCD and ICD have already set up an STS connection (e.g., via user touching the ICD, via user placing the UCD in close proximity to the ICD, etc.). In another example, the UCD and ICD will setup an STS connection during or subsequent to the selection of menu items. As illustrated, the user selects item 2 on a touch screen of the UCD and the ICD displays a mirrored menu showing item 2 being selected.

FIG. 62BB is a schematic block diagram of an example of an interactive computing device (ICD) interacting with a user computing device (UCD) to select items of a menu. The UCD displays a menu of items for selections by a user. The menu may be part of an application downloaded on the UCD. The application may be acquired via the ICD and/or from an interaction application server 1120.

In this example, the user computing device (UCD) receives selections of the menu from a user via its touch screen. For example, the user touches an area of the touch screen that corresponds to a selection of item 2. In an embodiment, the user touches the area ("button") of the touch screen that displays an item a certain number of times (e.g., releasing finger and then placing finger in same area again) corresponding to a desired quantity of the item. As a specific example, when the user desires two lattes and one breakfast sandwich, the user touches the button for a latte twice and the breakfast sandwich once. In another embodiment, after the user makes a selection (e.g., touches item 2), a quantity selection option (e.g., in same area of as item 2 on the touch screen, in different area of touch screen, etc.) is then displayed prompting the user to input a quantity or confirm a default (e.g., 111) quantity.

Having received the selection of an item, the UCD sends the selections to the ICD, which displays the selections on a display of the ICD. For example, the user selects a quantity of two of item 7, a quantity of one of item 4, and a quantity of three of item 2. As illustrated, the ICD may display the selections along with price information.

FIG. 62BC is a schematic block diagram of an example of an interactive computing device (ICD) interacting with a user computing device (UCD) to edit a menu selection. In this example, the coffee shop application displays an edit button. A user of the UCD selects the edit button when they wish to modify an item or quantity of the item previously selected. When receiving the edit selection, the UCD sends an edit signal to the ICD that indicates the user wishes to edit the item and/or quantity. The user may the edit the menu selections by one or more of the touch screen of the UCD, the touch screen of the ICD, and a voice command.

FIG. 62BD is a schematic block diagram of an example of an interactive computing device (ICD) interacting with a user computing device (UCD) to edit a menu selection. In this example, the menu displayed on the ICD is mirrored to the display of the UCD after the ICD receives the edit signal. Alternatively, or in addition to, the ICD screen may be sent to the UCD for editing. The user selects the item(s) to be edited. For example, the user selects a quantity value button of item 2 to edit.

FIG. 62BE is a schematic block diagram of an example of an interactive computing device (ICD) interacting with a user computing device (UCD) to edit a menu selection. After selecting the quantity of item 2, the user is prompted to enter a new value for the quantity. For example, the user is presented with an empty quantity field and digit buttons 0-9 to manually enter a new quantity. As another example, the UCD displays the current quantity with up and down arrows for the user to touch to modify the current quantity by a default value (e.g., by 111). In this specific example, the user edits the quantity of item 2 from a quantity of three to a quantity of two. The ICD receives the selection and display an updated tabulated menu (e.g., the line total for item 2 and the total for all items).

FIG. 62BF is a schematic block diagram of an example of an interactive computing device (ICD) interacting with a user computing device (UCD) to edit a menu selection. As illustrated, the user selects an end edit button to finalize editing and returns to a previous screen or to a finalize order screen. Once the editing is complete, the ICD may discontinue the mirroring and the UCD may return the display to the last shown in the application.

FIG. 62BG is a schematic block diagram of an example of an interactive computing device (ICD) interacting with a user computing device (UCD) to edit a menu selection. To finishing the editing, the user selects a done button, which causes the UCD to send a done signal to the ICD. In an example, the done button causes the selected items to be ordered. In an instance, the UCD and ICD then communicate via an STS connection (e.g., BaaN, close proximity, etc.) to process payment for the ordered items.

FIG. 62BH is a schematic block diagram of an embodiment of setting up screen to screen (STS) communications between a user computing device (UCD) 1114 and an interactive computing device (ICD) 1112. The UCD 1114 and the ICD 1112 both include a screen to screen (STS) communication application 1190.

The example begins by the UCD 1114 sending (1) a user identification (ID) package 11570 to the ICD via an STS connection. The user ID package 11570 includes a user ID information for the UCD 11571, STS account ID information 11572, and UCD ID information 11573. In an example, one or more portions of the information 11571-573 is confidential information 11141.

The user ID information for UCD 11571 includes one or more of a user name field, a password (PW) field, an address field, a phone number field, a date of birth (DOB) field, and a personal field. The personal data field includes data that further identifies a user of the UCD (e.g., personal codes, personal biometric data, etc.). The STS account ID information 11572 includes one or more of a user name field, a PW field, an account (acct) ID field, and a time stamps field. The time stamps field may include times regarding creation of an STS account, a last 1110 STS uses, etc.). The UCD ID information 11573 includes one or more of an international mobile equipment identity (IMEI) field and an internet protocol (IP) address field.

Continuing with the example, after receiving the user ID package 11570, the ICD 1112 creates a verification package 11578, which includes an aggregate of the user ID package 11570 and an ICD operator ID package 11574 or selected portions thereof. The ICD operator ID package 11574 includes operator ID information for the ICD 11575, STS account ID information 11576, and ICD ID information 11577. The information 11575 includes one or more of an operator name field, an operator password field, an address field, a phone number field, and an operator unique ID field. The STS account ID information 11576 includes an operator name field, a password field, and an account ID field. The ICD ID information 11577 field includes an IMID field and an IP address field. In an example, the verification package 11578 includes a user name and password of information 11571, and an operator name and password of information 11575. Note one or more portions of the information 11575-577 is classified as confidential information 11141.

FIG. 62BI is a schematic block diagram of the example of the setting up screen to screen (STS) communications of FIG. 62BH that continues with the interactive computing device (ICD) sending (3) the verification package 11578 to a screen to screen (STS) communication server 1122. The STS communication server 1122 receives and reviews (4) the verification package 11578. The reviewing may include one or more verifications. As an example of a first verification, the STS communication server 1122 reviews the verification package 11578 by looking up and verifying the user STS account information that is stored in a user database 11580 substantially matches the user STS account information included in verification package 11578. As an example of a second verification, the STS communication server 1122 further reviews the verification package 11578 by looking up and verifying the ICD operator STS account information that is stored in ICD database 11582 substantially matches the ICD operator STS account information included in verification package 11578.

Having reviewed the verification package 11578, the STS communication server 1122 sends (5) an acknowledgement (ACK) or error message to one or both of the user computing device (UCD) 1114 and the ICD 1112. For example, the STS communication server 1122 sends an ACK to UCD 1114 when the review of the user STS account information is favorable (e.g., user STS account info in verification package 11578 substantially the same as user STS account information stored in user database 11580). As another example, the STS communication server 1122 sends an error message to ICD 1112 when the review of the ICD operator STS account information is unfavorable (e.g., ICD operator STS account information in verification package 11578 is not substantially the same as ICD operator STS account information stored in user database 11580).

The example continues with the UCD 1114 confirming (6) the ACK. For example, when the UCD is sent an ACK from the STS communication server 1122, the UCD sends (6) its ACK to ICD 1112. Alternatively, the UCD may send a ping verification message to the ICD that indicates a favorable acknowledgement was received by the UCD in step (5).

FIG. 62BJ is a schematic block diagram of the example of the setting up the screen to screen (STS) communications of FIGS. 1159-0 that continues with the STS communication server creating a one-time use interaction security code. Continuing with the example, the STS communication server creates (7) the one-time user security interaction code. The interaction security code may be one or more of an alphanumerical code (e.g., A3zv89jb3, etc.), a numerical code (e.g., 118374), a public/private key pair, data transmission information (e.g., type of encoding, transmission frequency, etc.) and a graphical code (e.g., QR code, bar code, etc.).

Having created the security interaction code, the STS communication server 1122 sends (8a) a first portion of the security interaction code to the user computing device (UCD) 1114 and sends (8b) a second portion of the security interaction code to the interactive computing device (ICD) 1112. As an example, the security interaction code is a numerical code of "8374". Thus, a first portion could be "83" and the second portion could be "74". Alternatively, the first portion could be "84" with a message indicating "8" is a first digit of the numerical code and "4" is a fourth digit of the numerical code, and the second portion could be "37" with a message indicating "3" is a second digit of the numerical code and "7" is a third digit of the numerical code.

As another example, the security interaction code is an indication of which frequencies to use (e.g., 11100 Hz, 1120 MHz, 3 GHz, etc.) for an STS communication. Thus, a first portion could indicate a first frequency is 11100 Hz and a second portion indicates a second frequency is 11120 Hz. In yet another example, the security interaction code is an indication of bits per cycle and the type of modulation for the STS communications. As such, a first portion could be "4" and the second portion could be "amplitude shift keying".

Having received the portions of the security interaction code, the UCD 1114 and the ICD 1112 exchange their respective portions to recreate the security interaction code. For example, UCD 1114 sends "83" to the ICD 1112, and ICD 1112 sends "74" to UCD 1114 such that both the UCD 1114 and ICD 1112 recreate security code "8374". The recreated security code may then be verified with the STS communication server in order for the STS connection to be utilized (e.g., for an STS communication of confidential information). Note that in an example, steps 117-9 are performed after both the UCD 1114 and ICD 1112 have been verified in step (4).

FIG. 62BK is a schematic block diagram of an embodiment of the example of the setting up screen to screen (STS) communications of FIGS. 1159-61 that continues with the ICD 1112 and UCD 1114 selecting (10) a modality for menu interaction. The modality includes one or more of mirroring displays during menu interaction, using one of the UCD or ICD for the menu interaction, and using both the UCD and ICD for different part of the menu interaction (e.g., UCD to order, ICD for processing payment).

In an example, the selection could be encoded using a second security interaction code (e.g., code that specifies a type of encoding, etc.). Note the setting up the STS communication includes determining a connection type (e.g., BaaN, close proximity, etc.) and a communication protocol (e.g., what data to be transmitted via STS, via Bluetooth, via WLAN, what frequencies to use, what modulation scheme to use, how many bits per cycle, etc.).

FIG. 62BL is a logic flow diagram of an example of a method of determining a mem interaction modality between an interactive computing device (ICD) and a user computing device (UCD) (the ICD and/or UCD are hereinafter referred to in this Figure as a computing device). The method begins at step 11610, where the computing device determines whether the interaction with the menu is performed via an ICD touch screen or via a UCD touch screen. When the computing device determines the menu interaction is via the ICD screen, the method continues to step 11612, where the ICD displays menu options for a user touch selection.

When the menu interaction is via the UCD touch screen, the method continues to step 11614, where the computing device determines whether to mirror menu display data one both of the touch screens or split the menu display data between the UCD and the ICD touch screens.

When the computing device determines to mirror the menu display data, the method continues to step 11618, where the computing device selects a wireless communication means (e.g., WLAN, Bluetooth, cellular data, etc.) to be used for the mirroring. When the computing device determines to split the screens, the method continues to step 11616, where the computing device selects a wireless communication means (e.g., WLAN, Bluetooth, cellular data, etc.) to be used for the splitting.

FIG. 62BM is a logic flow diagram of an example of a method of setting up a screen to screen (STS) communication setting between an interactive computing device (ICD) and a user computing device (UCD) (the ICD and/or UCD are hereinafter referred to in this Figure as a computing device). The method begins at step 11630, where the computing device determines whether an STS connection is initiated by touch (e.g., body as a network (BaaN)), or by device proximity (e.g., close proximity). When the STS connection is initiated by touch, the method continues to step 11634, where the computing device determines BaaN is to be utilized as a connection medium for setting up the STS communication settings. When the STS connection is initiated by proximity, the method continues to step 11632, where the computing device determines device to device close proximity is to be utilized as the connection medium for setting up the STS communications.

Having setup the STS communication medium (e.g., steps 11632 and 11634), the method continues with step 11636, where the computing device selects a data signaling format for the STS communications. The data signaling format includes one or more of a frequency-time pattern encoding, frequency shift keying (FSK) on selected electrodes, amplitude shift keying (ASK) on selected electrodes, phase shift keying on selected electrodes, 4 quadrature amplitude modulation on selected electrodes, FSK/ASK combination on selected electrodes, and/or other data signaling formats. In an example, one of the previous list of data signaling formats is utilized as a default data signaling format. For example, the computing device determines a default data signaling format for STS communications is ASK on selected electrodes.

Having selected a data signaling format, the method continues to step 11637, where the computing device determines whether the STS communication was successful. For example, the ICD sends a ping signal in accordance with the selected data signaling format and determines the STS communication was successful when receiving a favorable ping back signal from the UCD.

When the STS communication is successful, the method continues to step 11638, where the computing device selects a communication path option for menu interaction. The communication path options includes one or more of an STS connection via BaaN, an STS connection via device to device close proximity, an ICD touch screen direct touch, Bluetooth, wireless local area network (WLAN), and cellular data. When the STS communication is not successful, the method continues to step 11639, where the computing device retries setting up the STS communication or the process ends.

FIGS. 63A-63S present other embodiments of touchscreen processing modules, touchscreen displays, processing modules, drive sense circuits, and other features. Some or all features and/or functionality of the touchscreen processing modules, touchscreen displays, processing modules, drive sense circuits, and other features presented in FIGS. 63A-63S can be utilized to implement any other embodiments of the touchscreen processing modules, touchscreen displays, processing modules, drive sense circuits, and other corresponding features described herein. For example, the detection and/or dentification of a particular user in proximity to and/or interacting with an interactive display device 10 and/or an interactive tabletop 5505, and/or the detection and/or identification of a user being at a particular location in proximity to interactive display device 10 and/or an interactive tabletop 5505, can be based on detecting user identifier data in signals propagated through the user's body by utilizing some or all functionality described in conjunction with FIGS. 63A-63S. In particular, the user identifier data can be detected as a result of being included in a signal propagating through the user's body, and as a result of the user's hand, finger, or other body part being in proximity to interactive display device 10 and/or an interactive tabletop 5505 as discussed previously. As a particular example, one or more chairs in proximity to the interactive display device 10 and/or interactive tabletop 5505, such as user chair 5010 of FIGS. 55C and/or 55D, can transmit a signal having an identifier unique to the chair, or identifier identifying the user based on receiving the identifier from a computing device associated with the user or user input by the user as discussed previously, based on implementing some or all or all functionality described in conjunction with FIGS. 63A-63S to generate and transmit the signal for propagation through a user's body while sitting in the chair.

FIG. 63A is a schematic block diagram of an embodiment 1400 of a touchscreen display in accordance with the present disclosure. This diagram includes a schematic block diagram of an embodiment of a touchscreen display 1280 that includes a plurality of drive-sense circuits (DSCs), a touchscreen processing module 1282, a display 1283, and a plurality of electrodes 1285 (e.g., the electrodes operate as the sensors or sensor components into which touch and/or proximity may be detected in the touchscreen display 1280). The touchscreen display 1280 is coupled to a processing module 1242, a video graphics processing module 48, and a display interface 1293, which are components of a computing device (e.g., one or more of computing devices 1214-1218), an interactive display, or other device that includes a touchscreen display. An interactive display functions to provide users with an interactive experience (e.g., touch the screen to obtain information, be entertained, etc.). For example, a store provides interactive displays for customers to find certain products, to obtain coupons, to enter contests, etc.

In some examples, note that display functionality and touchscreen functionality are both provided by a combined device that may be referred to as a touchscreen display with sensors 1280. However, in other examples, note that touchscreen functionality and display functionality are provided by separate devices, namely, the display 1283 and a touchscreen that is implemented separately from the display 83. Generally speaking, different implementations may include display functionality and touchscreen functionality within a combined device such as a touchscreen display with sensors 1280, or separately using a display 1283 and a touchscreen.

There are a variety of other devices that may be implemented to include a touchscreen display. For example, a vending machine includes a touchscreen display to select and/or pay for an item. Another example of a device having a touchscreen display is an Automated Teller Machine (ATM). As yet another example, an automobile includes a touchscreen display for entertainment media control, navigation, climate control, etc.

The touchscreen display 1280 includes a large display 1283 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 1283, but it's not an exhaustive list. Other screen sizes, resolutions, aspect ratios, etc. may be implemented within other various displays.

The display 1283 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 1283 further includes integrated electrodes 1285 that provide the sensors for the touch sense part of the touchscreen display. The electrodes 1285 are distributed throughout the display area or where touchscreen functionality is desired. For example, a first group of the electrodes are arranged in rows and a second group of electrodes are arranged in columns. As will be discussed in greater detail with reference to one or more of FIGS. 18, 19, 20, and 21, the row electrodes are separated from the column electrodes by a dielectric material.

The electrodes 1285 are comprised of a transparent conductive material and are in-cell or on-cell with respect to layers of the display. For example, a conductive trace is placed in-cell or on-cell of a layer of the touchscreen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 1242 is executing an operating system application 1289 and one or more user applications 1291. The user applications 1291 includes, but is not limited to, a video playback application, a spreadsheet application, a word processing application, a computer aided drawing application, a photo display application, an image processing application, a database application, etc. While executing an application 1291, the processing module generates data for display (e.g., video data, image data, text data, etc.). The processing module 1242 sends the data to the video graphics processing module 48, which converts the data into frames of video 87.

The video graphics processing module 1248 sends the frames of video 1287 (e.g., frames of a video file, refresh rate for a word processing document, a series of images, etc.) to the display interface 93. The display interface 1293 provides the frames of video to the display 1283, which renders the frames of video into visible images.

In certain examples, one or more images are displayed so as to facilitate communication of data from a first computing device to a second computing device via a user. For example, one or more images are displayed on the touchscreen display with sensors 1280, and when a user is in contact with the one or more images that are displayed on the touchscreen display with sensors 1280, one or more signals that are associated with the one or more images are coupled via the user to another computing device. In some examples, the touchscreen display with sensors 1280 is implemented within a portable device, such as a cell phone, a smart phone, a tablet, and/or any other such device that includes a touching display with sensors 1280. Also, in some examples, note that the computing device that is displaying one or more images that are coupled via the user to another computing device does not include a touchscreen display with sensors 1280, but merely a display that is implemented to display one or more images. In accordance with operation of the display, whether implemented as it display alone for a touchscreen display with sensors, as the one or more images are displayed, and when the user is in contact with the display (e.g., such as touching the one or more images with a digit of a hand, such as found, fingers, etc.) or it was within sufficient proximity to facilitate coupling of one or more signals that are associated with a lot of images, then the signals are coupled via the user to another computing device.

When the display 1283 is implemented as a touchscreen display with sensors 1280, while the display 1283 is rendering the frames of video into visible images, the drive-sense circuits (DSC) provide sensor signals to the electrodes 1285. When the touchscreen (e.g., which may alternatively be referred to as screen) is touched, capacitance of the electrodes 1285 proximal to the touch (i.e., directly or close by) is changed. The DSCs detect the capacitance change for affected electrodes and provide the detected change to the touchscreen processing module 1282.

The touchscreen processing module 82 processes the capacitance change of the effected electrodes to determine one or more specific locations of touch and provides this information to the processing module 1242. Processing module 1242 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

FIG. 63B is a schematic block diagram of another embodiment 1500 of a touchscreen display in accordance with the present disclosure. This diagram includes a schematic block diagram of another embodiment of a touchscreen display 1280 that includes a plurality of drive-sense circuits (DSC), the processing module 1242, a display 1283, and a plurality of electrodes 1285. The processing module 1242 is executing an operating system 1289 and one or more user applications 1291 to produce frames of data 1287. The processing module 1242 provides the frames of data 1287 to the display interface 1293. The touchscreen display 1280 operates similarly to the touchscreen display 1280 of FIG. 63A with the above noted differences.

FIG. 63C is a logic diagram of an embodiment of a method 1601 for sensing a touch on a touchscreen display in accordance with the present disclosure. This diagram includes a logic diagram of an embodiment of a method 1601 for execution by one or more computing devices for sensing a touch on a touchscreen display that is executed by one or more processing modules of one or various types (e.g., 42, 82, and/or 1248 of the previous figures). The method 1601 begins at step 1600 where the processing module generate a control signal (e.g., power enable, operation enable, etc.) to enable a drive-sense circuit to monitor the sensor signal on the electrode. The processing module generates additional control signals to enable other drive-sense circuits to monitor their respective sensor signals. In an example, the processing module enables all of the drive-sense circuits for continuous sensing for touches of the screen In another example, the processing module enables a first group of drive-sense circuits coupled to a first group of row electrodes and enables a second group of drive-sense circuits coupled to a second group of column electrodes.

The method 1601 continues at step 1602 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method 1601 continues at step 1604 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode of a user or other element. As another example, a decrease in mutual capacitance (e.g., the capacitance between a row electrode and a column electrode) is also indicative of a touch and/or presence of a user or other element near the electrodes. The processing module does this for each representation of the impedance of the electrode it receives. Note that the representation of the impedance is a digital value, an analog signal, an impedance value, and/or any other analog or digital way of representing a sensor's impedance.

The method 1601 continues at step 1606 where the processing module interprets the change in the impedance to indicate a touch and/or presence of a user or other element of the touchscreen display in an area corresponding to the electrode. For each change in impedance detected, the processing module indicates a touch and/or presence of a user or other element. Further processing may be done to determine if the touch is a desired touch or an undesired touch.

FIG. 63D is a schematic block diagram of an embodiment 1602 of a drive sense circuit in accordance with the present disclosure, this diagram includes a schematic block diagram of an embodiment of a drive sense circuit 1228-16 that includes a first conversion circuit 1610 and a second conversion circuit 1612. The first conversion circuit 1610 converts an electrode signal 1616 (alternatively a sensor signal, such as when the electrode 1285 includes a sensor, etc.) into a signal 1620 that is representative of the electrode signal and/or change thereof (e.g., note that such a signal may alternatively be referred to as a sensor signal, a signal representative of a sensor signal and or change thereof, etc. such as when the electrode 1285 includes a sensor, etc.). The second conversion circuit 1612 generates the drive signal component 1614 from the sensed signal 1612. As an example, the first conversion circuit 1610 functions to keep the electrode signal 1616 substantially constant (e.g., substantially matching a reference signal) by creating the signal 1620 to correspond to changes in a receive signal component 1618 of the sensor signal. The second conversion circuit 1612 functions to generate a drive signal component 1614 of the sensor signal based on the signal 1620 substantially to compensate for changes in the receive signal component 1618 such that the electrode signal 1616 remains substantially constant.

In an example, the electrode signal 1616 (e.g., which may be viewed as a power signal, a drive signal, a sensor signal, etc. such as in accordance with other examples, embodiments, diagrams, etc. herein) is provided to the electrode 1285 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the first conversion circuit 1610 adjusts the signal 1620 based on the receive signal component 1618, which is indicative of the impedance of the electrode and change thereof. The second conversion circuit 1612 adjusts the regulated current based on the changes to the signal 1620.

As another example, the electrode signal 1616 is provided to the electrode 1285 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 1610 adjusts the signal 1620 based on the receive signal component 1618, which is indicative of the impedance of the electrode and change thereof. The second conversion circuit 1612 adjusts the regulated voltage based on the changes to the signal 1620.

FIG. 63E is a schematic block diagram of another embodiment 1700 of a drive sense circuit in accordance with the present disclosure. this diagram includes a schematic block diagram of another embodiment of a drive sense circuit 1228 that includes a first conversion circuit 1610 and a second conversion circuit 1612. The first conversion circuit 1610 includes a comparator (comp) and an analog to digital converter 1730. The second conversion circuit 1612 includes a digital to analog converter 1732, a signal source circuit 1733, and a driver.

In an example of operation, the comparator compares the electrode signal 12116 (alternatively, a sensor signal, etc.) to an analog reference signal 1722 to produce an analog comparison signal 1724. The analog reference signal 1724 includes a DC component and/or an oscillating component. As such, the electrode signal 1716 will have a substantially matching DC component and/or oscillating component. An example of an analog reference signal 1722 is also described in greater detail with reference to FIG. 63G such as with respect to a power signal graph.

The analog to digital converter 1730 converts the analog comparison signal 1724 into the signal 1620. The analog to digital converter (ADC) 1730 may be implemented in a variety of ways. For example, the (ADC) 1730 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 1732 may be a sigma-delta DAC, a pulse width modulator DAC, a binary weighted DAC, a successive approximation DAC, and/or a thermometer-coded DAC.

The digital to analog converter (DAC) 1732 converts the signal 1620 into an analog feedback signal 1726. The signal source circuit 1733 (e.g., a dependent current source, a linear regulator, a DC-DC power supply, etc.) generates a regulated source signal 1735 (e.g., a regulated current signal or a regulated voltage signal) based on the analog feedback signal 1726. The driver increases power of the regulated source signal 1735 to produce the drive signal component 1614.

FIG. 63F is a cross section schematic block diagram of an example 1800 of a touchscreen display with in-cell touch sensors in accordance with the present disclosure. This diagram includes a cross section schematic block diagram of an example of a display 1283 (e.g., such as a touchscreen display with sensors 1283) with in-cell touch sensors, which includes lighting layers 1877 and display with integrated touch sensing layers 1879. The lighting layers 1877 include a light distributing layer 1887, a light guide layer 1885, a prism film layer 1883, and a defusing film layer 1881. The display with integrated touch sensing layers 1879 include a rear polarizing film layer 1805, a glass layer 1803, a rear transparent electrode layer with thin film transistors 1801 (which may be two or more separate layers), a liquid crystal layer (e.g., a rubber polymer layer with spacers) 1899, a front electrode layer with thin film transistors, a color mask layer 1895, a glass layer 1893, and a front polarizing film layer 1891. Note that one or more protective layers may be applied over the polarizing film layer 1891.

In an example of operation, a row of LEDs (light emitted diodes), or other light source, projects light into the light distributing player 1887, which projects the light towards the light guide 1885. The light guide includes a plurality of holes that let's some light components pass at differing angles. The prism film layer 1883 increases perpendicularity of the light components, which are then defused by the defusing film layer 1881 to provide a substantially even back lighting for the display with integrated touch sense layers 1879.

The two polarizing film layers 1805 and 1891 are orientated to block the light (i.e., provide black light). The front and rear electrode layers 1897 and 1801 provide an electric field at a sub-pixel level to orientate liquid crystals in the liquid crystal layer 1899 to twist the light. When the electric field is off, or is very low, the liquid crystals are orientated in a first manner (e.g., end-to-end) that does not twist the light, thus, for the sub-pixel, the two polarizing film layers 1805 and 1891 are blocking the light. As the electric field is increased, the orientation of the liquid crystals change such that the two polarizing film layers 1805 and 1891 pass the light (e.g., white light). When the liquid crystals are in a second orientation (e.g., side by side), intensity of the light is at its highest point.

The color mask layer 1895 includes three sub-pixel color masks (red, green, and blue) for each pixel of the display, which includes a plurality of pixels (e.g., 1440×1080). As the electric field produced by electrodes change the orientations of the liquid crystals at the sub-pixel level, the light is twisted to produce varying sub-pixel brightness. The sub-pixel light passes through its corresponding sub-pixel color mask to produce a color component for the pixel. The varying brightness of the three sub-pixel colors (red, green, and blue), collectively produce a single color to the human eye. For example, a blue shirt has a 12% red component, a 20% green component, and 55% blue component.

The in-cell touch sense functionality uses the existing layers of the display layers 1879 to provide capacitance-based sensors. For instance, one or more of the transparent front and rear electrode layers 1897 and 1801 are used to provide row electrodes and column electrodes. Various examples of creating row and column electrodes from one or more of the transparent front and rear electrode layers 1897 and 1801 is discussed in some of the subsequent figures.

FIG. 63G is a schematic block diagram of an example 1900 of a transparent electrode layer with thin film transistors in accordance with the present disclosure. This diagram includes a schematic block diagram of an example of a transparent electrode layer 1897 and/or 1801 with thin film transistors (TFT). Sub-pixel electrodes are formed on the transparent electrode layer and each sub-pixel electrode is coupled to a thin film transistor (TW). Three sub-pixels (R-red, G-green, and B-blue) form a pixel. The gates of the TFTs associated with a row of sub-electrodes are coupled to a common gate line. In this example, each of the four rows has its own gate line. The drains (or sources) of the TFTs associated with a column of sub-electrodes are coupled to a common R, B, or G data line. The sources (or drains) of the TFTs are coupled to its corresponding sub-electrode.

In an example of operation, one gate line is activated at a time and RGB data for each pixel of the corresponding row is placed on the RGB data lines. At the next time interval, another gate line is activated and the RGB data for the pixels of that row is placed on the RGB data lines. For 1080 rows and a refresh rate of 60 Hz, each row is activated for about 15 microseconds each time it is activated, which is 60 times per second. When the sub-pixels of a row are not activated, the liquid crystal layer holds at least some of the charge to keep an orientation of the liquid crystals.

FIG. 63H is a schematic block diagram of an example 2000 of a pixel with three sub-pixels in accordance with the present disclosure. This diagram includes a schematic block diagram of an example of a pixel with three sub-pixels (R-red, G-green, and B-blue). In this example, the front sub-pixel electrodes are formed in the front transparent conductor layer 1897 and the rear sub-pixel electrodes are formed in the rear transparent conductor layer 1801. Each front and rear sub-pixel electrode is coupled to a corresponding thin film transistor. The thin film transistors coupled to the top sub-pixel electrodes are coupled to a front (f) gate line and to front R, G, and B data lines. The thin film transistors coupled to the bottom sub-pixel electrodes are coupled to a rear (f) gate line and to rear R, G, and B data lines.

To create an electric field between related sub-pixel electrodes, a differential gate signal is applied to the front and rear gate lines and differential R, G, and B data signals are applied to the front and rear R, G, and B data lines. For example, for the red (R) sub-pixel, the thin film transistors are activated by the signal on the gate lines. The electric field created by the red sub-pixel electrodes is depending on the front and rear Red data signals. As a specific example, a large differential voltage creates a large electric field, which twists the light towards maximum light passing and increases the red component of the pixel.

The gate lines and data lines are non-transparent wires (e.g., copper) that are positioned between the sub-pixel electrodes such that they are hidden from human sight. The non-transparent wires may be on the same layer as the sub-pixel electrodes or on different layers and coupled using vias.

FIG. 63I is a schematic block diagram of another example 2100 of a pixel with three sub-pixels in accordance with the present disclosure. This diagram includes a schematic block diagram of another example of a pixel with three sub-pixels (R-red, G-green, and B-blue). In this example, the front sub-pixel electrodes are formed in the front transparent conductor layer 1897 and the rear sub-pixel electrodes are formed in the rear transparent conductor layer 1801. Each front sub-pixel electrode is coupled to a corresponding thin film transistor. The thin film transistors coupled to the top sub-pixel electrodes are coupled to a front (f) gate line and to front R, G, and B data lines. Each rear sub-pixel electrode is coupled to a common voltage reference (e.g., ground, which may be a common ground plane or a segmented common ground plane (e.g., separate ground planes coupled together to form a common ground plane)).

To create an electric field between related sub-pixel electrodes, a single-ended gate signal is applied to the front gate lines and a single-ended R, G, and B data signals are applied to the front R, G, and B data lines. For example, for the red (R) sub-pixel, the thin film transistors are activated by the signal on the gate lines. The electric field created by the red sub-pixel electrodes is depending on the front Red data signals.

Note that any of the various examples provided herein, or their equivalent, or other examples of computing devices operative to display one or more images may be used to facilitate communication of data from a first computing device to a second computing device via a user. Generally speaking, any desired image, when generated by a display 83, will correspondingly operate the components within the display 1283 such as the RGB data lines, the gate lines, the sub-pixel electrodes, and/or any of the respective other components within the display 1283 such as may include one or more of their respective components of the lighting layers 1877 and/or display with integrated touch sensing layers 1879 such as described with reference to FIG. 63F. As these various components operate to effectuate one or more images to be displayed on the display 1283 may be viewed as components of one or more signal generators (alternatively referred to as signal generation circuitry or signal generation circuitries) operative to generate one or more signals to be coupled from a first computing device via a user to a second computing device. For example, as the actual components within the display 1283 are operative to render one or more images, one or more signals are generated in accordance with operation of those components, and when a user is in contact with the display 1283 or within sufficient proximity to the display 1283 so as to facilitate coupling of those signals from the computing device that includes the display 1283 to the user, then one or more signals that are associated with one or more images that are displayed on the display 1283 may be coupled from the computing device that includes the display 1283 via the user to another computing device.

Note also that while certain examples described herein use a liquid crystal display (LCD) for illustration, in general, if any matrix addressed display may be implemented and operative to generate one or more signals, such as may be based on one or more images, as described herein. For example, regardless of the particular technology implemented for a particular display (e.g., whether it be a light emitting diode (LED) display, an electroluminescent display (ELD), a plasma display panel (PDP), a liquid crystal display (LCD), an LCD high performance addressing (HPA) display, an LCD thin film transistor (IF) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS), etc.), such a display that is a matrix addressed display is operative to support the functionality and capability as described herein including the generation of one or more signals, such as may be based on one or more images, as described herein.

FIG. 63J is a schematic block diagram of an embodiment 2200 of a DSC that is interactive with an electrode in accordance with the present disclosure. Similar to other diagrams, examples, embodiments, etc. herein, the DSC 1228-*a*2 of this diagram is in communication with one or more processing modules 1242. The DSC 1228-*a*2 is configured to provide a signal (e.g., a power signal, an electrode signal, transmit signal, a monitoring signal, etc.) to the electrode 1285 via a single line and simultaneously to sense that signal via the single line. In some examples, sensing the signal includes detection of an electrical characteristic of the electrode that is based on a response of the electrode 1285 to that signal. Examples of such an electrical characteristic may include detection of an impedance of the electrode 1285 such as a change of capacitance of the electrode 1285, detection of one or more signals coupled into the electrode 1285 such as from one or more other electrodes, and/or other electrical characteristics. In addition, note that the electrode 1285 may be implemented in a capacitive imaging glove in certain examples.

In some examples, the DSC 1228-*a*2 is configured to provide the signal to the electrode to perform any one or more of capacitive imaging of an element (e.g., such as a glove, sock, a bodysuit, or any portion of a capacitive imaging component associated with the user and/or operative to be worn and/or used by a user) that includes the electrode (e.g., such as a capacitive imaging glove, a capacitive imaging sock, a capacitive imaging bodysuit, or any portion of a capacitive imaging component associated with the user and/or operative to be worn and/or used by a user), digit movement detection such as based on a competitive imaging glove, inter-digit movement detection such as based on a competitive imaging glove, movement detection within a three-dimensional (3-D) space, and/or other purpose(s).

This embodiment of a DSC 1228-*a*2 includes a current source 12110-1 and a power signal change detection circuit 12112-*a*1. The power signal change detection circuit 12112-*a*1 includes a power source reference circuit 12130 and a comparator 12132. The current source 12110-1 may be an independent current source, a dependent current source, a current mirror circuit, etc.

In an example of operation, the power source reference circuit 12130 provides a current reference 12134 with DC and oscillating components to the current source 12110-1. The current source generates a current as the power signal 12116 based on the current reference 12134. An electrical characteristic of the electrode 1285 has an effect on the current power signal 12116. For example, if the impedance of the electrode 1285 decreases and the current power signal 12116 remains substantially unchanged, the voltage across the electrode 1285 is decreased.

The comparator 12132 compares the current reference 12134 with the affected power signal 12118 to produce the signal 120 that is representative of the change to the power signal. For example, the current reference signal 12134 corresponds to a given current (I) times a given impedance (Z). The current reference generates the power signal to produce the given current (I). If the impedance of the electrode 1285 substantially matches the given impedance (Z), then the comparator's output is reflective of the impedances substantially matching. If the impedance of the electrode 1285 is greater than the given impedance (Z), then the comparator's output is indicative of how much greater the impedance of the electrode 1285 is than that of the given impedance (Z). If the impedance of the electrode 1285 is less than the given impedance (Z), then the comparator's output is indicative of how much less the impedance of the electrode 1285 is than that of the given impedance (Z).

FIG. 63K is a schematic block diagram of another embodiment 2300 of a DSC that is interactive with an electrode in accordance with the present disclosure. Similar to other diagrams, examples, embodiments, etc. herein, the DSC 1228-*a*3 of this diagram is in communication with one or more processing modules 42. Similar to the previous diagram, although providing a different embodiment of the DSC, the DSC 1228-*a*3 is configured to provide a signal to the electrode 1285 via a single line and simultaneously to sense that signal via the single line. In some examples, sensing the signal includes detection of an electrical characteristic of the electrode 1285 that is based on a response of the electrode 1285 to that signal. Examples of such an electrical characteristic may include detection of an impedance of the electrode 1285 such as a change of capacitance of the electrode 1285, detection of one or more signals coupled into the electrode 1285 such as from one or more other electrodes, and/or other electrical characteristics. In addition, note that the electrode 1285 may be implemented in a capacitive imaging glove in certain examples.

This embodiment of a DSC 1228-*a*3 includes a voltage source 12110-2 and a power signal change detection circuit 112-*a*2. The power signal change detection circuit 12112-*a*2 includes a power source reference circuit 130-2 and a comparator 132-2. The voltage source 12110-2 may be a battery, a linear regulator, a DC-DC converter, etc.

In an example of operation, the power source reference circuit 130-2 provides a voltage reference 136 with DC and oscillating components to the voltage source 12110-2. The voltage source generates a voltage as the power signal 12116 based on the voltage reference 12136. An electrical characteristic of the electrode 1285 has an effect on the voltage power signal 12116. For example, if the impedance of the electrode 1285 decreases and the voltage power signal 12116 remains substantially unchanged, the current through the electrode 1285 is increased.

The comparator 12132 compares the voltage reference 12136 with the affected power signal 12118 to produce the signal 12120 that is representative of the change to the power signal. For example, the voltage reference signal 12134 corresponds to a given voltage (V) divided by a given impedance (Z). The voltage reference generates the power signal to produce the given voltage (V). If the impedance of the electrode 1285 substantially matches the given impedance (Z), then the comparator's output is reflective of the impedances substantially matching. If the impedance of the electrode 1285 is greater than the given impedance (Z), then the comparator's output is indicative of how much greater the impedance of the electrode 1285 is than that of the given impedance (Z). If the impedance of the electrode 1285 is less than the given impedance (Z), then the comparator's output is indicative of how much less the impedance of the electrode 1285 is than that of the given impedance (Z).

FIG. 63L is a schematic block diagram of an embodiment 2400 of computing devices within a system operative to facilitate coupling of one or more signals from a first computing device via a user to a second computing device in accordance with the present disclosure. In this diagram, a user is operative to interact with different respective computing devices. The user interacts with computing device 2420 and also computing device 2424 that includes a touchscreen display with sensors 1280. The computing device 2420 may be any of a variety of types including any one or more of a portable device, cell phone, smartphone, tablet, etc. in certain examples, the computing device 2420 is a device capable to be transported with the user as the user moves and changes location. However, note that in other examples, the computing device 2420 is a stationary device having a fixed location and not being a portable device per se, such as a desktop computer, a television, a set-top box, etc. such as a device that substantially remains in a given location.

As the user interacts with the computing device 2424, such as touching the touchscreen display with sensors 1280 with a finger, hand, stylist, e-pen, and/or another appropriate device to interact therewith, etc., or is within sufficiently close proximity to facilitate coupling from the user to the deep lights and a touchscreen display with sensors 1280 thereof, the computing device 2424 is operative to receive input from the user.

In an example of operation and implementation, the computing device 2420 includes a display 2422 that is operative to display one or more images thereon. The user interacts with the one or more images that are generated on the display 2422, and based on such interaction, one or more signals associated with one or more images are coupled through the user from the computing device 2420 to the computing device 2424. As described herein, when a display such as within computing device 2420 is operative to produce one or more images thereon, the hardware components of the computing device 2420 generate various signals to effectuate the rendering of the one or more images on the display 2422 of the computing device 2420. For example, in accordance with operation of the display 2422 to render the one or more images thereon, the actual hard work components of the display 2422 themselves (e.g., such as the gate lines, the data lines, the sub-pixel electrodes, etc.) include signal generation circuitry that is configured to generate the one or more signals to be coupled into the user's body. These signals are coupled via the user's body from the computing device 2420 to the computing device 2424. The touchscreen display with sensors 1280 of the computing device 2420 is configured to detect the one or more signals that are coupled via the user from the computing device 2420.

In certain samples, the computing device 2424 is implemented to include a number of electrodes 1285 of the touchscreen display with sensors 1280 such that each respective electrode 1285 is connected to or communicatively coupled to a respective drive-sense circuit (DSC)

1228. For example, a first electrode 1285 is connected to or communicatively coupled to a first DSC 1228, a second electrode 1285 is connected to or communicatively coupled to a second DSC 1228, etc.

In this diagram as well as others here and, one or more processing modules 1242 is configured to communicate with and interact with the DSC 1228. This diagram particularly shows the one or more processing modules 1242 implemented to communicate with and interact with a first DSC 1228 and up to an nth DSC 28, where n is a positive integer greater than or equal to 2, that are respectively connected to and/or coupled to electrodes 1285.

Note that the communication and interaction between the one or more processing modules 1242 and any given one of the DSCs 1228 may be implemented in via any desired number of communication pathways (e.g., generally n communication pathways, where n is a positive integer greater than or equal to one). The one or more processing modules 1242 is coupled to at least one DSC 1228 (e.g., a first DSC 1228 associated with a first electrode 1285 and a second DSC 1228 associated with a second electrode 1285). Note that the one or more processing modules 1242 may include integrated memory and/or be coupled to other memory. At least some of the memory stores operational instructions to be executed by the one or more processing modules 42. In addition, note that the one or more processing modules 1242 may interface with one or more other devices, components, elements, etc. via one or more communication links, networks, communication pathways, channels, etc. (e.g., such as via one or more communication interfaces of the computing device 2420, such as may be integrated into the one or more processing modules 1242 or be implemented as a separate component, circuitry, etc.).

Considering one of the DSCs 28, the DSC 1228 is configured to provide a signal to an electrode 1285. Note that the DSC 1228 is configured to provide the signal to the electrode and also simultaneously to sense the signal that is provided to the electrode including detecting any change of the signal. For example, a DSC 1228 is configured to provide a signal to the electrode 1285 to which it is connected or coupled and simultaneously sense that signal including any change thereof. For example, the DSC 1228 is configured to sense a signal that is capacitively coupled between the electrodes 1285 including any change of the signal. In some examples, the DSC 1228 is also configured to sense a signal that is capacitively coupled into an electrode 1285 after having been coupled via the user from the computing device 2420.

Generally speaking, a DSC 1228 is configured to provide a signal having any of a variety of characteristics such as a signal that includes only a DC component, a signal that includes only an AC component, or a signal that includes both a DC and AC component.

In addition, in some examples, the one or more processing modules 1242 is configured to provide a reference signal to the DSC 1228, facilitate communication with the DSC 1228, perform interfacing and control of the operation of one or more components of the DSC 1228, receive digital information from the DSC 1228 that may be used for a variety of purposes detecting, identifying, processing, etc. one or more signals that have been coupled from the computing device 2420 via the user to the computing device 2424 and also to interpret those one or more signals. Note that these one or more signals may be used to convey any of a variety of types of information from the computing device 2420 via the user to the computing device 2424.

Examples of some types of information that may be conveyed within these one or more signals may include any one or more of user identification information related to the user, name of the user, etc., financial related information such as payment information, credit card information, banking information, etc., shipping information such as a personal address, a business address, etc. to which one or more selected or purchase products are to be shipped, etc., and/or contact information associated with the user such as phone number, e-mail address, physical address, business card information, a web link such as a Universal Resource Location (URL), etc. Generally speaking, such one or more signals may be generated and produced to include any desired information to be conveyed from the computing device 2420 to the computing device 2424 via the user.

Other examples of other types of information that may be conveyed within these one or more signals may include any one or more of information from the computing device 2420 that is desired to be displayed on the display of the computing device 2424. For example, consider the computing device 2420 as including information therein that the user would like to display it on another screen, such as the display of the computing device 2424. Examples of such information may include personal health monitoring information, such as may be collected and provided by a smart device such as a smart watch, which monitors any one or more characteristics of the user. Examples of such characteristics may include any one or more of heart rate, EKG patterns, number of steps during a given period of time, the number of hours of sleep within a given period of time, etc. The user of such a smart device may desire to have information collected by that smart device to be displayed on another screen, such as the display of the computing device 2424.

Even other examples of types of information may be conveyed within these one or more signals may include instructional information. For example, the information provided from the computing device 2420 to the computing device 2424 may include instructional information from the computing device 2420 that is operative to instruct the computing device 2424 to perform some operation. For example, the instruction may include the direction for the computing device 2424 to retrieve information from a database, server, via one or more networks 26, such as the Internet, etc. The instruction may alternatively include the direction for the computing device 2424 two locate a particular file, perform a particular action, etc.

In some examples, such instructional information may be conveyed as tokenized information. For example, the data that is transferred from the computing device 2420 to the computing device 2424 may include a token that, when interpreted based on a tokenized communication protocol understood and used by both the computing device 2420 in the computing device 2424, instructs the computing device 2424 to perform a particular operation. This may include instructing the computing device 2424 to retrieve certain information from a database, server, via one or more networks 26, such as the Internet, etc. Alternatively, this may include instructing the computing device 2424 to go to and/or retrieve information from a particular website link, such as a web link such as a Universal Resource Location (URL), etc.

For example, the information that is conveyed within these one or more signals that are communicated from the computing device 2420 via the user to the computing device 2424 may include information that is be based on some particular communication protocol such that the information, upon being interpreted and recovered by the computing device 2424, instructs the computing device 2424 to perform some operation (e.g., locating a file, performing some action, accessing a database, displaying a particular image or particular information on its display, etc.).

Even other examples of information that is conveyed within these one or more signals that are communicated from computing device 2420 via the user to the computing device 2424 may correspond to one or more gestures that are performed by a user that is interacting with a touchscreen of the computing device 2420. For example, a particular pattern, sequence of movements, such as a signature, such as spreading two digits apart as they are in contact with the touchscreen or closing the distance between two digits as they are in contact with the touchscreen, etc. may be used to instruct the computing device 2420 include particular information within one or more signals that are coupled from the computing device 2420 via the user to the computing device 2424.

For example, consider a user having to digits in contact with an image that is displayed on the display of the computing device 2420 and spreading two digits apart has to scale or increase the size of the image being displayed on the display of the computing device 2420. Such a gesture by the user instructs the computing device 2420 to generate information that includes instruction for the computing device 2424 to scale or increase the size of the same image or another image that is being displayed on the display of the computing device 2424, and the computing device 2420 then generates one or more signals that includes such instruction and are then coupled from the computing device 2420 via the user to the computing device 2424. Similarly, a different gesture, such as a user closing the distance between two digits as they are in contact with a portion of the touchscreen that is displaying an image, made results in the computing device 2420 to generate information that includes instruction for the computing device 2424 to scale or decrease the size of the same image or another image that is being displayed on the display of the computing device 2424. In general, any desired mapping of gestures to instructions, information, etc. may be made within the computing device 2420.

With respect to the signals that are generated by the computing device 2420 accordance with displaying one or more images on the display 2422 of the computing device 2420, note that such signals may be of any of a variety of types. Various examples are described below regarding different respective images being used to produce different respective signals, based on displaying images on the display 2422 of the computing device 2420 having certain characteristics. In accordance with generating such signals by displaying images on the display 2422 of the computing device 2420, the computing device 2420 is configured to produce and transmit one or more signals having any of a number of desired properties via the user to the computing device 2424.

In addition, note that such signals may be implemented to include any desired characteristics, properties, parameters, etc. For example, a signal generated by the display of an image 2421 on the display 2422 of the computing device 2420 may be based on encoding of one or more bits to generate one or more coded bits used to generate modulation data (or generally, data). For example, one or more processing modules is included within or associated with computing device 2420. Note that the one or more processing modules implemented within or associated with the computing device 2420 may include integrated memory and/or be coupled to other memory. At least some of the memory stores operational instructions to be executed by the one or more processing modules. In addition, note that the one or more processing modules 1242 may interface with one or more other devices, components, elements, etc. via one or more communication links, networks, communication pathways, channels, etc. (e.g., such as via one or more communication interfaces of the computing device 2420, such as may be integrated into the one or more processing modules 1242 or be implemented as a separate component, circuitry, etc.).

These one or more processing modules included within or associated with computing device 2420 is configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, these one or more processing modules included within or associated with computing device 2420 is configured to process the one or more coded bits in accordance with modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In certain examples, the display 2422 of the computing device 2420 includes a display alone. In other examples, the display 2422 of the computing device 2420 includes a display with touchscreen display capability, but is not particularly implemented in accordance with electrodes 1285 that are respectively serviced by a number of respective DSCs 1228.

However, in even other examples, the display 2422 of the computing device 2420 includes a display with touchscreen display with sensors 1280 capability that is implemented in accordance with electrodes 1285 that are respectively serviced by a number of respective DSCs 1228 as described herein. For example, the display 2422 of the computing device 2420 includes a touchscreen display with sensors 1280. For example, similar to the implementation shown with respect to computing device 2424, a number of electrodes 1285 of a touchscreen display with sensors 1280 may be implemented within the computing device 2420 such that a number of respective DSCs 1228 are implemented to service the respective electrodes 1285 of such a touching display with sensors 1280 that are implemented within the computing device 2420 and also: communicate with and cooperate with one or more processing modules 1242 that may include memory and/or be coupled to memory, in a similar fashion by which such components are implemented and operated within the computing device 2424.

In accordance with implementation that is based on a display with touchscreen display with sensors 1280 capability that is implemented in accordance with electrodes 1285 that are respectively serviced by a number of respective DSCs 1228 as described herein, note that a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing modules (e.g., one or more controllers) such that the one or more DSC is/are directed by the one or more processing modules regarding which frequency or frequencies and/or which other one or more characteristics of the one or more signals to use at one or more respective times and/or in one or more particular situations.

With respect to any signal that is driven and simultaneously detected by a DSC 28, note that any additional signal that is coupled into an electrode 1285 associated with that DSC 1228 is also detectable. For example, a DSC 1228 that is associated with such electrode is configured to detect any signal from one or more other sources that may include any one or more of electrodes, touch sensors, buses, communication links, loads, electrical couplings or connections, etc. that get coupled into that line, electrode, touch sensor, bus, communication link, a battery, load, electrical coupling or connection, etc.

In addition, note the different respective signals that are driven and simultaneously sensed by one or more DSCs 1228 may be differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

In an example of operation and implementation, an application, an "app," is opened by the user on the computing device 2420 based on the user appropriately interacting with the computing device 2420 (e.g., pressing a button of the computing device 2420, such as a hard button on a side of the computing device 2420, by pressing an icon that is associated with the application that is displayed on the display 2422 of the computing device 2420, etc.), and the initiation of the operation of such an application produces an image 2421 on a display 2422 of the computing device 2420. As the image 2421 is generated and displayed on the display 2422 of the computing device 2420, one or more signals are generated by the image 2421 on the display 2422 of the computing device 2420 and are coupled into the user's body as the user is touching the image 2421 on the display 2422 of the computing device 2420 or is within sufficient proximity to facilitate coupling of signals associated with the image 2421 into the user's body.

Then, based on operation of the application, one or more signals associated with the image 2421 or coupled into the user's body, through the user's body, and are coupled into one or more of the electrodes 1285 of the touchscreen display with sensors 1280 of the computing device 2424. One or more DSCs 1228 of the computing device 2424 is configured to detect the one or more signals associated with the image 2421 that have been generated within the computing device 2420 and coupled via the user's body to the into one or more of the electrodes 1285 of the touchscreen display with sensors 1280 of the computing device 2424.

In accordance with operation of a DSC 1228 within the computing device 2424, a reference signal is used to facilitate operation of the DSC 1228 as described herein. Note that such a reference signal that provided from the one or more processing modules 1242 to a DSC 1228 in this diagram as well as any other diagram herein may have any desired form. For example, the reference signal may be selected to have any desired magnitude, frequency, phase, etc. among other various signal characteristics. In addition, the reference signal may have any desired waveform. For example, many examples described herein are directed towards a reference signal having a DC component and/or an AC component. Note that the AC component may have any desired waveform shape including sinusoid, sawtooth wave, triangular wave, square wave signal, etc. among the various desired waveform shapes. In addition, note that DC component may be positive or negative. Moreover, note that some examples operate having no DC component (e.g., a DC component having a value of zero/0). In addition, note that more the AC component may include more than one component corresponding to more than one frequency. For example, the AC component may include a first AC component having a first frequency and a second AC component having a second frequency. Generally speaking, the AC component may include any number of AC components having any number of respective frequencies.

Based on coupling of the one or more signals associated with the image 2421, via the user's body, and into one or more of the electrodes 1285 of the touchscreen display with sensors 1280 of the computing device 2424 will be affected by those one or more signals. The one or more DSCs 1228 that is configured to interact with and service the one or more electrodes 1285 of the touchscreen display with sensors 1280 of the computing device 2424 into which the one or more signals associated with the image 2421 are coupled is also configured to detect those one or more signals associated with the image 2421 such as based on any change of signals that are driven to the one or more electrodes 1285 of the touchscreen display with sensors 1280 of the computing device 2424 and simultaneously sensed by the one or more DSCs 1228 within the computing device 2424.

From certain perspectives, this diagram provides an illustration of the communication system that facilitates communication from the computing device 2420 to the computing device 2424, and vice versa if desired, using the user as the communication channel, the communication medium, etc. In addition, note that communication may be made between the computing device 2420 and the computing device 2424 via alternative means as also described herein including via one or more communication systems, communication networks, etc. with which the computing device 2420 and the computing device 2424 are configured to interact with and communicate (e.g., a cellular telephone system, a wireless communication system, satellite communication system, a wireless local area network (WLAN), a wired communication system, a local area network (LAN), a cable-based communication system, fiber-optic communication system, etc.).

In an example of operation and implementation, the computing device 2420 includes signal generation circuitry. When enabled, the signal generation circuitry operably coupled and configured to generate a signal that includes information corresponding to a user and/or an application that is operative within the computing device. Also, the signal generation circuitry operably coupled and configured to couple the signal into the user from a location on the computing device based on a bodily portion of the user being in contact with or within sufficient proximity to the location on the computing device that facilitates coupling of the signal into the user. Also, note that the signal is coupled via the user to computing device 2424 that includes a touch-screen display that is operative to detect and receive the signal based on another bodily portion of the user being in contact with or within sufficient proximity to the touch-screen display of the other computing device that facilitates coupling of the signal from the user.

In some examples, the computing device includes a display and/or a touchscreen display that is operative as the signal generation circuitry. For example, the computing device 2420 includes a display that includes certain hardware components. Examples of such hardware components may include a plurality of pixel electrodes coupled via a plurality of lines (e.g., gate lines, data lines, etc.) to one or more processing modules. When enabled, the display is operably coupled and configured to display an image within at least a portion of the display based on image data associated with operation of the application that is operative within the computing device. In such an implementation, the signal generation circuitry includes at least some of the plurality of pixel electrodes and at least some of the plurality of lines of the display that are operative to facilitate display the image within the at least a portion of the display.

Also, in certain examples, the computing device includes memory that stores operational instructions and one or more processing modules that is operably coupled to the display and the memory. Wherein, when enabled, the one or more processing modules is configured to execute the operational instructions to generate the image data based on operation of the application within the computing device that is initiated based on input from the user to the computing device. The one or more processing modules is also configured to execute the operational instructions to provide the image data to the display via a display interface to be used by the display to render image within the at least a portion of the display.

In some examples, the display includes a resolution that specifies a number of pixel rows and is operative based on a frame refresh rate (FRR). A gate scanning frequency of the display is a product resulting from the number of pixel rows multiplied by the FRR, and a frequency of the signal is a sub-multiple of a gate scanning frequency that is the gate scanning frequency divided by a positive integer that is greater than or equal to 2.

In even other examples, the frequency of the signal is a sub-multiple of the gate scanning frequency that is one-half of the gate scanning frequency multiple by a fraction N/M, where N is a first positive integer that is greater than or equal to 2, and M is a second positive integer that is greater than or equal to 2 and also greater than N.

Examples of the location on the computing device may include any one or more of at least a portion of a display of the computing device, a touchscreen display of the computing device, a button of the computing device, a frame of the computing device, and/or a ground plane of the computing device.

Also, examples of the information corresponding to the user and/or the application that is operative within the computing device may include any one or more of user identification information related to the user, financial related information associated with the user, shipping information associated with the user, and/or contact information associated with the user.

Moreover, in certain specific examples, the user identification information related to the user includes any one or more of a name of the user, a username of the user, a phone number of the user, an e-mail address of the user, a personal address of the user, a business address of the user, and/or business card information of the user. Also, the financial related information associated with the user includes any one or more of payment information of the user, credit card information of the user, or banking information of the user. The shipping information associated with the user includes any one or more of a personal address of the user and/or a business address of the user. Also, the contact information associated with the user includes any one or more of a phone number of the user, an e-mail address of the user, a personal address of the user, a business address of the user, and/or business card information of the user.

In some particular examples, the touchscreen display of the other computing device includes a plurality of sensors and a plurality of drive-sense circuits (DSCs), wherein, when enabled, a DSC of the plurality of DSCs is operably coupled and configured to provide a sensor signal via a single line to a sensor of the plurality of sensors and simultaneously to sense the sensor signal via the single line. Note that the sensing of the sensor signal includes detection of an electrical characteristic of the sensor signal that includes coupling of the signal from the user into the sensor of the plurality of sensors. Also, the DSC of the plurality of DSCs is operably coupled and configured to generate a digital signal representative of the electrical characteristic of the sensor signal.

In some implementations of the DSC, the DSC includes a power source circuit operably coupled and configured to the sensor of the plurality of sensors. When enabled, the power source circuit is operably coupled and configured to provide the sensor signal via the single line to the sensor of the plurality of sensors. Also, the sensor signal includes a DC (direct current) component and/or an oscillating component. The DSC also includes a power source change detection circuit that is operably coupled and configured to the power source circuit. When enabled, the power source change detection circuit is configured to detect an effect on the sensor signal that is based on the coupling of the signal from the user into sensor of the plurality of sensors.

In some specific examples of the DSC, the power source circuit includes a power source to source a voltage and/or a current to the sensor of the plurality of sensors via the single line. Also, the power source change detection circuit included a power source reference circuit configured to provide a voltage reference and/or a current reference. The DSC also includes a comparator configured to compare the voltage and/or the current provided to the sensor of the plurality of sensors to the voltage reference and/or the current reference, appropriately such as voltage to voltage reference and current to current reference, to produce the sensor signal.

In an example of operation and implementation, the computing device 2420 includes a touchscreen display that includes a plurality of sensors and a plurality of drive-sense circuits (DSCs). When enabled, a DSC of the plurality of DSCs is operably coupled and configured to provide a first signal via a single line to a sensor of the plurality of sensors and simultaneously to sense the first signal via the single line, wherein sensing of the first signal includes detection of an electrical characteristic of the first signal. The DSC is also operably coupled and configured to generate a digital signal representative of the electrical characteristic of the first signal.

The computing device 2420 also includes signal generation circuitry. When enabled, the signal generation circuitry is operably coupled and configured to generate a second signal that includes information corresponding to a user and/or an application that is operative within the computing device 2420. The signal generation circuitry is operably coupled and configured to couple the second signal into the user from a location on the computing device 2420 based on a bodily portion of the user being in contact with or within sufficient proximity to the location on the computing device 2420 that facilitates coupling of the second signal into the user, wherein the second signal is coupled via the user to another computing device 2424 that includes another that is operative to detect and receive the second signal based on another bodily portion of the user being in contact with or within sufficient proximity to the touchscreen display of the another computing device 2424 that facilitates coupling of the second signal from the user.

FIG. 63M is a schematic block diagram of another embodiment 2500 of computing devices within a system operative to facilitate coupling of one or more signals from a first computing device via a user to a second computing device in accordance with the present disclosure. This diagram has similarities to the previous diagram with at least one difference being that the computing device 2420 includes one or more buttons implemented thereon. For example, the computing device 2420 includes a button 2523 that is configured to produce a couple one or more signals into the user's body. In some examples, the button 2523 includes a hard button on the computing device 2420 (e.g., such as having similar shape, style, etc., such as a power on or off button, a volume up or down button, a display intensity increase or decrease button, a dimmer button, and/or any other button of the computing device 2420, etc.).

As the user interacts with the button 2523 of the computing device 2420 (e.g., by touching the button 2523 of the computing device 2420 with a finger, a thumb, a hand, etc. or alternatively being within sufficiently close proximity to the button 2523 of the computing device 2420 as to facilitate coupling from the button 2523 of the computing device 2420 into the body of the user), one or more signals is coupled into the body of the user.

In an example of operation and implementation, an application, an "app," is opened by the user on the computing device 2420 based on the user appropriately interacting with the computing device 2420 (e.g., pressing the button 2523 of the computing device 2420, by pressing an icon that is associated with the application that is displayed on the display 2422 of the computing device 2420, etc.), and the initiation of the operation of such an application operates to produce one or more signals that is coupled via the button 2523 of the computing device 2420 into the body of the user.

In certain examples, one or more signal generators, signal generation circuitry, and/or one or more processing modules implemented is connected to or communicatively coupled to the button 2523 and is operative to generate one or more signals to be coupled from a first computing device via a user to a second computing device. For example, based on operation of the application, the one or more signal generators and/or one or more processing modules is configured to generate one or more signals that are coupled to the button 2523, and when a user is in contact with the button 2523 or within sufficient proximity to the button 2523 so as to facilitate coupling of those signals from the computing device that includes button 2523 to the user, then one or more signals that are associated with the button 2523 are be coupled from the computing device that includes the button 2523 via the user to another computing device.

Then, based on operation of the application, one or more signals associated with the image 2421 or coupled into the user's body via the button 2523, through the user's body, and are coupled into one or more of the electrodes 1285 of the touchscreen display with sensors 1280 of the computing device 2424. One or more DSCs 1228 of the computing device 2424 is configured to detect the one or more signals associated with the image 2421 that have been generated within the computing device 2420 and coupled via the user's body to the into one or more of the electrodes 1285 of the touchscreen display with sensors 1280 of the computing device 2424.

In addition, while the use of a button 2523 is used in certain examples herein, note that any desired element or component of the computing device 2420 may alternatively be the means via which one or more signals is coupled into the user. For example, one or more signals that may be generated by any one or more signal generators, signal generation circuitry, etc. such as one or more processing modules 1242, a controller, an integrated circuit, an oscillator, etc. may be coupled into the user using any desired component of the computing device 2420 that may be located at any desired location on the computing device 2420 such as a button of the device, the frame of the device, a ground plane of the device, and/or some other location on the computing device 2420, etc.

Several of the following diagrams show various the embodiments, examples, etc., by which information may be conveyed from the first computing device to a second computing device via a user. In some instances, different information is provided via different images, buttons, pathways via the user, etc.

FIG. 63N is a schematic block diagram of an embodiment 2600 of coupling of one or more signals from a first computing device, such as from an image displayed by the computing device, via a user to a second computing device in accordance with the present disclosure. This diagram shows a left-hand and right-hand of the user that are respectively interacting with the first computing device 2420 and a second computing device 2424. On a display of the first computing device 2420, an image 2421 is being displayed, and a thumb of the user is shown as being in contact with or within sufficient proximity of the image 2421 as to facilitate coupling of one or more signals associated with the image 2421 into the user's body. The signals are coupled through the user's body (e.g., via a digit of the user, such as a thumb of the user as shown in the second, and into the body of the user). The signals are coupled through the user's body and also into a touchscreen display with sensors 1280 of the second computing device 2424. In some instances, a particular image 2423 is displayed on the touchscreen display with sensors 1280 of the second computing device 2424, and the user is in contact with or within sufficient proximity of the image 2423 as to facilitate coupling of the one or more signals associated with the image 2421 that have been coupled through the user's body into a portion of the touchscreen display with sensors 1280 of the second computing device 2424 and specifically in a location of the image 2423.

In an example of operation and implementation, consider electrodes 1285 that have at least portions thereof underneath the portion of the touchscreen display with sensors 1280 that is displaying the image 2423. Those particular electrodes 1285 are configured to detect the one or more signals associated with the image 2421 that have been coupled through the user's body into a portion of the touchscreen display with sensors 1280 of the second computing device 2424 and specifically in a location of the image 2423. In this example, note that a particular portion of the touchscreen display with sensors 1280 of the second computing device 2424, specifically that associated with the image 2423, is the area within which the one or more signals associated with the image 2421 that have been coupled through the user's body are targeted. Note that the image 2423 may be associated with any of a number of items, such as an application being nm on the computing device 2424, a particular object that is displayed pictorially (e.g., such as using a photo, a character, an emoji, textual description, or some other visual indicator of a particular object) and that is selected by the user on the touchscreen display with sensors 1280 of the second computing device 2424. This example corresponds to an embodiment by which information is conveyed from the first computing device 2420 a specific area or location of the second computing device 2424.

In other examples, note that the user is in contact with or within sufficient proximity of the computing device 2424 as to facilitate coupling of those one or more signals associated with the image 2421 that have been coupled through the user's body to any of the electrodes 1285 that are implemented within the touchscreen display with sensors 1280 of the second computing device 2424. For example, there may be instances in which the coupling of the one or more signals associated with the image 2421 that have been coupled through the user's body to any portion of the second computing device 2424 is sufficient as to facilitate communication and to convey information from the first computing device 2420 to the second computing device 2424.

In addition, with respect to this diagram and others herein, note that the location of an image, such as image 2421, may be made based on the operation of the first computing device 2420 itself, or based on detection of a touch of a user on a touchscreen of the first computing device 2420 (or detection of a user be in within sufficient proximity of the touchscreen of the first computing device 2420). In some examples, the image 2421 is placed at a particular location based on operation of the first computing device 2420 without consideration of user interaction with the touchscreen of the first computing device 2420. Consider the image 2421 being displayed on a display of the first computing device 2420, and the user interacts with that image by touching, or coming within sufficiently close proximity to the image 2421, as to facilitate coupling of one or more signals associated with the image 2421 into the user's body.

In other examples, the touchscreen of the first computing device 2420 detects the presence of the user, and the display of the first computing device 2420 displays the image 2421 at a location associated with the presence of the user with respect to the touchscreen of the first computing device 2420. For example, as the user interacts with the touchscreen of the first computing device 2420 (e.g., at any desired particular location on the entirety of the touchscreen of the first computing device 2420), the display then displays the image 2421 at a location that corresponds to where the user is interacting with the touchscreen of the first computing device 2420.

FIG. 63O is a schematic block diagram of an embodiment 2700 of coupling of one or more signals from a first computing device, such as from a button of the computing device, via a user to a second computing device in accordance with the present disclosure. This diagram is similar to the prior diagram with at least one difference being that the button 2523 that is implemented on the computing device 2420 is the pathway via which one or more signals are coupled from the first computing device 2420 to the second computing device 2424 via the user. In this example, a portion of the user is in contact with or within sufficient proximity of the button 2523 of the computing device 2420 as to facilitate coupling of those one or more signals from the button 2523 into the user body (e.g., in this diagram, particularly shown as the thumb of the user, though any portion of the user's body may alternatively be used such as a different digit of the user, another bodily portion of the user, etc.).

Certain of the following diagrams show different embodiments, examples, etc. by which one or more signals may be coupled into or out of a user via one or more respective pathways and based on one or more respective images, buttons, etc. Note that while certain of the examples show one or more signals being coupled into a user's body from the first computing device 2420, note that the complementary operation of one or more signals being coupled from the user's body into the first computing device 2420 may alternatively be performed in different examples. Also, note that while many of the examples use the first computing device 2420, another computing device such as a second computing device 2424 may alternatively be implemented to facilitate similar operation.

In this example, the first computing device 2420 includes signal generation circuitry 2710. For example, such signal generation circuitry 2710 may be implemented using any one or more components capable of generating one or more signals that may be coupled into a user of the first computing device 2420 at one or more locations on the first computing device 2420. Examples of such signal generation circuitry 2710 may include any one or more of controller circuitries of the first computing device 2420 (e.g., such as a first controller circuitry implemented to control display operations of a display 1283 and a second controller circuitry implemented to control touchscreen operations within a touchscreen display with sensors 1280).

Additional examples of such signal generation circuitry 2710 may include processing module(s) of various types within the first computing device 2420. Examples of such processing module(s) may include one or more processing modules 1242 implemented to control both the display operations and touch sensing operations within a touchscreen display with sensors 1280, a touchscreen processing module 82 implemented to control only the touch sensing operations within a touchscreen display with sensors 1280, and/or more processing modules 1242 and/or a video graphics processing module 1248 implemented to control only the display operations within a touchscreen display with sensors 1280, etc. such as described with reference to FIG. 63A and FIG. 63B.

Other examples of such signal generation circuitry 2710 may include one or more DSCs 1228 that are coupled respective to one or more electrodes 1285 of a touchscreen display with sensors. For example, a DSC 1228 is configured to operate as signal generation circuitry 2710 that is operative to generate and transmit one or more signals that may be coupled into a user of the first computing device 2420 at one or more locations on the first computing device 2420 (e.g., via one or more electrodes 1285 of the touchscreen). In some examples, multiples DSCs 1228 are configured to operate as signal generation circuitry 2710 that is operative to generate and transmit one or more signals that may be coupled into a user of the first computing device

2420 at one or more locations on the first computing device 2420 (e.g., via one or more electrodes 1285 of the touchscreen).

Even other examples of such signal generation circuitry 2710 may include an oscillator, a mixer, etc. and/or any other circuitry operative to generate a signal may be used within the first computing device 2420. In even other examples, the hardware components of a display of the first computing device 2420 that operative to render the one or more images on a display 1283 of the first computing device 2420 constitute the generation circuitry 2710 (e.g., such as the gate lines, the data lines, the sub-pixel electrodes, etc. of the display 1283 are the signal generation circuitry 2710 that is configured to generate the one or more signals to be coupled into the user's body).

Also, the one or more signals generated by the signal generation circuitry 2710 may have any of a variety of forms. For example, the one or more signals may include signals having a DC component and/or an AC component. Note that the AC component may have any desired waveform shape including sinusoid, sawtooth wave, triangular wave, square wave signal, etc. among other waveform shapes.

In addition, regardless of the manner or mechanism by which the one or more signals are generated, such one or more signals may be coupled into the user using any desired location of the first computing device 2420 (e.g., a button, frame, ground plane, and/or some other location on the first computing device 2420, etc.).

FIG. 63P is a schematic block diagram of an embodiment 2801 of coupling of one or more signals from a computing device via a user, or alternatively, from a user into a computing device, in accordance with the present disclosure. In this diagram, an image 2421 is shown as being displayed on a display of the first computing device 2420. One or more signals associated with the image 2421 is coupled into and through the user's body based on at least a portion of the user's body being in contact with or within sufficient proximity of the image 2421 as to facilitate coupling of the one or more signals associated therewith into the user's body. This diagram shows one or more signals being coupled into the user's body from a sub-portion of the display of the first computing device 2420 that is less than the entirety of the display of the first computing device 2420. Incidentally, that particular sub-portion of the display of the first computing device 2420 is associated with an image 2421 that is being displayed on the display of the first computing device 2420.

FIG. 63Q is a schematic block diagram of an embodiment 2802 of coupling of one or more signals from a computing device via a user, or alternatively, from a user into a computing device, in accordance with the present disclosure. In this diagram, any image 2425 is shown as being displayed on the entirety of the display of the first computing device 2420. One or more signals associated with the image 2425 that occupies the entirety of the display of the first computing device 2420 is coupled into and through the user's body based on at least a portion of the user's body being in contact with or within sufficient proximity of the image 2425 as to facilitate coupling of the one or more signals associated therewith into the user's body.

As can be seen in this diagram, three respective digits of a hand of the user are shown as being in contact with or within sufficient proximity of the image 2425 as to facilitate coupling of the one or more signals associated with the image 2425 into the user's body, and similar information associated with the image 2425 is transmitted via a different respective pathways associated with the three respective digits of the hand of the user. This diagram shows an example where one or more signals are coupled through two or more pathways associated with the user (e.g., a first pathway associated with coupling of one or more signals via a first digit of a hand of user, a second passageway associated with coupling of one or more signals via a second digit of the end of the user, etc.). Such an application may be desirable in certain instances where one or more backup pathways or redundancy of coupling similar information is used to improve the overall performance of the system. For example, consider an example during which there has been a detective failure or poor performance of coupling of one or more signals via the user. Such an implementation of providing multiple respective pathways via the user is operative to provide for redundancy and backup to ensure effective coupling of the one or more signals into the user's body.

FIG. 63R is a schematic block diagram of an embodiment of a method 3901 for execution by one or more computing devices in accordance with the present disclosure. The method 3901 operates in step 3910 by generating a signal using a computing device that includes information corresponding to a user and/or and application (e.g., an application operative within the computing device).

In some alternative variants of the method 3901, the method 3901 also operates in step 3912 by generating the signal using signal generation circuitry, processing module(s), etc. of the computing device. For example, a signal generator, one or more processing modules, an oscillator, a mixer, etc. and/or any other circuitry operative to generate a signal may be used within the computing device.

In other alternative variants of the method 3901, the method 3901 operates in step 3914 by generating the signal using hardware components of a display and/or a touchscreen display (e.g., pixel electrodes, lines such as gate lines, data lines, etc.). For example, the actual hardware components of a display and/or a touchscreen display of the computing device serve as the mechanism to generate the signal. In such an example, the hardware components of the display and/or the touchscreen display may be viewed as being signal generation circuitry that operates to generate the signal itself.

The method 3901 also operates in step 3920 by coupling the signal into a user from one or more locations on the computing device. For example, the signal is coupled into the body of the user based on the user being in contact with or within sufficient proximity to a location on the computing device that is generating the signal. This signal is coupled into the body of the user and may then be coupled into another computing device. For example, in some alternative variants of the method 3901, the method 3901 also operates in step 3939 by transmitting the signal via the user to another computing device that is operative to detect and receive the signal. In certain examples, this other computing device may include a device with a touchscreen and/or touchscreen display. Also, the sensors, electrodes, etc. of the touchscreen and/or touchscreen display may be operative in conjunction with one or more DSCs as described herein.

FIG. 63S is a schematic block diagram of another embodiment of a method 3902 for execution by one or more computing devices in accordance with the present disclosure. The method 3902 operates in step 3911 by receiving, via a user, a signal using a computing device (e.g., a signal that is generated by another computing device and coupled into and through the body of the user to the computing device, the signal including information corresponding to the user and/or and application such as an application operative within the computing device).

In some alternative variants of the method 3902, the method 3902 also operates in step 3913 by detecting the signal using a touchscreen and/or touchscreen display with electrodes, sensors, etc.

The method 3902 operates in step 3921 by processing the signal (e.g., the modulating, decoding, interpreting, etc.) to recover the information corresponding to the user and/or and application. In some alternative variants of the method 3902, the method 3902 also operates in step 3912 by operating on the information corresponding to the user and/or the application in accordance with (e.g., effectuating a purchase and/or financial transaction, receiving and storing such information, etc.). Generally speaking, depending on the type of information being conveyed to the computing device from the other computing device, the computing device operates to use the information that has been recovered in accordance with one or more functions. The types of functions may be of any of the variety of types. Examples of such types of functions may include any one or more of ordering of one or more particular food items from a menu that is displayed on a display and/or a touchscreen display of the computing device, selecting one or more items for purchase that are displayed on the display and/or the touchscreen display of the computing device, exchanging business card information, providing a shipping address for one or more items that have been purchased, completing a financial transaction such as payment of money, transfer of funds, etc.

FIGS. 64A-64BF present other embodiments of computing devices, touchscreen displays, processing modules, drive sense circuits, and other features. Some or all features and/or functionality of the computing devices, touchscreen displays, processing modules, drive sense circuits, and other features presented in FIGS. 64A-64BF can be utilized to implement any other embodiments of the computing devices, touchscreen displays, processing modules, drive sense circuits, and other corresponding features described herein. For example, the detection and identification of touch-based and/or touchless gestures to facilitate corresponding movement and/or action of game elements of game state data and corresponding display data displayed by an interactive display device as described in conjunction with FIGS. 61A-62E can be performed based on implementing some or all features and/or functionality of the of computing devices, touchscreen displays, processing modules, drive sense circuits, and other features of FIGS. 64A-64BF. For example, the interactive display device 10 can be implemented via a computing device 3114 and/or 18, where capacitance imaging data is captured based on corresponding electrical characteristics captured by the DSCs of the interactive display device 10, and where the capacitance imaging data is processed via some or all functionality described in conjunction with FIGS. 64A-64BF, for example, via processing modules 42, to render identification of various types of touch-based and/or touchless gestures by a user while interacting with interactive display device 10 in conjunction with playing a game, where the display data is manipulated accordingly in conjunction with corresponding updates of the game state data as described previously.

FIG. 64A is a schematic block diagram of an embodiment of a computing device 3112 and/or 14 (e.g., any one of 3112-1 through 3112-*x*). The computing device 3112 and/or 3114 includes a touch screen 16, a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

The touch screen 16 includes a touch screen display 80, a plurality of sensors 30, a plurality of drive-sense circuits (DSC), and a touch screen processing module 82. In general, the sensors (e.g., electrodes, capacitor sensing cells, capacitor sensors, inductive sensor, etc.) detect a proximal touch of the screen and/or a touchless indication in proximity to the screen. For example, when one or more fingers touches the screen or come in close proximity (e.g. within 1 mm, 2 mm, 3 mm or some other distance threshold), capacitance of sensors proximal to the finger(s) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). As used herein, “touch” or “touch(es)”, include one or more proximal touches where finger(s) or other object(s) comes into physical contact with a surface of the touch screen 16 as well as one or more touchless indications where finger(s) or other object(s) come into close proximity with the surface of the touch screen 16. This information is inputted to the processing module 42 for processing as an input. For example, a touch or touchless indication represents a selection of a button on screen, a scroll function, a zoom in-out function, etc.

Each of the main memories 44 includes one or more Random Access Memory (RAM) integrated circuits, or chips. For example, a main memory 44 includes four DDR4 (4th generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 64AG and the I/O and/or peripheral control module 52. An output device 74 includes a speaker, etc. An output interface module 64AG includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 64B is a schematic block diagram of another embodiment of a computing device 3118 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 3190, a plurality of sensors 30, a plurality of actuators 32, a plurality of drive-sense circuits (DSC), a touch screen processing module 82, and a tactile screen processing module 3192.

Computing device 3118 operates similarly to computing device 3114 of FIG. 64A with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 3192, which may be a stand-alone processing module or integrated into processing module 42. The drive-sense circuits (DSC) convert the tactile data into drive-actuate signals and provide them to the appropriate actuators to create the desired tactile feel on the screen 20.

FIG. 64C is a schematic block diagram of an example of a computing device 3114 or 18 that includes the components of FIG. 64A and/or FIG. 3. Only the processing module 42, the touch screen processing module 82, the display 80 or 90, the electrodes 85, and the drive sense circuits (DSC) are shown.

In an example of operation, the touch screen processing module 82 receives sensed signals from the drive sense circuits and interprets them to identify a finger or pen touch. In this example, there are no touches. The touch screen processing module 82 provides touch data (which includes location of touches, if any, based on the row and column electrodes having an impedance change due to the touch(es)) to the processing module 42.

The processing module 42 processes the touch data to produce a capacitance image 232 of the display 80 or 90. In this example, there are no touches or touchless indications, so the capacitance image 232 is substantially uniform across the display. The refresh rate of the capacitance image ranges from a few frames of capacitance images per second to a hundred or more frames of capacitance images per second. Note that the capacitance image may be generated in a variety of ways. For example, the self-capacitance and/or mutual capacitance of each touch cell (e.g., intersection of a row electrode with a column electrode) is represented by a color. When the touch cells have substantially the same capacitance, their representative color will be substantially the same. As another example, the capacitance image is topological mapping of differences between the capacitances of the touch cells.

FIG. 64D is a schematic block diagram of another example of a computing device that is substantially similar to the example of FIG. 64C with the exception that the touch or touchless indication data includes two touches. As such, the touch data generated by the touch screen processing module 82 includes the location of two touches or touchless indications based on effected rows and columns. The processing module 42 processes the touch data to determine the x-y coordinates of the touches on the display 80 or 90 and generates the capacitance image, which includes the touches.

FIG. 64E is a logic diagram of an embodiment of a method for generating a capacitance image of a touch screen display that is executed by the processing module 42 and/or 82. The method begins at step 1240 where the processing module enables (for continuous or periodic operation) the drive-sense circuits to provide a sensor signals to the electrodes. For example, the processing module 42 and/or 82 provides a control signal to the drive sense circuits to enable them. The control signal allows power to be supplied to the drive sense circuits, to turn-on one or more of the components of the drive sense circuits, and/or close a switch coupling the drive sense circuits to their respective electrodes.

The method continues at step 1242 where the processing module receives, from the drive-sense circuits, sensed indications regarding (self and/or mutual) capacitance of the electrodes. The method continues at step 1244 where the processing module generates a capacitance image of the display based on the sensed indications. As part of step 1244, the processing module stores the capacitance image in memory. The method continues at step 1246 where the processing module interprets the capacitance image to identify one or more proximal touches (e.g., actual physical contact or near physical contact) of the touch screen display.

The method continues at step 1248 where the processing module processes the interpreted capacitance image to determine an appropriate action. For example, if the touch(es) corresponds to a particular part of the screen, the appropriate action is a select operation. As another example, of the touches are in a sequence, then the appropriate action is to interpret the gesture and then determine the particular action.

The method continues at step 1250 where the processing module determines whether to end the capacitance image generation and interpretation. If so, the method continues to step 1252 where the processing module disables the drive sense circuits. If the capacitance image generation and interpretation is to continue, the method reverts to step 1240.

FIG. 64F is a schematic block diagram of an example of generating capacitance images over a time period. In this example, two touches are detected at time t0 and move across and upwards through the display over times t1 through t5. The movement corresponds to a gesture or action. For instance, the action is dragging a window across and upwards through the display.

FIG. 64G is a logic diagram of an embodiment of a method for identifying desired and undesired touches using a capacitance image that is executed by processing module 42 and/or 82. The method starts are step 1260 where the processing module detects one or more touches (or touchless indications). The method continues at step 1262 where the processing module determines the type of touch (including touchless indication) for each detected touch. For example, a desired touch is a finger touch or a pen touch or a touchless indication by a finger or a pen. As a further example, an undesired touch is a water droplet, a side of a hand, and/or an object.

The method continues at step 1264 where the processing module determines, for each touch, whether it is a desired or undesired touch. For example, a desired touch or touchless indication of a pen and/or a finger will have a known effect on the self-capacitance and mutual-capacitance of the effected electrodes. As another example, an undesired touch will have an effect on the self-capacitance and/or mutual-capacitance outside of the know effect of a finger and/or a pen. As another example, a finger touch will have a known and predictable shape, as will a pen touch. An undesired touch will have a shape that is different from the known and desired touches.

If the touch (or touchless indication) is desired, the method continues at step 1266 where the processing module continues to monitor the desired touch. If the touch is undesired, the method continues at step 1268 where the processing module ignores the undesired touch.

FIG. 64H is a schematic block diagram of an example of using capacitance images to identify desired and undesired touches. In this example, the desired pen touch 270 will be processed and the undesired hand touch 272 will be ignored.

FIG. 64I is a schematic block diagram of another example of using capacitance images to identify desired and undesired touches. In this example, the desired finger touch 276 will be processed and the undesired water touch 274 will be ignored. The undesired water touch 274 would not produce a change to the self-capacitance of the effected electrodes since the water does not have a path to ground and the same frequency component is used for self-capacitance for activated electrodes.

FIG. 64J is a schematic block diagram of an electrical equivalent circuit of two drive sense circuits coupled to two electrodes without a finger touch or touchless indication. The drive sense circuits are represented as dependent current sources, the self-capacitance of a first electrode is referenced as $C_{p1}$, the self-capacitance of the second electrode is referenced as $C_{p2}$, and the mutual capacitance between the electrodes is referenced as $C_{m\_0}$. In this example, the current source of the first drive sense circuit is providing a controlled current (I at f1) that includes a DC component and an oscillating component, which oscillates at frequency f1. The current source of the second drive sense circuit is providing a controlled current (I at f1 and at f2) that includes a DC component and two oscillating components at frequency f1 and frequency f2.

The first controlled current (I at f1) has one components: $i1_{Cp1}$ and the second controlled current (I at f1 and f2) has two components: $i1{+}2_{Cp2}$ and $i2_{Cm\_0}$. The current ratio between the two components for a controlled current is based on the respective impedances of the two paths.

FIG. 64K is a schematic block diagram of an electrical equivalent circuit of two drive sense circuits coupled to two electrodes as shown in FIG. 64J, but this figure includes a finger touch or touchless indication. The finger touch or touchless indication is represented by the finger capacitances (Cn and Ca), which are in parallel with the self-capacitance ($C_{p1}$ and $C_{p2}$). The dependent current sources are providing the same levels of current as in FIG. 64J (I at f1 and I at f1 and f2).

In this example, however, more current is being directed towards the self-capacitance in parallel with the finger capacitance than in FIG. 64J. Further, less current is being directed towards the mutual capacitance ($C_{m\_1}$) (i.e., taking charge away from the mutual capacitance, where C=Q/V). With the self-capacitance effectively having an increase in capacitance due to the finger capacitance, its impedance decreases and, with the mutual-capacitance effectively having a decrease in capacitance, its impedance (magnitude) increases.

The drive sense circuits can detect the change in the magnitude of the impedance of the self-capacitance and of the mutual capacitance when the change is within the sensitivity of the drive sense circuits. For example, V=I*Z, I*t=C*V, and the magnitude of Z=1/2πfC (where V is voltage, I is current, Z is the impedance, t is time, C is capacitance, and f is the frequency), thus the magnitude of V=the magnitude of I*1/2πfC. If the change between C is small, then the change in V will be small. If the change in V is too small to be detected by the drive sense circuit, then a finger touch or touchless indication will go undetected. To reduce the chance of missing a touch or touchless indication due to a thick protective layer, the voltage (V) and/or the current (I) can be increased. As such, for small capacitance changes, the increased voltage and/or current allows the drive sense circuit to detect a change in impedance. As an example, as the thickness of the protective layer increases, the voltage and/or current is increased by 2 to more than 100 times.

FIG. 64L is a schematic block diagram of an electrical equivalent circuit of a drive sense circuit coupled to an electrode without a finger touch or touchless indication. This similar to FIG. 64J, but for just one drive sense circuit and one electrode. Thus, the current source of the first drive sense circuit is providing a controlled current (I at f1) that includes a DC component and an oscillating component, which oscillates at frequency f1 and the first controlled current (I at f1) has two components: $\mathbf{i1}_{Cp1}$ and $\mathbf{i1}_{Cf1}$.

FIG. 64M is an example graph that plots finger capacitance verses protective layer thickness of a touch screen display 250. As shown, as the thickness increases, the finger capacitance decreases. This effects changes in the mutual-capacitance as shown in FIG. 64N and in self-capacitance as shown in FIG. 64O.

FIG. 64N is an example graph that plots mutual capacitance verses protective layer thickness and drive voltage verses protective layer thickness of a touch screen display 150. As shown, as the thickness increases, the difference between the mutual capacitance without a touch or touchless indication and mutual capacitance with a touch decreases. In order for the decreasing difference to be detected, the voltage (or current) sourced to the electrode increases substantially inversely proportion to the decrease in finger capacitance.

FIG. 64OA is a cross section schematic block diagram of another example of a touch screen display 250 having a protective transparent layer 402. This embodiment is similar to the embodiment of FIG. 43 with the exception that this embodiment includes a single sensor layer 255. Similar elements are referred to by common reference numerals. The sensor layer 255 may be implemented in a variety of ways. In various embodiments, the sensor layer 255 includes a plurality of capacitive sensors that operate via mutual capacitance.

Consider the following example. The sensor layer 255 includes a plurality of electrodes integrated into the display to facilitate touch sense functionality based on electrode signals, such as sensor signals 266, having a drive signal component and a receive signal component. The plurality of electrodes includes a plurality of row electrodes and a plurality of column electrodes. The plurality of row electrodes is separated from the plurality of column electrodes by a dielectric material. The plurality of row electrodes and the plurality of column electrodes form a plurality of cross points. A plurality of drive-sense circuit(s) 28 is coupled to at least some of the plurality of electrodes (e.g. the rows or the columns) to generate a plurality of sensed signal(s) 120. Each the plurality of drive-sense circuits 28 includes a first conversion circuit and a second conversion circuit. When a drive-sense circuit 28 is enabled to monitor a corresponding electrode of the plurality of electrodes, the first conversion circuit is configured to convert the receive signal component into a sensed signal 120 and the second conversion circuit is configured to generate the drive signal component from the sensed signal 120. The sensed signals 120 indicate variations in mutual capacitance associated the plurality of cross points. In particular, components of sensed signals 120 that correspond to the capacitive coupling of each cross-point vary from the nominal mutual capacitance value for each cross-point in response to variations in mutual capacitance associated with that cross point. Conditions at cross-point, such as proximal touch conditions by a finger for example, can decrease the mutual capacitance at that cross point, causing an increase in impedance indicated in a corresponding component of sensed signals 120. As previously noted, layers 256 & 258 can be removed and/or there may be other layers between the protective layer 402 and the LCD layer 262. In addition, the LCD layer 262 could be replaced by other layer technologies such as OLED, EL, Plasma, EPD, microLED, etc. Other configurations are possible as well.

FIG. 64P is a schematic block diagram of an embodiment 2000 of a DSC that is interactive with an electrode in accordance with the present disclosure. Similar to other diagrams, examples, embodiments, etc. herein, the DSC 28-*a*2 of this diagram is in communication with one or more processing modules 42. The DSC 28-*a*2 is configured to provide a signal (e.g., a power signal, an electrode signal, transmit signal, a monitoring signal, etc.) to the electrode 85 via a single line and simultaneously to sense that signal via the single line. In some examples, sensing the signal includes detection of an electrical characteristic of the electrode that is based on a response of the electrode 85 to that signal. Examples of such an electrical characteristic may include detection of an impedance (such as the magnitude of the impedance) of the electrode 85 that is dependent on the mutual capacitance of the various cross-points of the electrode 85, detection of one or more signals coupled into the electrode 85 such as from one or more other electrodes, and/or other electrical characteristics such as charge, voltage (magnitude and/or phase), current (magnitude and/or phase), reactance, conductance, resistance, etc.

In some examples, the DSC 28-*a*2 is configured to provide the signal to the electrode to perform any one or more of capacitive imaging of an element (e.g., a touch screen display) that includes the electrode. This embodiment of a DSC 28-*a*2 includes a current source 110-1 and a power signal change detection circuit 112-*a*1. The power signal change detection circuit 112-*a*1 includes a power source reference circuit 130 and a comparator 132. The current source 110-1 may be an independent current source, a dependent current source, a current mirror circuit, etc.

In an example of operation, the power source reference circuit 130 provides a current reference 134 with DC and oscillating components to the current source 110-1. The current source generates a current as the power signal 116 based on the current reference 134. An electrical characteristic of the electrode 85 has an effect on the current power signal 116. For example, if the magnitude of the impedance of the electrode 85 decreases, the current power signal 116 remains substantially unchanged, and the voltage across the electrode 85 is decreased.

The comparator 132 compares the current reference 134 with the affected power signal 118 to produce the sensed signal 120 that is representative of the change to the power signal. For example, the current reference signal 134 corresponds to a given current (I) times a given impedance magnitude (Z). The current reference generates the power signal to produce the given current (I). If the impedance of the electrode 85 substantially matches the given impedance (Z), then the comparator's output is reflective of the impedances substantially matching. If the impedance of the electrode 85 is greater than the given impedance (Z), then the comparator's output is indicative of how much greater the impedance of the electrode 85 is than that of the given impedance (Z). If the impedance of the electrode 85 is less than the given impedance (Z), then the comparator's output is indicative of how much less the impedance of the electrode 85 is than that of the given impedance (Z).

Furthermore, components of the sensed signal 120 having differing frequencies or other distinguishing characteristics can each represent the impedance or other electrical characteristic of the electrode 85 for each of the corresponding cross-points that intersect that electrode 85. When considering all of the row/column electrodes 85 of a touch screen display, this facilitates the creation of capacitance image data associated with the plurality of cross points that indicates the capacitive coupling associated with each individual cross-point and consequently, indicate variations of mutual capacitance at each individual cross-point.

FIG. 64Q is a schematic block diagram of another embodiment 2100 of a DSC that is interactive with an electrode in accordance with the present disclosure. Similar to other diagrams, examples, embodiments, etc. herein, the DSC 28-*a*3 of this diagram is in communication with one or more processing modules 42. Similar to the previous diagram, although providing a different embodiment of the DSC, the DSC 28-*a*3 is configured to provide a signal to the electrode 85 via a single line and simultaneously to sense that signal via the single line. In some examples, sensing the signal includes detection of an electrical characteristic of the electrode 85 that is based on a response of the electrode 85 to that signal. Examples of such an electrical characteristic may include detection of an impedance of the electrode 85 that depends on a mutual capacitance of the electrode 85, detection of one or more signals coupled into the electrode 85 such as from one or more other electrodes, and/or other electrical characteristics.

This embodiment of a DSC 28-*a*3 includes a voltage source 110-2 and a power signal change detection circuit 112-*a*2. The power signal change detection circuit 112-*a*2 includes a power source reference circuit 130-2 and a comparator 132-2. The voltage source 110-2 may be a battery, a linear regulator, a DC-DC converter, etc.

In an example of operation, the power source reference circuit 130-2 provides a voltage reference 136 with DC and oscillating components to the voltage source 110-2. The voltage source generates a voltage as the power signal 116 based on the voltage reference 136. An electrical characteristic of the electrode 85 has an effect on the voltage power signal 116. For example, if the magnitude of the impedance of the electrode 85 decreases, the voltage power signal 116 remains substantially unchanged and the current through the electrode 85 is increased.

The comparator 132 compares the voltage reference 136 with the affected power signal 118 to produce the signal 120 that is representative of the change to the power signal. For example, the voltage reference signal 134 corresponds to a given voltage (V) divided by a given impedance (Z). The voltage reference generates the power signal to produce the given voltage (V). If the impedance of the electrode 85 substantially matches the given impedance (Z), then the comparator's output is reflective of the impedances substantially matching. If the magnitude of the impedance of the electrode 85 is greater than the given impedance (Z), then the comparator's output is indicative of how much greater the impedance of the electrode 85 is than that of the given impedance (Z). If the magnitude of the impedance of the electrode 85 is less than the given impedance (Z), then the comparator's output is indicative of how much less the impedance of the electrode 85 is than that of the given impedance (Z).

With respect to many of the following diagrams, one or more processing modules 42, which includes and/or is coupled to memory, is configured to communicate and interact with one or more DSCs 28 the coupled to one or more electrodes of the panel or a touchscreen display. In many of the diagrams, the DSCs 28 are shown as interfacing with electrodes of the panel or touchscreen display (e.g., via an interface that couples to roll electrodes and an interface that couples to column electrodes). Note that the number of lines that coupled the one or more processing modules 42 to the respective one or more DSCs 28, and from the one or more DSCs 28 to the respective interfaces and 87 may be varied, as shown by n and m, which are positive integers greater than or equal to 1. Other diagrams also show different values, such as o, p, etc., which are also positive integers greater than or equal to 1. Note that the respective values may be the same or different within different respective embodiments and/or examples herein.

Note that the same and/or different respective signals may be driven simultaneously sensed by the respective one or more DSCs 28 that couple to electrodes 85 within any of the various embodiments and/or examples herein. In some examples, different respective signals (e.g., different respective signals having one or more different characteristics) are implemented in accordance with mutual signaling as described below.

For example, as previously discussed the different respective signals that are driven and simultaneously sensed via the electrodes 85 may be distinguished/differentiated from one another. For example, appropriate filtering and processing can identify the various signals given their differentiation, orthogonality to one another, difference in frequency, etc. Note that the differentiation among the different respective signals that are driven and simultaneously sensed by the various DSCs 28 may be differentiated based on any one or more characteristics such as frequency, amplitude, modulation, modulation & coding set/rate (MCS), forward error correction (FEC) and/or error checking and correction (ECC), type, etc.

Other examples described herein and their equivalents operate using any of a number of different characteristics other than or in addition to frequency. Differentiation between the signals based on frequency corresponds to a first signal has a first frequency and a second signal has a second frequency different than the first frequency. Differentiation between the signals based on amplitude corresponds to a that if first signal has a first amplitude and a second signal has a second amplitude different than the first amplitude. Note that the amplitude may be a fixed amplitude for a DC signal or the oscillating amplitude component for a signal having both a DC offset and an oscillating component. Differentiation between the signals based on DC offset corresponds to a that if first signal has a first DC offset and a second signal has a second DC offset different than the first DC offset.

Differentiation between the signals based on modulation and/or modulation & coding set/rate (MCS) corresponds to a first signal has a first modulation and/or MCS and a second signal has a second modulation and/or MCS different than the first modulation and/or MCS. Examples of modulation and/or MCS may include binary phase shift keying (BPSK), quadrature phase shift keying (QPSK) or quadrature amplitude modulation (QAM), 8-phase shift keying (PSK), 16 quadrature amplitude modulation (QAM), 32 amplitude and phase shift keying (APSK), 64-QAM, etc., uncoded modulation, and/or any other desired types of modulation including higher ordered modulations that may include even greater number of constellation points (e.g., 1024 QAM, etc.). For example, a first signal may be of a QAM modulation, and the second signal may be of a 32 APSK modulation. In an alternative example, a first signal may be of a first QAM modulation such that the constellation points there and have a first labeling/mapping, and the second signal may be of a second QAM modulation such that the constellation points there and have a second labeling/mapping.

Differentiation between the signals based on FEC/ECC corresponds to a first signal being generated, coded, and/or based on a first FEC/ECC and a second signal being generated, coded, and/or based on a second FEC/ECC that is different than the first modulation and/or first FEC/ECC. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. For example, a first signal may be generated, coded, and/or based on a first LDPC code, and the second signal may be generated, coded, and/or based on a second LDPC code. In an alternative example, a first signal may be generated, coded, and/or based on a BCH code, and the second signal may be generated, coded, and/or based on a turbo code. Differentiation between the different respective signals may be made based on a similar type of FEC/ECC, using different characteristics of the FEC/ECC (e.g., codeword length, redundancy, matrix size, etc. as may be appropriate with respect to the particular type of FEC/ECC). Alternatively, differentiation between the different respective signals may be made based on using different types of FEC/ECC for the different respective signals.

Differentiation between the signals based on type corresponds to a first signal being or a first type and a second signal being of a second generated, coded, and/or based on a second type that is different than the first type. Examples of different types of signals include a sinusoidal signal, a square wave signal, a triangular wave signal, a multiple level signal, a polygonal signal, a DC signal, etc. For example, a first signal may be of a sinusoidal signal type, and the second signal may be of a DC signal type. In an alternative example, a first signal may be of a first sinusoidal signal type having first sinusoidal characteristics (e.g., first frequency, first amplitude, first DC offset, first phase, etc.), and the second signal may be of second sinusoidal signal type having second sinusoidal characteristics (e.g., second frequency, second amplitude, second DC offset, second phase, etc.) that is different than the first sinusoidal signal type.

Note that any implementation that differentiates the signals based on one or more characteristics may be used in this and other embodiments, examples, and their equivalents to distinguish and identify variations in capacitive coupling/mutual capacitance between each cross point between the row and column electrodes in a sensing layer.

In addition, within this diagram above as well as any other diagram described herein, or their equivalents, the one or electrodes 85 (e.g., touch sensor electrodes such as may be implemented within a device operative to facilitate sensing of touch, proximity, gesture, etc.) may be of any of a variety of one or more types including any one or more of a touch sensor device, a touch sensor element (e.g., including one or more touch sensors with or without display functionality), a touch screen display including both touch sensor and display functionality, a button, an electrode, an external controller, one or more rows of electrodes, one or more columns of electrodes, a matrix of buttons, an array of buttons, a film that includes any desired implementation of components to facilitate touch sensor operation, and/or any other configuration by which interaction with the touch sensor may be performed.

Note that the one or more electrodes 85 may be implemented within any of a variety of devices including any one or more of a touchscreen, a pad device, a laptop, a cell phone, a smartphone, a whiteboard, an interactive display, a navigation system display, an in-vehicle display, etc., and/or any other device in which one or more touch electrodes 85 may be implemented.

Note that such interaction of a user with an electrode 85 may correspond to the user touching the touch sensor, the user being in proximate distance to the touch sensor (e.g., within a sufficient proximity to the touch sensor that coupling from the user to the touch sensor may be performed via capacitively coupling (CC), etc. and/or generally any manner of interacting with the touch sensor that is detectable based on processing of signals transmitted to and/or sensed from the touch sensor including proximity detection, gesture detection, etc.). With respect to the various embodiments, implementations, etc. of various respective electrodes as described herein, note that they may also be of any such variety of one or more types. For example, electrodes may be implemented within any desired shape or style (e.g., lines, buttons, pads, etc.) or include any one or more of touch sensor electrodes, capacitive buttons, capacitive sensors, row and column implementations of touch sensor electrodes such as in a touchscreen, etc.

FIG. 64R is a schematic block diagram of an embodiment of a plurality of electrodes creating a plurality of touch sense cells 280 within a display. In this embodiment, a few second electrodes 278 are perpendicular and on a different layer of the display than a few of the first electrodes 277. For each cross-point of a first electrode and a second electrode, a touch sense cell 280 is created. At each touch sense cell 280/cross-point, a mutual capacitance ($C_{m\_0}$) is created between the crossing electrodes at each cross-point.

A drive sense circuit (DSC) is coupled to a corresponding one of the electrodes. The drive sense circuits (DSC) provides electrode signals to the electrodes and generates sensed signals 120 that indicates the loading on the electrode signals of the electrodes. When no touch or touchless indication is present, each touch cell 280 will have a similar mutual capacitance, $C_{m\_0}$. When a traditional proximal touch or touchless indication is applied on or near a touch sense cell 280 by a finger, for example, the mutual capacitance of the cross point will decrease (creating an increased impedance). Based on these impedance changes of the various distinguishing components of sensed signals 120, the processing module can generate capacitance image data as, for example, captured frames of data that indicate the magnitude of the capacitive coupling at each of the cross-points indicative of variations in their mutual capacitance and further can be analyzed to determine the location of touch(es), or touchless indication(s) and or other conditions of the display.

FIG. 64S is a schematic block diagram of another embodiment 2201 of a touch sensor device in accordance with the present disclosure. This diagram shows a panel or touchscreen display with touch sensor device that includes electrodes 85 that are arranged in rows and columns. One or more processing modules 42 is implemented to communicate and interact with the first set of DSCs 28 that couple to the row electrodes via an interface and a second set of DSCs 28 that are coupled to the column electrodes the interface.

With respect to signaling provided from the DSCs 28 to the respective column and row electrodes, note that mutual signaling is performed in certain examples. With respect to mutual signaling, different signals are provided via the respective DSCs 28 that couple to the row and column electrodes. For example, a first mutual signal is provided via a first DSC 28 to a first row electrode via the interface, and a second mutual signals provided via second DSC 28 to a second row electrode via the interface, etc. Generally speaking, different respective mutual signals are provided via different respective DSCs 28 to different respective row electrodes via the interface and those different respective mutual signals are then detected via capacitive coupling into one or more of the respective column electrodes via the different respective DSCs 28 that couple to the row electrodes via an interface. Then, the respective DSCs 28 that couple to the column electrodes via the interface are implemented to detect capacitive coupling of those signals that are provided via the respective row electrodes via the interface to identify the location of any interaction with the panel or touchscreen display.

From certain perspectives and generally speaking, mutual signaling facilitates not only detection of interaction with the panel or touchscreen but can also provide disambiguation of the location of the interaction with the panel or touchscreen. In certain examples, one or more processing modules 42 is configured to process both the signals that are transmitted, received, and simultaneously sensed, etc. in accordance with mutual signaling with respect to a panel or touchscreen display.

For example, as a user interacts with the panel or touchscreen display, such as based on a touch or touchless indication from a finger or portion of the user's body, a stylus, etc., there will be capacitive coupling of the signals that are provided via the row electrodes into the column electrodes proximally close to the cross-points of each of those row and column electrodes. Based on detection of the signal that has been transmitted via the row electrode into the column electrode, has facilitated based on the capacitive coupling that is based on the user interaction with the panel or touchscreen display via, for example, a stylus, pen or finger). The one or more processing modules 42 is configured to identify the location of the user interaction with the panel or touchscreen display based on changes in the sensed signals 120 caused by changes in mutual capacitance at the various cross-points. In addition, note that non-user associated objects may also interact with the panel or touchscreen display, such as based on capacitive coupling between such non-user associated objects with the panel or touchscreen display that also facilitate capacitive coupling between signals transmitted via a row electrode into corresponding column electrodes at a corresponding cross-points in the row, or vice versa.

Consider two respective interactions with the panel touchscreen display as shown by the hashed circles, then a corresponding heat map or other capacitance image data showing the electrode cross-point intersection may be generated by the one or more processing modules 42 interpreting the signals provided to it via the DSCs 28 that couple to the row and column electrodes.

In addition, with respect to this diagram and others herein, the one or more processing modules 42 and DSC 28 may be implemented in a variety of ways. In certain examples, the one or more processing modules 42 includes a first subset of the one or more processing modules 42 that are in communication and operative with a first subset of the one or more DSCs 28 (e.g., those in communication with one or more row electrodes of a panel or touchscreen display a touch sensor device) and a second subset of the one or more processing modules 42 that are in communication and operative with a second subset of the one or more DSCs 28 (e.g., those in communication with column electrodes of a panel or touchscreen display a touch sensor device).

In even other examples, the one or more processing modules 42 includes a first subset of the one or more processing modules 42 that are in communication and operative with a first subset of one or more DSCs 28 (e.g., those in communication with one or more row and/or column electrodes) and a second subset of the one or more processing modules 42 that are in communication and operative with a second subset of one or more DSCs 28 (e.g., those in communication with electrodes of another device entirely, such as another touch sensor device, an e-pen, etc.).

In yet other examples, the first subset of the one or more processing modules 42, a first subset of one or more DSCs 28, and a first subset of one or more electrodes 85 are implemented within or associated with a first device, and the second subset of the one or more processing modules 42, a second subset of one or more DSCs 28, and a second subset of one or more electrodes 85 are implemented within or associated with a second device. The different respective devices (e.g., first and second) may be similar type devices or different devices. For example, they may both be devices that include touch sensors (e.g., without display functionality). For example, they may both be devices that include touchscreens (e.g., with display functionality). For example, the first device may be a device that include touch sensors (e.g., with or without display functionality), and the second device is an e-pen device.

In an example of operation and implementation, with respect to the first subset of the one or more processing modules 42 that are in communication and operative with a first subset of one or more DSCs 28, a signal #1 is coupled from a first electrode 85 that is in communication to a first DSC 28 of the first subset of one or more DSCs 28 that is in communication and operative with the first subset of the one or more processing modules 42 to a second electrode 85 that is in communication to a first DSC 28 of the second subset of one or more DSCs 28 that is in communication and operative with the second subset of the one or more processing modules 42.

When more than one DSC 28 is included within the first subset of one or more DSCs 28, the signal #1 may also be coupled from the first electrode 85 that is in communication to a first DSC 28 of the first subset of one or more DSCs 28 that is in communication and operative with the first subset of the one or more processing modules 42 to a third electrode 85 that is in communication to a second DSC 28 of the second subset of one or more DSCs 28 that is in communication and operative with the second subset of the one or more processing modules 42.

Generally speaking, signals may be coupled between one or more electrodes 85 that are in communication and operative with the first subset of the one or more DSCs 28 associated with the first subset of the one or more processing modules 42 and the one or more electrodes 85 that are in communication and operative with the second subset of the one or more DSCs 28 (e.g., signal #1, signal #2). In certain examples, such signals are coupled from one electrode 85 to another electrode 85.

In some examples, these two different subsets of the one or more processing modules 42 are also in communication with one another (e.g., via communication effectuated via capacitive coupling between a first subset of electrodes 85 serviced by the first subset of the one or more processing modules 42 and a second subset of electrodes 85 serviced by the first subset of the one or more processing modules 42, via one or more alternative communication means such as a backplane, a bus, a wireless communication path, etc., and/or other means). In some particular examples, these two different subsets of the one or more processing modules 42 are not in communication with one another directly other than via the signal coupling between the one or more electrodes 85 themselves.

A first group of one or more DSCs 28 is/are implemented simultaneously to drive and to sense respective one or more signals provided to a first of the one or more electrodes 85. In addition, a second group of one or more DSCs 28 is/are implemented simultaneously to drive and to sense respective one or more other signals provided to a second of the one or more electrodes 85.

For example, a first DSC 28 is implemented simultaneously to drive and to sense a first signal via a first sensor electrode 85. A second DSC 28 is implemented simultaneously to drive and to sense a second signal via a second sensor electrode 85. Note that any number of additional DSCs implemented simultaneously to drive and to sense additional signals to additional electrodes 85 as may be appropriate in certain embodiments. Note also that the respective DSCs 28 may be implemented in a variety of ways. For example, they may be implemented within a device that includes the one or more electrodes 85, they may be implemented within a touchscreen display, they may be distributed among the device that includes the one or more electrodes 85 that does not include display functionality, etc.

FIG. 64T is a schematic block diagram of an embodiment 2202 of mutual signaling within a touch sensor device in accordance with the present disclosure. Note that mutual signaling may be performed in a variety of different ways. For example, mutual signaling may be performed such that signals are transmitted via the row electrodes of the panel or touchscreen display and detection of capacitive coupling of those signals into the column electrodes is detected via the column electrodes as variations in sensed signals 120. Alternatively, mutual signaling may be performed such that signals are transmitted via the column electrodes of the panel or touchscreen display and detection of capacitive coupling of those signals into the row electrodes is detected via the row electrodes as variations in sensed signals 120. Regardless of the particular implementation by which mutual signaling is performed, note that a respective DSC 28 is configured to transmit a signal via the respective electrode to which it coupled and simultaneously to sense that same signal via that respective electrode including to sense any other signal that is coupled into that respective electrode (e.g., such as with respect to capacitive coupling of signals from one or more other electrodes based on user interaction with the panel or touchscreen display).

Note that certain examples of signaling as described herein relate to mutual signaling such that a one or more signals are transmitted via row electrodes of one or more panels or touchscreen displays and, based on capacitive coupling of those one or more signals into column electrodes of the one or more panels are touchscreen displays, disambiguation of the location of any interaction of a user, device, object, etc. may be identified by one or more processing modules 42 that are configured to interpret the signals provided from one or more DSCs 28.

FIG. 64U is a schematic block diagram of an embodiment of a processing module in accordance with the present disclosure. In particular, a processing module 42 is presented as a further embodiment of processing module 42, and/or other processing modules disclosed herein with display 250, 250' and/or other touch screen displays disclosed herein. The processing module 42 improves the technology of touch screens, such as Projected Capacitive (PCAP) touch screens and associated touch screen controllers by employing enhanced mutual capacitance, namely the ability to detect both increases and decreases in the amplitude of mutual capacitance signals with the processing module 42 or other touch controller. This enhanced mutual capacitance capability allows for improved performance in the presence of noise, interference and/or other artifacts. It further provides an improved ability to detect, identify, characterize and track proximal touch conditions by an object or finger, pressure conditions and other conditions of a touch screen display.

The processing module 42 includes one or more processing circuits 2250 and one or more memories 2252. The processing module 42 also includes a DSC interface 2254, such as a serial or parallel I/O interface or other interface device for receiving sensed signals 120 from the DSC(s) 28 and/or for controlling their operation, e.g. via selectively enabling or disabling groups or individual DSC(s) 28. The processing module 42 also includes a host interface 2254, such as a serial or parallel I/O interface or other interface device for receiving commands from core computer 14 or other host device and for sending condition data and/or other touch screen data to a core computer 14 or other host device indicating, for example, the presence or absence of various touch conditions of the touch screen display, tracking and location data as well as other parameters associated the various touch conditions of the touch screen display that identify and/or characterize various artifacts or conditions.

In operation, the memory(s) 2252 store operational instructions and the processing circuit(s) execute the instructions to perform operations that can include selectively enabling or disabling groups or individual DSC(s) 28 and receiving sensed signals 120 via the DSC interface 2254. In addition, the operations can include other operations such as executing enhanced mutual capacitance generating function 2260, artifact detection function(s) 2262, artifact compensation function(s) 2264, condition detection function(s) 2266 and/or other functions and operations associated with a touch screen display.

In various embodiments, the enhanced mutual capacitance generating function 2260 can include one or more of the following operations:

- Analyzing sensed signals 120 to distinguish the separate components, e.g. impedances or other electrical characteristics indicating capacitive coupling/mutual capacitance corresponding to each individual cross-point. This can include differentiation of individual components by frequency, time, modulation, coding and/or other distinguishing characteristic as discussed herein.
- Formatting the separate components as capacitance image data. This can include capturing the magnitude of the separate components corresponding to each individual cross-point and a corresponding coordinates indicating the position of the cross-point in the touch screen display, and generating capacitive image data, for example as frames of data formatted to indicate these magnitudes and positions as a two-dimensional image or other array. In particular, the magnitude portion of the capacitance image data includes positive capacitance variation data corresponding to positive variations of the capacitance image data from a nominal value and negative capacitance variation data corresponding to negative variations of the capacitance image data from the nominal value.

Examples of positive capacitance variation data and negative capacitance variation data including several alternatives will be discussed further in conjunction with FIG. 64V that follows.

FIG. 64V is a graphical diagram 300 of an embodiment of capacitance image data in accordance with the present disclosure. As previously discussed, components of the sensed signal 120 having differing frequencies or other differentiating characteristics can each represent the impedance or other electrical characteristic of an electrode 85 for each of the corresponding cross-points that intersect that electrode 85. When considering all of the row/column electrodes 85 of a touch screen display, this facilitates the creation of capacitance image data associated with the plurality of cross points that indicates the capacitive coupling associated with each individual cross-point and consequently, indicate variations of mutual capacitance at each individual cross-point. In particular, components of sensed signals 120 vary from the nominal mutual capacitance value for each cross-point in response to variations in mutual capacitance associated with that cross point.

Consider a component of sensed signals 120 for a cross-point with coordinate position (i, j) of the touch screen display and in a corresponding coordinate position in the capacitance image data to be represented by $S_{ij}$. This component can be expressed as a function S of the actual mutual capacitance of the cross-point with coordinate position (i, j) or $Cm_{ij}$, $$S_{ij}=S(Cm_{ij})$$

As previously discussed, the function S can be proportional to the magnitude of the impedance of the cross-point (i, j) at the particular operating frequency, in which case, the value of S increases in response to a decrease in the value of the mutual capacitance $Cm_{ij}$. As also noted, in other examples, the function S can be proportional to other electrical characteristic(s) of the mutual capacitance of the cross-point.

Consider further, the nominal value of $S_{ij}$—corresponding to a quiescent state—such as the absence of a proximal touch or touchless condition of the touch screen display, noise, pressure or other artifacts, etc. This nominal value can be represented by $S_0$, where, $S_0=S(Cm_0)$ and $Cm_0$ (or $Cm\__0$) represents a nominal mutual capacitance, such as the mutual capacitance of the particular cross-point (i, j) in the quiescent state. In a further example, the nominal mutual capacitance $Cm_0$ can be predetermined value and assumed to be the same, or substantially the same for all of the cross-points within a predetermined or industry-accepted tolerance such as 1%, 5%, 10% or some other value and the same value of $Cm_0$ is used for all cross-points. In the alternative, $Cm_0$ can be calculated as an average mutual capacitance calculated over all of the cross-points of the touch screen display in the quiescent state or other operating state in the presence of normal operating noise. In a further example, $Cm_0$ can be calculated individually for all of the cross-points of the touch screen display in the quiescent state or other operating state in the presence of normal operating noise, with each individual value being used for its corresponding cross-point. While described above in terms of values of $Cm_0$, predetermined or calculated values of $S_0$ could similarly be used directly.

As used herein, a frame of capacitance image data for an N×M touch screen includes, an N×M array of magnitude data $S_{ij}$, at corresponding cross-point coordinate positions 1≤i≤N and 1≤j≤M. The magnitude portion of the capacitance image data $S_{ij}$ can include positive capacitance variation data corresponding to positive variations of the capacitance image data from the nominal value $S_0$ in the positive capacitance region shown where, $$(S_{ij}>S_0)$$

The magnitude portion of the capacitance image data $S_{ij}$ can also include negative capacitance variation data corresponding to negative variations of the capacitance image data from the nominal value $S_0$ in the negative capacitance region shown where, $$(S_{ij}<S_0)$$

It should be noted, when the function S is proportional to the magnitude of the impedance of the cross-point (i, j) at the particular operating frequency, negative variations in mutual capacitance from the nominal mutual capacitance $Cm_0$ result in positive capacitance variation data. Conversely, positive variations in mutual capacitance from the nominal mutual capacitance $Cm_0$ result in negative capacitance variation data.

FIG. 64W is a flow diagram of an embodiment of a method in accordance with the present disclosure. In particular a method is presented for use in conjunction with the processing module 42, display 250, 250' and/or other processing modules and touch screen displays disclosed herein. Step 310 includes receiving sensed indications of mutual capacitance. This step can be performed, for example, via DSC interface 2254. Step 312 includes generating capacitance image data including positive capacitance variation data and negative capacitance variation data. This step can be performed, for example, via enhanced mutual capacitance generating function 2260. Step 314 includes identifying artifacts in the capacitance image data and compensating for those artifacts. This step can be performed, for example, via artifact detection function(s) 2262 and/or artifact compensation function(s) 2264. In some embodiments, artifact compensation is performed only if one or more artifacts are identified. In other examples, such as noise compensation, artifact compensation can be performed repeatedly, continuously and/or periodically. Step 316 includes processing the capacitance image data to identify the presence and/or absence of various conditions and to characterize the conditions that were identified. This step can be performed, for example, via condition detection function(s) 2266.

Returning back to FIG. 64U, in various embodiments, the artifact detection function(s) 2262 process the capacitance image data to detect, identify and/or characterize one or more conditions of the touch screen display corresponding to artifacts in the capacitance image data—conditions that differ from the ordinary proximal touch or touchless conditions, by fingers, a stylus, etc. and/or that differ from other conditions of the touch screen display that occur during the intended operation of the touch screen display. Examples of such artifacts include noise in the capacitance image data, interference caused by the presence of devices in proximity to the display that emit electromagnetic fields having frequencies that overlap with the operating frequency or frequencies of the touch screen display and/or variations in the capacitance image data caused by the presence of water or salt-water on the surface of the touch screen display, the presence of other foreign objects on the surface of the touch screen display or in proximity to the display including conductive objects, dielectric objects and non-conductive objects that ae not intended by the user to invoke touch operations and/or other artifacts in the capacitance image data caused by other undesirable conditions.

The operations of the artifact detection function(s) 2262 can include one or more of the following operations:

- Processing the positive capacitance variation data and/or the negative capacitance variation data via one or more inference functions corresponding to each possible artifact to be detected. Examples of such inference functions can include signal analysis, statistical noise analysis, statistical pattern recognition functions, other pattern recognition functions, texture recognition functions, artificial intelligence (AI) models such as convolutional neural networks, deep-learning functions, clustering algorithms, machine learning functions trained on sets of training data with capacitance image data corresponding to known conditions of various kinds, and/or other image processing techniques. In various embodiments, the capacitance image data is processed via each of the inference functions to determine if an artifact corresponding to each particular inference function is present or absent.
- If the presence of a particular artifact is detected, the particular artifact can be identified and/or characterized based on one or more parameters of the artifact. In this fashion, for example, noise or interference can be identified and characterized based on noise or interference levels, signal to noise ratio, signal to noise and interference ratio, interference frequencies, etc. In a further example, the presence of water droplets on the display can be identified and or characterized by amount or level.

When one or more artifacts are detected via the artifact detection function(s) 2262, one or more artifact compensation function(s) 2264 corresponding to the identified artifact or artifacts can be selected and enabled to compensate for these particular artifact(s) in the capacitance image data. In particular the goal of the artifact compensation function(s) 2264 is to generate compensated capacitance image data that permits the continued normal and desired touch operation of the touch screen display. The operations of the artifact compensation function(s) 2264 can include one or more of the following operations:

- Determining locations and/or other portions of the positive capacitance variation data and/or the negative capacitance variation data corresponding to the artifact(s). For example, the presence of noise can result in high frequency variations in both the positive capacitance variation data and the negative capacitance variation data within a noise zone about $S_0$. The magnitude of the noise determined statistically or based on peak signal levels by the artifact detection functions(s) 2262 can be used to determine the size of the noise zone. In another example, the presence of water on the display can result in static or slowly varying variations in both the positive capacitance variation data and the negative capacitance variation data about $S_0$. The signal variation artifacts caused by the water in the positive capacitance variation data and the negative capacitance variation data can be identified.
- Generating compensated capacitance image data by subtracting, ignoring or removing the portions of the positive capacitance variation data and/or the negative capacitance variation data corresponding to the artifact(s).

The condition detection function(s) 2266 can operate to detect and/or identify a desired condition of the touch screen display, i.e., an intended actual proximal touch and/or touchless operation. Examples of such desired conditions include a proximal touch or touchless indication by a finger, e-pen or stylus, touch pressure by a conductive, non-conductive or dielectric object, the presence of an object with a particular shape on the surface of the display, and/or other desired conditions. The operation of the condition detection function(s) 2266 can include:

- Processing the positive capacitance variation data and/or the negative capacitance variation data from the capacitance image data (in the absence of artifacts) or from the compensated capacitance image data (in the presence of one or more artifacts) to identify one or more touch conditions or other desired condition. For example, the presence of a spike in the positive capacitance variation data above a touch or touchless indication threshold can be used to identify proximal finger touches. In a further example, an object of one or more particular shape(s) on or near the surface of the display can be detected based on analysis by one or more inference functions corresponding to these particular shapes. Examples of such inference functions can include statistical pattern recognition functions, other pattern recognition functions, texture recognition functions, artificial intelligence (AI) models such as convolutional neural networks, deep-learning functions, clustering algorithms, machine learning functions trained on sets of training data with capacitance image data corresponding to known conditions of various kinds, and/or other image processing techniques.
- If a particular condition is detected, condition data can be generated that indicates the condition, and/or parameters of the condition. Such condition data can be sent via the host interface 2256 for use by a host device, running app, the core computer 14 etc. Examples of such condition data include the identification and location of one or more touches, or touchless indications, the locations and identification of one or more particular shapes and/or their orientation and/or other characterization parameters.

An embodiment of a condition detection function 2266 is discussed in further detail in conjunction with FIG. 64AA. The further operation of the processing module 42, including several optional functions and features, will be described in conjunction with the figures that follow.

FIG. 64X is a schematic block diagram of an embodiment of an artifact detection function and artifact compensation function in accordance with the present disclosure. As previously discussed, the artifact detection function(s) 2262 can detect one or more differing artifacts such as the presence of water or salt-water on the surface of the touch screen display, the presence of other foreign objects on the surface of the touch screen display or in proximity to the display including conductive objects, dielectric objects and non-conductive objects, and/or other artifacts in the capacitance image data caused by other undesirable conditions.

In various embodiments, the artifact detection function(s) 2262 can be implemented via differing inference functions or other detection functions for each of the possible artifacts. In the presence of a single artifact, the particular artifact detection function 2262 corresponding to single artifact operates to signal the presence of that artifact—while the other artifact detection functions 2262 corresponding to other artifacts operate to signal the absence of their corresponding artifacts. In the presence of a more than one artifact, the particular artifact detection functions 2262 corresponding to artifact detected each operate to signal the presence of their corresponding artifact—while the other artifact detection functions 2262 corresponding to other artifacts operate to signal the absence of their corresponding artifacts.

Furthermore, the artifact compensation function(s) 2264 can be implemented via differing inference functions or other compensation functions for each of the possible artifacts. When a single artifact is identified as being present, the particular artifact compensation function 2264 is enabled to compensate for the presence of artifact data corresponding to the artifact in the capacitance image data. When more than one artifact is identified as being present, the corresponding artifact compensation function(s) 2264 are each enabled to compensate for the presence of the corresponding artifacts in the capacitance image data.

Capacitance image data 1300-1, including the positive capacitance variation data and the negative capacitance variation data is analyzed by an artifact detection function 2262-1 corresponding to an undesirable condition, for example, the presence of conductive liquids on the surface of the display. The artifact detection function 2262-1 can operate to detect the presence of the water on the surface of the display via a statistical pattern recognition function, other pattern recognition function, and/or texture recognition functions that recognizes a pattern or texture corresponding to the presence of water on the surface. In a further example, the artifact detection function 2262-1 can operate to detect the presence of the water on the surface of the display via an artificial intelligence (AI) model such as a convolutional neural network, deep-learning function, clustering algorithm, or other machine learning function trained on sets of training data corresponding to capacitance image data with known artifacts of various kinds. In yet another example, the capacitance image data 1300-1 can be transformed into a 2-D frequency domain, via a discrete Fourier transform, and the resulting frequencies are analyzed to identify one or more frequencies or a band of frequencies determined to correspond to water or other conductive liquid.

Once the presence of water or other conductive liquid is detected by the artifact detection function 2262-1, indication of this detection can be sent to the artifact compensation function 2264-1 corresponding to this artifact. In response to this indication, the artifact compensation function 2264-1 can be enabled to generate compensated capacitance image data 1325-1 from the capacitance image data 1300-1. As previously discussed, the presence of conductive liquid on the display can result in static or slowly varying variations in both the positive capacitance variation data and the negative capacitance variation data about $S_0$. This signal variation artifacts caused by the water in the positive capacitance variation data and the negative capacitance variation data can be identified and located, particularly when water is determined to be present on only a portion of the display. The compensated capacitance image data 1325-1 can be generated by subtracting from the capacitance image data 1300-1, the portions of the positive capacitance variation data and the negative capacitance variation data corresponding to this artifact.

In another example, compensated capacitance image data 1325-1 can be generated by:

- determining a zone in the positive capacitance variation data and the negative capacitance variation data corresponding to variations caused by this artifact. For example, the zone can be defined by the region between an upper threshold corresponding to a highest positive peak in the positive capacitance variation data and a lower threshold corresponding to a lowest negative peak in the negative capacitance variation data.
- generating the capacitance image data 1325-1 by removing from the capacitance image data 1300-1, the portions of the positive capacitance variation data and the negative capacitance variation data within this zone or otherwise ignoring the portions of the positive capacitance variation data and the negative capacitance variation data within this zone.

This technique can be used, for example when droplets of water are not localized to a small region and instead are scattered over more than a predetermined percentage of the surface of the display.

FIG. 64Y is a flow diagram of an embodiment of a method in accordance with the present disclosure. In particular a method is presented for use in conjunction with the processing module 42, display 250, 250' and/or other processing modules and touch screen displays disclosed herein. Common elements with FIG. 64VB are referred to by common reference numerals. Step 314-1' includes identifying noise in the capacitance image data. This step can be performed, for example, via a corresponding artifact detection function 2262 designed for this purpose, for example, as discussed in conjunction with FIG. 64Z. Step 314-2' includes compensating for the noise in the capacitance image data. This step can be performed, for example, via an artifact compensation function 2264, for example, as discussed in conjunction with FIG. 64Z. While shown as separate steps 314-1' and 314-2', these functions can be performed together to, for example, determine the amount of noise present in the capacitance image data and to compensate for that noise.

FIG. 64Z is a schematic block diagram of an embodiment of an artifact detection function and artifact compensation function in accordance with the present disclosure. The presence of noise in the capacitance image data can result in variations in both the positive capacitance variation data and the negative capacitance variation data about $S_0$. This signal variation caused by the noise in the positive capacitance variation data and the negative capacitance variation data can be identified. As previously discussed, the artifact detection function(s) 2262 can operate to detect the presence of noise in the capacitance image data and identify the noise, for example by a noise level, noise energy, signal to noise ratio, etc.

In various embodiments, an artifact detection function 2262-2 can be implemented via signal analysis, statistical noise analysis or other noise detection technique. For example, the artifact detection function 2262-2 can be the same as or different from artifact detection function 2262-1, for example, based on being implemented to detect the presence of noise. Once the noise has been identified by the artifact detection function 2262-2, an indication of the noise can be sent to the artifact compensation function 2264-2 for compensation of the noise. In response to this indication, the artifact compensation function 2264-2 can be enabled to generate compensated capacitance image data 1325-1 from the capacitance image data 1300-1. In the alternative, the artifact compensation function 2264-2 can be in continuous/periodic operation to compensate for the current noise conditions.

Once the noise level is identified, compensated capacitance image data 1325-1 can be generated by:

- determining a noise zone in the positive capacitance variation data and the negative capacitance variation data corresponding to variations caused by this artifact.

For example, the noise zone can be defined by the region between an upper threshold (e.g. an upper baseline) corresponding to the highest positive peak in the positive capacitance variation data or highest average positive noise deviation and a lower threshold (e.g. a lower baseline) corresponding to the lowest negative peak or lowest average negative noise deviation in the negative capacitance variation data and/or based on other indications of noise energy, levels or noise statistics.

generating the capacitance image data 1325-1 by subtracting or removing from the capacitance image data 1300-1, the portions of the positive capacitance variation data and the negative capacitance variation data within this zone or otherwise ignoring the portions of the positive capacitance variation data and the negative capacitance variation data within this zone.

By generating a noise zone, with a upper baseline value to represent a traditional PCAP touch controller baseline floor and an additional lower baseline value, which is used for the negative capacitance variation data, allows for the measurement of the negative capacitance variation data with the noise above to be subtracted, removed or ignored.

When the display is remotely located from the processing module 42 or other controller, there could be increased baseline noise, which will be addressed by the implementation of a noise zone. Also, when connecting two or more sensors with common parallel same/shared mutual signals, which is when the TX (transmitted) and/or RX (received) channels have cabling between the sensors, there is an increase of noise generated from the cabling, that increases the noise floor, with the artifact compensation function 2264-2 can increase the range between the upper baseline and the lower baseline, which will increase the range of the values to subtract, remove, or ignore from the measure values. Furthermore, when connecting two or more sensors that have cabling between the sensors with common parallel same/shared mutual signals, unique noise zones can be created by the artifact compensation function 2264-2 for each of sensor's measured signal content.

In addition, when connecting a multi-ended sensor with common parallel same/shared mutual signals, on a single large sensor or a high trace resistance sensor, there is an increase of noise generated on the cabling routed across/around the two or more ends of the sensor's channels, that increases the noise floor. The artifact compensation function 2264-2 can compensate by increasing the range of the upper baseline and the lower baseline, which will increase the range of the values to subtract, remove, or ignore from the measure values.

FIG. 64AA is a schematic block diagram of an embodiment of a condition detection function in accordance with the present disclosure. The condition detection function 2266-1 operates based on capacitance image data 1300-1 or compensated capacitance image data 1325-1, in the event that one or more artifacts were detected and compensated.

In particular a condition detection function 2266-1 is presented corresponding to a touchless indication by a finger. Further discussion of the touchless indication condition is presented in conjunction with FIG. 64AC.

In various embodiments, the presence of a spike in the positive capacitance variation data above a touchless indication threshold and below a touch threshold can be used to identify one or more proximal touchless indication(s) by finger(s). The touch threshold and/or touchless indication threshold can be predetermined thresholds or dynamic thresholds that are adjusted based on the presence of one or more artifacts, such as noise, water, the presence of foreign objects, etc.

If a proximal touchless condition is detected, condition data 1350-1 can be generated that indicates the touchless indication, and/or parameters of the touchless indication. Examples of condition data 1350-1 include the identification and location, size, boundaries, strength, path, trajectory and/or other parameters of one or more touchless indications, etc. Such condition data 1350-1 can be sent via the host interface 2256 for use by a host device, a running app, the core computer 14, etc.

In particular, alternatively or in addition to detecting physical touch to the touch screen, one or more embodiments of the touch screen 16 described herein can be configured to detect objects, such as a hand and/or one or more individual fingers of a user, hovering over the touch screen 16, without touching the touch screen 16. As used herein "hovering" can correspond to being adjacent to the touch screen without touching the touch screen, in any orientation relative to the direction of gravity. In particular, "hovering" over a touch screen 16 as discussed herein is relative to an orientation of the corresponding touch screen 16.

FIG. 64AB is a pictorial diagram 320-2 of an embodiment of a touch screen 16 that includes electrode columns 85 of a touch screen utilized to detect an object in proximity, but not touching, the touch screen 16 such as a hand, in a same or similar fashion as utilized to detect touch as discussed previously.

In some embodiments, a smaller number of electrode rows and/or columns than implemented in other embodiments discussed herein, and/or electrode rows and/or columns with larger spacing than implemented in other embodiments discussed herein, can be implemented by touch screen 16 to facilitate presence detection by touch screen 16. In some embodiments, this can be based on leveraging the presence of electric field induced by presence of a hovering object such as a hand. For example, the electric field can be detected and/or measured, where properties of the detected electric field can be processed by processing module 42 to implement presence detection and/or a location and/or characteristics of a hovering one or more objects in proximity to the electrode rows and/or columns. This can be ideal to capture large gestures and/or touchless indications, or to otherwise detect a person is in proximity.

FIG. 64AC is a pictorial diagram 320-2 of another embodiment of a touch screen display in accordance with the present disclosure. In particular, more detailed capacitance image data can be generated by touch screen 16 for hovering objects, such as particular fingers of a hand, for example, based on implementing electrode rows and/or columns, such as a number of electrode rows and/or columns of other embodiments discussed herein and/or based on implementing a same spacing of electrode rows and/or columns implemented in other embodiments discussed herein. This can be ideal to capture minute gestures and/or touchless indications by particular fingers, without necessitating physical touching of the touchscreen.

As depicted in FIG. 64AC, the surface of the touch screen 16 can define and/or be parallel with an x-y plane with an x-axis and y-axis, and a distance between the user's finger and the touch screen projected upon a z-axis orthogonal to the x-y plane can be a non-zero hover distance 602.1, based on the finger hovering over the touch screen without touching the touchscreen.

When the hover distance 602 is sufficiently small, such as less than 1 centimeter, less than 10 centimeters, and/or otherwise close enough to render detectable changes to the self-capacitance and the mutual capacitance of the electrodes, a corresponding location on the touch screen over which the finger or object is hovering can be identified. In this example, a hover region 605.1 upon the x-y plane is identified, for example, based on detecting capacitance variation data at corresponding cross points of the plurality of electrodes indicating a hovering finger and/or object at this region. For example, the hover region 605 corresponds to portions of the hovering finger within sufficient hover distance 602 to render detection. This detection of an object hovering over the screen without touching can be similar to the detection of actual touch of the screen described herein, for example, where different threshold capacitance variations are utilized to detect a hovering finger and/or object. For example, threshold self-capacitance and/or mutual capacitance indicating physical touch can be higher than the threshold self-capacitance and/or mutual capacitance indicating a hovering object.

The identification of hover region 605 can be utilized to detect a corresponding touchless indication 610 by a user. For example, a user can use their finger, pen, or other object can interact with graphical image data, such as a graphical user interface or other displayed image data displayed via touch screen 16, via one or more touchless indications, for example, in a same or similar fashion as interaction with image data displayed via touch screen 16 via physical touch. The touchless indication 610 can correspond to a detectable condition detected via condition detection function 2266-1 as discussed in conjunction with FIG. 64AA.

In some embodiments, a user can optionally interact with the graphical image data displayed by a touch screen 16 entirely via touchless indications 610, where the user need not physically touch the screen to "click on" buttons, select options, scroll, zoom in and/or out, etc. Alternatively, a user can optionally interact with the graphical image data displayed by a touch screen 16 via touchless indications in addition to touch-based indications, for example, to distinguish the same or different types of different commands and/or selections when interacting with displayed graphical image data.

These touchless indications 610 can include: statically hovering over the touch screen 16 at hover distance 602, for example, to interact with a corresponding portion of graphical image data displayed via a corresponding portion of the x-y plane; dynamically hovering over the touch screen 16 with movements along the x-y plane at hover distance 602, for example, to perform a gesture-based command and/or to interact with different portions of graphical image data displayed via different corresponding portions of the x-y plane; dynamically hovering over the touch screen 16 with movements along the z-axis to change the hover distance 602, for example, to perform a gesture-based command and/or to interact with a corresponding portion of graphical image data displayed via a corresponding portion of the x-y plane; and/or other hover-based and/or gesture-based indications that optionally do not involve any physical touching of the touch screen 16.

In some embodiments, different types of touchless indications 610 can optionally correspond to different gesture-based commands utilized to invoke different types of interaction with the graphical image data, for example, where one type of touchless gesture-based command is processed to cause scrolling of the graphical image data, where another type of touchless gesture-based command is detected processed to cause zooming in of the graphical image data, where another type of touchless gesture-based command detected is processed to cause zooming out of the graphical image data, where another type of touchless gesture-based command is detected and processed to cause selection of a selectable element of the graphical image data, such as a button displayed by the graphical image data, and/or where one or more additional types of touchless gesture-based command are also detected and processed to cause other interaction with the graphical image data.

FIGS. 57A and 57B are graphical diagrams 330-2 and 340-2 of an embodiment of capacitance image data in accordance with the present disclosure. In particular, capacitance image data is presented in response to the touchless indication presented in conjunction with FIG. 64AC. FIG. 64AD presents a 2-D heat map representation where differing colors represent the magnitude of the positive capacitance variation data and the negative capacitance variation data. The two dimensions heatmap of FIG. 64AD can correspond to the x axis and y axis of the x-y plane of touch screen 16, where the heatmap depicts positive capacitance variation data and the negative capacitance variation data detected across various locations of the x-y area of touch screen 16. FIG. 64AE presents a 3-D heat map representation where differing colors represent the magnitude of the positive capacitance variation data and the negative capacitance variation data.

In particular, the presence of the touchless indication is clearly indicated by the peak in positive capacitance touch data that is above the touchless indication threshold 342-2 but below the touch threshold 344-2. For example, the detected hover region can be determined based on portions of the heatmap 57A with positive capacitance variation data exceeding the touchless indication threshold 342-2. Compensated capacitance image data can subtract, remove or ignore portions of the positive capacitance variation data and the negative capacitance variation data within the zone 346-2 and/or by increasing the touchless indication threshold 342-2 to be above this zone 346-2. A condition detection function 2266 corresponding to a touchless indication can detect and identify that a finger is in close proximity to the display surface based on the location of the positive peak in the positive capacitance variation data that exceeds the touchless indication threshold 342-2 but below the touch threshold 344-2. In the example shown, the touchless threshold 342-2 is placed slightly above, such as a predetermined value above, the upper threshold of the zone 346-2. In other examples, the touchless indication threshold 342-2 can be set at the upper threshold of the zone 346-2.

In addition, a further condition detection function 2266 corresponding to a touch can detect and identify that a finger is physically touching the surface of the display based on the location of the positive peak in the positive capacitance variation data that exceeds the touch threshold 344-2.

FIG. 64AF illustrates the detected hover region 605.1 detected as discussed based on processing the capacitance image data of FIGS. 57A and 57B. In particular, FIG. 64AF illustrates the projection of the detected hover region 605.1 upon the corresponding x-y plane, for example, corresponding to the two-dimensional plane of display 50 and/or otherwise corresponding to the planar surface of the touch screen 16 and/or the planar display of graphical image data by the touchscreen. The boundary of detected hover region 605.1 illustrated in FIG. 64AF corresponds to the boundary of corresponding capacitance variance data in the two-dimensional heat map of FIG. 64AD that compares favorably to the touchless indication threshold. This hover region 605 thus depicts the portion of the touch screen 16 over which an object is detected to be hovering, such as the finger of FIG. 64AC at the hover distance 602.1 in this example. This hover region 605 can be further processed, for example, to induce corresponding selections and/or interactions with the graphical image data displayed at corresponding portions of the x-y plane, as described in further detail herein.

FIG. 64AG presents another pictorial representation of another touchless indication 610.2 upon touch screen 16. In this case, a new hover region 605.2 is detected in a different location upon the x-y plane, for example, due to movement of the finger with respect to the x-y plane from the position depicted in FIG. 64AC. The corresponding hover distance 602.2 can be larger than the hover distance 602.1 of FIG. 64AC, for example, due to movement of the finger orthogonal to the x-y plane from the position depicted in FIG. 64AC.

FIGS. 64AH and 64AI are graphical diagrams 330-4 and 340-4 of an embodiment of capacitance image data in accordance with the present disclosure. In particular, capacitance image data is presented in response to the touchless indication presented in conjunction with FIG. 64AG. FIG. 64AH presents a 2-D heat map representation where differing colors represent the magnitude of the positive capacitance variation data and the negative capacitance variation data. The two dimensions heatmap of FIG. 64AH can correspond to the x axis and y axis of the x-y plane of touch screen 16, where the heatmap depicts positive capacitance variation data and the negative capacitance variation data detected across various locations of the x-y area of touch screen 16.

FIG. 64AI presents a 3-D heat map representation where, again, differing colors represent the magnitude of the positive capacitance variation data and the negative capacitance variation data Note that the magnitude of the depicted peak of FIG. 64AI can be smaller than the magnitude of the depicted peak of FIG. 64AE, for example, based on the hover distance 602.2 of FIG. 64AG being larger than the hover distance 602.1 of FIG. 64AC, and thus inducing a smaller variation in positive capacitance.

While differences in hover distance 602.1 and 602.2 in FIGS. 56 and 59, respectively, are presented to illustrate corresponding effects on the positive capacitance variation data, the illustrated distances relative to the size and/or orientation of the finger are not necessarily drawn to scales that would impose the exact example positive capacitance variation data presented in FIGS. 57A and 57B, and 64AH and 64AI, respectively.

In the example shown, the presence of the touchless indication is clearly indicated by the peak in positive capacitance touch data Compensated capacitance image data can subtract, remove or ignore portions of the positive capacitance variation data and the negative capacitance variation data within the zone 346-4 and/or by increasing the touchless indication threshold 342-4 and touch threshold 344-4 to amount(s) above this zone 346-4. In other embodiments, the touchless indication threshold 342-4 and/or touch threshold 344-4 can be the same as the touchless indication threshold 342-2 and/or touch threshold 344-2 of FIG. 64AE.

A condition detection function 2266-1 corresponding to a touchless indication can detect and identify the touch indication based on the location of the positive peak in the positive capacitance variation data that exceeds the touchless indication threshold 342-4 and falls below the touch threshold 344-4. In the example shown, the touchless indication threshold 342-4 is placed above, such as a predetermined value above, the upper threshold of the zone 346-4. In other examples, the touchless indication threshold 342-4 can be set at the upper threshold of the zone 346-4. While zones 346-2 and 346-4 have been described in term of compensation for water and salt water artifacts, similar zones can be generated to compensate for other artifacts such as noise, interference, other foreign objects, etc. Furthermore, such zones can be used to set or adjust thresholds corresponding to both positive capacitance variation data and negative capacitance variation data for other conditions such as pressure, shape detection, etc.

FIG. 64AJ illustrates the detected hover region 605.2 detected as discussed based on processing the capacitance image data of FIGS. 64AH and 64AI, similarly to the illustration of FIG. 64AF. The boundary of detected hover region 605.2 illustrated in FIG. 64AJ corresponds to the boundary of corresponding capacitance variance data in the two-dimensional heat map of FIG. 64AH that compares favorably to the touchless indication threshold. This hover region 605 thus depicts the portion of the touch screen 16 over which an object is detected to be hovering, such as the finger of FIG. 64AG at the hover distance 602.2 in this example.

FIG. 64AK illustrates a flow diagram of an embodiment of a method in accordance with the present disclosure. In particular a method is presented for use in conjunction with the processing module 42, touch screen 16, and/or other processing modules and/or touch screen displays disclosed herein, Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 386 includes processing the capacitance image data to detect a touchless indication. For example, performing step 386 includes performing step 316 and/or otherwise includes process capacitance image data to identify the presence or absence of various conditions, such as presence of absence of a condition corresponding to at least one touchless indication, and/or to characterize the conditions that were identified, such as characterizing the touchless indication. Performing step 386 can include performing condition detection function 2266-1. The touchless indication can be detected based on identifying portions of the capacitance image data, such as a hover region 605, having capacitance variation data comparing favorably to a touchless indication threshold such as touchless indication threshold 342. The touchless indication can optionally be detected based on identifying portions of the capacitance image data, such as a hover region 605, having capacitance variation data comparing favorably to the touchless indication threshold, and also comparing unfavorably to a touch threshold such as touch threshold 344.

FIGS. 61A-61C present embodiments of touch screen 16 where true touchless indications are detected and differentiated from false touchless indications. Some or all features and/or functionality of embodiments of touch screen 16 and/or processing module 42 described in conjunction with FIGS. 61A-61C can be utilized to implement the touch screen 16 described in conjunction with FIGS. 57-60, and/or any other embodiment of touch screen 16 and/or processing module 42 described herein.

For example, artifacts and/or noise, such as objects hovering over and/or physically touching the surface of the touch screen but not intended to impose user interaction with the graphical image data displayed by the touchscreen, can present capacitance variations upon the x-y plane that compare favorably to the touchless indication threshold 342, but do not correspond to true and/or intended touchless indications 610 by a user. These "false" touchless indications can be distinguished from "true" touchless indications, and can be similarly removed when generating compensated capacitance image data as discussed previously and/or can otherwise be ignored, where only "true" touchless indications are processed as user input to render interactions with the graphical image data. For example, when a hover region 605 is detected based on corresponding capacitance variation data comparing favorably to the touchless indication threshold 342, the hover region 605 can be identified as a "potential" touchless indication. Characteristics of the hover region 605 and/or other portions of the capacitance image data at the given time and/or across one or more prior temporal periods can be processed to determine whether the potential touchless indication is a true touchless indications or a false touchless indications.

In some embodiments, distinguishing these false touchless indications from true touchless indications can include performing one or more artifact detection functions 2262 and/or artifact compensation functions 2264. In some embodiments, identifying true touchless indication from true touchless indications includes performing a condition detection function 2266, such as the condition detection function 2266-1.

In some embodiments, distinguishing these false touchless indications from true touchless indications can include detecting undesired water touches 274 as false touchless indication and/or undesired hand touches 272 as false touchless indication. In some embodiments, undesired hand hovering, where a hand is hovering rather than touching the display as an undesired hand touch 272, can be similarly detected as a false touchless indications. Other undesired artifacts that are physically touching and/or hovering can be detected and/or processed in a same or similar fashion as the undesired hand touches 272 of FIG. 64H and/or the undesired water touches 274 of FIG. 64I.

In some embodiments, distinguishing these false touchless indications from true touchless indications can include detecting desired pen hovering, where a pen or other object that is hovering rather than touching the display as a desired pen touch 270 can be similarly detected as a true touchless indications, for example, based on comparison to the touchless indication threshold 342 rather than the touch threshold 344. In some embodiments, distinguishing these false touchless indications from true touchless indication can include detecting desired finger hovering, where a finger or other object that is hovering rather than touching the display as a desired finger touch 276 can be similarly detected as a true touchless indication, for example, based on comparison to the touchless indication threshold 342 rather than the touch threshold 344.

In some embodiments, desired finger touches 276 and/or desired pen touches 270, where the pen and/or finger are physically touching the screen, are similarly considered true touchless indications based on comparing favorably to the touchless indication threshold 342 and/or otherwise indicating desired interaction with the graphical image data. For example, objects such as pens and fingers that are utilized by a user to interact with graphical image data via either physical touch or touchless indication are thus processed as true indications by the user for corresponding interaction with the graphical image data.

Alternatively, such finger touches and/or pen touches where the pen and/or finger are physically touching the screen are instead detected and processed as false touchless indications, for example, based on determining the corresponding capacitance variation data was induced via physical touching, for example, based on comparing favorably with the touch threshold 344. In such embodiments, only indications achieved via hovering, and not via physical touch, are identified and processed as true touchless indications, for example, based on presuming that only touchless indication by the user will be imparted by the user, and thus assuming that objects physically touching the surface are undesired artifacts.

FIG. 64AL is a schematic block diagram of an embodiment of a touchless indication determination function 630 in accordance with the present disclosure. The touchless indication determination function 630 operates based on processing potential touchless indication data 631, such as one or more detected hover regions 605 of capacitance image data 1300 and/or compensated capacitance image data 1325, to generate touchless indication determination data indicating whether the potential touchless indication data 631 is a true touchless indication or a false touchless indication. For example, the touchless indication determination function 630 can be implemented as a type of condition detection function 2266, such as the condition detection function 2266-1 operable to detect touchless indications. The touchless indication determination function 630 can otherwise be performed by processing module 42 in processing capacitance image data.

In some embodiments, distinguishing false touchless indications from true touchless indications can include determining whether the given hover region 605 and/or the capacitance image data as a whole compares favorably to touchless indication threshold parameter data 615. The touchless indication threshold parameter data 615 can be predetermined, stored in memory accessible by processing module 42, received from a server system via a network connection, configured by a user of the touch screen 16, generated automatically, for example, based on learned characteristics of touchless indications by the user of the touch screen 16 over time, and/or can otherwise be determined.

In some embodiments, distinguishing false touchless indications from true touchless indications can include generating touchless indication determination data for a potential touchless indication to identify whether the potential touchless indication corresponds to a true touchless indication or a false touchless indication, for example, based on the touchless indication threshold parameter data 615. For example, any hover region in capacitance image data identified based on having capacitance variation data comparing favorably to the touchless indication threshold 342 and/or also comparing unfavorably to the touch threshold 344 can be treated as denoting a potential touchless indication, and can be processed accordingly to generate the touchless indication determination data.

In such embodiments, determining whether a given hover region 605 corresponds to a true touchless indication or a false touchless indication can be a function of at least one of: an area of the given hover region 605, a shape of the given hover region 605, a temporal stability of the given hover region 605, a proximity of the given hover region 605 to at least one selectable element displayed in the graphical image data, and/or other characteristics of the given hover region 605.

The touchless indication threshold parameter data 615 can indicate at least one threshold parameter. For example, any hover region in capacitance image data identified based on having capacitance variation data comparing favorably to the touchless indication threshold 342 and/or also comparing unfavorably to the touch threshold 344 can be treated as denoting a potential touchless indication, and is only deemed a true touchless indication if the detected hover region compares favorably to every parameter of the touchless indication threshold parameter data 615 and/or at least a threshold number of parameters of the touchless indication threshold parameter data 615. Alternatively, the parameters of hover region can be otherwise processed in accordance with corresponding threshold parameters to generate the touchless indication determination data.

Such parameters of the touchless indication threshold parameter data 615 can include a minimum area size parameter, for example, indicating a threshold minimum area size. Such parameters of the touchless indication threshold parameter data 615 can alternatively or additionally include a maximum area size parameter, for example, indicating a threshold maximum area size. The threshold maximum area size and/or the threshold minimum area size can be configured based on a known and/or expected area induced by hovering of one or more fingers, a pen, and/or another object configured to interact via touchless hovering with touch screen 16. For example, the detected hover region 605 is identified as a false touchless indication, and is thus not processed as a touchless indication, when: the area of the detected hover region 605 is less than, or otherwise compares unfavorably to, the threshold minimum area size, and/or when the area of the detected hover region 605 is greater than, or otherwise compares unfavorably to, the threshold maximum area size. In such cases, the detected hover region 605 is only identified as a true touchless indication when the area of the detected hover region 605 compares favorably to the threshold minimum area size and compares favorably to the threshold maximum area size. Alternatively or in addition, the touchless indication determination data is generated as a function of the difference between the area of the detected hover region 605 and the threshold minimum area size and/or the threshold maximum area size.

Such parameters of the touchless indication threshold parameter data 615 can alternatively or additionally include area shape requirement parameters relating to requirements for the shape of a hover region corresponding to a true touchless indication. For example, the detected hover region 605 is identified as a false touchless indication, and is thus not processed as a touchless indication, when the shape of the detected hover region is dissimilar to or otherwise compares unfavorably to area shape requirement parameters. In such cases, the detected hover region 605 is only identified as a true touchless indication when the shape of the detected hover region 605 compares favorably to the area shape requirement parameters. Alternatively or in addition, the touchless indication determination data is generated as a function of the difference between the shape of detected hover region 605 and area shape requirement parameters.

The area shape requirement parameters can be configured based on a known and/or expected shape induced by hovering of one or more fingers, a pen, and/or another object configured to interact via touchless hovering with touch screen 16, such as a circular and/or oblong shape. In some embodiments, a circular, rectangular, and/or polygonal border surrounding the outer points of a detected hover region must have a length and/or width, such as a major axis and a minor axis, that fall within corresponding maximum and/or minimum threshold, and/or that have a ratio adhering to threshold maximum and/or minimum ratio requirements. In some embodiments, a predefined shape with a predefined area, such as a predefined oblong shape corresponding to an expected hover region of a finger, must overlap with the given detected hover region 605 by a threshold amount and/or must not differ from the given detected hover region 605 by more than a threshold amount.

In some embodiments, the shape parameters include orientation requirements relative to the x-y plane, for example, based on a presumed orientation of the user's finger and/or pen when hovering. Alternatively, the shape parameters are independent of orientation. In some embodiments, the hover region 605 is required to be a contiguous region.

In some embodiments, a smoothing function is optionally applied to the hover region and/or the capacitance image data a whole prior to processing, for example, to smooth and/or remove noise and/or other erroneous capacitance variation measurements in the capacitance image data, such as outlier measurements generated for a small number of individual cross points of the row electrodes and column electrodes. For example, the border of hover region is smoothed as a rounded and/or oblong shape prior to generating the touchless indication determination data.

Such parameters of the touchless indication threshold parameter data 615 can alternatively or additionally include temporal stability threshold parameters relating to the hover region's stability in capacitive image data captured over time. For example, a given hover region tracked over time can be determined to correspond to a true touchless indication based on having movement and/or characteristics indicative of typical and/or expected types of user interaction with the graphical image data, such as moving at a reasonable rate, not changing drastically in size and/or shape, statically hovering in given place, performing a movement corresponding to a touchless gesture command, or otherwise being identified as having behavior indicative of a true touchless indication.

The temporal stability threshold parameters can indicate a minimum threshold temporal period, such as minimum number of milliseconds or other units of time, that the same hover region 605 is consistently included in the capacitive image data Determining that the same hover region 605 can be based on detecting an initial hover region at a given time, and measuring changes in size, shape, orientation, and/or position. The amount and/or rate of measured changes in these parameters can be utilized to determine whether the corresponding hover region 605 indicates a true touchless indication, for example, based on being sufficiently stable, matching known gesture patterns, and/or otherwise matching threshold maximum amounts and/or threshold maximum rates of change of hover region size, shape, orientation, and/or position.

The shape and/or size of an initial hover region can be determined based on determining a border of the hover region, with or without applying a smoothing function. The shape and/or size of subsequently detected hover regions at subsequent times can be determined based on detecting the border of the subsequently detected hover regions, with or without applying the smoothing function. The measured sizes can be compared over time to determine whether the amount of and/or rate of change in size, for example, within the predetermined temporal period, compares favorably to the threshold maximum amounts and/or threshold maximum rates of change in shape and/or size, where the hover region is only identified as a true touchless indication when its measured sizes within the temporal period compare favorably to the threshold amount of and/or rate of change in size. Alternatively or in addition, the touchless indication determination data is generated as a function of the difference between the amount and/or rate of change in size and/or shape of detected hover region 605 to the threshold maximum amounts and/or threshold maximum rates of change in shape and/or size.

The position of an initial hover region can be determined based on determining a centroid of the hover region, for example, as a centroid of a shape defined by the corresponding measured border, with or without applying a smoothing function. The positions of subsequently detected hover regions at subsequent times can be determined based on similarly detecting the centroids of the subsequently detected hover regions, with or without applying the smoothing function. The distances between the measured centroids be compared over time to determine whether the amount of and/or rate of change in position, for example, within the predetermined temporal period, compares favorably to the threshold maximum amounts and/or threshold maximum rates of change in position, where the hover region is only identified as a true touchless indication when its measured positions within the temporal period compare favorably to the threshold amount of and/or rate of change in position. In some embodiments, a shape outlining the measured centroids over time can be utilized to determine whether the hover regions over time compare favorably to a corresponding gesture and/or to other touchless indication behavior that is known and/or expected in interaction with the graphical image data. Alternatively or in addition, the touchless indication determination data is generated as a function of the difference between the amount and/or rate of change in size and/or shape of detected hover region 605 to the threshold maximum amount of change in position, a threshold maximum and/or minimum speed of centroid movement with respect to the x-y plane, and/or a threshold maximum and/or minimum change in velocity of centroid movement with respect to the x-y plane.

Such parameters of the touchless indication threshold parameter data 615 can alternatively or additionally include selectable element proximity parameters relating to the hover region's proximity to a selectable region 720, such as a button or other interface feature, of the graphical image data displayed by the display device of the touch screen 16 with respect to corresponding projections upon the x-y plane. For example, the selectable element proximity parameters can indicate a threshold distance from a given selectable region and/or an area surrounding a displayed selectable element, such as a displayed button, within which touchless indications can be registered. The hover region is only identified as a true touchless indication when its position compares favorably to the selectable region proximity parameters of a given selectable element displayed by the touch screen. This can be based on the hover region overlapping with the selectable region and/or having a centroid that is within a threshold distance from a centroid of the selectable element. Alternatively or in addition, the touchless indication determination data is generated as a function of a distance between the position of the detected hover region and the position and/or boundary of the selectable element.

FIG. 64AM is a pictorial representation of a proximity of a detected hover region 605 and a selectable region 720 displayed in graphical image data 700 by the display 50 of the touch screen, with respect to the x-y plane. An embodiment indicating proximity between a hover region 605 and a selectable region with respect to the x-y plane is illustrated in FIG. 64AM. In this example a proximity measure 718 indicates proximity as a distance between the centroid of the detected hover region 605 on the x-y plane and a centroid of the selectable region 720 on the x-y plane. In particular, the position of the hover region 605 with respect to x-y plane can be based on projecting the hover region 605 upon x-y plane relative to its position within the corresponding touch screen area on the x-y plane, and the position of the selectable region 720 with respect to x-y plane can be based on projecting the selectable region 720 upon x-y plane relative to its position in graphical image data on the x-y plane.

Parameters of the touchless indication threshold parameter data 615 can alternatively or additionally include capacitance variance uniformity parameters relating to the uniformity of the capacitance variance data within the hover region. For example, a given hover region can be deemed a true touchless indication based on a measured variance and/or standard deviation of its capacitance variance data being less than and/or comparing favorably to a threshold variance and/or standard deviation threshold, and can be deemed a false touchless indication based on a measured variance and/or standard deviation of its capacitance variance data exceeding and/or comparing unfavorably to the threshold variance and/or standard deviation threshold. Alternatively or in addition, the touchless indication determination data is generated as a function of the variance and/or standard deviation of the capacitance variance data measured within a detected hover region 605.

Parameters of the touchless indication threshold parameter data 615 can alternatively or additionally include hover distance temporal stability parameters. For example, multiple instances of the hover region tracked over time, such as within a temporal period, can be deemed a true touchless indication based on a measured amount and/or rate of change of its minimum, maximum, and/or average capacitance variance data being less than and/or comparing favorably to a threshold maximum amount and/or maximum rate of change. Multiple instances of the hover region tracked over time, such as within a temporal period, can be deemed a false touchless indication based on a measured amount and/or rate of change of its minimum, maximum, and/or average capacitance variance data exceeding and/or comparing unfavorably to the threshold maximum amount and/or maximum rate of change. In some embodiments, the minimum, maximum, and/or average capacitance variance data measured over time is compared to parameters corresponding to a known touchless gesture, such as timing and/or hover distances of a hovered click motion where the finger is detected to move towards and then away from the touch screen along a path orthogonal to the touch screen, all whilst not touching the touch screen. Alternatively or in addition, the touchless indication determination data is generated as a function of the capacitance variance data measured for a hover region tracked across a temporal period.

Parameters of the touchless indication threshold parameter data 615 can alternatively or additionally include hover region count parameters, for example, indicating parameters relating to how many distinct hover regions can correspond to distinct touchless indications simultaneously, and/or within a same temporal period. For example, multiple detected hover regions can correspond to multiple fingers, noise, artifacts, and/or other objects. A maximum number of hover regions indicated in the hover region count parameters can be configured based on a number of fingers and/or other simultaneous interaction with the touchscreen in different places that is expected, that is required for one or more touchless gestures, that is required and/or expected for interaction with displayed interface elements, and/or that is otherwise known and/or expected. For example, if a user is allowed and/or expected to interact with the touch screen via a single finger or pen and multiple distinct hover regions are identified, some of these hover regions can be ignored as artifacts, such as additional ones of the users fingers not being utilized to actively invoke touchless indications. Alternatively, in some cases, a user can be expected to interact with the touch screen via multiple hover regions, for example, when interacting with a keyboard and/or when performing a touchless gesture requiring multiple fingers.

The hover region count parameters can be applied to flag a number of hover regions as false touchless indications to ensure that less than or equal to the threshold maximum number of hover regions is flagged as a true touchless indication. For example, when more than the threshold maximum number of hover regions are detected, the least favorable ones of the set of hover regions, such as the hover regions comparing least favorably to other ones of the touchless indication threshold parameter data 615, can be identified as false touchless indications. In some cases, all detected hover regions at a given time are identified as false touchless indications, for example, based on all comparing unfavorably to other ones of the touchless indication threshold parameter data 615. In some cases, the application of the hover region court parameters can guarantee that no more than the maximum number of hover regions are identified as true touchless indications at a given time. In some cases, the application of the hover region count parameters can be utilized to identify multiple hover regions detected in different locations within a given temporal period as a same hover region that has moved over time, for example, due to movement of a single finger, rather than different hover regions, for example, due to presence of multiple fingers and/or undesired objects.

Parameters of the touchless indication threshold parameter data 615 can alternatively or additionally include positive capacitance variance data threshold parameters, such as the touchless indication threshold 342 and/or the touch threshold 344, for example, relative to the zone 346. This can include parameters relating to conditions and/or functions for shifting the touchless indication threshold 342 and/or the touch threshold 344, to make these relative thresholds stricter or looser for hover region detection and/or validation as a true touchless indication under different conditions. In some embodiments, the touchless indication threshold parameter data 615 is utilized to detect the hover regions 605 based on its capacitance variance data threshold parameters, for example, to detect a potential touchless indication and/or a true touchless indication based on detecting a hover region having maximum, minimum, and/or average capacitance variance data comparing favorably to the touchless indication threshold 342 and/or the touch threshold 344 as described previously.

In some cases, the positive capacitance variance data threshold parameters are optionally expressed as hover distance threshold parameters. The positive capacitance variance data can otherwise be considered an inverse function of absolute and/or relative hover distance 602.

For example, an estimated hover distance, and/or relative change in hover distance, of a hover region can be a measurable parameter of a given hover region that is detected and/or tracked over time, computed as a function of the capacitance variance data of the hover region, such as the maximum, minimum, and/or average capacitance variance data of the hover region, and/or computed as a function of changes in the capacitance variance data of the hover region as the hover region is tracked over a temporal period. The hover distance threshold parameters can optionally indicate: a maximum and/or minimum threshold hover distance 602, and/or a maximum and/or minimum threshold amount and/or rate of change, for example in a given temporal period. The touchless indication determination data can otherwise be generated as a function of a computed hover distance, a computed change in hover distance, and/or a computed rate of change in hover distance.

The positive capacitance variance data parameters can alternatively or additionally include peak parameter data for a peak identified in capacitance image data, for example, as discussed and illustrated in conjunction with FIGS. 64AF and 64AJ. The peak parameter data can include parameters relating to and/or indicating thresholds for shape of the peak, slope of the peak, symmetry of the peak, and/or other characteristics of an identified peak denoting whether this peak be identified as a true touchless indication. The touchless indication determination data can otherwise be generated as a function of the shape of the peak, slope of the peak, symmetry of the peak, and/or other characteristics of an identified peak.

Parameters of the touchless indication threshold parameter data 615 can alternatively or additionally include anatomical feature mapping parameters, such as the parameters relating to the anatomical feature mapping data that is tracked and detected in capacitance image data as discussed in conjunction with FIGS. 64AO-64AQ. This can include parameters relating to requirements for orientation and/or configuration of the right hand, the left hand, the palm of either hand, and/or one or more fingers upon either hand. This can include parameters denoting that a corresponding finger, hand, or other identifiable anatomical feature or identifiable object such as a pen, must be detected as hovering over the touch screen in anatomical feature mapping data generated for the capacitance image data to identify a true touchless indication, for example, where a hover region that does not correspond to a detected properties of a hovering hand, finger, and/or pen is deemed as a false touchless indication and/or is otherwise identified as noise or an artifact to be ignored and/or removed.

Parameters of the touchless indication threshold parameter data 615 can include other types of thresholds relating to the hover region and/or capacitance image data at a single point of time and/or across a temporal period. Parameters of the touchless indication threshold parameter data 615 can alternatively or additionally include relative weights and/or a function definition for utilizing corresponding parameters of a detected hover region in generating the touchless indication determination data 632, for example, as binary output and/or quantitative output for comparison to a corresponding threshold. Some or all of the touchless indication threshold parameter data 615, and/or corresponding computed parameters of a given detected hover region and/or given capacitance image data prior to and/or after compensation, can otherwise be processed via any other predetermined and/or learned means to generate the touchless indication determination data 632 The touchless indication determination data 632 can optionally be generated via same or different means for different users, different types of graphical image data, and/or different types of touch screens 16, for example, where some or all of the corresponding touchless indication threshold parameter data 615 is the same or different for different users, different types of graphical image data, and/or different types of touch screens 16.

FIG. 64AN illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 64AN can be performed in conjunction with some or all steps method of FIG. 64AK, and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 416 includes processing the capacitance image data to detect a potential touchless indication. For example, performing step 416 is performed in conjunction with performing step 386. Performing step 416 can include detecting at least one hover region 605 in given capacitance image data at a given time and/or across a temporal period and/or processing the hover region 605 as a potential touchless indication. The potential touchless indication can be detected based on identifying portions of the capacitance image data, such as a hover region 605, having capacitance variation data comparing favorably to a touchless indication threshold such as touchless indication threshold 342. The touchless indication can optionally be detected based on identifying portions of the capacitance image data, such as a hover region 605, having capacitance variation data comparing favorably to the touchless indication threshold, and also comparing unfavorably to a touch threshold such as touch threshold 344.

Performing step 416 can include performing step 316 and/or can otherwise include processing capacitance image data to identify the presence or absence of various conditions, such as presence of absence of a condition corresponding to at least one potential touchless indication, and/or to characterize the conditions that were identified, such as characterizing the corresponding hover region.

Step 418 includes generating touchless indication determination data based on detecting the potential touchless indication. This can include comparing the potential touchless indication, such as the corresponding hover region and/or capacitance image data, to touchless indication threshold parameter data 615. For example, performing step 418 includes performing the touchless indication determination function 630. Performing step 418 can include performing step 316 and/or otherwise includes process capacitance image data to identify the presence or absence of various conditions, such as presence of absence of a condition corresponding to at least one true touchless indication, and/or to characterize the conditions that were identified, such as characterizing the potential touchless indication as either a true touchless indication or a false touchless indication. Performing step 416 and/or 418 can include performing condition detection function 2266-1.

Step 420 includes processing the potential touchless indication as a touchless indication only when the touchless indication determination data indicates the potential touchless indication is a true touchless indication. For example, processing the potential touchless indication as a touchless indication can include utilizing the touchless indication as input to a graphical user interface displayed by the touch screen, such as a corresponding click and/or other command, and/or updating the graphical user interface based on the touchless indication. When the potential touchless interaction is identified as a false touchless indication, the corresponding the potential touchless indication is ignored and/or not processed, for example, where this potential touchless indication is not utilized as input to the graphical user interface displayed by the touch screen and/or where the graphical user interface is not updated based on the potential touchless indication not being processed as a touchless indication.

FIGS. 64AO-64AQ present embodiments of touch screen 16 where the capacitance image data is processed to identify the presence of some or all parts of a hand, where one or more individual fingers are identified. This can be utilized to detect which fingers and/or portions of the hand that are detected to be hovering over the screen at a given time should be ignored as artifacts, and which fingers and/or portions of the hand that are detected to be hovering should be utilized to detect corresponding touchless indications. Some or all features and/or functionality of embodiments of touch screen 16 and/or processing module 42 described in conjunction with FIGS. 64AO-64AQ can be utilized to implement the touch screen 16 described in conjunction with FIGS. 57-60, and/or any other embodiment of touch screen 16 and/or processing module 42 described herein.

FIG. 64AO illustrates a schematic block diagram of an anatomical feature mapping data generator function 710 in accordance with the present disclosure. The anatomical feature mapping data generator function 710 operates to generate anatomical feature mapping data 730 for given capacitance image data. The touchless indication determination function 630 can otherwise be performed by processing module 42 in processing capacitance image data.

The anatomical feature mapping data 730 can indicate a physical mapping of anatomical features or other detected objects hovering over the touch screen 16, based on detecting the corresponding features in capacitance image data 1300, prior to and/or after compensation. For example, this mapping is a projection of the detected anatomical features upon the x-y plane, and/or a mapping of these features in the three-dimensional space that includes the x-y plane, relative to the position of the x-y plane. The mapping can indicate a position and/or orientation of various features, and can further identify the detected features as particular anatomical features, such as particular fingers and/or parts of the hand. For example, the anatomical feature mapping data 730 identifies and further indicates position and/or orientation of some or all anatomical features of a given finger, of a given hand, of multiple hands, and/or of objects such as a pen held by one or more hands. Ti anatomical feature mapping data generator function 710 can generate the anatomical feature mapping data 730 based on processing the capacitance image data 1300 at a particular time and/or in capacitance image data generated across a temporal period, for example, to track the detected features as they change position and/or orientation.

The anatomical feature mapping data generator function 710 can generate the anatomical feature mapping data 730 based on utilizing anatomical feature parameter data 725. Given capacitance image data can be processed based on and/or compared to the anatomical feature parameter data 725 to enable identification and/or characterization of particular anatomical features detected to be hovering over the touch screen.

The anatomical feature parameter data 725 can be predetermined, stored in memory accessible by processing module 42, received from a server system via a network connection, configured by a user of the touch screen 16, generated automatically, for example, based on learned characteristics of the hand of a user interacting with of the touch screen 16 over time, and/or can otherwise be determined.

The anatomical feature parameter data 725 can indicate a known structure and/or known characteristics of one or more anatomical features for detection. In particular, the anatomical feature parameter data 725 can indicate and/or be based on known and/or expected size and/or shape of the hand, various movements and/or positions of the hand, shape and/or length of individual fingers, relative position of different fingers on the right hand and on the left hand, various movements and/or positions of the fingers relative to the hand, and/or other parameters characterizing hands and/or fingers, and/or characteristics of capacitance image data for various configurations of the hand when hovering over a corresponding touch screen. In some embodiments, non-anatomical features can similarly be detected and mapped in a similar fashion.

Performing the anatomical feature mapping data generator function 710 can be based on performing at least one image processing function. For example, performing the image processing function can include utilizing a computer vision model trained via a training set of capacitance image data, for example, imposed via various configurations of the hand hovering over a corresponding touch screen display. For example, labeling data for capacitance image data in the training set of capacitance image data can indicate the presence of hover regions, the location and/or bounds of hover regions, a particular finger and/or other particular anatomical feature to which the hover region corresponds, a corresponding orientation and/or configuration of the hand inducing the capacitance image data, and/or other labeling data. The computer vision model can be trained via at least one machine learning function and/or technique and/or at least one artificial intelligence function and/or technique. Performing the anatomical feature mapping data generator function can include utilizing at least one machine learning function and/or technique and/or at least one artificial intelligence function and/or technique.

FIG. 64AP illustrates a pictorial representation of how detected patterns of hover regions in capacitance image data can be utilized to: detect a one or more hands hovering over the touch screen; map the location of individual fingers of the hand and/or the palm of the hand; and/or determine an orientation of the hand and/or of the individual fingers with respect to the x-y plane and/or with respect to the z-axis. In particular, anatomical feature mapping data 730 can be generated to detect particular anatomical features, such as the thumb, index finger, middle finger, ring finger, pinky finger, and/or palm of the right hand and/or the left hand based on utilizing known anatomical structure of the hand to identify corresponding patterns corresponding to different parts of the hand, and/or other anatomical features hovering over the touch screen such as a face, in the capacitance image data. The anatomical feature mapping data 730 can indicate the position of these various anatomical features, such as different fingers of the hand, in two dimensional and/or three dimensional space relative to the touch screen based on corresponding capacitance variance data induced by the hand, and based on leveraging known structure of the hand to detect the features of the hand in the capacitance image data.

For example, FIG. 64AQ depicts the anatomical feature mapping data 730 as a corresponding heat map in the x-y plane, indicated by corresponding capacitance image data, for example, as discussed in conjunction with FIGS. 56-64AI. The anatomical feature mapping data 730 can indicate areas on the x-y plane where different particular fingers and/or the palm are hovering over the touch screen. In the example illustrated in FIG. 64AQ, darker shading indicates higher detected positive capacitance variation data based on fingers that are closer to the touch screen can have hover regions in the capacitance image data with higher positive capacitance variation data, while fingers that are further from the touch screen can have hover regions in the capacitance image data with lower positive capacitance variation data.

In some cases, multiple fingers can induce hover regions 605 based on having capacitance variation data comparing favorably to the touchless indication threshold. In some cases, only one finger is actually intended to render a touchless interaction, where the other fingers should be ignored. In some cases, the finger actually intended to render a touchless interaction may have lower average and/or lower maximum capacitance variance data measured in its hover region 605 than other fingers, for example, due to being further away from the screen during some or all of its interaction with the graphical image data displayed by the touch screen.

The mapping and tracking of one or more hands can be accomplished based on the capacitance image data and/or based on known properties of the hand. This can be utilized to identify some or all fingers and/or parts of the hand as artifacts and/or as false touchless indications, where one or more fingers utilized to perform touchless interactions are detected and tracked in the capacitance image data over time.

In some cases, this can include determining a particular one or more fingers responsible for interaction with the graphical image data displayed by the touch screen, such as the thumb and/or the index finger. This can be based on expected fingers utilized for particular touchless gestures, for interaction with particular types of graphical image data, and/or other touchless indications. Alternatively or in addition, this can be based on user configuration and/or learned user behavior overtime to determine preferred fingers and/or a preferred hand of the user for performing various touchless gestures, for interacting with various types of graphical image data, and/or performing any other touchless indications. The determined one or more fingers expected and/or known to be responsible for performing touchless interactions can be identified in the capacitance image data, for example, relative to other portions of the hand that are detected, and/or can be tracked over time accordingly.

In some embodiments, the hover regions 605 for these determined fingers can be processed as true touchless indications, for example, when applicable based on otherwise meeting the touchless indication threshold parameter data 615 at various times. In some embodiments, the hover regions 605 for other fingers can be processed as false touchless indications at all times and/or can have stricter corresponding touchless indication threshold parameter data 615 required to determine their interactions are true touchless indications, for example, due to being less commonly used and/or less likely to be used. In some embodiments, other hover regions 605 detected but determined not to be a part of the mapped hand can be processed as false touchless indications at all times based on being identified as artifacts. Alternatively, in some embodiments, a pen or other tool held by the user can similarly be mapped and tracked to render corresponding true touchless indications.

In this example, the thumb and index finger are detected as being closest to the screen based on being differentiated from the other fingers based on their relative ordering upon the hand, and based on their corresponding hover regions having highest capacitance variance data In some embodiments, only the index finger's hover region in this example is determined to correspond to a true touchless indication based on being detected to be closest to the screen, based on the index finger being determined to be most likely to perform touchless indications, and/or based on the hover region count parameters indicating use of only one finger. In other embodiments, both the index finger's hover region and the thumb's hover region in this example are determined to correspond to true touchless indications based on both being detected to be closest to the touch screen, based on the index finger being determined to be most likely to perform touchless indications, based on the hover region count parameters indicating use of two fingers, and/or based on the user performing a touchless gesture involving the use of two fingers, such as the index finger and the thumb.

FIG. 64AQ illustrates a flow diagram of an embodiment of a method in accordance with the present disclosure. In particular a method is presented for use in conjunction with the processing module 42, touch screen 16, and/or other processing modules and/or touch screen displays disclosed herein. Some or all steps of FIG. 64AQ can be performed in conjunction with some or all steps method of FIG. 64AK, and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 426 includes processing the capacitance image data to generate anatomical feature mapping data. Performing step 426 can include detecting at least one hover region 605 in given capacitance image data at a given time and/or across a temporal period and/or processing the hover region 605 as a potential touchless indication. The anatomical feature mapping data can be detected based on identifying portions of the capacitance image data, such as a hover region 605, having capacitance variation data comparing favorably to a touchless indication threshold such as touchless indication threshold 342. The anatomical feature mapping data can optionally be detected based on identifying hover regions 605 with shapes and/or relative positions comparing favorably to known anatomy of a hand and/or a finger.

Performing step 426 can include performing step 316 and/or can otherwise include processing capacitance image data to identify the presence or absence of various conditions, such as presence of absence of a condition corresponding to detection of one or more hover regions corresponding to parts of a hand, and/or to characterize the conditions that were identified, such as characterizing the orientation of the hand, identifying whether the hand is the right hand or the left hand, characterizing the relative position of some or all individual fingertips of the hand, and/or other parts the hand relative to the x-y plane and/or relative to the x-axis.

Step 428 includes detecting a touchless interaction based on the anatomical feature mapping. For example, performing step 428 is performed in conjunction with performing step 386. This can include determining one or more particular fingers in the anatomical feature mapping as fingers responsible for touchless indications, and/or determining one or more particular fingers in the anatomical feature mapping as artifacts to be ignored. For example, step 428 is performed in conjunction with performing step 418. Performing step 428 can include performing step 316 and/or otherwise includes process capacitance image data to identify the presence or absence of various conditions, such as presence of absence of a condition corresponding to at least one touchless indication by a particular finger of the hand, and/or to characterize the conditions that were identified. Performing step 426 and/or 428 can include performing condition detection function 2266-1.

FIGS. 64AR-64AY present embodiments of touch screen 16 where detected hover regions 605 are processed to identify a particular touchless indication point 745 within the hover region. In particular, in instances where a user is hovering over a touch screen to interact with the touchscreen via touchless "clicks" or gestures, granularity may be required to identify a particular point or points upon the graphical image data that the user is selecting, or otherwise indicating via a touchless indication, at a particular time. Some or all features and/or functionality of the touch screen 16 and/or processing module 42 of embodiments discussed in conjunction with FIGS. 64AR-64AY can be utilized to implement the touch screen 16 and/or processing module 42 of FIGS. 57-60, and/or any other embodiment of touch screen 16 and/or processing module 42 described herein.

The touchless indication point 745 can be determined as a point in x-y space, for example, corresponding to a particular pixel and/or small set of adjacent pixels of the graphical image data displayed by display 50 the touch screen 16. The touchless indication point 745 can be a singular point, for example, with no corresponding area. Alternatively, the touchless indication point 745 can have a small area that is, for example, smoothed from the hover region 605 and/or substantially smaller than the area of a corresponding hover region 605.

FIG. 64AR illustrates a schematic block diagram of a touchless indication point identification function 740 in accordance with the present disclosure. The touchless indication point identification function 740 operates to determine a touchless indication point within a given detected hover region 605, such as a hover region 605 of a particular finger in the anatomical feature mapping data 730 and/or a hover region identified as corresponding to a true touchless indication in the touchless indication determination data. For example, the touchless indication point identification function 740 can be implemented as a type of condition detection function 2266, such as the condition detection function 2266-1 operable to detect touchless indications, where the output of condition detection function 2266-1 includes detection of a particular touchless indication point. The touchless indication determination function 630 can otherwise be performed by processing module 42 in processing capacitance image data.

In particular, the touchless indication point 745 can be computed and/or otherwise identified as a function of the corresponding detected hover region 605. Performing touchless indication point identification function 740 can include processing a given hover region 605 to identify the shape and bounds of the hover region 605 projected upon the x-y plane, for example, as a contiguous region, and identifying a particular touchless indication point 745 as a point upon the x-y plane that is within the hover region projected upon the x-y plane. Performing touchless indication point identification function 740 can include processing other portions of the corresponding capacitance image data, and/or processing recent positions of the hover region 605 in previously captured capacitance image data, for example, as the given hover region is tracked across a temporal period.

In some embodiments, performing touchless indication point identification function 740 can include computing the touchless indication point 745 as a centroid of the hover region 605. Such an example is illustrated in FIG. 64AS, where a centroid of a detected hover region 605 is computed and identified as the touchless indication point 745. For example, the hover region 605 of the example of FIG. 64AS can correspond to the hover region 605.2 of FIGS. 64AH-59D and/or can otherwise be detected as a region upon the x-y plane discussed herein.

Alternatively or in addition, performing touchless indication point identification function 740 can include performing a smoothing function upon the detected hover region 605 to update the identified the hover region 605 as a smoothed hover region 744, such as a circle and/or oblong shape, and/or a region having a size and/or shape of a fingertip and/or tip of a pen or stylus. The touchless indication point 745 can be identified as a centroid of the smoothed hover region 744 within the smoothed shape. FIG. 64AT illustrates such an example of identification of a centroid of an example smoothed hover region 644. For example, the smoothed hover region 644 of FIG. 64AT is generated by performing a smoothing function upon hover region 605.2 of FIGS. 64AH-59D and/or another detected hover region 605.

In some embodiments, rather than identifying the touchless indication point 745 as a centroid of a raw and/or smoothed hover region 605, performing touchless indication point identification function 740 can alternatively or additionally include identifying a point in the hover region having a maximal positive capacitance variance relative to all other points within the detected hover region, and identifying this point as the touchless indication point 745. In cases where adjacent points within the detected hover region have higher positive capacitance variance relative to some or all other points within the detected hover region, such as a set of adjacent points comparing favorably to a touchless point threshold that is higher than the touchless indication threshold 342, a centroid of these adjacent points can be computed as the touchless indication point 745.

FIGS. 64AU and 64AV illustrate such an example where a local maxima 748 of a hover region 605 with respect to the capacitance image data is identified and utilized as the touchless indication point 745. FIG. 64AU illustrates detection of this local maxima 748, for example, based on having a maximal capacitance variation value indicated in the corresponding capacitance image data across all values within the hover region 605. FIG. 64AV illustrates the corresponding detected hover region and touchless indication point 745, identified as the local maxima 748 illustrated in FIG. 64AU, upon the x-y plane. For example, the hover region 605 of the example of FIGS. 64AU and 64AV can correspond to the hover region 605.2 of FIGS. 64AH-59D and/or can otherwise be detected as a region upon the x-y plane discussed herein.

The touchless indication point 745 can be identified via other means not illustrated in the examples of FIGS. 64AS-64AV. In some embodiments, the touchless indication point 745 is identified based on anatomical features of the hand and/or finger. For example, where a tip of the finger or other predetermined point upon the finger, for example, relative to the hand and/or based on mapped structure of the finger, is always utilized as the touchless indication point 745. In some embodiments, the touchless indication point 745 is adjacent to and/or upon the border of the hover region 605, for example, where the user optionally "underlines" the point on the touch screen with their finger that they wish to select or otherwise indicate. This can be ideal in embodiments where the user benefits from seeing the portion of the screen they wish to indicate, rather than the touchless indication point 745 being obscured by their finger, pen, or hand based on being directly under their finger, pen, or hand.

The touchless indication point 745 can otherwise be identified via any other predetermined and/or learned means. The touchless indication point 745 can optionally be identified in same or different means for different users, different types of graphical image data, and/or different types of touch screens 16.

The identified touchless indication point 745, rather than the corresponding hover region 605 as a whole, can be utilized in identifying and/or generating command data for interactions with the graphical image data displayed by touch screen 16. For example, as the user moves their hovered finger with respect to the x-y plane, the touchless indication point 745 can act as a cursor upon graphical image data and/or can be utilized to identify the location upon graphical image data indicated by a corresponding cursor. As another example, the touchless indication point 745 can indicate a discrete point of the graphical image data, within the hover region 605 projected upon the graphical image data, corresponding to selection by the user and/or corresponding to a given gesture.

Such functionality can be favorable in embodiments of touch screen 16 involving interaction with a user interface element with multiple small discrete selectable regions, such as different letters of a keyboard display, that may necessitate that a small point within a detected hover region, rather than the full hover region, be applied to distinguish selection between the multiple small discrete selectable regions. Such functionality can alternatively or additionally be favorable in embodiments of touch screen 16 involving interaction with a user interface requiring tracing of a thin shape, such as a an interface element where a user supplies a signature via a touchless interaction or sketches a shape via a touchless interaction, may require such granularity in identifying a series of small connected points of a granular width, such as a small number of pixels substantially smaller in width than a width of a hover region induced by a finger, to form the thin shape.

A particular example of distinguishing touchless interaction as selection of one selectable region from a set of small selectable regions in close proximity is illustrated in FIG. 64AW. In this example, despite the hover region 405 being detected as overlapping both selectable region 720.1 and 720.2 of graphical image data displayed by the display 50 of the touch screen 16, only selectable region 720.2 is determined to be selected by the user based on the touchless indication point 745 being included in the selectable region 720.2 and not the selectable region 720.1. As a particular example, the selectable regions 720.1, 720.2, and 720.3 correspond to adjacent keys on a keyboard interface element displayed by the touch screen 16 and/or correspond to adjacent numbers of a number pad interface element displayed by the touch screen 16.

A particular example of touchless interaction as tracing a thin shape, such as a signature, is illustrated in FIG. 64AX. In this example, as the user traces their signature via correspond movement of a finger with respect to the x-y axis while hovering over the touch screen, only the tracked position of the touchless indication point as the finger moves over time is utilized to render the corresponding shape, such as the signature depicted in FIG. 64AX. For example, a corresponding selectable region 720.4 of graphical image data 700 can be configured for interaction by a user to trace their signature within this selectable region 720.4. Such functionality can be ideal in embodiments where the touch screen 16 is implemented as a publicly-used touch screen at a point of sale where customers can supply a signature as part of performing a transaction via hovering over the publicly-used touch screen to achieve a touchless transaction.

FIG. 64AY illustrates a flow diagram of an embodiment of a method in accordance with the present disclosure. In particular a method is presented for use in conjunction with the processing module 42, touch screen 16, and/or other processing modules and/or touch screen displays disclosed herein. Some or all steps of FIG. 64AY can be performed in conjunction with some or all steps method of FIG. 64AK, and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 436 includes processing the capacitance image data to determine a hover region. Performing step 436 can include detecting at least one hover region 605 in given capacitance image data at a given time and/or across a temporal period, and/or can include first processing the hover region 605 as a potential touchless indication to identify the hover region as a true touchless indication. For example, step 436 is performed in conjunction with performing step 416 and/or 418. The hover region can be detected based on identifying portions of the capacitance image data having capacitance variation data comparing favorably to a touchless indication threshold such as touchless indication threshold 342. The hover region can be detected based on identifying a corresponding finger in anatomical feature mapping data. The determined hover region can correspond to a raw hover region from the capacitance image data and/or can correspond to a smoothed hover region generated by applying a smoothing function to the raw hover region.

Performing step 436 can include performing step 316 and/or can otherwise include processing capacitance image data to identify the presence or absence of various conditions, such as presence of absence of a condition corresponding to detection of a hover regions, and/or to characterize the conditions that were identified, such as characterizing the hover region.

Step 438 includes identifying, based on the hover region, a touchless indication point within the two-dimensional area corresponding to a touchless indication. For example, performing step 438 includes performing the touchless indication point identification function 740, and/or otherwise includes identifying the touchless indication point as a point included in and/or otherwise based on the detected hover region.

Step 436 and/or 438 can be performed in conjunction with performing step 386. Performing step 436 and/or 438 can include performing condition detection function 2266-1.

FIGS. 64AZ-64BA present embodiments of touch screen 16 where a detected hover region and/or corresponding touchless indication point is tracked over time. In particular, once an initial hover region is detected and/or deemed a true touchless indication, the persistence of this hover region at subsequent times can be expected, for example, in the same location or neighboring locations on the x-y plane. Continued detection of this given hover region can be based on loosened parameters, for example, that are loosened from and/or different from another set of parameters utilized to initially detect this hover region. Some or all features and/or functionality of the touch screen 16 and/or processing module 42 of embodiments discussed in conjunction with FIGS. 64AZ-64BA can be utilized to implement the touch screen 16 and/or processing module 42 of FIGS. 57-60, and/or any other embodiment of touch screen 16 and/or processing module 42 described herein.

FIG. 64AZ is a schematic block diagram of an embodiment of an initial touchless indication detection function 762 and a maintained touchless indication detection function 768 in accordance with the present disclosure. The initial touchless indication detection function 762 and/or the maintained touchless indication detection function 768 can be performed by processing module 42 in conjunction with processing capacitance image data 1300, prior to and/or after compensation.

The initial touchless indication detection function 762 can operates based on processing raw and/or compensated capacitance image data 1300 captured within an initial temporal period t0, such as a single capacitance image data 1300 at a single time or a stream of sequentially generated capacitance image data 1300 heat maps 1300.1-1300.*i* captured within a temporal period t0 to first identify detection of a touchless indication in generating touchless indication detection data 764.

The touchless indication detection data 764 can indicate a hover region 605, a corresponding touchless indication point 745, a touchless gesture, or can otherwise indicate detection of a touchless indication. In some embodiments, performing the initial touchless indication detection function 762 includes processing potential touchless indication data 631 of the capacitance image data 1300 of temporal period t0 to determine whether a true touchless indication is detected as discussed in conjunction with FIG. 64AL, where the touchless indication detection data 764 indicates detection of a touchless indication based on the potential touchless indication data being determined to correspond to a true touchless indication.

In some embodiments, initially detecting a given touchless indication can include determining whether the given capacitance image data of temporal period t0 compares favorably to initial touchless threshold parameter data 765. The initial touchless threshold parameter data 765 can be predetermined, stored in memory accessible by processing module 42, received from a server system via a network connection, configured by a user of the touch screen 16, generated automatically, for example, based on learned characteristics of touchless indications by the user of the touch screen 16 over time, and/or can otherwise be determined. In some embodiments, the initial touchless threshold parameter data 765 is implemented touchless indication threshold parameter data 615 discussed in conjunction with 61A, and/or performing the initial touchless indication detection function involves processing of some or all of the types of parameters and/or threshold requirements discussed in conjunction with 61A.

Once touchless indication detection data 764 is detected, a maintained touchless indication detection function 768 can be processed to generate subsequent touchless indication detection data 764 in a temporal period t1 following t0. This subsequently generated subsequent touchless indication detection data 764 can be based on detecting and/or tracking persistence of initially detected touchless indication, and/or to detect further touchless indications after the initially detected touchless indication, in subsequently generated raw and/or compensated capacitance image data, such as a set of sequentially generated capacitance image data 1300 *i*+1-1300.*j* within the temporal period t1 and/or any other capacitance image data generated after temporal period t0.

For example, the touchless indication detection data 764 indicates detection of a touchless indication based on initially detecting a finger that has begun hovering over the touch screen, that has initiated a touchless gesture, that has completed a first touchless gesture, and/or has otherwise initiated interaction with the touchscreen, potentially with further touchless indications to come. Subsequently generated subsequent touchless indication detection data 764 can be generated via performance of the maintained touchless indication detection function 768 to track movement of the given finger in the x-y plane and/or perpendicular to the touch screen once it has been initially detected, to track completion of a touchless gesture and/or identify the touchless gesture once completed, to detect subsequent touchless indications to the touch screen after an initial touchless interaction, to process with generating a mapping of the hand as anatomical feature mapping data or to otherwise detect introduction of new fingers and process these new fingers as fingers providing subsequent touchless indications or as artifacts, and/or to otherwise facilitate continued detection of touchless interaction after initially detecting touchless interaction.

The maintained touchless indication detection function 768 can utilize touchless indication detection data 747 generated previously by the initial touchless indication determination, for example, to facilitate tracking of a given hover region and/or touchless indication point. In particular, given touchless indication detection data 764 can be generated based on prior touchless indication detection data 764, for example, to track a stable position of and/or movement of a given touchless indication. This can include identifying a new position of the hover region and/or touchless indication point 745 with respect to the x-y plane and/or the z-axis as a function of the most recently tracked prior position of the hover region and/or touchless indication point 745, for example, where the new position of the hover region and/or touchless indication point 745 indicates a reasonably small and/or expected type of shift in position and/or intensity of the hover region and/or touchless indication point 745.

The most recent position of the of the hover region and/or touchless indication point 745 can optionally be weighted and/or otherwise processed to identify the new hover region and/or touchless indication point 745 as being in the same location or a similar location. Probabilities of various types of movements, such as probability of stability vs movement of the hover region along the x-y plane, probability of stability vs movement of the hover region along the z-axis, probability of various speeds and/or directions of movements of the hover region along the x-y plane, and/or probability of various speeds and/or directions of movements of the hover region along the z-axis, can be predetermined and/or learned over time, and can be optionally utilized to determine the new position of the hover region. For example, if stability of the hover region has a high probability, ambiguity in the most recent touchless indication detection data can be processed by presuming that the hover region has maintained its same position, while if stability of the hover region has a lower probability, ambiguity in the most recent touchless indication detection data can be processed by presuming that the hover region has moved from its given position to a new position.

Such probabilities can optionally be a function of a corresponding type of graphical image data being displayed, types of selectable regions being displayed, and/or learned behavior of the given user. Such probabilities can optionally be a function of corresponding types of gestures, where initialization of a type of gesture can be detected, and the user can be presumed to continue a type of movement corresponding to completion of the type of gesture.

Furthermore, the maintained touchless indication detection function 768 can optionally be configured to leverage the knowledge that a current and/or recent touchless indication has been detected via initial touchless indication detection function 762. For example, once a touchless indication has been detected, the maintained touchless indication detection function 768 can operate on the presumption that this touchless indication is likely to persist and/or that further touchless indication are likely to follow. In particular, the probability of true existence of touchless indications in capacitance image data 1300.*i*+1 can be presumed to be significantly higher than the probability of true existence of touchless indications in capacitance image data 1300.1, as the user is expected to continue interaction with the touch screen fora least some period of time after initial touchless interaction is detected. For example, ambiguity in subsequent capacitance image data can be processed to presume that the user has maintained interaction with the touch screen, and that a hover region is more likely to exist.

The maintained touchless indication detection function 768 can thus generate touchless indication detection data 764 based on determining whether the given capacitance image data of temporal period t1 compares favorably to maintained touchless indication threshold parameter data 767. In particular, some or all of the maintained touchless indication threshold parameter data 767 can be looser than the initial touchless indication threshold parameter data 767, where some or all corresponding threshold requirements for detection are less strict than that of the initial touchless indication threshold parameter data 767.

The maintained touchless indication threshold parameter data 767 can be predetermined, stored in memory accessible by processing module 42, received from a server system via a network connection, configured by a user of the touch screen 16, generated automatically, for example, based on learned characteristics of touchless indications by the user of the touch screen 16 over time, and/or can otherwise be determined. In some embodiments, the maintained touchless indication threshold parameter data 767 is implemented touchless indication threshold parameter data 615 discussed in conjunction with 61A, and/or performing the maintained touchless indication detection function involves processing of some or all of the types of parameters and/or threshold requirements discussed in conjunction with 61A.

For example, in some embodiments, a touchless indication threshold 342 of the initial touchless threshold parameter data 765 can be higher than and/or otherwise stricter than the touchless indication threshold 342 of the maintained touchless threshold parameter data 767. Alternatively or in addition, a touch threshold 344 of the initial touchless threshold parameter data 765 can be lower than and/or otherwise stricter than a touch threshold 344 of the maintained touchless threshold parameter data 767. Alternatively or in addition, a threshold minimum area size of the initial touchless threshold parameter data 765 can be greater than, or otherwise stricter than, a threshold minimum area size of the maintained touchless threshold parameter data 767. Alternatively or in addition, a threshold maximum area size of the initial touchless threshold parameter data 765 can be smaller than, or otherwise stricter than, a threshold maximum area size of the maintained touchless threshold parameter data 767. Alternatively or in addition, area shape requirement parameters of the initial touchless threshold parameter data 765 can be stricter than area shape requirement parameters of the maintained touchless threshold parameter data 767. Alternatively or in addition, temporal stability parameters of the initial touchless threshold parameter data 765 can be stricter than area shape requirement parameters of the maintained touchless threshold parameter data 767. For example, the minimum threshold temporal period of the initial touchless threshold parameter data 765 can be stricter than the minimum threshold temporal period of the maintained touchless threshold parameter data 767; the threshold maximum amounts and/or threshold maximum rates of change in shape and/or size of the initial touchless threshold parameter data 765 can be stricter than the threshold maximum amounts and/or threshold maximum rates of change in shape and/or size of the maintained touchless threshold parameter data 767; the threshold maximum and/or minimum speed of centroid movement with respect to the x-y plane of the initial touchless threshold parameter data 765 can be stricter than the threshold maximum and/or minimum velocity of centroid movement with respect to the x-y plane of the maintained touchless threshold parameter data 767; the threshold maximum and/or minimum speed of centroid movement with respect to the x-y plane of the initial touchless threshold parameter data 765 can be stricter than the threshold maximum and/or minimum velocity of centroid movement with respect to the x-y plane of the maintained touchless threshold parameter data 767; the threshold distance from a given selectable region of the initial touchless threshold parameter data 765 can be stricter than the threshold distance from a given selectable region of the maintained touchless threshold parameter data 767; the capacitance variance uniformity parameters of the initial touchless threshold parameter data 765 can be stricter than the capacitance variance uniformity parameters of the maintained touchless threshold parameter data 767; the hover distance temporal stability parameters of the initial touchless threshold parameter data 765 can be stricter than the hover distance temporal stability parameters of the maintained touchless threshold parameter data 767; the hover region count parameters of the initial touchless threshold parameter data 765 can be stricter than the hover region count parameters of the maintained touchless threshold parameter data 767; and/or other parameters and/or requirements for maintained detection of touchless indication after initial detection of touchless indication can otherwise be looser than that utilized for this initial detection of touchless indication.

Once touchless indication detection data no longer indicates detection and/or tracking of touchless indication, for example, based on a user ending their given interaction with the touch screen, subsequent interaction can again require detection via the initial touchless indication detection function 762, where the process of tracking touchless interaction is repeated for a new initially detected touchless interaction.

FIG. 64BA illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 64BA can be performed in conjunction with some or all steps method of FIG. 64AK and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. For example, performing step 384 includes performing step 312 and/or otherwise includes generating capacitance image data including positive capacitance variation data and negative capacitance variation data. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 466 includes processing the capacitance image data to identify an initial hover region and/or touchless indication point. For example, performing step 466 is performed in conjunction with performing step 386 and/or steps 416-418. The hover region can be detected based on identifying portions of the capacitance image data having capacitance variation data comparing favorably to a touchless indication threshold such as touchless indication threshold 342. Performing step 466 can include performing the initial touchless indication detection function 762.

Step 468 includes processing updated capacitance image data to identify an updated hover region and/or an updated touchless indication point. For example, performing step 468 is performed in conjunction with performing step 386 and/or steps 416-418. Performing step 468 can include performing the maintained touchless indication detection function 768.

FIGS. 64BB-64BD present embodiments of touch screen 16 where one or more types of touchless gestures are detected. In particular, one or more types of touchless gestures performed via hover over touch screen 16 within a temporal period, for example, via one or more fingers, can correspond to various types of interface commands utilized to facilitate various types of user interaction with graphical image data. Some or all features and/or functionality of the touch screen 16 and/or processing module 42 of embodiments discussed in conjunction with FIGS. 64BB-64BD can be utilized to implement the touch screen 16 and/or processing module 42 of FIGS. 57-60, and/or any other embodiment of touch screen 16 and/or processing module 42 described herein.

FIG. 64BB is a schematic block diagram of an embodiment of a touchless gesture identification function 820 in accordance with the present disclosure. For example, the touchless gesture identification function 820 can be implemented as a type of condition detection function 2266 operable to detect touchless gestures, such as the condition detection function 2266-1 operable to detect touchless indications, where these touchless indications correspond to touchless gestures. This can include detecting the presence or absence of various conditions corresponding to one or more types of touchless gestures, and/or to characterize the conditions that were identified, such as distinguishing the type of touchless gesture, its corresponding location, and/or corresponding command data corresponding to performance of the particular touchless gesture. The touchless indication determination function 630 can otherwise be performed by processing module 42 in processing capacitance image data.

The touchless gesture identification function 820 can be performed by processing a capacitance image data stream 805, for example, that includes a stream of sequentially generated capacitance image data 1300, prior to and/or after compensation, to enable detect and/or tracking of movements of hovering fingers and/or objects based on corresponding changes in capacitance image data of the capacitance image data stream 805 across a temporal period. This can include: detecting and tracking one or more hover regions 605 in the stream of sequentially generated capacitance image data within a temporal period; detecting and tracking one or more touchless indication points 745 in the stream of sequentially generated capacitance image data within a temporal period; detecting and tracking anatomical feature mapping data 730 in the stream of sequentially generated capacitance image data within a temporal period; and/or otherwise detecting changes in the capacitance image data denoting performance of particular gestures by one or more fingers, hands, or objects hovering over the touch screen 16.

Performing the touchless gesture identification function 820 can include generating corresponding touchless gesture identification data 825 identifying a particular touchless gesture type 813, for example, from a set of different possible touchless gestures of a touchless gesture set 812. A given touchless gesture type 813 can be identified based on the capacitance image data stream 805 comparing favorably to corresponding touchless gesture pattern data 815 of the given touchless gesture type 813. Different touchless gesture types 813 can have different touchless gesture pattern data 815, indicating respective differences in these different gestures. The touchless gesture pattern data 815 for each touchless gesture type 813 of the touchless gesture set 812 can be predetermined, stored in memory accessible by processing module 42, received from a server system via a network connection, configured by a user of the touch screen 16, generated automatically, for example, based on learned characteristics of touchless indications by the user of the touch screen 16 over time, and/or can otherwise be determined.

Given gesture pattern data 815 can indicate: a number of fingers and/or other hovering objects involved in the corresponding type of gesture; threshold minimum and/or maximum time frames for performing the gesture as a whole and/or for performing discrete segments of the gesture; shape, speed, direction, and/or ordering of movement to perform the gesture with respect to the x-y plane; speed, direction, and/or ordering of movement to perform the gesture with respect to the z-axis; portions of the x-y plane upon which the gesture can be performed and/or detected, and/or other parameters defining the gesture and/or indicating threshold requirements for detection of the gesture. The gesture pattern data 815 for one or more types of gestures can be optionally implemented as touchless indication threshold parameter data 615, and/or can otherwise include and/or involve processing of one or more corresponding parameters discussed in conjunction with the touchless indication threshold parameter data 615.

The gesture pattern data 815 can optionally indicate relative position and/or orientation of anatomical features and/or other identifiable objects in performing the gesture, or movement patterns relating to the relative position and/or orientation of anatomical feature and/or other identifiable objects in performing the gesture, such as various finger and/or hand manipulation. For example, performing the touchless gesture identification function 820 to identify a given gesture can include generating and/or processing anatomical feature mapping data 730 to identify static and/or dynamic properties of various features, such as various fingers, in the anatomical feature mapping data 730 that match and/or compare favorably to gesture pattern data 815 of a given type of gesture.

In some embodiments, the gesture pattern data 815 can indicate a corresponding gesture pattern performed based on changes in configuration of one or more joints of a particular finger via anatomical properties of individual fingers, such as patterns relating to bending at or straightening at one or more joints of the given finger, and/or moving towards and/or away from other fingers. For example, one given gesture pattern can involve one or more fingers statically maintaining and/or moving in or out of a straightened position, while another one given gesture pattern can involve one or more fingers statically maintaining and/or moving in or out of a bent position, such as the forming of a fist.

In some embodiments, the gesture pattern data 815 can indicate a corresponding gesture pattern performed based on changes in position and/or orientation of the hand via anatomical properties via anatomical properties of the hand, such as patterns relating to bending and/or rotating about the wrist, motion and/or rotation induced by bending and/or rotating about the elbow and/or shoulder. For example, one given gesture pattern can involve the hand rotating about the wrist, where the top of the hand moves towards and/or away from the top of the forearm, while another given gesture pattern can involve the hand rotating about another direction such as orthogonal direction, based on the top of the hand and the forearm rotating together from the elbow.

In some cases, the gesture pattern data 815 can involve at least one touch to the touch screen, for example, by one or more particular fingers, but the corresponding type of gesture can be distinguished from other types of gestures based on static and/or dynamic characteristics of other fingers and/or parts of the hand that are hovering over the touch screen. For example, one given gesture pattern can involve touching the screen via a given finger, such as the index finger, while the remainder of the fingers are bent to form a fist, another given gesture pattern can also involve touching the screen via the given finger, while the remainder of the fingers are extended, and/or another given gesture pattern can also involve touching the screen via the index finger, while the thumb dynamically moves up and down while hovering. In such cases, while touch-based detection of the given finger touching may be involved in these touchless gestures, distinguishing of a given gesture, and thus identification of a particular corresponding command, requires detection and characterizing of hovering features, such as the other fingers of the hand, for example, based on generating and processing anatomical feature mapping data 730.

Performing the touchless gesture identification function 820 can include identifying the touchless gesture as a true touchless indication, for example, based on performing the touchless indication determination function 630. Performing the touchless gesture identification function 820 can include identifying initiation of the touchless gesture, and then tracking the remainder of the performance of the touchless gesture, for example, based on first performing the initial touchless indication detection function 762 to identify initiation of a touchless gesture, and performing the maintained touchless indication detection function 768 to track the movements involved in touchless gesture to ultimately identify the touchless gesture.

The touchless gesture identification data 825 can optionally indicate a gesture starting position, gesture ending position, and/or tracked movement from the starting position to the ending position. The starting position and/or the ending position can be an x-y position, such as a hover region 605 and/or touchless indication point 745. The starting position, the ending position, and/or respective movement can optionally have a z-component, based on respective hover distance and/or changes in hover distance when performing the gesture. If multiple fingers, hands and/or object are involved in performing the gesture, the touchless gesture identification data 825 can further indicate gesture starting position, ending position, and/or tracked movement from the starting position to the ending position for each finger, hand, and/or object.

The starting position, ending position, and/or tracked movement can further identify particular interaction and/or command indicated by the gesture, for example, based on an interface element and/or properties of a selectable region at the starting position and/or ending position. As a particular example, a type of gesture can be identified as a touchless selection gesture, and a hover region and/or touchless indication point identified for the touchless selection gesture can indicate touchless selection of a selectable region, such as a particular button, at the hover region and/or touchless indication point.

The type of gesture and this additional information denoted by some or all of the tracked movement can be utilized to facilitate corresponding interaction with the graphical image data, for example, based on being processed as a corresponding command by the processing module 42. This can include updating the graphical image data and/or transmitting data to a corresponding server system hosting a corresponding application executed by the touch screen and/or a corresponding webpage accessed via a web browser application executed by the touch screen. This can include processing the corresponding the touchless gesture in a same or similar fashion as one or more commands induced by one or more types of touch-based interactions with the touch screen.

For example, the touchless gestures set 812 can include touchless gesture types 813 corresponding to interactive interface commands, such as: selection of a selectable interface element, such as a button, displayed by graphical image data 700 at a touchless indication point or hover region indicated by the touchless gesture; zooming in on the graphical image data 700 at a touchless indication point indicated by the touchless gesture; zooming out on the graphical image data 700 at a touchless indication point indicated by the touchless gesture; scrolling up, down, left, or right on the graphical image data 700; configuring and/or changing other parameters corresponding to display of the graphical image data 700; configuring and/or changing other parameters corresponding to touch screen 16 such as display brightness, speaker volume; selection of a particular application for execution by the touch screen 16 and/or exiting from execution of a particular application being executed by touch screen 16; inducing execution of instructions by application data currently executed by the touchscreen and/or corresponding to the graphical image data 700; inducing transmission of data to a server system corresponding to an application and/or web browser currently displayed by the touchscreen and/or corresponding to the graphical image data 700; entering a touchless mode of operation; exiting a touchless mode of operation; facilitating execution of a command that can be induced via a touch-based gesture or indication by the given touch screen and/or by other touch screens; and/or other instructions.

FIG. 64BC illustrates performance and detection of an example touchless gesture 810. A touchless gesture can correspond to a type of touchless indication 610, where some or all touchless indications described herein are optionally implemented as a touchless gesture 810, and/or as part of a touchless gesture, for example, at a particular point in time within the performance of a touchless gesture 810.

The touchless gesture 810 of FIG. 64BC can correspond to an example touchless gesture type 813 corresponding to a touchless selection gesture performed across three consecutive temporal periods i, i+1, i+2 of same or different lengths. The hover regions 605, absolute hover distances 602, and/or relative hover distances 602, can be in capacitance image data across these three consecutive temporal periods for comparison with touchless gesture pattern data 815 to identify a type of gesture corresponding to the touchless selection gesture.

In this example, the touchless selection gesture can have corresponding touchless gesture pattern data 815 denoting a pattern of a single finger, or other object: hovering at a first hover distance 602.*a* in a first temporal period i; transitioning, in a second temporal period i+1 following the first temporal period, from the first hover distance 602.*a* to a second hover distance 602.*b* that is smaller than the first hover distance 602.*a*, for example, by at least a threshold amount; and transitioning, in a third temporal period i+2 following the second temporal period, from the second hover distance 602.*b* to a third hover distance 602.*c* that is greater than second hover distance 602.*b*, for example, by at least a threshold amount, and/or that is similar to the first hover distance 602.*a*.

The touchless gesture pattern data 815 for the touchless selection gesture can optionally indicate a threshold difference in hover distance between the first hover distance 602.*a* and the second hover distance 602.*b*, and/or between the second hover distance 602.*b* and the third hover distance 602.*c*. The touchless gesture pattern data 815 for the touchless selection gesture can indicate a threshold difference in hover distance between the first hover distance 602.*a* and the second hover distance 602.*b*, and/or between the second hover distance 602.*b* and the third hover distance 602.*c*. The touchless gesture pattern data 815 can indicate threshold minimum and/or maximum distances for the first hover distance 602.*a*, the second hover distance 602.*b*, and/or the third hover distance 602.*c*. The hover distance for a potential and/or true touchless indication can be computed and/or estimated as a function of positive capacitance variation data of a corresponding hover region and/or touchless indication point as discussed previously.

The touchless gesture pattern data 815 for the touchless selection gesture can optionally indicate a threshold minimum and/or maximum time for the transition between the first hover distance and the second hover distance, and/or for the transition between the second hover distance and the third hover distance. This can include a threshold minimum and/or maximum time span for temporal period i, i+1, and/or i+2.

The touchless gesture pattern data 815 for the touchless selection gesture can indicate maximum and/or minimum threshold rates of change of hover distance, for example, as the speed of the finger in transitioning between different hover distances.

The touchless gesture pattern data 815 for the touchless selection gesture can indicate maximum threshold movement of the corresponding hover region in the x-y plane, for example, where detection of the touchless selection gesture requires that the hover region position remain relatively stable, for example, by remain within a threshold area size, and/or not moving in position by more than a threshold amount during performance of the gesture.

The touchless indication point of the touchless selection gesture can be utilized to determine a corresponding "click" point for the corresponding touchless gesture. This can be based on an average touchless indication point across the duration of the touchless gesture, an initial touchless indication point of the hover region in temporal period i, touchless indication point of the hover region in temporal period i+1, for example, with maximum positive capacitance variance data and/or minimal hover distance within the touchless selection gesture, a final touchless indication point of the hover region in temporal period i+2, or based on other processing of hover regions across the some or all of the tracked touchless selection gesture.

While not depicted, other types of gestures can correspond to other types of patterns involving movement relative to the z-axis similar to the example of FIG. 64BC where hover distance changes with respect to a corresponding touchless gesture pattern. While not depicted, other types of gestures can correspond to other types of patterns involving movement relative to the x-y plane, where the position of hover region changes with respect to a corresponding touchless gesture pattern. While not depicted, other types of gestures can correspond to other types of patterns involving movement relative to the x-y plane and/or the z-axis for multiple hover regions, corresponding to fingers of the same or different hand, where the position of hover region changes with respect to a corresponding touchless gesture pattern. Some types of gestures can correspond to other types of patterns involving particular movement of one or both hands, for example, detected based on anatomical feature mapping data tracked over a temporal period indicating the user's hand moved in accordance with the respective pattern.

FIG. 64BD illustrates a flow diagram of an embodiment of a method in accordance with the present disclosure. In particular a method is presented for use in conjunction with the processing module 42, touch screen 16, and/or other processing modules and/or touch screen displays disclosed herein, Some or all steps of FIG. 64BD can be performed in conjunction with some or all steps method of FIG. 64AK and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 474 includes generating capacitance image data across a temporal period based on the plurality of sensed signals. For example, performing step 474 includes performing step 384, step 312, and/or otherwise includes generating capacitance image data including positive capacitance variation data and negative capacitance variation data. The capacitance image data can be generated for multiple points in time across a temporal period, where a stream of sequential capacitance image data is generated within the temporal period. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 476 includes processing the capacitance image data to identify a touchless gesture occurring within the temporal period. For example, performing step 476 is performed in conjunction with performing step 386, step 466 and/or step 468, and/or steps 416-418. The touchless gesture can be detected based on identifying portions of the capacitance image data generated within the time period comparing favorably to touchless gesture pattern data 815. The touchless gesture can be identified as a given type of gesture of a set of different types of touchless gestures, for example, based on the capacitance image data generated within the time period comparing more favorably to the touchless gesture pattern data 815 of the given type of gesture than the touchless gesture pattern data of some or all other types of gestures. The identified touchless gesture can optionally be processed as a command for interaction with graphical image data displayed by a display of the touch screen, for example, to induce a change in the display of the graphical image data, to induce performance of operations in response to selection of a selectable region via the touchless gesture, and/or to otherwise process and/or execute some or all of the corresponding command.

FIGS. 64BE-64BF present embodiments of touch screen 16 where both touchless indications and touch-based indications are detected and processed. In particular, the touch screen 16 can be operable to enable a user can interact with various graphical image data via a combination of touch-based indications and touchless indications 610. Some or all features and/or functionality of the touch screen 16 and/or processing module 42 of embodiments discussed in conjunction with FIGS. 64BE-64BF can be utilized to implement the touch screen 16 and/or processing module 42 of FIGS. 57-60, and/or any other embodiment of touch screen 16 and/or processing module 42 described herein.

FIG. 64BE is a schematic block diagram of an embodiment of a touchless indication detection function 842 and a touch-based indication detection function 841 in accordance with the present disclosure. The touchless indication detection function 842 and/or a touch-based indication detection function 841 can be performed by processing module 42 in processing capacitance image data prior to and/or after compensation. The touchless indication detection function 842 and touch-based indication detection function 841 can be performed simultaneously, can be performed at different times based on the current mode of operation, can be performed in parallel without coordination, and/or can be performed in conjunction as part of performing a common indication detection function to detect any interaction with touch screen 16, whether touch-based or touchless.

The touchless indication detection function 842 can be operable to generate touchless indication detection data 844. For example, the touchless indication detection function 842 can be implemented as the condition detection function 2266-1 operable to detect touchless indications 610 as discussed previously, where the touchless indication detection data 844 indicates detection of and/or characteristics of touchless indications 610. This can include distinguishing between true and false touchless indications, mapping and/or tracking the hand and/or individual fingers upon the hand as anatomical feature mapping data 730; detecting and/or tracking hover regions 605, identifying and/or tracking touchless indication points 745, identifying touchless gestures 810, detecting touchless indications based on having entered the touchless mode of operation 830, and/or processing other types and/or characteristics of touchless indications 610 as discussed herein. For example, performing the touchless indication detection function 842 includes performing one or more of: touchless indication determination function 630, anatomical feature mapping data generator function 710, touchless indication point identification function 740, initial touchless indication detection function 762 and/or maintained touchless indication detection function 768, touchless gesture identification function 820, and/or touchless mode initiation function 835.

Performing the touchless indication detection function can be based on performing at least one image processing function. For example, performing the image processing function can include utilizing a computer vision model trained via a training set of capacitance image data, for example, imposed via various touchless indications described herein. The computer vision model can be trained via at least one machine learning function and/or technique and/or at least one artificial intelligence function and/or technique. Performing the touchless indication detection function can include utilizing at least one machine learning function and/or technique and/or at least one artificial intelligence function and/or technique.

The touch-based indication detection function 841 can be operable to generate touch-based indication detection data 843. For example, the touch-based indication detection function 8421 can be implemented as another condition detection function 2266 operable to detect touch-based indications.

Performing the touch-based indication detection function can be based on performing at least one image processing function. For example, performing the image processing function can include utilizing a computer vision model trained via a training set of capacitance image data, for example, imposed via various touch-based indications described herein. The computer vision model can be trained via at least one machine learning function and/or technique and/or at least one artificial intelligence function and/or technique. Performing the touchless indication detection function can include utilizing at least one machine learning function and/or technique and/or at least one artificial intelligence function and/or technique.

The touch-based indication detection data 843 can be detected in a same or similar fashion as touchless detection data, where a different threshold is utilized to distinguish touch-based indications from touchless indications. In particular, detected hover regions having positive capacitance variance data falling below or otherwise comparing unfavorably to the touch threshold 344 can be identified as touchless indications by the touchless indication detection function 842 when the positive capacitance variance data also is greater than or equal to the touchless indication threshold 342 as discussed previously. Meanwhile detected hover regions having positive capacitance variance data greater than or equal to, or otherwise comparing favorably to the touch threshold 344, can be identified as touch-based indications by the touch-based indication detection function 843.

Other than having different capacitance variance thresholds, touch-based indications can optionally be processed in a same or similar fashion as touchless indication described herein. For example: a touch region of a touch-based indication can be identified in a same or similar fashion as hover region 605, where the touch threshold 344 is utilized instead of the touchless indication threshold 342 to identify touch regions; a touch indication point of a touch-based indication can be identified within a detected touch region in a same or similar fashion as identifying a touchless indication point 745 for a given hover region 605; true touch-based indications can be distinguished from false touch-based indications in a same or similar fashion as distinguishing true touchless indications from false touchless indications, by utilizing corresponding touch-based indication parameter threshold data that is similar to touchless indication parameter threshold data 615, with differences that include different positive capacitance variation thresholds corresponding to a closer proximity to and/or physical touch of the surface of the touch screen; touch-based gestures can be detected in a same or similar fashion as identifying a touchless gestures, where some or all patterns of touch-based gestures with respect to the x-y axis types optionally correspond same or different patterns with respect to the x-y axis for some or all types of touchless gestures in the touchless gesture set 812;

and/or can otherwise be processed similarly to and/or differently from touchless indications.

In this fashion, various touchless indications detected in capacitance image data over time can be distinguished from, and optionally induce different commands or otherwise be processed differently from, various touch-based indications detected in capacitance image data over time. For example, a given touchless gesture with a particular pattern with respect to the x-y axis can be detected and can correspond to a first command or otherwise induce a first type of interaction with the graphical image data, while a given touch-based gesture with the same or similar particular pattern with respect to the x-y axis can be detected, distinguished from the corresponding touchless gesture, and can correspond to a second command or otherwise induce a second type of interaction with the graphical image data. As another example, a user detected to be hovering over the touch screen can induce display of touchless indication display data but is not processed as commands, for example, to a corresponding application executed by the touch screen, but once the user further engages with the touch screen 16 via touch-based indications, these touch-based indications are distinguished from the hovering movements, and are processed as corresponding commands, for example, to a corresponding application executed by the touch screen.

Alternatively, various touchless indications detected in capacitance image data over time can be processed in a same fashion, where both touch-based and touchless indications are detected, but are optionally not distinguished from one another. For example, rather than separately identifying touch-based and touchless indications, all hover regions and/or indication points detected as comparing favorably to the touchless indication threshold 342 can be treated in the same fashion, regardless of whether they compared favorably to unfavorably to the touch threshold 344. In this fashion a user can elect to engage with the touch screen via touch-based interactions, or identical touchless interactions, to induce the same effect.

In some embodiments, rather than being operable to identify both touch-based and touchless indications in given capacitance image data, the means by which the capacitance image data is processed depends on whether the touch screen 16 is operating in the touchless mode of operation 830 or a touch-based mode of operation. For example, while in the touch-based mode of operations, touchless indications are not detected, where touchless indication detection function 842 is optionally not performed and/or where touchless indication detection data 844 is not processed to induce interaction with graphical image data. Alternatively or in addition, while in the touchless mode of operations, touch-based indications are not detected, where touch-based indication detection function 841 is optionally not performed and/or where touch-based indication detection data 843 is not processed to induce interaction with graphical image data.

In some embodiments, the touch screen can optionally operate in a mode of operation where both touch-based and touchless indications are detected and processed, for example, based on being in both the touchless mode of operation and the touch-based mode of operation at a given time. Alternatively, the touch screen can operate in either the touchless mode of operation or the touch-based mode of operation at given time, but not both, but is operable to shift between these modes of operations based on determining to shift from one mode of operation to the other mode of operation, for example, based on detection of a corresponding condition utilized to change between modes of operation.

In some embodiments, the processing module enters the touch-based mode of operation based on detecting a touch-based indication, for example as an initiation gesture to enter the touch-based mode of operation, in touch-based indication detection data 843. Alternatively or in addition, the processing module enters the touchless mode of operation based on detecting a touchless indication, for example as a touchless indication initiation gesture to enter the touchless mode of operation as discussed in conjunction with FIGS. 67A-67B, in touchless indication detection data 844.

In some embodiments, the processing module operates in accordance with the touch-based mode of operation based on displaying a particular type of graphical image data 700 and/or based on executing a particular type of application, and operates in accordance with the touchless mode of operation based on displaying another particular type of graphical image data 700 and/or based on executing another particular type of application. For example, while a given application is being executed, the processing module operates in accordance with the touch-based mode of operation, and switches to the touchless mode of operation based on a different application being executed.

In some embodiments, at a given time while displaying particular graphical image data 700, the processing module can be operable to detect interaction with different interface elements of the graphical image data 700, for example, with respect to the x-y axis, in accordance with the different modes of operation. For example, at a given time, the graphical image data 700 displays a first interface feature, such as a first button, slider, hyperlink, keyboard, or other selectable region that includes an interactable interface element, in a first location with respect to the x-y plane, in accordance with the touch-based mode of operation, where only touch-based interaction, and not touchless interaction, is detected and/or processed as command data in the region of the graphical image data 700. At this same given time, the graphical image data 700 also displays a second interface feature, such as a second button, slider, hyperlink, keyboard, or other selectable region that includes an interactable interface element, in a second location with respect to the x-y plane, in accordance with the touchless mode of operation, where touchless interaction is detected and/or processed as command data in this region of the graphical image data 700.

In some embodiments, the different types of graphical image data 700 and/or types of applications that induce operation under these different modes of operation can be based on a speed and/or precision of dexterity required to interact with the corresponding graphical image data 700 and/or type of application. For example, interface elements of graphical image data and/or application requiring greater speed and/or greater precision, such as keyboard elements and/or gaming applications, induce the touch-based mode of operation, while interface elements of graphical image data and/or application requiring slower speed and/or lower precision, such as media player applications and/or social media applications, induce the touch-based mode of operation.

In some embodiments, the different types of graphical image data 700 and/or types of applications that induce operation under these different modes of operation can be based on a level of public-facing interaction of the graphical image data and/or the corresponding application. For example, a touch screen implemented as a tablet at a commercial establishment, such as a restaurant and/or at a point-of-sale at the commercial establishment, operates under the touchless mode of operation when displaying graphical user interface features requiring customer interaction, such as supplying of a signature, selection of a tip amount, and/or indicating a receipt be printed, emailed, and/or texted to the customer. The touch screen implemented as a tablet at the commercial establishment can operate under the touch-based mode of operation when displaying graphical user interface features requiring merchant interaction, such as selection of items or services purchased by a corresponding customer, assignment of the user to a table, or other interface features of the same or different application relating to the point of sale or the commercial establishment for interaction via personnel of the establishment.

In some embodiments, the different types of graphical image data 700 and/or types of applications that induce operation under these different modes of operation can be based on importance and/or severity of consequence of inadvertently detected indications. For example, banking applications, interface features corresponding to execution of a financial transaction, interface elements associated with transmission of data to a server system, or other applications and/or interface elements associated with a high level of severity can be executed in accordance with the touch-based mode of operation. Other applications and/or interface elements associated with a lower level of severity, such as media player applications, interface elements for scrolling, or other lower severity applications, can be executed in accordance with the touchless mode of operation.

In some embodiments, the different types of graphical image data 700 and/or types of applications that induce operation under these different modes of operation can be configured based on user preferences. For example, a touch screen used exclusively or primarily by a given user can be configured to operate in the touch-based mode, touchless mode, or both, for various interface features and/or applications, based on user-configured and/or automatically learned personal preferences of the user. For example, a user may elect that use of a recipe application, or display of data of a particular website corresponding to display of recipes, be executed in accordance with the touchless mode of operation to reduce the need to touch the touch screen with sticky fingers while cooking. As another example, a user may elect that interaction with a web browser application or other application that hosts ads that, when clicked on, direct the user to an advertiser's webpage, be executed in accordance with the touch-based mode of operation, as to mitigate risk of the touch screen interacting with an advertisement due to inadvertent hovering by the user. As another example, some users may prefer to interact with particular types of interface features, such as keyboards, in the touchless mode of operations, while other users may prefer to interact with particular types of interface features in the touch-based mode of operations.

In some embodiments, alternatively or in addition to processing interaction with different interface features and/or applications with either the touch-based or touchless mode of operation, the touchless mode of operation can be further configured, for example, to enable lower and/or higher sensitivity of detection of touchless indications, based on the different interface features and/or applications. For example, various threshold requirements and/or other parameters of the touchless indication threshold parameter data 615 can be configured differently for different interface features and/or applications. Such configurations can be determined automatically, for example, based on same or similar criteria as discussed with regards to selection between the touch-based and touchless mode of operation. Alternatively or in addition, such configurations can be determined based on user-configured and/or automatically learned user preferences.

In some embodiments, the mode of operation, and/or the given touchless indication threshold parameter data 615, can be configured based on other detected conditions instead of or in addition to the given application and/or the given interface features. For example, a mode of operation and/or touchless indication threshold parameter data 615 for a touch screen implemented via a mobile device can be determined and/or changed based on the location of the touch screen, such as geolocation data or other location generated by the mobile device. As another example, a mode of operation and/or touchless indication threshold parameter data 615 for a touch screen can be determined and/or changed based on the touch screen connecting with another device, such as speakers, a display device, or another device via a wired and/or short range wireless connection, such as a Bluetooth connection.

In some embodiments, a mode of operation and/or touchless indication threshold parameter data 615 for a touch screen can be determined and/or changed based on other mode of operation of a corresponding device implementing the touch screen. For example, a vehicle operates in accordance with the touchless mode of operation while detected to be motion and/or while detected to be in a drive mode, and can operates in accordance with the touch-based mode of operation, alternatively or in addition to the touchless mode of operation, while detected to be static and/or while detected to be in a park mode.

FIG. 64BF illustrates a flow diagram of an embodiment of a method in accordance with the present disclosure. In particular, a method is presented for use in conjunction with the processing module 42, touch screen 16, and/or other processing modules and/or touch screen displays disclosed herein, Some or all steps of FIG. 64BF can be performed in conjunction with some or all steps method of FIG. 64AK and/or some or all steps of other methods described herein.

Step 382 includes receiving a plurality of sensed signals. For example, performing step 382 includes performing step 310 and/or otherwise includes receiving sensed indications of mutual capacitance. The plurality of sensed signals can indicate variations in capacitance associated with the plurality of cross points formed by a plurality of row electrodes 85 and a plurality of column electrodes 85 as discussed previously herein.

Step 384 includes generating capacitance image data based on the plurality of sensed signals. The capacitance image data can be generated for multiple points in time across a temporal period, where a stream of sequential capacitance image data is generated within the temporal period. For example, performing step 384 includes performing step 474 and/or otherwise includes processing a stream of capacitance image data generated across a temporal period. The capacitance image data can be associated with the plurality of cross points, for example, such as a two-dimensional heat map of capacitance variation data corresponding to the plurality of cross-points across a corresponding two-dimensional area. The capacitance image data can include capacitance variation data corresponding to variations of the capacitance image data from a nominal value.

Step 506 includes processing the capacitance image data to detect a touch-based indication. The touch-based interaction can be detected based on determining the capacitance image data compares favorably to a touch threshold 344 and/or other touch-based indication threshold parameter data. The touch-based interaction can be detected based on performing the touch-based indication detection function 841.

Step 508 includes processing the capacitance image data to detect a touchless indication. For example, performing step 508 includes performing step 386. The touchless interaction can be detected based on determining the capacitance image data compares favorably to a touchless indication threshold 342, compares unfavorably to a touch threshold 344, and/or compares favorably other touchless indication threshold parameter data 615. The touchless interaction can be detected based on performing the touchless indication detection function 842.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An interactive display device comprises:

a display configured to render frames of data into visible images;

a plurality of electrodes integrated into the display to facilitate touch sense functionality based on electrode signals having a drive signal component and a receive signal component, wherein the plurality of electrodes includes a plurality of row electrodes and a plurality of column electrodes, wherein the plurality of row electrodes is separated from the plurality of column electrodes by a dielectric material and wherein the plurality of row electrodes and the plurality of row electrodes form a plurality of cross points;

a plurality of drive-sense circuits coupled to at least some of the plurality of electrodes to generate a plurality of sensed signals, wherein each the plurality of drive-sense circuits includes a first conversion circuit and a second conversion circuit, and wherein, when a drive-sense circuit of the plurality of drive-sense circuits is enabled to monitor a corresponding electrode of the plurality of electrodes, the first conversion circuit is configured to convert the receive signal component into a sensed signal of the plurality of sensed signals and the second conversion circuit is configured to generate the drive signal component from the sensed signal of the plurality of sensed signals; and a processing module that includes at least one memory that stores operational instructions and at least one processing circuit that executes the operational instructions so that the interactive display device is configured to:

receive a first plurality of sensed signals during a first temporal period, wherein the first plurality of sensed signals indicate a first plurality of changes in electrical characteristics of a set of electrodes of the plurality of electrodes;

detect a first impedance pattern identifying a writing passive device based on interpreting the first plurality of changes in the electrical characteristics of the set of electrodes during the first temporal period;

identify the writing passive device based on the first plurality of changes in the electrical characteristics of the set of electrodes, wherein the writing passive device is identified based on detecting the first impedance pattern;

determine, by the processing module, written user notion data based on detecting movement of the writing passive device in relation to the interactive display device during the first temporal period;

process the written user notation data for display, via the display, in accordance with at least one display setting corresponding to the writing passive device based on identifying the writing passive device based on detecting the first impedance pattern;

receive a second plurality of sensed signals, wherein the first plurality of sensed signals indicate a second plurality of changes in electrical characteristics of the plurality of electrodes;

identifying, by the processing module, a second writing passive device in proximity to the interactive display device by detecting a second impedance pattern identifying the second writing passive device based on interpreting at least one second change in the electrical characteristics of the set of electrodes, wherein the second impedance pattern is different from the first impedance pattern;

determining, by the processing module, second written user notion data based on interpreting the at least one second change in the electrical characteristics of the set of electrodes induced via movement of the second writing passive device in relation to the interactive display device; and process the second written user notation data for display, via the display, in accordance with at least one second display setting corresponding to the second writing passive device based on identifying the second writing passive device, wherein the at least one second display setting is different from the at least one display setting based on the second impedance pattern being different from the first impedance pattern.

2. The interactive display device of claim 1, wherein the interactive display device is further configured to:

detect a third impedance pattern identifying an erasing passive device based on interpreting a third plurality of changes in the electrical characteristics of the set of electrodes, wherein the third impedance pattern is different from the first impedance pattern, wherein the erasing passive device is identified based on detecting the third impedance pattern.

3. The interactive display device of claim 2, wherein the interactive display device is further configured to:

determine erased portions of the written user notation data based on detecting movement of the erasing passive device in relation to the interactive display device; and process the erased portion of the written user notation data for display via the display, wherein the display no longer displays the erased portions of the written user notation data based on the erased portion of the written user notation data being processed for display.

4. The interactive display device of claim 2, wherein a combination passive device includes the writing passive device on a first end of the combination passive device, and wherein the combination passive device includes the erasing passive device on a second end of the combination passive device.

5. The interactive display device of claim 1, wherein the first impedance pattern of the writing passive device is different from other ones of a plurality of impedance patterns of a plurality of different writing passive devices, and wherein the at least one display setting corresponding to the writing passive device corresponds to user profile settings of a user mapped to the writing passive device.

6. The interactive display device of claim 1, wherein, based on the at least one display setting indicating a first color, the written user notation data is displayed in accordance with the first color, wherein, based on the at least one second display setting indicating a second color, the second written user notation data is displayed in accordance with the second color, and wherein the first color is different from the second color.

7. The interactive display device of claim 1, wherein, based on the at least one display setting indicating a first line thickness, the written user notation data is displayed in accordance with the first line thickness;

wherein, based on the at least one second display setting a second line thickness, the second written user notation data is displayed in accordance with the second line thickness; and wherein the first line thickness is different from the second line thickness.

8. The interactive display device of claim 1, wherein the writing passive device is used by a first user interacting with the interactive display device during the first temporal period, wherein the movement of the second writing passive device in relation to the interactive display device is detected during a second temporal period based on use of the second writing passive device by the first user interacting with the interactive display device during the second temporal period, wherein the second written user notion data is determined based on the movement of the second writing passive device in relation to the interactive display device during the second temporal period, and wherein the second written user notion data is displayed during the second temporal period.

9. The interactive display device of claim 1, wherein the writing passive device is used by a first user interacting with the interactive display device during the first temporal period, wherein the movement of the second writing passive device in relation to the interactive display device is detected during the first temporal period based on use of the second writing passive device by a second user also interacting with the interactive display device during the first temporal period, wherein the second written user notion data is determined based on the movement of the second writing passive device in relation to the interactive display device during the first temporal period, and wherein the second written user notion data is displayed during the first temporal period in conjunction with displaying the written user notation data during the first temporal period.

10. The interactive display device of claim 1, wherein the first impedance pattern of the writing passive device is different from other ones of a plurality of impedance patterns of a plurality of different writing passive devices, wherein at least one functional setting mapped to the writing passive device is different from other functional settings mapped to other ones of the plurality of different writing passive devices, and wherein the interactive display device is further configured to:

process the written user notation data in accordance with the at least one functional setting mapped to the writing passive device.

11. The interactive display device of claim 10, wherein the at least one functional setting identifies at least one of:

a user of a plurality of users, wherein the written user notation data is processed in accordance with the at least one functional setting corresponding to user profile data of the user, an educational course of a plurality of different educational courses, wherein the written user notation data is processed in accordance with the at least one functional setting corresponding to context-based processing based on the educational course; or permissions data, wherein the written user notation data is processed in accordance with the at least one functional setting corresponding to only allowed functionality allowed corresponding to the permissions data.

12. The interactive display device of claim 1, wherein a multi-tip writing device includes a plurality of interchangeable tips, wherein the writing passive device corresponds to a first interchangeable tip of the multi-tip writing device, and wherein the second writing passive device corresponds to a second interchangeable tip of the multi-tip writing device.

13. The interactive display device of claim 12, wherein the first interchangeable tip is identified based on detecting the first impedance pattern, wherein the written user notation data is displayed in accordance with the at least one display setting corresponding to the first interchangeable tip based on identifying first interchangeable tip based on detecting the first impedance pattern; and wherein the second interchangeable tip is identified based on detecting the second impedance pattern, wherein the second written user notation data is displayed in accordance with the at least one second display setting corresponding to the second interchangeable tip based on identifying second interchangeable tip based on detecting the second impedance pattern.

14. A method comprises:

transmitting, by a plurality of drive sense circuits of an interactive device, a plurality of signals on a plurality of electrodes of the interactive device;

detecting, by a set of drive sense circuits of the plurality of drive sense circuits, a first plurality of changes in electrical characteristics of a set of electrodes of the plurality of electrodes during a first temporal period;

detecting a first impedance pattern identifying a writing passive device based on interpreting the first plurality of changes in the electrical characteristics of the set of electrodes during the first temporal period; wherein the first impedance pattern of the writing passive device is different from other ones of a plurality of impedance patterns of a plurality of different writing passive devices, and wherein at least one functional setting mapped to the writing passive device is different from other functional settings mapped to other ones of the plurality of different writing passive devices;

identifying the writing passive device based on the first plurality of changes in the electrical characteristics of the plurality of electrodes, wherein the writing passive device is identified based on detecting the first impedance pattern;

determining written user notion data based on detecting movement of the writing passive device in relation to the interactive device during the first temporal period; and processing the written user notation data for display in accordance with the at least one functional setting mapped to the writing passive device.

15. The method of claim 14, further comprising:

detecting a third impedance pattern identifying an erasing passive device based on interpreting a third plurality of changes in the electrical characteristics of the set of electrodes, wherein the third impedance pattern is different from the first impedance pattern, wherein the erasing passive device is identified based on detecting the third impedance pattern.

16. The method of claim 14, wherein the interactive device includes a display upon a surface of the interactive device, and wherein the written user notation data is displayed via display.

17. The method of claim 14, further comprising:

transmitting the written user notation data to a separate display device separate from the interactive device, wherein the separate display device displays the written user notation data based on receiving the written user notation data.

18. The method of claim 14, wherein the interactive device includes a surface, and wherein the written user notation data is further visibly viewable upon the surface based on being physically written upon the surface.

19. The method of claim 18, wherein at least one of:

the surface is a chalkboard surface, and the writing passive device is configured to produce chalk notations via chalk upon the chalkboard surface, the surface is a whiteboard surface, and the writing passive device is configured to produce ink notations via ink upon the whiteboard surface; or the writing passive device is configured to produce graphite notations via graphite upon paper placed upon the surface.

20. A method comprises:

transmitting, by a plurality of drive sense circuits of an interactive device, a plurality of signals on a plurality of electrodes of the interactive device;

detecting, by a set of drive sense circuits of the plurality of drive sense circuits, a first plurality of changes in electrical characteristics of a set of electrodes of the plurality of electrodes during a first temporal period;

detecting a first impedance pattern identifying a writing passive device based on interpreting the first plurality of changes in the electrical characteristics of the set of electrodes during the first temporal period;

identifying the writing passive device based on the first plurality of changes in the electrical characteristics of the plurality of electrodes, wherein the writing passive device is identified based on detecting the first impedance pattern;

determining written user notion data based on detecting movement of the writing passive device in relation to the interactive device during the first temporal period;

processing the written user notation data for display in accordance with at least one display setting corresponding to the writing passive device based on identifying the writing passive device based on detecting the first impedance pattern;

detecting, by at least some of the set of drive sense circuits of the plurality of drive sense circuits, a second plurality of changes in electrical characteristics of at least some of the set of electrodes of the plurality of electrodes;

detecting a second impedance pattern identifying a second passive device based on interpreting the second plurality of changes in the electrical characteristics of the set of electrodes;

identifying a second writing passive device based on the first plurality of changes in the electrical characteristics of the plurality of electrodes, wherein the second writing passive device is identified based on detecting the second impedance pattern, and wherein the second impedance pattern is different from the first impedance pattern;

determining second written user notion data based on detecting movement of the second writing passive device in relation to the interactive device during the first temporal period; and processing the second written user notation data for display in accordance with at least one second display setting corresponding to the second writing passive device based on identifying the second writing passive device based on detecting the second impedance pattern, wherein the at least one second display setting is different from the at least one display setting.

* * * * *